US012235960B2

(12) United States Patent
Klonowski et al.

(10) Patent No.: US 12,235,960 B2
(45) Date of Patent: *Feb. 25, 2025

(54) BEHAVIORAL THREAT DETECTION DEFINITION AND COMPILATION

(71) Applicant: Open Text Inc., Menlo Park, CA (US)

(72) Inventors: Eric Klonowski, Broomfield, CO (US); Fred Krenson, Denver, CO (US)

(73) Assignee: OPEN TEXT INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,200

(22) Filed: Mar. 18, 2022

(65) Prior Publication Data

US 2022/0207144 A1    Jun. 30, 2022

Related U.S. Application Data

(63) Continuation of application No. 16/366,014, filed on Mar. 27, 2019, now Pat. No. 11,314,863.

(51) Int. Cl.
*G06F 21/56* (2013.01)
*G06F 8/41* (2018.01)
*G06F 9/455* (2018.01)

(52) U.S. Cl.
CPC ............. *G06F 21/566* (2013.01); *G06F 8/41* (2013.01); *G06F 9/45558* (2013.01); *G06F 21/567* (2013.01); *G06F 2009/45587* (2013.01)

(58) Field of Classification Search
CPC ...... G06F 21/552; G06F 21/56; G06F 21/566; G06F 21/567; G06F 8/41; G06F 2009/45587; G06F 9/45558
See application file for complete search history.

(56) References Cited

U.S. PATENT DOCUMENTS 5,121,345 A   6/1992 Lentz
5,359,659 A   10/1994 Rosenthal
(Continued)

FOREIGN PATENT DOCUMENTS

AU         701007 B2    1/1999
AU     2001262958 A1   11/2001
(Continued)

OTHER PUBLICATIONS

Notice of Allowance for U.S. Appl. No. 16/366,065, dated Jun. 29, 2022, 7 pgs.

(Continued)

*Primary Examiner* — Linglan Edwards
(74) *Attorney, Agent, or Firm* — Sprinkle IP Law Group

(57) ABSTRACT

Examples of the present disclosure describe systems and methods for behavioral threat detection definition compilation. In an example, one or more sets of rule instructions may be packaged for distribution and/or use by a behavioral threat detection engine. As an example, a set of rule instructions is compiled into an intermediate language and assembled in to a compiled behavior rule binary. Event linking is performed, wherein other rules launched by the rule and/or events that launch the rule or are processed by the rule are identified, and such information may be stored accordingly. The behavior rule binary may be packaged with other rules associated with identifying a specific behavior. The packaged behavior rule is distributed to one or more computing devices for use with a behavioral threat detection engine. For example, the threat detection engine may execute the behavior rule using a rule virtual machine.

19 Claims, 6 Drawing Sheets

(56) References Cited

U.S. PATENT DOCUMENTS

| | | | |
|---|---|---|---|
| 5,440,723 A | 8/1995 | Arnold |
| 5,450,586 A | 9/1995 | Kuzara |
| 5,473,769 A | 12/1995 | Cozza |
| 5,511,184 A | 4/1996 | Lin |
| 5,623,600 A | 4/1997 | Ji |
| 5,680,547 A | 10/1997 | Chang |
| 5,696,822 A | 12/1997 | Nachenberg |
| 5,826,013 A | 10/1998 | Nachenberg |
| 5,832,208 A | 11/1998 | Chen |
| 5,886,699 A | 3/1999 | Belfiore |
| 5,889,943 A | 3/1999 | Ji |
| 5,951,698 A | 9/1999 | Chen |
| 5,960,170 A | 9/1999 | Chen |
| 5,983,348 A | 11/1999 | Ji |
| 5,991,881 A | 11/1999 | Conklin |
| 5,999,723 A | 12/1999 | Nachenberg |
| 6,021,510 A | 2/2000 | Nachenberg |
| 6,035,423 A | 3/2000 | Hodges |
| 6,044,155 A | 3/2000 | Thomlinson |
| 6,088,804 A | 7/2000 | Hill |
| 6,092,194 A | 7/2000 | Touboul |
| 6,094,731 A | 7/2000 | Waldin |
| 6,149,522 A | 11/2000 | Alcorn |
| 6,154,844 A | 11/2000 | Touboul |
| 6,195,587 B1 | 2/2001 | Hruska |
| 6,272,641 B1 | 8/2001 | Ji |
| 6,321,338 B1 | 11/2001 | Porras |
| 6,327,579 B1 | 12/2001 | Crawford |
| 6,412,071 B1 | 6/2002 | Hollander |
| 6,460,060 B1 | 10/2002 | Maddalazzo |
| 6,578,094 B1 | 6/2003 | Moudgill |
| 6,594,686 B1 | 7/2003 | Edwards |
| 6,658,571 B1 | 12/2003 | O'Brien |
| 6,663,000 B1 | 12/2003 | Muttik |
| 6,704,874 B1 | 3/2004 | Porras |
| 6,721,721 B1 | 4/2004 | Bates |
| 6,728,886 B1 | 4/2004 | Ji |
| 6,735,703 B1 | 5/2004 | Kilpatrick |
| 6,742,123 B1 | 5/2004 | Foote |
| 6,742,128 B1 | 5/2004 | Joiner |
| 6,772,346 B1 | 8/2004 | Chess |
| 6,772,363 B2 | 8/2004 | Pedone |
| 6,775,780 B1 | 8/2004 | Muttik |
| 6,785,732 B1 | 8/2004 | Bates |
| 6,842,861 B1 | 1/2005 | Cox |
| 6,873,988 B2 | 3/2005 | Herrmann |
| 6,880,110 B2 | 4/2005 | Largman |
| 6,886,099 B1 | 4/2005 | Smithson |
| 6,889,167 B2 | 5/2005 | Curry |
| 6,928,550 B1 | 8/2005 | Le Pennec |
| 6,944,772 B2 | 9/2005 | Dozortsev |
| 6,839,850 B1 | 10/2005 | Campbell |
| 6,966,059 B1 | 11/2005 | Shetty |
| 6,971,019 B1 | 11/2005 | Nachenberg |
| 6,973,577 B1 | 12/2005 | Kouznetsov |
| 6,983,377 B1 | 1/2006 | Beesley |
| 7,024,694 B1 | 4/2006 | Ko |
| 7,043,757 B2 | 5/2006 | Hoefelmeyer |
| 7,055,008 B2 | 5/2006 | Niles |
| 7,055,148 B2 | 5/2006 | Marsh |
| 7,069,480 B1 | 5/2006 | Lovy |
| 7,062,553 B2 | 6/2006 | Liang |
| 7,080,000 B1 | 6/2006 | Cambridge |
| 7,089,428 B2 | 8/2006 | Farley |
| 7,093,239 B1 | 8/2006 | van der Made |
| 7,093,292 B1 | 8/2006 | Pantuso |
| 7,096,215 B2 | 8/2006 | Bates |
| 7,096,500 B2 | 8/2006 | Roberts |
| 7,099,853 B1 | 8/2006 | Liu |
| 7,107,618 B1 | 9/2006 | Gordon |
| 7,134,141 B2 | 11/2006 | Crosbie |
| 7,152,164 B1 | 12/2006 | Loukas |
| 7,152,242 B2 | 12/2006 | Douglas |
| 7,174,566 B2 | 2/2007 | Yadav |
| 7,178,165 B2 | 2/2007 | Abrams |
| 7,188,369 B2 | 3/2007 | Ho |
| 7,203,960 B1 | 4/2007 | Painter |
| 7,203,962 B1 | 4/2007 | Moran |
| 7,210,168 B2 | 4/2007 | Hursey |
| 7,225,343 B1 | 5/2007 | Honig |
| 7,228,562 B2 | 5/2007 | Szor |
| 7,231,667 B2 | 6/2007 | Jordan |
| 7,237,008 B1 | 6/2007 | Tarbotton |
| 7,257,841 B2 | 8/2007 | Naitoh |
| 7,263,616 B1 | 8/2007 | Brackett |
| 7,269,851 B2 | 9/2007 | Ackroyd |
| 7,287,278 B2 | 10/2007 | Liang |
| 7,287,281 B1 | 10/2007 | Szor |
| 7,290,266 B2 | 10/2007 | Gladstone |
| 7,290,282 B1 | 10/2007 | Renert |
| 7,302,706 B1 | 11/2007 | Hicks |
| 7,308,714 B2 | 12/2007 | Bardsley |
| 7,310,817 B2 | 12/2007 | Hinchliffe |
| 7,334,264 B2 | 2/2008 | Takahashi |
| 7,340,777 B1 | 3/2008 | Szor |
| 7,345,843 B2 | 3/2008 | Seol |
| 7,352,280 B1 | 4/2008 | Rockwood |
| 7,356,736 B2 | 4/2008 | Natvig |
| 7,356,843 B1 | 4/2008 | Kingsford |
| 7,370,361 B2 | 5/2008 | de los Santos |
| 7,373,664 B2 | 5/2008 | Kissel |
| 7,373,667 B1 | 5/2008 | Millard |
| 7,376,970 B2 | 5/2008 | Marinescu |
| 7,386,886 B1 | 6/2008 | Abrams |
| 7,392,543 B2 | 6/2008 | Szor |
| 7,398,399 B2 | 7/2008 | Palliyil |
| 7,398,553 B1 | 7/2008 | Li |
| 7,401,359 B2 | 7/2008 | Gartside |
| 7,406,454 B1 | 7/2008 | Liu |
| 7,406,603 B1 | 7/2008 | MacKay |
| 7,415,726 B2 | 8/2008 | Kelly |
| 7,418,729 B2 | 8/2008 | Szor |
| 7,424,609 B2 | 9/2008 | Kwan |
| 7,426,574 B2 | 9/2008 | Liao |
| 7,434,260 B2 | 10/2008 | Hong |
| 7,434,261 B2 | 10/2008 | Costea |
| 7,448,084 B1 | 11/2008 | Apap |
| 7,448,085 B1 | 11/2008 | Reyes |
| 7,450,005 B2 | 11/2008 | Anand |
| 7,461,339 B2 | 12/2008 | Liao |
| 7,472,288 B1 | 12/2008 | Chou |
| 7,475,135 B2 | 1/2009 | Bantz |
| 7,478,431 B1 | 1/2009 | Nachenberg |
| 7,487,543 B2 | 2/2009 | Arnold |
| 7,496,960 B1 | 2/2009 | Chen |
| 7,509,676 B2 | 3/2009 | Trueba |
| 7,509,677 B2 | 3/2009 | Saurabh |
| 7,509,680 B1 | 3/2009 | Sallam |
| 7,512,808 B2 | 3/2009 | Liang |
| 7,516,317 B2 | 4/2009 | Diwan |
| 7,516,476 B1 | 4/2009 | Kraemer |
| 7,519,998 B2 | 4/2009 | Cai |
| 7,523,493 B2 | 4/2009 | Liang |
| 7,523,501 B2 | 4/2009 | Liang |
| 7,536,456 B2 | 5/2009 | Williams |
| 7,621,613 B2 | 5/2009 | McClintock |
| 7,549,055 B2 | 6/2009 | Zimmer |
| 7,555,777 B2 | 6/2009 | Swimmer |
| 7,558,796 B1 | 7/2009 | Bromwich |
| 7,565,550 B2 | 7/2009 | Liang |
| 7,568,233 B1 | 7/2009 | Szor |
| 7,571,482 B2 | 8/2009 | Polyakov |
| 7,574,741 B2 | 8/2009 | Aviani |
| 7,577,721 B1 | 8/2009 | Chen |
| 7,587,724 B2 | 9/2009 | Yeap |
| 7,590,813 B1 | 9/2009 | Szor |
| 7,591,018 B1 | 9/2009 | Lee |
| 7,594,111 B2 | 9/2009 | Kiriansky |
| 7,594,267 B2 | 9/2009 | Gladstone |
| 7,594,272 B1 | 9/2009 | Kennedy |
| 7,603,440 B1 | 10/2009 | Grabowski |
| 7,603,711 B2 | 10/2009 | Scheidell |
| 7,624,444 B2 | 11/2009 | Gupta |
| 7,624,448 B2 | 11/2009 | Coffman |

(56) References Cited

U.S. PATENT DOCUMENTS

| | | |
|---|---|---|
| 7,613,930 B2 | 12/2009 | Dotan |
| 7,627,758 B1 | 12/2009 | Tock |
| 7,627,898 B2 | 12/2009 | Beck |
| 7,634,521 B1 | 12/2009 | Spertus |
| 7,634,806 B2 | 12/2009 | Zinda |
| 7,636,716 B1 | 12/2009 | Cheng |
| 7,636,946 B2 | 12/2009 | Verma |
| 7,640,434 B2 | 12/2009 | Lee |
| 7,647,636 B2 | 1/2010 | Polyakov |
| 7,653,941 B2 | 1/2010 | Gleichauf |
| 7,657,838 B2 | 2/2010 | Daniell |
| 7,660,999 B2 | 2/2010 | Kudallur |
| 7,664,626 B1 | 2/2010 | Ferrie |
| 7,664,984 B2 | 2/2010 | Wang |
| 7,665,123 B1 | 2/2010 | Szor |
| 7,665,138 B2 | 2/2010 | Song |
| 7,673,341 B2 | 3/2010 | Kramer |
| 7,681,226 B2 | 3/2010 | Kraemer |
| 7,689,531 B1 | 3/2010 | Diao |
| 7,689,984 B2 | 3/2010 | Riley |
| 7,690,038 B1 | 3/2010 | Ko |
| 7,694,150 B1 | 4/2010 | Kirby |
| 7,702,907 B2 | 4/2010 | Vaha-Sipila |
| 7,707,635 B1 | 4/2010 | Kuo |
| 7,707,636 B2 | 4/2010 | Catanzano |
| 7,711,673 B1 | 5/2010 | Diao |
| 7,739,741 B2 | 5/2010 | Saffre |
| 7,730,481 B2 | 6/2010 | Chou |
| 7,734,790 B1 | 6/2010 | Chen |
| 7,735,138 B2 | 6/2010 | Zhao |
| 7,739,738 B1 | 6/2010 | Sobel |
| 7,739,739 B2 | 6/2010 | Dettinger |
| 7,743,419 B1 | 6/2010 | Mashevsky |
| 7,748,038 B2 | 6/2010 | Oliver |
| 7,756,535 B1 | 7/2010 | Diao |
| 7,756,834 B2 | 7/2010 | Masters |
| 7,765,589 B2 | 7/2010 | Keochane |
| 7,765,592 B2 | 7/2010 | Wang |
| 7,774,824 B2 | 8/2010 | Ross |
| 7,774,845 B2 | 8/2010 | Shipman |
| 7,778,999 B1 | 8/2010 | Boisjolie |
| 7,779,119 B2 | 8/2010 | Ginter |
| 7,779,470 B2 | 8/2010 | Keochane |
| 7,779,472 B1 | 8/2010 | Lou |
| 7,784,098 B1 | 8/2010 | Fan |
| 7,793,091 B2 | 9/2010 | Weikel |
| 7,802,301 B1 | 9/2010 | Dreyer |
| 7,809,796 B1 | 10/2010 | Bloch |
| 7,818,800 B1 | 10/2010 | Lemley |
| 7,822,818 B2 | 10/2010 | Desouza |
| 7,836,133 B2 | 11/2010 | Quinlan |
| 7,840,763 B2 | 11/2010 | Murotake |
| 7,840,958 B1 | 11/2010 | Wan |
| 7,841,006 B2 | 11/2010 | Gassoway |
| 7,845,009 B2 | 11/2010 | Grobman |
| 7,854,006 B1 | 12/2010 | Andruss |
| 7,856,538 B2 | 12/2010 | Speirs |
| 7,856,573 B2 | 12/2010 | Ingram |
| 7,861,303 B2 | 12/2010 | Kouznetsov |
| 7,865,956 B1 | 1/2011 | Cambridge |
| 7,874,001 B2 | 1/2011 | Beck |
| 7,877,801 B2 | 1/2011 | Repasi |
| 7,877,809 B1 | 1/2011 | Sutton |
| 7,890,619 B2 | 2/2011 | Morota |
| 7,899,849 B2 | 3/2011 | Chaudhry |
| 7,899,901 B1 | 3/2011 | Njemanze |
| 7,900,194 B1 | 3/2011 | Mankins |
| 7,913,303 B1 | 3/2011 | Rouland |
| 7,926,106 B1 | 4/2011 | Kennedy |
| 7,930,746 B1 | 4/2011 | Sheleheda |
| 7,934,103 B2 | 4/2011 | Kidron |
| 7,937,758 B2 | 5/2011 | Kronenberg |
| 7,941,659 B2 | 5/2011 | Lam |
| 7,945,957 B2 | 5/2011 | Dettinger |
| 7,949,771 B1 | 5/2011 | Chen |
| 7,966,650 B2 | 6/2011 | Manring |
| 7,971,255 B1 | 6/2011 | Kc |
| 7,996,905 B2 | 6/2011 | Arnold |
| 7,975,260 B1 | 7/2011 | Conover |
| 7,975,302 B2 | 7/2011 | Armingaud |
| 7,979,889 B2 | 7/2011 | Gladstone |
| 7,984,503 B2 | 7/2011 | Edwards |
| 7,992,156 B1 | 8/2011 | Wang |
| 7,996,374 B1 | 8/2011 | Jones |
| 7,996,637 B2 | 8/2011 | Inoue |
| 7,996,902 B1 | 8/2011 | Gordon |
| 8,015,174 B2 | 9/2011 | Hubbard |
| 8,023,974 B1 | 9/2011 | Diao |
| 8,024,807 B2 | 9/2011 | Hall |
| 8,028,326 B2 | 9/2011 | Palmer |
| 8,028,336 B2 | 9/2011 | Schuba |
| 8,037,290 B1 | 10/2011 | Stutton |
| 8,042,102 B2 | 10/2011 | DeWitt |
| 8,042,186 B1 | 10/2011 | Polyakov |
| 8,051,487 B2 | 11/2011 | Huang |
| 8,056,136 B1 | 11/2011 | Zaitsev |
| 8,069,213 B2 | 11/2011 | Bloch |
| 8,074,287 B2 | 12/2011 | Barde |
| 8,079,085 B1 | 12/2011 | Wu |
| 8,087,087 B1 | 12/2011 | van Oorschot |
| 8,090,816 B1 | 1/2012 | Deshmukh |
| 8,108,332 B2 | 1/2012 | Misra |
| 8,117,433 B2 | 2/2012 | McIntosh |
| 8,117,659 B2 | 2/2012 | Hartrell |
| 8,140,664 B2 | 3/2012 | Huang |
| 8,145,904 B2 | 3/2012 | Cavanaugh |
| 8,161,548 B1 | 4/2012 | Wan |
| 8,161,552 B1 | 4/2012 | Sun |
| 8,171,552 B1 | 5/2012 | Chang |
| 8,176,527 B1 | 5/2012 | Njemanze |
| 8,181,244 B2 | 5/2012 | Boney |
| 8,190,868 B2 | 5/2012 | Schneider |
| 8,191,139 B2 | 5/2012 | Heimerdinger |
| 8,205,261 B1 | 6/2012 | Andruss |
| 8,220,050 B2 | 7/2012 | Sarathy |
| 8,225,407 B1 | 7/2012 | Thrower |
| 8,230,506 B1 | 7/2012 | Forristal |
| 8,234,687 B2 | 7/2012 | Baumhof |
| 8,234,710 B2 | 7/2012 | Wenzinger |
| 8,230,499 B1 | 8/2012 | Pereira |
| 8,239,668 B1 | 8/2012 | Chen |
| 8,239,947 B1 | 8/2012 | Glick |
| 8,261,347 B2 | 9/2012 | Hrabik |
| 8,266,698 B1 | 9/2012 | Seshardi |
| 8,272,058 B2 | 9/2012 | Brennan |
| 8,286,239 B1 | 10/2012 | Sutton |
| 8,291,381 B2 | 10/2012 | Lai |
| 8,291,498 B1 | 10/2012 | Liang |
| 8,312,545 B2 | 11/2012 | Tuvell |
| 8,321,910 B1 | 11/2012 | English |
| 8,327,446 B2 | 12/2012 | Liang |
| 8,332,946 B1 | 12/2012 | Boisjolie |
| 8,341,649 B2 | 12/2012 | Freericks |
| 8,365,286 B2 | 1/2013 | Poston |
| 8,370,938 B1 | 2/2013 | Daswani |
| 8,375,450 B1 | 2/2013 | Oliver |
| 8,387,146 B2 | 2/2013 | Parish |
| 8,412,779 B1 | 4/2013 | Qian |
| 8,418,249 B1 | 4/2013 | Nucci |
| 8,429,180 B1 | 4/2013 | Sobel |
| 8,429,746 B2 | 4/2013 | Capalik |
| 8,443,449 B1 | 5/2013 | Fan |
| 8,458,797 B1 | 6/2013 | Yu |
| 8,464,318 B1 | 6/2013 | Hallak |
| 8,468,602 B2 | 6/2013 | McDougal |
| 8,484,732 B1 | 7/2013 | Chen |
| 8,490,183 B2 | 7/2013 | Kondo |
| 8,495,144 B1 | 7/2013 | Cheng |
| 8,495,743 B2 | 7/2013 | Kraemer |
| 8,505,094 B1 | 8/2013 | Xuewen |
| 8,510,596 B1 | 8/2013 | Gupta |
| 8,516,583 B2 | 8/2013 | Thomas |
| 8,533,831 B2 | 9/2013 | Satish |
| 8,533,837 B2 | 9/2013 | Cavanaugh |

(56) References Cited

U.S. PATENT DOCUMENTS

| | | |
|---|---|---|
| 8,549,581 B1 | 10/2013 | Kailash |
| 8,554,907 B1 | 10/2013 | Chen |
| 8,560,466 B2 | 10/2013 | Diao |
| 8,561,182 B1 | 10/2013 | Lee |
| 8,561,190 B2 | 10/2013 | Marinescu |
| 8,572,729 B1 | 10/2013 | Lowe |
| 8,578,497 B2 | 11/2013 | Antonakakis |
| 8,584,240 B1 | 11/2013 | Yang |
| 8,584,241 B1 | 11/2013 | Jenks |
| 8,601,581 B2 | 12/2013 | Wenzinger |
| 8,607,066 B1 | 12/2013 | Kailash |
| 8,619,971 B2 | 12/2013 | Kurien |
| 8,627,458 B2 | 1/2014 | Muttik |
| 8,635,669 B2 | 1/2014 | Iftode |
| 8,645,340 B2 | 2/2014 | Kester |
| 8,646,038 B2 | 2/2014 | Blumfield |
| 8,650,648 B2 | 2/2014 | Howard |
| 8,656,488 B2 | 2/2014 | Liang |
| 8,656,493 B2 | 2/2014 | Capalik |
| 8,661,062 B1 | 2/2014 | Jamail |
| 8,661,541 B2 | 2/2014 | Beck |
| 8,667,590 B1 | 3/2014 | Lee |
| 8,683,031 B2 | 3/2014 | Green |
| 8,688,797 B2 | 4/2014 | Hesselink |
| 8,709,924 B2 | 4/2014 | Hanawa |
| 8,719,924 B1 | 5/2014 | Williamson |
| 8,719,939 B2 | 5/2014 | Krasser |
| 8,732,824 B2 | 5/2014 | Arbaugh |
| 8,762,948 B1* | 6/2014 | Zaitsev ............... G06F 9/45558 |
| | | 717/124 |
| 8,789,189 B2 | 7/2014 | Capalik |
| 8,793,798 B2 | 7/2014 | Fossen |
| 8,799,190 B2 | 8/2014 | Stokes |
| 8,826,439 B1 | 9/2014 | Hu |
| 8,838,992 B1 | 9/2014 | Zhu |
| 8,839,417 B1 | 9/2014 | Jordan |
| 8,839,422 B2 | 9/2014 | Ghosh |
| 8,850,570 B1 | 9/2014 | Ramzan |
| 8,856,473 B2 | 10/2014 | van Riel |
| 8,869,139 B2 | 10/2014 | Le |
| 8,875,289 B2 | 10/2014 | Mahaffey |
| 8,881,283 B2 | 11/2014 | Tuvell |
| 8,885,928 B2 | 11/2014 | Forman |
| 8,885,938 B2 | 11/2014 | Hong |
| 8,925,101 B2 | 12/2014 | Bhargava |
| 8,935,788 B1 | 1/2015 | Diao |
| 8,935,792 B1 | 1/2015 | Spurlock |
| 8,943,592 B1 | 1/2015 | Mirski |
| 8,955,104 B2 | 2/2015 | Arbaugh |
| 8,955,133 B2 | 2/2015 | Kumar |
| 8,955,134 B2 | 2/2015 | Hartrell |
| 9,021,589 B2 | 4/2015 | Anderson |
| 9,043,894 B1 | 5/2015 | Dennison |
| 9,043,903 B2 | 5/2015 | Diehl |
| 9,104,871 B2 | 8/2015 | Tuvell |
| 9,117,075 B1 | 8/2015 | Yeh |
| 9,129,110 B1 | 9/2015 | Mason |
| 9,129,111 B2 | 9/2015 | Rothwell |
| 9,152,789 B2 | 10/2015 | Natarajan |
| 9,171,157 B2 | 10/2015 | Flores |
| 9,177,153 B1 | 11/2015 | Perrig |
| 9,189,750 B1 | 11/2015 | Narsky |
| 9,208,323 B1 | 12/2015 | Karta |
| 9,213,836 B2 | 12/2015 | Mayer |
| 9,245,120 B2 | 1/2016 | Friedrichs |
| 9,251,373 B2 | 2/2016 | AlHarbi |
| 9,286,182 B2 | 3/2016 | Fries |
| 9,292,881 B2 | 3/2016 | Alperovitch |
| 9,306,966 B2 | 4/2016 | Eskin |
| 9,306,971 B2 | 4/2016 | Altman |
| 9,319,385 B2 | 4/2016 | Iwanski |
| 9,324,034 B2 | 4/2016 | Gupta |
| 9,330,257 B2 | 5/2016 | Valencia |
| 9,336,390 B2 | 5/2016 | Pavlyushchik |
| 9,349,103 B2 | 5/2016 | Eberhardt |
| 9,398,034 B2 | 7/2016 | Ronen |
| 9,400,886 B1 | 7/2016 | Beloussov |
| 9,411,953 B1 | 8/2016 | Kane |
| 9,424,430 B2 | 8/2016 | Rosenan |
| 9,465,936 B2 | 10/2016 | Tosa |
| 9,465,940 B1 | 10/2016 | Wojnowicz |
| 9,489,514 B2 | 11/2016 | Mankin |
| 9,497,204 B2 | 11/2016 | Symons |
| 9,516,039 B1 | 12/2016 | Yen |
| 9,516,057 B2 | 12/2016 | Aziz |
| 9,602,538 B1 | 3/2017 | Chou |
| 9,654,495 B2 | 5/2017 | Hubbard |
| 9,672,355 B2 | 6/2017 | Titonis |
| 9,710,647 B2 | 7/2017 | Zimmer |
| 9,721,212 B2 | 8/2017 | Gupta |
| 9,734,125 B2 | 8/2017 | Baldry |
| 9,781,151 B1 | 10/2017 | McCorkendale |
| 9,832,211 B2 | 11/2017 | Hsiao |
| 9,853,997 B2 | 12/2017 | Canzanese |
| 9,866,584 B2 | 1/2018 | Capalik |
| 9,886,665 B2* | 2/2018 | Chen ..................... G06N 5/025 |
| 9,904,784 B2 | 2/2018 | Diehl |
| 9,940,459 B1 | 4/2018 | Saxe |
| 9,954,872 B2 | 4/2018 | Capalik |
| 9,967,264 B2* | 5/2018 | Harris ................... H04L 63/102 |
| 10,043,008 B2 | 8/2018 | Costea |
| 10,061,921 B1* | 8/2018 | Chang ................. G06F 21/554 |
| 10,102,372 B2* | 10/2018 | Huang ................. G06F 21/563 |
| 10,169,579 B1 | 1/2019 | Xu |
| 10,182,061 B2 | 1/2019 | Balasubramanian |
| 10,257,224 B2 | 4/2019 | Jaroch |
| 10,262,136 B1 | 4/2019 | Kailash |
| 10,268,820 B2 | 4/2019 | Okano |
| 10,277,617 B2 | 4/2019 | Yang |
| 10,284,591 B2 | 5/2019 | Giuliani |
| 10,395,032 B2 | 8/2019 | Keller |
| 10,521,599 B2* | 12/2019 | Wurster ................. G06F 21/62 |
| 10,649,970 B1 | 5/2020 | Saxe |
| 10,666,676 B1 | 5/2020 | Hsu |
| 10,783,254 B2 | 9/2020 | Sharma |
| 10,965,717 B2* | 3/2021 | Shulman-Peleg ..... H04L 63/205 |
| 11,481,486 B2 | 10/2022 | Klonowski |
| 11,657,149 B2 | 5/2023 | Klonowski |
| 11,663,326 B2 | 5/2023 | Klonowski |
| 11,755,730 B2 | 9/2023 | Klonowski |
| 12,032,691 B2 | 7/2024 | Klonowski |
| 12,039,038 B2 | 7/2024 | Klonowski |
| 12,093,380 B2 | 9/2024 | Klonowski |
| 2001/0005889 A1 | 6/2001 | Albrecht |
| 2001/0052014 A1 | 12/2001 | Sheymov |
| 2002/0078381 A1 | 6/2002 | Farley |
| 2002/0099952 A1 | 7/2002 | Lambert |
| 2002/0147923 A1 | 10/2002 | Dotan |
| 2002/0178374 A1 | 11/2002 | Swimmer |
| 2002/0194490 A1 | 12/2002 | Halperin |
| 2002/0199116 A1 | 12/2002 | Hoene |
| 2003/0046582 A1 | 3/2003 | Black |
| 2003/0065926 A1 | 4/2003 | Schultz |
| 2003/0084323 A1 | 5/2003 | Gales |
| 2003/0084349 A1 | 5/2003 | Friedrichs |
| 2003/0101381 A1 | 5/2003 | Mateev |
| 2003/0115479 A1 | 6/2003 | Edwards |
| 2003/0120935 A1 | 6/2003 | Teal |
| 2003/0135791 A1 | 6/2003 | Natvig |
| 2003/0131256 A1 | 7/2003 | Ackroyd |
| 2003/0172166 A1 | 9/2003 | Judge |
| 2003/0177394 A1 | 9/2003 | Dorzortsev |
| 2003/0188196 A1 | 10/2003 | Choi |
| 2004/0006704 A1 | 1/2004 | Dahlstrom |
| 2004/0030913 A1 | 2/2004 | Liang |
| 2004/0034800 A1 | 2/2004 | Singhal |
| 2004/0039968 A1 | 2/2004 | Hatonen |
| 2004/0064736 A1 | 4/2004 | Obrecht |
| 2004/0068652 A1 | 4/2004 | Carpentier |
| 2004/0073810 A1 | 4/2004 | Dettinger |
| 2004/0078580 A1 | 4/2004 | Hsu |
| 2004/0083384 A1 | 4/2004 | Hypponen |
| 2004/0083408 A1 | 4/2004 | Spiegel |
| 2004/0024864 A1 | 5/2004 | Porras |

(56) References Cited

U.S. PATENT DOCUMENTS

| | | |
|---|---|---|
| 2004/0111632 A1 | 6/2004 | Halperin |
| 2004/0123145 A1 | 6/2004 | Baffes |
| 2004/0128530 A1 | 7/2004 | Isenberg |
| 2004/0143749 A1 | 7/2004 | Tajalli |
| 2004/0143753 A1 | 7/2004 | Hernacki |
| 2004/0153644 A1 | 8/2004 | McCorkendale |
| 2004/0158729 A1 | 8/2004 | Szor |
| 2004/0172551 A1 | 9/2004 | Fielding |
| 2004/0172557 A1 | 9/2004 | Nakae |
| 2004/0199827 A1 | 10/2004 | Muttik |
| 2004/0205419 A1 | 10/2004 | Liang |
| 2004/0225877 A1 | 11/2004 | Huang |
| 2004/0236960 A1 | 11/2004 | Zimmer |
| 2004/0243829 A1 | 12/2004 | Jordan |
| 2004/0244160 A1 | 12/2004 | Nessel |
| 2004/0255160 A1 | 12/2004 | Stamos |
| 2005/0005160 A1 | 1/2005 | Bates |
| 2005/0021994 A1 | 1/2005 | Barton |
| 2005/0038818 A1 | 2/2005 | Hooks |
| 2005/0044406 A1 | 2/2005 | Stute |
| 2005/0050336 A1 | 3/2005 | Liang |
| 2005/0050337 A1 | 3/2005 | Liang |
| 2005/0050378 A1 | 3/2005 | Liang |
| 2005/0055559 A1 | 3/2005 | Bucher |
| 2005/0091494 A1 | 4/2005 | Hyser |
| 2005/0108562 A1 | 5/2005 | Khazan |
| 2005/0114687 A1 | 5/2005 | Zimmer |
| 2005/0125687 A1 | 6/2005 | Townsend |
| 2005/0132205 A1 | 6/2005 | Palliyil |
| 2005/0138427 A1 | 6/2005 | Crommer |
| 2005/0210035 A1 | 9/2005 | Kester |
| 2005/0216759 A1 | 9/2005 | Rothman |
| 2005/0223001 A1 | 10/2005 | Kester |
| 2005/0229250 A1 | 10/2005 | Ring |
| 2005/0246776 A1 | 11/2005 | Chawro |
| 2005/0251860 A1 | 11/2005 | Saurabh |
| 2005/0262560 A1 | 11/2005 | Gassoway |
| 2005/0268079 A1 | 12/2005 | Rothman |
| 2005/0268112 A1 | 12/2005 | Wang |
| 2005/0283640 A1 | 12/2005 | Cheston |
| 2006/0017557 A1 | 1/2006 | Chung |
| 2006/0026675 A1 | 2/2006 | Cai |
| 2006/0031673 A1 | 2/2006 | Beck |
| 2006/0037079 A1 | 2/2006 | Midgley |
| 2006/0037080 A1 | 2/2006 | Maloof |
| 2006/0070128 A1 | 3/2006 | Heimerdinger |
| 2006/0070130 A1 | 3/2006 | Costea |
| 2006/0075468 A1 | 4/2006 | Boney |
| 2006/0075490 A1 | 4/2006 | Boney |
| 2006/0075502 A1 | 4/2006 | Edwards |
| 2006/0075504 A1 | 4/2006 | Liu |
| 2006/0085857 A1 | 4/2006 | Omote |
| 2006/0095964 A1 | 5/2006 | Costea |
| 2006/0095970 A1 | 5/2006 | Rajagopal |
| 2006/0101520 A1 | 5/2006 | Schumaker |
| 2006/0130141 A1 | 6/2006 | Kramer |
| 2006/0130144 A1 | 6/2006 | Wernicke |
| 2006/0150256 A1 | 7/2006 | Fanton |
| 2006/0156397 A1 | 7/2006 | Dai |
| 2006/0174319 A1 | 8/2006 | Kraemer |
| 2006/0179484 A1 | 8/2006 | Scrimsher |
| 2006/0206937 A1 | 9/2006 | Repasi |
| 2006/0224930 A1 | 10/2006 | Bantz |
| 2006/0230289 A1 | 10/2006 | Fox |
| 2006/0230452 A1 | 10/2006 | Field |
| 2006/0236392 A1 | 10/2006 | Thomas |
| 2006/0253584 A1 | 11/2006 | Dixon |
| 2006/0259819 A1 | 11/2006 | Connor |
| 2006/0259967 A1 | 11/2006 | Thomas |
| 2006/0265746 A1 | 11/2006 | Farley |
| 2006/0288342 A1 | 12/2006 | Hatlelid |
| 2006/0293777 A1 | 12/2006 | Breitgand |
| 2007/0006304 A1 | 1/2007 | Kramer |
| 2007/0006310 A1 | 1/2007 | Piccard |
| 2007/0006311 A1 | 1/2007 | Barton |
| 2007/0016914 A1 | 1/2007 | Yeap |
| 2007/0016951 A1 | 1/2007 | Piccard |
| 2007/0016953 A1 | 1/2007 | Morris |
| 2007/0022315 A1 | 1/2007 | Comegys |
| 2007/0028292 A1 | 2/2007 | Kabzinski |
| 2007/0028304 A1 | 2/2007 | Brennan |
| 2007/0050846 A1 | 3/2007 | Xie |
| 2007/0067844 A1 | 3/2007 | Williamson |
| 2007/0078915 A1 | 4/2007 | Gassoway |
| 2007/0094725 A1 | 4/2007 | Borders |
| 2007/0118646 A1 | 5/2007 | Gassoway |
| 2007/0130350 A1 | 6/2007 | Alperovitch |
| 2007/0150957 A1 | 6/2007 | Hartrell |
| 2007/0162975 A1 | 7/2007 | Overton |
| 2007/0168694 A1 | 7/2007 | Maddaloni |
| 2007/0174911 A1 | 7/2007 | Kronenberg |
| 2007/0180509 A1 | 8/2007 | Swartz |
| 2007/0239999 A1 | 10/2007 | Honig |
| 2007/0240212 A1 | 10/2007 | Matalytski |
| 2007/0240220 A1 | 10/2007 | Tuvell |
| 2007/0244877 A1 | 10/2007 | Kempka |
| 2007/0245420 A1 | 10/2007 | Yong |
| 2007/0250817 A1 | 10/2007 | Boney |
| 2007/0250927 A1 | 10/2007 | Naik |
| 2007/0271610 A1 | 11/2007 | Grobman |
| 2007/0289019 A1 | 12/2007 | Lowrey |
| 2007/0294768 A1 | 12/2007 | Moskovitch |
| 2008/0005797 A1 | 1/2008 | Field |
| 2008/0010368 A1 | 1/2008 | Hubbard |
| 2008/0016314 A1 | 1/2008 | Li |
| 2008/0016339 A1 | 1/2008 | Shukla |
| 2008/0016570 A1 | 1/2008 | Capalik |
| 2008/0028100 A1 | 1/2008 | Adelman |
| 2008/0052468 A1 | 2/2008 | Speirs |
| 2008/0082662 A1 | 4/2008 | Dandliker |
| 2008/0086773 A1 | 4/2008 | Tuvell |
| 2008/0133812 A1 | 6/2008 | Kaiser |
| 2008/0175266 A1 | 7/2008 | Alperovitch |
| 2008/0184058 A1 | 7/2008 | McDermott |
| 2008/0229419 A1 | 9/2008 | Holostov |
| 2008/0263197 A1 | 10/2008 | Stephens |
| 2008/0271163 A1 | 10/2008 | Stillerman |
| 2008/0319932 A1 | 12/2008 | Yih |
| 2009/0013405 A1 | 1/2009 | Schipka |
| 2009/0044024 A1 | 2/2009 | Oberheide |
| 2009/0049550 A1 | 2/2009 | Shevchenko |
| 2009/0070873 A1 | 3/2009 | McAfee |
| 2009/0144826 A2 | 6/2009 | Piccard |
| 2009/0248623 A1 | 10/2009 | Adelman |
| 2009/0254992 A1 | 10/2009 | Schultz |
| 2009/0288167 A1 | 11/2009 | Freericks |
| 2009/0328210 A1 | 12/2009 | Khachaturov |
| 2010/0011200 A1 | 1/2010 | Rosenan |
| 2010/0031361 A1 | 2/2010 | Shukla |
| 2010/0077481 A1 | 3/2010 | Polyakov |
| 2010/0082642 A1 | 4/2010 | Forman |
| 2010/0138728 A1 | 6/2010 | Kim |
| 2010/0150448 A1 | 6/2010 | Lecerf |
| 2010/0162395 A1 | 6/2010 | Kennedy |
| 2010/0169972 A1 | 7/2010 | Kuo |
| 2010/0169973 A1 | 7/2010 | Kim |
| 2010/0191734 A1 | 7/2010 | Rajaram |
| 2010/0256977 A1 | 10/2010 | Yu |
| 2010/0293273 A1 | 11/2010 | Basarrate |
| 2011/0041179 A1 | 2/2011 | Stahlberg |
| 2011/0047618 A1 | 2/2011 | Evans |
| 2011/0067101 A1 | 3/2011 | Seshadri |
| 2011/0083180 A1 | 4/2011 | Mashevsky |
| 2011/0145920 A1 | 6/2011 | Mahaffey |
| 2011/0172504 A1 | 7/2011 | Wegerich |
| 2011/0173699 A1 | 7/2011 | Figlin |
| 2011/0191341 A1 | 8/2011 | Meyer |
| 2011/0225655 A1 | 9/2011 | Niemela |
| 2011/0289586 A1 | 11/2011 | Kc |
| 2011/0321160 A1 | 12/2011 | Mohandas |
| 2011/0321166 A1 | 12/2011 | Capalik |
| 2012/0047579 A1 | 2/2012 | Ishiyama |
| 2012/0047581 A1 | 2/2012 | Banerjee |
| 2012/0151586 A1 | 6/2012 | Hentunen |

(56) References Cited

U.S. PATENT DOCUMENTS

| | | | |
|---|---|---|---|
| 2012/0159620 A1 | 6/2012 | Seifert | |
| 2012/0227105 A1 | 9/2012 | Friedrichs | |
| 2012/0255018 A1 | 10/2012 | Sallam | |
| 2012/0260340 A1 | 10/2012 | Morris | |
| 2012/0304278 A1 | 11/2012 | Murotake | |
| 2012/0317644 A1 | 12/2012 | Kumar | |
| 2013/0007870 A1 | 1/2013 | Devarajan | |
| 2013/0047255 A1 | 2/2013 | Dalcher | |
| 2013/0055339 A1 | 2/2013 | Apostolescu | |
| 2013/0055399 A1 | 2/2013 | Zaitsev | |
| 2013/0067576 A1 | 3/2013 | Niemela | |
| 2013/0074143 A1 | 3/2013 | Bu | |
| 2013/0091570 A1 | 4/2013 | McCorkendale | |
| 2013/0198217 A1 | 8/2013 | Narula | |
| 2013/0198841 A1 | 8/2013 | Poulson | |
| 2013/0227680 A1 | 8/2013 | Pavlyushchik | |
| 2013/0247179 A1 | 9/2013 | Chandran | |
| 2013/0247190 A1 | 9/2013 | Spurlock | |
| 2013/0275981 A1 | 10/2013 | Dalcher | |
| 2013/0276110 A1 | 10/2013 | Dalcher | |
| 2013/0298244 A1 | 11/2013 | Kumar | |
| 2013/0305357 A1 | 11/2013 | Ayyagari | |
| 2013/0326625 A1 | 12/2013 | Anderson | |
| 2014/0090061 A1 | 3/2014 | Avasarala | |
| 2014/0090064 A1 | 3/2014 | Pistoia | |
| 2014/0181973 A1 | 6/2014 | Lee | |
| 2014/0283037 A1 | 9/2014 | Sikorski | |
| 2014/0325650 A1 | 10/2014 | Pavlyushchik | |
| 2015/0033341 A1 | 1/2015 | Schmidtler | |
| 2015/0089645 A1 | 3/2015 | Vandergeest | |
| 2015/0096024 A1 | 4/2015 | Haq | |
| 2015/0106931 A1 | 4/2015 | Mankin | |
| 2015/0128263 A1 | 5/2015 | Raugus | |
| 2015/0213365 A1 | 7/2015 | Ideses | |
| 2015/0213376 A1 | 7/2015 | Ideses | |
| 2016/0080399 A1* | 3/2016 | Harris | H04L 63/1433 726/23 |
| 2016/0154960 A1 | 6/2016 | Sharma | |
| 2016/0162788 A1* | 6/2016 | Chen | G06N 5/025 706/47 |
| 2016/0253501 A1 | 9/2016 | Wynn | |
| 2016/0277423 A1 | 9/2016 | Apostolescu | |
| 2016/0300060 A1 | 10/2016 | Pike | |
| 2017/0083703 A1 | 3/2017 | Abbasi | |
| 2017/0098074 A1 | 4/2017 | Okano | |
| 2019/0036978 A1* | 1/2019 | Shulman-Peleg | H04L 63/1441 |
| 2019/0081963 A1* | 3/2019 | Waghorn | H04L 63/1441 |
| 2019/0272371 A1 | 9/2019 | Pintiysky | |
| 2020/0120118 A1 | 4/2020 | Shu | |
| 2023/0004643 A1 | 1/2023 | Klonowski | |
| 2023/0252135 A1 | 8/2023 | Klonowski | |
| 2023/0252141 A1 | 8/2023 | Klonowski | |
| 2023/0359734 A1 | 11/2023 | Klonowski | |

FOREIGN PATENT DOCUMENTS

| | | |
|---|---|---|
| CN | 102142068 A | 8/2011 |
| CN | 103106365 A | 5/2013 |
| CN | 103473506 A | 12/2013 |
| EP | 0449242 A2 | 10/1991 |
| EP | 1280040 A2 | 3/2004 |
| EP | 1280040 A3 | 3/2004 |
| EP | 1549012 A1 | 6/2005 |
| EP | 2182458 A1 | 5/2010 |
| EP | 1335559 B1 | 2/2012 |
| EP | 1933499 B1 | 3/2016 |
| JP | 2004086241 | 3/2004 |
| JP | 2004334312 A | 11/2004 |
| JP | 2005250760 A | 9/2005 |
| JP | 2012027710 A | 2/2012 |
| KR | 20100089245 A | 8/2010 |
| KR | 20110036426 A | 4/2011 |
| TW | I252976 B | 7/2006 |
| WO | WO 1999015966 A1 | 4/1999 |
| WO | WO 2000073955 A2 | 12/2000 |
| WO | WO 2001016709 A1 | 3/2001 |
| WO | WO 2001033359 A1 | 5/2001 |
| WO | WO 2003017099 A1 | 8/2001 |
| WO | WO 2001084285 A2 | 11/2001 |
| WO | WO 2001090892 A1 | 11/2001 |
| WO | WO 2002033525 A2 | 4/2002 |
| WO | WO 2003021402 A2 | 3/2003 |
| WO | WO 2003088017 A2 | 10/2003 |
| WO | WO 2004097602 A2 | 11/2004 |
| WO | WO 2005114949 A1 | 12/2005 |
| WO | WO 2006115533 A2 | 11/2006 |
| WO | WO 2007015266 A2 | 2/2007 |
| WO | WO 2007015266 A3 | 2/2007 |
| WO | WO 2007104988 A1 | 9/2007 |
| WO | WO 2007120954 A2 | 10/2007 |
| WO | WO 2008008401 | 1/2008 |
| WO | WO 2012027588 A1 | 3/2012 |
| WO | WO 2012084507 A1 | 6/2012 |
| WO | WO 2012110501 A1 | 8/2012 |
| WO | WO 2014107439 A2 | 7/2014 |
| WO | WO 2014122662 A1 | 8/2014 |
| WO | WO 2019051507 | 3/2019 |

OTHER PUBLICATIONS

Office Action for U.S. Appl. No. 17/362,112, dated Sep. 22, 2022, 11 pgs.
Noticeof Allowance for U.S. Appl. No. 17/345,761 dated Jan. 17, 2023, 9 pgs.
Notice of Allowance for U.S. Appl. No. 17/362,112, dated Jan. 20, 2023, 2 pgs.
*Crowdstrike, Inc. v. Webroot Inc.*, PTAB Case No. IPR2022-01522, Petition for Inter Partes Review of U.S. Pat. No. 10,284,591, 77 pgs.
*Crowdstrike, Inc. v. Webroot Inc.*, PTAB Case No. IPR2022-01522, Exhibit 1001: U.S. Pat. No. 10,284,591 to Giuliani et al., 14 pgs.
*Crowdstrike, Inc. v. Webroot Inc.*, PTAB Case No. IPR2022-01522, Exhibit 1002: File History of U.S. Pat. No. 10,284,591, 236 pgs.
*Crowdstrike, Inc. v. Webroot Inc.*, PTAB Case No. IPR2022-01522, Exhibit 1003: Declaration of Dr. Wenke Lee, 144 pgs.
*Crowdstrike, Inc. v. Webroot Inc.*, PTAB Case No. IPR2022-01522, Exhibit 1004: U.S. Pat. No. 2008/0016339 to Shukla, 26 pgs.
*Crowdstrike, Inc. v. Webroot Inc.*, PTAB Case No. IPR2022-01522, Exhibit 1005: U.S. Pat. No. 2013/0047255 to Dalcher, 20 pgs.
*Crowdstrike, Inc. v. Webroot Inc.*, PTAB Case No. IPR2022-01522, Exhibit 1006: U.S. Pat. No. 9,465,936 to Tosa, 19 pgs.
*Crowdstrike, Inc. v. Webroot Inc.*, PTAB Case No. IPR2022-01522, Exhibit 1007: U.S. Pat. No. 7,971,255 to Kc et al., 12 pgs.
*Crowdstrike, Inc. v. Webroot Inc.*, PTAB Case No. IPR2022-01522, Exhibit 1008: Dawson R. Engler, M. Frans Kaashoek, and James O'Toole Jr., Exokernel: An Operating System Architecture for Application-Level Resource Management, 29 ACM SIGOPS Operating Systems Review (Dec. 3, 1995, p. 251), 16 pgs.
*Crowdstrike, Inc. v. Webroot Inc.*, PTAB Case No. IPR2022-01522, Exhibit 1009: Intel Architecture Software Developer's Manual vol. 3: SystemProgramming, Intel Corporation (1999), 658 pgs.
*Crowdstrike, Inc. v. Webroot Inc.*, PTAB Case No. IPR2022-01522, Exhibit 1010: Desmond Lobo, Xin-Wen Wu, Paul Watters, and Li Sun, Windows Rootkits, Attacks and Countermeasures, 2010 IEEE Second Cybercrime and Trustworthy Computing Workshop (Jul. 2010), 10 pgs.
*Crowdstrike, Inc. v. Webroot Inc.*, PTAB Case No. IPR2022-01522, Exhibit 1011: Michael Sikorski and Andrew Honig, Practical Malware Analysis, No Starch Press, Inc. (2012), 20 pgs.
*Crowdstrike, Inc. v. Webroot Inc.*, PTAB Case No. IPR2022-01522, Exhibit 1012: Manuel Egele, Theodoor Scholte, Engin Kirda, Christopher Kruegel, A Survey on Automated Dynamic Malware-Analysis Techniques and Tools, ACM Computing Surveys, vol. 44, No. 2, Article 6 (Feb. 2012), 42 pgs.
*Crowdstrike, Inc. v. Webroot Inc.*, PTAB Case No. IPR2022-01522, Exhibit 1013: Pablo Bravo and Daniel F. Garcia, Proactive Detection of Kernel-Mode Rootkits, IEEE 2011 Sixth International Conference on Availability, Reliability and Security (2011), 6 pgs.

(56) References Cited

OTHER PUBLICATIONS

*Crowdstrike, Inc.* v. *Webroot Inc.*, PTAB Case No. IPR2022-01522, Exhibit 1014: Marco Prandini and Marco Ramilli, Return-Oriented Programming, IEEE Security & Privacy, vol. 10, No. 6 (Dec. 10, 2012), 4 pgs.
*Crowdstrike, Inc.* v. *Webroot Inc.*, PTAB Case No. IPR2022-01522, Exhibit 1015: Yang-Seo Choi, Dong-il Seo, and Sung-Won Sohn, A New Stack Buffer Overflow Hacking Defense Technique with Memory Address Confirmation, in Information Security and Cryptology—ICISC 2001, 146-159 (K. Kim ed., 2002), 14 pgs.
*Crowdstrike, Inc.* v. *Webroot Inc.*, PTAB Case No. IPR2022-01522, Exhibit 1016: Kevin A. Roundy and Barton P. Miller, Hybrid Analysis and Control of Malware, in Recent Advances in Intrusion Detection, 317-338 (S. Jha, R. Sommer, and C. Kreibich eds., 2010), 23 pgs.
*Crowdstrike, Inc.* v. *Webroot Inc.*, PTAB Case No. IPR2022-01522, Exhibit 1017: Úlfar Erlingsson and Fred B. Schneider, IRM Enforcement of Java Stack Inspection, IEEE Security & Privacy, vol. 10, No. 6 (Dec. 10, 2012), 10 pgs.
*Crowdstrike, Inc.* v. *Webroot Inc.*, PTAB Case No. IPR2022-01522, Exhibit 1018: Dictionary of Computer and Internet Terms (8th ed. 2003), 10 pgs.
*Crowdstrike, Inc.* v. *Webroot Inc.*, PTAB Case No. IPR2022-01522, Exhibit 1019: Dan Appleman, Visual Basic Programmer's Guide to the Win32 API, Macmillan Computer Publishing USA (1999), 21 pgs.
*Crowdstrike, Inc.* v. *Webroot Inc.*, PTAB Case No. IPR2022-01522, Exhibit 1020: 4 objdump, https://web.archive.org/web/20130326055338/http://sourceware.org/binubinu/docs/binutils/objdump.html#objdump (Mar. 26, 2013, retrieved Sep. 9, 2022), 5 pgs.
*Crowdstrike, Inc.* v. *Webroot Inc.*, PTAB Case No. IPR2022-01522, Exhibit 1021: John Calcote, Autotools, No Starch Press, Inc. (2010), 14 pgs.
*Crowdstrike, Inc.* v. *Webroot Inc.*, PTAB Case No. IPR2022-01522, Exhibit 1022: Zi-Shun Huang, Ian G. Harris, Return-Oriented Vulnerabilities in ARM Executables, 2012 IEEE Conference on Technologies for Homeland Security (HST) (2012), 6 pgs.
*Crowdstrike, Inc.* v. *Webroot Inc.*, PTAB Case No. IPR2022-01522, Exhibit 1023: U.S. Pat. No. 2012/0255018 to Sallam, 53 pgs.
*Crowdstrike, Inc.* v. *Webroot Inc.*, PTAB Case No. IPR2022-01522, Exhibit 1024: U.S. Pat. No. 2007/0016914 to Yeap, 12 pgs.
*Crowdstrike, Inc.* v. *Webroot Inc.*, PTAB Case No. IPR2022-01522, Exhibit 1025: Henry Hanping Feng, Oleg M. Kolesnikov, Prahlad Fogla, Wenke Lee, and Weibo Gong, Anomaly Detection Using Call Stack Information, Proceedings of the 2003 IEEE Symposium on Security and Privacy (2003), 14 pgs.
*Crowdstrike, Inc.* v. *Webroot Inc.*, PTAB Case No. IPR2022-01522, Exhibit 1026: Scheduling Order (Dkt. 50), 18 pgs.
*Crowdstrike, Inc.* v. *Webroot Inc.*, PTAB Case No. IPR2022-01522, Patent Owner Open Text Inc.'s Mandatory Notices Pursuant to 37 CFR § 42.8(b), Oct. 21, 2022, 4 pgs.
*Crowdstrike, Inc.* v. *Webroot Inc.*, PTAB Case No. IPR2022-01522, Notice of Filing Date Accorded to Petition and Time for Filing Patent Owner Preliminary Response, Oct. 27, 2022, 6 pgs.
*Crowdstrike, Inc.* v. *Webroot Inc.*, PTAB Case No. IPR2022-01522, Patent Owner Open Text Inc.'s Updated Mandatory Notices Pursuant to 37 CFR § 42.8(b), Jan. 27, 2023, 6 pgs.
*Crowdstrike, Inc.* v. *Webroot Inc.*, PTAB Case No. IPR2022-01522, Patent Owner's Preliminary Response, Jan. 27, 2023, 79 pgs.
*Crowdstrike, Inc.* v. *Webroot Inc.*, PTAB Case No. IPR2022-01522, Exhibit 2001: Declaration of Professor Nenad Medvidovic, Ph.D, 95 pgs.
*Crowdstrike, Inc.* v. *Webroot Inc.*, PTAB Case No. IPR2022-01522, Exhibit 2002: Curriculum Vitae of Professor Nenad Medvidovic, Ph.D., 71 pgs.
*Crowdstrike, Inc.* v. *Webroot Inc.*, PTAB Case No. IPR2022-01522, Exhibit 2003: *Webroot, Inc. and Open Text Inc.*, v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.

*Crowdstrike, Inc.* v. *Webroot Inc.*, PTAB Case No. IPR2022-01522, Exhibit 2004: *Sonrai Memory Ltd.* v. *Kingston Tech. Co. and Kingston Tech. Corp.*, Case No. 6:21-cv-1284- ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Crowdstrike, Inc.* v. *Webroot Inc.*, PTAB Case No. IPR2022-01522, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Crowdstrike, Inc.* v. *Webroot Inc.*, PTAB Case No. IPR2022-01522, Exhibit 2006: *Intellectual Ventures I LLC et al.* v. *Hewlett Packard Enterprise Co.*, No. 6:21-cv-00596- ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Crowdstrike, Inc.* v. *Webroot Inc.*, PTAB Case No. IPR2022-01522, Exhibit 2007: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.
*Crowdstrike, Inc.* v. *Webroot Inc.*, PTAB Case No. IPR2022-01522, Exhibit 2008: Standing Order Governing Proceedings (OGP) 4.2—Patent Cases (W.D. Tex., Sep. 16, 2022), available at chrome-extension://efaid-bmnnnibpcajpcglclefindmkaj/https://www.txwd.uscourts.gov/wpcontent/uploads/Standing%20Orders/Waco/Albright/Stand-ing%20Order%20Governing%20Proceedings%20-%20Patent%20Cases%20091622.pdf (excerpted), 5 pgs.
*Crowdstrike, Inc.* v. *Webroot Inc.*, PTAB Case No. IPR2022-01522, Exhibit 2009: *Webroot, Inc. and Open Text Inc.*, v. *Trend Micro Inc.*, Case No. 6:22-cv-00239-ADA-DTG, Defendant's Preliminary Invalidity Contentions (W.D. Tex., Sep. 13, 2022) (excerpted), 9 pgs.
*Crowdstrike, Inc.* v. *Webroot Inc.*, PTAB Case No. IPR2022-01522, Exhibit 2010: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 6 pgs.
*Crowdstrike, Inc.* v. *Webroot Inc.*, PTAB Case No. IPR2022-01522, Exhibit 2011: *Open Text Inc et al.*, v. *AO Kaspersky Lab*, Case No. 6:22-cv-00243-ADA-DTG, Defendant AO Kaspersky Lab's Preliminary Invalidity Contentions Exhibit 5A (W.D. Tex., Sep. 14, 2022) (excerpted), 1 pg.
*Crowdstrike, Inc.* v. *Webroot Inc.*, PTAB Case No. IPR2022-01522, Exhibit 2012: U.S. Appl. No. 2011/0289586 A1 to Gaurav S. Kc and Alfred V. Aho, filed Jun. 3, 2011 and issued Nov. 24, 2011 ("Kc Continuation"), 10 pgs.
*Crowdstrike, Inc.* v. *Webroot Inc.*, PTAB Case No. IPR2022-01522, Exhibit 2013: Erickson, J., Hacking: The Art of Exploitation, 2nd Ed. (2008) (excerpted), 133 pgs.
*Crowdstrike, Inc.* v. *Webroot Inc.*, PTAB Case No. IPR2022-01522, Exhibit 2014: Kleymenov, A. and Thabet, A., Mastering Malware Analysis, Packt Pub. (2019) (excerpted), 7 pgs.
*Crowdstrike, Inc.* v. *Webroot Inc.*, PTAB Case No. IPR2022-01522, Exhibit 2015: Goldberg, I. et al., A Secure Environment for Untrusted Helper Applications (Confining the Wily Hacker), Computer Sci. Div., Univ. of Calif., Berkeley (Jul. 1996) ("Goldberg"), 14 pgs.
*Crowdstrike, Inc.* v. *Webroot Inc.*, PTAB Case No. IPR2022-01522, Exhibit 2016: *Webroot, Inc., Open Text Inc.*, v. *AO Kaspersky Lab et al.*, Case No. 6:22-cv-00243-ADA-DTG, Plaintiffs Responsive Claim Construction Brief, Dkt. 98 (W.D. Tex., Nov. 18, 2022), 86 pgs.
*Crowdstrike, Inc.* v. *Webroot Inc.*, PTAB Case No. IPR2022-01522, Exhibit 2017: *Webroot, Inc. and Open Text Inc.*, v. *AO Kaspersky Lab et al.*, Case No. 6:22-cv-00243-ADA-DTG, Defendants' Opening Claim Construction Brief, Dkt. 86 (W.D. Tex., Oct. 28, 2022) (excerpted), 23 pgs.
*Crowdstrike, Inc.* v. *Webroot Inc.*, PTAB Case No. IPR2022-01522, Exhibit 2018: U.S. Appl. No. 2009/0049550 A1 to S. Shevchenko, filed Jun. 6, 2008 and issued Feb. 19, 2009 ("Shevchenko"), 17 pgs.
*Crowdstrike, Inc.* v. *Webroot Inc.*, PTAB Case No. IPR2022-01522, Exhibit 2019: U.S. Appl. No. 2005/0108562 A1 to R. Khazan et al., filed Jun. 18, 2003 and issued May 19, 2005 ("Khazan"), 30 pgs.

(56) References Cited

OTHER PUBLICATIONS

*Crowdstrike, Inc.* v. *Webroot Inc.*, PTAB Case No. IPR2022-01522, Exhibit 2020: U.S. Pat. No. 8,510,596 B1 to S. Gupta and P. Shenoy, filed Jul. 6, 2007 and issued Aug. 13, 2013 ("Gupta"), 47 pgs.
*Crowdstrike, Inc.* v. *Webroot Inc.*, PTAB Case No. IPR2022-01522, Exhibit 2021: U.S. Pat. No. 10,135,861 to M. Harris et al., filed Nov. 2, 2015 and issued Nov. 20, 2018 ("Harris"), 22 pgs.
*Crowdstrike, Inc.* v. *Webroot Inc.*, PTAB Case No. IPR2022-01522, Exhibit 2022: U.S. Pat. No. 10,896,254 B2 to R. Mckerchar et al., filed Jun. 29, 2016 and issued Jan. 19, 2021 ("McKerchar"), 31 pgs.
*Crowdstrike, Inc.* v. *Webroot Inc.*, PTAB Case No. IPR2022-01522, Decision Granting Institution of Inter Partes Review, Apr. 21, 2023, 47 pgs.
*Crowdstrike, Inc.* v. *Webroot Inc.*, PTAB Case No. IPR2022-01522, Scheduling Order, Apr. 21, 2023, 12 pgs.
*Crowdstrike, Inc.* v. *Webroot Inc.*, PTAB Case No. IPR2022-01522, Patent Owner's Request for Rehearing, May 5, 2023, 20 pgs.
*Crowdstrike, Inc.* v. *Webroot Inc.*, PTAB Case No. IPR2022-01522, Patent Owner's Objection to Evidence Submitted by Petitioner, May 5, 2023, 5 pgs.
*Crowdstrike, Inc.* v. *Webroot Inc.*, PTAB Case No. IPR2022-01522, Patent Owner's Updated Exhibit List as of May 5, 2023, 5 pgs.
*Crowdstrike, Inc.* v. *Webroot Inc.*, PTAB Case No. IPR2022-01522, Exhibit 2023: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Crowdstrike, Inc.* v. *Webroot Inc.*, PTAB Case No. IPR2022-01522, Exhibit 3001: POP Request, May 5, 2023, 3 pgs.
*Crowdstrike, Inc.* v. *Webroot Inc.*, PTAB Case No. IPR2022-01522, Notification of Receipt of POP Request, May 8, 2023, 2 pgs.
*Crowdstrike, Inc.* v. *Webroot Inc.*, PTAB Case No. IPR2022-01522, Patent Owner Open Text Inc.'s Second Updated Mandatory Notices Pursuant to 37 CFR § 42.8(b), May 25, 2023, 8 pgs.
*Crowdstrike, Inc.* v. *Webroot Inc.*, PTAB Case No. IPR2022-01522, Order Denying POP, Jun. 8, 2023, 3 pgs.
*Trend Micro, Inc.* v. *Webroot Inc.*, PTAB Case No. IPR2023-00692, Petition for Inter Partes Review of U.S. Pat. No. 10,284,591, Mar. 7, 2023, 79 pgs.
*Trend Micro, Inc.* v. *Webroot Inc.*, PTAB Case No. IPR2023-00692, Exhibit 1001: U.S. Pat. No. 10,284,591 to Giuliani et al. ('591 patent), 14 pgs.
*Trend Micro, Inc.* v. *Webroot Inc.*, PTAB Case No. IPR2023-00692, Exhibit 1002: Expert Declaration of Dr. Seth Nielson, 177 pgs.
*Trend Micro, Inc.* v. *Webroot Inc.*, PTAB Case No. IPR2023-00692, Exhibit 1003: Curriculum Vitae of A.L Dr. Seth Nielson, 15 pgs.
*Trend Micro, Inc.* v. *Webroot Inc.*, PTAB Case No. IPR2023-00692, Exhibit 1004: U.S. Appl. No. 2013/0275981 to Dalcher, 11 pgs.
*Trend Micro, Inc.* v. *Webroot Inc.*, PTAB Case No. IPR2023-00692, Exhibit 1005: Vasilis Pappas, Transparent ROP Exploit Mitigation Using Indirect Branch Tracing, 22nd USENIX Security Symposium, (Aug. 14-16, 2013), 17 pgs.
*Trend Micro, Inc.* v. *Webroot Inc.*, PTAB Case No. IPR2023-00692, Exhibit 1006: Prosecution History of the '591 patent, 232 pgs.
*Trend Micro, Inc.* v. *Webroot Inc.*, PTAB Case No. IPR2023-00692, Exhibit 1007: Provisional patent application claimed by '591 patent for priority, 30 pgs.
*Trend Micro, Inc.* v. *Webroot Inc.*, PTAB Case No. IPR2023-00692, Exhibit 1008: David A. Patterson, Computer Organization & Design The Hardware/Software Interface, Morgan Kaufmann Publishers, Inc., (1994), 18 pgs.
*Trend Micro, Inc.* v. *Webroot Inc.*, PTAB Case No. IPR2023-00692, Exhibit 1009: ORS Open Systems Resources, Inc., Collecting Detailed Performance Data with Xperf, The NT Insider 17(1), (2010), 20 pgs.
*Trend Micro, Inc.* v. *Webroot Inc.*, PTAB Case No. IPR2023-00692, Exhibit 1010: Aleph One, Smashing the Stack for Fun and Profit, (1996), 25 pgs.

*Trend Micro, Inc.* v. *Webroot Inc.*, PTAB Case No. IPR2023-00692, Exhibit 1011: Jacob R. Lorch, The VTrace Tool: Building a System Tracer for Windows NT and Windows 2000, MSDN Magazine, (2000), 19 pgs.
*Trend Micro, Inc.* v. *Webroot Inc.*, PTAB Case No. IPR2023-00692, Exhibit 1012: Marco Pistoia, Beyond Stack Inspection: A Unified Access-Control and Information-Flow Security Model, IEE, (2007), 16 pgs.
*Trend Micro, Inc.* v. *Webroot Inc.*, PTAB Case No. IPR2023-00692, Exhibit 1013: Galen Hunt, Detours: Binary Interception of Win32 Functions, Microsoft Research, (1999), 9 pgs.
*Trend Micro, Inc.* v. *Webroot Inc.*, PTAB Case No. IPR2023-00692, Exhibit 1014: Sandra Loosemore, The GNU C Library Reference Manual, 188-193, (1999) 10 pgs.
*Trend Micro, Inc.* v. *Webroot Inc.*, PTAB Case No. IPR2023-00692, Exhibit 1015: Jonathan Corbet, Expanding the Kernel Stack, LWN.net, (2014) 1 pg.
*Trend Micro, Inc.* v. *Webroot Inc.*, PTAB Case No. IPR2023-00692, Exhibit 1016: OpenSSL documentation API listing, https://www.openssl.org/docs/man1.0.2/man3/., 39 pgs.
*Trend Micro, Inc.* v. *Webroot Inc.*, PTAB Case No. IPR2023-00692, Exhibit 1017: Declaration of Ingrid Hsieh-Yee, Ph.D., 36 pgs.
*Trend Micro, Inc.* v. *Webroot Inc.*, PTAB Case No. IPR2023-00692, Patent Owner Open Text Inc.'s Mandatory Notices Pursuant to 37 CFR § 42.8(b), Mar. 28, 2023, 7 pgs.
*Trend Micro, Inc.* v. *Webroot Inc.*, PTAB Case No. IPR2023-00692, Notice of Filing Date Accorded to Petition and Time for Filing Patent Owner Preliminary Response, May 11, 2023, 6 pgs.
*AO Kaspersky Lab* v. *Webroot Inc.*, PTAB Case No. IPR2023-00895, Petition for Inter Partes Review, U.S. Pat. No. 10,284,591, Apr. 28, 2023, 85 pgs.
*AO Kaspersky Lab* v. *Webroot Inc.*, PTAB Case No. IPR2023-00895, Exhibit 1001: U.S. Pat. No. 10,284,591 (issued May 7, 2019), 14 pgs.
*AO Kaspersky Lab* v. *Webroot Inc.*, PTAB Case No. IPR2023-00895, Exhibit 1002: Declaration of V.S. Subrahmanian, Ph.D. under 37 C.F.R. §1.68, 110 pgs.
*AO Kaspersky Lab* v. *Webroot Inc.*, PTAB Case No. IPR2023-00895, Exhibit 1003: Curriculum Vitae of V.S. Subrahmanian, Ph.D., 77 pgs.
*AO Kaspersky Lab* v. *Webroot Inc.*, PTAB Case No. IPR2023-00895, Exhibit 1004: Motion for Order Authorizing Alternative Service, 13 pgs.
*AO Kaspersky Lab* v. *Webroot Inc.*, PTAB Case No. IPR2023-00895, Exhibit 1005: Waiver of Service of Summons, 1 pgs.
*AO Kaspersky Lab* v. *Webroot Inc.*, PTAB Case No. IPR2023-00895, Exhibit 1006: File History of U.S. Pat. No. 10,284,591, 238 pgs.
*AO Kaspersky Lab* v. *Webroot Inc.*, PTAB Case No. IPR2023-00895, Exhibit 1007: Ivan Fratric, Runtime Prevention of Return-Oriented Programming Attacks to Ivan Fratric, https://github.com/ivanfratric/ropguard/blob/master/doc/ropguard.pdf ("Fratric"), 11 pgs.
*AO Kaspersky Lab* v. *Webroot Inc.*, PTAB Case No. IPR2023-00895, Exhibit 1008: U.S. Appl. No. 2012/0255018 (issued Oct. 4, 2012) ("Sallam"), 53 pg.
*AO Kaspersky Lab* v. *Webroot Inc.*, PTAB Case No. IPR2023-00895, Exhibit 1009: Hello World, Github Docs, https://docs.github.com/en/get-started/quickstart/hello-world (last visited Apr. 26, 2023), 8 pgs.
*AO Kaspersky Lab* v. *Webroot Inc.*, PTAB Case No. IPR2023-00895, Exhibit 1010: Committing and Reviewing Changes to your Project, Github Docs, https://docs.github.com/en/desktop/contributing-and-collaborating-using-github-desktop/making-changes-in-a-branch/committing-and-reviewing-changes-to-your-project (last visited Apr. 26, 2023), 11 pgs.
*AO Kaspersky Lab* v. *Webroot Inc.*, PTAB Case No. IPR2023-00895, Exhibit 1011: Setting Repository Visibility, Github Docs, https://docs.github.com/en/repositories/managing-your-repositorys-settings-and-features/managing-repository-settings/setting-repository-visibility (last visited Apr. 26, 2023), 3 pgs.
*AO Kaspersky Lab* v. *Webroot Inc.*, PTAB Case No. IPR2023-00895, Exhibit 1012: GitHub Glossary, Github Docs, https://docs.

(56) References Cited

OTHER PUBLICATIONS github.com/en/get-started/quickstart/github-glossary#public-repository (last visited Apr. 26, 2023), 37 pgs.
*AO Kaspersky Lab* v. *Webroot Inc.*, PTAB Case No. IPR2023-00895, Exhibit 1013: Scott Chacon, GitHub Code Search, The Github Blog (Nov. 3, 2008), https://github.blog/2008-11-03-github-code-search/, 7 pgs.
*AO Kaspersky Lab* v. *Webroot Inc.*, PTAB Case No. IPR2023-00895, Exhibit 1014: About Searching on GitHub, Github Docs, https://docs.github.com/en/search-github/getting-started-with-searching-on-github/about-searching-on-github (last visited Apr. 26, 2023), 3 pgs.
*AO Kaspersky Lab* v. *Webroot Inc.*, PTAB Case No. IPR2023-00895, Exhibit 1015: Finding Ways to Contribute to Open Source on GitHub, Github Docs, https://docs.github.com/en/get-started/exploring-projects-on-github/finding-ways-to-contribute-to-open-source-on-github (last visited Apr. 26, 2023), 3 pgs.
*AO Kaspersky Lab* v. *Webroot Inc.*, PTAB Case No. IPR2023-00895, Exhibit 1016: Claim Construction Order, *Webroot, Inc. and Open Text, Inc.* v. *AO Kaspersky Lab*, Case No. 6:22-CV-00243-ADA-DTG, (Mar. 16, 2023), 5 pgs.
*AO Kaspersky Lab* v. *Webroot Inc.*, PTAB Case No. IPR2023-00895, Exhibit 1017: Michael Huttermann, Devops for Developers (Apress, 2012), 183 pgs.
*AO Kaspersky Lab* v. *Webroot Inc.*, PTAB Case No. IPR2023-00895, Exhibit 1018: Nicolas Despres, Automatic performance monitoring tool, Laboratoire De Recherche Et Developpement De L'Epita Tech Report No. 0601, 915 (2006), 21 pgs.
*AO Kaspersky Lab* v. *Webroot Inc.*, PTAB Case No. IPR2023-00895, Exhibit 1019: Bryan D. Payne, Martin D.P. de A. Carbone, Wenke Lee, 2007, December. Secure and Flexible Monitoring of Virtual Machines, 23rd Ann. Comp. Sec. Applications Conf., 385, 385-397 (2007), 13 pgs.
*AO Kaspersky Lab* v. *Webroot Inc.*, PTAB Case No. IPR2023-00895, Exhibit 1020: Margaret Rouse, Dynamic Library, Techopedia (Mar. 2, 2012), 7 pgs.
*O Kaspersky Lab* v. *Webroot Inc.*, PTAB Case No. IPR2023-00895, Exhibit 1021: Krishnan, S. and Srihari, K., A Knowledge-Based Object Oriented DFM Advisor for Surface Mount PCB Assembly. 10 Li Int'l. J. Advanced Mfg. Tech, 317, 317-329 (1995), 13 pgs.
*AO Kaspersky Lab* v. *Webroot Inc.*, PTAB Case No. IPR2023-00895, Exhibit 1022: Henry Hanping Feng, Jonathon T. Giffin, Yong Huang, Somesh Jha, Wenkee Lee, and Barton P. Miller, Formalizing Sensitivity in Static Analysis for Intrusion Detection, IEEE Symp. Sec. Priv., 194, 194-208, 15 pgs.
*AO Kaspersky Lab* v. *Webroot Inc.*, PTAB Case No. IPR2023-00895, Exhibit 1023: Wei Li, Lap-chung Lam, and Tzi-cker Chiueh, How to Automatically and Accurately Sandbox Microsoft IIS, 22nd Ann. Comp. Sec. Applications Conf., 213, 213-222 (2006), 10 pgs.
*AO Kaspersky Lab* v. *Webroot Inc.*, PTAB Case No. IPR2023-00895, Exhibit 1024: Kevin A. Roundy and Barton P. Miller, Hybrid Analysis and Control of Malware, Recent Advances in Intrusion Detection: 13th Int'l Symp., 317, 317-338 (2010), 23 pgs.
*AO Kaspersky Lab* v. *Webroot Inc.*, PTAB Case No. IPR2023-00895, Exhibit 1025: Toshiyuki Maeda, 2002, Safe Execution of User Programs in Kernel Mode Using Typed Assembly Language, (Master's Thesis, University of Tokyo, 2002), 44 pgs.
*AO Kaspersky Lab* v. *Webroot Inc.*, PTAB Case No. IPR2023-00895, Exhibit 1026: Alex Skaletsky, Tevi Devor, Nadav Chachmon, Robert Cohn, Kim Hazelwood, Vladimirov, Moshe Bach, Dynamic Program Analysis of Microsoft Windows Applications, IEEE Int'l Symp. Performance Analysis Sys. Software, 2, 2-12 (2010), 11 pgs.
*AO Kaspersky Lab* v. *Webroot Inc.*, PTAB Case No. IPR2023-00895, Exhibit 1027: Tarjei Mandt, T., Locking Down the Windows Kernel: Mitigating Null Pointer Exploitation, Norman Threat Research, 13 pgs.
*AO Kaspersky Lab* v. *Webroot Inc.*, PTAB Case No. IPR2023-00895, Exhibit 1028: Xiangyu Dong, Cong Xu, Yuan Xie, Norman P. Jouppi, N.P., NVSim: A Circuit-Level Performance, Energy, and Area Model for Emerging Nonvolatile Memory, 31 IEEE Transactions Computer-Aided Design of Integrated Circuits Sys., 994, 994-1007 (2012), 14 pgs.
*AO Kaspersky Lab* v. *Webroot Inc.*, PTAB Case No. IPR2023-00895, Exhibit 1029: Father, H., Hooking Windows API-Technics of hooking API functions on Windows, 2 Assembly Programming J., 2, 2-30 (2004), 30 pgs.
*AO Kaspersky Lab* v. *Webroot Inc.*, PTAB Case No. IPR2023-00895, Exhibit 1030: J. Berdajs and Z. Bosnić, Extending Applications Using an Advanced Approach to DLL Injection and API Hooking, 40 Software: Practice Experience, 567, 567-584 (2010), 18 pgs.
*AO Kaspersky Lab* v. *Webroot Inc.*, PTAB Case No. IPR2023-00895, Exhibit 1031: Ulrich Bayer, Christopher Kruegel, and Engin Kirda, TTAnalyze: A Tool for Analyzing Malware, Ikarus Software Tech. Univ. Vienna, 180, 180-192 (2006), 12 pgs.
*AO Kaspersky Lab* v. *Webroot Inc.*, PTAB Case No. IPR2023-00895, Patent Owner Open Text Inc.'s Mandatory Notices Pursuant to 37 CFR § 42.8(b), May 19, 2023, 8 pgs.
*AO Kaspersky Lab* v. *Webroot Inc.*, PTAB Case No. IPR2023-00895, Notice of Filing Date Accorded to Petition and Time for Filing Patent Owner Preliminary Response, Jun. 9, 2023, 6 pgs.
*Crowdstrike, Inc.* v. *Webroot Inc.*, PTAB Case No. IPR2023-00124, Petition for Inter Partes Review of U.S. Pat. No. 9,578,045, 86 pgs.
*Crowdstrike, Inc.* v. *Webroot Inc.*, PTAB Case No. IPR2023-00124, Exhibit 1001: U.S. Pat. No. 9,578,045 to Jaroch et al., 30 pgs.
*Crowdstrike, Inc.* v. *Webroot Inc.*, PTAB Case No. IPR2023-00124, Exhibit 1002: File History of U.S. Pat. No. 9,578,045, 210 pgs.
*Crowdstrike, Inc.* v. *Webroot Inc.*, PTAB Case No. IPR2023-00124, Exhibit 1003: Declaration of Dr. Wenke Lee, 202 pgs.
*Crowdstrike, Inc.* v. *Webroot Inc.*, PTAB Case No. IPR2023-00124, Exhibit 1004: U.S. Appl. No. 2013/0298244 to Kumar et al., 52 pgs.
*Crowdstrike, Inc.* v. *Webroot Inc.*, PTAB Case No. IPR2023-00124, Exhibit 1005: U.S. Appl. No. 2007/0016953 to Morris et al. ("Morris"), 18 pgs.
*Crowdstrike, Inc.* v. *Webroot Inc.*, PTAB Case No. IPR2023-00124, Exhibit 1006: U.S. Pat. No. 8,087,087 to Van Oorschot et al. ("Van Oorschot"), 19 pgs.
*Crowdstrike, Inc.* . *Webroot Inc.*, PTAB Case No. IPR2023-00124, Exhibit 1007: U.S. Pat. No. 2010/0077481 to Polyakov et al., 11 pgs.
*Crowdstrike, Inc.* v. *Webroot Inc.*, PTAB Case No. IPR2023-00124, Exhibit 1008: U.S. Appl. No. 2011/0321166 to Capalik et al. ("Capalik"), 29 pgs.
*Crowdstrike, Inc.* v. *Webroot Inc.*, PTAB Case No. IPR2023-00124, Exhibit 1009: U.S. Appl. No. 2012/0260340, 30 pgs.
*Crowdstrike, Inc.* v. *Webroot Inc.*, PTAB Case No. IPR2023-00124, Exhibit 1010: U.S. Pat. No. 10,257,224, 31 pgs.
*Crowdstrike, Inc.* v. *Webroot Inc.*, PTAB Case No. IPR2023-00124, Exhibit 1011: Scheduling Order (Dkt. 50), Sep. 28, 2022, 18 pgs.
*Crowdstrike, Inc.* v. *Webroot Inc.*, PTAB Case No. IPR2023-00124, Exhibit 1012: Natarajan Meghanathan, Sumanth Reddy Allam, and Loretta A. Moore, Tools and Techniques for Network Forensics, International Journal of Network Security & Its Applications (IJNSA), vol. 1., No. 1, Apr. 2009, 12 pgs.
*Crowdstrike, Inc.* v. *Webroot Inc.*, PTAB Case No. IPR2023-00124, Exhibit 1013: SANS Institute, Host- vs. Network-Based Intrusion Detection Systems (2000-2005), 11 pgs.
*Crowdstrike, Inc.* v. *Webroot Inc.*, PTAB Case No. IPR2023-00124, Exhibit 1014: Securosis LLC, Evolving Endpoint Malware Detection: Dealing with Advanced and Targeted Attacks, Version 1.3 (Jul. 12, 2012), 23 pgs.
*Crowdstrike, Inc.* v. *Webroot Inc.*, PTAB Case No. IPR2023-00124, Exhibit 1015: Yanfang Ye, Weiwei Zhuang, Tao Li, Egemen Tas, Umesh Gupta, Shenghuo Zhu, Melih Abdulhayoglu, Combining File Content and File Relations for Cloud Based Malware Detection, Aug. 2011, 9 pgs.
*Crowdstrike, Inc.* v. *Webroot Inc.*, PTAB Case No. IPR2023-00124, Exhibit 1016: U.S. Pat. No. 6,944,772 to Dozortsev, 10 pgs.
*Crowdstrike, Inc.* v. *Webroot Inc.*, PTAB Case No. IPR2023-00124, Exhibit 1017: U.S. Pat. No. 6,772,346 to Chess et al., 14 pgs.
*Crowdstrike, Inc.* v. *Webroot Inc.*, PTAB Case No. IPR2023-00124, Exhibit 1018: WO 2002/033525 to Shyne-Song Chuang, 18 pgs.

(56) References Cited

OTHER PUBLICATIONS

*Crowdstrike, Inc. v. Webroot Inc.*, PTAB Case No. IPR2023-00124, Exhibit 1019: EP 1,549,012 to Kristof De Spiegeleer, 19 pgs.
*Crowdstrike, Inc. v. Webroot Inc.*, PTAB Case No. IPR2023-00124, Exhibit 1020: EP 1,280,040 to Alexander James Hinchliffe et al., 17 pgs.
*Crowdstrike, Inc. v. Webroot Inc.*, PTAB Case No. IPR2023-00124, Exhibit 1021: Oracle, Java Documentation, The Java Tutorials, What is a Path? (And Other File System Facts) (available at the following link https://docs.oracle.com/javase/tutorial/essential/io/path.html) (last accessed Oct. 2022), 3 pgs.
*Crowdstrike, Inc. v. Webroot Inc.*, PTAB Case No. IPR2023-00124, Exhibit 1022: U.S. Pat. No. 2004/0143753 to Hernacki et al., 20 pgs.
*Crowdstrike, Inc. v. Webroot Inc.*, PTAB Case No. IPR2023-00124, Exhibit 1023: U.S. Pat. No. 2011/0083180 to Mashevsky et al., 16 pgs.
*Crowdstrike, Inc. v. Webroot Inc.*, PTAB Case No. IPR2023-00124, Exhibit 1024: U.S. Pat. No. 8,429,746 to Capalik, 11 pgs.
*Crowdstrike, Inc. v. Webroot Inc.*, PTAB Case No. IPR2023-00124, Exhibit 1025: Server Hardware, Software and Architecture by Abeer El Hadi El Zein El Nahas, University of Khartoum, Electrical and Electronics Engineering Dept., Feb. 2008, 152 pgs.
*Crowdstrike, Inc. v. Webroot Inc.*, PTAB Case No. IPR2023-00124, Exhibit 1026: Guofei Gu, Phillip Porras, Vinod Yegneswaran, Martin Fong, Wenke Lee, BotHunter: Detecting Malware Infection Through IDS-Driven Dialog Correlation, In Proceedings of The 16th USENIX Security Symposium, Aug. 2007, 16 pgs.
*Crowdstrike, Inc. v. Webroot Inc.*, PTAB Case No. IPR2023-00124, Exhibit 1027: Yacin Nadji, Manos Antonakakis, Roberto Perdisci, and Wenke Lee, Understanding the Prevalence and Use of Alternative Plans in Malware with Network Games, In Proceedings of The 27th Annual Computer Security Applications Conference, Dec. 2011, 10 pgs.
*Crowdstrike, Inc. v. Webroot Inc.*, PTAB Case No. IPR2023-00124, Exhibit 1028: Manos Antonakakis, Roberto Perdisci, David Dagon, Wenke Lee, and Nick Feamster, Building a Dynamic Reputation System for DNS, In Proceedings of The 19th USENIX Security Symposium, Aug. 2010, 17 pgs.
*Crowdstrike, Inc. v. Webroot Inc.*, PTAB Case No. IPR2023-00124, Exhibit 1029: Long Lu, Vinod Yegneswaran, Phil Porras, and Wenke Lee, BLADE: An Attack-Agnostic Approach for Preventing Drive-By Malware Infections, In Proceedings of The 17th ACM Conference on Computer and Communications Security (CCS), Chicago, IL, Oct. 2010, 12 pgs.
*Crowdstrike, Inc. v. Webroot Inc.*, PTAB Case No. IPR2023-00124, Exhibit 1030: Plaintiffs' Markman Opposition Brief (Dkt. 98), Nov. 18, 2022, 86 pgs.
*Crowdstrike, Inc. v. Webroot Inc.*, PTAB Case No. IPR2023-00124, Exhibit 1031: Defendants' Markman Opening Brief (Dkt. 86), Oct. 28, 2022, 84 pgs.
*Crowdstrike, Inc. v. Webroot Inc.*, PTAB Case No. IPR2023-00124, Notice of Filing Date Accorded to Petition and Time for Filing Patent Owner Preliminary Response, Dec. 20, 2022, 6 pgs.
*Crowdstrike, Inc. v. Webroot Inc.*, PTAB Case No. IPR2023-00124, Patent Owner Open Text Inc.'s Mandatory Notices Pursuant to 37 CFR § 42.8(b), Dec. 21, 2022, 5 pgs.
*Crowdstrike, Inc. v. Webroot Inc.*, PTAB Case No. IPR2023-00124, Patent Owner's Preliminary Response, Mar. 20, 2023, 82 pgs.
*Crowdstrike, Inc. v. Webroot Inc.*, PTAB Case No. IPR2023-00124, Exhibit 2001: Declaration of Professor Nenad Medvidovic, Ph. D., 45 pgs.
*Crowdstrike, Inc. v. Webroot Inc.*, PTAB Case No. IPR2023-00124, Exhibit 2002: Curriculum Vitae of Professor Nenad Medvidovic, Ph. D., 71 pgs.
*Crowdstrike, Inc. v. Webroot Inc.*, PTAB Case No. IPR2023-00124, Exhibit 2003: *Webroot, Inc., and Open Text Inc., v. CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.
*Crowdstrike, Inc. v. Webroot Inc.*, PTAB Case No. IPR2023-00124, Exhibit 2004: *Sonrai Memory Ltd. v. Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Crowdstrike, Inc. v. Webroot Inc.*, PTAB Case No. IPR2023-00124, Exhibit 2005: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Crowdstrike, Inc. v. Webroot Inc.*, PTAB Case No. IPR2023-00124, Exhibit 2006: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Crowdstrike, Inc. v. Webroot Inc.*, PTAB Case No. IPR2023-00124, Exhibit 2007: *Webroot, Inc., Open Text Inc., v. AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.
*Crowdstrike, Inc. v. Webroot Inc.*, PTAB Case No. IPR2023-00124, Exhibit 2008: *Webroot, Inc. and Open Text Inc., v. AO Kaspersky Lab et al.*, Case No. 6:22-cv-243-ADA-DTG, Claim Construction Order, Dkt. 236 (W.D. Tex. Mar. 16, 2023), 20 pgs.
*Crowdstrike, Inc. v. Webroot Inc.*, PTAB Case No. IPR2023-00124, Exhibit 2009: *Webroot, Inc. and Open Text Inc., v. AO Kaspersky Lab et al.*, Case No. 6:22-cv-00243-ADA-DTG, Defendants' Opening Claim Construction Brief, Dkt. 86 (W.D. Tex., Oct. 28, 2022) (excerpted), 19 pgs.
*Crowdstrike, Inc. v. Webroot Inc.*, PTAB Case No. IPR2023-00124, Exhibit 2010: *Webroot, Inc. and Open Text Inc., v. AO Kaspersky Lab et al.*, Case No. 6:22-cv-00243-ADA-DTG, Defendants' Reply Claim Construction Brief, Dkt. 110 (W.D. Tex., Dec. 6, 2022) (excerpted), 11 pgs.
*Crowdstrike, Inc. v. Webroot Inc.*, PTAB Case No. IPR2023-00124, Exhibit 2011: *Webroot, Inc. and Open Text Inc., v. AO Kaspersky Lab et al.*, Case No. 6:22-cv-00243-ADA-DTG, Scheduling Order, Dkt. 50 (W.D. Tex., Sep. 28, 2022) (excerpted), 6 pgs.
*Crowdstrike, Inc. v. Webroot Inc.*, PTAB Case No. IPR2023-00124, Exhibit 2012: *Open Text Inc. et al., v. AO Kaspersky Lab*, Case No. 6:22-cv-00243- ADA-DTG, Defendant AO Kaspersky Lab's Preliminary Invalidity Contentions Exhibit 4A (W.D. Tex., Sep. 14, 2022) (excerpted), 1 pg.
*Crowdstrike, Inc. v. Webroot Inc.*, PTAB Case No. IPR2023-00124, Exhibit 2013: *Webroot, Inc. and Open Text Inc., v. Sophos Ltd.*, Case No. 6:22- cv- 00240-ADA-DTG, Defendant Sophos Ltd.'s Preliminary Invalidity Contentions (W.D. Tex., Sep. 13, 2022) (excerpted), 8 pgs.
*Crowdstrike, Inc. v. Webroot Inc.*, PTAB Case No. IPR2023-00124, Exhibit 2014: *Webroot, Inc. and Open Text Inc., v. Trend Micro Inc.*, Case No. 6:22-cv- 00239-ADA-DTG, Defendant's Preliminary Invalidity Contentions (W.D. Tex., Sep. 13, 2022) (excerpted), 9 pgs.
*Crowdstrike, Inc. v. Webroot Inc.*, PTAB Case No. IPR2023-00124, Exhibit 2015: *Webroot, Inc. and Open Text Inc., v. CrowdStrike, Inc. and CrowdStrike Holdings, Inc.*, Case No. 6:22-cv-00241-ADA, Complaint for Patent Infringement, Dkt. 1 (W.D. Tex., Mar. 4, 2022), 141 pgs.
*Crowdstrike, Inc. v. Webroot Inc.*, PTAB Case No. IPR2023-00124, Exhibit 2016: *Open Text Inc. et al., v. AO Kaspersky Lab*, Case No. 6:22-cv-00243-ADA-DTG, First Amended Complaint for Patent Infringement, Dkt. 80 (W.D. Tex., Oct. 27, 2022), 148 pgs.
*Crowdstrike, Inc. v. Webroot Inc.*, PTAB Case No. IPR2023-00124, Exhibit 2017: *Webroot, Inc. and Open Text Inc., v. Trend Micro Inc.*, Case No. 6:22-cv-00239-ADA-DTG, First Amended Complaint for Patent Infringement, Dkt. 53 (W.D. Tex., Sept. 7, 2022), 235 pgs.
*Crowdstrike, Inc. v. Webroot Inc.*, PTAB Case No. IPR2023-00124, Exhibit 2018: *Webroot, Inc. and Open Text Inc., v. Sophos, Ltd.*, Case No. 6:22-cv-00240-ADA-DTG, Second Amended Complaint for Patent Infringement, Dkt. 76 (W.D. Tex., Oct. 24, 2022), 184 pgs.

(56) References Cited

OTHER PUBLICATIONS

*Crowdstrike, Inc.* v. *Webroot Inc.*, PTAB Case No. IPR2023-00124, Exhibit 2019: File History for Continuation Patent, U.S. Pat. No. 10,257,224, 472 pgs.
*Crowdstrike, Inc.* v. *Webroot Inc.*, PTAB Case No. IPR2023-00124, Exhibit 2020: U.S. Appl. No. 2008/0016570 to Capalik ("Capalik 570"), 14 pgs.
*Crowdstrike, Inc.* v. *Webroot Inc.*, PTAB Case No. IPR2023-00124, Exhibit 2021: *Webroot, Inc. and Open Text Inc.*, v. *AO Kaspersky Lab et al.*, Case No. 6:22-cv-243-ADA-DTG, Mar. 9, *Crowdstrike, Inc.* v. *Webroot Inc.*, PTAB Case No. IPR2023-00124, Exhibit 2022: Transcript of Motions Hearing, Dkt. 133 (W.D. Tex. Dec. 15, 2022) (excerpted), 7 pgs.
*Crowdstrike, Inc.* v. *Webroot Inc.*, PTAB Case No. IPR2023-00124, Exhibit 2022: U.S. Pat. No. 10,257,224 to Joseph Jaroch ("'224 Patent"), 31 pgs.
*Crowdstrike, Inc.* v. *Webroot Inc.*, PTAB Case No. IPR2023-00124, Exhibit 2023: Joseph Jaroch LinkedIn, 1 pg.
*Crowdstrike, Inc.* v. *Webroot Inc.*, PTAB Case No. IPR2023-00124, Preliminary Reply to Patent Owner's Preliminary Response, Apr. 12, 2023, 10 pgs.
*Crowdstrike, Inc.* v. *Webroot Inc*l., PTAB Case No. IPR2023-00124, Exhibit 1032: EP File History, 233 pgs.
*Crowdstrike, Inc.* v. *Webroot Inc.*, PTAB Case No. IPR2023-00124, Patent Owner's Preliminary Sur-Reply to Petitioner's Preliminary Reply, Apr. 19, 2023, 13 pgs.
*Crowdstrike, Inc.* v. *Webroot Inc.*, PTAB Case No. IPR2023-00124, Patent Owner Open Text Inc.'s Updated Mandatory Notices Pursuant to 37 CFR § 42.8(b), May 25, 2023, 8 pgs.
*Trend Micro, Inc.* v. *Webroot Inc.*, PTAB Case No. IPR2023-00677, Petition for Inter Partes Review of U.S. Pat. No. 9,578,045, Mar. 6, 2023, 84 pgs.
*Trend Micro, Inc.* v. *Webroot Inc.*, PTAB Case No. IPR2023-00677, Exhibit 1001: U.S. Pat. No. 9,578,045 to Jaroch et al., 30 pgs.
*Trend Micro, Inc.* v. *Webroot Inc.*, PTAB Case No. IPR2023-00677, Exhibit 1002: Expert Declaration of Dr. Seth Nielson, 138 pgs.
*Trend Micro, Inc.* v. *Webroot Inc.*, PTAB Case No. IPR2023-00677, Exhibit 1003: CV of Seth Nielson, 15 pgs.
*Trend Micro, Inc.* v. *Webroot Inc.*, PTAB Case No. IPR2023-00677, Exhibit 1004: U.S. Pat. No. 7,352,280 to Rockwood, Troy, 24 pgs.
*Trend Micro, Inc.* v. *Webroot Inc.*, PTAB Case No. IPR2023-00677, Exhibit 1005: Xie, A Spatiotemporal Event Correlation Approach to Computer Security, 152 pgs.
*Trend Micro, Inc.* v. *Webroot Inc.*, PTAB Case No. IPR2023-00677, Exhibit 1006: Prosecution History of '045 Patent, 210 pgs.
*Trend Micro, Inc.* v. *Webroot Inc.*, PTAB Case No. IPR2023-00677, Exhibit 1007: Peterson, et al., "Computer networks: a systems approach," Morgan Kaufmann Publishers, Inc., 1996, 28 pgs.
*Trend Micro, Inc.* v. *Webroot Inc.*, PTAB Case No. IPR2023-00677, Exhibit 1008: Bangia, et al., "Operating Systems and Software Diagnostics" (2007), 3 pgs.
*Trend Micro, Inc.* v. *Webroot Inc.*, PTAB Case No. IPR2023-00677, Exhibit 1009: U.S. Appl. No. 2013/0067576 to Niemela, 10 pgs.
*Trend Micro, Inc.* v. *Webroot Inc.*, PTAB Case No. IPR2023-00677, Exhibit 1010: Hutchins, et al., "Intelligence-Driven Computer Network Defense Informed by Analysis of Adversary Campaigns and Intrusion Kill Chains", The Proceedings of the 6th International Conference on Information Warfare and Security, Mar. 17-18, 2011, 15 pgs.
*Trend Micro, Inc.* v. *Webroot Inc.*, PTAB Case No. IPR2023-00677, Exhibit 1011: Cheswick, et al., "Firewalls and Internet Security Second Edition, Repelling the Wily Hacker", 2003, 4 pgs.
*Trend Micro, Inc.* v. *Webroot Inc.*, PTAB Case No. IPR2023-00677, Exhibit 1012: Anderson, "Network Attack and Defense", Security Engineering vol. 2, 2008, 51 pgs.
*Trend Micro, Inc.* v. *Webroot Inc.*, PTAB Case No. IPR2023-00677, Exhibit 1013: Wilding et al., Virus Bulletin, The Authoritative International Publication of Computer Virus Prevention Recognition and Removal, Jul. 1989, 16 pgs.

*Trend Micro, Inc.* v. *Webroot Inc.*, PTAB Case No. IPR2023-00677, Exhibit 1014: Lardinois, Google Acquires Online Virus Malware and URL Scanner VirusTotal, TechCrunch, Sep. 7, 2012, 6 pgs.
*Trend Micro, Inc.* v. *Webroot Inc.*, PTAB Case No. IPR2023-00677, Exhibit 1015: Lasser, "Special Focus Issue: Security", ;login: The Magazine of USENIX & Sage, 51-54, (Nov. 2001), 6 pgs.
*Trend Micro, Inc.* v. *Webroot Inc.*, PTAB Case No. IPR2023-00677, Patent Owner Open Text Inc.'s Mandatory Notices Pursuant to 37 CFR § 42.8(b), Mar. 27, 2023, 8 pgs.
*Trend Micro, Inc.* v. *Webroot Inc.*, PTAB Case No. IPR2023-00677, Notice of Filing Date Accorded to Petition and Time for Filing Patent Owner Preliminary Response, May 10, 2023, 6 pgs.
*Crowdstrike, Inc.* v. *Webroot Inc.*, PTAB Case No. IPR2023-00126, Petition for Inter Partes Review of U.S. Pat. No. 10,257,224, Oct. 31, 2022, 87 pgs.
*Crowdstrike, Inc.* v. *Webroot Inc.*, PTAB Case No. IPR2023-00126, Exhibit 1001: U.S. Pat. No. 10,257,224 to Jaroch et al., 31 pgs.
*Crowdstrike, Inc.* v. *Webroot Inc.*, PTAB Case No. IPR2023-00126, Exhibit 1002: File History of U.S. Pat. No. 10,257,224, 472 pgs.
*Crowdstrike, Inc.* v. *Webroot Inc.*, PTAB Case No. IPR2023-00126, Exhibit 1003: Declaration of Dr. Wenke Lee, 202 pgs.
*Crowdstrike, Inc.* v. *Webroot Inc.*, PTAB Case No. IPR2023-00126, Exhibit 1004: U.S. Appl. No. 2013/0298244 to Kumar et al., 52 pgs.
*Crowdstrike, Inc.* v. *Webroot Inc.*, PTAB Case No. IPR2023-00126, Exhibit 1005: U.S. Appl. No. 2007/0016953 to Morris et al. ("Morris"), 18 pgs.
*Crowdstrike, Inc.* v. *Webroot Inc.*, PTAB Case No. IPR2023-00126, Exhibit 1006: U.S. Pat. No. 8,087,087 to Van Oorschot et al. ("Van Oorschot"), 19 pgs.
*Crowdstrike, Inc.* v. *Webroot Inc.*, PTAB Case No. IPR2023-00126, Exhibit 1007: U.S. Appl. No. 2010/0077481 to Polyakov et al., 11 pgs.
*Crowdstrike, Inc.* v. *Webroot Inc.*, PTAB Case No. IPR2023-00126, Exhibit 1008: U.S. Publication No. 2011/0321166 to Capalik et al. ("Capalik"), 29 pgs.
*Crowdstrike, Inc.* v. *Webroot Inc.*, PTAB Case No. IPR2023-00126, Exhibit 1009: U.S. Appl. No. 2012/0260340, 30 pgs.
*Crowdstrike, Inc.* v. *Webroot Inc.*, PTAB Case No. IPR2023-00126, Exhibit 1010: File History of U.S. Pat. No. 9,578,045 ("'045 Patent File History"), 210 pgs.
*Crowdstrike, Inc.* v. *Webroot Inc.*, PTAB Case No. IPR2023-00126, Exhibit 1011: Scheduling Order (Dkt. 50), 18 pgs.
*Crowdstrike, Inc.* v. *Webroot Inc.*, PTAB Case No. IPR2023-00126, Exhibit 1012: Natarajan Meghanathan, Sumanth Reddy Allam, and Loretta A. Moore, Tools and Techniques for Network Forensics, International Journal of Network Security & Its Applications (IJNSA), vol. 1., No. 1 (Apr. 2009), 12 pgs.
*Crowdstrike, Inc.* v. *Webroot Inc.*, PTAB Case No. IPR2023-00126, Exhibit 1013: SANS Institute, Host- vs. Network-Based Intrusion Detection Systems (2000-2005), 11 pgs.
*Crowdstrike, Inc.* v. *Webroot Inc.*, PTAB Case No. IPR2023-00126, Exhibit 1014: Securosis LLC, Evolving Endpoint Malware Detection: Dealing with Advanced and Targeted Attacks, Version 1.3 (Jul. 12, 2012), 23 pgs.
*Crowdstrike, Inc.* v. *Webroot Inc.*, PTAB Case No. IPR2023-00126, Exhibit 1015: Yanfang Ye, Weiwei Zhuang, Tao Li, Egemen Tas, Umesh Gupta, Shenghuo Zhu, Melih Abdulhayogiu, Combining File Content and File Relations for Cloud Based Malware Detection (Aug. 2011), 9 pgs.
*Crowdstrike, Inc.* v. *Webroot Inc.*, PTAB Case No. IPR2023-00126, Exhibit 1016: U.S. Pat. No. 6,944,772 to Dozortsev, 10 pgs.
*Crowdstrike, Inc.* v. *Webroot Inc.*, PTAB Case No. IPR2023-00126, Exhibit 1017: U.S. Pat. No. 6,772,346 to Chess et al., 14 pgs.
*Crowdstrike, Inc.* v. *Webroot Inc.*, PTAB Case No. IPR2023-00126, Exhibit 1018: WO 2002/033525 to Shyne-Song Chuang, 18 pgs.
*Crowdstrike, Inc.* v. *Webroot Inc.*, PTAB Case No. IPR2023-00126, Exhibit 1019: EP 1,549,012 to Kristof De Spiegeleer, 19 pgs.
*Crowdstrike, Inc.* v. *Webroot Inc.*, PTAB Case No. IPR2023-00126, Exhibit 1020: EP 1,280,040 to Alexander James Hinchliffe et al., 17 pgs.
*Crowdstrike, Inc.* v. *Webroot Inc.*, PTAB Case No. IPR2023-00126, Exhibit 1021: Oracle, Java Documentation, The Java Tutorials, What is a Path? (And Other File System Facts) (available at the

(56) References Cited

OTHER PUBLICATIONS following link https://docs.oracle.com/javase/tutorial/essential/io/path.html) (last accessed Oct. 2022), 3 pgs.
*Crowdstrike, Inc. v. Webroot Inc.*, PTAB Case No. IPR2023-00126, Exhibit 1022: U.S. Appl. No. 2004/0143753 to Hernacki et al., 20 pgs.
*Crowdstrike, Inc. v. Webroot Inc.*, PTAB Case No. IPR2023-00126, Exhibit 1023: U.S. Appl. No. 2011/0083180 to Mashevsky et al., 16 pgs.
*Crowdstrike, Inc. v. Webroot Inc.*, PTAB Case No. IPR2023-00126, Exhibit 1024: U.S. Pat. No. 8,429,746 to Alen Capalik, 11 pgs.
*Crowdstrike, Inc. v. Webroot Inc.*, PTAB Case No. IPR2023-00126, Exhibit 1025: Server Hardware, Software and Architecture by Abeer El Hadi El Zein El Nahas, University of Khartoum, Electrical and Electronics Engineering Dept. (Feb. 2008), 152 pgs.
*Crowdstrike, Inc. v. Webroot Inc.*, PTAB Case No. IPR2023-00126, Exhibit 1026: Guofei Gu, Phillip Porras, Vinod Yegneswaran, Martin Fong, Wenke Lee, BotHunter: Detecting Malware Infection Through IDS-Driven Dialog Correlation, In Proceedings of The 16th USENIX Security Symposium (Aug. 2007), 16 pgs.
*Crowdstrike, Inc. v. Webroot Inc.*, PTAB Case No. IPR2023-00126, Exhibit 1027: Yacin Nadji, Manos Antonakakis, Roberto Perdisci, and Wenke Lee, Understanding the Prevalence and Use of Alternative Plans in Malware with Network Games, In Proceedings of The 27th Annual Computer Security Applications Conference (Dec. 2011), 10 pgs.
*Crowdstrike, Inc. v. Webroot Inc.*, PTAB Case No. IPR2023-00126, Exhibit 1028: Manos Antonakakis, Roberto Perdisci, David Dagon, Wenke Lee, and Nick Feamster, Building a Dynamic Reputation System for DNS, In Proceedings of The 19th USENIX Security Symposium, (Aug. 2010), 17 pgs.
*Crowdstrike, Inc. v. Webroot Inc.*, PTAB Case No. IPR2023-00126, Exhibit 1029: Long Lu, Vinod Yegneswaran, Phil Porras, and Wenke Lee, BLADE: An Attack-Agnostic Approach for Preventing Drive-By Malware Infections, In Proceedings of The 17th ACM Conference on Computer and Communications Security (CCS), Chicago, IL (Oct. 2010), 12 pgs.
*Crowdstrike, Inc. v. Webroot Inc.*, PTAB Case No. IPR2023-00126, Exhibit 1030: U.S. Appl. No. 2008/0016570 to Capalik, 14 pgs.
*Crowdstrike, Inc. v. Webroot Inc.*, PTAB Case No. IPR2023-00126, Notice of Filing Date Accorded to Petition and Time for Filing Patent Owner Preliminary Response, Nov. 9, 2022, 5 pgs.
*Crowdstrike, Inc. v. Webroot Inc.*, PTAB Case No. IPR2023-00126, Patent Owner Open Text Inc.'s Mandatory Notices Pursuant to 37 CFR § 42.8(b), Nov. 21, 2022, 5 pgs.
*Crowdstrike, Inc. v. Webroot Inc.*, PTAB Case No. IPR2023-00126, Patent Owner's Preliminary Response, Feb. 9, 2023, 67 pgs.
*Crowdstrike, Inc. v. Webroot Inc.*, PTAB Case No. IPR2023-00126, Exhibit 2001: Declaration of Professor Nenad Medvidovic, Ph.D, 45 pgs.
*Crowdstrike, Inc. v. Webroot Inc.*, PTAB Case No. IPR2023-00126, Exhibit 2002: Curriculum Vitae of Professor Nenad Medvidovic, Ph.D., 71 pgs.
*Crowdstrike, Inc. v. Webroot Inc.*, PTAB Case No. IPR2023-00126, Exhibit 2003: *Webroot, Inc. and Open Text Inc., v. CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.
*Crowdstrike, Inc. v. Webroot Inc.*, PTAB Case No. IPR2023-00126, Exhibit 2004: *Sonrai Memory Ltd. v. Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Crowdstrike, Inc. v. Webroot Inc.*, PTAB Case No. IPR2023-00126, Exhibit 2005: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Crowdstrike, Inc. v. Webroot Inc.*, PTAB Case No. IPR2023-00126, Exhibit 2006: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Crowdstrike, Inc. v. Webroot Inc.*, PTAB Case No. IPR2023-00126, Exhibit 2007: *Webroot, Inc., Open Text Inc., v. AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.
*Crowdstrike, Inc. v. Webroot Inc.*, PTAB Case No. IPR2023-00126, Exhibit 2008: Standing Order Governing Proceedings (OGP) 4.2—Patent Cases (W.D. Tex., Sep. 16, 2022), available at chrome-extension://efaid-nbmnnnibpcajpcglclefindmkaj/https://www.txwd.uscourts.gov/wp-content/uploads/Standing%20Orders/Waco/Albright/Standing%20Order%20Governing%20Proceedings%20-%20Patent%20Cases%20091622.pdf (excerpted), 5 pgs.
*Crowdstrike, Inc. v. Webroot Inc.*, PTAB Case No. IPR2023-00126, Exhibit 2009: *Webroot, Inc. and Open Text Inc., v. AO Kaspersky Lab et al.*, Case No. 6:22-cv-00243-ADA-DTG, Defendants' Opening Claim Construction Brief, Dkt. 86 (W.D. Tex., Oct. 28, 2022) (excerpted), 19 pgs.
*Crowdstrike, Inc. v. Webroot Inc.*, PTAB Case No. IPR2023-00126, Exhibit 2010: *Webroot, Inc. and Open Text Inc., v. AO Kaspersky Lab et al.*, Case No. 6:22-cv-00243-ADA-DTG, Defendants' Reply Claim Construction Brief, Dkt. 110 (W.D. Tex., Dec. 6, 2022) (excerpted), 11 pgs.
*Crowdstrike, Inc. v. Webroot Inc.*, PTAB Case No. IPR2023-00126, Exhibit 2011: *Webroot, Inc. and Open Text Inc., v. AO Kaspersky Lab et al.*, Case No. 6:22-cv-00243-ADA-DTG, Scheduling Order, Dkt. 50 (W.D. Tex., Sep. 28, 2022) (excerpted), 6 pgs.
*Crowdstrike, Inc. v. Webroot Inc.*, PTAB Case No. IPR2023-00126, Exhibit 2012: *Open Text Inc et al., v. AO Kaspersky Lab*, Case No. 6:22-cv-00243-ADA-DTG, Defendant AO Kaspersky Lab's Preliminary Invalidity Contentions Exhibit 4A (W.D. Tex., Sep. 14, 2022) (excerpted), 1 pg.
*Crowdstrike, Inc. v. Webroot Inc.*, PTAB Case No. IPR2023-00126, Exhibit 2013: *Webroot, Inc. and Open Text Inc., v. Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 8 pgs.
*Crowdstrike, Inc. v. Webroot Inc.*, PTAB Case No. IPR2023-00126, Exhibit 2014: *Webroot, Inc. and Open Text Inc., v. Trend Micro Inc.*, Case No. 6:22-cv-00239-ADA-DTG, Defendant's Preliminary Invalidity Contentions (W.D. Tex., Sep. 13, 2022) (excerpted), 9 pgs.
*Crowdstrike, Inc. v. Webroot Inc.*, PTAB Case No. IPR2023-00126, Exhibit 2015: *Webroot, Inc. and Open Text Inc., v. CrowdStrike, Inc. and CrowdStrike Holdings, Inc.*, Case No. 6:22-cv-00241-ADA, Complaint for Patent Infringement, Dkt. 1 (W.D. Tex., Mar. 4, 2022), 141 pgs.
*Crowdstrike, Inc. v. Webroot Inc.*, PTAB Case No. IPR2023-00126, Exhibit 2016: *Open Text Inc et al., v. AO Kaspersky Lab*, Case No. 6:22-cv-00243-ADA-DTG, First Amended Complaint for Patent Infringement, Dkt. 80 (W.D. Tex., Oct. 27, 2022), 148 pgs.
*Crowdstrike, Inc. v. Webroot Inc.*, PTAB Case No. IPR2023-00126, Exhibit 2017: *Webroot, Inc. and Open Text Inc., v. Trend Micro Inc.*, Case No. 6:22-cv-00239-ADA-DTG, First Amended Complaint for Patent Infringement, Dkt. 53 (W.D. Tex., Sept. 7, 2022), 235 pgs.
*Crowdstrike, Inc. v. Webroot Inc.*, PTAB Case No. IPR2023-00126, Exhibit 2018: *Webroot, Inc. and Open Text Inc., v. Sophos, Ltd.*, Case No. 6:22-cv-00240-ADA-DTG, Second Amended Complaint for Patent Infringement, Dkt. 76 (W.D. Tex., Oct. 24, 2022), 184 pgs.
*Crowdstrike, Inc. v. Webroot Inc.*, PTAB Case No. IPR2023-00126, Preliminary Reply to Patent Owner's Preliminary Response, Mar. 9, 2023, 9 pgs.
*Crowdstrike, Inc. v. Webroot Inc.*, PTAB Case No. IPR2023-00126, Exhibit 1031: File History of EP14791882.5, 233 pgs.
*Crowdstrike, Inc. v. Webroot Inc.*, PTAB Case No. IPR2023-00126, Patent Owner's Preliminary Sur-Reply to Petitioner's Preliminary Reply, Mar. 16, 2023, 13 pgs.

(56) References Cited

OTHER PUBLICATIONS

*Crowdstrike, Inc. v. Webroot Inc.*, PTAB Case No. IPR2023-00126, Exhibit 2019: Excerpts from EX-1002 (File History of U.S. Pat. No. 10,257,224), 3 pgs.
*Crowdstrike, Inc. v. Webroot Inc.*, PTAB Case No. IPR2023-00126, Exhibit 2020: Joseph Jaroch LinkedIn, 1 pg.
*Crowdstrike, Inc. v. Webroot Inc.*, PTAB Case No. IPR2023-00126, Decision Granting Institution of Inter Partes Review, May 5, 2023, 43 pgs.
*Crowdstrike, Inc. v. Webroot Inc.*, PTAB Case No. IPR2023-00126, Scheduling Order, May 5, 2023, 12 pgs.
*Crowdstrike, Inc. v. Webroot Inc.*, PTAB Case No. IPR2023-00126, Patent Owner's Request for Rehearing, May 19, 2023, 19 pgs.
*Crowdstrike, Inc. v. Webroot Inc.*, PTAB Case No. IPR2023-00126, Patent Owner's Objections to Evidence Submitted by Petitioner, May 19, 2023, 6 pgs.
*Crowdstrike, Inc. v. Webroot Inc.*, PTAB Case No. IPR2023-00126, Exhibit 2021: Claim Construction Order, Webroot, Inc., *Open Text Inc. v. AO Kaspersky*, No. 6:22-cv-00243-ADA-DTG (lead case), May 19, 2023, 20 pgs.
*Crowdstrike, Inc. v. Webroot Inc.*, PTAB Case No. IPR2023-00126, Notification of Receipt of POP Request, May 24, 2023, 2 pgs.
*Crowdstrike, Inc. v. Webroot Inc.*, PTAB Case No. IPR2023-00126, Exhibit 3001: Request for POP, May 24, 2023, 20 pgs.
*Crowdstrike, Inc. v. Webroot Inc.*, PTAB Case No. IPR2023-00126, Patent Owner Open Text Inc.'s Updated Mandatory Notices Pursuant to 37 CFR § 42.8(b), May 25, 2023, 8 pgs.
*Crowdstrike, Inc. v. Webroot Inc.*, PTAB Case No. IPR2023-00126, Order denying POP, Jun. 8, 2023, 3 pgs.
*Trend Micro, Inc. v. Webroot Inc.*, PTAB Case No. IPR2023-00657, Petition for Inter Partes Review of U.S. Pat. No. 10,257,224, Mar. 3, 2023, 85 pgs.
*Trend Micro, Inc. v. Webroot Inc.*, PTAB Case No. IPR2023-00657, Exhibit 1001: U.S. Pat. No. 10,257,224 to Jaroch et al., 31 pgs.
*Trend Micro, Inc. v. Webroot Inc.*, PTAB Case No. IPR2023-00657, Exhibit 1002: Expert Declaration of Dr. Seth Nielson, 138 pgs.
*Trend Micro, Inc. v. Webroot Inc.*, PTAB Case No. IPR2023-00657, Exhibit 1003: Curriculum Vitae of Dr. Seth Nielson, 15 pgs.
*Trend Micro, Inc. v. Webroot Inc.*, PTAB Case No. IPR2023-00657, Exhibit 1004: U.S. Pat. No. 7,352,280 to Rockwood, 24 pgs.
*Trend Micro, Inc. v. Webroot Inc.*, PTAB Case No. IPR2023-00657, Exhibit 1005: Xie, A Spatiotemporal Event Correlation Approach to Computer Security, 148 pgs.
*Trend Micro, Inc. v. Webroot Inc.*, PTAB Case No. IPR2023-00657, Exhibit 1006: Prosecution History of '224 Patent, 472 pgs.
*Trend Micro, Inc. v. Webroot Inc.*, PTAB Case No. IPR2023-00657, Exhibit 1007: Declaration verifying Xie publication date, 4 pgs.
*Trend Micro, Inc. v. Webroot Inc.*, PTAB Case No. IPR2023-00657, Exhibit 1008: Peterson, et al., "Computer networks: a systems approach," Morgan Kaufmann Publishers, Inc., 1996, 28 pgs.
*Trend Micro, Inc. v. Webroot Inc.*, PTAB Case No. IPR2023-00657, Exhibit 1009: Bangia, et al., "Operating Systems and Software Diagnostics" (2007), 3 pgs.
*Trend Micro, Inc. v. Webroot Inc.*, PTAB Case No. IPR2023-00657, Exhibit 1010: U.S. Appl. No. 2013/0067576 to Niemela, 10 pgs.
*Trend Micro, Inc. v. Webroot Inc.*, PTAB Case No. IPR2023-00657, Exhibit 1011: Hutchins, et al., "Intelligence-Driven Computer Network Defense Informed by Analysis of Adversary Campaigns and Intrusion Kill Chains", The Proceedings of the 6th Int'l Conf. on Information Warfare and Security, Mar. 17-18, 2011, 15 pgs.
*Trend Micro, Inc. v. Webroot Inc.*, PTAB Case No. IPR2023-00657, Exhibit 1012: Cheswick, et al., "Firewalls and Internet Security Second Edition, Repelling the Wily Hacker", 2003, 4 pgs.
*Trend Micro, Inc. v. Webroot Inc.*, PTAB Case No. IPR2023-00657, Exhibit 1013: Anderson, "Network Attack and Defense", Security Engineering, vol. 2, 2008, 51 pgs.
*Trend Micro, Inc. v. Webroot Inc.*, PTAB Case No. IPR2023-00657, Exhibit 1014: Wilding et al., Virus Bulletin, The Authoritative International Publication of Computer Virus Prevention Recognition and Removal, Jul. 1989, 16 pgs.
*Trend Micro, Inc. v. Webroot Inc.*, PTAB Case No. IPR2023-00657, Exhibit 1015: Lardinois, Google Acquires Online Virus Malware and URL Scanner VirusTotal, TechCrunch, Sep. 7, 2012, 6 pgs.
*Trend Micro, Inc. v. Webroot Inc.*, PTAB Case No. IPR2023-00657, Exhibit 1016: Lasser, "Special Focus Issue: Security", ;login: The Magazine of USENIX & Sage, 6 pgs.
*Trend Micro, Inc. v. Webroot Inc.*, PTAB Case No. IPR2023-00657, Patent Owner Open Text Inc.'s Mandatory Notices Pursuant to 37 CFR § 42.8(b), Mar. 24, 2023, 8 pgs.
*Trend Micro, Inc. v. Webroot Inc.*, PTAB Case No. IPR2023-00657, Notice of Filing Date Accorded to Petition and Time for Filing Patent Owner Preliminary Response, Apr. 17, 2023, 5 pgs.
*Sophos Ltd. and Sophos Inc. v. Webroot Inc.*, PTAB Case No. IPR2023-00731, Petition for Inter Partes Review of U.S. Pat. No. 8,201,243, Apr. 4, 2023, 86 pgs.
*Sophos Ltd. and Sophos Inc. v. Webroot Inc.*, PTAB Case No. IPR2023-00731, Exhibit 1001: U.S. Pat. No. 8,201,243 ("the '243 Patent"), 13 pgs.
*Sophos Ltd. and Sophos Inc. v. Webroot Inc.*, PTAB Case No. IPR2023-00731, Exhibit 1002: File History of the '243 Patent, 423 pgs.
*Sophos Ltd. and Sophos Inc. v. Webroot Inc.*, PTAB Case No. IPR2023-00731, Exhibit 1003: Declaration of Dr. Henry Houh, 113 pgs.
*Sophos Ltd. and Sophos Inc. v. Webroot Inc.*, PTAB Case No. IPR2023-00731, Exhibit 1004: Curriculum Vitae of Dr. Henry Houh, 12 pgs.
*Sophos Ltd. and Sophos Inc. v. Webroot Inc.*, PTAB Case No. IPR2023-00731, Exhibit 1005: Li, et al., UCLog: A Unified, Correlated Logging Architecture for Intrusion Detection Int'l Conf. on Telecomm. Sys.—Modelling & Analysis (2004) ("Li"), 15 pgs.
*Sophos Ltd. and Sophos Inc. v. Webroot Inc.*, PTAB Case No. IPR2023-00731, Exhibit 1006: U.S. Pat. No. 8,117,659 to Hartrell et al. ("Hartrell"), 16 pgs.
*Sophos Ltd. and Sophos Inc. v. Webroot Inc.*, PTAB Case No. IPR2023-00731, Exhibit 1007: Salvador Mandujano Vergara, A multiagent approach to outbound intrusion detection (2004) (Ph.D. Thesis, Instituto Tecnológico y de Estudios Superires de Monterrey) (on file with Repositorio Institucional del Tecnológico de Monterrey (RITEC) in the Instituto Tecnológico y de Estudios Superiores de Monterrey Library) ("Mandujano"), 216 pgs.
*Sophos Ltd. and Sophos Inc. v. Webroot Inc.*, PTAB Case No. IPR2023-00731, Exhibit 1008: U.S. Pat. No. 7,174,566 to Yadav ("Yadav"), 17 pgs.
*Sophos Ltd. and Sophos Inc. v. Webroot Inc.*, PTAB Case No. IPR2023-00731, Exhibit 1009: Declaration of Dr. Sylvia D. Hall-Ellis, 30 pgs.
*Sophos Ltd. and Sophos Inc. v. Webroot Inc.*, PTAB Case No. IPR2023-00731, Exhibit 1010: Webroot Oct. 25, 2022 Infringement Contentions, 9 pgs.
*Sophos Ltd. and Sophos Inc. v. Webroot Inc.*, PTAB Case No. IPR2023-00731, Exhibit 1011: Jeff Crume, Inside Internet Security: What Hackers Don't Want You to Know (Pearson Educ. Ltd. 2000), 293 pgs.
*Sophos Ltd. and Sophos Inc. v. Webroot Inc.*, PTAB Case No. IPR2023-00731, Exhibit 1012: Information Sciences Institute, Univ. of S. Cal., Internet Protocol: DARPA Internet Program Protocol Specification (1981), 51 pgs.
*Sophos Ltd. and Sophos Inc. v. Webroot Inc.*, PTAB Case No. IPR2023-00731, Exhibit 1013: Stipulation Waiving IPR Claims in District Court Litigation, 4 pgs.
*Sophos Ltd. and Sophos Inc. v. Webroot Inc.*, PTAB Case No. IPR2023-00731, Exhibit 1014: *Excerpt from Transcript of Motions Hearing in Webroot, Inc., et al. v. AO Kaspersky Lab*, No. 6:22-cv-00243-ADA-DTG (W.D. Tex.) (Dec. 9, 2022), 7 pgs.
*Sophos Ltd. and Sophos Inc. v. Webroot Inc.*, PTAB Case No. IPR2023-00731, Exhibit 1015: Mandia, K & Prosise, C., Incident Response: Investigating Computer Crime, 23 pgs.
*Sophos Ltd. and Sophos Inc. v. Webroot Inc.*, PTAB Case No. IPR2023-00731, Patent Owner Open Text Inc.'s Mandatory Notices Pursuant to 37 CFR § 42.8(b), Apr. 25, 2023, 8 pgs.

(56) References Cited

OTHER PUBLICATIONS

*Sophos Ltd. and Sophos Inc.* v. *Webroot Inc.*, PTAB Case No. IPR2023-00731, Notice of Filing Date Accorded to Petition and Time for Filing Patent Owner Preliminary Response, May 10, 2023, 5 pgs.
*Sophos Ltd. and Sophos Inc.* v. *Webroot Inc.*, PTAB Case No. IPR2023-00732, Petition for Inter Partes Review of U.S. Pat. No. 8,719,932, Apr. 4, 2023, 86 pgs.
*Sophos Ltd. and Sophos Inc.* v. *Webroot Inc.*, PTAB Case No. IPR2023-00732, Exhibit 1001: U.S. Pat. No. 8,719,932 ("the '932 Patent"), 12 pgs.
*Sophos Ltd. and Sophos Inc.* v. *Webroot Inc.*, PTAB Case No. IPR2023-00732, Exhibit 1002: File History of the '932 Patent, 120 pgs.
*Sophos Ltd. and Sophos Inc.* v. *Webroot Inc.*, PTAB Case No. IPR2023-00732, Exhibit 1003: Declaration of Dr. Henry Houh, 111 pgs.
*Sophos Ltd. and Sophos Inc.* v. *Webroot Inc.*, PTAB Case No. IPR2023-00732, Exhibit 1004: Curriculum Vitae of Dr. Henry Houh, 12 pgs.
*Sophos Ltd. and Sophos Inc.* v. *Webroot Inc.*, PTAB Case No. IPR2023-00732, Exhibit 1005: Li, et al., UCLog: A Unified, Correlated Logging Architecture for Intrusion Detection Int'l Conf. on Telecomm. Sys.—Modelling & Analysis (2004) ("Li") 1, 15 pgs.
*Sophos Ltd. and Sophos Inc.* v. *Webroot Inc.*, PTAB Case No. IPR2023-00732, Exhibit 1006: U.S. Pat. No. 8,117,659 ("Hartrell"), 16 pgs.
*Sophos Ltd. and Sophos Inc.* v. *Webroot Inc.*, PTAB Case No. IPR2023-00732, Exhibit 1007: Salvador Mandujano Vergara, A multiagent approach to outbound intrusion detection (2004) (Ph.D. Thesis, Instituto Tecnológico y de Estudios Superires de Monterrey) (on file with Repositorio Institucional del Tecnológico de Monterrey (RITEC) in the Instituto Tecnológico y de Estudios Superiores de Monterrey Library) ("Mandujano"), 216 pgs.
*Sophos Ltd. and Sophos Inc.* v. *Webroot Inc.*, PTAB Case No. IPR2023-00732, Exhibit 1008: U.S. Pat. No. 7,174,566 to Yadav ("Yadav"), 17 pgs.
*Sophos Ltd. and Sophos Inc.* v. *Webroot Inc.*, PTAB Case No. IPR2023-00732, Exhibit 1009: Declaration of Dr. Sylvia D. Hall-Ellis, 30 pgs.
*Sophos Ltd. and Sophos Inc.* v. *Webroot Inc.*, PTAB Case No. IPR2023-00732, Exhibit 1010: Webroot Oct. 25, 2022 Infringement Contentions, 9 pgs.
*Sophos Ltd. and Sophos Inc.* v. *Webroot Inc.*, PTAB Case No. IPR2023-00732, Exhibit 1011: Jeff Crume, Inside Internet Security: What Hackers Don't Want You to Know, 293 pgs.
*Sophos Ltd. and Sophos Inc.* v. *Webroot Inc.*, PTAB Case No. IPR2023-00732, Exhibit 1012: DARPA, Internet Program Protocol Specification, 51 pgs.
*Sophos Ltd. and Sophos Inc.* v. *Webroot Inc.*, PTAB Case No. IPR2023-00732, Exhibit 1013: U.S. Pat. No. 8,201,243, 13 pgs.
*Sophos Ltd. and Sophos Inc.* v. *Webroot Inc.*, PTAB Case No. IPR2023-00732, Exhibit 1014: File History of U.S. Pat. No. 8,201,243, 423 pgs.
*Sophos Ltd. and Sophos Inc.* v. *Webroot Inc.*, PTAB Case No. IPR2023-00732, Exhibit 1015: Mandia, K & Prosise, C., Incident Response: Investigating Computer Crime, 23 pgs.
*Sophos Ltd. and Sophos Inc.* v. *Webroot Inc.*, PTAB Case No. IPR2023-00732, Exhibit 1016: Stipulation Waiving IPR Claims in District Court Litigation, 4 pgs.
*Sophos Ltd. and Sophos Inc.* v. *Webroot Inc.*, PTAB Case No. IPR2023-00732, Exhibit 1017: *Excerpt from Transcript of Motions Hearing in Webroot, Inc., et al.* v. *AO Kaspersky Lab*, No. 6:22-cv-00243-ADA-DTG (W.D. Tex.) (Dec. 9, 2022), 7 pgs.
*Sophos Ltd. and Sophos Inc.* v. *Webroot Inc.*, PTAB Case No. IPR2023-00732, Patent Owner Open Text Inc.'s Mandatory Notices Pursuant to 37 CFR § 42.8(b), Apr. 25, 2023, 8 pgs.

*Sophos Ltd. and Sophos Inc.* v. *Webroot Inc.*, PTAB Case No. IPR2023-00732, Notice of Filing Date Accorded to Petition and Time for Filing Patent Owner Preliminary Response, May 10, 2023, 5 pgs.
*AO Kaspersky Lab* v. *Webroot, Inc.*, PTAB Case No. IPR2023-01011, Petition for Inter Partes Review of U.S. Pat. No. 10,257,224, Jun. 2, 2023, 91 pgs.
*AO Kaspersky Lab* v. *Webroot, Inc.*, PTAB Case No. IPR2023-01011, Exhibit 1001: U.S. Pat. No. 10,257,224 to Jaroch et al., 31 pgs.
*AO Kaspersky Lab* v. *Webroot, Inc.*, PTAB Case No. IPR2023-01011, Exhibit 1002: File History of U.S. Pat. No. 10,257,224, 472 pgs.
*AO Kaspersky Lab* v. *Webroot, Inc.*, PTAB Case No. IPR2023-01011, Exhibit 1003: Declaration of Dr. Wenke Lee, 202 pgs.
*AO Kaspersky Lab* v. *Webroot, Inc.*, PTAB Case No. IPR2023-01011, Exhibit 1004: U.S. Appl. No. 2013/0298244 to Kumar et al., 52 pgs.
*AO Kaspersky Lab* v. *Webroot, Inc.*, PTAB Case No. IPR2023-01011, Exhibit 1005: U.S. Appl. No. 2007/0016953 to Morris et al. ("Morris"), 18 pgs.
*AO Kaspersky Lab* v. *Webroot, Inc.*, PTAB Case No. IPR2023-01011, Exhibit 1006: U.S. Pat. No. 8,087,087 to Van Oorschot et al. ("Van Oorschot"), 19 pgs.
*AO Kaspersky Lab* v. *Webroot, Inc.*, PTAB Case No. IPR2023-01011, Exhibit 1007: U.S. Appl. No. 2010/0077481 to Polyakov et al., 11 pgs.
*AO Kaspersky Lab* v. *Webroot, Inc.*, PTAB Case No. IPR2023-01011, Exhibit 1008: U.S. Appl. No. 2011/0321166 to Capalik et al. ("Capalik"), 29 pgs.
*AO Kaspersky Lab* v. *Webroot, Inc.*, PTAB Case No. IPR2023-01011, Exhibit 1009: U.S. Appl. No. 2012/0260340, 30 pgs.
*AO Kaspersky Lab* v. *Webroot, Inc.*, PTAB Case No. IPR2023-01011, Exhibit 1010: File History of U.S. Pat. No. 9,578,045 ("'045 Patent File History"), 210 pgs.
*AO Kaspersky Lab* v. *Webroot, Inc.*, PTAB Case No. IPR2023-01011, Exhibit 1011: Scheduling Order (Dkt. 50), Sep. 28, 2022, 18 pgs.
*AO Kaspersky Lab* v. *Webroot, Inc.*, PTAB Case No. IPR2023-01011, Exhibit 1012: Natarajan Meghanathan, Sumanth Reddy Allam, and Loretta A. Moore, Tools and Techniques for Network Forensics, International Journal of Network Security & Its Applications (IJNSA), vol. 1., No. 1 (Apr. 2009), 12 pgs.
*AO Kaspersky Lab* v. *Webroot, Inc.*, PTAB Case No. IPR2023-01011, Exhibit 1013: SANS Institute, Host- vs. Network-Based Intrusion Detection Systems (2000-2005), 11 pgs.
*AO Kaspersky Lab* v. *Webroot, Inc.*, PTAB Case No. IPR2023-01011, Exhibit 1014: Securosis LLC, Evolving Endpoint Malware Detection: Dealing with Advanced and Targeted Attacks, Version 1.3 (Jul. 12, 2012), 23 pgs.
*AO Kaspersky Lab* v. *Webroot, Inc.*, PTAB Case No. IPR2023-01011, Exhibit 1015: Yanfang Ye, Weiwei Zhuang, Tao Li, Egemen Tas, Umesh Gupta, Shenghuo Zhu, Melih Abdulhayogiu, Combining File Content and File Relations for Cloud Based Malware Detection, Aug. 2011, 9 pgs.
*AO Kaspersky Lab* v. *Webroot, Inc.*, PTAB Case No. IPR2023-01011, Exhibit 1016: U.S. Pat. No. 6,944,772 to Dozortsev, 10 pgs.
*AO Kaspersky Lab* v. *Webroot, Inc.*, PTAB Case No. IPR2023-01011, Exhibit 1017: U.S. Pat. No. 6,772,346 to Chess et al., 14 pgs.
*AO Kaspersky Lab* v. *Webroot, Inc.*, PTAB Case No. IPR2023-01011, Exhibit 1018: WO 2002/033525 to Shyne-Song Chuang, 18 pgs.
*AO Kaspersky Lab* v. *Webroot, Inc.*, PTAB Case No. IPR2023-01011, Exhibit 1019: EP 1,549,012 to Kristof De Spiegeleer, 19 pgs.
*AO Kaspersky Lab* v. *Webroot, Inc.*, PTAB Case No. IPR2023-01011, Exhibit 1020: EP 1,280,040 to Alexander James Hinchliffe et al., 17 pgs.
*AO Kaspersky Lab* v. *Webroot, Inc.*, PTAB Case No. IPR2023-01011, Exhibit 1021: Oracle, Java Documentation, The Java Tutorials, What is a Path? (And Other File System Facts) (available at the following link https://docs.oracle.com/javase/tutorial/essential/io/path.html) (last accessed Oct. 2022), 3 pgs.

(56) References Cited

OTHER PUBLICATIONS

*AO Kaspersky Lab* v. *Webroot, Inc.*, PTAB Case No. IPR2023-01011, Exhibit 1022: U.S. Appl. No. 2004/0143753 to Hernacki et al., 20 pgs.
*AO Kaspersky Lab* v. *Webroot, Inc.*, PTAB Case No. IPR2023-01011, Exhibit 1023: U.S. Appl. No. 2011/0083180 to Mashevsky et al., 16 pgs.
*AO Kaspersky Lab* v. *Webroot, Inc.*, PTAB Case No. IPR2023-01011, Exhibit 1024: U.S. Pat. No. 8,429,746 to Alen Capalik, 11 pgs.
*AO Kaspersky Lab* v. *Webroot, Inc.*, PTAB Case No. IPR2023-01011, Exhibit 1025: Server Hardware, Software and Architecture by Abeer El Hadi El Zein El Nahas, University of Khartoum, Electrical and Electronics Engineering Dept., Feb. 2008, 152 pgs.
*AO Kaspersky Lab* v. *Webroot, Inc.*, PTAB Case No. IPR2023-01011, Exhibit 1026: Guofei Gu, Phillip Porras, Vinod Yegneswaran, Martin Fong, Wenke Lee, BotHunter: Detecting Malware Infection Through IDS- Driven Dialog Correlation, In Proceedings of The 16th USENIX Security Symposium, Aug. 2007, 16 pgs.
*AO Kaspersky Lab* v. *Webroot, Inc.*, PTAB Case No. IPR2023-01011, Exhibit 1027: Yacin Nadji, Manos Antonakakis, Roberto Perdisci, and Wenke Lee, Understanding the Prevalence and Use of Alternative Plans in Malware with Network Games, In Proceedings of The 27th Annual Computer Security Applications Conference, Dec. 2011, 10 pgs.
*AO Kaspersky Lab* v. *Webroot, Inc.*, PTAB Case No. IPR2023-01011, Exhibit 1028: Manos Antonakakis, Roberto Perdisci, David Dagon, Wenke Lee, and Nick Feamster, Building a Dynamic Reputation System for DNS, In Proceedings of The 19th USENIX Security Symposium, Aug. 2010, 17 pgs.
*AO Kaspersky Lab* v. *Webroot, Inc.*, PTAB Case No. IPR2023-01011, Exhibit 1029: Long Lu, Vinod Yegneswaran, Phil Porras, and Wenke Lee, BLADE: An Attack-Agnostic Approach for Preventing Drive-By Malware Infections, In Proceedings of The 17th ACM Conference on Computer and Communications Security (CCS), Chicago, IL (Oct. 2010), 12 pgs.
*AO Kaspersky Lab* v. *Webroot, Inc.*, PTAB Case No. IPR2023-01011, Exhibit 1030: U.S. Appl. No. 2008/0016570 to Capalik, 14 pgs.
*AO Kaspersky Lab* v. *Webroot, Inc.*, PTAB Case No. IPR2023-01011, Exhibit 1031: Declaration of V.S. Subrahmanian, Ph.D., 88 pgs.
*AO Kaspersky Lab* v. *Webroot, Inc.*, PTAB Case No. IPR2023-01011, Exhibit 1032: Order Granting Fifth Amended Scheduling Order, ECF No. 252, Mar. 29, 2023, 9 pgs.
*AO Kaspersky Lab* v. *Webroot, Inc.*, PTAB Case No. IPR2023-01011, Petitioner's Motion for Joinder under 35 U.S.C. § 315(c), 37 C.F.R. § 42.22, and § 42.122(b), Jun. 2, 2023, 18 pgs.
*AO Kaspersky Lab* v. *Webroot, Inc.*, PTAB Case No. IPR2023-01011, Notice of Filing Date Accorded to Petition and Time for Filing Patent Owner Preliminary Response, Jun. 9, 2023, 6 pgs.
*Forcepoint LLC* v. *Webroot Inc. and Open Text, Inc.*, PTAB Case No. IPR2023-00786, Petition for Inter Partes Review of U.S. Pat. No. 10,025,928, Mar. 31, 2023, 89 pgs.
*Forcepoint LLC* v. *Webroot Inc. and Open Text, Inc.*, PTAB Case No. IPR2023- 00786, Exhibit 1001: U.S. Pat. No. 10,025,928 to Jaroch et al., 12 pgs.
*Forcepoint LLC* v. *Webroot Inc. and Open Text, Inc.*, PTAB Case No. IPR2023-00786, Exhibit 1002: Declaration of Dr. Michael T. Goodrich, 130 pgs.
*Forcepoint LLC* v. *Webroot Inc. and Open Text, Inc.*, PTAB Case No. IPR2023-00786, Exhibit 1003: Patent File History of U.S. Pat. No. 10,025,928, 402 pgs.
*Forcepoint LLC* v. *Webroot Inc. and Open Text, Inc.*, PTAB Case No. IPR2023-00786, Exhibit 1004: U.S. Appl. No. 2013/0007870 ("Devarajan"), 25 pgs.
*Forcepoint LLC* v. *Webroot Inc. and Open Text, Inc.*, PTAB Case No. IPR2023-00786, Exhibit 1005: U.S. Appl. No. 2009/0070873 ("McAfee"), 23 pgs.
*Forcepoint LLC* v. *Webroot Inc. and Open Text, Inc.*, PTAB Case No. IPR2023-00786, Exhibit 1006: Complaint, *Webroot, Inc et al.* v. *Forcepoint LLC*, No. 6:22-cv-342 (W.D. Tex.) (Mar. 31, 2022), 98 pgs.
*Forcepoint LLC* v. *Webroot Inc. and Open Text, Inc.*, PTAB Case No. IPR2023-00786, Exhibit 1007: Excerpt from Transcript of Motions Hearing in *Webroot, Inc., et al.* v. *AO Kaspersky Lab*, No. 6:22-cv-243 (W.D. Tex.) (Dec. 9, 2022), 6 pgs.
*Forcepoint LLC* v. *Webroot Inc. and Open Text, Inc.*, PTAB Case No. IPR2023-00786, Exhibit 1008: U.S. Pat. No. 9,654,495 ("Hubbard"), 45 pgs.
*Forcepoint LLC* v. *Webroot Inc. and Open Text, Inc.*, PTAB Case No. IPR2023-00786, Exhibit 1009: Curriculum Vitae of Dr. Michael T. Goodrich, 38 pgs.
*Forcepoint LLC* v. *Webroot Inc. and Open Text, Inc.*, PTAB Case No. IPR2023-00786, Exhibit 1010: LexMachina Summary of Cases filed by Webroot, Inc. in the Western District of Texas, 2 pgs.
*Forcepoint LLC* v. *Webroot Inc. and Open Text, Inc.*, PTAB Case No. IPR2023-00786, Patent Owner Open Text Inc.'s Mandatory Notices Pursuant to 37 CFR § 42.8(b), Apr. 21, 2023, 7 pgs.
*Forcepoint LLC* v. *Webroot Inc. and Open Text, Inc.*, PTAB Case No. IPR2023-00786, Notice of Filing Date Accorded to Petition and Time for Filing Patent Owner Preliminary Response, May 17, 2023, 5 pgs.
*Forcepoint LLC* v. *Webroot, Inc. and Open Text, Inc.*, PTAB Case No. IPR2023-00784, Petition for Inter Partes Review of U.S. Pat. No. 8,438,386 under 37 CFR § 42.101, Mar. 31, 2023, 87 pgs.
*Forcepoint LLC* v. *Webroot, Inc. and Open Text, Inc.*, PTAB Case No. IPR2023-00784, Exhibit 1001: U.S. Pat. No. 8,438,386 to Hegli et al., 23 pgs.
*Forcepoint LLC* v. *Webroot, Inc. and Open Text, Inc.*, PTAB Case No. IPR2023-00784, Exhibit 1002: Declaration of Dr. Michael T. Goodrich, 135 pgs.
*Forcepoint LLC* v. *Webroot, Inc. and Open Text, Inc.*, PTAB Case No. IPR2023-00784, Exhibit 1003: Curriculum Vitae of Dr. Michael T. Goodrich, 38 pgs.
*Forcepoint LLC* v. *Webroot, Inc. and Open Text, Inc.*, PTAB Case No. IPR2023-00784, Exhibit 1004: U.S. Pat. No. 9,654,495 to Hubbard et al., 45 pgs.
*Forcepoint LLC* v. *Webroot, Inc. and Open Text, Inc.*, PTAB Case No. IPR2023-00784, Exhibit 1005: U.S. Pat. No. 8,015,174 to Hubbard, 32 pgs.
*Forcepoint LLC* v. *Webroot, Inc. and Open Text, Inc.*, PTAB Case No. IPR2023-00784, Exhibit 1006: U.S. Appl. No. 2008/0175266 to Alperovitch et al., 30 pgs.
*Forcepoint LLC* v. *Webroot, Inc. and Open Text, Inc.*, PTAB Case No. IPR2023-00784, Exhibit 1007: Complaint, *Webroot, Inc et al.* v. *Forcepoint LLC*, No. 6:22-cv-342 (W.D. Tex.) (Mar. 31, 2022), 98 pgs.
*Forcepoint LLC* v. *Webroot, Inc. and Open Text, Inc.*, PTAB Case No. IPR2023-00784, Exhibit 1008: Excerpt from Transcript of Motions Hearing in *Webroot, Inc., et al.* v. *AO Kaspersky Lab*, No. 6:22-cv-243 (W.D. Tex.) (Dec. 9, 2022), 6 pgs.
*Forcepoint LLC* v. *Webroot, Inc. and Open Text, Inc.*, PTAB Case No. IPR2023-00784, Exhibit 1009: Patent File History of U.S. Pat. No. 8,438,386, 197 pgs.
*Forcepoint LLC* v. *Webroot, Inc. and Open Text, Inc.*, PTAB Case No. IPR2023-00784, Exhibit 1010: LexMachina Summary of Cases filed by Webroot, Inc. in the Western District of Texas, 2 pgs.
*Forcepoint LLC* v. *Webroot, Inc. and Open Text, Inc.*, PTAB Case No. IPR2023-00784, Exhibit 1011: Periakaruppan, Ram & Nemeth, Evi, "GTrace-A Graphical Traceroute Tool," USENIX (1999), 11 pgs.
*Forcepoint LLC* v. *Webroot, Inc. and Open Text, Inc.*, PTAB Case No. IPR2023-00784, Exhibit 1012: Microsoft Computer Dictionary (5th ed., 2002), 3 pgs.
*Forcepoint LLC* v. *Webroot, Inc. and Open Text, Inc.*, PTAB Case No. IPR2023-00784, Exhibit 1013: U.S. Appl. No. 2008/0082662 to Dandliker et al., 24 pgs.
*Forcepoint LLC* v. *Webroot, Inc. and Open Text, Inc.*, PTAB Case No. IPR2023-00784, Patent Owner Open Text Inc.'s Mandatory Notices Pursuant to 37 CFR § 42.8(b), Apr. 21, 2023, 7 pgs.

(56) References Cited

OTHER PUBLICATIONS

*Forcepoint LLC* v. *Webroot, Inc. and Open Text, Inc.*, PTAB Case No. IPR2023-00784, Notice of Filing Date Accorded to Petition and Time for Filing Patent Owner Preliminary Response, May 17, 2023, 5 pgs.
*Sophos Ltd. and Sophos Inc.* v. *Webroot Inc.*, PTAB Case No. IPR2023-00528, Petition for Inter Partes Review of U.S. Pat. No. 10,599,844, Mar. 3, 2023, 86 pgs.
*Sophos Ltd. and Sophos Inc.* v. *Webroot Inc.*, PTAB Case No. IPR2023-00528, Exhibit 1001: U.S. Pat. No. 10,599,844, 15 pgs.
*Sophos Ltd. and Sophos Inc.* v. *Webroot Inc.*, PTAB Case No. IPR2023-00528, Exhibit 1002: File History for U.S. Pat. No. 10,599,844, 458 pgs.
*Sophos Ltd. and Sophos Inc.* v. *Webroot Inc.*, PTAB Case No. IPR2023-00528, Exhibit 1003: Defendant Sophos Ltd.'s Stipulation regarding Invalidity Contents for U.S. Pat. No. 10,599,844, 4 pgs.
*Sophos Ltd. and Sophos Inc.* v. *Webroot Inc.*, PTAB Case No. IPR2023-00528, Exhibit 1004: Declaration of Dr. Gene Tsudik, 122 pgs.
*Sophos Ltd. and Sophos Inc.* v. *Webroot Inc.*, PTAB Case No. IPR2023-00528, Exhibit 1005: U.S. Appl. No. 20150213376 ("Ideses"), 19 pgs.
*Sophos Ltd. and Sophos Inc.* v. *Webroot Inc.*, PTAB Case No. IPR2023-00528, Exhibit 1006: Japanese Patent Appl. Pub. No. 2012027710A ("Mori") and Certified Translation Thereof, 27 pgs.
*Sophos Ltd. and Sophos Inc.* v. *Webroot Inc.*, PTAB Case No. IPR2023-00528, Exhibit 1007: Defendants' Opening Claim Construction Brief, D.I. 86, *Webroot Inc et al.* v. *AO Kaspersky Lab et al.*, No. 6:22-cv-00243 (W.D. Tex., Jan. 22, 2023), 84 pgs.
*Sophos Ltd. and Sophos Inc.* v. *Webroot Inc.*, PTAB Case No. IPR2023-00528, Exhibit 1008: Order granting Fourth Amended Scheduling Order, D.I. 160, *Webroot Inc et al.* v. *AO Kaspersky Lab et al.*, No. 6:22-cv-00243 (W.D. Tex. Jan. 22, 2023), 7 pgs.
*Sophos Ltd. and Sophos Inc.* v. *Webroot Inc.*, PTAB Case No. IPR2023-00528, Exhibit 1009: WANG, et al., *Detecting Unknown Malicious Executables Using Portable Executable Headers*, Fifth International Joint Conference on INC, IMS, and IDC, 2009, pp. 278-284.
*Sophos Ltd. and Sophos Inc.* v. *Webroot Inc.*, PTAB Case No. IPR2023-00528, Exhibit 1010: Michael Sikorski & Andrew Honig, *Practical Malware Analysis*, 2012, 12 pgs.
*Sophos Ltd. and Sophos Inc.* v. *Webroot Inc.*, PTAB Case No. IPR2023-00528, Exhibit 1011: Murugiah Souppaya & Karen Scarfone, *Guide to Malware Incident Prevention and Handling for Desktops and Laptops*, NIST Spec. Pub. 800-83, Rev. 1, Jul. 2013, 47 pgs.
*Sophos Ltd. and Sophos Inc.* v. *Webroot Inc.*, PTAB Case No. IPR2023-00528, Exhibit 1012: Monnappa K A, Learning Malware Analysis, 2018, 9 pgs.
*Sophos Ltd. and Sophos Inc.* v. *Webroot Inc.*, PTAB Case No. IPR2023-00528, Exhibit 1013: V. Kecman, *Support Vector Machines—An Introduction*, StudFuzz 177, 1-47, 2005, 11 pgs.
*Sophos Ltd. and Sophos Inc.* v. *Webroot Inc.*, PTAB Case No. IPR2023-00528, Exhibit 1014: *Virus Bulletin* (Nov. 1990), 24 pgs.
*Sophos Ltd. and Sophos Inc.* v. *Webroot Inc.*, PTAB Case No. IPR2023-00528, Exhibit 1015: U.S. Pat. No. 8,709,924, 17 pgs.
*Sophos Ltd. and Sophos Inc.* v. *Webroot Inc.*, PTAB Case No. IPR2023-00528, Exhibit 1016: U.S. Pat. No. 9,465,940, 14 pgs.
*Sophos Ltd. and Sophos Inc.* v. *Webroot Inc.*, PTAB Case No. IPR2023-00528, Exhibit 1017: D. Devi & S. Nandi, *Detection of Packed Malware, in Proceedings of the First Int'l Conf. on Security of Internet of Things* (SecurIT '12), Association for Computing Machinery, New York, NY, USA 22-26, 2012, 1 pg.
*Sophos Ltd. and Sophos Inc.* v. *Webroot Inc.*, PTAB Case No. IPR2023-00528, Exhibit 1018: Excerpt from Transcript of Motions Hearing, *Webroot Inc et al.* v. *AO Kaspersky Lab et al.*, No. 6:22-cv-00243 (W.D. Tex.), Dec. 9, 2022, 3 pgs.
*Sophos Ltd. and Sophos Inc.* v. *Webroot Inc.*, PTAB Case No. IPR2023-00528, Patent Owner Open Text Inc.'s Mandatory Notices Pursuant to 37 CFR § 42.8(b), Mar. 24, 2023, 7 pgs.

*Sophos Ltd. and Sophos Inc.* v. *Webroot Inc.*, PTAB Case No. IPR2023-00528, Notice of Filing Date Accorded to Petition and Time for Filing Patent Owner Preliminary Response, Feb. 16, 2023, 6 pgs.
Patent Owner's Preliminary Response, *Sophos Ltd. and Sophos Inc.* v. *Webroot Inc.*, PTAB Case No. IPR2023-00528, May 16, 2023, 64 pgs.
Exhibit 2001: Declaration Of Sam Malek, Ph.D., *Sophos Ltd. and Sophos Inc.* v. *Webroot Inc.*, PTAB Case No. IPR2023-00528, May 16, 2023, 45 pgs.
Exhibit 2002: Curriculum Vitae of Sam Malek, Ph.D., *Sophos Ltd. and Sophos Inc.* v. *Webroot Inc.*, PTAB Case No. IPR2023-00528, May 16, 2023, 36 pgs.
Exhibit 2003: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), *Sophos Ltd. and Sophos Inc.* v. *Webroot Inc.*, PTAB Case No. IPR2023-00528, May 16, 2023, 9 pgs.
Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), *Sophos Ltd. and Sophos Inc.* v. *Webroot Inc.*, PTAB Case No. IPR2023-00528, May 16, 2023, 7 pgs.
Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), *Sophos Ltd. and Sophos Inc.* v. *Webroot Inc.*, PTAB Case No. IPR2023-00528, May 16, 2023, 7 pgs.
Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), *Sophos Ltd. and Sophos Inc.* v. *Webroot Inc.*, PTAB Case No. IPR2023-00528, May 16, 2023, 8 pgs.
Exhibit 2007: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), *Sophos Ltd. and Sophos Inc.* v. *Webroot Inc.*, PTAB Case No. IPR2023-00528, May 16, 2023, 20 pgs.
Exhibit 2008: Dani Kass, "Catching Up On Patent Litigation With Judge Albright" (Law360 Mar. 14, 2023); https://www.law360.com/pulse/articles/1582438/print?section=pulse/courts, *Sophos Ltd. and Sophos Inc.* v. *Webroot Inc.*, PTAB Case No. IPR2023-00528, May 16, 2023, 3 pgs.
Exhibit 2009: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), *Sophos Ltd. and Sophos Inc.* v. *Webroot Inc.*, PTAB Case No. IPR2023-00528, May 16, 2023, 9 pgs.
Exhibit 2010: United States Courts, Statistics & Reports, Federal Court Management Statistics—Comparison Within Circuit—During the 12-Month Period Ending Jun. 30, 2022, "Comparison of Districts Within the First Circuit—12-Month Period Ending Jun. 30, 2022," at https://www.uscourts.gov/sites/default/files/fcms_na_distcomparison0630.2022_0.pdf, *Sophos Ltd. and Sophos Inc.* v. *Webroot Inc.*, PTAB Case No. IPR2023-00528, May 16, 2023, 11 pgs.
Exhibit 2011: *Webroot, Inc. and Open Text Inc.*, v. *Sophos Ltd.*, Case No. 6:22-cv-00240-ADA, Complaint for Patent Infringement, Dkt. 1 (W.D. Tex., Mar. 4, 2022), *Sophos Ltd. and Sophos Inc.* v. *Webroot Inc.*, PTAB Case No. IPR2023-00528, May 16, 2023, 144 pgs.
Exhibit 2012: *Webroot, Inc. and Open Text Inc.*, v. *ForcePoint LLC*, Case No. 6:22-cv-00342-ADA-DTG, Defendant ForcePoint LLC's Prelimi-nary Invalidity Contentions (W.D. Tex., Sep. 13, 2022) (excerpted), *Sophos Ltd. and Sophos Inc.* v. *Webroot Inc.*, PTAB Case No. IPR2023-00528, May 16, 2023, 149 pgs.
Exhibit 2013: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022) (excerpted), *Sophos Ltd. and Sophos Inc.* v. *Webroot Inc.*, PTAB Case No. IPR2023-00528, May 16, 2023, 127 pgs.

(56) References Cited

OTHER PUBLICATIONS

Exhibit 2014: *Webroot, Inc. and Open Text Inc., v. Trend Micro Inc.*, Case No. 6:22-cv-00239-ADA-DTG, Defendant's Preliminary Invalidity Contentions (W.D. Tex., Sep. 13, 2022) (excerpted), *Sophos Ltd. and Sophos Inc. v. Webroot Inc.*, PTAB Case No. IPR2023-00528, May 16, 2023, 125 pgs.
Exhibit 2015: *Webroot, Inc. and Open Text Inc., v. AO Kaspersky Lab*, Case No. 6:22-cv-00243-ADA-DTG, Defendant's Preliminary Invalidity Contentions Appendix A (W.D. Tex., Sep. 14, 2022) (excerpted), *Sophos Ltd. and Sophos Inc. v. Webroot Inc.*, PTAB Case No. IPR2023-00528, May 16, 2023, 8 pgs.
Exhibit 2016: *Webroot, Inc. and Open Text Inc., v. CrowdStrike, Inc. and CrowdStrike Holdings, Inc.*, Case No. 6:22-cv-00241-ADA-DTG, Defendant's Preliminary Invalidity Contentions (W.D. Tex., Sep. 13, 2022) (excerpted), *Sophos Ltd. and Sophos Inc. v. Webroot Inc.*, PTAB Case No. IPR2023-00528, May 16, 2023, 62 pgs.
*Trend Micro, Inc. v. Webroot Inc.*, PTAB Case No. IPR2023-00662, Petition for Inter Partes Review of U.S. Pat. No. 10,599,844, Mar. 3, 2023, 85 pgs.
*Trend Micro, Inc. v. Webroot Inc.*, PTAB Case No. IPR2023-00662, Exhibit 1001, U.S. Pat. No. 10,599,844 to Schmidtler et al., 15 pgs.
*Trend Micro, Inc. v. Webroot Inc.*, PTAB Case No. IPR2023-00662, Exhibit 1002, Expert Declaration of Dr. Seth Nielson, 152 pgs.
*Trend Micro, Inc. v. Webroot Inc.*, PTAB Case No. IPR2023-00662, Exhibit 1003, Gil Tahan, et al., *Mal-ID: Automatic Malware Detection Using Common Segment Analysis and Meta-Features*, Journal of Machine Learning 13, 949-979, Apr. 13, 2012, 31 pgs.
*Trend Micro, Inc. v. Webroot Inc.*, PTAB Case No. IPR2023-00662, Exhibit 1004, Eitan Menahem, *Improving Malware Detection by Applying Multi- Inducer Ensemble*, Computational Statistics & Data Analysis, 53, 2009, 1483-1494, 12 pgs.
*Trend Micro, Inc. v. Webroot Inc.*, PTAB Case No. IPR2023-00662, Exhibit 1005, U.S. Appl. No. 2009/0254992 ("Schultz"), 20 pgs.
*Trend Micro, Inc. v. Webroot Inc.*, PTAB Case No. IPR2023-00662, Exhibit 1006, Curriculum Vitae of Seth James Nielson, Ph.D., 15 pgs.
*Trend Micro, Inc. v. Webroot Inc.*, PTAB Case No. IPR2023-00662, Exhibit 1007, Prosecution history of U.S. Pat. No. 10,599,844, 456 pgs.
*Trend Micro, Inc. v. Webroot Inc.*, PTAB Case No. IPR2023-00662, Exhibit 1008, J. Zico Kolter, *Learning to Detect and Classify Malicious Executables in the Wild*, Journal of Machine Learning Research, 7, 2721-2744, Dec. 2006, 24 pgs.
*Trend Micro, Inc. v. Webroot Inc.*, PTAB Case No. IPR2023-00662, Exhibit 1009, Srinivas Mukkamala, *Intrusion detection using an ensemble of intelligent paradigms*, Journal of Network and Computer Applications, 28, 167-182, 2005, 15 pgs.
*Trend Micro, Inc. v. Webroot Inc.*, PTAB Case No. IPR2023-00662, Exhibit 1010, Stuart J. Russell, et al., Artificial Intelligence, A Modern Approach, Second Edition, Kernel Machines, ch. 20.6, Pearson Education, Inc., NJ, copyright 2003, 5 pgs.
*Trend Micro, Inc. v. Webroot Inc.*, PTAB Case No. IPR2023-00662, Exhibit 1011, Lars Buitinck, Giles Louppe, Mathieu Blondel, et al., "API design for machine learning software: Experiences from the scikit-learn project", Sep. 2013, 16 pgs.
*Trend Micro, Inc. v. Webroot Inc.*, PTAB Case No. IPR2023-00662, Exhibit 1012, Y. Ye, L. Chen, D. Wang, T. Li, Q. Jiang, and M. Zhao, SBMDS: an interpretable string based malware detection system using SVM ensemble with bagging, Journal in Computer Virology, 5:283-293, 11/26/208, 12 pgs.
*Trend Micro, Inc. v. Webroot Inc.*, PTAB Case No. IPR2023-00662, Exhibit 1013, O. Henchiri and N. Japkowicz, A Feature Selection and Evaluation Scheme for Computer Virus Detection, Proceedings of the Sixth Int'l Conference on Data Mining (ICDM' 06), pp. 891-895.
*Trend Micro, Inc. v. Webroot Inc.*, PTAB Case No. IPR2023-00662, Exhibit 1014, J. Dai, R. Guha, and J. Lee, Efficient Virus Detection Using Dynamic Instruction Sequences, Journal of Computers, vol. 4, No. 5, May 2009, pp. 405-414.
*Trend Micro, Inc. v. Webroot Inc.*, PTAB Case No. IPR2023-00662, Exhibit 1015, J. Z. Kolter, "Learning to Detect Malicious Executables in the Wild", Proceedings of the Tenth ACM SIGKDD Int'l Conf. on Knowledge Discovery and Data Mining, 2004, 9 pgs.
*Trend Micro, Inc. v. Webroot Inc.*, PTAB Case No. IPR2023-00662, Exhibit 1016, T. Joachims, Advances in Kernel Methods, Making Large-Scale SVM Learning Practical, MIT Press, 1999, pp. 169-184.
*Trend Micro, Inc. v. Webroot Inc.*, PTAB Case No. IPR2023-00662, Exhibit 1017, Y. Ye, Hierarchical Associative Classifier (HAC) for Malware Detection from the Large and Imbalanced Gray List, Journal of Intelligent Information Systems, 35:1-20, 2010, 21 pgs.
*Trend Micro, Inc. v. Webroot Inc.*, PTAB Case No. IPR2023-00662, Exhibit 1018, Y. Elovici, A. Shabtai, R. Moskovitch, G. Tahan, and C. Glezer, Applying Machine Learning Techniques for Detection of Malicious Code in Network Traffic, 2007: Advances in Artificial Intelligence, pp. 44-50, 8 pgs.
*Trend Micro, Inc. v. Webroot Inc.*, PTAB Case No. IPR2023-00662, Exhibit 1019, Declaration of Ingrid Hsieh-Yee, Ph.D., 98 pgs.
*Trend Micro, Inc. v. Webroot Inc.*, PTAB Case No. IPR2023-00662, Patent Owner Open Text Inc.'s Mandatory Notices Pursuant to 37 CFR § 42.8(b), Mar. 24, 2023, 8 pgs.
*Trend Micro, Inc. v. Webroot Inc.*, PTAB Case No. IPR2023-00662, Notice of Filing Date Accorded to Petition and Time for Filing Patent Owner Preliminary Response, Apr. 17, 2023, 5 pgs.
*Sophos Ltd. and Sophos Inc. v. Webroot Inc.*, PTAB Case No. PGR2023-00031, Petition for Post-Grant Review of U.S. Pat. No. 11,409,869, May 8, 2023, 119 pgs.
*Sophos Ltd. and Sophos Inc. v. Webroot Inc.*, PTAB Case No. PGR2023-00031, Exhibit 1001: U.S. Pat. No. 11,409,869 ("the '869 Patent"), 16 pgs.
*Sophos Ltd. and Sophos Inc. v. Webroot Inc.*, PTAB Case No. PGR2023-00031, Exhibit 1002: File History for U.S. Pat. No. 11,409,869, 347 pgs.
*Sophos Ltd. and Sophos Inc. v. Webroot Inc.*, PTAB Case No. PGR2023-00031, Exhibit 1003: File History for U.S. Pat. No. 10,599,844, 456 pgs.
*Sophos Ltd. and Sophos Inc. v. Webroot Inc.*, PTAB Case No. PGR2023-00031, Exhibit 1004: Declaration of Dr. Gene Tsudik, 192 pgs.
*Sophos Ltd. and Sophos Inc. v. Webroot Inc.*, PTAB Case No. PGR2023-00031, Exhibit 1005: U.S. Appl. No. 2015/0213376 ("Ideses"), 19 pgs.
*Sophos Ltd. and Sophos Inc. v. Webroot Inc.*, PTAB Case No. PGR2023-00031, Exhibit 1006: Japanese Patent Appl. Pub. No. 2012027710A ("Mori") and Certified Translation Thereof, 27 pgs.
*Sophos Ltd. and Sophos Inc. v. Webroot Inc.*, PTAB Case No. PGR2023-00031, Exhibit 1007: Litigation Claim Construction Order (D.I. 236), 29 pgs.
*Sophos Ltd. and Sophos Inc. v. Webroot Inc.*, PTAB Case No. PGR2023-00031, Exhibit 1008: Litigation Opening Claim Construction Brief (D.I. 263), 69 pgs.
*Sophos Ltd. and Sophos Inc. v. Webroot Inc.*, PTAB Case No. PGR2023-00031, Exhibit 1009: Litigation Responsive Claim Construction Brief (D.I. 304), 70 pgs.
*Sophos Ltd. and Sophos Inc. v. Webroot Inc.*, PTAB Case No. PGR2023-00031, Exhibit 1010: Litigation Joint Stipulation Reserving Appellate Rights (D.I. 260), 9 pgs.
*Sophos Ltd. and Sophos Inc. v. Webroot Inc.*, PTAB Case No. PGR2023-00031, Exhibit 1011: Monnappa K A, Learning Malware Analysis (2018), 9 pgs.
*Sophos Ltd. and Sophos Inc. v. Webroot Inc.*, PTAB Case No. PGR2023-00031, Exhibit 1012: Michael Sikorski & Andrew Honig, Practical Malware Analysis (2012), 12 pgs.
*Sophos Ltd. and Sophos Inc. v. Webroot Inc.*, PTAB Case No. PGR2023-00031, Exhibit 1013: John C. Platt, Probabilistic Outputs for Support Vector Machines and Comparisons to Regularized Likelihood Methods, in Advances in Large Margin Classifiers (Alexander J. Smola et al., eds. 2000), 11 pgs.
*Sophos Ltd. and Sophos Inc. v. Webroot Inc.*, PTAB Case No. PGR2023-00031, Exhibit 1014: Wang et al., Detecting Unknown

(56) References Cited

OTHER PUBLICATIONS

Malicious Executables Using Portable Executable Headers, Fifth International Joint Conference on INC, IMS and IDC, 278-84 (2009), 7 pgs.

*Sophos Ltd. and Sophos Inc.* v. *Webroot Inc.*, PTAB Case No. PGR2023-00031, Exhibit 1015: Virus Bulletin (Nov. 1990), 24 pgs.

*Sophos Ltd. and Sophos Inc.* v. *Webroot Inc.*, PTAB Case No. PGR2023-00031, Exhibit 1016: U.S. Pat. No. 8,709,924, 17 pgs.

*Sophos Ltd. and Sophos Inc.* v. *Webroot Inc.*, PTAB Case No. PGR2023-00031, Exhibit 1017: U.S. Pat. No. 9,465,940, 14 pgs.

*Sophos Ltd. and Sophos Inc.* v. *Webroot Inc.*, PTAB Case No. PGR2023-00031, Exhibit 1018: D. Devi & S. Nandi, Detection of Packed Malware, in Proceedings of the First International Conference on Security of Internet of Things (SecurIT '12), Association for Computing Machinery, New York, NY, USA, 22-26 (2012), 1 pg.

*Sophos Ltd. and Sophos Inc.* v. *Webroot Inc.*, PTAB Case No. PGR2023-00031, Exhibit 1019: Excerpt from Transcript of Motions Hearing, *Webroot Inc et al.* v. *AO Kaspersky Lab et al.*, No. 6:22-cv-00243 (W.D. Tex. Dec. 9, 2022), 3 pgs.

*Sophos Ltd. and Sophos Inc.* v. *Webroot Inc.*, PTAB Case No. PGR2023-00031, Exhibit 1020: Shabtai et al., Detection of malicious code by applying machine learning classifiers on static features: A state-of-the-art survey, Information Security Technical Report, 16-29 (2009), 14 pgs.

*Sophos Ltd. and Sophos Inc.* v. *Webroot Inc.*, PTAB Case No. PGR2023-00031, Exhibit 1021: U.S. Appl. No. 2010/0293273, 14 pgs.

*Sophos Ltd. and Sophos Inc.* v. *Webroot Inc.*, PTAB Case No. PGR2023-00031, Exhibit 1022: U.S. Appl. No. 2010/0082642, 14 pgs.

*Sophos Ltd. and Sophos Inc.* v. *Webroot Inc.*, PTAB Case No. PGR2023-00031, Exhibit 1023: Defendant Sophos Ltd.'s Stipulation Regarding Invalidity Contentions for U.S. Pat. No. 11,409,869, 4 pgs.

Patent Owner Open Text Inc.'s Mandatory Notices Pursuant to 37 CFR § 42.8(b), *Sophos Ltd. and Sophos Inc.* v. *Webroot Inc.*, PTAB Case No. PGR2023-00031, May 30, 2023, 9 pgs.

Notice of Filing Date Accorded to Petition and Time for Filing Patent Owner Preliminary Response, *Sophos Ltd. and Sophos Inc.* v. *Webroot Inc.*, PTAB Case No. PGR2023-00031, Jun. 6, 2023, 6 pgs.

*Crowdstrike, Inc.* v. *Webroot Inc.*, PTAB Case No. IPR2023-00289, Petition for Inter Partes Review of U.S. Pat. No. 8,418,250, Dec. 29, 2022, 75 pgs.

*Crowdstrike, Inc.* v. *Webroot Inc.*, PTAB Case No. IPR2023-00289, Exhibit 1001: U.S. Pat. No. 8,418,250 to Morris et al. ("'250 Patent"), 17 pgs.

*Crowdstrike, Inc.* v. *Webroot Inc.*, PTAB Case No. IPR2023-00289, Exhibit 1002: File History of U.S. Pat. No. 8,418,250 ("'250 File History"), 888 pgs.

*Crowdstrike, Inc.* v. *Webroot Inc.*, PTAB Case No. IPR2023-00289, Exhibit 1003: Declaration of Dr. Wenke Lee ("Decl."), 171 pgs.

*Crowdstrike, Inc.* v. *Webroot Inc.*, PTAB Case No. IPR2023-00289, Exhibit 1004: U.S. Appl. No. 2005/0210035 A1 ("Kester"), 42 pgs.

*Crowdstrike, Inc.* v. *Webroot Inc.*, PTAB Case No. IPR2023-00289, Exhibit 1005: U.S. Pat. No. 7,225,343 ("Honig"), 22 pgs.

*Crowdstrike, Inc.* v. *Webroot Inc.*, PTAB Case No. IPR2023-00289, Exhibit 1006: U.S. Pat. No. 7,594,272 ("Kennedy"), 10 pgs.

*Crowdstrike, Inc.* v. *Webroot Inc.*, PTAB Case No. IPR2023-00289, Exhibit 1007: Plaintiff's Opposition Markman Brief, 22-cv-00243 WDTX,, No. 98, Nov. 18, 2022, 86 pgs.

*Crowdstrike, Inc.* v. *Webroot Inc.*, PTAB Case No. IPR2023-00289, Exhibit 1010: Defendants' Opening Markman Brief, 22-cv-00243 WDTX,, No. 86, Oct. 28, 2022, 84 pgs.

*Crowdstrike, Inc.* v. *Webroot Inc.*, PTAB Case No. IPR2023-00289, Exhibit 1011: Intrusion Detection with Unlabeled Data Using Clustering by Leonid Portnoy, et al. ("Portnoy"), 25 pgs.

*Crowdstrike, Inc.* v. *Webroot Inc.*, PTAB Case No. IPR2023-00289, Exhibit 1012: U.S. Pat. No. 6,944,772 ("Dozortsev"), 10 pgs.

*Crowdstrike, Inc.* v. *Webroot Inc.*, PTAB Case No. IPR2023-00289, Exhibit 1013: U.S. Pat. No. 6,772,363 ("Chess"), 14 pgs.

*Crowdstrike, Inc.* v. *Webroot Inc.*, PTAB Case No. IPR2023-00289, Exhibit 1014: WO 2002/033525 ("Shyne-Song Chuang"), 18 pgs.

*Crowdstrike, Inc.* v. *Webroot Inc.*, PTAB Case No. IPR2023-00289, Exhibit 1015: EP 1,549,012 ("Kristof De Spiegeleer"), 19 pgs.

*Crowdstrike, Inc.* v. *Webroot Inc.*, PTAB Case No. IPR2023-00289, Exhibit 1016: EP 1,280,040 ("Alexander James Hinchliffe"), 17 pgs.

*Crowdstrike, Inc.* v. *Webroot Inc.*, PTAB Case No. IPR2023-00289, Exhibit 1017: U.S. Appl. No. 2004/0153644 ("McCorkendale"), 15 pgs.

*Crowdstrike, Inc.* v. *Webroot Inc.*, PTAB Case No. IPR2023-00289, Exhibit 1018: U.S. Pat. No. 7,516,476 ("Kraemer"), 13 pgs.

*Crowdstrike, Inc.* v. *Webroot Inc.*, PTAB Case No. IPR2023-00289, Exhibit 1019: Harold S. Javitz et al., The NIDES Statistical Component: Description and Justification ("The NIDES Statistical Component: Description and Justification"), Mar. 7, 1994, 52 pgs.

*Crowdstrike, Inc.* v. *Webroot Inc.*, PTAB Case No. IPR2023-00289, Exhibit 1020: U.S. Pat. No. 7,448,084 ("Apap"), 17 pgs.

*Crowdstrike, Inc.* v. *Webroot Inc.*, PTAB Case No. IPR2023-00289, Exhibit 1021: Order Granting Third Amended Scheduling Order, 22-cv-00243, WDTX, No. 142 ("Third Amended Scheduling Order"), Dec. 27, 2022, 9 pgs.

*Crowdstrike, Inc.* v. *Webroot Inc.*, PTAB Case No. IPR2023-00289, Patent Owner's Preliminary Response, Dec. 29, 2022, 82 pgs.

*Crowdstrike, Inc.* v. *Webroot Inc.*, PTAB Case No. IPR2023-00289, Exhibit 2001: Declaration of Professor Nenad Medvidovic, Ph.D., 76 pgs.

*Crowdstrike, Inc.* v. *Webroot Inc.*, PTAB Case No. IPR2023-00289, Exhibit 2002: Curriculum Vitae of Professor Nenad Medvidovic, Ph.D., 71 pgs.

*Crowdstrike, Inc.* v. *Webroot Inc.*, PTAB Case No. IPR2023-00289, Exhibit 2003: *Webroot, Inc. and Open Text Inc.* v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.

*Crowdstrike, Inc.* v. *Webroot Inc.*, PTAB Case No. IPR2023-00289, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Crowdstrike, Inc.* v. *Webroot Inc.*, PTAB Case No. IPR2023-00289, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Crowdstrike, Inc.* v. *Webroot Inc.*, PTAB Case No. IPR2023-00289, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Crowdstrike, Inc.* v. *Webroot Inc.*, PTAB Case No. IPR2023-00289, Exhibit 2007: *Webroot, Inc. and Open Text Inc.* v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.

*Crowdstrike, Inc.* v. *Webroot Inc.*, PTAB Case No. IPR2023-00289, Exhibit 2008: Dani Kass, "Catching Up On Patent Litigation With Judge Albright" (Law360 Mar. 14, 2023) at https://www.law360.com/pulse/articles/1582438/print?sec-tion=pulse/courts, 3 pgs.

*Crowdstrike, Inc.* v. *Webroot Inc.*, PTAB Case No. IPR2023-00289, Exhibit 2009: *Webroot, Inc. and Open Text Inc.* v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.

*Crowdstrike, Inc.* v. *Webroot Inc.*, PTAB Case No. IPR2023-00289, Exhibit 2010: *Webroot, Inc. and Open Text Inc.* v. *Sophos Ltd.*, Case No. 6:22-cv-00240-ADA-DTG, Minute Entry for proceedings held before Judge Derek T. Gilliland, Notice of Electronic Filing, Dkt. 102, (W.D. Tex., Mar. 7, 2023), 3 pgs.

(56) References Cited

OTHER PUBLICATIONS

*Crowdstrike, Inc. v. Webroot Inc.*, PTAB Case No. IPR2023-00289, Exhibit 2011: *Webroot, Inc. and Open Text Inc. v. AO Kaspersky Lab et al.*, Case No. 6:22-cv-243-ADA-DTG, Scheduling Order, Dkt. 39 (W.D. Tex. Aug. 17, 2022), 7 pgs.
*Crowdstrike, Inc. v. Webroot Inc.*, PTAB Case No. IPR2023-00289, Exhibit 2012: *Webroot, Inc. and Open Text Inc. v. AO Kaspersky Lab et al.*, Case No. 6:22-cv-243-ADA-DTG, Claim Construction Order, Dkt. 236 (W.D. Tex. Mar. 16, 2023), 20 pgs.
*Crowdstrike, Inc. v. Webroot Inc.*, PTAB Case No. IPR2023-00289, Exhibit 2013: *Webroot, Inc. and Open Text Inc. v. Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 9 pgs.
*Crowdstrike, Inc. v. Webroot Inc.*, PTAB Case No. IPR2023-00289, Exhibit 2014: *Webroot, Inc. and Open Text Inc. v. Trend Micro, Inc.*, Case No. 6:22-cv-00239-ADA-DTG, Defendant's Preliminary Invalidity Contentions (W.D. Tex., Sep. 13, 2022) (excerpted), 27 pgs.
*Crowdstrike, Inc. v. Webroot Inc.*, PTAB Case No. IPR2023-00289, Exhibit 2015: Ex Parte James M. Brennan, et al., Appeal 2021-003606, U.S. Appl. No. 15/285,875, Decision On Appeal Statement of the Case (PTAB Jul. 26, 2022), 10 pgs.
*Crowdstrike, Inc. v. Webroot Inc.*, PTAB Case No. IPR2023-00289, Exhibit 2016: *Webroot, Inc. and Open Text Inc. v. CrowdStrike, Inc. and CrowdStrike Holdings, Inc.*, Case No. 6:22-cv-00241-ADA, Complaint for Patent Infringement, Dkt. 1 (W.D. Tex., Mar. 4, 2022), 141 pgs.
*Crowdstrike, Inc. v. Webroot Inc.*, PTAB Case No. IPR2023-00289, Exhibit 2017: *Webroot, Inc. and Open Text Inc. v. AO Kaspersky Lab et al.*, Case No. 6:22-cv-243-ADA-DTG, Plaintiffs' SurReply Claim Construction Brief, Dkt. 147 (W.D. Tex. Jan. 6, 2023) (excerpted), 21 pgs.
*Crowdstrike, Inc. v. Webroot Inc.*, PTAB Case No. IPR2023-00289, Patent Owner Open Text Inc.'s Mandatory Notices Pursuant to 37 CFR § 42.8(b), Jan. 19, 2023, 5 pgs.
*Crowdstrike, Inc. v. Webroot Inc.*, PTAB Case No. IPR2023-00289, Patent Owner Open Text Inc.'s Notice of Filing Date Accorded to Petition and Time for Filing Patent Owner Preliminary Response, Jan. 26, 2023, 6 pgs.
*Trend Micro, Inc. v. Webroot Inc.*, PTAB Case No. IPR2023-00655, Petition for Inter Partes Review of U.S. Pat. No. 8,418,250, Mar. 2, 2023, 90 pgs.
*Trend Micro, Inc. v. Webroot Inc.*, PTAB Case No. IPR2023-00655, Exhibit 1001: U.S. Pat. No. 8,418,250 (Morris), 17 pgs.
*Trend Micro, Inc. v. Webroot Inc.*, PTAB Case No. IPR2023-00655, Exhibit 1002: Expert Declaration of Dr. Seth Nielson, 156 pgs.
*Trend Micro, Inc. v. Webroot Inc.*, PTAB Case No. IPR2023-00655, Exhibit 1003: U.S. Appl. No. 2004/0111632 (Halperin), 22 pgs.
*Trend Micro, Inc. v. Webroot Inc.*, PTAB Case No. IPR2023-00655, Exhibit 1004: U.S. Pat. No. 7,900,194 (Mankins), 12 pgs.
*Trend Micro, Inc. v. Webroot Inc.*, PTAB Case No. IPR2023-00655, Exhibit 1005: Inoue, et al., "Anomaly Intrusion Detection in Dynamic Execution Environments", New Security Paradigms Workshop '02, Sep. 23-26, 2002, 32 pgs.
*Trend Micro, Inc. v. Webroot Inc.*, PTAB Case No. IPR2023-00655, Exhibit 1006: U.S. Pat. No. 7,694,150 (Kirby), 22 pgs.
*Trend Micro, Inc. v. Webroot Inc.*, PTAB Case No. IPR2023-00655, Exhibit 1007: Prosecution History of the '250 patent, 888 pgs.
*Trend Micro, Inc. v. Webroot Inc.*, PTAB Case No. IPR2023-00655, Exhibit 1008: U.S. Pat. No. 5,440,723 (Arnold), 29 pgs.
*Trend Micro, Inc. v. Webroot Inc.*, PTAB Case No. IPR2023-00655, Exhibit 1009: Fred Cohen, "Computer Viruses Theory and Experiments", 1984, 15 pgs.
*Trend Micro, Inc. v. Webroot Inc.*, PTAB Case No. IPR2023-00655, Exhibit 1010: Joseph A. Bank, "Java Security", Dec. 8, 1995, 11 pgs.
*Trend Micro, Inc. v. Webroot Inc.*, PTAB Case No. IPR2023-00655, Exhibit 1011: Curriculum Vitae of A.L. Seth Nielson, Ph.D., 15 pgs.
*Trend Micro, Inc. v. Webroot Inc.*, PTAB Case No. IPR2023-00655, Exhibit 1012: U.S. Pat. Appl. 2003/0177394 (Dozortsev), 11 pgs.
*Trend Micro, Inc. v. Webroot Inc.*, PTAB Case No. IPR2023-00655, Exhibit 1013: U.S. Appl. No. 2004/0068652 (Carpentier et al.), 19 pgs.
*Trend Micro, Inc. v. Webroot Inc.*, PTAB Case No. IPR2023-00655, Patent Owner Open Text Inc.'s Mandatory Notices Pursuant to 37 CFR § 42.8(b), Mar. 23, 2023, 7 pgs.
*Trend Micro, Inc. v. Webroot Inc.*, PTAB Case No. IPR2023-00655, Notice of Filing Date Accorded to Petition and Time for Filing Patent Owner Preliminary Response, Apr. 17, 2023, 5 pgs.
*Sophos Ltd. and Sophos Inc. v. Webroot Inc.*, PTAB Case No. IPR2023-00699, Petition for Inter Partes Review of U.S. Pat. No. 8,418,250, Mar. 8, 2023, 83 pgs.
*Sophos Ltd. and Sophos Inc. v. Webroot Inc.*, PTAB Case No. IPR2023-00699, Exhibit 1001: U.S. Pat. No. 8,418,250, 17 pgs.
*Sophos Ltd. and Sophos Inc. v. Webroot Inc.*, PTAB Case No. IPR2023-00699, Exhibit 1002: File History for U.S. Pat. No. 8,418,250, 888 pgs.
*Sophos Ltd. and Sophos Inc. v. Webroot Inc.*, PTAB Case No. IPR2023-00699, Exhibit 1003: Complaint, *Webroot Inc et al. v. Sophos Ltd.*, No. 6:22-cv-240 (W.D. Tex.), 144 pgs.
*Sophos Ltd. and Sophos Inc. v. Webroot Inc.*, PTAB Case No. IPR2023-00699, Exhibit 1004: Declaration of Dr. Richard Newman, 85 pgs.
*Sophos Ltd. and Sophos Inc. v. Webroot Inc.*, PTAB Case No. IPR2023-00699, Exhibit 1005: Curriculum Vitae of Dr. Richard Newman, 13 pgs.
*Sophos Ltd. and Sophos Inc. v. Webroot Inc.*, PTAB Case No. IPR2023-00699, Exhibit 1006: U.S. Appl. No. 2004/0111632 ("Halperin"), 22 pgs.
*Sophos Ltd. and Sophos Inc. v. Webroot Inc.*, PTAB Case No. IPR2023-00699, Exhibit 1007: U.S. Pat. No. 7,694,150 ("Kirby"), 22 pgs.
*Sophos Ltd. and Sophos Inc. v. Webroot Inc.*, PTAB Case No. IPR2023-00699, Exhibit 1008: U.S. Pat. No. 7,900,194 ("Mankins"), 12 pgs.
*Sophos Ltd. and Sophos Inc. v. Webroot Inc.*, PTAB Case No. IPR2023-00699, Exhibit 1009: Stipulation Waiving IPR Claims in District Court Litigation, 4 pgs.
*Sophos Ltd. and Sophos Inc. v. Webroot Inc.*, PTAB Case No. IPR2023-00699, Exhibit 1010: S. Forrest et al., *Computer Immunology*, Comms. Of the ACM, vol. 40, No. 10, 88-96 (1997).
*Sophos Ltd. and Sophos Inc. v. Webroot Inc.*, PTAB Case No. IPR2023-00699, Exhibit 1011: A Snoeren et al., *Single-Packet IP Traceback*, IEEE/ACM Trans. On Networking (TON), vol. 10, No. 6, 721-34 (2002).
*Sophos Ltd. and Sophos Inc. v. Webroot Inc.*, PTAB Case No. IPR2023-00699, Exhibit 1012: S. Hofmeyr, *Intrusion Detection Using Sequences of System Calls*, J. Computer Security, vol. 6, Issue 3, 151-180 (Aug. 1998).
*Sophos Ltd. and Sophos Inc. v. Webroot Inc.*, PTAB Case No. IPR2023-00699, Exhibit 1013: S. Forrest et al., *A Sense of Self for Unix Processes*, Proc. 1996, IEEE Symp. on Security and Privacy, 120-28 (1996).
*Sophos Ltd. and Sophos Inc. v. Webroot Inc.*, PTAB Case No. IPR2023-00699, Exhibit 1014: Order Granting Fourth Amended Scheduling Order, Dkt. 160, *Webroot, Inc et al. v. AO Kaspersky Lab*, No. 6:22-cv-00243-ADA-DTG (W.D. Tex.), Jan. 22, 2023, 7 pgs.
*Sophos Ltd. and Sophos Inc. v. Webroot Inc.*, PTAB Case No. IPR2023-00699, Exhibit 1015: Excerpt from Transcript of Motions Hearing in *Webroot, Inc et al. v. AO Kaspersky Lab*, No. 6:22-cv-00243-ADA-DTG (W.D. Tex.), Dec. 9, 2022, 7 pgs.
*Sophos Ltd. and Sophos Inc. v. Webroot Inc.*, PTAB Case No. IPR2023-00699, Exhibit 1016: Threat Graphs examples: Malware detection, Sophos Ltd., KB- 000036359, https://support.sophos.com/support/s/article/KB-000036359?language=en_US (Feb. 23, 2023), 15 pgs.
*Sophos Ltd. and Sophos Inc. v. Webroot Inc.*, PTAB Case No. IPR2023-00699, Patent Owner Open Text Inc.'s Mandatory Notices Pursuant to 37 CFR § 42.8(b), Mar. 29, 2023, 8 pgs.

(56) References Cited

OTHER PUBLICATIONS

*Sophos Ltd. and Sophos Inc.* v. *Webroot Inc.*, PTAB Case No. IPR2023-00699, Notice of Filing Date Accorded to Petition and Time for Filing Patent Owner Preliminary Response, Apr. 14, 2023, 6 pgs.
*Crowdstrike, Inc.* v. *Webroot Inc.*, PTAB Case No. IPR2023-00556, Petition for Inter Partes Review of U.S. Pat. No. 8,726,389, Feb. 17, 2023, 74 pgs.
*Crowdstrike, Inc.* v. *Webroot Inc.*, PTAB Case No. IPR2023-00556, Exhibit 1001: U.S. Pat. No. 8,726,389 (Morris) ("'389 Patent"), 17 pgs.
*Crowdstrike, Inc.* v. *Webroot Inc.*, PTAB Case No. IPR2023-00556, Exhibit 1002: File History of U.S. Pat. No. 8,726,389 ("'389 File History") 276 pgs.
*Crowdstrike, Inc.* v. *Webroot Inc.*, PTAB Case No. IPR2023-00556, Exhibit 1003: Declaration of Dr. Wenke Lee ("Decl."), 164 pgs.
*Crowdstrike, Inc.* v. *Webroot Inc.*, PTAB Case No. IPR2023-00556, Exhibit 1004: U.S. Appl. No. 2005/0210035 A1 ("Kester"), 42 pgs.
*Crowdstrike, Inc.* v. *Webroot Inc.*, PTAB Case No. IPR2023-00556, Exhibit 1005: U.S. Pat. No. 7,594,272 ("Kennedy"), 10 pgs.
*Crowdstrike, Inc.* v. *Webroot Inc.*, PTAB Case No. IPR2023-00556, Exhibit 1006: U.S. Pat. No. 7,225,343 ("Honig"), 22 pgs.
*Crowdstrike, Inc.* v. *Webroot Inc.*, PTAB Case No. IPR2023-00556, Exhibit 1007: PO Opposition Markman Brief, 22-cv-00243 WDTX, No. 98, Nov. 18, 2022, 86 pgs.
*Crowdstrike, Inc.* v. *Webroot Inc.*, PTAB Case No. IPR2023-00556, Exhibit 1008: Defendants' Opening Markman Brief, 22-cv-00243 WDTX, No. 86, Oct. 28, 2022, 84 pgs.
*Crowdstrike, Inc.* v. *Webroot Inc.*, PTAB Case No. IPR2023-00556, Exhibit 1009: Order Granting Fourth Amended Scheduling Order, 22-cv-00243, WDTX, No. 160 ("Fourth Amended Scheduling Order"), Jan. 22, 2023, 7 pgs.
*Crowdstrike, Inc.* v. *Webroot Inc.*, PTAB Case No. IPR2023-00556, Exhibit 1010: SANS Institute (2000-2005) Host- vs. Network-Based Intrusion Detection Systems, 11 pgs.
*Crowdstrike, Inc.* v. *Webroot Inc.*, PTAB Case No. IPR2023-00556, Exhibit 1011: Intrusion Detection with Unlabeled Data Using Clustering by Leonid Portnoy, et al. ("Portnoy"), 25 pgs.
*Crowdstrike, Inc.* v. *Webroot Inc.*, PTAB Case No. IPR2023-00556, Exhibit 1012: U.S. Pat. No. 6,944,772 ("Dozortsev"), 10 pgs.
*Crowdstrike, Inc.* v. *Webroot Inc.*, PTAB Case No. IPR2023-00556, Exhibit 1013: U.S. Pat. No. 6,772,346 ("Chess"), 14 pgs.
*Crowdstrike, Inc.* v. *Webroot Inc.*, PTAB Case No. IPR2023-00556, Exhibit 1014: WO 2002/033525 ("Chuang"), 18 pgs.
*Crowdstrike, Inc.* v. *Webroot Inc.*, PTAB Case No. IPR2023-00556, Exhibit 1015: EP 1,549,012 ("De Spiegeleer"), 19 pgs.
*Crowdstrike, Inc.* v. *Webroot Inc.*, PTAB Case No. IPR2023-00556, Exhibit 1016: EP 1,280,040 ("Hinchliffe"), 17 pgs.
*Crowdstrike, Inc.* v. *Webroot Inc.*, PTAB Case No. IPR2023-00556, Exhibit 1017: U.S. Pat. No. 7,089,428 ("Farley"), 35 pgs.
*Crowdstrike, Inc.* v. *Webroot Inc.*, PTAB Case No. IPR2023-00556, Exhibit 1018: U.S. Appl. No. 2004/0153644 ("McCorkendale"), 15 pgs.
*Crowdstrike, Inc.* v. *Webroot Inc.*, PTAB Case No. IPR2023-00556, Exhibit 1019: The NIDES Statistical Component: Description and Justification by Harold S. Javitz et al., Mar. 7, 1994, 52 pgs.
*Crowdstrike, Inc.* v. *Webroot Inc.*, PTAB Case No. IPR2023-00556, Exhibit 1020: U.S. Pat. No. 7,516,476 ("Kraemer"), 13 pgs.
*Crowdstrike, Inc.* v. *Webroot Inc.*, PTAB Case No. IPR2023-00556, Exhibit 1021: U.S. Pat. No. 8,418,250 (Morris) ("'250 Patent"), 17 pgs.
*Crowdstrike, Inc.* v. *Webroot Inc.*, PTAB Case No. IPR2023-00556, Exhibit 1022: U.S. Pat. No. 10,284,591 (Giuliani) ('591 Patent), 14 pgs.
*Crowdstrike, Inc.* v. *Webroot Inc.*, PTAB Case No. IPR2023-00556, Patent Owner Open Text Inc.'s Mandatory Notices Pursuant to 37 CFR § 42.8(b), Mar. 10, 2023, 8 pgs.
*Crowdstrike, Inc.* v. *Webroot Inc.*, PTAB Case No. IPR2023-00556, Notice of Filing Date Accorded to Petition and Time for Filing Patent Owner Preliminary Response, Mar. 16, 2023, 5 pgs.

*Sophos Ltd. and Sophos Inc.* v. *Webroot Inc.*, PTAB Case No. IPR2023-00633, Petition for Inter Partes Review of U.S. Pat. No. 8,726,389, Mar. 3, 2023, 85 pgs.
*Sophos Ltd. and Sophos Inc.* v. *Webroot Inc.*, PTAB Case No. IPR2023-00633, Exhibit 1001: U.S. Pat. No. 8,726,389, 17 pgs.
*Sophos Ltd. and Sophos Inc.* v. *Webroot Inc.*, PTAB Case No. IPR2023-00633, Exhibit 1002: File History for U.S. Pat. No. 8,726,389, 275 pgs.
*Sophos Ltd. and Sophos Inc.* v. *Webroot Inc.*, PTAB Case No. IPR2023-00633, Exhibit 1003: Complaint, *Webroot Inc. et al.* v. *Sophos Ltd.*, No. 6:22-cv-240 (W.D. Tex), 144 pgs.
*Sophos Ltd. and Sophos Inc.* v. *Webroot Inc.*, PTAB Case No. IPR2023-00633, Exhibit 1004: Declaration of Dr. Richard Newman, 91 pgs.
*Sophos Ltd. and Sophos Inc.* v. *Webroot Inc.*, PTAB Case No. IPR2023-00633, Exhibit 1005: Curriculum Vitae of Dr. Richard Newman, 13 pgs.
*Sophos Ltd. and Sophos Inc.* v. *Webroot Inc.*, PTAB Case No. IPR2023-00633, Exhibit 1006: U.S. Appl. No. 2004/0111632 ("Halperin"), 22 pgs.
*Sophos Ltd. and Sophos Inc.* v. *Webroot Inc.*, PTAB Case No. IPR2023-00633, Exhibit 1007: U.S. Pat. No. 7,694,150 ("Kirby"), 22 pgs.
*Sophos Ltd. and Sophos Inc.* v. *Webroot Inc.*, PTAB Case No. IPR2023-00633, Exhibit 1008: U.S. Pat. No. 7,900,194 ("Mankins"), 12 pgs.
*Sophos Ltd. and Sophos Inc.* v. *Webroot Inc.*, PTAB Case No. IPR2023-00633, Exhibit 1009: Stipulation Waiving IPR claims in District Court Litigation, 4 pgs.
*Sophos Ltd. and Sophos Inc.* v. *Webroot Inc.*, PTAB Case No. IPR2023-00633, Exhibit 1010: Sophos Central Admin, Threat Graph Analysis, Sophos Ltd., at https://docs.sophos.com/centra/customer/help/en-us/ManageYourProducts/ThreatAnalysisCenter/ThreatGraphs/index.html (last visited Feb. 15, 2023), 1 pg.
*Sophos Ltd. and Sophos Inc.* v. *Webroot Inc.*, PTAB Case No. IPR2023-00633, Exhibit 1011: Sophos Central Admin, Threat Graph Analysis, Sophos Ltd., at https://docs.sophos.com/centra/customer/help/en-us/ManageYourProducts/ThreatAnalysisCenter/ThreatGraphs/ThreatAnalysisDetails/index.html (last visited Feb. 15, 2023), 5 pgs.
*Sophos Ltd. and Sophos Inc.* v. *Webroot Inc.*, PTAB Case No. IPR2023-00633, Exhibit 1012: Excerpt from Transcript of Motions Hearing in *Webroot, Inc et al.* v. *AO Kaspersky Lab*, No. 6:22-cv-00243-ADA-DTG (W.D. Tex.), Dec. 9, 2022, 7 pgs.
*Sophos Ltd. and Sophos Inc.* v. *Webroot Inc.*, PTAB Case No. IPR2023-00633, Exhibit 1013: Order Granting Fourth Amended Scheduling Order, Dkt. 160, *Webroot, Inc et al.* v. *AO Kaspersky Lab*, No. 6:22-cv-00243-ADA-DTG (W.D. Tex.), Jan. 22, 2023, 7 pgs.
*Sophos Ltd. and Sophos Inc.* v. *Webroot Inc.*, PTAB Case No. IPR2023-00633, Patent Owner Open Text Inc.'s Mandatory Notices Pursuant to 37 CFR § 42.8(b), Mar. 24, 2023, 8 pgs.
*Sophos Ltd. and Sophos Inc.* v. *Webroot Inc.*, PTAB Case No. IPR2023-00633, Notice of Filing Date Accorded to Petition and Time for Filing Patent Owner Preliminary Response, Mar. 16, 2023, 5 pgs.
*Sophos Ltd. and Sophos Inc.* v. *Webroot Inc.*, PTAB Case No. IPR2023-00491, Petition for Inter Partes Review of U.S. Pat. No. 9,413,721, Jan. 20, 2023, 81 pgs.
*Sophos Ltd. and Sophos Inc.* v. *Webroot Inc.*, PTAB Case No. IPR2023-00491, Exhibit 1001: U.S. Pat. No. 9,413,721 ('721 Patent), 30 pgs.
*Sophos Ltd. and Sophos Inc.* v. *Webroot Inc.*, PTAB Case No. IPR2023-00491, Exhibit 1002: File History of the '721 Patent, 683 pgs.
*Sophos Ltd. and Sophos Inc.* v. *Webroot Inc.*, PTAB Case No. IPR2023-00491, Exhibit 1003: Declaration of Dr. Richard Newman, 82 pgs.
*Sophos Ltd. and Sophos Inc.* v. *Webroot Inc.*, PTAB Case No. IPR2023-00491, Exhibit 1004: Curriculum Vitae of Dr. Richard Newman, 13 pgs.

(56) References Cited

OTHER PUBLICATIONS

*Sophos Ltd. and Sophos Inc. v. Webroot Inc.*, PTAB Case No. IPR2023-00491, Exhibit 1005: U.S. Appl. No. 2006/0075504 ("Liu"), 19 pgs.
*Sophos Ltd. and Sophos Inc. v. Webroot Inc.*, PTAB Case No. IPR2023-00491, Exhibit 1006: U.S. Appl. No. 2008/0086773 ("Tuvell"), 21 pgs.
*Sophos Ltd. and Sophos Inc. v. Webroot Inc.*, PTAB Case No. IPR2023-00491, Exhibit 1007: U.S. Appl. No. 2005/0223001 ("Kester"), 27 pgs.
*Sophos Ltd. and Sophos Inc. v. Webroot Inc.*, PTAB Case No. IPR2023-00491, Exhibit 1008: U.S. Pat. No. 7,392,543 ("Szor"), 18 pgs.
*Sophos Ltd. and Sophos Inc. v. Webroot Inc.*, PTAB Case No. IPR2023-00491, Exhibit 1009: U.S. Appl. No. 2007/0016953 ("Morris") ("'953 Publication"), 18 pgs.
*Sophos Ltd. and Sophos Inc. v. Webroot Inc.*, PTAB Case No. IPR2023-00491, Exhibit 1010: U.S. Pat. No. 7,966,650 ("Manring"), 21 pgs.
*Sophos Ltd. and Sophos Inc. v. Webroot Inc.*, PTAB Case No. IPR2023-00491, Exhibit 1011: Stipulation Waiving IPR Claims in District Court Litigation, 4 pgs.
*Sophos Ltd. and Sophos Inc. v. Webroot Inc.*, PTAB Case No. IPR2023-00491, Exhibit 1012: Excerpt from Transcript of Motions Hearing in *Webroot, Inc et al. v. AO Kaspersky Lab*, No. 6:22-cv-00243-ADA-DTG (W.D. Tex.), Dec. 9, 2022, 7 pgs.
*Sophos Ltd. and Sophos Inc. v. Webroot Inc.*, PTAB Case No. IPR2023-00491, Exhibit 1013: Excerpt from Henry F. Korth and Abraham Silberschatz, Database System Concepts, McGraw-Hill, New York, 2006, 72 pgs.
*Sophos Ltd. and Sophos Inc. v. Webroot Inc.*, PTAB Case No. IPR2023-00491, Exhibit 1014: K.J. Biba, "Integrity Considerations for Secure Computer Systems," MTR-3153, The MITRE Corporation, Apr. 1977, 68 pgs.
*Sophos Ltd. and Sophos Inc. v. Webroot Inc.*, PTAB Case No. IPR2023-00491, Exhibit 1015: David E. Bell and Leonard J. LaPadula, "Secure Computer Systems: Mathematical Foundations," MTR-2547, The MITRE Corporation, Nov. 1996, 33 pgs.
*Sophos Ltd. and Sophos Inc. v. Webroot Inc.*, PTAB Case No. IPR2023-00491, Patent Owner Open Text Inc.'s Mandatory Notices Pursuant to 37 CFR § 42.8(b), Feb. 10, 2023, 6 pgs.
*Sophos Ltd. and Sophos Inc. v. Webroot Inc.*, PTAB Case No. IPR2023-00491, Notice of Filing Date Accorded to Petition and Time for Filing Patent Owner Preliminary Response, Feb. 16, 2023, 6 pgs.
Patent Owner's Preliminary Response to Petition for Inter Partes Review, *Sophos Ltd. and Sophos Inc. v. Webroot Inc.*, PTAB Case No. IPR2023-00491, May 16, 2023, 73 pgs.
Exhibit 2001: Declaration of Professor Alessandro Orso, Ph. D., *Sophos Ltd. and Sophos Inc. v. Webroot Inc.*, PTAB Case No. IPR2023-00491, 56 pgs.
Exhibit 2002: Curriculum Vitae of Professor Alessandro Orso, Ph. D., *Sophos Ltd. and Sophos Inc. v. Webroot Inc.*, PTAB Case No. IPR2023-00491, 52 pgs.
Exhibit 2003: *Webroot, Inc., and Open Text Inc., v. CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), *Sophos Ltd. and Sophos Inc. v. Webroot Inc.*, PTAB Case No. IPR2023-00491, 37 pgs.
Exhibit 2004: *Sonrai Memory Ltd. v. Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), *Sophos Ltd. and Sophos Inc. v. Webroot Inc.*, PTAB Case No. IPR2023-00491, 7 pgs.
Exhibit 2005: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), *Sophos Ltd. and Sophos Inc. v. Webroot Inc.*, PTAB Case No. IPR2023-00491, 7 pgs.

Exhibit 2006: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), *Sophos Ltd. and Sophos Inc. v. Webroot Inc.*, PTAB Case No. IPR2023-00491, 8 pgs.
Exhibit 2007: *Webroot, Inc. and Open Text Inc., v. AO Kaspersky Lab et al.*, Case No. 6:22-cv-243-ADA-DTG, Claim Construction Order, Dkt. 236 (W.D. Tex. Mar. 16, 2023), *Sophos Ltd. and Sophos Inc. v. Webroot Inc.*, PTAB Case No. IPR2023-00491, 20 pgs.
Exhibit 2008: *Webroot, Inc. and Open Text Inc., v. AO Kaspersky Lab et al.*, Case No. 6:22-cv-00243-ADA-DTG, Scheduling Order, Dkt. 50 (W.D. Tex., Sep. 28, 2022), *Sophos Ltd. and Sophos Inc. v. Webroot Inc.*, PTAB Case No. IPR2023-00491, 18 pgs.
Exhibit 2009: *Open Text Inc et al., v. AO Kaspersky Lab*, Case No. 6:22-cv-00243-ADA-DTG, First Amended Complaint for Patent Infringement, Dkt. 80 (W.D. Tex., Oct. 27, 2022), *Sophos Ltd. and Sophos Inc. v. Webroot Inc.*, PTAB Case No. IPR2023-00491, 148 pgs.
Exhibit 2010: *Webroot, Inc. and Open Text Inc., v. Sophos, Ltd.*, Case No. 6:22-cv-00240-ADA-DTG, Second Amended Complaint for Patent Infringement, Dkt. 76 (W.D. Tex., Oct. 24, 2022), *Sophos Ltd. and Sophos Inc. v. Webroot Inc.*, PTAB Case No. IPR2023-00491, 184 pgs.
Exhibit 2011: Law360, "Catching Up on Patent Litigation with Judge Albright", *Sophos Ltd. and Sophos Inc. v. Webroot Inc.*, PTAB Case No. IPR2023-00491, 3 pgs.
Exhibit 2012: Jun. 30, 2022 U.S. Courts Statistics & Reports Comparison Report, *Sophos Ltd. and Sophos Inc. v. Webroot Inc.*, PTAB Case No. IPR2023-00491, 11 pgs.
Exhibit 2013: *Webroot, Inc. and Open Text Inc., v. ForcePoint LLC*, Case No. 6:22-cv-00342-ADA-DTG, Defendant ForcePoint LLC's Preliminary Invalidity Contentions (W.D. Tex., Sep. 13, 2022), *Sophos Ltd. and Sophos Inc. v. Webroot Inc.*, PTAB Case No. IPR2023-00491, 149 pgs.
Exhibit 2014: U.S. Appl. No. 15/285,875, Appeal No. 2021-003606, Decision on Appeal at 7-8 (PTAB Jul. 26, 2022), *Sophos Ltd. and Sophos Inc. v. Webroot Inc.*, PTAB Case No. IPR2023-00491, 10 pgs.
Notice of Allowance for U.S. Appl. No. 17/944,317, mailed Jul. 10, 2023, 13 pages.
Defendant Forcepoint LLC's Preliminary Invalidity Contentions, *Webroot, Inc. and Open Text, Inc. v. Forcepoint LLC*, No. 6:22-CV-00342-ADA-DTG (Wd, Texas), Sep. 13, 2022, 149 pgs.
Defendant Sophos Ltd.'s Preliminary Invalidity Contentions, *Webroot, Inc. and Open Text, Inc.. v. Sophos Ltd.*, CA. No. 6:22-CV-00240-ADA-DTG, W.D. Tex., Sep. 13, 2022, 127 pgs.
Defendant's Preliminary Invalidity Contentions, *Webroot Inc. and Open Text, Inc.. v. Trend Micro Inc.*, CA. No. 6:22-CV-00239-ADA-DTG, W.D. Tex., Sep. 13, 2022, 125 pgs.
Defendant AO Kaspersky Lab.'s Preliminary Invalidity Contentions, *Webroot Inc. and Open Text, Inc. v. AO Kaspersky Lab*, CA. No. 6:22-CV-00243-ADA-DTG, W.D. Tex., Sep. 14, 2022, 23 pgs.
Crowdstrike's Preliminary Invalidity Contentions, *Webroot, Inc. and Open Text, Inc. v. Crowdstrike, Inc.*, No. 6:22-CV-00241-ADA-DTG (Wd, Texas), Sep. 13, 2022, 62 pgs.
Crowdstrike's Preliminary Invalidity Contentions (Patents Asserted by Amendment), *Webroot, Inc. and Open Text, Inc. v. Crowdstrike, Inc.*, No. 6:22 CV-00241-ADA-DTG (WD, Texas), Feb. 21, 2023, 86 pgs.
Crowdstrike's First Supplemental Preliminary Invalidity Contentions, *Webroot, Inc. and Open Text, Inc. v. Crowdstrike, Inc.*, No. 6:22 CV-00241-ADA-DTG (WD, Texas), Apr. 25, 2023, 85 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, 205 pgs.
Defendant AO Kaspersky Lab's Preliminary Invalidity Contentions—Appendix A, Prior Art Index, *Webroot, Inc. and Open Text, Inc. v. AO Kaspersky Lab*, No. 6:22-CV-00243 (WD, Texas), Sep. 14, 2022, 8 pgs.

(56) References Cited

OTHER PUBLICATIONS

Defendant AO Kaspersky Lab's Preliminary Invalidity Contentions—Appendix B, Invalidity Claim Chart Index, *Webroot, Inc. and Open Text, Inc.* v. *AO Kaspersky Lab*, No. 6:22-CV-00243 (WD, Texas), Sep. 14, 2022, 1 pg.

Defendant AO Kaspersky Lab's Preliminary Invalidity Contentions, *Webroot, Inc. and Open Text, Inc.* v. *AO Kaspersky Lab*, No. 6:22-CV-00243 (WD, Texas), Feb. 21, 2023, 23 pgs.

Defendant AO Kaspersky Lab's Preliminary Invalidity Contentions—Appendix C, Prior Art Index, *Webroot, Inc. and Open Text, Inc.* v. *AO Kaspersky Lab*, No. 6:22-CV-00243 (WD, Texas), Feb. 21, 2023, 4 pgs.

Defendant AO Kaspersky Lab's Preliminary Invalidity Contentions—Appendix D, Invalidity Claim Chart Index, *Webroot, Inc. and Open Text, Inc.* v. *AO Kaspersky Lab*, No. 6:22-CV-00243 (WD, Texas), Feb. 21, 2023, 1 pg.

Defendant Sophos Ltd.'s Preliminary Invalidity Contentions for Patent Plaintiffs Added by Amendment, *Webroot, Inc. and Open Text, Inc.* v. *Sophos Ltd.*, No. 6:22-CV-00240-ADA-DTG (WD, Texas), Feb. 21, 2023, 167 pgs.

Defendant's Preliminary Invalidity Contentions, *Webroot, Inc. and Open Text, Inc.* v. *Trend Micro Inc.*, No. 6:22-CV-239-ADA-DTG, Feb. 21, 2023, 94 pgs.

Defendant Crowdstrike Holdings, Inc.'s Preliminary Invalidity Contentions, Exhibit 045-A-1, *Webroot, Inc. and Open Text, Inc.* v. *Crowdstrike Holdings, Inc.*, No. 6:22-CV-00241-ADA-DTG (WD, Texas), Sep. 13, 2022, 35 pgs.

Defendant Crowdstrike Holdings, Inc.'s Preliminary Invalidity Contentions, Exhibit 045-A-2, *Webroot, Inc. and Open Text, Inc.* v. *Crowdstrike Holdings, Inc.*, No. 6:22-CV-00241-ADA-DTG (WD, Texas), Sep. 13, 2022, 36 pgs.

Defendant Crowdstrike Holdings, Inc.'s Preliminary Invalidity Contentions, Exhibit 045-A-3, *Webroot, Inc. and Open Text, Inc.* v. *Crowdstrike Holdings, Inc.*, No. 6:22-CV-00241-ADA-DTG (WD, Texas), Sep. 13, 2022, 52 pgs.

Defendant Crowdstrike Holdings, Inc.'s Preliminary Invalidity Contentions, Exhibit 045-A-4, *Webroot, Inc. and Open Text, Inc.* v. *Crowdstrike Holdings, Inc.*, No. 6:22-CV-00241-ADA-DTG (WD, Texas), Sep. 13, 2022, 34 pgs.

Defendant Crowdstrike Holdings, Inc.'s Preliminary Invalidity Contentions, Exhibit 045-A-5, *Webroot, Inc. and Open Text, Inc.* v. *Crowdstrike Holdings, Inc.*, No. 6:22-CV-00241-ADA-DTG (WD, Texas), Sep. 13, 2022, 33 pgs.

Defendant Crowdstrike Holdings, Inc.'s Preliminary Invalidity Contentions, Exhibit 045-A-6, *Webroot, Inc. and Open Text, Inc.* v. *Crowdstrike Holdings, Inc.*, No. 6:22-CV-00241-ADA-DTG (WD, Texas), Sep. 13, 2022, 15 pgs.

Defendant Crowdstrike Holdings, Inc.'s Preliminary Invalidity Contentions, Exhibit 045-A-7, *Webroot, Inc. and Open Text, Inc.* v. *Crowdstrike Holdings, Inc.*, No. 6:22-CV-00241-ADA-DTG (WD, Texas), Sep. 13, 2022, 16 pgs.

Defendant Crowdstrike Holdings, Inc.'s Preliminary Invalidity Contentions, Exhibit 045-A-8, *Webroot, Inc. and Open Text, Inc.* v. *Crowdstrike Holdings, Inc.*, No. 6:22-CV-00241-ADA-DTG (WD, Texas), Sep. 13, 2022, 69 pgs.

Defendant Crowdstrike Holdings, Inc.'s Preliminary Invalidity Contentions, Exhibit 045-A-9, *Webroot, Inc. and Open Text, Inc.* v. *Crowdstrike Holdings, Inc.*, No. 6:22-CV-00241-ADA-DTG (WD, Texas), Sep. 13, 2022, 21 pgs.

Defendant Crowdstrike Holdings, Inc.'s Preliminary Invalidity Contentions, Exhibit 045-A-10, *Webroot, Inc. and Open Text, Inc.* v. *Crowdstrike Holdings, Inc.*, No. 6:22-CV-00241-ADA-DTG (WD, Texas), Sep. 13, 2022, 21 pgs.

Defendant Crowdstrike Holdings, Inc.'s Preliminary Invalidity Contentions, Exhibit 045-A-11, *Webroot, Inc. and Open Text, Inc.* v. *Crowdstrike Holdings, Inc.*, No. 6:22-CV-00241-ADA-DTG (WD, Texas), Sep. 13, 2022, 38 pgs.

Defendant Crowdstrike Holdings, Inc.'s Preliminary Invalidity Contentions, Exhibit 045-A-12, *Webroot, Inc. and Open Text, Inc.* v. *Crowdstrike Holdings, Inc.*, No. 6:22-CV-00241-ADA-DTG (WD, Texas), Sep. 13, 2022, 34 pgs.

Defendant Crowdstrike Holdings, Inc.'s Preliminary Invalidity Contentions, Exhibit 045-A-13, *Webroot, Inc. and Open Text, Inc.* v. *Crowdstrike Holdings, Inc.*, No. 6:22-CV-00241-ADA-DTG (WD, Texas), Sep. 13, 2022, 50 pgs.

Defendant Crowdstrike Holdings, Inc.'s Preliminary Invalidity Contentions, Exhibit 045-A-14, *Webroot, Inc. and Open Text, Inc.* v. *Crowdstrike Holdings, Inc.*, No. 6:22-CV-00241-ADA-DTG (WD, Texas), Sep. 13, 2022, 38 pgs.

Defendant Crowdstrike Holdings, Inc.'s Preliminary Invalidity Contentions, Exhibit 045-A-15, *Webroot, Inc. and Open Text, Inc.* v. *Crowdstrike Holdings, Inc.*, No. 6:22-CV-00241-ADA-DTG (WD, Texas), Sep. 13, 2022, 43 pgs.

Defendant Crowdstrike Holdings, Inc.'s Preliminary Invalidity Contentions, Exhibit 045-A-16, *Webroot, Inc. and Open Text, Inc.* v. *Crowdstrike Holdings, Inc.*, No. 6:22-CV-00241-ADA-DTG (WD, Texas), Sep. 13, 2022, 52 pgs.

Defendant Crowdstrike Holdings, Inc.'s Preliminary Invalidity Contentions, Exhibit 045-A-17, *Webroot, Inc. and Open Text, Inc.* v. *Crowdstrike Holdings, Inc.*, No. 6:22-CV-00241-ADA-DTG (Wd, Texas), Sep. 13, 2022, 47 pgs.

Defendant Crowdstrike Holdings, Inc.'s Preliminary Invalidity Contentions, Exhibit 045-A-18, *Webroot, Inc. and Open Text, Inc.* v. *Crowdstrike Holdings, Inc.*, No. 6:22-CV-00241-ADA-DTG (WD, Texas), Sep. 13, 2022, 57 pgs.

Defendant Crowdstrike Holdings, Inc.'s Preliminary Invalidity Contentions, Exhibit 045-A-19, *Webroot, Inc. and Open Text, Inc.* v. *Crowdstrike Holdings, Inc.*, No. 6:22-CV-00241-ADA-DTG (WD, Texas), Sep. 13, 2022, 66 pgs.

Defendant Crowdstrike Holdings, Inc.'s Preliminary Invalidity Contentions, Exhibit 045-A-20, *Webroot, Inc. and Open Text, Inc.* v. *Crowdstrike Holdings, Inc.*, No. 6:22-CV-00241-ADA-DTG (WD, Texas), Sep. 13, 2022, 97 pgs.

Defendant Crowdstrike Holdings, Inc.'s Preliminary Invalidity Contentions, Exhibit 045-A-21, *Webroot, Inc. and Open Text, Inc.* v. *Crowdstrike Holdings, Inc.*, No. 6:22-CV-00241-ADA-DTG (WD, Texas), Sep. 13, 2022, 46 pgs.

Defendant Crowdstrike Holdings, Inc.'s Preliminary Invalidity Contentions, Exhibit 045-A-22, *Webroot, Inc. and Open Text, Inc.* v. *Crowdstrike Holdings, Inc.*, No. 6:22-CV-00241-ADA-DTG (WD, Texas), Sep. 13, 2022, 15 pgs.

Defendant Crowdstrike Holdings, Inc.'s Preliminary Invalidity Contentions, Exhibit 045-A-23, *Webroot, Inc. and Open Text, Inc.* v. *Crowdstrike Holdings, Inc.*, No. 6:22-CV-00241-ADA-DTG (WD, Texas), Sep. 13, 2022, 17 pgs.

Defendant Crowdstrike Holdings, Inc.'s Preliminary Invalidity Contentions, Exhibit 045-A-24, *Webroot, Inc. and Open Text, Inc.* v. *Crowdstrike Holdings, Inc.*, No. 6:22-CV-00241-ADA-DTG (WD, Texas), Sep. 13, 2022, 75 pgs.

Defendant Crowdstrike Holdings, Inc.'s Preliminary Invalidity Contentions, Exhibit 045-A-25, *Webroot, Inc. and Open Text, Inc.* v. *Crowdstrike Holdings, Inc.*, No. 6:22-CV-00241-ADA-DTG (Wd, Texas), Sep. 13, 2022, 16 pgs.

Defendant Crowdstrike Holdings, Inc.'s Preliminary Invalidity Contentions, Exhibit 045-A-26, *Webroot, Inc. and Open Text, Inc.* v. *Crowdstrike Holdings, Inc.*, No. 6:22-CV-00241-ADA-DTG (WD, Texas), Sep. 13, 2022, 18 pgs.

Defendant Crowdstrike Holdings, Inc.'s Preliminary Invalidity Contentions, Exhibit 045-A-27, *Webroot, Inc. and Open Text, Inc.* v. *Crowdstrike Holdings, Inc.*, No. 6:22-CV-00241-ADA-DTG (WD, Texas), Sep. 13, 2022, 25 pgs.

Defendant Crowdstrike Holdings, Inc.'s Preliminary Invalidity Contentions, Exhibit 045-A-28, *Webroot, Inc. and Open Text, Inc.* v. *Crowdstrike Holdings, Inc.*, No. 6:22-CV-00241-ADA-DTG (WD, Texas), Sep. 13, 2022, 14 pgs.

Defendant Crowdstrike Holdings, Inc.'s Preliminary Invalidity Contentions, Exhibit 045-A-29, *Webroot, Inc. and Open Text, Inc.* v. *Crowdstrike Holdings, Inc.*, No. 6:22-CV-00241-ADA-DTG (WD, Texas), Sep. 13, 2022, 40 pgs.

(56) References Cited

OTHER PUBLICATIONS

Defendant Crowdstrike Holdings, Inc.'s Preliminary Invalidity Contentions, Exhibit 045-A-30, *Webroot, Inc. and Open Text, Inc. v. Crowdstrike Holdings, Inc.*, No. 6:22-CV-00241-ADA-DTG (WD, Texas), Sep. 13, 2022, 19 pgs.

Defendant Crowdstrike Holdings, Inc.'s Preliminary Invalidity Contentions, Exhibit 045-A-31, *Webroot, Inc. and Open Text, Inc. v. Crowdstrike Holdings, Inc.*, No. 6:22-CV-00241-ADA-DTG (WD, Texas), Sep. 13, 2022, 45 pgs.

Defendant Crowdstrike Holdings, Inc.'s Preliminary Invalidity Contentions, Exhibit 045-A-32, *Webroot, Inc. and Open Text, Inc. v. Crowdstrike Holdings, Inc.*, No. 6:22-CV-00241-ADA-DTG (WD, Texas), Sep. 13, 2022, 19 pgs.

Defendant Crowdstrike Holdings, Inc.'s Preliminary Invalidity Contentions, Exhibit 045-A-33, *Webroot, Inc. and Open Text, Inc. v. Crowdstrike Holdings, Inc.*, No. 6:22-CV-00241-ADA-DTG (WD, Texas), Sep. 13, 2022, 42 pgs.

Defendant Crowdstrike Holdings, Inc.'s Preliminary Invalidity Contentions, Exhibit 045-A-34, *Webroot, Inc. and Open Text, Inc. v. Crowdstrike Holdings, Inc.*, No. 6:22-CV-00241-ADA-DTG (WD, Texas), Sep. 13, 2022, 51 pgs.

Defendant Crowdstrike Holdings, Inc.'s Preliminary Invalidity Contentions, Exhibit 045-B, *Webroot, Inc. and Open Text, Inc. v. Crowdstrike Holdings, Inc.*, No. 6:22-CV-00241-ADA-DTG (WD, Texas), Sep. 13, 2022, 129 pgs.

Defendant Crowdstrike Holdings, Inc.'s Preliminary Invalidity Contentions, Exhibit 224-A-1, *Webroot, Inc. and Open Text, Inc. v. Crowdstrike Holdings, Inc.*, No. 6:22-CV-00241-ADA-DTG (WD, Texas), Sep. 13, 2022, 53 pgs.

Defendant Crowdstrike Holdings, Inc.'s Preliminary Invalidity Contentions, Exhibit 224-A-2, *Webroot, Inc. and Open Text, Inc. v. Crowdstrike Holdings, Inc.*, No. 6:22-CV-00241-ADA-DTG (WD, Texas), Sep. 13, 2022, 53 pgs.

Defendant Crowdstrike Holdings, Inc.'s Preliminary Invalidity Contentions, Exhibit 224-A-3, *Webroot, Inc. and Open Text, Inc. v. Crowdstrike Holdings, Inc.*, No. 6:22-CV-00241-ADA-DTG (WD, Texas), Sep. 13, 2022, 73 pgs.

Defendant Crowdstrike Holdings, Inc.'s Preliminary Invalidity Contentions, Exhibit 224-A-4, *Webroot, Inc. and Open Text, Inc. v. Crowdstrike Holdings, Inc.*, No. 6:22-CV-00241-ADA-DTG (WD, Texas), Sep. 13, 2022, 47 pgs.

Defendant Crowdstrike Holdings, Inc.'s Preliminary Invalidity Contentions, Exhibit 224-A-5, *Webroot, Inc. and Open Text, Inc. v. Crowdstrike Holdings, Inc.*, No. 6:22-CV-00241-ADA-DTG (WD, Texas), Sep. 13, 2022, 55 pgs.

Defendant Crowdstrike Holdings, Inc.'s Preliminary Invalidity Contentions, Exhibit 224-A-6, *Webroot, Inc. and Open Text, Inc. v. Crowdstrike Holdings, Inc.*, No. 6:22-CV-00241-ADA-DTG (WD, Texas), Sep. 13, 2022, 34 pgs.

Defendant Crowdstrike Holdings, Inc.'s Preliminary Invalidity Contentions, Exhibit 224-A-7, *Webroot, Inc. and Open Text, Inc. v. Crowdstrike Holdings, Inc.*, No. 6:22-CV-00241-ADA-DTG (WD, Texas), Sep. 13, 2022, 33 pgs.

Defendant Crowdstrike Holdings, Inc.'s Preliminary Invalidity Contentions, Exhibit 224-A-8, *Webroot, Inc. and Open Text, Inc. v. Crowdstrike Holdings, Inc.*, No. 6:22-CV-00241-ADA-DTG (WD, Texas), Sep. 13, 2022, 112 pgs.

Defendant Crowdstrike Holdings, Inc.'s Preliminary Invalidity Contentions, Exhibit 224-A-9, *Webroot, Inc. and Open Text, Inc. v. Crowdstrike Holdings, Inc.*, No. 6:22-CV-00241-ADA-DTG (WD, Texas), Sep. 13, 2022, 47 pgs.

Defendant Crowdstrike Holdings, Inc.'s Preliminary Invalidity Contentions, Exhibit 224-A-10, *Webroot, Inc. and Open Text, Inc. v. Crowdstrike Holdings, Inc.*, No. 6:22-CV-00241-ADA-DTG (WD, Texas), Sep. 13, 2022, 39 pgs.

Defendant Crowdstrike Holdings, Inc.'s Preliminary Invalidity Contentions, Exhibit 224-A-11, *Webroot, Inc. and Open Text, Inc. v. Crowdstrike Holdings, Inc.*, No. 6:22-CV-00241-ADA-DTG (WD, Texas), Sep. 13, 2022, 72 pgs.

Defendant Crowdstrike Holdings, Inc.'s Preliminary Invalidity Contentions, Exhibit 224-A-12, *Webroot, Inc. and Open Text, Inc. v. Crowdstrike Holdings, Inc.*, No. 6:22-CV-00241-ADA-DTG (WD, Texas), Sep. 13, 2022, 72 pgs.

Defendant Crowdstrike Holdings, Inc.'s Preliminary Invalidity Contentions, Exhibit 224-A-13, *Webroot, Inc. and Open Text, Inc. v. Crowdstrike Holdings, Inc.*, No. 6:22-CV-00241-ADA-DTG (WD, Texas), Sep. 13, 2022, 62 pgs.

Defendant Crowdstrike Holdings, Inc.'s Preliminary Invalidity Contentions, Exhibit 224-A-14, *Webroot, Inc. and Open Text, Inc. v. Crowdstrike Holdings, Inc.*, No. 6:22-CV-00241-ADA-DTG (WD, Texas), Sep. 13, 2022, 95 pgs.

Defendant Crowdstrike Holdings, Inc.'s Preliminary Invalidity Contentions, Exhibit 224-A-15, *Webroot, Inc. and Open Text, Inc. v. Crowdstrike Holdings, Inc.*, No. 6:22-CV-00241-ADA-DTG (WD, Texas), Sep. 13, 2022, 79 pgs.

Defendant Crowdstrike Holdings, Inc.'s Preliminary Invalidity Contentions, Exhibit 224-A-16, *Webroot, Inc. and Open Text, Inc. v. Crowdstrike Holdings, Inc.*, No. 6:22-CV-00241-ADA-DTG (WD, Texas), Sep. 13, 2022, 95 pgs.

Defendant Crowdstrike Holdings, Inc.'s Preliminary Invalidity Contentions, Exhibit 224-A-17, *Webroot, Inc. and Open Text, Inc. v. Crowdstrike Holdings, Inc.*, No. 6:22-CV-00241-ADA-DTG (WD, Texas), Sep. 13, 2022, 78 pgs.

Defendant Crowdstrike Holdings, Inc.'s Preliminary Invalidity Contentions, Exhibit 224-A-18, *Webroot, Inc. and Open Text, Inc. v. Crowdstrike Holdings, Inc.*, No. 6:22-CV-00241-ADA-DTG (WD, Texas), Sep. 13, 2022, 93 pgs.

Defendant Crowdstrike Holdings, Inc.'s Preliminary Invalidity Contentions, Exhibit 224-A-19, *Webroot, Inc. and Open Text, Inc. v. Crowdstrike Holdings, Inc.*, No. 6:22-CV-00241-ADA-DTG (WD, Texas), Sep. 13, 2022, 129 pgs.

Defendant Crowdstrike Holdings, Inc.'s Preliminary Invalidity Contentions, Exhibit 224-A-20, *Webroot, Inc. and Open Text, Inc. v. Crowdstrike Holdings, Inc.*, No. 6:22-CV-00241-ADA-DTG (WD, Texas), Sep. 13, 2022, 132 pgs.

Defendant Crowdstrike Holdings, Inc.'s Preliminary Invalidity Contentions, Exhibit 224-A-21, *Webroot, Inc. and Open Text, Inc. v. Crowdstrike Holdings, Inc.*, No. 6:22-CV-00241-ADA-DTG (WD, Texas), Sep. 13, 2022, 100 pgs.

Defendant Crowdstrike Holdings, Inc.'s Preliminary Invalidity Contentions, Exhibit 224-A-22, *Webroot, Inc. and Open Text, Inc. v. Crowdstrike Holdings, Inc.*, No. 6:22-CV-00241-ADA-DTG (WD, Texas), Sep. 13, 2022, 31 pgs.

Defendant Crowdstrike Holdings, Inc.'s Preliminary Invalidity Contentions, Exhibit 224-A-23, *Webroot, Inc. and Open Text, Inc. v. Crowdstrike Holdings, Inc.*, No. 6:22-CV-00241-ADA-DTG (WD, Texas), Sep. 13, 2022, 35 pgs.

Defendant Crowdstrike Holdings, Inc.'s Preliminary Invalidity Contentions, Exhibit 224-A-24, *Webroot, Inc. and Open Text, Inc. v. Crowdstrike Holdings, Inc.*, No. 6:22-CV-00241-ADA-DTG (WD, Texas), Sep. 13, 2022, 176 pgs.

Defendant Crowdstrike Holdings, Inc.'s Preliminary Invalidity Contentions, Exhibit 224-A-25, *Webroot, Inc. and Open Text, Inc. v. Crowdstrike Holdings, Inc.*, No. 6:22-CV-00241-ADA-DTG (WD, Texas), Sep. 13, 2022, 31 pgs.

Defendant Crowdstrike Holdings, Inc.'s Preliminary Invalidity Contentions, Exhibit 224-A-26, *Webroot, Inc. and Open Text, Inc. v. Crowdstrike Holdings, Inc.*, No. 6:22-CV-00241-ADA-DTG (WD, Texas), Sep. 13, 2022, 43 pgs.

Defendant Crowdstrike Holdings, Inc.'s Preliminary Invalidity Contentions, Exhibit 224-A-27, *Webroot, Inc. and Open Text, Inc. v. Crowdstrike Holdings, Inc.*, No. 6:22-CV-00241-ADA-DTG (WD, Texas), Sep. 13, 2022, 54 pgs.

Defendant Crowdstrike Holdings, Inc.'s Preliminary Invalidity Contentions, Exhibit 224-A-28, *Webroot, Inc. and Open Text, Inc. v. Crowdstrike Holdings, Inc.*, No. 6:22-CV-00241-ADA-DTG (WD, Texas), Sep. 13, 2022, 37 pgs.

Defendant Crowdstrike Holdings, Inc.'s Preliminary Invalidity Contentions, Exhibit 224-A-29, *Webroot, Inc. and Open Text, Inc. v. Crowdstrike Holdings,* Inc., No. 6:22-CV-00241-ADA-DTG (WD, Texas), Sep. 13, 2022, 94 pgs.

(56) References Cited

OTHER PUBLICATIONS

Defendant Crowdstrike Holdings, Inc.'s Preliminary Invalidity Contentions, Exhibit 224-A-30, *Webroot, Inc. and Open Text, Inc. v. Crowdstrike Holdings, Inc.*, No. 6:22-CV-00241-ADA-DTG (WD, Texas), Sep. 13, 2022, 42 pgs.

Defendant Crowdstrike Holdings, Inc.'s Preliminary Invalidity Contentions, Exhibit 224-A-31, *Webroot, Inc. and Open Text, Inc. v. Crowdstrike Holdings, Inc.*, No. 6:22-CV-00241-ADA-DTG (WD, Texas), Sep. 13, 2022, 64 pgs.

Defendant Crowdstrike Holdings, Inc.'s Preliminary Invalidity Contentions, Exhibit 224-A-32, *Webroot, Inc. and Open Text, Inc. v. Crowdstrike Holdings, Inc.*, No. 6:22-CV-00241-ADA-DTG (WD, Texas), Sep. 13, 2022, 37 pgs.

Defendant Crowdstrike Holdings, Inc.'s Preliminary Invalidity Contentions, Exhibit 224-A-33, *Webroot, Inc. and Open Text, Inc. v. Crowdstrike Holdings, Inc.*, No. 6:22-CV-00241-ADA-DTG (WD, Texas), Sep. 13, 2022, 63 pgs.

Defendant Crowdstrike Holdings, Inc.'s Preliminary Invalidity Contentions, Exhibit 224-A-34, *Webroot, Inc. and Open Text, Inc. v. Crowdstrike Holdings, Inc.*, No. 6:22-CV-00241-ADA-DTG (WD, Texas), Sep. 13, 2022, 88 pgs.

Defendant Crowdstrike Holdings, Inc.'s Preliminary Invalidity Contentions, Exhibit 224-B, *Webroot, Inc. and Open Text, Inc. v. Crowdstrike Holdings, Inc.*, No. 6:22-CV-00241-ADA-DTG (WD, Texas), Sep. 13, 2022, 195 pgs.

Defendant Crowdstrike Holdings, Inc.'s Preliminary Invalidity Contentions, Exhibit 591-A-1, *Webroot, Inc. and Open Text, Inc. v. Crowdstrike Holdings, Inc.*, No. 6:22-CV-00241-ADA-DTG (WD, Texas), Sep. 13, 2022, 32 pgs.

Defendant Crowdstrike Holdings, Inc.'s Preliminary Invalidity Contentions, Exhibit 591-A-2, *Webroot, Inc. and Open Text, Inc. v. Crowdstrike Holdings, Inc.*, No. 6:22-CV-00241-ADA-DTG (WD, Texas), Sep. 13, 2022, 28 pgs.

Defendant Crowdstrike Holdings, Inc.'s Preliminary Invalidity Contentions, Exhibit 591-A-3, *Webroot, Inc. and Open Text, Inc. v. Crowdstrike Holdings, Inc.*, No. 6:22-CV-00241-ADA-DTG (WD, Texas), Sep. 13, 2022, 35 pgs.

Defendant Crowdstrike Holdings, Inc.'s Preliminary Invalidity Contentions, Exhibit 591-A-4, *Webroot, Inc. and Open Text, Inc. v. Crowdstrike Holdings, Inc.*, No. 6:22-CV-00241-ADA-DTG (WD, Texas), Sep. 13, 2022, 36 pgs.

Defendant Crowdstrike Holdings, Inc.'s Preliminary Invalidity Contentions, Exhibit 591-A-5, *Webroot, Inc. and Open Text, Inc. v. Crowdstrike Holdings, Inc.*, No. 6:22-CV-00241-ADA-DTG (WD, Texas), Sep. 13, 2022, 59 pgs.

Defendant Crowdstrike Holdings, Inc.'s Preliminary Invalidity Contentions, Exhibit 591-A-6, *Webroot, Inc. and Open Text, Inc. v. Crowdstrike Holdings, Inc.*, No. 6:22-CV-00241-ADA-DTG (WD, Texas), Sep. 13, 2022, 37 pgs.

Defendant Crowdstrike Holdings, Inc.'s Preliminary Invalidity Contentions, Exhibit 591-A-7, *Webroot, Inc. and Open Text, Inc. v. Crowdstrike Holdings, Inc.*, No. 6:22-CV-00241-ADA-DTG (WD, Texas), Sep. 13, 2022, 64 pgs.

Defendant Crowdstrike Holdings, Inc.'s Preliminary Invalidity Contentions, Exhibit 591-A-8, *Webroot, Inc. and Open Text, Inc. v. Crowdstrike Holdings, Inc.*, No. 6:22-CV-00241-ADA-DTG (WD, Texas), Sep. 13, 2022, 50 pgs.

Defendant Crowdstrike Holdings, Inc.'s Preliminary Invalidity Contentions, Exhibit 591-A-9, *Webroot, Inc. and Open Text, Inc. v. Crowdstrike Holdings, Inc.*, No. 6:22-CV-00241-ADA-DTG (WD, Texas), Sep. 13, 2022, 17 pgs.

Defendant Crowdstrike Holdings, Inc.'s Preliminary Invalidity Contentions, Exhibit 591-A-10, *Webroot, Inc. and Open Text, Inc. v. Crowdstrike Holdings, Inc.*, No. 6:22-CV-00241-ADA-DTG (WD, Texas), Sep. 13, 2022, 23 pgs.

Defendant Crowdstrike Holdings, Inc.'s Preliminary Invalidity Contentions, Exhibit 591-A-11, *Webroot, Inc. and Open Text, Inc. v. Crowdstrike Holdings, Inc.*, No. 6:22-CV-00241-ADA-DTG (WD, Texas), Sep. 13, 2022, 18 pgs.

Defendant Crowdstrike Holdings, Inc.'s Preliminary Invalidity Contentions, Exhibit 591-A-12, *Webroot, Inc. and Open Text, Inc. v. Crowdstrike Holdings, Inc.*, No. 6:22-CV-00241-ADA-DTG (WD, Texas), Sep. 13, 2022, 16 pgs.

Defendant Crowdstrike Holdings, Inc.'s Preliminary Invalidity Contentions, Exhibit 591-A-13, *Webroot, Inc. and Open Text, Inc. v. Crowdstrike Holdings, Inc.*, No. 6:22-CV-00241-ADA-DTG (WD, Texas), Sep. 13, 2022, 17 pgs.

Defendant Crowdstrike Holdings, Inc.'s Preliminary Invalidity Contentions, Exhibit 591-A-14, *Webroot, Inc. and Open Text, Inc. v. Crowdstrike Holdings, Inc.*, No. 6:22-CV-00241-ADA-DTG (WD, Texas), Sep. 13, 2022, 18 pgs.

Defendant Crowdstrike Holdings, Inc.'s Preliminary Invalidity Contentions, Exhibit 591-A-15, *Webroot, Inc. and Open Text, Inc. v. Crowdstrike Holdings, Inc.*, No. 6:22-CV-00241-ADA-DTG (WD, Texas), Sep. 13, 2022, 18 pgs.

Defendant Crowdstrike Holdings, Inc.'s Preliminary Invalidity Contentions, Exhibit 591-A-16, *Webroot, Inc. and Open Text, Inc. v. Crowdstrike Holdings, Inc.*, No. 6:22-CV-00241-ADA-DTG (WD, Texas), Sep. 13, 2022, 22 pgs.

Defendant Crowdstrike Holdings, Inc.'s Preliminary Invalidity Contentions, Exhibit 591-A-17, *Webroot, Inc. and Open Text, Inc. v. Crowdstrike Holdings, Inc.*, No. 6:22-CV-00241-ADA-DTG (WD, Texas), Sep. 13, 2022, 18 pgs.

Defendant Crowdstrike Holdings, Inc.'s Preliminary Invalidity Contentions, Exhibit 591-A-18, *Webroot, Inc. and Open Text, Inc. v. Crowdstrike Holdings, Inc.*, No. 6:22-CV-00241-ADA-DTG (WD, Texas), Sep. 13, 2022, 17 pgs.

Defendant Crowdstrike Holdings, Inc.'s Preliminary Invalidity Contentions, Exhibit 591-A-19, *Webroot, Inc. and Open Text, Inc. v. Crowdstrike Holdings, Inc.*, No. 6:22-CV-00241-ADA-DTG (WD, Texas), Sep. 13, 2022, 27 pgs.

Defendant Crowdstrike Holdings, Inc.'s Preliminary Invalidity Contentions, Exhibit 591-A-20, *Webroot, Inc. and Open Text, Inc. v. Crowdstrike Holdings, Inc.*, No. 6:22-CV-00241-ADA-DTG (WD, Texas), Sep. 13, 2022, 29 pgs.

Defendant Crowdstrike Holdings, Inc.'s Preliminary Invalidity Contentions, Exhibit 591-A-21, *Webroot, Inc. and Open Text, Inc. v. Crowdstrike Holdings, Inc.*, No. 6:22-CV-00241-ADA-DTG (WD, Texas), Sep. 13, 2022, 27 pgs.

Defendant Crowdstrike Holdings, Inc.'s Preliminary Invalidity Contentions, Exhibit 591-A-22, *Webroot, Inc. and Open Text, Inc. v. Crowdstrike Holdings, Inc.*, No. 6:22-CV-00241-ADA-DTG (WD, Texas), Sep. 13, 2022, 20 pgs.

Defendant Crowdstrike Holdings, Inc.'s Preliminary Invalidity Contentions, Exhibit 591-A-23, *Webroot, Inc. and Open Text, Inc. v. Crowdstrike Holdings, Inc.*, No. 6:22-CV-00241-ADA-DTG (WD, Texas), Sep. 13, 2022, 20 pgs.

Defendant Crowdstrike Holdings, Inc.'s Preliminary Invalidity Contentions, Exhibit 591-A-24, *Webroot, Inc. and Open Text, Inc. v. Crowdstrike Holdings, Inc.*, No. 6:22-CV-00241-ADA-DTG (WD, Texas), Sep. 13, 2022, 24 pgs.

Defendant Crowdstrike Holdings, Inc.'s Preliminary Invalidity Contentions, Exhibit 591-B, *Webroot, Inc. and Open Text, Inc. v. Crowdstrike Holdings, Inc.*, No. 6:22-CV-00241-ADA-DTG (WD, Texas), Sep. 13, 2022, 303 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-1, 25 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-2, 49 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-3, 36 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-4, 31 pgs.

(56) References Cited

OTHER PUBLICATIONS

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-5, 90 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-6, 35 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-7, 73 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-8, 58 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-9, 92 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-10, 52 pgs.

Defendant Forcepoint LLC's Preliminary Invalidity Contentions, *Webroot, Inc. and Open Text, Inc. v. Forcepoint LLC*, CA. No.. 6:22-CV-00342-ADA-DTG, W.D. Tex., Feb. 21, 2023, Exhibit 243-F-11, 88 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-12, 64 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-13, 53 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-14, 60 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-15, 34 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-16, 53 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-17, 37 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-18, 46 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-19, 46 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-20, 45 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-21, 41 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-22, 52 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-23, 50 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-24, 54 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-25, 107 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-26, 220 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-27, 32 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-28, 29 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-1, 26 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-2, 54 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-3, 44 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-4, 33 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-5, 118 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-6, 36 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-7, 87 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-8, 70 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-9, 112 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-10, 63 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-11, 110 pgs.

(56) References Cited

OTHER PUBLICATIONS

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-12, 74 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-13, 57 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-14, 60 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-15, 39 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-16, 62 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-17, 57 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-18, 61 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-19, 54 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-20, 57 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-21, 59 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-22, 139 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-23, 273 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-24, 39 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-25, 31 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-26, 54 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-27, 55 pgs.
Defendant AO Kaspersky Lab's Preliminary Invalidity Contentions—Exhibit 3A, Invalidity Claim Chart Index, *Webroot, Inc. and Open Text, Inc. v. AO Kaspersky Lab*, No. 6:22-CV-00243 (WD, Texas), Sep. 14, 2022, 22 pgs.
Defendant AO Kaspersky Lab's Preliminary Invalidity Contentions—Exhibit 4A, Invalidity Claim Chart Index, *Webroot, Inc. and Open Text, Inc. v. AO Kaspersky Lab*, No. 6:22-CV-00243 (WD, Texas), Sep. 14, 2022, 54 pgs.
Defendant AO Kaspersky Lab's Preliminary Invalidity Contentions—Exhibit 5A, Invalidity Claim Chart Index, *Webroot, Inc. and Open Text, Inc. v. AO Kaspersky Lab*, No. 6:22-CV-00243 (WD, Texas), Sep. 14, 2022, 43 pgs.
Defendant AO Kaspersky Lab's Preliminary Invalidity Contentions—Exhibit 5B, Invalidity Claim Chart Index, *Webroot, Inc. and Open Text, Inc. v. AO Kaspersky Lab*, No. 6:22-CV-00243 (WD, Texas), Sep. 14, 2022, 34 pgs.
Defendant AO Kaspersky Lab's Preliminary Invalidity Contentions—Exhibit 5C, Invalidity Claim Chart Index, *Webroot, Inc. and Open Text, Inc. v. AO Kaspersky Lab*, No. 6:22-CV-00243 (WD, Texas), Sep. 14, 2022, 36 pgs.
Defendant AO Kaspersky Lab's Preliminary Invalidity Contentions—Exhibit 5D, Invalidity Claim Chart Index, *Webroot, Inc. and Open Text, Inc. v. AO Kaspersky Lab*, No. 6:22-CV-00243 (WD, Texas), Sep. 14, 2022, 69 pgs.
Defendant AO Kaspersky Lab's Preliminary Invalidity Contentions—Exhibit 8, Invalidity Claim Chart Index, *Webroot, Inc. and Open Text, Inc. v. AO Kaspersky Lab*, No. 6:22-CV-00243 (WD, Texas), Feb. 21, 2023, 30 pgs.
Defendant AO Kaspersky Lab's Preliminary Invalidity Contentions—Exhibit 9, Invalidity Claim Chart Index, *Webroot, Inc. and Open Text, Inc. v. AO Kaspersky Lab*, No. 6:22-CV-00243 (WD, Texas), Feb. 21, 2023, 56 pgs.
Defendant AO Kaspersky Lab's Preliminary Invalidity Contentions—Exhibit 10, Invalidity Claim Chart Index, *Webroot, Inc. and Open Text, Inc. v. AO Kaspersky Lab*, No. 6:22-CV-00243 (WD, Texas), Feb. 21, 2023, 62 pgs.
Defendant Sophos Ltd.'s Preliminary Invalidity Contentions, Exhibit 045-A-1, *Webroot, Inc. and Open Text, Inc. v. Sophos Ltd.*, CA. No. 6:22-CV-00240-ADA-DTG, W.D. Tex., Sep. 13, 2022, 77 pgs.
Defendant Sophos Ltd.'s Preliminary Invalidity Contentions, Exhibit 045-A-2, *Webroot, Inc. and Open Text, Inc. v. Sophos Ltd.*, CA. No. 6:22-CV-00240-ADA-DTG, W.D. Tex., Sep. 13, 2022, 42 pgs.
Defendant Sophos Ltd.'s Preliminary Invalidity Contentions, Exhibit 045-A-3, *Webroot, Inc. and Open Text, Inc. v. Sophos Ltd.*, CA. No. 6:22-CV-00240-ADA-DTG, W.D. Tex., Sep. 13, 2022, 62 pgs.
Defendant Sophos Ltd.'s Preliminary Invalidity Contentions, Exhibit 045-A-4, *Webroot, Inc. and Open Text, Inc. v. Sophos Ltd.*, CA. No. 6:22-CV-00240-ADA-DTG, W.D. Tex., Sep. 13, 2022, 147 pgs.
Defendant Sophos Ltd.'s Preliminary Invalidity Contentions, Exhibit 045-A-5, *Webroot, Inc. and Open Text, Inc. v. Sophos Ltd.*, CA. No. 6:22-CV-00240-ADA-DTG, W.D. Tex., Sep. 13, 2022, 21 pgs.
Defendant Sophos Ltd.'s Preliminary Invalidity Contentions, Exhibit 045-A-6, *Webroot, Inc. and Open Text, Inc. v. Sophos Ltd.*, CA. No. 6:22-CV-00240-ADA-DTG, W.D. Tex., Sep. 13, 2022, 169 pgs.
Defendant Sophos Ltd.'s Preliminary Invalidity Contentions, Exhibit 045-A-7, *Webroot, Inc. and Open Text, Inc. v. Sophos Ltd.*, CA. No. 6:22-CV-00240-ADA-DTG, W.D. Tex., Sep. 13, 2022, 55 pgs.
Defendant Sophos Ltd.'s Preliminary Invalidity Contentions, Exhibit 045-A-8, *Webroot, Inc. and Open Text, Inc. v. Sophos Ltd.*, CA. No. 6:22-CV-00240-ADA-DTG, W.D. Tex., Sep. 13, 2022, 19 pgs.
Defendant Sophos Ltd.'s Preliminary Invalidity Contentions, Exhibit 045-A-9, *Webroot, Inc. and Open Text, Inc. v. Sophos Ltd.*, CA. No. 6:22-CV-00240-ADA-DTG, W.D. Tex., Sep. 13, 2022, 70 pgs.
Defendant Sophos Ltd.'s Preliminary Invalidity Contentions, Exhibit 045-A-10, *Webroot, Inc. and Open Text, Inc. v. Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 045-A-11, *Webroot, Inc. and Open Text, Inc. v. Sophos Ltd.*, CA. No. 6:22-CV-00240-ADA-DTG, W.D. Tex., Sep. 13, 2022, 116 pgs.
Defendant Sophos Ltd.'s Preliminary Invalidity Contentions, Exhibit 045-A-12, *Webroot, Inc. and Open Text, Inc. v. Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 045-A-13, *Webroot, Inc. and Open Text, Inc. v. Sophos Ltd.*, CA. No. 6:22-CV-00240-ADA-DTG, W.D. Tex., Sep. 13, 2022, 61 pgs.

(56) References Cited

OTHER PUBLICATIONS

Defendant Sophos Ltd.'s Preliminary Invalidity Contentions, Exhibit 045-A-14, *Webroot, Inc. and Open Text, Inc. v. Sophos Ltd.*, CA. No. 6:22-CV-00240-ADA-DTG, W.D. Tex., Sep. 13, 2022, 117 pgs.
Defendant Sophos Ltd.'s Preliminary Invalidity Contentions, Exhibit 045-A-15, *Webroot, Inc. and Open Text, Inc. v. Sophos Ltd.*, CA. No. 6:22-CV-00240-ADA-DTG, W.D. Tex., Sep. 13, 2022, 95 pgs.
Defendant Sophos Ltd.'s Preliminary Invalidity Contentions, Exhibit 045-A-16, *Webroot, Inc. and Open Text, Inc. v. Sophos Ltd.*, CA. No. 6:22-CV-00240-ADA-DTG, W.D. Tex., Sep. 13, 2022, 78 pgs.
Defendant Sophos Ltd.'s Preliminary Invalidity Contentions, Exhibit 045-A-17, *Webroot, Inc. and Open Text, Inc. v. Sophos Ltd.*, CA. No. 6:22-CV-00240-ADA-DTG, W.D. Tex., Sep. 13, 2022, 68 pgs.
Defendant Sophos Ltd.'s Preliminary Invalidity Contentions, Exhibit 045-A-18, *Webroot, Inc. and Open Text, Inc. v. Sophos Ltd.*, CA. No. 6:22-CV-00240-ADA-DTG, W.D. Tex., Sep. 13, 2022, 18 pgs.
Defendant Sophos Ltd.'s Preliminary Invalidity Contentions, Exhibit 045-A-19, *Webroot, Inc. and Open Text, Inc. v. Sophos Ltd.*, CA. No. 6:22-CV-00240-ADA-DTG, W.D. Tex., Sep. 13, 2022, 19 pgs.
Defendant Sophos Ltd.'s Preliminary Invalidity Contentions, Exhibit 045-A-20, *Webroot, Inc. and Open Text, Inc. v. Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 045-A-21, *Webroot, Inc. and Open Text, Inc. v. Sophos Ltd.*, CA. No. 6:22-CV-00240-ADA-DTG, W.D. Tex., Sep. 13, 2022, 85 pgs.
Defendant Sophos Ltd.'s Preliminary Invalidity Contentions, Exhibit 045-A-22, *Webroot, Inc. and Open Text, Inc. v. Sophos Ltd.*, CA. No. 6:22-CV-00240-ADA-DTG, W.D. Tex., Sep. 13, 2022, 93 pgs.
Defendant Sophos Ltd.'s Preliminary Invalidity Contentions, Exhibit 045-A-23, *Webroot, Inc. and Open Text, Inc. v. Sophos Ltd.*, CA. No. 6:22-CV-00240-ADA-DTG, W.D. Tex., Sep. 13, 2022, 64 pgs.
Defendant Sophos Ltd.'s Preliminary Invalidity Contentions, Exhibit 045-A-24, *Webroot, Inc. and Open Text, Inc. v. Sophos Ltd.*, CA. No. 6:22-CV-00240-ADA-DTG, W.D. Tex., Sep. 13, 2022, 69 pgs.
Defendant Sophos Ltd.'s Preliminary Invalidity Contentions, Exhibit 045-A-25, *Webroot, Inc. and Open Text, Inc. v. Sophos Ltd.*, CA. No. 6:22-CV-00240-ADA-DTG, W.D. Tex., Sep. 13, 2022, 53 pgs.
Defendant Sophos Ltd.'s Preliminary Invalidity Contentions, Exhibit 045-A-26, *Webroot, Inc. and Open Text, Inc. v. Sophos Ltd.*, CA. No. 6:22-CV-00240-ADA-DTG, W.D. Tex., Sep. 13, 2022, 75 pgs.
Defendant Sophos Ltd.'s Preliminary Invalidity Contentions, Exhibit 045-A-27, *Webroot, Inc. and Open Text, Inc. v. Sophos Ltd.*, CA. No. 6:22-CV-00240-ADA-DTG, W.D. Tex., Sep. 13, 2022, 25 pgs.
Defendant Sophos Ltd.'s Preliminary Invalidity Contentions, Exhibit 045-A-28, *Webroot, Inc. and Open Text, Inc. v. Sophos Ltd.*, CA. No. 6:22-CV-00240-ADA-DTG, W.D. Tex., Sep. 13, 2022, 75 pgs.
Defendant Sophos Ltd.'s Preliminary Invalidity Contentions, Exhibit 045-A-29, *Webroot, Inc. and Open Text, Inc. v. Sophos Ltd.*, CA. No. 6:22-CV-00240-ADA-DTG, W.D. Tex., Sep. 13, 2022, 20 pgs.
Defendant Sophos Ltd.'s Preliminary Invalidity Contentions, Exhibit 045-A-30, *Webroot, Inc. and Open Text, Inc. v. Sophos Ltd.*, CA. No. 6:22-CV-00240-ADA-DTG, W.D. Tex., Sep. 13, 2022, 90 pgs.
Defendant Sophos Ltd.'s Preliminary Invalidity Contentions, Exhibit 045-A-31, *Webroot, Inc. and Open Text, Inc. v. Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 045-A-32, *Webroot, Inc. and Open Text, Inc. v. Sophos Ltd.*, CA. No. 6:22-CV-00240-ADA-DTG, W.D. Tex., Sep. 13, 2022, 23 pgs.
Defendant Sophos Ltd.'s Preliminary Invalidity Contentions, Exhibit 045-A-34, *Webroot, Inc. and Open Text, Inc. v. Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 045-A-35, *Webroot, Inc. and Open Text, Inc. v. Sophos Ltd.*, CA. No. 6:22-CV-00240-ADA-DTG, W.D. Tex., Sep. 13, 2022, 22 pgs.
Defendant Sophos Ltd.'s Preliminary Invalidity Contentions, Exhibit 045-B, *Webroot, Inc. and Open Text, Inc. v. Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 224-A-1, *Webroot, Inc. and Open Text, Inc. v. Sophos Ltd.*, CA. No. 6:22-CV-00240-ADA-DTG, W.D. Tex., Sep. 13, 2022, 111 pgs.
Defendant Sophos Ltd.'s Preliminary Invalidity Contentions, Exhibit 224-A-2, *Webroot, Inc. and Open Text, Inc. v. Sophos Ltd.*, CA. No. 6:22-CV-00240-ADA-DTG, W.D. Tex., Sep. 13, 2022, 68 pgs.
Defendant Sophos Ltd.'s Preliminary Invalidity Contentions, Exhibit 224-A-3, *Webroot, Inc. and Open Text, Inc. v. Sophos Ltd.*, CA. No. 6:22-CV-00240-ADA-DTG, W.D. Tex., Sep. 13, 2022, 95 pgs.
Defendant Sophos Ltd.'s Preliminary Invalidity Contentions, Exhibit 224-A-4, *Webroot, Inc. and Open Text, Inc. v. Sophos Ltd.*, CA. No. 6:22-CV-00240-ADA-DTG, W.D. Tex., Sep. 13, 2022, 207 pgs.
Defendant Sophos Ltd.'s Preliminary Invalidity Contentions, Exhibit 224-A-5, *Webroot, Inc. and Open Text, Inc. v. Sophos Ltd.*, CA. No. 6:22-CV-00240-ADA-DTG, W.D. Tex., Sep. 13, 2022, 61 pgs.
Defendant Sophos Ltd.'s Preliminary Invalidity Contentions, Exhibit 224-A-6, *Webroot, Inc. and Open Text, Inc. v. Sophos Ltd.*, CA. No. 6:22-CV-00240-ADA-DTG, W.D. Tex., Sep. 13, 2022, 263 pgs.
Defendant Sophos Ltd.'s Preliminary Invalidity Contentions, Exhibit 224-A-8, *Webroot, Inc. and Open Text, Inc. v. Sophos Ltd.*, CA. No. 6:22-CV-00240-ADA-DTG, W.D. Tex., Sep. 13, 2022, 51 pgs.
Defendant Sophos Ltd.'s Preliminary Invalidity Contentions, Exhibit 224-A-9, *Webroot, Inc. and Open Text, Inc. v. Sophos Ltd.*, CA. No. 6:22-CV-00240-ADA-DTG, W.D. Tex., Sep. 13, 2022, 136 pgs.
Defendant Sophos Ltd.'s Preliminary Invalidity Contentions, Exhibit 224-A-10, *Webroot, Inc. and Open Text, Inc. v. Sophos Ltd.*, CA. No. 6:22-CV-00240-ADA-DTG, W.D. Tex., Sep. 13, 2022, 79 pgs.
Defendant Sophos Ltd.'s Preliminary Invalidity Contentions, Exhibit 224-A-11, *Webroot, Inc. and Open Text, Inc. v. Sophos Ltd.*, CA. No. 6:22-CV-00240-ADA-DTG, W.D. Tex., Sep. 13, 2022, 185 pgs.
Defendant Sophos Ltd.'s Preliminary Invalidity Contentions, Exhibit 224-A-12, *Webroot, Inc. and Open Text, Inc. v. Sophos Ltd.*, CA. No. 6:22-CV-00240-ADA-DTG, W.D. Tex., Sep. 13, 2022, 53 pgs.
Defendant Sophos Ltd.'s Preliminary Invalidity Contentions, Exhibit 224-A-13, *Webroot, Inc. and Open Text, Inc. v. Sophos Ltd.*, CA. No. 6:22-CV-00240-ADA-DTG, W.D. Tex., Sep. 13, 2022, 95 pgs.
Defendant Sophos Ltd.'s Preliminary Invalidity Contentions, Exhibit 224-A-14, *Webroot, Inc. and Open Text, Inc. v. Sophos Ltd.*, CA. No. 6:22-CV-00240-ADA-DTG, W.D. Tex., Sep. 13, 2022, 176 pgs.
Defendant Sophos Ltd.'s Preliminary Invalidity Contentions, Exhibit 224-A-15, *Webroot, Inc. and Open Text, Inc. v. Sophos Ltd.*, CA. No. 6:22-CV-00240-ADA-DTG, W.D. Tex., Sep. 13, 2022, 173 pgs.
Defendant Sophos Ltd.'s Preliminary Invalidity Contentions, Exhibit 224-A-16, *Webroot, Inc. and Open Text, Inc. v. Sophos Ltd.*, CA. No. 6:22-CV-00240-ADA-DTG, W.D. Tex., Sep. 13, 2022, 126 pgs.
Defendant Sophos Ltd.'s Preliminary Invalidity Contentions, Exhibit 224-A-17, *Webroot, Inc. and Open Text, Inc. v. Sophos Ltd.*, CA. No. 6:22-CV-00240-ADA-DTG, W.D. Tex., Sep. 13, 2022, 103 pgs.
Defendant Sophos Ltd.'s Preliminary Invalidity Contentions, Exhibit 224-A-18, *Webroot, Inc. and Open Text, Inc. v. Sophos Ltd.*, CA. No. 6:22-CV-00240-ADA-DTG, W.D. Tex., Sep. 13, 2022, 49 pgs.
Defendant Sophos Ltd.'s Preliminary Invalidity Contentions, Exhibit 224-A-19, *Webroot, Inc. and Open Text, Inc. v. Sophos Ltd.*, CA. No. 6:22-CV-00240-ADA-DTG, W.D. Tex., Sep. 13, 2022, 68 pgs.
Defendant Sophos Ltd.'s Preliminary Invalidity Contentions, Exhibit 224-A-20, *Webroot, Inc. and Open Text, Inc. v. Sophos Ltd.*, CA. No. 6:22-CV-00240-ADA-DTG, W.D. Tex., Sep. 13, 2022, 157 pgs.
Defendant Sophos Ltd.'s Preliminary Invalidity Contentions, Exhibit 224-A-21, *Webroot, Inc. and Open Text, Inc. v. Sophos Ltd.*, CA. No. 6:22-CV-00240-ADA-DTG, W.D. Tex., Sep. 13, 2022, 139 pgs.
Defendant Sophos Ltd.'s Preliminary Invalidity Contentions, Exhibit 224-A-22, *Webroot, Inc. and Open Text, Inc. v. Sophos Ltd.*, CA. No. 6:22-CV-00240-ADA-DTG, W.D. Tex., Sep. 13, 2022, 152 pgs.
Defendant Sophos Ltd.'s Preliminary Invalidity Contentions, Exhibit 224-A-23, *Webroot, Inc. and Open Text, Inc. v. Sophos Ltd.*, CA. No. 6:22-CV-00240-ADA-DTG, W.D. Tex., Sep. 13, 2022, 98 pgs.
Defendant Sophos Ltd.'s Preliminary Invalidity Contentions, Exhibit 224-A-24, *Webroot, Inc. and Open Text, Inc. v. Sophos Ltd.*, CA. No. 6:22-CV-00240-ADA-DTG, W.D. Tex., Sep. 13, 2022, 117 pgs.
Defendant Sophos Ltd.'s Preliminary Invalidity Contentions, Exhibit 224-A-25, *Webroot, Inc. and Open Text, Inc. v. Sophos Ltd.*, CA. No. 6:22-CV-00240-ADA-DTG, W.D. Tex., Sep. 13, 2022, 78 pgs.
Defendant Sophos Ltd.'s Preliminary Invalidity Contentions, Exhibit 224-A-26, *Webroot, Inc. and Open Text, Inc. v. Sophos Ltd.*, CA. No. 6:22-CV-00240-ADA-DTG, W.D. Tex., Sep. 13, 2022, 117 pgs.

(56) References Cited

OTHER PUBLICATIONS

Defendant Sophos Ltd.'s Preliminary Invalidity Contentions, Exhibit 224-A-27, *Webroot, Inc. and Open Text, Inc. v. Sophos Ltd.*, CA. No. 6:22-CV-00240-ADA-DTG, W.D. Tex., Sep. 13, 2022, 60 pgs.
Defendant Sophos Ltd.'s Preliminary Invalidity Contentions, Exhibit 224-A-28, *Webroot, Inc. and Open Text, Inc. v. Sophos Ltd.*, CA. No. 6:22-CV-00240-ADA-DTG, W.D. Tex., Sep. 13, 2022, 55 pgs.
Defendant Sophos Ltd.'s Preliminary Invalidity Contentions, Exhibit 224-A-29, *Webroot, Inc. and Open Text, Inc. v. Sophos Ltd.*, CA. No. 6:22-CV-00240-ADA-DTG, W.D. Tex., Sep. 13, 2022, 145 pgs.
Defendant Sophos Ltd.'s Preliminary Invalidity Contentions, Exhibit 224-A-30, *Webroot, Inc. and Open Text, Inc. v. Sophos Ltd.*, CA. No. 6:22-CV-00240-ADA-DTG, W.D. Tex., Sep. 13, 2022, 60 pgs.
Defendant Sophos Ltd.'s Preliminary Invalidity Contentions, Exhibit 224-A-31, *Webroot, Inc. and Open Text, Inc. v. Sophos Ltd.*, CA. No. 6:22-CV-00240-ADA-DTG, W.D. Tex., Sep. 13, 2022, 104 pgs.
Defendant Sophos Ltd.'s Preliminary Invalidity Contentions, Exhibit 224-A-32, *Webroot, Inc. and Open Text, Inc. v. Sophos Ltd.*, CA. No. 6:22-CV-00240-ADA-DTG, W.D. Tex., Sep. 13, 2022, 57 pgs.
Defendant Sophos Ltd.'s Preliminary Invalidity Contentions, Exhibit 224-A-34, *Webroot, Inc. and Open Text, Inc. v. Sophos Ltd.*, CA. No. 6:22-CV-00240-ADA-DTG, W.D. Tex., Sep. 13, 2022, 59 pgs.
Defendant Sophos Ltd.'s Preliminary Invalidity Contentions, Exhibit 224-A-35, *Webroot, Inc. and Open Text, Inc. v. Sophos Ltd.*, CA. No. 6:22-CV-00240-ADA-DTG, W.D. Tex., Sep. 13, 2022, 63 pgs.
Defendant Sophos Ltd.'s Preliminary Invalidity Contentions, Exhibit 224-B, *Webroot, Inc. and Open Text, Inc. v. Sophos Ltd.*, CA. No. 6:22-CV-00240-ADA-DTG, W.D. Tex., Sep. 13, 2022, 50 pgs.
Defendant Sophos Ltd.'s Preliminary Invalidity Contentions, Exhibit 591-A-1, *Webroot, Inc. and Open Text, Inc. v. Sophos Ltd.*, CA. No. 6:22-CV-00240-ADA-DTG, W.D. Tex., Sep. 13, 2022, 20 pgs.
Defendant Sophos Ltd.'s Preliminary Invalidity Contentions, Exhibit 591-A-2, *Webroot, Inc. and Open Text, Inc. v. Sophos Ltd.*, CA. No. 6:22-CV-00240-ADA-DTG, W.D. Tex., Sep. 13, 2022, 19 pgs.
Defendant Sophos Ltd.'s Preliminary Invalidity Contentions, Exhibit 591-A-3, *Webroot, Inc. and Open Text, Inc. v. Sophos Ltd.*, CA. No. 6:22-CV-00240-ADA-DTG, W.D. Tex., Sep. 13, 2022, 22 pgs.
Defendant Sophos Ltd.'s Preliminary Invalidity Contentions, Exhibit 591-A-4, *Webroot, Inc. and Open Text, Inc. v. Sophos Ltd.*, CA. No. 6:22-CV-00240-ADA-DTG, W.D. Tex., Sep. 13, 2022, 52 pgs.
Defendant Sophos Ltd.'s Preliminary Invalidity Contentions, Exhibit 591-A-5, *Webroot, Inc. and Open Text, Inc. v. Sophos Ltd.*, CA. No. 6:22-CV-00240-ADA-DTG, W.D. Tex., Sep. 13, 2022, 19 pgs.
Defendant Sophos Ltd.'s Preliminary Invalidity Contentions, Exhibit 591-A-6, *Webroot, Inc. and Open Text, Inc. v. Sophos Ltd.*, CA. No. 6:22-CV-00240-ADA-DTG, W.D. Tex., Sep. 13, 2022, 30 pgs.
Defendant Sophos Ltd.'s Preliminary Invalidity Contentions, Exhibit 591-A-7, *Webroot, Inc. and Open Text, Inc. v. Sophos Ltd.*, CA. No. 6:22-CV-00240-ADA-DTG, W.D. Tex., Sep. 13, 2022, 42 pgs.
Defendant Sophos Ltd.'s Preliminary Invalidity Contentions, Exhibit 591-A-8, *Webroot, Inc. and Open Text, Inc. v. Sophos Ltd.*, CA. No. 6:22-CV-00240-ADA-DTG, W.D. Tex., Sep. 13, 2022, 33 pgs.
Defendant Sophos Ltd.'s Preliminary Invalidity Contentions, Exhibit 591-A-9, *Webroot, Inc. and Open Text, Inc. v. Sophos Ltd.*, CA. No. 6:22-CV-00240-ADA-DTG, W.D. Tex., Sep. 13, 2022, 19 pgs.
Defendant Sophos Ltd.'s Preliminary Invalidity Contentions, Exhibit 591-A-10, *Webroot, Inc. and Open Text, Inc. v. Sophos Ltd.*, CA. No. 6:22-CV-00240-ADA-DTG, W.D. Tex., Sep. 13, 2022, 20 pgs.
Defendant Sophos Ltd.'s Preliminary Invalidity Contentions, Exhibit 591-A-11, *Webroot, Inc. and Open Text, Inc. v. Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 591-A-12, *Webroot, Inc. and Open Text, Inc. v. Sophos Ltd.*, CA. No. 6:22-CV-00240-ADA-DTG, W.D. Tex., Sep. 13, 2022, 40 pgs.
Defendant Sophos Ltd.'s Preliminary Invalidity Contentions, Exhibit 591-A-13, *Webroot, Inc. and Open Text, Inc. v. Sophos Ltd.*, CA. No. 6:22-CV-00240-ADA-DTG, W.D. Tex., Sep. 13, 2022, 21 pgs.
Defendant Sophos Ltd.'s Preliminary Invalidity Contentions, Exhibit 591-A-14, *Webroot, Inc. and Open Text, Inc. v. Sophos Ltd.*, CA. No. 6:22-CV-00240-ADA-DTG, W.D. Tex., Sep. 13, 2022, 21 pgs.
Defendant Sophos Ltd.'s Preliminary Invalidity Contentions, Exhibit 591-A-15, *Webroot, Inc. and Open Text, Inc. v. Sophos Ltd.*, CA. No. 6:22-CV-00240-ADA-DTG, W.D. Tex., Sep. 13, 2022, 40 pgs.
Defendant Sophos Ltd.'s Preliminary Invalidity Contentions, Exhibit 591-A-16, *Webroot, Inc. and Open Text, Inc. v. Sophos Ltd.*, CA. No. 6:22-CV-00240-ADA-DTG, W.D. Tex., Sep. 13, 2022, 18 pgs.
Defendant Sophos Ltd.'s Preliminary Invalidity Contentions, Exhibit 591-A-17, *Webroot, Inc. and Open Text, Inc. v. Sophos Ltd.*, CA. No. 6:22-CV-00240-ADA-DTG, W.D. Tex., Sep. 13, 2022, 22 pgs.
Defendant Sophos Ltd.'s Preliminary Invalidity Contentions, Exhibit 591-A-18, *Webroot, Inc. and Open Text, Inc. v. Sophos Ltd.*, CA. No. 6:22-CV-00240-ADA-DTG, W.D. Tex., Sep. 13, 2022, 71 pgs.
Defendant Sophos Ltd.'s Preliminary Invalidity Contentions, Exhibit 591-A-19, *Webroot, Inc. and Open Text, Inc. v. Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 591-A-20, *Webroot, Inc. and Open Text, Inc. v. Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 591-A-21, *Webroot, Inc. and Open Text, Inc. v. Sophos Ltd.*, CA. No. 6:22-CV-00240-ADA-DTG, W.D. Tex., Sep. 13, 2022, 34 pgs.
Defendant Sophos Ltd.'s Preliminary Invalidity Contentions, Exhibit 591-A-22, *Webroot, Inc. and Open Text, Inc. v. Sophos Ltd.*, CA. No. 6:22-CV-00240-ADA-DTG, W.D. Tex., Sep. 13, 2022, 22 pgs.
Defendant Sophos Ltd.'s Preliminary Invalidity Contentions, Exhibit 591-A-23, *Webroot, Inc. and Open Text, Inc. v. Sophos Ltd.*, CA. No. 6:22-CV-00240-ADA-DTG, W.D. Tex., Sep. 13, 2022, 20 pgs.
Defendant Sophos Ltd.'s Preliminary Invalidity Contentions, Exhibit 591-A-24, *Webroot, Inc. and Open Text, Inc. v. Sophos Ltd.*, CA. No. 6:22-CV-00240-ADA-DTG, W.D. Tex., Sep. 13, 2022, 38 pgs.
Defendant Sophos Ltd.'s Preliminary Invalidity Contentions, Exhibit 591-A-25, *Webroot, Inc. and Open Text, Inc. v. Sophos Ltd.*, CA. No. 6:22-CV-00240-ADA-DTG, W.D. Tex., Sep. 13, 2022, 72 pgs.
Defendant Sophos Ltd.'s Preliminary Invalidity Contentions, Exhibit 591-A-26, *Webroot, Inc. and Open Text, Inc. v. Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 591-A-27, *Webroot, Inc. and Open Text, Inc. v. Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 591-B, *Webroot, Inc. and Open Text, Inc. v. Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 243-A-1, *Webroot, Inc. and Open Text, Inc. v. Sophos Ltd.*, CA. No. 6:22-CV-00240-ADA-DTG, W.D. Tex., Feb. 21, 2023, 101 pgs.
Defendant Sophos Ltd.'s Preliminary Invalidity Contentions, Exhibit 243-A-2, *Webroot, Inc. and Open Text, Inc. v. Sophos Ltd.*, CA. No. 6:22-CV-00240-ADA-DTG, W.D. Tex., Feb. 21, 2023, 54 pgs.
Defendant Sophos Ltd.'s Preliminary Invalidity Contentions, Exhibit 243-A-3, *Webroot, Inc. and Open Text, Inc. v. Sophos Ltd.*, CA. No. 6:22-CV-00240-ADA-DTG, W.D. Tex., Feb. 21, 2023, 27 pgs.
Defendant Sophos Ltd.'s Preliminary Invalidity Contentions, Exhibit 243-A-4, *Webroot, Inc. and Open Text, Inc. v. Sophos Ltd.*, CA. No. 6:22-CV-00240-ADA-DTG, W.D. Tex., Feb. 21, 2023, 80 pgs.
Defendant Sophos Ltd.'s Preliminary Invalidity Contentions, Exhibit 243-A-5, *Webroot, Inc. and Open Text, Inc. v. Sophos Ltd.*, CA. No. 6:22-CV-00240-ADA-DTG, W.D. Tex., Feb. 21, 2023, 58 pgs.
Defendant Sophos Ltd.'s Preliminary Invalidity Contentions, Exhibit 243-A-6, *Webroot, Inc. and Open Text, Inc. v. Sophos Ltd.*, CA. No. 6:22-CV-00240-ADA-DTG, W.D. Tex., Feb. 21, 2023, 49 pgs.
Defendant Sophos Ltd.'s Preliminary Invalidity Contentions, Exhibit 243-A-7, *Webroot, Inc. and Open Text, Inc. v. Sophos Ltd.*, CA. No. 6:22-CV-00240-ADA-DTG, W.D. Tex., Feb. 21, 2023, 98 pgs.
Defendant Sophos Ltd.'s Preliminary Invalidity Contentions, Exhibit 243-A-8, *Webroot, Inc. and Open Text, Inc. v. Sophos Ltd.*, CA. No. 6:22-CV-00240-ADA-DTG, W.D. Tex., Feb. 21, 2023, 58 pgs.
Defendant Sophos Ltd.'s Preliminary Invalidity Contentions, Exhibit 243-A-9, *Webroot, Inc. and Open Text, Inc. v. Sophos Ltd.*, CA. No. 6:22-CV-00240-ADA-DTG, W.D. Tex., Feb. 21, 2023, 59 pgs.
Defendant Sophos Ltd.'s Preliminary Invalidity Contentions, Exhibit 243-A-10, *Webroot, Inc. and Open Text, Inc. v. Sophos Ltd.*, CA. No. 6:22-CV-00240-ADA-DTG, W.D. Tex., Feb. 21, 2023, 103 pgs.

(56) References Cited

OTHER PUBLICATIONS

Defendant Sophos Ltd.'s Preliminary Invalidity Contentions, Exhibit 243-A-11, *Webroot, Inc. and Open Text, Inc. v. Sophos Ltd.*, CA. No. 6:22-CV-00240-ADA-DTG, W.D. Tex., Feb. 21, 2023, 60 pgs.
Defendant Sophos Ltd.'s Preliminary Invalidity Contentions, Exhibit 243-A-12, *Webroot, Inc. and Open Text, Inc. v. Sophos Ltd.*, CA. No. 6:22-CV-00240-ADA-DTG, W.D. Tex., Feb. 21, 2023, 38 pgs.
Defendant Sophos Ltd.'s Preliminary Invalidity Contentions, Exhibit 243-A-13, *Webroot, Inc. and Open Text, Inc. v. Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 243-A-14, *Webroot, Inc. and Open Text, Inc. v. Sophos Ltd.*, CA. No. 6:22-CV-00240-ADA-DTG, W.D. Tex., Feb. 21, 2023, 49 pgs.
Defendant Sophos Ltd.'s Preliminary Invalidity Contentions, Exhibit 243-A-15, *Webroot, Inc. and Open Text, Inc. v. Sophos Ltd.*, CA. No. 6:22-CV-00240-ADA-DTG, W.D. Tex., Feb. 21, 2023, 57 pgs.
Defendant Sophos Ltd.'s Preliminary Invalidity Contentions, Exhibit 243-A-16, *Webroot, Inc. and Open Text, Inc. v. Sophos Ltd.*, CA. No. 6:22-CV-00240-ADA-DTG, W.D. Tex., Feb. 21, 2023, 60 pgs.
Defendant Sophos Ltd.'s Preliminary Invalidity Contentions, Exhibit 243-A-17, *Webroot, Inc. and Open Text, Inc. v. Sophos Ltd.*, CA. No. 6:22-CV-00240-ADA-DTG, W.D. Tex., Feb. 21, 2023, 47 pgs.
Defendant Sophos Ltd.'s Preliminary Invalidity Contentions, Exhibit 243-A-18, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 243-A-19, *Webroot, Inc. and Open Text, Inc. v. Sophos Ltd.*, CA. No. 6:22-CV-00240-ADA-DTG, W.D. Tex., Feb. 21, 2023, 70 pgs.
Defendant Sophos Ltd.'s Preliminary Invalidity Contentions, Exhibit 243-A-20, *Webroot, Inc. and Open Text, Inc. v. Sophos Ltd.*, CA. No. 6:22-CV-00240-ADA-DTG, W.D. Tex., Feb. 21, 2023, 51 pgs.
Defendant Sophos Ltd.'s Preliminary Invalidity Contentions, Exhibit 243-A-21, *Webroot, Inc. and Open Text, Inc. v. Sophos Ltd.*, CA. No. 6:22-CV-00240-ADA-DTG, W.D. Tex., Feb. 21, 2023, 117 pgs.
Defendant Sophos Ltd.'s Preliminary Invalidity Contentions, Exhibit 243-A-22, *Webroot, Inc. and Open Text, Inc. v. Sophos Ltd.*, CA. No. 6:22-CV-00240-ADA-DTG, W.D. Tex., Feb. 21, 2023, 239 pgs.
Defendant Sophos Ltd.'s Preliminary Invalidity Contentions, Exhibit 243-A-23, *Webroot, Inc. and Open Text, Inc. v. Sophos Ltd.*, CA. No. 6:22-CV-00240-ADA-DTG, W.D. Tex., Feb. 21, 2023, 62 pgs.
Defendant Sophos Ltd.'s Preliminary Invalidity Contentions, Exhibit 243-A-24, *Webroot, Inc. and Open Text, Inc. v. Sophos Ltd.*, CA. No. 6:22-CV-00240-ADA-DTG, W.D. Tex., Feb. 21, 2023, 36 pgs.
Defendant Sophos Ltd.'s Preliminary Invalidity Contentions, Exhibit 243-A-25, *Webroot, Inc. and Open Text, Inc. v. Sophos Ltd.*, CA. No. 6:22-CV-00240-ADA-DTG, W.D. Tex., Feb. 21, 2023, 39 pgs.
Defendant Sophos Ltd.'s Preliminary Invalidity Contentions, Exhibit 243-A-26, *Webroot, Inc. and Open Text, Inc. v. Sophos Ltd.*, CA. No. 6:22-CV-00240-ADA-DTG, W.D. Tex., Feb. 21, 2023, 38 pgs.
Defendant Sophos Ltd.'s Preliminary Invalidity Contentions, Exhibit 243-A-27, *Webroot, Inc. and Open Text, Inc. v. Sophos Ltd.*, CA. No. 6:22-CV-00240-ADA-DTG, W.D. Tex., Feb. 21, 2023, 44 pgs.
Defendant Sophos Ltd.'s Preliminary Invalidity Contentions, Exhibit 243-A-28, *Webroot, Inc. and Open Text, Inc. v. Sophos Ltd.*, CA. No. 6:22-CV-00240-ADA-DTG, W.D. Tex., Feb. 21, 2023, 31 pgs.
Defendant Sophos Ltd.'s Preliminary Invalidity Contentions, Exhibit 243-B, *Webroot, Inc. and Open Text, Inc. v. Sophos Ltd.*, CA. No. 6:22-CV-00240-ADA-DTG, W.D. Tex., Feb. 21, 2023, 111 pgs.
Defendant Sophos Ltd.'s Preliminary Invalidity Contentions, Exhibit 932-A-1, *Webroot, Inc. and Open Text, Inc. v. Sophos Ltd.*, CA. No. 6:22-CV-00240-ADA-DTG, W.D. Tex., Feb. 21, 2023, 122 pgs.
Defendant Sophos Ltd.'s Preliminary Invalidity Contentions, Exhibit 932-A-2, *Webroot, Inc. and Open Text, Inc. v. Sophos Ltd.*, CA. No. 6:22-CV-00240-ADA-DTG, W.D. Tex., Feb. 21, 2023,62 pgs.
Defendant Sophos Ltd.'s Preliminary Invalidity Contentions, Exhibit 932-A-3, *Webroot, Inc. and Open Text, Inc. v. Sophos Ltd.*, CA. No. 6:22-CV-00240-ADA-DTG, W.D. Tex., Feb. 21, 2023, 28 pgs.
Defendant Sophos Ltd.'s Preliminary Invalidity Contentions, Exhibit 932-A-4, *Webroot, Inc. and Open Text, Inc. v. Sophos Ltd.*, CA. No. 6:22-CV-00240-ADA-DTG, W.D. Tex., Feb. 21, 2023, 95 pgs.
Defendant Sophos Ltd.'s Preliminary Invalidity Contentions, Exhibit 932-A-5, *Webroot, Inc. and Open Text, Inc. v. Sophos Ltd.*, CA. No. 6:22-CV-00240-ADA-DTG, W.D. Tex., Feb. 21, 2023, 59 pgs.
Defendant Sophos Ltd.'s Preliminary Invalidity Contentions, Exhibit 932-A-6, *Webroot, Inc. and Open Text, Inc. v. Sophos Ltd.*, CA. No. 6:22-CV-00240-ADA-DTG, W.D. Tex., Feb. 21, 2023, 115 pgs.
Defendant Sophos Ltd.'s Preliminary Invalidity Contentions, Exhibit 932-A-7, *Webroot, Inc. and Open Text, Inc. v. Sophos Ltd.*, CA. No. 6:22-CV-00240-ADA-DTG, W.D. Tex., Feb. 21, 2023, 69 pgs.
Defendant Sophos Ltd.'s Preliminary Invalidity Contentions, Exhibit 932-A-8, *Webroot, Inc. and Open Text, Inc. v. Sophos Ltd.*, CA. No. 6:22-CV-00240-ADA-DTG, W.D. Tex., Feb. 21, 2023, 57 pgs.
Defendant Sophos Ltd.'s Preliminary Invalidity Contentions, Exhibit 932-A-9, *Webroot, Inc. and Open Text, Inc. v. Sophos Ltd.*, CA. No. 6:22-CV-00240-ADA-DTG, W.D. Tex., Feb. 21, 2023, 119 pgs.
Defendant Sophos Ltd.'s Preliminary Invalidity Contentions, Exhibit 932-A-10, *Webroot, Inc. and Open Text, Inc. v. Sophos Ltd.*, CA. No. 6:22-CV-00240-ADA-DTG, W.D. Tex., Feb. 21, 2023, 65 pgs.
Defendant Sophos Ltd.'s Preliminary Invalidity Contentions, Exhibit 932-A-11, *Webroot, Inc. and Open Text, Inc. v. Sophos Ltd.*, CA. No. 6:22-CV-00240-ADA-DTG, W.D. Tex., Feb. 21, 2023, 62 pgs.
Defendant Sophos Ltd.'s Preliminary Invalidity Contentions, Exhibit 932-A-12, *Webroot, Inc. and Open Text, Inc. v. Sophos Ltd.*, CA. No. 6:22-CV-00240-ADA-DTG, W.D. Tex., Feb. 21, 2023, 39 pgs.
Defendant Sophos Ltd.'s Preliminary Invalidity Contentions, Exhibit 932-A-13, *Webroot, Inc. and Open Text, Inc. v. Sophos Ltd.*, CA. No. 6:22-CV-00240-ADA-DTG, W.D. Tex., Feb. 21, 2023, 63 pgs.
Defendant Sophos Ltd.'s Preliminary Invalidity Contentions, Exhibit 932-A-14, *Webroot, Inc. and Open Text, Inc. v. Sophos Ltd.*, CA. No. 6:22-CV-00240-ADA-DTG, W.D. Tex., Feb. 21, 2023, 59 pgs.
Defendant Sophos Ltd.'s Preliminary Invalidity Contentions, Exhibit 932-A-15, *Webroot, Inc. and Open Text, Inc. v. Sophos Ltd.*, CA. No. 6:22-CV-00240-ADA-DTG, W.D. Tex., Feb. 21, 2023, 66 pgs.
Defendant Sophos Ltd.'s Preliminary Invalidity Contentions, Exhibit 932-A-16, *Webroot, Inc. and Open Text, Inc. v. Sophos Ltd.*, CA. No. 6:22-CV-00240-ADA-DTG, W.D. Tex., Feb. 21, 2023, 60 pgs.
Defendant Sophos Ltd.'s Preliminary Invalidity Contentions, Exhibit 932-A-17, *Webroot, Inc. and Open Text, Inc. v. Sophos Ltd.*, CA. No. 6:22-CV-00240-ADA-DTG, W.D. Tex., Feb. 21, 2023, 65 pgs.
Defendant Sophos Ltd.'s Preliminary Invalidity Contentions, Exhibit 932-A-18, *Webroot, Inc. and Open Text, Inc. v. Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 932-A-19, *Webroot, Inc. and Open Text, Inc. v. Sophos Ltd.*, CA. No. 6:22-CV-00240-ADA-DTG, W.D. Tex., Feb. 21, 2023, 80 pgs.
Defendant Sophos Ltd.'s Preliminary Invalidity Contentions, Exhibit 932-A-20, *Webroot, Inc. and Open Text, Inc. v. Sophos Ltd.*, CA. No. 6:22-CV-00240-ADA-DTG, W.D. Tex., Feb. 21, 2023, 61 pgs.
Defendant Sophos Ltd.'s Preliminary Invalidity Contentions, Exhibit 932-A-21, *Webroot, Inc. and Open Text, Inc. v. Sophos Ltd.*, CA. No. 6:22-CV-00240-ADA-DTG, W.D. Tex., Feb. 21, 2023, 158 pgs.
Defendant Sophos Ltd.'s Preliminary Invalidity Contentions, Exhibit 932-A-22, *Webroot, Inc. and Open Text, Inc. v. Sophos Ltd.*, CA. No. 6:22-CV-00240-ADA-DTG, W.D. Tex., Feb. 21, 2023, 297 pgs.
Defendant Sophos Ltd.'s Preliminary Invalidity Contentions, Exhibit 932-A-23, *Webroot, Inc. and Open Text, Inc. v. Sophos Ltd.*, CA. No. 6:22-CV-00240-ADA-DTG, W.D. Tex., Feb. 21, 2023, 73 pgs.
Defendant Sophos Ltd.'s Preliminary Invalidity Contentions, Exhibit 932-A-24, *Webroot, Inc. and Open Text, Inc. v. Sophos Ltd.*, CA. No. 6:22-CV-00240-ADA-DTG, W.D. Tex., Feb. 21, 2023, 44 pgs.
Defendant Sophos Ltd.'s Preliminary Invalidity Contentions, Exhibit 932-A-25, *Webroot, Inc. and Open Text, Inc. v. Sophos Ltd.*, CA. No. 6:22-CV-00240-ADA-DTG, W.D. Tex., Feb. 21, 2023, 46 pgs.
Defendant Sophos Ltd.'s Preliminary Invalidity Contentions, Exhibit 932-A-26, *Webroot, Inc. and Open Text, Inc. v. Sophos Ltd.*, CA. No. 6:22-CV-00240-ADA-DTG, W.D. Tex., Feb. 21, 2023, 43 pgs.
Defendant Sophos Ltd.'s Preliminary Invalidity Contentions, Exhibit 932-A-27, *Webroot, Inc. and Open Text, Inc. v. Sophos Ltd.*, CA. No. 6:22-CV-00240-ADA-DTG, W.D. Tex., Feb. 21, 2023, 34 pgs.
Defendant Sophos Ltd.'s Preliminary Invalidity Contentions, Exhibit 932-B, *Webroot, Inc. and Open Text, Inc. v. Sophos Ltd.*, CA. No. 6:22-CV-00240-ADA-DTG, W.D. Tex., Feb. 21, 2023, 139 pgs.

(56) References Cited

OTHER PUBLICATIONS

Defendant Sophos Ltd.'s Preliminary Invalidity Contentions, Exhibit 244-A-1, *Webroot, Inc. and Open Text, Inc. v. Sophos Ltd.*, CA. No. 6:22-CV-00240-ADA-DTG, W.D. Tex., Feb. 21, 2023, 290 pgs.
Defendant Sophos Ltd.'s Preliminary Invalidity Contentions, Exhibit 244-A-2, *Webroot, Inc. and Open Text, Inc. v. Sophos Ltd.*, CA. No. 6:22-CV-00240-ADA-DTG, W.D. Tex., Feb. 21, 2023, 104 pgs.
Defendant Sophos Ltd.'s Preliminary Invalidity Contentions, Exhibit 244-A-3, *Webroot, Inc. and Open Text, Inc. v. Sophos Ltd.*, CA. No. 6:22-CV-00240-ADA-DTG, W.D. Tex., Feb. 21, 2023, 71 pgs.
Defendant Sophos Ltd.'s Preliminary Invalidity Contentions, Exhibit 244-A-4, *Webroot, Inc. and Open Text, Inc. v. Sophos Ltd.*, CA. No. 6:22-CV-00240-ADA-DTG, W.D. Tex., Feb. 21, 2023, 182 pgs.
Defendant Sophos Ltd.'s Preliminary Invalidity Contentions, Exhibit 244-A-5, *Webroot, Inc. and Open Text, Inc. v. Sophos Ltd.*, CA. No. 6:22-CV-00240-ADA-DTG, W.D. Tex., Feb. 21, 2023, 37 pgs.
Defendant Sophos Ltd.'s Preliminary Invalidity Contentions, Exhibit 244-A-6, *Webroot, Inc. and Open Text, Inc. v. Sophos Ltd.*, CA. No. 6:22-CV-00240-ADA-DTG, W.D. Tex., Feb. 21, 2023, 43 pgs.
Defendant Sophos Ltd.'s Preliminary Invalidity Contentions, Exhibit 244-A-7, *Webroot, Inc. and Open Text, Inc. v. Sophos Ltd.*, CA. No. 6:22-CV-00240-ADA-DTG, W.D. Tex., Feb. 21, 2023, 55 pgs.
Defendant Sophos Ltd.'s Preliminary Invalidity Contentions, Exhibit 244-A-8, *Webroot, Inc. and Open Text, Inc. v. Sophos Ltd.*, CA. No. 6:22-CV-00240-ADA-DTG, W.D. Tex., Feb. 21, 2023, 80 pgs.
Defendant Sophos Ltd.'s Preliminary Invalidity Contentions, Exhibit 244-A-9, *Webroot, Inc. and Open Text, Inc. v. Sophos Ltd.*, CA. No. 6:22-CV-00240-ADA-DTG, W.D. Tex., Feb. 21, 2023, 62 pgs.
Defendant Sophos Ltd.'s Preliminary Invalidity Contentions, Exhibit 244-A-10, *Webroot, Inc. and Open Text, Inc. v. Sophos Ltd.*, CA. No. 6:22-CV-00240-ADA-DTG, W.D. Tex., Feb. 21, 2023, 70 pgs.
Defendant Sophos Ltd.'s Preliminary Invalidity Contentions, Exhibit 244-A-11, *Webroot, Inc. and Open Text, Inc. v. Sophos Ltd.*, CA. No. 6:22-CV-00240-ADA-DTG, W.D. Tex., Feb. 21, 2023, 45 pgs.
Defendant Sophos Ltd.'s Preliminary Invalidity Contentions, Exhibit 244-A-12, *Webroot, Inc. and Open Text, Inc. v. Sophos Ltd.*, CA. No. 6:22-CV-00240-ADA-DTG, W.D. Tex., Feb. 21, 2023, 72 pgs.
Defendant Sophos Ltd.'s Preliminary Invalidity Contentions, Exhibit 244-A-13, *Webroot, Inc. and Open Text, Inc. v. Sophos Ltd.*, CA. No. 6:22-CV-00240-ADA-DTG, W.D. Tex., Feb. 21, 2023, 68 pgs.
Defendant Sophos Ltd.'s Preliminary Invalidity Contentions, Exhibit 244-A-14, *Webroot, Inc. and Open Text, Inc. v. Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 244-A-15, *Webroot, Inc. and Open Text, Inc. v. Sophos Ltd.*, CA. No. 6:22-CV-00240-ADA-DTG, W.D. Tex., Feb. 21, 2023, 54 pgs.
Defendant Sophos Ltd.'s Preliminary Invalidity Contentions, Exhibit 244-A-16, *Webroot, Inc. and Open Text, Inc. v. Sophos Ltd.*, CA. No. 6:22-CV-00240-ADA-DTG, W.D. Tex., Feb. 21, 2023, 63 pgs.
Defendant Sophos Ltd.'s Preliminary Invalidity Contentions, Exhibit 244-A-17, *Webroot, Inc. and Open Text, Inc. v. Sophos Ltd.*, CA. No. 6:22-CV-00240-ADA-DTG, W.D. Tex., Feb. 21, 2023, 212 pgs.
Defendant Sophos Ltd.'s Preliminary Invalidity Contentions, Exhibit 244-A-18, *Webroot, Inc. and Open Text, Inc. v. Sophos Ltd.*, CA. No. 6:22-CV-00240-ADA-DTG, W.D. Tex., Feb. 21, 2023, 66 pgs.
Defendant Sophos Ltd.'s Preliminary Invalidity Contentions, Exhibit 244-A-19, *Webroot, Inc. and Open Text, Inc. v. Sophos Ltd.*, CA. No. 6:22-CV-00240-ADA-DTG, W.D. Tex., Feb. 21, 2023, 109 pgs.
Defendant Sophos Ltd.'s Preliminary Invalidity Contentions, Exhibit 244-A-20, *Webroot, Inc. and Open Text, Inc. v. Sophos Ltd.*, CA. No. 6:22-CV-00240-ADA-DTG, W.D. Tex., Feb. 21, 2023, 63 pgs.
Defendant Sophos Ltd.'s Preliminary Invalidity Contentions, Exhibit 244-A-21, *Webroot, Inc. and Open Text, Inc. v. Sophos Ltd.*, CA. No. 6:22-CV-00240-ADA-DTG, W.D. Tex., Feb. 21, 2023, 4 pgs.
Defendant Sophos Ltd.'s Preliminary Invalidity Contentions, Exhibit 244-A-22, *Webroot, Inc. and Open Text, Inc. v. Sophos Ltd.*, CA. No. 6:22-CV-00240-ADA-DTG, W.D. Tex., Feb. 21, 2023, 198 pgs.
Defendant Sophos Ltd.'s Preliminary Invalidity Contentions, Exhibit 244-B, *Webroot, Inc. and Open Text, Inc. v. Sophos Ltd.*, CA. No. 6:22-CV-00240-ADA-DTG, W.D. Tex., Feb. 21, 2023, 56 pgs.
Defendant Sophos Ltd.'s Preliminary Invalidity Contentions, Exhibit 505-A-1, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 505-A-2, *Webroot, Inc. and Open Text, Inc. v. Sophos Ltd.*, CA. No. 6:22-CV-00240-ADA-DTG, W.D. Tex., Feb. 21, 2023, 39 pgs.
Defendant Sophos Ltd.'s Preliminary Invalidity Contentions, Exhibit 505-A-3, *Webroot, Inc. and Open Text, Inc. v. Sophos Ltd.*, CA. No. 6:22-CV-00240-ADA-DTG, W.D. Tex., Feb. 21, 2023, 111 pgs.
Defendant Sophos Ltd.'s Preliminary Invalidity Contentions, Exhibit 505-A-4, *Webroot, Inc. and Open Text, Inc. v. Sophos Ltd.*, CA. No. 6:22-CV-00240-ADA-DTG, W.D. Tex., Feb. 21, 2023, 34 pgs.
Defendant Sophos Ltd.'s Preliminary Invalidity Contentions, Exhibit 505-A-5, *Webroot, Inc. and Open Text, Inc. v. Sophos Ltd.*, CA. No. 6:22-CV-00240-ADA-DTG, W.D. Tex., Feb. 21, 2023, 38 pgs.
Defendant Sophos Ltd.'s Preliminary Invalidity Contentions, Exhibit 505-A-6, *Webroot, Inc. and Open Text, Inc. v. Sophos Ltd.*, CA. No. 6:22-CV-00240-ADA-DTG, W.D. Tex., Feb. 21, 2023, 162 pgs.
Defendant Sophos Ltd.'s Preliminary Invalidity Contentions, Exhibit 505-A-7, *Webroot, Inc. and Open Text, Inc. v. Sophos Ltd.*, CA. No. 6:22-CV-00240-ADA-DTG, W.D. Tex., Feb. 21, 2023, 96 pgs.
Defendant Sophos Ltd.'s Preliminary Invalidity Contentions, Exhibit 505-A-8, *Webroot, Inc. and Open Text, Inc. v. Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 505-A-9, *Webroot, Inc. and Open Text, Inc. v. Sophos Ltd.*, CA. No. 6:22-CV-00240-ADA-DTG, W.D. Tex., Feb. 21, 2023, 81 pgs.
Defendant Sophos Ltd.'s Preliminary Invalidity Contentions, Exhibit 505-A-10, *Webroot, Inc. and Open Text, Inc. v. Sophos Ltd.*, CA. No. 6:22-CV-00240-ADA-DTG, W.D. Tex., Feb. 21, 2023, 48 pgs.
Defendant Sophos Ltd.'s Preliminary Invalidity Contentions, Exhibit 505-A-11, *Webroot, Inc. and Open Text, Inc. v. Sophos Ltd.*, CA. No. 6:22-CV-00240-ADA-DTG, W.D. Tex., Feb. 21, 2023, 52 pgs.
Defendant Sophos Ltd.'s Preliminary Invalidity Contentions, Exhibit 505-A-12, *Webroot, Inc. and Open Text, Inc. v. Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 505-A-13, *Webroot, Inc. and Open Text, Inc. v. Sophos Ltd.*, CA. No. 6:22-CV-00240-ADA-DTG, W.D. Tex., Feb. 21, 2023, 147 pgs.
Defendant Sophos Ltd.'s Preliminary Invalidity Contentions, Exhibit 505-A-14, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 505-A-15, *Webroot, Inc. and Open Text, Inc. v. Sophos Ltd.*, CA. No. 6:22-CV-00240-ADA-DTG, W.D. Tex., Feb. 21, 2023, 148 pgs.
Defendant Sophos Ltd.'s Preliminary Invalidity Contentions, Exhibit 505-A-16, *Webroot, Inc. and Open Text, Inc. v. Sophos Ltd.*, CA. No. 6:22-CV-00240-ADA-DTG, W.D. Tex., Feb. 21, 2023, 46 pgs.
Defendant Sophos Ltd.'s Preliminary Invalidity Contentions, Exhibit 505-A-17, *Webroot, Inc. and Open Text, Inc. v. Sophos Ltd.*, CA. No. 6:22-CV-00240-ADA-DTG, W.D. Tex., Feb. 21, 2023, 31 pgs.
Defendant Sophos Ltd.'s Preliminary Invalidity Contentions, Exhibit 505-A-18, *Webroot, Inc. and Open Text, Inc. v. Sophos Ltd.*, CA. No. 6:22-CV-00240-ADA-DTG, W.D. Tex., Feb. 21, 2023, 47 pgs.
Defendant Sophos Ltd.'s Preliminary Invalidity Contentions, Exhibit 505-A-19, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 505-A-20, *Webroot, Inc. and Open Text, Inc. v. Sophos Ltd.*, CA. No. 6:22-CV-00240-ADA-DTG, W.D. Tex., Feb. 21, 2023, 47 pgs.
Defendant Sophos Ltd.'s Preliminary Invalidity Contentions, Exhibit 505-B, *Webroot, Inc. and Open Text, Inc. v. Sophos Ltd.*, CA. No. 6:22-CV-00240-ADA-DTG, W.D. Tex., Feb. 21, 2023, 81 pgs.
Defendant's Preliminary Invalidity Contentions, Exhibit 045-A-2, *Webroot, Inc. and Open Text, Inc. v. Trend Micro Inc.*, No. 6:22-CV-00239-ADA-DTG, W.D. Tex., Sep. 13, 2022, 35 pgs.
Defendant's Preliminary Invalidity Contentions, Exhibit 045-A-3, *Webroot, Inc. and Open Text, Inc. v. Trend Micro Inc.*, No. 6:22-CV-00239-ADA-DTG, W.D. Tex., Sep. 13, 2022, 75 pgs.
Defendant's Preliminary Invalidity Contentions, Exhibit 045-A-4, *Webroot, Inc. and Open Text, Inc. v. Trend Micro Inc.*, No. 6:22-CV-00239-ADA-DTG, W.D. Tex., Sep. 13, 2022, 51 pgs.

(56) References Cited

OTHER PUBLICATIONS

Defendant's Preliminary Invalidity Contentions, Exhibit 045-A-5, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 045-A-6, *Webroot, Inc. and Open Text, Inc. v. Trend Micro Inc.*, No. 6:22-CV-00239-ADA-DTG, W.D. Tex., Sep. 13, 2022, 66 pgs.
Defendant's Preliminary Invalidity Contentions, Exhibit 045-A-7, *Webroot, Inc. and Open Text, Inc. v. Trend Micro Inc.*, No. 6:22-CV-00239-ADA-DTG, W.D. Tex., Sep. 13, 2022, 62 pgs.
Defendant's Preliminary Invalidity Contentions, Exhibit 045-A-9, *Webroot, Inc. and Open Text, Inc. v. Trend Micro Inc.*, No. 6:22-CV-00239-ADA-DTG, W.D. Tex., Sep. 13, 2022, 47 pgs.
Defendant's Preliminary Invalidity Contentions, Exhibit 045-A-10, *Webroot, Inc. and Open Text, Inc. v. Trend Micro Inc.*, No. 6:22-CV-00239-ADA-DTG, W.D. Tex., Sep. 13, 2022, 35 pgs.
Defendant's Preliminary Invalidity Contentions, Exhibit 045-A-11, *Webroot, Inc. and Open Text, Inc. v. Trend Micro Inc.*, No. 6:22-CV-00239-ADA-DTG, W.D. Tex., Sep. 13, 2022, 37 pgs.
Defendant's Preliminary Invalidity Contentions, Exhibit 045-A-12, *Webroot, Inc. and Open Text, Inc. v. Trend Micro Inc.*, No. 6:22-CV-00239-ADA-DTG, W.D. Tex., Sep. 13, 2022, 21 pgs.
Defendant's Preliminary Invalidity Contentions, Exhibit 045-A-13, *Webroot, Inc. and Open Text, Inc. v. Trend Micro Inc.*, No. 6:22-CV-00239-ADA-DTG, W.D. Tex., Sep. 13, 2022, 22 pgs.
Defendant's Preliminary Invalidity Contentions, Exhibit 045-A-14, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 045-A-15, *Webroot, Inc. and Open Text, Inc. v. Trend Micro Inc.*, No. 6:22-CV-00239-ADA-DTG, W.D. Tex., Sep. 13, 2022, 18 pgs.
Defendant's Preliminary Invalidity Contentions, Exhibit 045-A-16, *Webroot, Inc. and Open Text, Inc. v. Trend Micro Inc.*, No. 6:22-CV-00239-ADA-DTG, W.D. Tex., Sep. 13, 2022, 23 pgs.
Defendant's Preliminary Invalidity Contentions, Exhibit 045-A-17, *Webroot, Inc. and Open Text, Inc. v. Trend Micro Inc.*, No. 6:22-CV-00239-ADA-DTG, W.D. Tex., Sep. 13, 2022, 24 pgs.
Defendant's Preliminary Invalidity Contentions, Exhibit 045-A-18, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 045-A-19, *Webroot, Inc. and Open Text, Inc. v. Trend Micro Inc.*, No. 6:22-CV-00239-ADA-DTG, W.D. Tex., Sep. 13, 2022, 20 pgs.
Defendant's Preliminary Invalidity Contentions, Exhibit 045-A-20, *Webroot, Inc. and Open Text, Inc. v. Trend Micro Inc.*, No. 6:22-CV-00239-ADA-DTG, W.D. Tex., Sep. 13, 2022, 23 pgs.
Defendant's Preliminary Invalidity Contentions, Exhibit 045-A-21, *Webroot, Inc. and Open Text, Inc. v. Trend Micro Inc.*, No. 6:22-CV-00239-ADA-DTG, W.D. Tex., Sep. 13, 2022, 48 pgs.
Defendant's Preliminary Invalidity Contentions, Exhibit 045-A-22, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 045-A-23, *Webroot, Inc. and Open Text, Inc. v. Trend Micro Inc.*, No. 6:22-CV-00239-ADA-DTG, W.D. Tex., Sep. 13, 2022, 36 pgs.
Defendant's Preliminary Invalidity Contentions, Exhibit 045-A-24, *Webroot, Inc. and Open Text, Inc. v. Trend Micro Inc.*, No. 6:22-CV-00239-ADA-DTG, W.D. Tex., Sep. 13, 2022, 57 pgs.
Defendant's Preliminary Invalidity Contentions, Exhibit 045-A-25, *Webroot, Inc. and Open Text, Inc. v. Trend Micro Inc.*, No. 6:22-CV-00239-ADA-DTG, W.D. Tex., Sep. 13, 2022, 45 pgs.
Defendant's Preliminary Invalidity Contentions, Exhibit 045-A-26, *Webroot, Inc. and Open Text, Inc. v. Trend Micro Inc.*, No. 6:22-CV-00239-ADA-DTG, W.D. Tex., Sep. 13, 2022, 19 pgs.
Defendant's Preliminary Invalidity Contentions, Exhibit 045-A-27, *Webroot, Inc. and Open Text, Inc. v. Trend Micro Inc.*, No. 6:22-CV-00239-ADA-DTG, W.D. Tex., Sep. 13, 2022, 43 pgs.
Defendant's Preliminary Invalidity Contentions, Exhibit 045-A-28, *Webroot, Inc. and Open Text, Inc. v. Trend Micro Inc.*, No. 6:22-CV-00239-ADA-DTG, W.D. Tex., Sep. 13, 2022, 48 pgs.
Defendant's Preliminary Invalidity Contentions, Exhibit 045-A-29, *Webroot, Inc. and Open Text, Inc. v. Trend Micro Inc.*, No. 6:22-CV-00239-ADA-DTG, W.D. Tex., Sep. 13, 2022, 48 pgs.
Defendant's Preliminary Invalidity Contentions, Exhibit 045-A-30, *Webroot, Inc. and Open Text, Inc. v. Trend Micro Inc.*, No. 6:22-CV-00239-ADA-DTG, W.D. Tex., Sep. 13, 2022, 49 pgs.
Defendant's Preliminary Invalidity Contentions, Exhibit 045-A-31, *Webroot, Inc. and Open Text, Inc. v. Trend Micro Inc.*, No. 6:22-CV-00239-ADA-DTG, W.D. Tex., Sep. 13, 2022, 59 pgs.
Defendant's Preliminary Invalidity Contentions, Exhibit 045-A-32, *Webroot, Inc. and Open Text, Inc. v. Trend Micro Inc.*, No. 6:22-CV-00239-ADA-DTG, W.D. Tex., Sep. 13, 2022, 100 pgs.
Defendant's Preliminary Invalidity Contentions, Exhibit 045-A-33, *Webroot, Inc. and Open Text, Inc. v. Trend Micro Inc.*, No. 6:22-CV-00239-ADA-DTG, W.D. Tex., Sep. 13, 2022, 74 pgs.
Defendant's Preliminary Invalidity Contentions, Exhibit 045-A-34, *Webroot, Inc. and Open Text, Inc. v. Trend Micro Inc.*, No. 6:22-CV-00239-ADA-DTG, W.D. Tex., Sep. 13, 2022, 39 pgs.
Defendant's Preliminary Invalidity Contentions, Exhibit 045-A-35, *Webroot, Inc. and Open Text, Inc. v. Trend Micro Inc.*, No. 6:22-CV-00239-ADA-DTG, W.D. Tex., Sep. 13, 2022, 64 pgs.
Defendant's Preliminary Invalidity Contentions, Exhibit 045-A-36, *Webroot, Inc. and Open Text, Inc. v. Trend Micro Inc.*, No. 6:22-CV-00239-ADA-DTG, W.D. Tex., Sep. 13, 2022, 170 pgs.
Defendant's Preliminary Invalidity Contentions, Exhibit 045-A-37, *Webroot, Inc. and Open Text, Inc. v. Trend Micro Inc.*, No. 6:22-CV-00239-ADA-DTG, W.D. Tex., Sep. 13, 2022, 170 pgs.
Defendant's Preliminary Invalidity Contentions, Exhibit 045-A-38, *Webroot, Inc. and Open Text, Inc. v. Trend Micro Inc.*, No. 6:22-CV-00239-ADA-DTG, W.D. Tex., Sep. 13, 2022, 32 pgs.
Defendant's Preliminary Invalidity Contentions, Exhibit 045-A-39, *Webroot, Inc. and Open Text, Inc. v. Trend Micro Inc.*, No. 6:22-CV-00239-ADA-DTG, W.D. Tex., Sep. 13, 2022, 62 pgs.
Defendant's Preliminary Invalidity Contentions, Exhibit 045-A-40, *Webroot, Inc. and Open Text, Inc. v. Trend Micro Inc.*, No. 6:22-CV-00239-ADA-DTG, W.D. Tex., Sep. 13, 2022, 79 pgs.
Defendant's Preliminary Invalidity Contentions, Exhibit 045-A-41, *Webroot, Inc. and Open Text, Inc. v. Trend Micro Inc.*, No. 6:22-CV-00239-ADA-DTG, W.D. Tex., Sep. 13, 2022, 85 pgs.
Defendant's Preliminary Invalidity Contentions, Exhibit 045-A-42, *Webroot, Inc. and Open Text, Inc. v. Trend Micro Inc.*, No. 6:22-CV-00239-ADA-DTG, W.D. Tex., Sep. 13, 2022, 70 pgs.
Defendant's Preliminary Invalidity Contentions, Exhibit 045-A-43, *Webroot, Inc. and Open Text, Inc. v. Trend Micro Inc.*, No. 6:22-CV-00239-ADA-DTG, W.D. Tex., Sep. 13, 2022, 76 pgs.
Defendant's Preliminary Invalidity Contentions, Exhibit 045-A-44, *Webroot, Inc. and Open Text, Inc. v. Trend Micro Inc.*, No. 6:22-CV-00239-ADA-DTG, W.D. Tex., Sep. 13, 2022, 38 pgs.
Defendant's Preliminary Invalidity Contentions, Exhibit 045-A-45, *Webroot, Inc. and Open Text, Inc. v. Trend Micro Inc.*, No. 6:22-CV-00239-ADA-DTG, W.D. Tex., Sep. 13, 2022, 45 pgs.
Defendant's Preliminary Invalidity Contentions, Exhibit 045-A-46, *Webroot, Inc. and Open Text, Inc. v. Trend Micro Inc.*, No. 6:22-CV-00239-ADA-DTG, W.D. Tex., Sep. 13, 2022, 78 pgs.
Defendant's Preliminary Invalidity Contentions, Exhibit 045-A-47, *Webroot, Inc. and Open Text, Inc. v. Trend Micro Inc.*, No. 6:22-CV-00239-ADA-DTG, W.D. Tex., Sep. 13, 2022, 65 pgs.
Defendant's Preliminary Invalidity Contentions, Exhibit 045-A-48, *Webroot, Inc. and Open Text, Inc. v. Trend Micro Inc.*, No. 6:22-CV-00239-ADA-DTG, W.D. Tex., Sep. 13, 2022, 27 pgs.
Defendant's Preliminary Invalidity Contentions, Exhibit 045-A-49, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 045-A-50, *Webroot, Inc. and Open Text, Inc. v. Trend Micro Inc.*, No. 6:22-CV-00239-ADA-DTG, W.D. Tex., Sep. 13, 2022, 98 pgs.
Defendant's Preliminary Invalidity Contentions, Exhibit 045-B, *Webroot, Inc. and Open Text, Inc. v. Trend Micro Inc.*, No. 6:22-CV-00239-ADA-DTG, W.D. Tex., Sep. 13, 2022, 45 pgs.
Defendant's Preliminary Invalidity Contentions, Exhibit 224-A-2, *Webroot, Inc. and Open Text, Inc. v. Trend Micro Inc.*, No. 6:22-CV-00239-ADA-DTG, W.D. Tex., Sep. 13, 2022, 102 pgs.

(56) References Cited

OTHER PUBLICATIONS

Defendant's Preliminary Invalidity Contentions, Exhibit 224-A-3, *Webroot, Inc. and Open Text, Inc. v. Trend Micro Inc.*, No. 6:22-CV-00239-ADA-DTG, W.D. Tex., Sep. 13, 2022, 169 pgs.
Defendant's Preliminary Invalidity Contentions, Exhibit 224-A-4, *Webroot, Inc. and Open Text, Inc. v. Trend Micro Inc.*, No. 6:22-CV-00239-ADA-DTG, W.D. Tex., Sep. 13, 2022, 120 pgs.
Defendant's Preliminary Invalidity Contentions, Exhibit 224-A-5, *Webroot, Inc. and Open Text, Inc. v. Trend Micro Inc.*, No. 6:22-CV-00239-ADA-DTG, W.D. Tex., Sep. 13, 2022, 117 pgs.
Defendant's Preliminary Invalidity Contentions, Exhibit 224-A-6, *Webroot, Inc. and Open Text, Inc. v. Trend Micro Inc.*, No. 6:22-CV-00239-ADA-DTG, W.D. Tex., Sep. 13, 2022, 142 pgs.
Defendant's Preliminary Invalidity Contentions, Exhibit 224-A-7, *Webroot, Inc. and Open Text, Inc. v. Trend Micro Inc.*, No. 6:22-CV-00239-ADA-DTG, W.D. Tex., Sep. 13, 2022, 129 pgs.
Defendant's Preliminary Invalidity Contentions, Exhibit 224-A-9, *Webroot, Inc. and Open Text, Inc. v. Trend Micro Inc.*, No. 6:22-CV-00239-ADA-DTG, W.D. Tex., Sep. 13, 2022, 102 pgs.
Defendant's Preliminary Invalidity Contentions, Exhibit 224-A-10, *Webroot, Inc. and Open Text, Inc. v. Trend Micro Inc.*, No. 6:22-CV-00239-ADA-DTG, W.D. Tex., Sep. 13, 2022, 75 pgs.
Defendant's Preliminary Invalidity Contentions, Exhibit 224-A-11, *Webroot, Inc. and Open Text, Inc. v. Trend Micro Inc.*, No. 6:22-CV-00239-ADA-DTG, W.D. Tex., Sep. 13, 2022, 87 pgs.
Defendant's Preliminary Invalidity Contentions, Exhibit 224-A-12, *Webroot, Inc. and Open Text, Inc. v. Trend Micro Inc.*, No. 6:22-CV-00239-ADA-DTG, W.D. Tex., Sep. 13, 2022, 61 pgs.
Defendant's Preliminary Invalidity Contentions, Exhibit 224-A-13, *Webroot, Inc. and Open Text, Inc. v. Trend Micro Inc.*, No. 6:22-CV-00239-ADA-DTG, W.D. Tex., Sep. 13, 2022, 63 pgs.
Defendant's Preliminary Invalidity Contentions, Exhibit 224-A-14, *Webroot, Inc. and Open Text, Inc. v. Trend Micro Inc.*, No. 6:22-CV-00239-ADA-DTG, W.D. Tex., Sep. 13, 2022, 68 pgs.
Defendant's Preliminary Invalidity Contentions, Exhibit 224-A-15, *Webroot, Inc. and Open Text, Inc. v. Trend Micro Inc.*, No. 6:22-CV-00239-ADA-DTG, W.D. Tex., Sep. 13, 2022, 49 pgs.
Defendant's Preliminary Invalidity Contentions, Exhibit 224-A-16, *Webroot, Inc. and Open Text, Inc. v. Trend Micro Inc.*, No. 6:22-CV-00239-ADA-DTG, W.D. Tex., Sep. 13, 2022, 59 pgs.
Defendant's Preliminary Invalidity Contentions, Exhibit 224-A-17, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 224-A-18, *Webroot, Inc. and Open Text, Inc. v. Trend Micro Inc.*, No. 6:22-CV-00239-ADA-DTG, W.D. Tex., Sep. 13, 2022, 60 pgs.
Defendant's Preliminary Invalidity Contentions, Exhibit 224-A-19, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 224-A-20, *Webroot, Inc. and Open Text, Inc. v. Trend Micro Inc.*, No. 6:22-CV-00239-ADA-DTG, W.D. Tex., Sep. 13, 2022, 57 pgs.
Defendant's Preliminary Invalidity Contentions, Exhibit 224-A-21, *Webroot, Inc. and Open Text, Inc. v. Trend Micro Inc.*, No. 6:22-CV-00239-ADA-DTG, W.D. Tex., Sep. 13, 2022, 95 pgs.
Defendant's Preliminary Invalidity Contentions, Exhibit 224-A-22, *Webroot, Inc. and Open Text, Inc. v. Trend Micro Inc.*, No. 6:22-CV-00239-ADA-DTG, W.D. Tex., Sep. 13, 2022, 108 pgs.
Defendant's Preliminary Invalidity Contentions, Exhibit 224-A-23, *Webroot, Inc. and Open Text, Inc. v. Trend Micro Inc.*, No. 6:22-CV-00239-ADA-DTG, W.D. Tex., Sep. 13, 2022, 59 pgs.
Defendant's Preliminary Invalidity Contentions, Exhibit 224-A-24, *Webroot, Inc. and Open Text, Inc. v. Trend Micro Inc.*, No. 6:22-CV-00239-ADA-DTG, W.D. Tex., Sep. 13, 2022, 110 pgs.
Defendant's Preliminary Invalidity Contentions, Exhibit 224-A-25, *Webroot, Inc. and Open Text, Inc. v. Trend Micro Inc.*, No. 6:22-CV-00239-ADA-DTG, W.D. Tex., Sep. 13, 2022, 92 pgs.
Defendant's Preliminary Invalidity Contentions, Exhibit 224-A-26, *Webroot, Inc. and Open Text, Inc. v. Trend Micro Inc.*, No. 6:22-CV-00239-ADA-DTG, W.D. Tex., Sep. 13, 2022, 51 pgs.
Defendant's Preliminary Invalidity Contentions, Exhibit 224-A-27, *Webroot, Inc. and Open Text, Inc. v. Trend Micro Inc.*, No. 6:22-CV-00239-ADA-DTG, W.D. Tex., Sep. 13, 2022, 118 pgs.
Defendant's Preliminary Invalidity Contentions, Exhibit 224-A-28, *Webroot, Inc. and Open Text, Inc. v. Trend Micro Inc.*, No. 6:22-CV-00239-ADA-DTG, W.D. Tex., Sep. 13, 2022, 118 pgs.
Defendant's Preliminary Invalidity Contentions, Exhibit 224-A-29, *Webroot, Inc. and Open Text, Inc. v. Trend Micro Inc.*, No. 6:22-CV-00239-ADA-DTG, W.D. Tex., Sep. 13, 2022, 85 pgs.
Defendant's Preliminary Invalidity Contentions, Exhibit 224-A-30, *Webroot, Inc. and Open Text, Inc. v. Trend Micro Inc.*, No. 6:22-CV-00239-ADA-DTG, W.D. Tex., Sep. 13, 2022, 98 pgs.
Defendant's Preliminary Invalidity Contentions, Exhibit 224-A-31, *Webroot, Inc. and Open Text, Inc. v. Trend Micro Inc.*, No. 6:22-CV-00239-ADA-DTG, W.D. Tex., Sep. 13, 2022, 111 pgs.
Defendant's Preliminary Invalidity Contentions, Exhibit 224-A-32, *Webroot, Inc. and Open Text, Inc. v. Trend Micro Inc.*, No. 6:22-CV-00239-ADA-DTG, W.D. Tex., Sep. 13, 2022, 150 pgs.
Defendant's Preliminary Invalidity Contentions, Exhibit 224-A-33, *Webroot, Inc. and Open Text, Inc. v. Trend Micro Inc.*, No. 6:22-CV-00239-ADA-DTG, W.D. Tex., Sep. 13, 2022, 129 pgs.
Defendant's Preliminary Invalidity Contentions, Exhibit 224-A-34, *Webroot, Inc. and Open Text, Inc. v. Trend Micro Inc.*, No. 6:22-CV-00239-ADA-DTG, W.D. Tex., Sep. 13, 2022, 65 pgs.
Defendant's Preliminary Invalidity Contentions, Exhibit 224-A-35, *Webroot, Inc. and Open Text, Inc. v. Trend Micro Inc.*, No. 6:22-CV-00239-ADA-DTG, W.D. Tex., Sep. 13, 2022, 108 pgs.
Defendant's Preliminary Invalidity Contentions, Exhibit 224-A-36, *Webroot, Inc. and Open Text, Inc. v. Trend Micro Inc.*, No. 6:22-CV-00239-ADA-DTG, W.D. Tex., Sep. 13, 2022, 275 pgs.
Defendant's Preliminary Invalidity Contentions, Exhibit 224-A-37, *Webroot, Inc. and Open Text, Inc. v. Trend Micro Inc.*, No. 6:22-CV-00239-ADA-DTG, W.D. Tex., Sep. 13, 2022, 198 pgs.
Defendant's Preliminary Invalidity Contentions, Exhibit 224-A-38, *Webroot, Inc. and Open Text, Inc. v. Trend Micro Inc.*, No. 6:22-CV-00239-ADA-DTG, W.D. Tex., Sep. 13, 2022, 65 pgs.
Defendant's Preliminary Invalidity Contentions, Exhibit 224-A-39, *Webroot, Inc. and Open Text, Inc. v. Trend Micro Inc.*, No. 6:22-CV-00239-ADA-DTG, W.D. Tex., Sep. 13, 2022, 107 pgs.
Defendant's Preliminary Invalidity Contentions, Exhibit 224-A-40, *Webroot, Inc. and Open Text, Inc. v. Trend Micro Inc.*, No. 6:22-CV-00239-ADA-DTG, W.D. Tex., Sep. 13, 2022, 138 pgs.
Defendant's Preliminary Invalidity Contentions, Exhibit 224-A-41, *Webroot, Inc. and Open Text, Inc. v. Trend Micro Inc.*, No. 6:22-CV-00239-ADA-DTG, W.D. Tex., Sep. 13, 2022, 150 pgs.
Defendant's Preliminary Invalidity Contentions, Exhibit 224-A-42, *Webroot, Inc. and Open Text, Inc. v. Trend Micro Inc.*, No. 6:22-CV-00239-ADA-DTG, W.D. Tex., Sep. 13, 2022, 129 pgs.
Defendant's Preliminary Invalidity Contentions, Exhibit 224-A-43, *Webroot, Inc. and Open Text, Inc. v. Trend Micro Inc.*, No. 6:22-CV-00239-ADA-DTG, W.D. Tex., Sep. 13, 2022, 118 pgs.
Defendant's Preliminary Invalidity Contentions, Exhibit 224-A-44, *Webroot, Inc. and Open Text, Inc. v. Trend Micro Inc.*, No. 6:22-CV-00239-ADA-DTG, W.D. Tex., Sep. 13, 2022, 70 pgs.
Defendant's Preliminary Invalidity Contentions, Exhibit 224-A-45, *Webroot, Inc. and Open Text, Inc. v. Trend Micro Inc.*, No. 6:22-CV-00239-ADA-DTG, W.D. Tex., Sep. 13, 2022, 70 pgs.
Defendant's Preliminary Invalidity Contentions, Exhibit 224-A-46, *Webroot, Inc. and Open Text, Inc. v. Trend Micro Inc.*, No. 6:22-CV-00239-ADA-DTG, W.D. Tex., Sep. 13, 2022, 124 pgs.
Defendant's Preliminary Invalidity Contentions, Exhibit 224-A-47, *Webroot, Inc. and Open Text, Inc. v. Trend Micro Inc.*, No. 6:22-CV-00239-ADA-DTG, W.D. Tex., Sep. 13, 2022, 110 pgs.
Defendant's Preliminary Invalidity Contentions, Exhibit 224-A-48, *Webroot, Inc. and Open Text, Inc. v. Trend Micro Inc.*, No. 6:22-CV-00239-ADA-DTG, W.D. Tex., Sep. 13, 2022, 45 pgs.
Defendant's Preliminary Invalidity Contentions, Exhibit 224-A-49, *Webroot, Inc. and Open Text, Inc. v. Trend Micro Inc.*, No. 6:22-CV-00239-ADA-DTG, W.D. Tex., Sep. 13, 2022, 112 pgs.
Defendant's Preliminary Invalidity Contentions, Exhibit 224-A-50, *Webroot, Inc. and Open Text, Inc. v. Trend Micro Inc.*, No. 6:22-CV-00239-ADA-DTG, W.D. Tex., Sep. 13, 2022, 187 pgs.

(56) References Cited

OTHER PUBLICATIONS

Defendant's Preliminary Invalidity Contentions, Exhibit 224-B, *Webroot, Inc. and Open Text, Inc. v. Trend Micro Inc.*, No. 6:22-CV-00239-ADA-DTG, W.D. Tex., Sep. 13, 2022, 93 pgs.
Defendant's Preliminary Invalidity Contentions, Exhibit 591-A-1, *Webroot, Inc. and Open Text, Inc. v. Trend Micro Inc.*, No. 6:22-CV-00239-ADA-DTG, W.D. Tex., Sep. 13, 2022, 35 pgs.
Defendant's Preliminary Invalidity Contentions, Exhibit 591-A-2, *Webroot, Inc. and Open Text, Inc. v. Trend Micro Inc.*, No. 6:22-CV-00239-ADA-DTG, W.D. Tex., Sep. 13, 2022, 28 pgs.
Defendant's Preliminary Invalidity Contentions, Exhibit 591-A-3, *Webroot, Inc. and Open Text, Inc. v. Trend Micro Inc.*, No. 6:22-CV-00239-ADA-DTG, W.D. Tex., Sep. 13, 2022, 27 pgs.
Defendant's Preliminary Invalidity Contentions, Exhibit 591-A-4, *Webroot, Inc. and Open Text, Inc. v. Trend Micro Inc.*, No. 6:22-CV-00239-ADA-DTG, W.D. Tex., Sep. 13, 2022, 38 pgs.
Defendant's Preliminary Invalidity Contentions, Exhibit 591-A-5, *Webroot, Inc. and Open Text, Inc. v. Trend Micro Inc.*, No. 6:22-CV-00239-ADA-DTG, W.D. Tex., Sep. 13, 2022, 25 pgs.
Defendant's Preliminary Invalidity Contentions, Exhibit 591-A-6, *Webroot, Inc. and Open Text, Inc. v. Trend Micro Inc.*, No. 6:22-CV-00239-ADA-DTG, W.D. Tex., Sep. 13, 2022, 27 pgs.
Defendant's Preliminary Invalidity Contentions, Exhibit 591-A-7, *Webroot, Inc. and Open Text, Inc. v. Trend Micro Inc.*, No. 6:22-CV-00239-ADA-DTG, W.D. Tex., Sep. 13, 2022, 25 pgs.
Defendant's Preliminary Invalidity Contentions, Exhibit 591-A-8, *Webroot, Inc. and Open Text, Inc. v. Trend Micro Inc.*, No. 6:22-CV-00239-ADA-DTG, W.D. Tex., Sep. 13, 2022, 28 pgs.
Defendant's Preliminary Invalidity Contentions, Exhibit 591-A-9, *Webroot, Inc. and Open Text, Inc. v. Trend Micro Inc.*, No. 6:22-CV-00239-ADA-DTG, W.D. Tex., Sep. 13, 2022, 34 pgs.
Defendant's Preliminary Invalidity Contentions, Exhibit 591-A-10, *Webroot, Inc. and Open Text, Inc. v. Trend Micro Inc.*, No. 6:22-CV-00239-ADA-DTG, W.D. Tex., Sep. 13, 2022, 89 pgs.
Defendant's Preliminary Invalidity Contentions, Exhibit 591-A-11, *Webroot, Inc. and Open Text, Inc. v. Trend Micro Inc.*, No. 6:22-CV-00239-ADA-DTG, W.D. Tex., Sep. 13, 2022, 42 pgs.
Defendant's Preliminary Invalidity Contentions, Exhibit 591-A-12, *Webroot, Inc. and Open Text, Inc. v. Trend Micro Inc.*, No. 6:22-CV-00239-ADA-DTG, W.D. Tex., Sep. 13, 2022, 50 pgs.
Defendant's Preliminary Invalidity Contentions, Exhibit 591-A-13, *Webroot, Inc. and Open Text, Inc. v. Trend Micro Inc.*, No. 6:22-CV-00239-ADA-DTG, W.D. Tex., Sep. 13, 2022, 69 pgs.
Defendant's Preliminary Invalidity Contentions, Exhibit 591-A-14, *Webroot, Inc. and Open Text, Inc. v. Trend Micro Inc.*, No. 6:22-CV-00239-ADA-DTG, W.D. Tex., Sep. 13, 2022, 59 pgs.
Defendant's Preliminary Invalidity Contentions, Exhibit 591-A-15, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 591-A-16, *Webroot, Inc. and Open Text, Inc. v. Trend Micro Inc.*, No. 6:22-CV-00239-ADA-DTG, W.D. Tex., Sep. 13, 2022, 43 pgs.
Defendant's Preliminary Invalidity Contentions, Exhibit 591-A-17, *Webroot, Inc. and Open Text, Inc. v. Trend Micro Inc.*, No. 6:22-CV-00239-ADA-DTG, W.D. Tex., Sep. 13, 2022, 47 pgs.
Defendant's Preliminary Invalidity Contentions, Exhibit 591-A-18, *Webroot, Inc. and Open Text, Inc. v. Trend Micro Inc.*, No. 6:22-CV-00239-ADA-DTG, W.D. Tex., Sep. 13, 2022, 46 pgs.
Defendant's Preliminary Invalidity Contentions, Exhibit 591-A-19, *Webroot, Inc. and Open Text, Inc. v. Trend Micro Inc.*, No. 6:22-CV-00239-ADA-DTG, W.D. Tex., Sep. 13, 2022, 99 pgs.
Defendant's Preliminary Invalidity Contentions, Exhibit 591-A-20, *Webroot, Inc. and Open Text, Inc. v. Trend Micro Inc.*, No. 6:22-CV-00239-ADA-DTG, W.D. Tex., Sep. 13, 2022, 33 pgs.
Defendant's Preliminary Invalidity Contentions, Exhibit 591-A-21, *Webroot, Inc. and Open Text, Inc. v. Trend Micro Inc.*, No. 6:22-CV-00239-ADA-DTG, W.D. Tex., Sep. 13, 2022, 38 pgs.
Defendant's Preliminary Invalidity Contentions, Exhibit 591-A-22, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 591-A-23, *Webroot, Inc. and Open Text, Inc. v. Trend Micro Inc.*, No. 6:22-CV-00239-ADA-DTG, W.D. Tex., Sep. 13, 2022, 31 pgs.
Defendant's Preliminary Invalidity Contentions, Exhibit 591-A-24, *Webroot, Inc. and Open Text, Inc. v. Trend Micro Inc.*, No. 6:22-CV-00239-ADA-DTG, W.D. Tex., Sep. 13, 2022, 75 pgs.
Defendant's Preliminary Invalidity Contentions, Exhibit 591-A-25, *Webroot, Inc. and Open Text, Inc. v. Trend Micro Inc.*, No. 6:22-CV-00239-ADA-DTG, W.D. Tex., Sep. 13, 2022, 54 pgs.
Defendant's Preliminary Invalidity Contentions, Exhibit 591-A-26, *Webroot, Inc. and Open Text, Inc. v. Trend Micro Inc.*, No. 6:22-CV-00239-ADA-DTG, W.D. Tex., Sep. 13, 2022, 25 pgs.
Defendant's Preliminary Invalidity Contentions, Exhibit 591-A-27, *Webroot, Inc. and Open Text, Inc. v. Trend Micro Inc.*, No. 6:22-CV-00239-ADA-DTG, W.D. Tex., Sep. 13, 2022, 29 pgs.
Defendant's Preliminary Invalidity Contentions, Exhibit 591-A-28, *Webroot, Inc. and Open Text, Inc. v. Trend Micro Inc.*, No. 6:22-CV-00239-ADA-DTG, W.D. Tex., Sep. 13, 2022, 164 pgs.
Defendant's Preliminary Invalidity Contentions, Exhibit 591-A-29, *Webroot, Inc. and Open Text, Inc. v. Trend Micro Inc.*, No. 6:22-CV-00239-ADA-DTG, W.D. Tex., Sep. 13, 2022, 62 pgs.
Defendant's Preliminary Invalidity Contentions, Exhibit 591-A-30, *Webroot, Inc. and Open Text, Inc. v. Trend Micro Inc.*, No. 6:22-CV-00239-ADA-DTG, W.D. Tex., Sep. 13, 2022, 41 pgs.
Defendant's Preliminary Invalidity Contentions, Exhibit 591-A-31, *Webroot, Inc. and Open Text, Inc. v. Trend Micro Inc.*, No. 6:22-CV-00239-ADA-DTG, W.D. Tex., Sep. 13, 2022, 124 pgs.
Defendant's Preliminary Invalidity Contentions, Exhibit 591-A-32, *Webroot, Inc. and Open Text, Inc. v. Trend Micro Inc.*, No. 6:22-CV-00239-ADA-DTG, W.D. Tex., Sep. 13, 2022, 123 pgs.
Defendant's Preliminary Invalidity Contentions, Exhibit 591-A-33, *Webroot, Inc. and Open Text, Inc. v. Trend Micro Inc.*, No. 6:22-CV-00239-ADA-DTG, W.D. Tex., Sep. 13, 2022, 107 pgs.
Defendant's Preliminary Invalidity Contentions, Exhibit 591-A-34, *Webroot, Inc. and Open Text, Inc. v. Trend Micro Inc.*, No. 6:22-CV-00239-ADA-DTG, W.D. Tex., Sep. 13, 2022, 67 pgs.
Defendant's Preliminary Invalidity Contentions, Exhibit 591-A-35, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 591-A-36, *Webroot, Inc. and Open Text, Inc. v. Trend Micro Inc.*, No. 6:22-CV-00239-ADA-DTG, W.D. Tex., Sep. 13, 2022, 82 pgs.
Defendant's Preliminary Invalidity Contentions, Exhibit 591-A-37, *Webroot, Inc. and Open Text, Inc. v. Trend Micro Inc.*, No. 6:22-CV-00239-ADA-DTG, W.D. Tex., Sep. 13, 2022, 93 pgs.
Defendant's Preliminary Invalidity Contentions, Exhibit 591-A-38, *Webroot, Inc. and Open Text, Inc. v. Trend Micro Inc.*, No. 6:22-CV-00239-ADA-DTG, W.D. Tex., Sep. 13, 2022, 93 pgs.
Defendant's Preliminary Invalidity Contentions, Exhibit 591-A-39, *Webroot, Inc. and Open Text, Inc. v. Trend Micro Inc.*, No. 6:22-CV-00239-ADA-DTG, W.D. Tex., Sep. 13, 2022, 81 pgs.
Defendant's Preliminary Invalidity Contentions, Exhibit 591-A-40, *Webroot, Inc. and Open Text, Inc. v. Trend Micro Inc.*, No. 6:22-CV-00239-ADA-DTG, W.D. Tex., Sep. 13, 2022, 25 pgs.
Defendant's Preliminary Invalidity Contentions, Exhibit 591-A-41, *Webroot, Inc. and Open Text, Inc. v. Trend Micro Inc.*, No. 6:22-CV-00239-ADA-DTG, W.D. Tex., Sep. 13, 2022, 22 pgs.
Defendant's Preliminary Invalidity Contentions, Exhibit 591-A-42, *Webroot, Inc. and Open Text, Inc. v. Trend Micro Inc.*, No. 6:22-CV-00239-ADA-DTG, W.D. Tex., Sep. 13, 2022, 43 pgs.
Defendant's Preliminary Invalidity Contentions, Exhibit 591-A-43, *Webroot, Inc. and Open Text, Inc. v. Trend Micro Inc.*, No. 6:22-CV-00239-ADA-DTG, W.D. Tex., Sep. 13, 2022, 43 pgs.
Defendant's Preliminary Invalidity Contentions, Exhibit 591-A-44, *Webroot, Inc. and Open Text, Inc. v. Trend Micro Inc.*, No. 6:22-CV-00239-ADA-DTG, W.D. Tex., Sep. 13, 2022, 67 pgs.
Defendant's Preliminary Invalidity Contentions, Exhibit 591-B, *Webroot, Inc. and Open Text, Inc. v. Trend Micro Inc.*, No. 6:22-CV-00239-ADA-DTG, W.D. Tex., Sep. 13, 2022, 51 pgs.
Defendant's Preliminary Invalidity Contentions, Exhibit 243-A-1, *Webroot, Inc. and Open Text, Inc. v. Trend Micro Inc.*, No. 6:22-CV-00239-ADA-DTG, W.D. Tex., Feb. 21, 2023, 27 pgs.

(56) References Cited

OTHER PUBLICATIONS

Defendant's Preliminary Invalidity Contentions, Exhibit 243-A-2, *Webroot, Inc. and Open Text, Inc. v. Trend Micro Inc.*, No. 6:22-CV-00239-ADA-DTG, W.D. Tex., Feb. 21, 2023, 59 pgs.
Defendant's Preliminary Invalidity Contentions, Exhibit 243-A-3, *Webroot, Inc. and Open Text, Inc. v. Trend Micro Inc.*, No. 6:22-CV-00239-ADA-DTG, W.D. Tex., Feb. 21, 2023, 39 pgs.
Defendant's Preliminary Invalidity Contentions, Exhibit 243-A-4, *Webroot, Inc. and Open Text, Inc. v. Trend Micro Inc.*, No. 6:22-CV-00239-ADA-DTG, W.D. Tex., Feb. 21, 2023, 34 pgs.
Defendant's Preliminary Invalidity Contentions, Exhibit 243-A-5, *Webroot, Inc. and Open Text, Inc. v. Trend Micro Inc.*, No. 6:22-CV-00239-ADA-DTG, W.D. Tex., Feb. 21, 2023, 101 pgs.
Defendant's Preliminary Invalidity Contentions, Exhibit 243-A-6, *Webroot, Inc. and Open Text, Inc. v. Trend Micro Inc.*, No. 6:22-CV-00239-ADA-DTG, W.D. Tex., Feb. 21, 2023, 39 pgs.
Defendant's Preliminary Invalidity Contentions, Exhibit 243-A-7, *Webroot, Inc. and Open Text, Inc. v. Trend Micro Inc.*, No. 6:22-CV-00239-ADA-DTG, W.D. Tex., Feb. 21, 2023, 80 pgs.
Defendant's Preliminary Invalidity Contentions, Exhibit 243-A-8, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 243-A-9, *Webroot, Inc. and Open Text, Inc. v. Trend Micro Inc.*, No. 6:22-CV-00239-ADA-DTG, W.D. Tex., Feb. 21, 2023, 103 pgs.
Defendant's Preliminary Invalidity Contentions, Exhibit 243-A-10, *Webroot, Inc. and Open Text, Inc. v. Trend Micro Inc.*, No. 6:22-CV-00239-ADA-DTG, W.D. Tex., Feb. 21, 2023, 57 pgs.
Defendant's Preliminary Invalidity Contentions, Exhibit 243-A-11, *Webroot, Inc. and Open Text, Inc. v. Trend Micro Inc.*, No. 6:22-CV-00239-ADA-DTG, W.D. Tex., Feb. 21, 2023, 98 pgs.
Defendant's Preliminary Invalidity Contentions, Exhibit 243-A-12, *Webroot, Inc. and Open Text, Inc. v. Trend Micro Inc.*, No. 6:22-CV-00239-ADA-DTG, W.D. Tex., Feb. 21, 2023, 71 pgs.
Defendant's Preliminary Invalidity Contentions, Exhibit 243-A-13, *Webroot, Inc. and Open Text, Inc. v. Trend Micro Inc.*, No. 6:22-CV-00239-ADA-DTG, W.D. Tex., Feb. 21, 2023, 49 pgs.
Defendant's Preliminary Invalidity Contentions, Exhibit 243-A-14, *Webroot, Inc. and Open Text, Inc. v. Trend Micro Inc.*, No. 6:22-CV-00239-ADA-DTG, W.D. Tex., Feb. 21, 2023, 60 pgs.
Defendant's Preliminary Invalidity Contentions, Exhibit 243-A-15, *Webroot, Inc. and Open Text, Inc. v. Trend Micro Inc.*, No. 6:22-CV-00239-ADA-DTG, W.D. Tex., Feb. 21, 2023, 38 pgs.
Defendant's Preliminary Invalidity Contentions, Exhibit 243-A-16, *Webroot, Inc. and Open Text, Inc. v. Trend Micro Inc.*, No. 6:22-CV-00239-ADA-DTG, W.D. Tex., Feb. 21, 2023, 54 pgs.
Defendant's Preliminary Invalidity Contentions, Exhibit 243-A-17, *Webroot, Inc. and Open Text, Inc. v. Trend Micro Inc.*, No. 6:22-CV-00239-ADA-DTG, W.D. Tex., Feb. 21, 2023, 44 pgs.
Defendant's Preliminary Invalidity Contentions, Exhibit 243-A-18, *Webroot, Inc. and Open Text, Inc. v. Trend Micro Inc.*, No. 6:22-CV-00239-ADA-DTG, W.D. Tex., Feb. 21, 2023, 48 pgs.
Defendant's Preliminary Invalidity Contentions, Exhibit 243-A-19, *Webroot, Inc. and Open Text, Inc. v. Trend Micro Inc.*, No. 6:22-CV-00239-ADA-DTG, W.D. Tex., Feb. 21, 2023, 37 pgs.
Defendant's Preliminary Invalidity Contentions, Exhibit 243-A-20, *Webroot, Inc. and Open Text, Inc. v. Trend Micro Inc.*, No. 6:22-CV-00239-ADA-DTG, W.D. Tex., Feb. 21, 2023, 32 pgs.
Defendant's Preliminary Invalidity Contentions, Exhibit 243-A-21, *Webroot, Inc. and Open Text, Inc. v. Trend Micro Inc.*, No. 6:22-CV-00239-ADA-DTG, W.D. Tex., Feb. 21, 2023, 240 pgs.
Defendant's Preliminary Invalidity Contentions, Exhibit 243-A-22, *Webroot, Inc. and Open Text, Inc. v. Trend Micro Inc.*, No. 6:22-CV-00239-ADA-DTG, W.D. Tex., Feb. 21, 2023, 117 pgs.
Defendant's Preliminary Invalidity Contentions, Exhibit 243-A-23, *Webroot, Inc. and Open Text, Inc. v. Trend Micro Inc.*, No. 6:22-CV-00239-ADA-DTG, W.D. Tex., Feb. 21, 2023, 58 pgs.
Defendant's Preliminary Invalidity Contentions, Exhibit 243-A-24, *Webroot, Inc. and Open Text, Inc. v. Trend Micro Inc.*, No. 6:22-CV-00239-ADA-DTG, W.D. Tex., Feb. 21, 2023, 61 pgs.
Defendant's Preliminary Invalidity Contentions, Exhibit 243-A-25, *Webroot, Inc. and Open Text, Inc. v. Trend Micro Inc.*, No. 6:22-CV-00239-ADA-DTG, W.D. Tex., Feb. 21, 2023, 50 pgs.
Defendant's Preliminary Invalidity Contentions, Exhibit 243-A-26, *Webroot, Inc. and Open Text, Inc. v. Trend Micro Inc.*, No. 6:22-CV-00239-ADA-DTG, W.D. Tex., Feb. 21, 2023, 40 pgs.
Defendant's Preliminary Invalidity Contentions, Exhibit 243-A-27, *Webroot, Inc. and Open Text, Inc. v. Trend Micro Inc.*, No. 6:22-CV-00239-ADA-DTG, W.D. Tex., Feb. 21, 2023, 49 pgs.
Defendant's Preliminary Invalidity Contentions, Exhibit 243-A-28, *Webroot, Inc. and Open Text, Inc. v. Trend Micro Inc.*, No. 6:22-CV-00239-ADA-DTG, W.D. Tex., Feb. 21, 2023, 51 pgs.
Defendant's Preliminary Invalidity Contentions, Exhibit 243-A-29, *Webroot, Inc. and Open Text, Inc. v. Trend Micro Inc.*, No. 6:22-CV-00239-ADA-DTG, W.D. Tex., Feb. 21, 2023, 110 pgs.
Defendant's Preliminary Invalidity Contentions, Exhibit 243-A-30, *Webroot, Inc. and Open Text, Inc. v. Trend Micro Inc.*, No. 6:22-CV-00239-ADA-DTG, W.D. Tex., Feb. 21, 2023, 76 pgs.
Defendant's Preliminary Invalidity Contentions, Exhibit 243-A-32, *Webroot, Inc. and Open Text, Inc. v. Trend Micro Inc.*, No. 6:22-CV-00239-ADA-DTG, W.D. Tex., Feb. 21, 2023, 107 pgs.
Defendant's Preliminary Invalidity Contentions, Exhibit 243-A-33, *Webroot, Inc. and Open Text, Inc. v. Trend Micro Inc.*, No. 6:22-CV-00239-ADA-DTG, W.D. Tex., Feb. 21, 2023, 137 pgs.
Defendant's Preliminary Invalidity Contentions, Exhibit 243-A-34, *Webroot, Inc. and Open Text, Inc. v. Trend Micro Inc.*, No. 6:22-CV-00239-ADA-DTG, W.D. Tex., Feb. 21, 2023, 93 pgs.
Defendant's Preliminary Invalidity Contentions, Exhibit 243-A-35, *Webroot, Inc. and Open Text, Inc. v. Trend Micro Inc.*, No. 6:22-CV-00239-ADA-DTG, W.D. Tex., Feb. 21, 2023, 72 pgs.
Defendant's Preliminary Invalidity Contentions, Exhibit 243-B, *Webroot, Inc. and Open Text, Inc. v. Trend Micro Inc.*, No. 6:22-CV-00239-ADA-DTG, W.D. Tex., Feb. 21, 2023, 115 pgs.
Defendant's Preliminary Invalidity Contentions, Exhibit 932-A-1, *Webroot, Inc. and Open Text, Inc. v. Trend Micro Inc.*, No. 6:22-CV-00239-ADA-DTG, W.D. Tex., Feb. 21, 2023, 28 pgs.
Defendant's Preliminary Invalidity Contentions, Exhibit 932-A-2, *Webroot, Inc. and Open Text, Inc. v. Trend Micro Inc.*, No. 6:22-CV-00239-ADA-DTG, W.D. Tex., Feb. 21, 2023, 57 pgs.
Defendant's Preliminary Invalidity Contentions, Exhibit 932-A-3, *Webroot, Inc. and Open Text, Inc. v. Trend Micro Inc.*, No. 6:22-CV-00239-ADA-DTG, W.D. Tex., Feb. 21, 2023, 46 pgs.
Defendant's Preliminary Invalidity Contentions, Exhibit 932-A-4, *Webroot, Inc. and Open Text, Inc. v. Trend Micro Inc.*, No. 6:22-CV-00239-ADA-DTG, W.D. Tex., Feb. 21, 2023, 36 pgs.
Defendant's Preliminary Invalidity Contentions, Exhibit 932-A-5, *Webroot, Inc. and Open Text, Inc. v. Trend Micro Inc.*, No. 6:22-CV-00239-ADA-DTG, W.D. Tex., Feb. 21, 2023, 122 pgs.
Defendant's Preliminary Invalidity Contentions, Exhibit 932-A-6, *Webroot, Inc. and Open Text, Inc. v. Trend Micro Inc.*, No. 6:22-CV-00239-ADA-DTG, W.D. Tex., Feb. 21, 2023, 39 pgs.
Defendant's Preliminary Invalidity Contentions, Exhibit 932-A-7, *Webroot, Inc. and Open Text, Inc. v. Trend Micro Inc.*, No. 6:22-CV-00239-ADA-DTG, W.D. Tex., Feb. 21, 2023, 95 pgs.
Defendant's Preliminary Invalidity Contentions, Exhibit 932-A-8, *Webroot, Inc. and Open Text, Inc. v. Trend Micro Inc.*, No. 6:22-CV-00239-ADA-DTG, W.D. Tex., Feb. 21, 2023, 73 pgs.
Defendant's Preliminary Invalidity Contentions, Exhibit 932-A-9, *Webroot, Inc. and Open Text, Inc. v. Trend Micro Inc.*, No. 6:22-CV-00239-ADA-DTG, W.D. Tex., Feb. 21, 2023, 119 pgs.
Defendant's Preliminary Invalidity Contentions, Exhibit 932-A-10, *Webroot, Inc. and Open Text, Inc. v. Trend Micro Inc.*, No. 6:22-CV-00239-ADA-DTG, W.D. Tex., Feb. 21, 2023, 66 pgs.
Defendant's Preliminary Invalidity Contentions, Exhibit 932-A-11, *Webroot, Inc. and Open Text, Inc. v. Trend Micro Inc.*, No. 6:22-CV-00239-ADA-DTG, W.D. Tex., Feb. 21, 2023, 115 pgs.
Defendant's Preliminary Invalidity Contentions, Exhibit 932-A-12, *Webroot, Inc. and Open Text, Inc. v. Trend Micro Inc.*, No. 6:22-CV-00239-ADA-DTG, W.D. Tex., Feb. 21, 2023, 81 pgs.
Defendant's Preliminary Invalidity Contentions, Exhibit 932-A-13, *Webroot, Inc. and Open Text, Inc. v. Trend Micro Inc.*, No. 6:22-CV-00239-ADA-DTG, W.D. Tex., Feb. 21, 2023, 60 pgs.

(56) References Cited

OTHER PUBLICATIONS

Defendant's Preliminary Invalidity Contentions, Exhibit 932-A-14, *Webroot, Inc. and Open Text, Inc. v. Trend Micro Inc.*, No. 6:22-CV-00239-ADA-DTG, W.D. Tex., Feb. 21, 2023, 60 pgs.
Defendant's Preliminary Invalidity Contentions, Exhibit 932-A-15, *Webroot, Inc. and Open Text, Inc. v. Trend Micro Inc.*, No. 6:22-CV-00239-ADA-DTG, W.D. Tex., Feb. 21, 2023, 43 pgs.
Defendant's Preliminary Invalidity Contentions, Exhibit 932-A-16, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 932-A-17, *Webroot, Inc. and Open Text, Inc. v. Trend Micro Inc.*, No. 6:22-CV-00239-ADA-DTG, W.D. Tex., Feb. 21, 2023, 49 pgs.
Defendant's Preliminary Invalidity Contentions, Exhibit 932-A-18, *Webroot, Inc. and Open Text, Inc. v. Trend Micro Inc.*, No. 6:22-CV-00239-ADA-DTG, W.D. Tex., Feb. 21, 2023, 66 pgs.
Defendant's Preliminary Invalidity Contentions, Exhibit 932-A-19, *Webroot, Inc. and Open Text, Inc. v. Trend Micro Inc.*, No. 6:22-CV-00239-ADA-DTG, W.D. Tex., Feb. 21, 2023, 44 pgs.
Defendant's Preliminary Invalidity Contentions, Exhibit 932-A-20, *Webroot, Inc. and Open Text, Inc. v. Trend Micro Inc.*, No. 6:22-CV-00239-ADA-DTG, W.D. Tex., Feb. 21, 2023, 35 pgs.
Defendant's Preliminary Invalidity Contentions, Exhibit 932-A-21, *Webroot, Inc. and Open Text, Inc. v. Trend Micro Inc.*, No. 6:22-CV-00239-ADA-DTG, W.D. Tex., Feb. 21, 2023, 298 pgs.
Defendant's Preliminary Invalidity Contentions, Exhibit 932-A-22, *Webroot, Inc. and Open Text, Inc. v. Trend Micro Inc.*, No. 6:22-CV-00239-ADA-DTG, W.D. Tex., Feb. 21, 2023, 158 pgs.
Defendant's Preliminary Invalidity Contentions, Exhibit 932-A-23, *Webroot, Inc. and Open Text, Inc. v. Trend Micro Inc.*, No. 6:22-CV-00239-ADA-DTG, W.D. Tex., Feb. 21, 2023, 70 pgs.
Defendant's Preliminary Invalidity Contentions, Exhibit 932-A-24, *Webroot, Inc. and Open Text, Inc. v. Trend Micro Inc.*, No. 6:22-CV-00239-ADA-DTG, W.D. Tex., Feb. 21, 2023, 65 pgs.
Defendant's Preliminary Invalidity Contentions, Exhibit 932-A-25, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 932-A-26, *Webroot, Inc. and Open Text, Inc. v. Trend Micro Inc.*, No. 6:22-CV-00239-ADA-DTG, W.D. Tex., Feb. 21, 2023, 63 pgs.
Defendant's Preliminary Invalidity Contentions, Exhibit 932-A-27, *Webroot, Inc. and Open Text, Inc. v. Trend Micro Inc.*, No. 6:22-CV-00239-ADA-DTG, W.D. Tex., Feb. 21, 2023, 59 pgs.
Defendant's Preliminary Invalidity Contentions, Exhibit 932-A-28, *Webroot, Inc. and Open Text, Inc. v. Trend Micro Inc.*, No. 6:22-CV-00239-ADA-DTG, W.D. Tex., Feb. 21, 2023, 61 pgs.
Defendant's Preliminary Invalidity Contentions, Exhibit 932-A-29, *Webroot, Inc. and Open Text, Inc. v. Trend Micro Inc.*, No. 6:22-CV-00239-ADA-DTG, W.D. Tex., Feb. 21, 2023, 145 pgs.
Defendant's Preliminary Invalidity Contentions, Exhibit 932-A-30, *Webroot, Inc. and Open Text, Inc. v. Trend Micro Inc.*, No. 6:22-CV-00239-ADA-DTG, W.D. Tex., Feb. 21, 2023, 89 pgs.
Defendant's Preliminary Invalidity Contentions, Exhibit 932-A-32, *Webroot, Inc. and Open Text, Inc. v. Trend Micro Inc.*, No. 6:22-CV-00239-ADA-DTG, W.D. Tex., Feb. 21, 2023, 130 pgs.
Defendant's Preliminary Invalidity Contentions, Exhibit 932-A-33, *Webroot, Inc. and Open Text, Inc. v. Trend Micro Inc.*, No. 6:22-CV-00239-ADA-DTG, W.D. Tex., Feb. 21, 2023, 165 pgs.
Defendant's Preliminary Invalidity Contentions, Exhibit 932-A-34, *Webroot, Inc. and Open Text, Inc. v. Trend Micro Inc.*, No. 6:22-CV-00239-ADA-DTG, W.D. Tex., Feb. 21, 2023, 110 pgs.
Defendant's Preliminary Invalidity Contentions, Exhibit 932-A-35, *Webroot, Inc. and Open Text, Inc. v. Trend Micro Inc.*, No. 6:22-CV-00239-ADA-DTG, W.D. Tex., Feb. 21, 2023, 80 pgs.
Defendant's Preliminary Invalidity Contentions, Exhibit 932-B, *Webroot, Inc. and Open Text, Inc. v. Trend Micro Inc.*, No. 6:22-CV-00239-ADA-DTG, W.D. Tex., Feb. 21, 2023, 141 pgs.
Defendant's Preliminary Invalidity Contentions, Exhibit 244-A-1, *Webroot, Inc. and Open Text, Inc. v. Trend Micro Inc.*, No. 6:22-CV-00239-ADA-DTG, W.D. Tex., Feb. 21, 2023, 39 pgs.
Defendant's Preliminary Invalidity Contentions, Exhibit 244-A-2, *Webroot, Inc. and Open Text, Inc. v. Trend Micro Inc.*, No. 6:22-CV-00239-ADA-DTG, W.D. Tex., Feb. 21, 2023, 66 pgs.
Defendant's Preliminary Invalidity Contentions, Exhibit 244-A-3, *Webroot, Inc. and Open Text, Inc. v. Trend Micro Inc.*, No. 6:22-CV-00239-ADA-DTG, W.D. Tex., Feb. 21, 2023, 67 pgs.
Defendant's Preliminary Invalidity Contentions, Exhibit 244-A-4, *Webroot, Inc. and Open Text, Inc. v. Trend Micro Inc.*, No. 6:22-CV-00239-ADA-DTG, W.D. Tex., Feb. 21, 2023, 57 pgs.
Defendant's Preliminary Invalidity Contentions, Exhibit 244-A-5, *Webroot, Inc. and Open Text, Inc. v. Trend Micro Inc.*, No. 6:22-CV-00239-ADA-DTG, W.D. Tex., Feb. 21, 2023, 106 pgs.
Defendant's Preliminary Invalidity Contentions, Exhibit 244-A-6, *Webroot, Inc. and Open Text, Inc. v. Trend Micro Inc.*, No. 6:22-CV-00239-ADA-DTG, W.D. Tex., Feb. 21, 2023, 47 pgs.
Defendant's Preliminary Invalidity Contentions, Exhibit 244-A-7, *Webroot, Inc. and Open Text, Inc. v. Trend Micro Inc.*, No. 6:22-CV-00239-ADA-DTG, W.D. Tex., Feb. 21, 2023, 46 pgs.
Defendant's Preliminary Invalidity Contentions, Exhibit 244-A-8, *Webroot, Inc. and Open Text, Inc. v. Trend Micro Inc.*, No. 6:22-CV-00239-ADA-DTG, W.D. Tex., Feb. 21, 2023, 69 pgs.
Defendant's Preliminary Invalidity Contentions, Exhibit 244-A-9, *Webroot, Inc. and Open Text, Inc. v. Trend Micro Inc.*, No. 6:22-CV-00239-ADA-DTG, W.D. Tex., Feb. 21, 2023, 72 pgs.
Defendant's Preliminary Invalidity Contentions, Exhibit 244-A-10, *Webroot, Inc. and Open Text, Inc. v. Trend Micro Inc.*, No. 6:22-CV-00239-ADA-DTG, W.D. Tex., Feb. 21, 2023, 81 pgs.
Defendant's Preliminary Invalidity Contentions, Exhibit 244-A-11, *Webroot, Inc. and Open Text, Inc. v. Trend Micro Inc.*, No. 6:22-CV-00239-ADA-DTG, W.D. Tex., Feb. 21, 2023, 77 pgs.
Defendant's Preliminary Invalidity Contentions, Exhibit 244-A-12, *Webroot, Inc. and Open Text, Inc. v. Trend Micro Inc.*, No. 6:22-CV-00239-ADA-DTG, W.D. Tex., Feb. 21, 2023, 64 pgs.
Defendant's Preliminary Invalidity Contentions, Exhibit 244-A-13, *Webroot, Inc. and Open Text, Inc. v. Trend Micro Inc.*, No. 6:22-CV-00239-ADA-DTG, W.D. Tex., Feb. 21, 2023, 57 pgs.
Defendant's Preliminary Invalidity Contentions, Exhibit 244-A-14, *Webroot, Inc. and Open Text, Inc. v. Trend Micro Inc.*, No. 6:22-CV-00239-ADA-DTG, W.D. Tex., Feb. 21, 2023, 71 pgs.
Defendant's Preliminary Invalidity Contentions, Exhibit 244-A-15, *Webroot, Inc. and Open Text, Inc. v. Trend Micro Inc.*, No. 6:22-CV-00239-ADA-DTG, W.D. Tex., Feb. 21, 2023, 43 pgs.
Defendant's Preliminary Invalidity Contentions, Exhibit 244-A-16, *Webroot, Inc. and Open Text, Inc. v. Trend Micro Inc.*, No. 6:22-CV-00239-ADA-DTG, W.D. Tex., Feb. 21, 2023, 73 pgs.
Defendant's Preliminary Invalidity Contentions, Exhibit 244-A-17, *Webroot, Inc. and Open Text, Inc. v. Trend Micro Inc.*, No. 6:22-CV-00239-ADA-DTG, W.D. Tex., Feb. 21, 2023, 49 pgs.
Defendant's Preliminary Invalidity Contentions, Exhibit 244-A-18, *Webroot, Inc. and Open Text, Inc. v. Trend Micro Inc.*, No. 6:22-CV-00239-ADA-DTG, W.D. Tex., Feb. 21, 2023, 42 pgs.
Defendant's Preliminary Invalidity Contentions, Exhibit 244-A-19, *Webroot, Inc. and Open Text, Inc. v. Trend Micro Inc.*, No. 6:22-CV-00239-ADA-DTG, W.D. Tex., Feb. 21, 2023, 38 pgs.
Defendant's Preliminary Invalidity Contentions, Exhibit 244-A-20, *Webroot, Inc. and Open Text, Inc. v. Trend Micro Inc.*, No. 6:22-CV-00239-ADA-DTG, W.D. Tex., Feb. 21, 2023, 36 pgs.
Defendant's Preliminary Invalidity Contentions, Exhibit 244-A-21, *Webroot, Inc. and Open Text, Inc. v. Trend Micro Inc.*, No. 6:22-CV-00239-ADA-DTG, W.D. Tex., Feb. 21, 2023, 215 pgs.
Defendant's Preliminary Invalidity Contentions, Exhibit 244-A-22, *Webroot, Inc. and Open Text, Inc. v. Trend Micro Inc.*, No. 6:22-CV-00239-ADA-DTG, W.D. Tex., Feb. 21, 2023, 140 pgs.
Defendant's Preliminary Invalidity Contentions, Exhibit 244-A-23, *Webroot, Inc. and Open Text, Inc. v. Trend Micro Inc.*, No. 6:22-CV-00239-ADA-DTG, W.D. Tex., Feb. 21, 2023, 68 pgs.
Defendant's Preliminary Invalidity Contentions, Exhibit 244-A-24, *Webroot, Inc. and Open Text, Inc. v. Trend Micro Inc.*, No. 6:22-CV-00239-ADA-DTG, W.D. Tex., Feb. 21, 2023, 301 pgs.
Defendant's Preliminary Invalidity Contentions, Exhibit 244-A-25, *Webroot, Inc. and Open Text, Inc. v. Trend Micro Inc.*, No. 6:22-CV-00239-ADA-DTG, W.D. Tex., Feb. 21, 2023, 113 pgs.

(56) References Cited

OTHER PUBLICATIONS

Defendant's Preliminary Invalidity Contentions, Exhibit 244-A-26, *Webroot, Inc. and Open Text, Inc. v. Trend Micro Inc.*, No. 6:22-CV-00239-ADA-DTG, W.D. Tex., Feb. 21, 2023, 207 pgs.
Defendant's Preliminary Invalidity Contentions, Exhibit 244-A-27, *Webroot, Inc. and Open Text, Inc. v. Trend Micro Inc.*, No. 6:22-CV-00239-ADA-DTG, W.D. Tex., Feb. 21, 2023, 187 pgs.
Defendant's Preliminary Invalidity Contentions, Exhibit 244-A-28, *Webroot, Inc. and Open Text, Inc. v. Trend Micro Inc.*, No. 6:22-CV-00239-ADA-DTG, W.D. Tex., Feb. 21, 2023, 88 pgs.
Defendant's Preliminary Invalidity Contentions, Exhibit 244-A-29, *Webroot, Inc. and Open Text, Inc. v. Trend Micro Inc.*, No. 6:22-CV-00239-ADA-DTG, W.D. Tex., Feb. 21, 2023, 88 pgs.
Defendant's Preliminary Invalidity Contentions, Exhibit 244-A-31, *Webroot, Inc. and Open Text, Inc. v. Trend Micro Inc.*, No. 6:22-CV-00239-ADA-DTG, W.D. Tex., Feb. 21, 2023, 122 pgs.
Defendant's Preliminary Invalidity Contentions, Exhibit 244-A-32, *Webroot, Inc. and Open Text, Inc. v. Trend Micro Inc.*, No. 6:22-CV-00239-ADA-DTG, W.D. Tex., Feb. 21, 2023, 136 pgs.
Defendant's Preliminary Invalidity Contentions, Exhibit 244-A-33, *Webroot, Inc. and Open Text, Inc. v. Trend Micro Inc.*, No. 6:22-CV-00239-ADA-DTG, W.D. Tex., Feb. 21, 2023, 86 pgs.
Defendant's Preliminary Invalidity Contentions, Exhibit 244-A-34, *Webroot, Inc. and Open Text, Inc. v. Trend Micro Inc.*, No. 6:22-CV-00239-ADA-DTG, W.D. Tex., Feb. 21, 2023, 105 pgs.
Defendant's Preliminary Invalidity Contentions, Exhibit 244-B, *Webroot, Inc. and Open Text, Inc. v. Trend Micro Inc.*, No. 6:22-CV-00239-ADA-DTG, W.D. Tex., Feb. 21, 2023, 294 pgs.
Defendant's Preliminary Invalidity Contentions, Exhibit 505-A-1, *Webroot, Inc. and Open Text, Inc. v. Trend Micro Inc.*, No. 6:22-CV-00239-ADA-DTG, W.D. Tex., Feb. 21, 2023, 47 pgs.
Defendant's Preliminary Invalidity Contentions, Exhibit 505-A-2, *Webroot, Inc. and Open Text, Inc. v. Trend Micro Inc.*, No. 6:22-CV-00239-ADA-DTG, W.D. Tex., Feb. 21, 2023, 40 pgs.
Defendant's Preliminary Invalidity Contentions, Exhibit 505-A-3, *Webroot, Inc. and Open Text, Inc. v. Trend Micro Inc.*, No. 6:22-CV-00239-ADA-DTG, W.D. Tex., Feb. 21, 2023, 48 pgs.
Defendant's Preliminary Invalidity Contentions, Exhibit 505-A-4, *Webroot, Inc. and Open Text, Inc. v. Trend Micro Inc.*, No. 6:22-CV-00239-ADA-DTG, W.D. Tex., Feb. 21, 2023, 35 pgs.
Defendant's Preliminary Invalidity Contentions, Exhibit 505-A-5, *Webroot, Inc. and Open Text, Inc. v. Trend Micro Inc.*, No. 6:22-CV-00239-ADA-DTG, W.D. Tex., Feb. 21, 2023, 161 pgs.
Defendant's Preliminary Invalidity Contentions, Exhibit 505-A-6, *Webroot, Inc. and Open Text, Inc. v. Trend Micro Inc.*, No. 6:22-CV-00239-ADA-DTG, W.D. Tex., Feb. 21, 2023, 34 pgs.
Defendant's Preliminary Invalidity Contentions, Exhibit 505-A-7, *Webroot, Inc. and Open Text, Inc. v. Trend Micro Inc.*, No. 6:22-CV-00239-ADA-DTG, W.D. Tex., Feb. 21, 2023, 34 pgs.
Defendant's Preliminary Invalidity Contentions, Exhibit 505-A-8, *Webroot, Inc. and Open Text, Inc. v. Trend Micro Inc.*, No. 6:22-CV-00239-ADA-DTG, W.D. Tex., Feb. 21, 2023, 52 pgs.
Defendant's Preliminary Invalidity Contentions, Exhibit 505-A-9, *Webroot, Inc. and Open Text, Inc. v. Trend Micro Inc.*, No. 6:22-CV-00239-ADA-DTG, W.D. Tex., Feb. 21, 2023, 33 pgs.
Defendant's Preliminary Invalidity Contentions, Exhibit 505-A-10, *Webroot, Inc. and Open Text, Inc. v. Trend Micro Inc.*, No. 6:22-CV-00239-ADA-DTG, W.D. Tex., Feb. 21, 2023, 34 pgs.
Defendant's Preliminary Invalidity Contentions, Exhibit 505-A-11, *Webroot, Inc. and Open Text, Inc. v. Trend Micro Inc.*, No. 6:22-CV-00239-ADA-DTG, W.D. Tex., Feb. 21, 2023, 51 pgs.
Defendant's Preliminary Invalidity Contentions, Exhibit 505-A-12, *Webroot, Inc. and Open Text, Inc. v. Trend Micro Inc.*, No. 6:22-CV-00239-ADA-DTG, W.D. Tex., Feb. 21, 2023, 46 pgs.
Defendant's Preliminary Invalidity Contentions, Exhibit 505-A-13, *Webroot, Inc. and Open Text, Inc. v. Trend Micro Inc.*, No. 6:22-CV-00239-ADA-DTG, W.D. Tex., Feb. 21, 2023, 38 pgs.
Defendant's Preliminary Invalidity Contentions, Exhibit 505-A-14, *Webroot, Inc. and Open Text, Inc. v. Trend Micro Inc.*, No. 6:22-CV-00239-ADA-DTG, W.D. Tex., Feb. 21, 2023, 146 pgs.
Defendant's Preliminary Invalidity Contentions, Exhibit 505-A-15, *Webroot, Inc. and Open Text, Inc. v. Trend Micro Inc.*, No. 6:22-CV-00239-ADA-DTG, W.D. Tex., Feb. 21, 2023, 148 pgs.
Defendant's Preliminary Invalidity Contentions, Exhibit 505-A-16, *Webroot, Inc. and Open Text, Inc. v. Trend Micro Inc.*, No. 6:22-CV-00239-ADA-DTG, W.D. Tex., Feb. 21, 2023, 47 pgs.
Defendant's Preliminary Invalidity Contentions, Exhibit 505-A-17, *Webroot, Inc. and Open Text, Inc. v. Trend Micro Inc.*, No. 6:22-CV-00239-ADA-DTG, W.D. Tex., Feb. 21, 2023, 111 pgs.
Defendant's Preliminary Invalidity Contentions, Exhibit 505-A-18, *Webroot, Inc. and Open Text, Inc. v. Trend Micro Inc.*, No. 6:22-CV-00239-ADA-DTG, W.D. Tex., Feb. 21, 2023, 96 pgs.
Defendant's Preliminary Invalidity Contentions, Exhibit 505-A-19, *Webroot, Inc. and Open Text, Inc. v. Trend Micro Inc.*, No. 6:22-CV-00239-ADA-DTG, W.D. Tex., Feb. 21, 2023, 81 pgs.
Defendant's Preliminary Invalidity Contentions, Exhibit 505-A-20, *Webroot, Inc. and Open Text, Inc. v. Trend Micro Inc.*, No. 6:22-CV-00239-ADA-DTG, W.D. Tex., Feb. 21, 2023, 70 pgs.
Defendant's Preliminary Invalidity Contentions, Exhibit 505-A-21, *Webroot, Inc. and Open Text, Inc. v. Trend Micro Inc.*, No. 6:22-CV-00239-ADA-DTG, W.D. Tex., Feb. 21, 2023, 65 pgs.
Defendant's Preliminary Invalidity Contentions, Exhibit 505-A-22, *Webroot, Inc. and Open Text, Inc. v. Trend Micro Inc.*, No. 6:22-CV-00239-ADA-DTG, W.D. Tex., Feb. 21, 2023, 73 pgs.
Defendant's Preliminary Invalidity Contentions, Exhibit 505-A-23, *Webroot, Inc. and Open Text, Inc. v. Trend Micro Inc.*, No. 6:22-CV-00239-ADA-DTG, W.D. Tex., Feb. 21, 2023, 75 pgs.
Defendant's Preliminary Invalidity Contentions, Exhibit 505-A-24, *Webroot, Inc. and Open Text, Inc. v. Trend Micro Inc.*, No. 6:22-CV-00239-ADA-DTG, W.D. Tex., Feb. 21, 2023, 63 pgs.
Defendant's Preliminary Invalidity Contentions, Exhibit 505-A-25, *Webroot, Inc. and Open Text, Inc. v. Trend Micro Inc.*, No. 6:22-CV-00239-ADA-DTG, W.D. Tex., Feb. 21, 2023, 61 pgs.
Defendant's Preliminary Invalidity Contentions, Exhibit 505-A-26, *Webroot, Inc. and Open Text, Inc. v. Trend Micro Inc.*, No. 6:22-CV-00239-ADA-DTG, W.D. Tex., Feb. 21, 2023, 78 pgs.
Defendant's Preliminary Invalidity Contentions, Exhibit 505-B, *Webroot, Inc. and Open Text, Inc. v. Trend Micro Inc.*, No. 6:22-CV-00239-ADA-DTG, W.D. Tex., Feb. 21, 2023, 428 pgs.
Defendant Crowdstrike Holdings, Inc.'s Preliminary Invalidity Contentions, Exhibit 250-A-1, *Webroot, Inc. and Open Text, Inc. v. Crowdstrike Holdings, Inc.*, No. 6:22-CV-00241-ADA-DTG (WD, Texas), Sep. 13, 2022, 42 pgs.
Defendant Crowdstrike Holdings, Inc.'s Preliminary Invalidity Contentions, Exhibit 250-A-2, *Webroot, Inc. and Open Text, Inc. v. Crowdstrike Holdings, Inc.*, No. 6:22-CV-00241-ADA-DTG (WD, Texas), Sep. 13, 2022, 31 pgs.
Defendant Crowdstrike Holdings, Inc.'s Preliminary Invalidity Contentions, Exhibit 250-A-3, *Webroot, Inc. and Open Text, Inc. v. Crowdstrike Holdings, Inc.*, No. 6:22-CV-00241-ADA-DTG (WD, Texas), Sep. 13, 2022, 120 pgs.
Defendant Crowdstrike Holdings, Inc.'s Preliminary Invalidity Contentions, Exhibit 250-A-4, *Webroot, Inc. and Open Text, Inc. v. Crowdstrike Holdings, Inc.*, No. 6:22-CV-00241-ADA-DTG (WD, Texas), Sep. 13, 2022, 112 pgs.
Defendant Crowdstrike Holdings, Inc.'s Preliminary Invalidity Contentions, Exhibit 250-A-5, *Webroot, Inc. and Open Text, Inc. v. Crowdstrike Holdings, Inc.*, No. 6:22-CV-00241-ADA-DTG (WD, Texas), Sep. 13, 2022, 51 pgs.
Defendant Crowdstrike Holdings, Inc.'s Preliminary Invalidity Contentions, Exhibit 250-A-6, *Webroot, Inc. and Open Text, Inc. v. Crowdstrike Holdings, Inc.*, No. 6:22-CV-00241-ADA-DTG (WD, Texas), Sep. 13, 2022, 34 pgs.
Defendant Crowdstrike Holdings, Inc.'s Preliminary Invalidity Contentions, Exhibit 250-A-7, *Webroot, Inc. and Open Text, Inc. v. Crowdstrike Holdings, Inc.*, No. 6:22-CV-00241-ADA-DTG (WD, Texas), Sep. 13, 2022, 70 pgs.
Defendant Crowdstrike Holdings, Inc.'s Preliminary Invalidity Contentions, Exhibit 250-A-8, *Webroot, Inc. and Open Text, Inc. v. Crowdstrike Holdings, Inc.*, No. 6:22-CV-00241-ADA-DTG (WD, Texas), Sep. 13, 2022, 32 pgs.

(56) References Cited

OTHER PUBLICATIONS

Defendant Crowdstrike Holdings, Inc.'s Preliminary Invalidity Contentions, Exhibit 250-A-9, *Webroot, Inc. and Open Text, Inc. v. Crowdstrike Holdings, Inc.*, No. 6:22-CV-00241-ADA-DTG (WD, Texas), Sep. 13, 2022, 44 pgs.
Defendant Crowdstrike Holdings, Inc.'s Preliminary Invalidity Contentions, Exhibit 250-A-10, *Webroot, Inc. and Open Text, Inc. v. Crowdstrike Holdings, Inc.*, No. 6:22-CV-00241-ADA-DTG (WD, Texas), Sep. 13, 2022, 32 pgs.
Defendant Crowdstrike Holdings, Inc.'s Preliminary Invalidity Contentions, Exhibit 250-A-11, *Webroot, Inc. and Open Text, Inc. v. Crowdstrike Holdings, Inc.*, No. 6:22-CV-00241-ADA-DTG (WD, Texas), Sep. 13, 2022, 77 pgs.
Defendant Crowdstrike Holdings, Inc.'s Preliminary Invalidity Contentions, Exhibit 250-A-12, *Webroot, Inc. and Open Text, Inc. v. Crowdstrike Holdings, Inc.*, No. 6:22-CV-00241-ADA-DTG (WD, Texas), Sep. 13, 2022, 25 pgs.
Defendant Crowdstrike Holdings, Inc.'s Preliminary Invalidity Contentions, Exhibit 250-A-13, *Webroot, Inc. and Open Text, Inc. v. Crowdstrike Holdings, Inc.*, No. 6:22-CV-00241-ADA-DTG (WD, Texas), Sep. 13, 2022, 76 pgs.
Defendant Crowdstrike Holdings, Inc.'s Preliminary Invalidity Contentions, Exhibit 250-A-14, *Webroot, Inc. and Open Text, Inc. v. Crowdstrike Holdings, Inc.*, No. 6:22-CV-00241-ADA-DTG (WD, Texas), Sep. 13, 2022, 27 pgs.
Defendant Crowdstrike Holdings, Inc.'s Preliminary Invalidity Contentions, Exhibit 250-A-15, *Webroot, Inc. and Open Text, Inc. v. Crowdstrike Holdings, Inc.*, No. 6:22-CV-00241-ADA-DTG (WD, Texas), Sep. 13, 2022, 35 pgs.
Defendant Crowdstrike Holdings, Inc.'s Preliminary Invalidity Contentions, Exhibit 250-A-16, *Webroot, Inc. and Open Text, Inc. v. Crowdstrike Holdings, Inc.*, No. 6:22-CV-00241-ADA-DTG (WD, Texas), Sep. 13, 2022, 25 pgs.
Defendant Crowdstrike Holdings, Inc.'s Preliminary Invalidity Contentions, Exhibit 250-B, *Webroot, Inc. and Open Text, Inc. v. Crowdstrike Holdings, Inc.*, No. 6:22-CV-00241-ADA-DTG (WD, Texas), Sep. 13, 2022, 130 pgs.
Defendant Crowdstrike Holdings, Inc.'s Preliminary Invalidity Contentions, Exhibit 389-A-1, *Webroot, Inc. and Open Text, Inc. v. Crowdstrike Holdings, Inc.*, No. 6:22-CV-00241-ADA-DTG (WD, Texas), Sep. 13, 2022, 37 pgs.
Defendant Crowdstrike Holdings, Inc.'s Preliminary Invalidity Contentions, Exhibit 389-A-2, *Webroot, Inc. and Open Text, Inc. v. Crowdstrike Holdings, Inc.*, No. 6:22-CV-00241-ADA-DTG (WD, Texas), Sep. 13, 2022, 24 pgs.
Defendant Crowdstrike Holdings, Inc.'s Preliminary Invalidity Contentions, Exhibit 389-A-3, *Webroot, Inc. and Open Text, Inc. v. Crowdstrike Holdings, Inc.*, No. 6:22-CV-00241-ADA-DTG (WD, Texas), Sep. 13, 2022, 150 pgs.
Defendant Crowdstrike Holdings, Inc.'s Preliminary Invalidity Contentions, Exhibit 389-A-4, *Webroot, Inc. and Open Text, Inc. v. Crowdstrike Holdings, Inc.*, No. 6:22-CV-00241-ADA-DTG (WD, Texas), Sep. 13, 2022, 151 pgs.
Defendant Crowdstrike Holdings, Inc.'s Preliminary Invalidity Contentions, Exhibit 389-A-5, *Webroot, Inc. and Open Text, Inc. v. Crowdstrike Holdings, Inc.*, No. 6:22-CV-00241-ADA-DTG (WD, Texas), Sep. 13, 2022, 46 pgs.
Defendant Crowdstrike Holdings, Inc.'s Preliminary Invalidity Contentions, Exhibit 389-A-6, *Webroot, Inc. and Open Text, Inc. v. Crowdstrike Holdings, Inc.*, No. 6:22-CV-00241-ADA-DTG (WD, Texas), Sep. 13, 2022, 37 pgs.
Defendant Crowdstrike Holdings, Inc.'s Preliminary Invalidity Contentions, Exhibit 389-A-7, *Webroot, Inc. and Open Text, Inc. v. Crowdstrike Holdings, Inc.*, No. 6:22-CV-00241-ADA-DTG (WD, Texas), Sep. 13, 2022, 74 pgs.
Defendant Crowdstrike Holdings, Inc.'s Preliminary Invalidity Contentions, Exhibit 389-A-8, *Webroot, Inc. and Open Text, Inc. v. Crowdstrike Holdings, Inc.*, No. 6:22-CV-00241-ADA-DTG (WD, Texas), Sep. 13, 2022, 26 pgs.
Defendant Crowdstrike Holdings, Inc.'s Preliminary Invalidity Contentions, Exhibit 389-A-9, *Webroot, Inc. and Open Text, Inc. v. Crowdstrike Holdings, Inc.*, No. 6:22-CV-00241-ADA-DTG (WD, Texas), Sep. 13, 2022, 41 pgs.
Defendant Crowdstrike Holdings, Inc.'s Preliminary Invalidity Contentions, Exhibit 389-A-10, *Webroot, Inc. and Open Text, Inc. v. Crowdstrike Holdings, Inc.*, No. 6:22-CV-00241-ADA-DTG (WD, Texas), Sep. 13, 2022, 35 pgs.
Defendant Crowdstrike Holdings, Inc.'s Preliminary Invalidity Contentions, Exhibit 389-A-11, *Webroot, Inc. and Open Text, Inc. v. Crowdstrike Holdings, Inc.*, No. 6:22-CV-00241-ADA-DTG (WD, Texas), Sep. 13, 2022, 104 pgs.
Defendant Crowdstrike Holdings, Inc.'s Preliminary Invalidity Contentions, Exhibit 389-A-12, *Webroot, Inc. and Open Text, Inc. v. Crowdstrike Holdings, Inc.*, No. 6:22-CV-00241-ADA-DTG (WD, Texas), Sep. 13, 2022, 29 pgs.
Defendant Crowdstrike Holdings, Inc.'s Preliminary Invalidity Contentions, Exhibit 389-A-13, *Webroot, Inc. and Open Text, Inc. v. Crowdstrike Holdings, Inc.*, No. 6:22-CV-00241-ADA-DTG (WD, Texas), Sep. 13, 2022, 92 pgs.
Defendant Crowdstrike Holdings, Inc.'s Preliminary Invalidity Contentions, Exhibit 389-A-14, *Webroot, Inc. and Open Text, Inc. v. Crowdstrike Holdings, Inc.*, No. 6:22-CV-00241-ADA-DTG (WD, Texas), Sep. 13, 2022, 22 pgs.
Defendant Crowdstrike Holdings, Inc.'s Preliminary Invalidity Contentions, Exhibit 389-A-15, *Webroot, Inc. and Open Text, Inc. v. Crowdstrike Holdings, Inc.*, No. 6:22-CV-00241-ADA-DTG (WD, Texas), Sep. 13, 2022, 54 pgs.
Defendant Crowdstrike Holdings, Inc.'s Preliminary Invalidity Contentions, Exhibit 389-A-16, *Webroot, Inc. and Open Text, Inc. v. Crowdstrike Holdings, Inc.*, No. 6:22-CV-00241-ADA-DTG (WD, Texas), Sep. 13, 2022, 26 pgs.
Defendant Crowdstrike Holdings, Inc.'s Preliminary Invalidity Contentions, Exhibit 389-A-17, *Webroot, Inc. and Open Text, Inc. v. Crowdstrike Holdings, Inc.*, No. 6:22-CV-00241-ADA-DTG (WD, Texas), Sep. 13, 2022, 30 pgs.
Defendant Crowdstrike Holdings, Inc.'s Preliminary Invalidity Contentions, Exhibit 389-A-18, *Webroot, Inc. and Open Text, Inc. v. Crowdstrike Holdings, Inc.*, No. 6:22-CV-00241-ADA-DTG (WD, Texas), Sep. 13, 2022, 45 pgs.
Defendant Crowdstrike Holdings, Inc.'s Preliminary Invalidity Contentions, Exhibit 389-B, *Webroot, Inc. and Open Text, Inc. v. Crowdstrike Holdings, Inc.*, No. 6:22-CV-00241-ADA-DTG (WD, Texas), Sep. 13, 2022, 195 pgs.
Defendant Crowdstrike Holdings, Inc.'s Preliminary Invalidity Contentions, Exhibit 844-A-1, *Webroot, Inc. and Open Text, Inc. v. Crowdstrike Holdings, Inc.*, No. 6:22-CV-00241-ADA-DTG (WD, Texas), Sep. 13, 2022, 33 pgs.
Defendant Crowdstrike Holdings, Inc.'s Preliminary Invalidity Contentions, Exhibit 844-A-2, *Webroot, Inc. and Open Text, Inc. v. Crowdstrike Holdings, Inc.*, No. 6:22-CV-00241-ADA-DTG (WD, Texas), Sep. 13, 2022, 44 pgs.
Defendant Crowdstrike Holdings, Inc.'s Preliminary Invalidity Contentions, Exhibit 844-A-3, *Webroot, Inc. and Open Text, Inc. v. Crowdstrike Holdings, Inc.*, No. 6:22-CV-00241-ADA-DTG (WD, Texas), Sep. 13, 2022, 34 pgs.
Defendant Crowdstrike Holdings, Inc.'s Preliminary Invalidity Contentions, Exhibit 844-A-4, *Webroot, Inc. and Open Text, Inc. v. Crowdstrike Holdings, Inc.*, No. 6:22-CV-00241-ADA-DTG (WD, Texas), Sep. 13, 2022, 43 pgs.
Defendant Crowdstrike Holdings, Inc.'s Preliminary Invalidity Contentions, Exhibit 844-A-5, *Webroot, Inc. and Open Text, Inc. v. Crowdstrike Holdings, Inc.*, No. 6:22-CV-00241-ADA-DTG (WD, Texas), Sep. 13, 2022, 34 pgs.
Defendant Crowdstrike Holdings, Inc.'s Preliminary Invalidity Contentions, Exhibit 844-A-6, *Webroot, Inc. and Open Text, Inc. v. Crowdstrike Holdings, Inc.*, No. 6:22-CV-00241-ADA-DTG (WD, Texas), Sep. 13, 2022, 31 pgs.
Defendant Crowdstrike Holdings, Inc.'s Preliminary Invalidity Contentions, Exhibit 844-A-7, *Webroot, Inc. and Open Text, Inc. v. Crowdstrike Holdings, Inc.*, No. 6:22-CV-00241-ADA-DTG (WD, Texas), Sep. 13, 2022, 28 pgs.

(56) References Cited

OTHER PUBLICATIONS

Defendant Crowdstrike Holdings, Inc.'s Preliminary Invalidity Contentions, Exhibit 844-A-8, *Webroot, Inc. and Open Text, Inc. v. Crowdstrike Holdings, Inc.*, No. 6:22-CV-00241-ADA-DTG (WD, Texas), Sep. 13, 2022, 28 pgs.
Defendant Crowdstrike Holdings, Inc.'s Preliminary Invalidity Contentions, Exhibit 844-A-9, *Webroot, Inc. and Open Text, Inc. v. Crowdstrike Holdings, Inc.*, No. 6:22-CV-00241-ADA-DTG (WD, Texas), Sep. 13, 2022, 35 pgs.
Defendant Crowdstrike Holdings, Inc.'s Preliminary Invalidity Contentions, Exhibit 844-A-10, *Webroot, Inc. and Open Text, Inc. v. Crowdstrike Holdings, Inc.*, No. 6:22-CV-00241-ADA-DTG (WD, Texas), Sep. 13, 2022, 28 pgs.
Defendant Crowdstrike Holdings, Inc.'s Preliminary Invalidity Contentions, Exhibit 844-A-11, *Webroot, Inc. and Open Text, Inc. v. Crowdstrike Holdings, Inc.*, No. 6:22-CV-00241-ADA-DTG (WD, Texas), Sep. 13, 2022, 27 pgs.
Defendant Crowdstrike Holdings, Inc.'s Preliminary Invalidity Contentions, Exhibit 844-A-12, *Webroot, Inc. and Open Text, Inc. v. Crowdstrike Holdings, Inc.*, No. 6:22-CV-00241-ADA-DTG (WD, Texas), Sep. 13, 2022, 32 pgs.
Defendant Crowdstrike Holdings, Inc.'s Preliminary Invalidity Contentions, Exhibit 844-A-13, *Webroot, Inc. and Open Text, Inc. v. Crowdstrike Holdings, Inc.*, No. 6:22-CV-00241-ADA-DTG (WD, Texas), Sep. 13, 2022, 37 pgs.
Defendant Crowdstrike Holdings, Inc.'s Preliminary Invalidity Contentions, Exhibit 844-A-14, *Webroot, Inc. and Open Text, Inc. v. Crowdstrike Holdings, Inc.*, No. 6:22-CV-00241-ADA-DTG (WD, Texas), Sep. 13, 2022, 32 pgs.
Defendant Crowdstrike Holdings, Inc.'s Preliminary Invalidity Contentions, Exhibit 844-A-15, *Webroot, Inc. and Open Text, Inc. v. Crowdstrike Holdings, Inc.*, No. 6:22-CV-00241-ADA-DTG (WD, Texas), Sep. 13, 2022, 32 pgs.
Defendant Crowdstrike Holdings, Inc.'s Preliminary Invalidity Contentions, Exhibit 844-A-16, *Webroot, Inc. and Open Text, Inc. v. Crowdstrike Holdings, Inc.*, No. 6:22-CV-00241-ADA-DTG (WD, Texas), Sep. 13, 2022, 35 pgs.
Defendant Crowdstrike Holdings, Inc.'s Preliminary Invalidity Contentions, Exhibit 844-A-17, *Webroot, Inc. and Open Text, Inc. v. Crowdstrike Holdings, Inc.*, No. 6:22-CV-00241-ADA-DTG (WD, Texas), Sep. 13, 2022, 35 pgs.
Defendant Crowdstrike Holdings, Inc.'s Preliminary Invalidity Contentions, Exhibit 844-A-18, *Webroot, Inc. and Open Text, Inc. v. Crowdstrike Holdings, Inc.*, No. 6:22-CV-00241-ADA-DTG (WD, Texas), Sep. 13, 2022, 42 pgs.
Defendant Crowdstrike Holdings, Inc.'s Preliminary Invalidity Contentions, Exhibit 844-A-19, *Webroot, Inc. and Open Text, Inc. v. Crowdstrike Holdings, Inc.*, No. 6:22-CV-00241-ADA-DTG (WD, Texas), Sep. 13, 2022, 28 pgs.
Defendant Crowdstrike Holdings, Inc.'s Preliminary Invalidity Contentions, Exhibit 844-A-20, *Webroot, Inc. and Open Text, Inc. v. Crowdstrike Holdings, Inc.*, No. 6:22-CV-00241-ADA-DTG (WD, Texas), Sep. 13, 2022, 33 pgs.
Defendant Crowdstrike Holdings, Inc.'s Preliminary Invalidity Contentions, Exhibit 844-A-21, *Webroot, Inc. and Open Text, Inc. v. Crowdstrike Holdings, Inc.*, No. 6:22-CV-00241-ADA-DTG (WD, Texas), Sep. 13, 2022, 44 pgs.
Defendant Crowdstrike Holdings, Inc.'s Preliminary Invalidity Contentions, Exhibit 844-A-22, *Webroot, Inc. and Open Text, Inc. v. Crowdstrike Holdings, Inc.*, No. 6:22-CV-00241-ADA-DTG (WD, Texas), Sep. 13, 2022, 29 pgs.
Defendant Crowdstrike Holdings, Inc.'s Preliminary Invalidity Contentions, Exhibit 844-A-23, *Webroot, Inc. and Open Text, Inc. v. Crowdstrike Holdings, Inc.*, No. 6:22-CV-00241-ADA-DTG (WD, Texas), Sep. 13, 2022, 26 pgs.
Defendant Crowdstrike Holdings, Inc.'s Preliminary Invalidity Contentions, Exhibit 844-A-24, *Webroot, Inc. and Open Text, Inc. v. Crowdstrike Holdings, Inc.*, No. 6:22-CV-00241-ADA-DTG (WD, Texas), Sep. 13, 2022, 30 pgs.
Defendant Crowdstrike Holdings, Inc.'s Preliminary Invalidity Contentions, Exhibit 844-A-25, *Webroot, Inc. and Open Text, Inc. v. Crowdstrike Holdings, Inc.*, No. 6:22-CV-00241-ADA-DTG (WD, Texas), Sep. 13, 2022, 37 pgs.
Defendant Crowdstrike Holdings, Inc.'s Preliminary Invalidity Contentions, Exhibit 844-A-26, *Webroot, Inc. and Open Text, Inc. v. Crowdstrike Holdings, Inc.*, No. 6:22-CV-00241-ADA-DTG (WD, Texas), Sep. 13, 2022, 26 pgs.
Defendant Crowdstrike Holdings, Inc.'s Preliminary Invalidity Contentions, Exhibit 844-A-27, *Webroot, Inc. and Open Text, Inc. v. Crowdstrike Holdings, Inc.*, No. 6:22-CV-00241-ADA-DTG (WD, Texas), Sep. 13, 2022, 45 pgs.
Defendant Crowdstrike Holdings, Inc.'s Preliminary Invalidity Contentions, Exhibit 844-A-28, *Webroot, Inc. and Open Text, Inc. v. Crowdstrike Holdings, Inc.*, No. 6:22-CV-00241-ADA-DTG (WD, Texas), Sep. 13, 2022, 41 pgs.
Defendant Crowdstrike Holdings, Inc.'s Preliminary Invalidity Contentions, Exhibit 844-A-29, *Webroot, Inc. and Open Text, Inc. v. Crowdstrike Holdings, Inc.*, No. 6:22-CV-00241-ADA-DTG (WD, Texas), Sep. 13, 2022, 38 pgs.
Defendant Crowdstrike Holdings, Inc.'s Preliminary Invalidity Contentions, Exhibit 844-B, *Webroot, Inc. and Open Text, Inc. v. Crowdstrike Holdings, Inc.*, No. 6:22-CV-00241-ADA-DTG (WD, Texas), Sep. 13, 2022, 167 pgs.
Defendant Forcepoint LLC's Preliminary Invalidity Contentions, Exhibit 389-A-1, *Webroot, Inc. and Open Text, Inc. v. Forcepoint LLC*, No. 6:22-CV-00342-ADA-DTG (WD, Texas), Sep. 13, 2022, 29 pgs.
Defendant Forcepoint LLC's Preliminary Invalidity Contentions, Exhibit 389-A-2, *Webroot, Inc. and Open Text, Inc. v. Forcepoint LLC*, No. 6:22-CV-00342-ADA-DTG (WD, Texas), Sep. 13, 2022, 45 pgs.
Defendant Forcepoint LLC's Preliminary Invalidity Contentions, Exhibit 389-A-3, *Webroot, Inc. and Open Text, Inc. v. Forcepoint LLC*, No. 6:22-CV-00342-ADA-DTG (WD, Texas), Sep. 13, 2022, 51 pgs.
Defendant Forcepoint LLC's Preliminary Invalidity Contentions, Exhibit 389-A-4, *Webroot, Inc. and Open Text, Inc. v. Forcepoint LLC*, No. 6:22-CV-00342-ADA-DTG (WD, Texas), Sep. 13, 2022, 71 pgs.
Defendant Forcepoint LLC's Preliminary Invalidity Contentions, Exhibit 389-A-5, *Webroot, Inc. and Open Text, Inc. v. Forcepoint LLC*, No. 6:22-CV-00342-ADA-DTG (WD, Texas), Sep. 13, 2022, 26 pgs.
Defendant Forcepoint LLC's Preliminary Invalidity Contentions, Exhibit 389-A-6, *Webroot, Inc. and Open Text, Inc. v. Forcepoint LLC*, No. 6:22-CV-00342-ADA-DTG (WD, Texas), Sep. 13, 2022, 21 pgs.
Defendant Forcepoint LLC's Preliminary Invalidity Contentions, Exhibit 389-A-7, *Webroot, Inc. and Open Text, Inc. v. Forcepoint LLC*, No. 6:22-CV-00342-ADA-DTG (WD, Texas), Sep. 13, 2022, 32 pgs.
Defendant Forcepoint LLC's Preliminary Invalidity Contentions, Exhibit 389-A-8, *Webroot, Inc. and Open Text, Inc. v. Forcepoint LLC*, No. 6:22-CV-00342-ADA-DTG (WD, Texas), Sep. 13, 2022, 87 pgs.
Defendant Forcepoint LLC's Preliminary Invalidity Contentions, Exhibit 389-A-9, *Webroot, Inc. and Open Text, Inc. v. Forcepoint LLC*, No. 6:22-CV-00342-ADA-DTG (WD, Texas), Sep. 13, 2022, 20 pgs.
Defendant Forcepoint LLC's Preliminary Invalidity Contentions, Exhibit 389-A-10, *Webroot, Inc. and Open Text, Inc. v. Forcepoint LLC*, No. 6:22-CV-00342-ADA-DTG (WD, Texas), Sep. 13, 2022, 76 pgs.
Defendant Forcepoint LLC's Preliminary Invalidity Contentions, Exhibit 389-A-11, *Webroot, Inc. and Open Text, Inc. v. Forcepoint LLC*, No. 6:22-CV-00342-ADA-DTG (WD, Texas), Sep. 13, 2022, 29 pgs.
Defendant Forcepoint LLC's Preliminary Invalidity Contentions, Exhibit 389-A-12, *Webroot, Inc. and Open Text, Inc. v. Forcepoint LLC*, No. 6:22-CV-00342-ADA-DTG (WD, Texas), Sep. 13, 2022, 25 pgs.

(56) References Cited

OTHER PUBLICATIONS

Defendant Forcepoint LLC's Preliminary Invalidity Contentions, Exhibit 389-A-13, *Webroot, Inc. and Open Text, Inc. v. Forcepoint LLC*, No. 6:22-CV-00342-ADA-DTG (WD, Texas), Sep. 13, 2022, 39 pgs.
Defendant Forcepoint LLC's Preliminary Invalidity Contentions, Exhibit 389-A-14, *Webroot, Inc. and Open Text, Inc. v. Forcepoint LLC*, No. 6:22-CV-00342-ADA-DTG (WD, Texas), Sep. 13, 2022, 24 pgs.
Defendant Forcepoint LLC's Preliminary Invalidity Contentions, Exhibit 389-A-15, *Webroot, Inc. and Open Text, Inc. v. Forcepoint LLC*, No. 6:22-CV-00342-ADA-DTG (WD, Texas), Sep. 13, 2022, 126 pgs.
Defendant Forcepoint LLC's Preliminary Invalidity Contentions, Exhibit 389-A-16, *Webroot, Inc. and Open Text, Inc. v. Forcepoint LLC*, No. 6:22-CV-00342-ADA-DTG (WD, Texas), Sep. 13, 2022, 127 pgs.
Defendant Forcepoint LLC's Preliminary Invalidity Contentions, Exhibit 389-A-17, *Webroot, Inc. and Open Text, Inc. v. Forcepoint LLC*, No. 6:22-CV-00342-ADA-DTG (WD, Texas), Sep. 13, 2022, 61 pgs.
Defendant Forcepoint LLC's Preliminary Invalidity Contentions, Exhibit 389-A-18, *Webroot, Inc. and Open Text, Inc. v. Forcepoint LLC*, No. 6:22-CV-00342-ADA-DTG (WD, Texas), Sep. 13, 2022, 35 pgs.
Defendant Forcepoint LLC's Preliminary Invalidity Contentions, Exhibit 389-A-19, *Webroot, Inc. and Open Text, Inc. v. Forcepoint LLC*, No. 6:22-CV-00342-ADA-DTG (WD, Texas), Sep. 13, 2022, 42 pgs.
Defendant Forcepoint LLC's Preliminary Invalidity Contentions, Exhibit 389-A-20, *Webroot, Inc. and Open Text, Inc. v. Forcepoint LLC*, No. 6:22-CV-00342-ADA-DTG (WD, Texas), Sep. 13, 2022, 35 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-1, 24 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-2, 23 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-3, 28 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-4, 24 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-5, 26 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-6, 22 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-7, 30 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-8, 25 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-9, 24 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-10, 21 pgs.
Defendant Forcepoint LLC's Preliminary Invalidity Contentions, *Webroot, Inc. and Open Text, Inc. v. Forcepoint LLC*, CA. No.. 6:22-CV-00342-ADA-DTG, W.D. Tex., Sep. 13, 2022, Exhibit 844-B-11, 26 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-12, 25 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-13, 25 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-14, 22 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-15, 18 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-16, 21 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-17, 19 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-18, 19 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-19, 21 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-20, 18 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-21, 19 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-22, 18 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-23, 24 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-24, 28 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-25, 25 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-26, 23 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-27, 34 pgs.

(56) References Cited

OTHER PUBLICATIONS

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-28, 31 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-29, 28 pgs.
Defendant Forcepoint LLC's Preliminary Invalidity Contentions, Exhibit 721-C-1, *Webroot, Inc. and Open Text, Inc. v. Forcepoint LLC*, No. 6:22-CV-00342-ADA-DTG (WD, Texas), Sep. 13, 2022, 44 pgs.
Defendant Forcepoint LLC's Preliminary Invalidity Contentions, Exhibit 721-C-2, *Webroot, Inc. and Open Text, Inc. v. Forcepoint LLC*, No. 6:22-CV-00342-ADA-DTG (WD, Texas), Sep. 13, 2022, 76 pgs.
Defendant Forcepoint LLC's Preliminary Invalidity Contentions, Exhibit 721-C-3, *Webroot, Inc. and Open Text, Inc. v. Forcepoint LLC*, No. 6:22-CV-00342-ADA-DTG (WD, Texas), Sep. 13, 2022, 73 pgs.
Defendant Forcepoint LLC's Preliminary Invalidity Contentions, Exhibit 721-C-4, *Webroot, Inc. and Open Text, Inc. v. Forcepoint LLC*, No. 6:22-CV-00342-ADA-DTG (WD, Texas), Sep. 13, 2022, 92 pgs.
Defendant Forcepoint LLC's Preliminary Invalidity Contentions, Exhibit 721-C-5, *Webroot, Inc. and Open Text, Inc. v. Forcepoint LLC*, No. 6:22-CV-00342-ADA-DTG (WD, Texas), Sep. 13, 2022, 24 pgs.
Defendant Forcepoint LLC's Preliminary Invalidity Contentions, Exhibit 721-C-6, *Webroot, Inc. and Open Text, Inc. v. Forcepoint LLC*, No. 6:22-CV-00342-ADA-DTG (WD, Texas), Sep. 13, 2022, 21 pgs.
Defendant Forcepoint LLC's Preliminary Invalidity Contentions, Exhibit 721-C-7, *Webroot, Inc. and Open Text, Inc. v. Forcepoint LLC*, No. 6:22-CV-00342-ADA-DTG (WD, Texas), Sep. 13, 2022, 27 pgs.
Defendant Forcepoint LLC's Preliminary Invalidity Contentions, Exhibit 721-C-8, *Webroot, Inc. and Open Text, Inc. v. Forcepoint LLC*, No. 6:22-CV-00342-ADA-DTG (WD, Texas), Sep. 13, 2022, 33 pgs.
Defendant Forcepoint LLC's Preliminary Invalidity Contentions, Exhibit 721-C-9, *Webroot, Inc. and Open Text, Inc. v. Forcepoint LLC*, No. 6:22-CV-00342-ADA-DTG (WD, Texas), Sep. 13, 2022, 38 pgs.
Defendant Forcepoint LLC's Preliminary Invalidity Contentions, Exhibit 721-C-10, *Webroot, Inc. and Open Text, Inc. v. Forcepoint LLC*, No. 6:22-CV-00342-ADA-DTG (WD, Texas), Sep. 13, 2022, 27 pgs.
Defendant Forcepoint LLC's Preliminary Invalidity Contentions, Exhibit 721-C-11, *Webroot, Inc. and Open Text, Inc. v. Forcepoint LLC*, No. 6:22-CV-00342-ADA-DTG (WD, Texas), Sep. 13, 2022, 34 pgs.
Defendant Forcepoint LLC's Preliminary Invalidity Contentions, Exhibit 721-C-12, *Webroot, Inc. and Open Text, Inc. v. Forcepoint LLC*, No. 6:22-CV-00342-ADA-DTG (WD, Texas), Sep. 13, 2022, 31 pgs.
Defendant Forcepoint LLC's Preliminary Invalidity Contentions, Exhibit 721-C-13, *Webroot, Inc. and Open Text, Inc. v. Forcepoint LLC*, No. 6:22-CV-00342-ADA-DTG (WD, Texas), Sep. 13, 2022, 39 pgs.
Defendant Forcepoint LLC's Preliminary Invalidity Contentions, Exhibit 721-C-14, *Webroot, Inc. and Open Text, Inc. v. Forcepoint LLC*, No. 6:22-CV-00342-ADA-DTG (WD, Texas), Sep. 13, 2022, 40 pgs.
Defendant Forcepoint LLC's Preliminary Invalidity Contentions, Exhibit 721-C-15, *Webroot, Inc. and Open Text, Inc. v. Forcepoint LLC*, No. 6:22-CV-00342-ADA-DTG (WD, Texas), Sep. 13, 2022, 28 pgs.
Defendant Forcepoint LLC's Preliminary Invalidity Contentions, Exhibit 721-C-16, *Webroot, Inc. and Open Text, Inc. v. Forcepoint LLC*, No. 6:22-CV-00342-ADA-DTG (WD, Texas), Sep. 13, 2022, 18 pgs.
Defendant Forcepoint LLC's Preliminary Invalidity Contentions, Exhibit 721-C-17, *Webroot, Inc. and Open Text, Inc. v. Forcepoint LLC*, No. 6:22-CV-00342-ADA-DTG (WD, Texas), Sep. 13, 2022, 18 pgs.
Defendant Forcepoint LLC's Preliminary Invalidity Contentions, Exhibit 386-D-1, *Webroot, Inc. and Open Text, Inc. v. Forcepoint LLC*, No. 6:22-CV-00342-ADA-DTG (WD, Texas), Sep. 13, 2022, 91 pgs.
Defendant Forcepoint LLC's Preliminary Invalidity Contentions, Exhibit 386-D-2, *Webroot, Inc. and Open Text, Inc. v. Forcepoint LLC*, No. 6:22-CV-00342-ADA-DTG (WD, Texas), Sep. 13, 2022, 64 pgs.
Defendant Forcepoint LLC's Preliminary Invalidity Contentions, Exhibit 386-D-3, *Webroot, Inc. and Open Text, Inc. v. Forcepoint LLC*, No. 6:22-CV-00342-ADA-DTG (WD, Texas), Sep. 13, 2022, 75 pgs.
Defendant Forcepoint LLC's Preliminary Invalidity Contentions, Exhibit 386-D-4, *Webroot, Inc. and Open Text, Inc. v. Forcepoint LLC*, No. 6:22-CV-00342-ADA-DTG (WD, Texas), Sep. 13, 2022, 72 pgs.
Defendant Forcepoint LLC's Preliminary Invalidity Contentions, Exhibit 386-D-5, *Webroot, Inc. and Open Text, Inc. v. Forcepoint LLC*, No. 6:22-CV-00342-ADA-DTG (WD, Texas), Sep. 13, 2022, 76 pgs.
Defendant Forcepoint LLC's Preliminary Invalidity Contentions, Exhibit 928-E-1, *Webroot, Inc. and Open Text, Inc. v. Forcepoint LLC*, No. 6:22-CV-00342-ADA-DTG (WD, Texas), Sep. 13, 2022, 27 pgs.
Defendant Forcepoint LLC's Preliminary Invalidity Contentions, Exhibit 928-E-2, *Webroot, Inc. and Open Text, Inc. v. Forcepoint LLC*, No. 6:22-CV-00342-ADA-DTG (WD, Texas), Sep. 13, 2022, 25 pgs.
Defendant Forcepoint LLC's Preliminary Invalidity Contentions, Exhibit 928-E-3, *Webroot, Inc. and Open Text, Inc. v. Forcepoint LLC*, No. 6:22-CV-00342-ADA-DTG (WD, Texas), Sep. 13, 2022, 28 pgs.
Defendant Forcepoint LLC's Preliminary Invalidity Contentions, Exhibit 928-E-4, *Webroot, Inc. and Open Text, Inc. v. Forcepoint LLC*, No. 6:22-CV-00342-ADA-DTG (WD, Texas), Sep. 13, 2022, 31 pgs.
Defendant Forcepoint LLC's Preliminary Invalidity Contentions, Exhibit 928-E-5, *Webroot, Inc. and Open Text, Inc. v. Forcepoint LLC*, No. 6:22-CV-00342-ADA-DTG (WD, Texas), Sep. 13, 2022, 31 pgs.
Defendant Forcepoint LLC's Preliminary Invalidity Contentions, Exhibit 869-H-1, *Webroot, Inc. and Open Text, Inc. v. Forcepoint LLC*, CA. No. 6:22-CV-00342-ADA-DTG, W.D. Tex., Feb. 21, 2023, 55 pgs.
Defendant Forcepoint LLC's Preliminary Invalidity Contentions, Exhibit 869-H-2, *Webroot, Inc. and Open Text, Inc. v. Forcepoint LLC*, CA. No. 6:22-CV-00342-ADA-DTG, W.D. Tex., Feb. 21, 2023, 42 pgs.
Defendant Forcepoint LLC's Preliminary Invalidity Contentions, Exhibit 869-H-3, *Webroot, Inc. and Open Text, Inc. v. Forcepoint LLC*, CA. No. 6:22-CV-00342-ADA-DTG, W.D. Tex., Feb. 21, 2023, 39 pgs.
Defendant Forcepoint LLC's Preliminary Invalidity Contentions, Exhibit 869-H-4, *Webroot, Inc. and Open Text, Inc. v. Forcepoint LLC*, CA. No. 6:22-CV-00342-ADA-DTG, W.D. Tex., Feb. 21, 2023, 40 pgs.
Defendant Forcepoint LLC's Preliminary Invalidity Contentions, Exhibit 869-H-5, *Webroot, Inc. and Open Text, Inc. v. Forcepoint LLC*, CA. No. 6:22-CV-00342-ADA-DTG, W.D. Tex., Feb. 21, 2023, 47 pgs.
Defendant Forcepoint LLC's Preliminary Invalidity Contentions, Exhibit 869-H-6, *Webroot, Inc. and Open Text, Inc. v. Forcepoint LLC*, CA. No. 6:22-CV-00342-ADA-DTG, W.D. Tex., Feb. 21, 2023, 48 pgs.

(56) References Cited

OTHER PUBLICATIONS

Defendant Forcepoint LLC's Preliminary Invalidity Contentions, Exhibit 869-H-7, *Webroot, Inc. and Open Text, Inc. v. Forcepoint LLC*, CA. No. 6:22-CV-00342-ADA-DTG, W.D. Tex., Feb. 21, 2023, 62 pgs.
Defendant Forcepoint LLC's Preliminary Invalidity Contentions, Exhibit 869-H-8, *Webroot, Inc. and Open Text, Inc. v. Forcepoint LLC*, CA. No. 6:22-CV-00342-ADA-DTG, W.D. Tex., Feb. 21, 2023, 36 pgs.
Defendant Forcepoint LLC's Preliminary Invalidity Contentions, Exhibit 869-H-9, *Webroot, Inc. and Open Text, Inc. v. Forcepoint LLC*, CA. No. 6:22-CV-00342-ADA-DTG, W.D. Tex., Feb. 21, 2023, 39 pgs.
Defendant Forcepoint LLC's Preliminary Invalidity Contentions, Exhibit 869-H-10, *Webroot, Inc. and Open Text, Inc. v. Forcepoint LLC*, CA. No. 6:22-CV-00342-ADA-DTG, W.D. Tex., Feb. 21, 2023, 37 pgs.
Defendant Forcepoint LLC's Preliminary Invalidity Contentions, Exhibit 869-H-11, *Webroot, Inc. and Open Text, Inc. v. Forcepoint LLC*, CA. No. 6:22-CV-00342-ADA-DTG, W.D. Tex., Feb. 21, 2023, 44 pgs.
Defendant Forcepoint LLC's Preliminary Invalidity Contentions, Exhibit 869-H-12, *Webroot, Inc. and Open Text, Inc. v. Forcepoint LLC*, CA. No. 6:22-CV-00342-ADA-DTG, W.D. Tex., Feb. 21, 2023, 39 pgs.
Defendant Forcepoint LLC's Preliminary Invalidity Contentions, Exhibit 869-H-13, *Webroot, Inc. and Open Text, Inc. v. Forcepoint LLC*, CA. No. 6:22-CV-00342-ADA-DTG, W.D. Tex., Feb. 21, 2023, 50 pgs.
Defendant Forcepoint LLC's Preliminary Invalidity Contentions, Exhibit 869-H-14, *Webroot, Inc. and Open Text, Inc. v. Forcepoint LLC*, CA. No. 6:22-CV-00342-ADA-DTG, W.D. Tex., Feb. 21, 2023, 37 pgs.
Defendant Forcepoint LLC's Preliminary Invalidity Contentions, Exhibit 869-H-15, *Webroot, Inc. and Open Text, Inc. v. Forcepoint LLC*, CA. No. 6:22-CV-00342-ADA-DTG, W.D. Tex., Feb. 21, 2023, 36 pgs.
Defendant Forcepoint LLC's Preliminary Invalidity Contentions, Exhibit 869-H-16, *Webroot, Inc. and Open Text, Inc. v. Forcepoint LLC*, CA. No. 6:22-CV-00342-ADA-DTG, W.D. Tex., Feb. 21, 2023, 32 pgs.
Defendant Forcepoint LLC's Preliminary Invalidity Contentions, Exhibit 869-H-17, *Webroot, Inc. and Open Text, Inc. v. Forcepoint LLC*, CA. No. 6:22-CV-00342-ADA-DTG, W.D. Tex., Feb. 21, 2023, 31 pgs.
Defendant Forcepoint LLC's Preliminary Invalidity Contentions, Exhibit 869-H-18, *Webroot, Inc. and Open Text, Inc. v. Forcepoint LLC*, CA. No. 6:22-CV-00342-ADA-DTG, W.D. Tex., Feb. 21, 2023, 30 pgs.
Defendant Forcepoint LLC's Preliminary Invalidity Contentions, Exhibit 869-H-19, *Webroot, Inc. and Open Text, Inc. v. Forcepoint LLC*, CA. No. 6:22-CV-00342-ADA-DTG, W.D. Tex., Feb. 21, 2023, 37 pgs.
Defendant Forcepoint LLC's Preliminary Invalidity Contentions, Exhibit 869-H-20, *Webroot, Inc. and Open Text, Inc. v. Forcepoint LLC*, CA. No. 6:22-CV-00342-ADA-DTG, W.D. Tex., Feb. 21, 2023, 32 pgs.
Defendant Forcepoint LLC's Preliminary Invalidity Contentions, Exhibit 869-H-21, *Webroot, Inc. and Open Text, Inc. v. Forcepoint LLC*, CA. No. 6:22-CV-00342-ADA-DTG, W.D. Tex., Feb. 21, 2023, 37 pgs.
Defendant Forcepoint LLC's Preliminary Invalidity Contentions, Exhibit 869-H-22, *Webroot, Inc. and Open Text, Inc. v. Forcepoint LLC*, CA. No. 6:22-CV-00342-ADA-DTG, W.D. Tex., Feb. 21, 2023, 38 pgs.
Defendant Forcepoint LLC's Preliminary Invalidity Contentions, Exhibit 869-H-23, *Webroot, Inc. and Open Text, Inc. v. Forcepoint LLC*, CA. No. 6:22-CV-00342-ADA-DTG, W.D. Tex., Feb. 21, 2023, 33 pgs.
Defendant Forcepoint LLC's Preliminary Invalidity Contentions, Exhibit 869-H-24, *Webroot, Inc. and Open Text, Inc. v. Forcepoint LLC*, CA. No. 6:22-CV-00342-ADA-DTG, W.D. Tex., Feb. 21, 2023, 35 pgs.
Defendant Forcepoint LLC's Preliminary Invalidity Contentions, Exhibit 869-H-25, *Webroot, Inc. and Open Text, Inc. v. Forcepoint LLC*, CA. No. 6:22-CV-00342-ADA-DTG, W.D. Tex., Feb. 21, 2023, 63 pgs.
Defendant Forcepoint LLC's Preliminary Invalidity Contentions, Exhibit 869-H-26, *Webroot, Inc. and Open Text, Inc. v. Forcepoint LLC*, CA. No. 6:22-CV-00342-ADA-DTG, W.D. Tex., Feb. 21, 2023, 39 pgs.
Defendant Forcepoint LLC's Preliminary Invalidity Contentions, Exhibit 869-H-27, *Webroot, Inc. and Open Text, Inc. v. Forcepoint LLC*, CA. No. 6:22-CV-00342-ADA-DTG, W.D. Tex., Feb. 21, 2023, 29 pgs.
Defendant Forcepoint LLC's Preliminary Invalidity Contentions, Exhibit 869-H-28, *Webroot, Inc. and Open Text, Inc. v. Forcepoint LLC*, CA. No. 6:22-CV-00342-ADA-DTG, W.D. Tex., Feb. 21, 2023, 71 pgs.
Defendant Forcepoint LLC's Preliminary Invalidity Contentions, Exhibit 869-H-29, *Webroot, Inc. and Open Text, Inc. v. Forcepoint LLC*, CA. No. 6:22-CV-00342-ADA-DTG, W.D. Tex., Feb. 21, 2023, 38 pgs.
Defendant Forcepoint LLC's Preliminary Invalidity Contentions, Exhibit 869-H-30, *Webroot, Inc. and Open Text, Inc. v. Forcepoint LLC*, CA. No. 6:22-CV-00342-ADA-DTG, W.D. Tex., Feb. 21, 2023, 33 pgs.
Defendant Forcepoint LLC's Preliminary Invalidity Contentions, Exhibit 869-H-31, *Webroot, Inc. and Open Text, Inc. v. Forcepoint LLC*, CA. No. 6:22-CV-00342-ADA-DTG, W.D. Tex., Feb. 21, 2023, 39 pgs.
Defendant Forcepoint LLC's Preliminary Invalidity Contentions, Exhibit 869-H-32, *Webroot, Inc. and Open Text, Inc. v. Forcepoint LLC*, CA. No. 6:22-CV-00342-ADA-DTG, W.D. Tex., Feb. 21, 2023, 34 pgs.
Defendant Forcepoint LLC's Preliminary Invalidity Contentions, Exhibit 869-H-33, *Webroot, Inc. and Open Text, Inc. v. Forcepoint LLC*, CA. No. 6:22-CV-00342-ADA-DTG, W.D. Tex., Feb. 21, 2023, 40 pgs.
Defendant Forcepoint LLC's Preliminary Invalidity Contentions, Exhibit 869-H-34, *Webroot, Inc. and Open Text, Inc. v. Forcepoint LLC*, CA. No. 6:22-CV-00342-ADA-DTG, W.D. Tex., Feb. 21, 2023, 43 pgs.
Defendant Forcepoint LLC's Preliminary Invalidity Contentions, Exhibit 869-H-35, *Webroot, Inc. and Open Text, Inc. v. Forcepoint LLC*, CA. No. 6:22-CV-00342-ADA-DTG, W.D. Tex., Feb. 21, 2023, 49 pgs.
Defendant Forcepoint LLC's Preliminary Invalidity Contentions, Exhibit 869-H-36, *Webroot, Inc. and Open Text, Inc. v. Forcepoint LLC*, CA. No. 6:22-CV-00342-ADA-DTG, W.D. Tex., Feb. 21, 2023, 69 pgs.
Defendant AO Kaspersky Lab's Preliminary Invalidity Contentions—Exhibit 1A, Prior Art Index, *Webroot, Inc. and Open Text, Inc. v. AO Kaspersky Lab*, AO6:22-CV-00243 (WD, Texas), Sep. 14, 2022, 67 pgs.
Defendant AO Kaspersky Lab's Preliminary Invalidity Contentions —Exhibit 2A, Invalidity Claim Chart Index, *Webroot, Inc. and Open Text, Inc. v. AO Kaspersky Lab*, No. 6:22-CV-00243 (WD, Texas), Sep. 14, 2022, 19 pgs.
Defendant AO Kaspersky Lab's Preliminary Invalidity Contentions—Exhibit 2B, Invalidity Claim Chart Index, *Webroot, Inc. and Open Text, Inc. v. AO Kaspersky Lab*, No. 6:22-CV-00243 (WD, Texas), Sep. 14, 2022, 22 pgs.
Defendant AO Kaspersky Lab's Preliminary Invalidity Contentions—Exhibit 6A, *Webroot, Inc. and Open Text, Inc. v. AO Kaspersky Lab*, No. 6:22-CV-00243 (WD, Texas), Sep. 14, 2022, 70 pgs.
Defendant AO Kaspersky Lab's Preliminary Invalidity Contentions—Exhibit 6B, *Webroot, Inc. and Open Text, Inc. v. AO Kaspersky Lab*, No. 6:22-CV-00243 (WD, Texas), Sep. 14, 2022, 55 pgs.
Defendant AO Kaspersky Lab's Preliminary Invalidity Contentions—Exhibit 6C, *Webroot, Inc. and Open Text, Inc. v. AO Kaspersky Lab*, No. 6:22-CV-00243 (WD, Texas), Sep. 14, 2022, 37 pgs.

(56) References Cited

OTHER PUBLICATIONS

Defendant AO Kaspersky Lab's Preliminary Invalidity Contentions—Exhibit 7A, *Webroot, Inc. and Open Text, Inc. v. AO Kaspersky Lab*, No. 6:22-CV-00243 (WD, Texas), Feb. 21, 2023, 71 pgs.
Defendant AO Kaspersky Lab's Preliminary Invalidity Contentions—Exhibit 7B, *Webroot, Inc. and Open Text, Inc. v. AO Kaspersky Lab*, No. 6:22-CV-00243 (WD, Texas), Feb. 21, 2023, 68 pgs.
Defendant Sophos Ltd.'s Preliminary Invalidity Contentions, Exhibit 250-A-1, *Webroot, Inc. and Open Text, Inc. v. Sophos Ltd.*, No. 6:22-CV-00240-ADA-DTG (WD, Texas), Sep. 13, 2022, 65 pgs.
Defendant Sophos Ltd.'s Preliminary Invalidity Contentions, Exhibit 250-A-2, *Webroot, Inc. and Open Text, Inc. v. Sophos Ltd.*, No. 6:22-CV-00240-ADA-DTG (WD, Texas), Sep. 13, 2022, 44 pgs.
Defendant Sophos Ltd.'s Preliminary Invalidity Contentions, Exhibit 250-A-3, *Webroot, Inc. and Open Text, Inc. v. Sophos Ltd.*, No. 6:22-CV-00240-ADA-DTG (WD, Texas), Sep. 13, 2022, 120 pgs.
Defendant Sophos Ltd.'s Preliminary Invalidity Contentions, Exhibit 250-A-4, *Webroot, Inc. and Open Text, Inc. v. Sophos Ltd.*, No. 6:22-CV-00240-ADA-DTG (WD, Texas), Sep. 13, 2022, 30 pgs.
Defendant Sophos Ltd.'s Preliminary Invalidity Contentions, Exhibit 250-A-5, *Webroot, Inc. and Open Text, Inc. v. Sophos Ltd.*, No. 6:22-CV-00240-ADA-DTG (WD, Texas), Sep. 13, 2022, 112 pgs.
Defendant Sophos Ltd.'s Preliminary Invalidity Contentions, Exhibit 250-A-6, *Webroot, Inc. and Open Text, Inc. v. Sophos Ltd.*, No. 6:22-CV-00240-ADA-DTG (WD, Texas), Sep. 13, 2022, 51 pgs.
Defendant Sophos Ltd.'s Preliminary Invalidity Contentions, Exhibit 250-A-7, *Webroot, Inc. and Open Text, Inc. v. Sophos Ltd.*, No. 6:22-CV-00240-ADA-DTG (WD, Texas), Sep. 13, 2022, 42 pgs.
Defendant Sophos Ltd.'s Preliminary Invalidity Contentions, Exhibit 250-A-8, *Webroot, Inc. and Open Text, Inc. v. Sophos Ltd.*, No. 6:22-CV-00240-ADA-DTG (WD, Texas), Sep. 13, 2022, 71 pgs.
Defendant Sophos Ltd.'s Preliminary Invalidity Contentions, Exhibit 250-A-9, *Webroot, Inc. and Open Text, Inc. v. Sophos Ltd.*, No. 6:22-CV-00240-ADA-DTG (WD, Texas), Sep. 13, 2022, 45 pgs.
Defendant Sophos Ltd.'s Preliminary Invalidity Contentions, Exhibit 250-A-10, *Webroot, Inc. and Open Text, Inc. v. Sophos Ltd.*, No. 6:22-CV-00240-ADA-DTG (WD, Texas), Sep. 13, 2022, 31 pgs.
Defendant Sophos Ltd.'s Preliminary Invalidity Contentions, Exhibit 250-A-11, *Webroot, Inc. and Open Text, Inc. v. Sophos Ltd.*, No. 6:22-CV-00240-ADA-DTG (WD, Texas), Sep. 13, 2022, 77 pgs.
Defendant Sophos Ltd.'s Preliminary Invalidity Contentions, Exhibit 250-A-12, *Webroot, Inc. and Open Text, Inc. v. Sophos Ltd.*, No. 6:22-CV-00240-ADA-DTG (WD, Texas), Sep. 13, 2022, 31 pgs.
Defendant Sophos Ltd.'s Preliminary Invalidity Contentions, Exhibit 250-A-13, *Webroot, Inc. and Open Text, Inc. v. Sophos Ltd.*, No. 6:22-CV-00240-ADA-DTG (WD, Texas), Sep. 13, 2022, 77 pgs.
Defendant Sophos Ltd.'s Preliminary Invalidity Contentions, Exhibit 250-A-14, *Webroot, Inc. and Open Text, Inc. v. Sophos Ltd.*, No. 6:22-CV-00240-ADA-DTG (WD, Texas), Sep. 13, 2022, 41 pgs.
Defendant Sophos Ltd.'s Preliminary Invalidity Contentions, Exhibit 250-A-15, *Webroot, Inc. and Open Text, Inc. v. Sophos Ltd.*, No. 6:22-CV-00240-ADA-DTG (WD, Texas), Sep. 13, 2022, 34 pgs.
Defendant Sophos Ltd.'s Preliminary Invalidity Contentions, Exhibit 250-A-16, *Webroot, Inc. and Open Text, Inc. v. Sophos Ltd.*, No. 6:22-CV-00240-ADA-DTG (WD, Texas), Sep. 13, 2022, 33 pgs.
Defendant Sophos Ltd.'s Preliminary Invalidity Contentions, Exhibit 250-A-17, *Webroot, Inc. and Open Text, Inc. v. Sophos Ltd.*, No. 6:22-CV-00240-ADA-DTG (WD, Texas), Sep. 13, 2022, 37 pgs.
Defendant Sophos Ltd.'s Preliminary Invalidity Contentions, Exhibit 250-B, *Webroot, Inc. and Open Text, Inc. v. Sophos Ltd.*, No. 6:22-CV-00240-ADA-DTG (WD, Texas), Sep. 13, 2022, 41 pgs.
Defendant Sophos Ltd.'s Preliminary Invalidity Contentions, Exhibit 389-A-1, *Webroot, Inc. and Open Text, Inc. v. Sophos Ltd.*, No. 6:22-CV-00240-ADA-DTG (WD, Texas), Sep. 13, 2022, 52 pgs.
Defendant Sophos Ltd.'s Preliminary Invalidity Contentions, Exhibit 389-A-2, *Webroot, Inc. and Open Text, Inc. v. Sophos Ltd.*, No. 6:22-CV-00240-ADA-DTG (WD, Texas), Sep. 13, 2022, 30 pgs.
Defendant Sophos Ltd.'s Preliminary Invalidity Contentions, Exhibit 389-A-3, *Webroot, Inc. and Open Text, Inc. v. Sophos Ltd.*, No. 6:22-CV-00240-ADA-DTG (WD, Texas), Sep. 13, 2022, 44 pgs.
Defendant Sophos Ltd.'s Preliminary Invalidity Contentions, Exhibit 389-A-4, *Webroot, Inc. and Open Text, Inc. v. Sophos Ltd.*, No. 6:22-CV-00240-ADA-DTG (WD, Texas), Sep. 13, 2022, 40 pgs.
Defendant Sophos Ltd.'s Preliminary Invalidity Contentions, Exhibit 389-A-5, *Webroot, Inc. and Open Text, Inc. v. Sophos Ltd.*, No. 6:22-CV-00240-ADA-DTG (WD, Texas), Sep. 13, 2022, 151 pgs.
Defendant Sophos Ltd.'s Preliminary Invalidity Contentions, Exhibit 389-A-6, *Webroot, Inc. and Open Text, Inc. v. Sophos Ltd.*, No. 6:22-CV-00240-ADA-DTG (WD, Texas), Sep. 13, 2022, 23 pgs.
Defendant Sophos Ltd.'s Preliminary Invalidity Contentions, Exhibit 389-A-7, *Webroot, Inc. and Open Text, Inc. v. Sophos Ltd.*, No. 6:22-CV-00240-ADA-DTG (WD, Texas), Sep. 13, 2022, 152 pgs.
Defendant Sophos Ltd.'s Preliminary Invalidity Contentions, Exhibit 389-A-8, *Webroot, Inc. and Open Text, Inc. v. Sophos Ltd.*, No. 6:22-CV-00240-ADA-DTG (WD, Texas), Sep. 13, 2022, 45 pgs.
Defendant Sophos Ltd.'s Preliminary Invalidity Contentions, Exhibit 389-A-9, *Webroot, Inc. and Open Text, Inc. v. Sophos Ltd.*, No. 6:22-CV-00240-ADA-DTG (WD, Texas), Sep. 13, 2022, 38 pgs.
Defendant Sophos Ltd.'s Preliminary Invalidity Contentions, Exhibit 389-A-10, *Webroot, Inc. and Open Text, Inc. v. Sophos Ltd.*, No. 6:22-CV-00240-ADA-DTG (WD, Texas), Sep. 13, 2022, 76 pgs.
Defendant Sophos Ltd.'s Preliminary Invalidity Contentions, Exhibit 389-A-11, *Webroot, Inc. and Open Text, Inc. v. Sophos Ltd.*, No. 6:22-CV-00240-ADA-DTG (WD, Texas), Sep. 13, 2022, 42 pgs.
Defendant Sophos Ltd.'s Preliminary Invalidity Contentions, Exhibit 389-A-12, *Webroot, Inc. and Open Text, Inc. v. Sophos Ltd.*, No. 6:22-CV-00240-ADA-DTG (WD, Texas), Sep. 13, 2022, 29 pgs.
Defendant Sophos Ltd.'s Preliminary Invalidity Contentions, Exhibit 389-A-13, *Webroot, Inc. and Open Text, Inc. v. Sophos Ltd.*, No. 6:22-CV-00240-ADA-DTG (WD, Texas), Sep. 13, 2022, 93 pgs.
Defendant Sophos Ltd.'s Preliminary Invalidity Contentions, Exhibit 389-A-14, *Webroot, Inc. and Open Text, Inc. v. Sophos Ltd.*, No. 6:22-CV-00240-ADA-DTG (WD, Texas), Sep. 13, 2022, 25 pgs.
Defendant Sophos Ltd.'s Preliminary Invalidity Contentions, Exhibit 389-A-15, *Webroot, Inc. and Open Text, Inc. v. Sophos Ltd.*, No. 6:22-CV-00240-ADA-DTG (WD, Texas), Sep. 13, 2022, 98 pgs.
Defendant Sophos Ltd.'s Preliminary Invalidity Contentions, Exhibit 389-A-16, *Webroot, Inc. and Open Text, Inc. v. Sophos Ltd.*, No. 6:22-CV-00240-ADA-DTG (WD, Texas), Sep. 13, 2022.
Defendant Sophos Ltd.'s Preliminary Invalidity Contentions, Exhibit 389-A-17, *Webroot, Inc. and Open Text, Inc. v. Sophos Ltd.*, No. 6:22-CV-00240-ADA-DTG (WD, Texas), Sep. 13, 2022, 52 pgs.
Defendant Sophos Ltd.'s Preliminary Invalidity Contentions, Exhibit 389-A-18, *Webroot, Inc. and Open Text, Inc. v. Sophos Ltd.*, No. 6:22-CV-00240-ADA-DTG (WD, Texas), Sep. 13, 2022, 57 pgs.
Defendant Sophos Ltd.'s Preliminary Invalidity Contentions, Exhibit 389-A-19, *Webroot, Inc. and Open Text, Inc. v. Sophos Ltd.*, No. 6:22-CV-00240-ADA-DTG (WD, Texas), Sep. 13, 2022, 79 pgs.
Defendant Sophos Ltd.'s Preliminary Invalidity Contentions, Exhibit 389-A-20, *Webroot, Inc. and Open Text, Inc. v. Sophos Ltd.*, No. 6:22-CV-00240-ADA-DTG (WD, Texas), Sep. 13, 2022, 36 pgs.
Defendant Sophos Ltd.'s Preliminary Invalidity Contentions, Exhibit 389-B, *Webroot, Inc. and Open Text, Inc. v. Sophos Ltd.*, No. 6:22-CV-00240-ADA-DTG (WD, Texas), Sep. 13, 2022, 21 pgs.
Defendant Sophos Ltd.'s Preliminary Invalidity Contentions, Exhibit 721-A-1, *Webroot, Inc. and Open Text, Inc. v. Sophos Ltd.*, No. 6:22-CV-00240-ADA-DTG (WD, Texas), Sep. 13, 2022, 14 pgs.
Defendant Sophos Ltd.'s Preliminary Invalidity Contentions, Exhibit 721-A-2, *Webroot, Inc. and Open Text, Inc. v. Sophos Ltd.*, No. 6:22-CV-00240-ADA-DTG (WD, Texas), Sep. 13, 2022, 14 pgs.
Defendant Sophos Ltd.'s Preliminary Invalidity Contentions, Exhibit 721-A-3, *Webroot, Inc. and Open Text, Inc. v. Sophos Ltd.*, No. 6:22-CV-00240-ADA-DTG (WD, Texas), Sep. 13, 2022, 31 pgs.
Defendant Sophos Ltd.'s Preliminary Invalidity Contentions, Exhibit 721-A-4, *Webroot, Inc. and Open Text, Inc. v. Sophos Ltd.*, No. 6:22-CV-00240-ADA-DTG (WD, Texas), Sep. 13, 2022, 50 pgs.
Defendant Sophos Ltd.'s Preliminary Invalidity Contentions, Exhibit 721-A-5, *Webroot, Inc. and Open Text, Inc. v. Sophos Ltd.*, No. 6:22-CV-00240-ADA-DTG (WD, Texas), Sep. 13, 2022, 39 pgs.
Defendant Sophos Ltd.'s Preliminary Invalidity Contentions, Exhibit 721-A-6, *Webroot, Inc. and Open Text, Inc. v. Sophos Ltd.*, No. 6:22-CV-00240-ADA-DTG (WD, Texas), Sep. 13, 2022, 17 pgs.

(56) References Cited

OTHER PUBLICATIONS

Defendant Sophos Ltd.'s Preliminary Invalidity Contentions, Exhibit 721-A-7, *Webroot, Inc. and Open Text, Inc. v. Sophos Ltd.*, No. 6:22-CV-00240-ADA-DTG (WD, Texas), Sep. 13, 2022, 33 pgs.
Defendant Sophos Ltd.'s Preliminary Invalidity Contentions, Exhibit 721-A-8, *Webroot, Inc. and Open Text, Inc. v. Sophos Ltd.*, No. 6:22-CV-00240-ADA-DTG (WD, Texas), Sep. 13, 2022, 40 pgs.
Defendant Sophos Ltd.'s Preliminary Invalidity Contentions, Exhibit 721-A-9, *Webroot, Inc. and Open Text, Inc. v. Sophos Ltd.*, No. 6:22-CV-00240-ADA-DTG (WD, Texas), Sep. 13, 2022, 29 pgs.
Defendant Sophos Ltd.'s Preliminary Invalidity Contentions, Exhibit 721-A-10, *Webroot, Inc. and Open Text, Inc. v. Sophos Ltd.*, No. 6:22-CV-00240-ADA-DTG (WD, Texas), Sep. 13, 2022, 114 pgs.
Defendant Sophos Ltd.'s Preliminary Invalidity Contentions, Exhibit 721-A-11, *Webroot, Inc. and Open Text, Inc. v. Sophos Ltd.*, No. 6:22-CV-00240-ADA-DTG (WD, Texas), Sep. 13, 2022, 24 pgs.
Defendant Sophos Ltd.'s Preliminary Invalidity Contentions, Exhibit 721-A-12, *Webroot, Inc. and Open Text, Inc. v. Sophos Ltd.*, No. 6:22-CV-00240-ADA-DTG (WD, Texas), Sep. 13, 2022, 37 pgs.
Defendant Sophos Ltd.'s Preliminary Invalidity Contentions, Exhibit 721-A-13, *Webroot, Inc. and Open Text, Inc. v. Sophos Ltd.*, No. 6:22-CV-00240-ADA-DTG (WD, Texas), Sep. 13, 2022, 34 pgs.
Defendant Sophos Ltd.'s Preliminary Invalidity Contentions, Exhibit 721-A-14, *Webroot, Inc. and Open Text, Inc. v. Sophos Ltd.*, No. 6:22-CV-00240-ADA-DTG (WD, Texas), Sep. 13, 2022, 44 pgs.
Defendant Sophos Ltd.'s Preliminary Invalidity Contentions, Exhibit 721-A-15, *Webroot, Inc. and Open Text, Inc. v. Sophos Ltd.*, No. 6:22-CV-00240-ADA-DTG (WD, Texas), Sep. 13, 2022, 28 pgs.
Defendant Sophos Ltd.'s Preliminary Invalidity Contentions, Exhibit 721-A-16, *Webroot, Inc. and Open Text, Inc. v. Sophos Ltd.*, No. 6:22-CV-00240-ADA-DTG (WD, Texas), Sep. 13, 2022, 92 pgs.
Defendant Sophos Ltd.'s Preliminary Invalidity Contentions, Exhibit 721-A-17, *Webroot, Inc. and Open Text, Inc. v. Sophos Ltd.*, No. 6:22-CV-00240-ADA-DTG (WD, Texas), Sep. 13, 2022, 19 pgs.
Defendant Sophos Ltd.'s Preliminary Invalidity Contentions, Exhibit 721-A-18, *Webroot, Inc. and Open Text, Inc. v. Sophos Ltd.*, No. 6:22-CV-00240-ADA-DTG (WD, Texas), Sep. 13, 2022, 19 pgs.
Defendant Sophos Ltd.'s Preliminary Invalidity Contentions, Exhibit 721-A-19, *Webroot, Inc. and Open Text, Inc. v. Sophos Ltd.*, No. 6:22-CV-00240-ADA-DTG (WD, Texas), Sep. 13, 2022, 41 pgs.
Defendant Sophos Ltd.'s Preliminary Invalidity Contentions, Exhibit 721-A-20, *Webroot, Inc. and Open Text, Inc. v. Sophos Ltd.*, No. 6:22-CV-00240-ADA-DTG (WD, Texas), Sep. 13, 2022, 85 pgs.
Defendant Sophos Ltd.'s Preliminary Invalidity Contentions, Exhibit 721-A-21, *Webroot, Inc. and Open Text, Inc. v. Sophos Ltd.*, No. 6:22-CV-00240-ADA-DTG (WD, Texas), Sep. 13, 2022, 27 pgs.
Defendant Sophos Ltd.'s Preliminary Invalidity Contentions, Exhibit 721-A-22, *Webroot, Inc. and Open Text, Inc. v. Sophos Ltd.*, No. 6:22-CV-00240-ADA-DTG (WD, Texas), Sep. 13, 2022, 31 pgs.
Defendant Sophos Ltd.'s Preliminary Invalidity Contentions, Exhibit 721-B, *Webroot, Inc. and Open Text, Inc. v. Sophos Ltd.*, No. 6:22-CV-00240-ADA-DTG (WD, Texas), Sep. 13, 2022, 23 pgs.
Defendant Sophos Ltd.'s Preliminary Invalidity Contentions, Exhibit 844-A-1, *Webroot, Inc. and Open Text, Inc. v. Sophos Ltd.*, CA. No. 6:22-CV-00240-ADA-DTG, W.D. Tex., Sep. 13, 2022, 30 pgs.
Defendant Sophos Ltd.'s Preliminary Invalidity Contentions, Exhibit 844-A-2, *Webroot, Inc. and Open Text, Inc. v. Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 844-A-3, *Webroot, Inc. and Open Text, Inc. v. Sophos Ltd.*, CA. No. 6:22-CV-00240-ADA-DTG, W.D. Tex., Sep. 13, 2022, 39 pgs.
Defendant Sophos Ltd.'s Preliminary Invalidity Contentions, Exhibit 844-A-4, *Webroot, Inc. and Open Text, Inc. v. Sophos Ltd.*, CA. No. 6:22-CV-00240-ADA-DTG, W.D. Tex., Sep. 13, 2022, 30 pgs.
Defendant Sophos Ltd.'s Preliminary Invalidity Contentions, Exhibit 844-A-5, *Webroot, Inc. and Open Text, Inc. v. Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 844-A-6, *Webroot, Inc. and Open Text, Inc. v. Sophos Ltd.*, CA. No. 6:22-CV-00240-ADA-DTG, W.D. Tex., Sep. 13, 2022, 48 pgs.
Defendant Sophos Ltd.'s Preliminary Invalidity Contentions, Exhibit 844-A-7, *Webroot, Inc. and Open Text, Inc. v. Sophos Ltd.*, CA. No. 6:22-CV-00240-ADA-DTG, W.D. Tex., Sep. 13, 2022, 25 pgs.
Defendant Sophos Ltd.'s Preliminary Invalidity Contentions, Exhibit 844-A-8, *Webroot, Inc. and Open Text, Inc. v. Sophos Ltd.*, CA. No. 6:22-CV-00240-ADA-DTG, W.D. Tex., Sep. 13, 2022, 33 pgs.
Defendant Sophos Ltd.'s Preliminary Invalidity Contentions, Exhibit 844-A-9, *Webroot, Inc. and Open Text, Inc. v. Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 844-A-10, *Webroot, Inc. and Open Text, Inc. v. Sophos Ltd.*, CA. No. 6:22-CV-00240-ADA-DTG, W.D. Tex., Sep. 13, 2022, 25 pgs.
Defendant Sophos Ltd.'s Preliminary Invalidity Contentions, Exhibit 844-A-11, *Webroot, Inc. and Open Text, Inc. v. Sophos Ltd.*, CA. No. 6:22-CV-00240-ADA-DTG, W.D. Tex., Sep. 13, 2022, 29 pgs.
Defendant Sophos Ltd.'s Preliminary Invalidity Contentions, Exhibit 844-A-12, *Webroot, Inc. and Open Text, Inc. v. Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 844-A-13, *Webroot, Inc. and Open Text, Inc. v. Sophos Ltd.*, CA. No. 6:22-CV-00240-ADA-DTG, W.D. Tex., Sep. 13, 2022, 34 pgs.
Defendant Sophos Ltd.'s Preliminary Invalidity Contentions, Exhibit 844-A-14, *Webroot, Inc. and Open Text, Inc. v. Sophos Ltd.*, CA. No. 6:22-CV-00240-ADA-DTG, W.D. Tex., Sep. 13, 2022, 30 pgs.
Defendant Sophos Ltd.'s Preliminary Invalidity Contentions, Exhibit 844-A-15, *Webroot, Inc. and Open Text, Inc. v. Sophos Ltd.*, CA. No. 6:22-CV-00240-ADA-DTG, W.D. Tex., Sep. 13, 2022, 42 pgs.
Defendant Sophos Ltd.'s Preliminary Invalidity Contentions, Exhibit 844-A-16, *Webroot, Inc. and Open Text, Inc. v. Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 844-A-17, *Webroot, Inc. and Open Text, Inc. v. Sophos Ltd.*, CA. No. 6:22-CV-00240-ADA-DTG, W.D. Tex., Sep. 13, 2022, 38 pgs.
Defendant Sophos Ltd.'s Preliminary Invalidity Contentions, Exhibit 844-A-18, *Webroot, Inc. and Open Text, Inc. v. Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 844-A-19, *Webroot, Inc. and Open Text, Inc. v. Sophos Ltd.*, CA. No. 6:22-CV-00240-ADA-DTG, W.D. Tex., Sep. 13, 2022, 35 pgs.
Defendant Sophos Ltd.'s Preliminary Invalidity Contentions, Exhibit 844-A-20, *Webroot, Inc. and Open Text, Inc. v. Sophos Ltd.*, CA. No. 6:22-CV-00240-ADA-DTG, W.D. Tex., Sep. 13, 2022, 43 pgs.
Defendant Sophos Ltd.'s Preliminary Invalidity Contentions, Exhibit 844-A-21, *Webroot, Inc. and Open Text, Inc. v. Sophos Ltd.*, CA. No. 6:22-CV-00240-ADA-DTG, W.D. Tex., Sep. 13, 2022, 42 pgs.
Defendant Sophos Ltd.'s Preliminary Invalidity Contentions, Exhibit 844-A-22, *Webroot, Inc. and Open Text, Inc. v. Sophos Ltd.*, CA. No. 6:22-CV-00240-ADA-DTG, W.D. Tex., Sep. 13, 2022, 30 pgs.
Defendant Sophos Ltd.'s Preliminary Invalidity Contentions, Exhibit 844-A-23, *Webroot, Inc. and Open Text, Inc. v. Sophos Ltd.*, CA. No. 6:22-CV-00240-ADA-DTG, W.D. Tex., Sep. 13, 2022, 48 pgs.
Defendant Sophos Ltd.'s Preliminary Invalidity Contentions, Exhibit 844-A-24, *Webroot, Inc. and Open Text, Inc. v. Sophos Ltd.*, CA. No. 6:22-CV-00240-ADA-DTG, W.D. Tex., Sep. 13, 2022, 36 pgs.
Defendant Sophos Ltd.'s Preliminary Invalidity Contentions, Exhibit 844-A-25, *Webroot, Inc. and Open Text, Inc. v. Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 844-A-26, *Webroot, Inc. and Open Text, Inc. v. Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 844-A-27, *Webroot, Inc. and Open Text, Inc. v. Sophos Ltd.*, CA. No. 6:22-CV-00240-ADA-DTG, W.D. Tex., Sep. 13, 2022, 30 pgs.
Defendant Sophos Ltd.'s Preliminary Invalidity Contentions, Exhibit 844-A-28, *Webroot, Inc. and Open Text, Inc. v. Sophos Ltd.*, CA. No. 6:22-CV-00240-ADA-DTG, W.D. Tex., Sep. 13, 2022, 37 pgs.
Defendant Sophos Ltd.'s Preliminary Invalidity Contentions, Exhibit 844-A-29, *Webroot, Inc. and Open Text, Inc. v. Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 844-A-30, *Webroot, Inc. and Open Text, Inc. v. Sophos Ltd.*, CA. No. 6:22-CV-00240-ADA-DTG, W.D. Tex., Sep. 13, 2022, 42 pgs.

(56) References Cited

OTHER PUBLICATIONS

Defendant Sophos Ltd.'s Preliminary Invalidity Contentions, Exhibit 844-A-31, *Webroot, Inc. and Open Text, Inc. v. Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 844-A-32, *Webroot, Inc. and Open Text, Inc. v. Sophos Ltd.*, CA. No. 6:22-CV-00240-ADA-DTG, W.D. Tex., Sep. 13, 2022, 25 pgs.
Defendant Sophos Ltd.'s Preliminary Invalidity Contentions, Exhibit 844-A-33, *Webroot, Inc. and Open Text, Inc. v. Sophos Ltd.*, CA. No. 6:22-CV-00240-ADA-DTG, W.D. Tex., Sep. 13, 2022, 29 pgs.
Defendant Sophos Ltd.'s Preliminary Invalidity Contentions, Exhibit 844-B, *Webroot, Inc. and Open Text, Inc. v. Sophos Ltd.*, CA. No. 6:22-CV-00240-ADA-DTG, W.D. Tex., Sep. 13, 2022, 36 pgs.
Defendant Sophos Ltd.'s Preliminary Invalidity Contentions, Exhibit 123-A-1, *Webroot, Inc. and Open Text, Inc. v. Sophos Ltd.*, CA. No. 6:22-CV-00240-ADA-DTG, W.D. Tex., Feb. 21, 2023, 48 pgs.
Defendant Sophos Ltd.'s Preliminary Invalidity Contentions, Exhibit 123-A-2, *Webroot, Inc. and Open Text, Inc. v. Sophos Ltd.*, CA. No. 6:22-CV-00240-ADA-DTG, W.D. Tex., Feb. 21, 2023, 57 pgs.
Defendant Sophos Ltd.'s Preliminary Invalidity Contentions, Exhibit 123-A-3, *Webroot, Inc. and Open Text, Inc. v. Sophos Ltd.*, CA. No. 6:22-CV-00240-ADA-DTG, W.D. Tex., Feb. 21, 2023, 83 pgs.
Defendant Sophos Ltd.'s Preliminary Invalidity Contentions, Exhibit 123-A-4, *Webroot, Inc. and Open Text, Inc. v. Sophos Ltd.*, CA. No. 6:22-CV-00240-ADA-DTG, W.D. Tex., Feb. 21, 2023, 45 pgs.
Defendant Sophos Ltd.'s Preliminary Invalidity Contentions, Exhibit 123-A-5, *Webroot, Inc. and Open Text, Inc. v. Sophos Ltd.*, CA. No. 6:22-CV-00240-ADA-DTG, W.D. Tex., Feb. 21, 2023, 57 pgs.
Defendant Sophos Ltd.'s Preliminary Invalidity Contentions, Exhibit 123-A-6, *Webroot, Inc. and Open Text, Inc. v. Sophos Ltd.*, CA. No. 6:22-CV-00240-ADA-DTG, W.D. Tex., Feb. 21, 2023, 41 pgs.
Defendant Sophos Ltd.'s Preliminary Invalidity Contentions, Exhibit 123-A-7, *Webroot, Inc. and Open Text, Inc. v. Sophos Ltd.*, CA. No. 6:22-CV-00240-ADA-DTG, W.D. Tex., Feb. 21, 2023, 51 pgs.
Defendant Sophos Ltd.'s Preliminary Invalidity Contentions, Exhibit 123-B, *Webroot, Inc. and Open Text, Inc. v. Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 869-A-1, *Webroot, Inc. and Open Text, Inc. v. Sophos Ltd.*, CA. No. 6:22-CV-00240-ADA-DTG, W.D. Tex., Feb. 21, 2023, 49 pgs.
Defendant Sophos Ltd.'s Preliminary Invalidity Contentions, Exhibit 869-A-2, *Webroot, Inc. and Open Text, Inc. v. Sophos Ltd.*, CA. No. 6:22-CV-00240-ADA-DTG, W.D. Tex., Feb. 21, 2023, 37 pgs.
Defendant Sophos Ltd.'s Preliminary Invalidity Contentions, Exhibit 869-A-3, *Webroot, Inc. and Open Text, Inc. v. Sophos Ltd.*, CA. No. 6:22-CV-00240-ADA-DTG, W.D. Tex., Feb. 21, 2023, 29 pgs.
Defendant Sophos Ltd.'s Preliminary Invalidity Contentions, Exhibit 869-A-4, *Webroot, Inc. and Open Text, Inc. v. Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 869-A-5, *Webroot, Inc. and Open Text, Inc. v. Sophos Ltd.*, CA. No. 6:22-CV-00240-ADA-DTG, W.D. Tex., Feb. 21, 2023, 29 pgs.
Defendant Sophos Ltd.'s Preliminary Invalidity Contentions, Exhibit 869-A-6, *Webroot, Inc. and Open Text, Inc. v. Sophos Ltd.*, CA. No. 6:22-CV-00240-ADA-DTG, W.D. Tex., Feb. 21, 2023, 30 pgs.
Defendant Sophos Ltd.'s Preliminary Invalidity Contentions, Exhibit 869-A-7, *Webroot, Inc. and Open Text, Inc. v. Sophos Ltd.*, CA. No. 6:22-CV-00240-ADA-DTG, W.D. Tex., Feb. 21, 2023, 29 pgs.
Defendant Sophos Ltd.'s Preliminary Invalidity Contentions, Exhibit 869-A-8, *Webroot, Inc. and Open Text, Inc. v. Sophos Ltd.*, CA. No. 6:22-CV-00240-ADA-DTG, W.D. Tex., Feb. 21, 2023, 27 pgs.
Defendant Sophos Ltd.'s Preliminary Invalidity Contentions, Exhibit 869-A-9, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 869-A-10, *Webroot, Inc. and Open Text, Inc. v. Sophos Ltd.*, CA. No. 6:22-CV-00240-ADA-DTG, W.D. Tex., Feb. 21, 2023, 53 pgs.
Defendant Sophos Ltd.'s Preliminary Invalidity Contentions, Exhibit 869-A-11, *Webroot, Inc. and Open Text, Inc. v. Sophos Ltd.*, CA. No. 6:22-CV-00240-ADA-DTG, W.D. Tex., Feb. 21, 2023, 34 pgs.
Defendant Sophos Ltd.'s Preliminary Invalidity Contentions, Exhibit 869-A-12, *Webroot, Inc. and Open Text, Inc. v. Sophos Ltd.*, CA. No. 6:22-CV-00240-ADA-DTG, W.D. Tex., Feb. 21, 2023, 32 pgs.
Defendant Sophos Ltd.'s Preliminary Invalidity Contentions, Exhibit 869-A-13, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 869-A-14, *Webroot, Inc. and Open Text, Inc. v. Sophos Ltd.*, CA. No. 6:22-CV-00240-ADA-DTG, W.D. Tex., Feb. 21, 2023, 63 pgs.
Defendant Sophos Ltd.'s Preliminary Invalidity Contentions, Exhibit 869-A-15, *Webroot, Inc. and Open Text, Inc. v. Sophos Ltd.*, CA. No. 6:22-CV-00240-ADA-DTG, W.D. Tex., Feb. 21, 2023, 75 pgs.
Defendant Sophos Ltd.'s Preliminary Invalidity Contentions, Exhibit 869-A-16, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 869-A-17, *Webroot, Inc. and Open Text, Inc. v. Sophos Ltd.*, CA. No. 6:22-CV-00240-ADA-DTG, W.D. Tex., Feb. 21, 2023, 54 pgs.
Defendant Sophos Ltd.'s Preliminary Invalidity Contentions, Exhibit 869-A-18, *Webroot, Inc. and Open Text, Inc. v. Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 869-A-19, *Webroot, Inc. and Open Text, Inc. v. Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 869-A-20, *Webroot, Inc. and Open Text, Inc. v. Sophos Ltd.*, CA. No. 6:22-CV-00240-ADA-DTG, W.D. Tex., Feb. 21, 2023, 44 pgs.
Defendant Sophos Ltd.'s Preliminary Invalidity Contentions, Exhibit 869-A-21, *Webroot, Inc. and Open Text, Inc. v. Sophos Ltd.*, CA. No. 6:22-CV-00240-ADA-DTG, W.D. Tex., Feb. 21, 2023, 34 pgs.
Defendant Sophos Ltd.'s Preliminary Invalidity Contentions, Exhibit 869-A-22, *Webroot, Inc. and Open Text, Inc. v. Sophos Ltd.*, CA. No. 6:22-CV-00240-ADA-DTG, W.D. Tex., Feb. 21, 2023, 65 pgs.
Defendant Sophos Ltd.'s Preliminary Invalidity Contentions, Exhibit 869-A-23, *Webroot, Inc. and Open Text, Inc. v. Sophos Ltd.*, CA. No. 6:22-CV-00240-ADA-DTG, W.D. Tex., Feb. 21, 2023, 45 pgs.
Defendant Sophos Ltd.'s Preliminary Invalidity Contentions, Exhibit 869-A-24, *Webroot, Inc. and Open Text, Inc. v. Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 869-A-25, *Webroot, Inc. and Open Text, Inc. v. Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 869-A-26, *Webroot, Inc. and Open Text, Inc. v. Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 869-A-27, *Webroot, Inc. and Open Text, Inc. v. Sophos Ltd.*, CA. No. 6:22-CV-00240-ADA-DTG, W.D. Tex., Feb. 21, 2023, 39 pgs.
Defendant Sophos Ltd.'s Preliminary Invalidity Contentions, Exhibit 869-A-28, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 869-A-29, *Webroot, Inc. and Open Text, Inc. v. Sophos Ltd.*, CA. No. 6:22-CV-00240-ADA-DTG, W.D. Tex., Feb. 21, 2023, 43 pgs.
Defendant Sophos Ltd.'s Preliminary Invalidity Contentions, Exhibit 869-A-30, *Webroot, Inc. and Open Text, Inc. v. Sophos Ltd.*, CA. No. 6:22-CV-00240-ADA-DTG, W.D. Tex., Feb. 21, 2023, 48 pgs.
Defendant Sophos Ltd.'s Preliminary Invalidity Contentions, Exhibit 869-A-31, *Webroot, Inc. and Open Text, Inc. v. Sophos Ltd.*, CA. No. 6:22-CV-00240-ADA-DTG, W.D. Tex., Feb. 21, 2023, 37 pgs.
Defendant Sophos Ltd.'s Preliminary Invalidity Contentions, Exhibit 869-A-32, *Webroot, Inc. and Open Text, Inc. v. Sophos Ltd.*, CA. No. 6:22-CV-00240-ADA-DTG, W.D. Tex., Feb. 21, 2023, 31 pgs.
Defendant Sophos Ltd.'s Preliminary Invalidity Contentions, Exhibit 869-A-33, *Webroot, Inc. and Open Text, Inc. v. Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 869-A-34, *Webroot, Inc. and Open Text, Inc. v. Sophos Ltd.*, CA. No. 6:22-CV-00240-ADA-DTG, W.D. Tex., Feb. 21, 2023, 58 pgs.
Defendant Sophos Ltd.'s Preliminary Invalidity Contentions, Exhibit 869-A-35, *Webroot, Inc. and Open Text, Inc. v. Sophos Ltd.*, CA. No. 6:22-CV-00240-ADA-DTG, W.D. Tex., Feb. 21, 2023, 36 pgs.

(56) References Cited

OTHER PUBLICATIONS

Defendant Sophos Ltd.'s Preliminary Invalidity Contentions, Exhibit 869-A-36, *Webroot, Inc. and Open Text, Inc.* v. *Sophos Ltd.*, CA. No. 6:22-CV-00240-ADA-DTG, W.D. Tex., Feb. 21, 2023, 37 pgs.
Defendant Sophos Ltd.'s Preliminary Invalidity Contentions, Exhibit 869-B, *Webroot, Inc. and Open Text, Inc.* v. *Sophos Ltd.*, CA. No. 6:22-CV-00240-ADA-DTG, W.D. Tex., Feb. 21, 2023, 75 pgs.
Defendant's Preliminary Invalidity Contentions Exhibit 250-A-1, *Webroot, Inc. and Open Text, Inc.* v. *Trend Micro Inc.*, No. 6:22-CV-00239-ADA-DTG (WD, Texas), Sep. 13, 2022, 89 pgs.
Defendant's Preliminary Invalidity Contentions Exhibit 250-A-2, *Webroot, Inc. and Open Text, Inc.* v. *Trend Micro Inc.*, No. 6:22-CV-00239-ADA-DTG (WD, Texas), Sep. 13, 2022, 64 pgs.
Defendant's Preliminary Invalidity Contentions Exhibit 250-A-3, *Webroot, Inc. and Open Text, Inc.* v. *Trend Micro Inc.*, No. 6:22-CV-00239-ADA-DTG (WD, Texas), Sep. 13, 2022, 104 pgs.
Defendant's Preliminary Invalidity Contentions Exhibit 250-A-4, *Webroot, Inc. and Open Text, Inc.* v. *Trend Micro Inc.*, No. 6:22-CV-00239-ADA-DTG (WD, Texas), Sep. 13, 2022, 54 pgs.
Defendant's Preliminary Invalidity Contentions Exhibit 250-A-5, *Webroot, Inc. and Open Text, Inc.* v. *Trend Micro Inc.*, No. 6:22-CV-00239-ADA-DTG (WD, Texas), Sep. 13, 2022, 45 pgs.
Defendant's Preliminary Invalidity Contentions Exhibit 250-A-6, *Webroot, Inc. and Open Text, Inc.* v. *Trend Micro Inc.*, No. 6:22-CV-00239-ADA-DTG (WD, Texas), Sep. 13, 2022, 36 pgs.
Defendant's Preliminary Invalidity Contentions Exhibit 250-A-7, *Webroot, Inc. and Open Text, Inc.* v. *Trend Micro Inc.*, No. 6:22-CV-00239-ADA-DTG (WD, Texas), Sep. 13, 2022, 42 pgs.
Defendant's Preliminary Invalidity Contentions Exhibit 250-A-8, *Webroot, Inc. and Open Text, Inc.* v. *Trend Micro Inc.*, No. 6:22-CV-00239-ADA-DTG (WD, Texas), Sep. 13, 2022, 105 pgs.
Defendant's Preliminary Invalidity Contentions Exhibit 250-A-9, *Webroot, Inc. and Open Text, Inc.* v. *Trend Micro Inc.*, No. 6:22-CV-00239-ADA-DTG (WD, Texas), Sep. 13, 2022, 44 pgs.
Defendant's Preliminary Invalidity Contentions Exhibit 250-A-10, *Webroot, Inc. and Open Text, Inc.* v. *Trend Micro Inc.*, No. 6:22-CV-00239-ADA-DTG (WD, Texas), Sep. 13, 2022, 46 pgs.
Defendant's Preliminary Invalidity Contentions Exhibit 250-A-11, *Webroot, Inc. and Open Text, Inc.* v. *Trend Micro Inc.*, No. 6:22-CV-00239-ADA-DTG (WD, Texas), Sep. 13, 2022, 45 pgs.
Defendant's Preliminary Invalidity Contentions Exhibit 250-A-12, *Webroot, Inc. and Open Text, Inc.* v. *Trend Micro Inc.*, No. 6:22-CV-00239-ADA-DTG (WD, Texas), Sep. 13, 2022, 166 pgs.
Defendant's Preliminary Invalidity Contentions Exhibit 250-A-13, *Webroot, Inc. and Open Text, Inc.* v. *Trend Micro Inc.*, No. 6:22-CV-00239-ADA-DTG (WD, Texas), Sep. 13, 2022, 169 pgs.
Defendant's Preliminary Invalidity Contentions Exhibit 250-A-14, *Webroot, Inc. and Open Text, Inc.* v. *Trend Micro Inc.*, No. 6:22-CV-00239-ADA-DTG (WD, Texas), Sep. 13, 2022, 51 pgs.
Defendant's Preliminary Invalidity Contentions Exhibit 250-A-15, *Webroot, Inc. and Open Text, Inc.* v. *Trend Micro Inc.*, No. 6:22-CV-00239-ADA-DTG (WD, Texas), Sep. 13, 2022, 44 pgs.
Defendant's Preliminary Invalidity Contentions Exhibit 250-A-16, *Webroot, Inc. and Open Text, Inc.* v. *Trend Micro Inc.*, No. 6:22-CV-00239-ADA-DTG (WD, Texas), Sep. 13, 2022, 34 pgs.
Defendant's Preliminary Invalidity Contentions Exhibit 250-A-17, *Webroot, Inc. and Open Text, Inc.* v. *Trend Micro Inc.*, No. 6:22-CV-00239-ADA-DTG (WD, Texas), Sep. 13, 2022, 31 pgs.
Defendant's Preliminary Invalidity Contentions Exhibit 250-A-18, *Webroot, Inc. and Open Text, Inc.* v. *Trend Micro Inc.*, No. 6:22-CV-00239-ADA-DTG (WD, Texas), Sep. 13, 2022, 32 pgs.
Defendant's Preliminary Invalidity Contentions Exhibit 250-A-19, *Webroot, Inc. and Open Text, Inc.* v. *Trend Micro Inc.*, No. 6:22-CV-00239-ADA-DTG (WD, Texas), Sep. 13, 2022, 42 pgs.
Defendant's Preliminary Invalidity Contentions Exhibit 250-A-20, *Webroot, Inc. and Open Text, Inc.* v. *Trend Micro Inc.*, No. 6:22-CV-00239-ADA-DTG (WD, Texas), Sep. 13, 2022, 42 pgs.
Defendant's Preliminary Invalidity Contentions Exhibit 250-A-21, *Webroot, Inc. and Open Text, Inc.* v. *Trend Micro Inc.*, No. 6:22-CV-00239-ADA-DTG (WD, Texas), Sep. 13, 2022, 192 pgs.
Defendant's Preliminary Invalidity Contentions Exhibit 250-A-22, *Webroot, Inc. and Open Text, Inc.* v. *Trend Micro Inc.*, No. 6:22-CV-00239-ADA-DTG (WD, Texas), Sep. 13, 2022, 127 pgs.
Defendant's Preliminary Invalidity Contentions Exhibit 250-A-23, *Webroot, Inc. and Open Text, Inc.* v. *Trend Micro Inc.*, No. 6:22-CV-00239-ADA-DTG (WD, Texas), Sep. 13, 2022, 120 pgs.
Defendant's Preliminary Invalidity Contentions Exhibit 250-A-24, *Webroot, Inc. and Open Text, Inc.* v. *Trend Micro Inc.*, No. 6:22-CV-00239-ADA-DTG (WD, Texas), Sep. 13, 2022, 113 pgs.
Defendant's Preliminary Invalidity Contentions Exhibit 250-A-25, *Webroot, Inc. and Open Text, Inc.* v. *Trend Micro Inc.*, No. 6:22-CV-00239-ADA-DTG (WD, Texas), Sep. 13, 2022, 71 pgs.
Defendant's Preliminary Invalidity Contentions Exhibit 250-A-26, *Webroot, Inc. and Open Text, Inc.* v. *Trend Micro Inc.*, No. 6:22-CV-00239-ADA-DTG (WD, Texas), Sep. 13, 2022, 77 pgs.
Defendant's Preliminary Invalidity Contentions Exhibit 250-A-27, *Webroot, Inc. and Open Text, Inc.* v. *Trend Micro Inc.*, No. 6:22-CV-00239-ADA-DTG (WD, Texas), Sep. 13, 2022, 32 pgs.
Defendant's Preliminary Invalidity Contentions Exhibit 250-A-28, *Webroot, Inc. and Open Text, Inc.* v. *Trend Micro Inc.*, No. 6:22-CV-00239-ADA-DTG (WD, Texas), Sep. 13, 2022, 77 pgs.
Defendant's Preliminary Invalidity Contentions Exhibit 250-A-29, *Webroot, Inc. and Open Text, Inc.* v. *Trend Micro Inc.*, No. 6:22-CV-00239-ADA-DTG (WD, Texas), Sep. 13, 2022, 45 pgs.
Defendant's Preliminary Invalidity Contentions Exhibit 250-A-30, *Webroot, Inc. and Open Text, Inc.* v. *Trend Micro Inc.*, No. 6:22-CV-00239-ADA-DTG (WD, Texas), Sep. 13, 2022, 31 pgs.
Defendant's Preliminary Invalidity Contentions Exhibit 250-A-31, *Webroot, Inc. and Open Text, Inc.* v. *Trend Micro Inc.*, No. 6:22-CV-00239-ADA-DTG (WD, Texas), Sep. 13, 2022, 29 pgs.
Defendant's Preliminary Invalidity Contentions Exhibit 250-A-32, *Webroot, Inc. and Open Text, Inc.* v. *Trend Micro Inc.*, No. 6:22-CV-00239-ADA-DTG (WD, Texas), Sep. 13, 2022, 34 pgs.
Defendant's Preliminary Invalidity Contentions Exhibit 250-A-33, *Webroot, Inc. and Open Text, Inc.* v. *Trend Micro Inc.*, No. 6:22-CV-00239-ADA-DTG (WD, Texas), Sep. 13, 2022, 41 pgs.
Defendant's Preliminary Invalidity Contentions Exhibit 250-A-34, *Webroot, Inc. and Open Text, Inc.* v. *Trend Micro Inc.*, No. 6:22-CV-00239-ADA-DTG (WD, Texas), Sep. 13, 2022, 59 pgs.
Defendant's Preliminary Invalidity Contentions Exhibit 250-A-35, *Webroot, Inc. and Open Text, Inc.* v. *Trend Micro Inc.*, No. 6:22-CV-00239-ADA-DTG (WD, Texas), Sep. 13, 2022, 42 pgs.
Defendant's Preliminary Invalidity Contentions Exhibit 250-A-36, *Webroot, Inc. and Open Text, Inc.* v. *Trend Micro Inc.*, No. 6:22-CV-00239-ADA-DTG (WD, Texas), Sep. 13, 2022, 29 pgs.
Defendant's Preliminary Invalidity Contentions Exhibit 250-B, *Webroot, Inc. and Open Text, Inc.* v. *Trend Micro Inc.*, No. 6:22-CV-00239-ADA-DTG (WD, Texas), Sep. 13, 2022, 91 pgs.
Defendant's Preliminary Invalidity Contentions, Exhibit 389-A-1, *Webroot, Inc. and Open Text, Inc.* v. *Trend Micro Inc.*, No. 6:22-CV-00239-ADA-DTG (WD, Texas), Sep. 13, 2022, 83 pgs.
Defendant's Preliminary Invalidity Contentions, Exhibit 389-A-2, *Webroot, Inc. and Open Text, Inc.* v. *Trend Micro Inc.*, No. 6:22-CV-00239-ADA-DTG (WD, Texas), Sep. 13, 2022, 59 pgs.
Defendant's Preliminary Invalidity Contentions, Exhibit 389-A-3, *Webroot, Inc. and Open Text, Inc.* v. *Trend Micro Inc.*, No. 6:22-CV-00239-ADA-DTG (WD, Texas), Sep. 13, 2022, 120 pgs.
Defendant's Preliminary Invalidity Contentions, Exhibit 389-A-4, *Webroot, Inc. and Open Text, Inc.* v. *Trend Micro Inc.*, No. 6:22-CV-00239-ADA-DTG (WD, Texas), Sep. 13, 2022, 45 pgs.
Defendant's Preliminary Invalidity Contentions, Exhibit 389-A-5, *Webroot, Inc. and Open Text, Inc.* v. *Trend Micro Inc.*, No. 6:22-CV-00239-ADA-DTG (WD, Texas), Sep. 13, 2022, 40 pgs.
Defendant's Preliminary Invalidity Contentions, Exhibit 389-A-6, *Webroot, Inc. and Open Text, Inc.* v. *Trend Micro Inc.*, No. 6:22-CV-00239-ADA-DTG (WD, Texas), Sep. 13, 2022, 32 pgs.
Defendant's Preliminary Invalidity Contentions, Exhibit 389-A-7, *Webroot, Inc. and Open Text, Inc.* v. *Trend Micro Inc.*, No. 6:22-CV-00239-ADA-DTG (WD, Texas), Sep. 13, 2022, 37 pgs.
Defendant's Preliminary Invalidity Contentions, Exhibit 389-A-8, *Webroot, Inc. and Open Text, Inc.* v. *Trend Micro Inc.*, No. 6:22-CV-00239-ADA-DTG (WD, Texas), Sep. 13, 2022, 106 pgs.

(56) References Cited

OTHER PUBLICATIONS

Defendant's Preliminary Invalidity Contentions, Exhibit 389-A-9, *Webroot, Inc. and Open Text, Inc. v. Trend Micro Inc.*, No. 6:22-CV-00239-ADA-DTG (WD, Texas), Sep. 13, 2022, 40 pgs.
Defendant's Preliminary Invalidity Contentions, Exhibit 389-A-10, *Webroot, Inc. and Open Text, Inc. v. Trend Micro Inc.*, No. 6:22-CV-00239-ADA-DTG (WD, Texas), Sep. 13, 2022, 43 pgs.
Defendant's Preliminary Invalidity Contentions, Exhibit 389-A-11, *Webroot, Inc. and Open Text, Inc. v. Trend Micro Inc.*, No. 6:22-CV-00239-ADA-DTG (WD, Texas), Sep. 13, 2022, 43 pgs.
Defendant's Preliminary Invalidity Contentions, Exhibit 389-A-12, *Webroot, Inc. and Open Text, Inc. v. Trend Micro Inc.*, No. 6:22-CV-00239-ADA-DTG (WD, Texas), Sep. 13, 2022, 179 pgs.
Defendant's Preliminary Invalidity Contentions, Exhibit 389-A-13, *Webroot, Inc. and Open Text, Inc. v. Trend Micro Inc.*, No. 6:22-CV-00239-ADA-DTG (WD, Texas), Sep. 13, 2022, 192 pgs.
Defendant's Preliminary Invalidity Contentions, Exhibit 389-A-14, *Webroot, Inc. and Open Text, Inc. v. Trend Micro Inc.*, No. 6:22-CV-00239-ADA-DTG (WD, Texas), Sep. 13, 2022, 46 pgs.
Defendant's Preliminary Invalidity Contentions, Exhibit 389-A-15, *Webroot, Inc. and Open Text, Inc. v. Trend Micro Inc.*, No. 6:22-CV-00239-ADA-DTG (WD, Texas), Sep. 13, 2022, 41 pgs.
Defendant's Preliminary Invalidity Contentions, Exhibit 389-A-16, *Webroot, Inc. and Open Text, Inc. v. Trend Micro Inc.*, No. 6:22-CV-00239-ADA-DTG (WD, Texas), Sep. 13, 2022, 37 pgs.
Defendant's Preliminary Invalidity Contentions, Exhibit 389-A-17, *Webroot, Inc. and Open Text, Inc. v. Trend Micro Inc.*, No. 6:22-CV-00239-ADA-DTG (WD, Texas), Sep. 13, 2022, 24 pgs.
Defendant's Preliminary Invalidity Contentions, Exhibit 389-A-18, *Webroot, Inc. and Open Text, Inc. v. Trend Micro Inc.*, No. 6:22-CV-00239-ADA-DTG (WD, Texas), Sep. 13, 2022, 26 pgs.
Defendant's Preliminary Invalidity Contentions, Exhibit 389-A-19, *Webroot, Inc. and Open Text, Inc. v. Trend Micro Inc.*, No. 6:22-CV-00239-ADA-DTG (WD, Texas), Sep. 13, 2022, 38 pgs.
Defendant's Preliminary Invalidity Contentions, Exhibit 389-A-20, *Webroot, Inc. and Open Text, Inc. v. Trend Micro Inc.*, No. 6:22-CV-00239-ADA-DTG (WD, Texas), Sep. 13, 2022, 37 pgs.
Defendant's Preliminary Invalidity Contentions, Exhibit 389-A-21, *Webroot, Inc. and Open Text, Inc. v. Trend Micro Inc.*, No. 6:22-CV-00239-ADA-DTG (WD, Texas), Sep. 13, 2022, 206 pgs.
Defendant's Preliminary Invalidity Contentions, Exhibit 389-A-22, *Webroot, Inc. and Open Text, Inc. v. Trend Micro Inc.*, No. 6:22-CV-00239-ADA-DTG (WD, Texas), Sep. 13, 2022, 138 pgs.
Defendant's Preliminary Invalidity Contentions, Exhibit 389-A-23, *Webroot, Inc. and Open Text, Inc. v. Trend Micro Inc.*, No. 6:22-CV-00239-ADA-DTG (WD, Texas), Sep. 13, 2022, 149 pgs.
Defendant's Preliminary Invalidity Contentions, Exhibit 389-A-24, *Webroot, Inc. and Open Text, Inc. v. Trend Micro Inc.*, No. 6:22-CV-00239-ADA-DTG (WD, Texas), Sep. 13, 2022, 152 pgs.
Defendant's Preliminary Invalidity Contentions, Exhibit 389-A-25, *Webroot, Inc. and Open Text, Inc. v. Trend Micro Inc.*, No. 6:22-CV-00239-ADA-DTG (WD, Texas), Sep. 13, 2022, 73 pgs.
Defendant's Preliminary Invalidity Contentions, Exhibit 389-A-26, *Webroot, Inc. and Open Text, Inc. v. Trend Micro Inc.*, No. 6:22-CV-00239-ADA-DTG (WD, Texas), Sep. 13, 2022, 91 pgs.
Defendant's Preliminary Invalidity Contentions, Exhibit 389-A-27, *Webroot, Inc. and Open Text, Inc. v. Trend Micro Inc.*, No. 6:22-CV-00239-ADA-DTG (WD, Texas), Sep. 13, 2022, 34 pgs.
Defendant's Preliminary Invalidity Contentions, Exhibit 389-A-28, *Webroot, Inc. and Open Text, Inc. v. Trend Micro Inc.*, No. 6:22-CV-00239-ADA-DTG (WD, Texas), Sep. 13, 2022, 102 pgs.
Defendant's Preliminary Invalidity Contentions, Exhibit 389-A-29, *Webroot, Inc. and Open Text, Inc. v. Trend Micro Inc.*, No. 6:22-CV-00239-ADA-DTG (WD, Texas), Sep. 13, 2022, 30 pgs.
Defendant's Preliminary Invalidity Contentions, Exhibit 389-A-30, *Webroot, Inc. and Open Text, Inc. v. Trend Micro Inc.*, No. 6:22-CV-00239-ADA-DTG (WD, Texas), Sep. 13, 2022, 21 pgs.
Defendant's Preliminary Invalidity Contentions, Exhibit 389-A-31, *Webroot, Inc. and Open Text, Inc. v. Trend Micro Inc.*, No. 6:22-CV-00239-ADA-DTG (WD, Texas), Sep. 13, 2022, 28 pgs.
Defendant's Preliminary Invalidity Contentions, Exhibit 389-A-32, *Webroot, Inc. and Open Text, Inc. v. Trend Micro Inc.*, No. 6:22-CV-00239-ADA-DTG (WD, Texas), Sep. 13, 2022, 48 pgs.
Defendant's Preliminary Invalidity Contentions, Exhibit 389-A-33, *Webroot, Inc. and Open Text, Inc. v. Trend Micro Inc.*, No. 6:22-CV-00239-ADA-DTG (WD, Texas), Sep. 13, 2022, 54 pgs.
Defendant's Preliminary Invalidity Contentions, Exhibit 389-A-34, *Webroot, Inc. and Open Text, Inc. v. Trend Micro Inc.*, No. 6:22-CV-00239-ADA-DTG (WD, Texas), Sep. 13, 2022, 78 pgs.
Defendant's Preliminary Invalidity Contentions, Exhibit 389-A-35, *Webroot, Inc. and Open Text, Inc. v. Trend Micro Inc.*, No. 6:22-CV-00239-ADA-DTG (WD, Texas), Sep. 13, 2022, 39 pgs.
Defendant's Preliminary Invalidity Contentions, Exhibit 389-A-36, *Webroot, Inc. and Open Text, Inc. v. Trend Micro Inc.*, No. 6:22-CV-00239-ADA-DTG (WD, Texas), Sep. 13, 2022, 21 pgs.
Defendant's Preliminary Invalidity Contentions, Exhibit 389-A-37, *Webroot, Inc. and Open Text, Inc. v. Trend Micro Inc.*, No. 6:22-CV-00239-ADA-DTG (WD, Texas), Sep. 13, 2022, 26 pgs.
Defendant's Preliminary Invalidity Contentions, Exhibit 389-B, *Webroot, Inc. and Open Text, Inc. v. Trend Micro Inc.*, No. 6:22-CV-00239-ADA-DTG (WD, Texas), Sep. 13, 2022, 92 pgs.
Defendant's Preliminary Invalidity Contentions, Exhibit 844-A-1, *Webroot, Inc. and Open Text, Inc. v. Trend Micro Inc.*, No. 6:22-CV-00239-ADA-DTG, W.D. Tex., Sep. 13, 2022, 28 pgs.
Defendant's Preliminary Invalidity Contentions, Exhibit 844-A-2, *Webroot, Inc. and Open Text, Inc. v. Trend Micro Inc.*, No. 6:22-CV-00239-ADA-DTG, W.D. Tex., Sep. 13, 2022, 30 pgs.
Defendant's Preliminary Invalidity Contentions, Exhibit 844-A-3, *Webroot, Inc. and Open Text, Inc. v. Trend Micro Inc.*, No. 6:22-CV-00239-ADA-DTG, W.D. Tex., Sep. 13, 2022, 27 pgs.
Defendant's Preliminary Invalidity Contentions, Exhibit 844-A-4, *Webroot, Inc. and Open Text, Inc. v. Trend Micro Inc.*, No. 6:22-CV-00239-ADA-DTG, W.D. Tex., Sep. 13, 2022, 31 pgs.
Defendant's Preliminary Invalidity Contentions, Exhibit 844-A-5, *Webroot, Inc. and Open Text, Inc. v. Trend Micro Inc.*, No. 6:22-CV-00239-ADA-DTG, W.D. Tex., Sep. 13, 2022, 34 pgs.
Defendant's Preliminary Invalidity Contentions, Exhibit 844-A-6, *Webroot, Inc. and Open Text, Inc. v. Trend Micro Inc.*, No. 6:22-CV-00239-ADA-DTG, W.D. Tex., Sep. 13, 2022, 28 pgs.
Defendant's Preliminary Invalidity Contentions, Exhibit 844-A-7, *Webroot, Inc. and Open Text, Inc. v. Trend Micro Inc.*, No. 6:22-CV-00239-ADA-DTG, W.D. Tex., Sep. 13, 2022, 45 pgs.
Defendant's Preliminary Invalidity Contentions, Exhibit 844-A-8, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 844-A-9, *Webroot, Inc. and Open Text, Inc. v. Trend Micro Inc.*, No. 6:22-CV-00239-ADA-DTG, W.D. Tex., Sep. 13, 2022, 28 pgs.
Defendant's Preliminary Invalidity Contentions, Exhibit 844-A-10, *Webroot, Inc. and Open Text, Inc. v. Trend Micro Inc.*, No. 6:22-CV-00239-ADA-DTG, W.D. Tex., Sep. 13, 2022, 35 pgs.
Defendant's Preliminary Invalidity Contentions, Exhibit 844-A-11, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 844-A-12, *Webroot, Inc. and Open Text, Inc. v. Trend Micro Inc.*, No. 6:22-CV-00239-ADA-DTG, W.D. Tex., Sep. 13, 2022, 40 pgs.
Defendant's Preliminary Invalidity Contentions, Exhibit 844-A-13, *Webroot, Inc. and Open Text, Inc. v. Trend Micro Inc.*, No. 6:22-CV-00239-ADA-DTG, W.D. Tex., Sep. 13, 2022, 38 pgs.
Defendant's Preliminary Invalidity Contentions, Exhibit 844-A-14, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 844-A-15, *Webroot, Inc. and Open Text, Inc. v. Trend Micro Inc.*, No. 6:22-CV-00239-ADA-DTG, W.D. Tex., Sep. 13, 2022, 31 pgs.
Defendant's Preliminary Invalidity Contentions, Exhibit 844-A-16, *Webroot, Inc. and Open Text, Inc. v. Trend Micro Inc.*, No. 6:22-CV-00239-ADA-DTG, W.D. Tex., Sep. 13, 2022, 40 pgs.
Defendant's Preliminary Invalidity Contentions, Exhibit 844-A-17, *Webroot, Inc. and Open Text, Inc. v. Trend Micro Inc.*, No. 6:22-CV-00239-ADA-DTG, W.D. Tex., Sep. 13, 2022, 43 pgs.

(56) References Cited

OTHER PUBLICATIONS

Defendant's Preliminary Invalidity Contentions, Exhibit 844-A-18, *Webroot, Inc. and Open Text, Inc. v. Trend Micro Inc.*, No. 6:22-CV-00239-ADA-DTG, W.D. Tex., Sep. 13, 2022, 44 pgs.
Defendant's Preliminary Invalidity Contentions, Exhibit 844-A-19, *Webroot, Inc. and Open Text, Inc. v. Trend Micro Inc.*, No. 6:22-CV-00239-ADA-DTG, W.D. Tex., Sep. 13, 2022, 40 pgs.
Defendant's Preliminary Invalidity Contentions, Exhibit 844-A-20, *Webroot, Inc. and Open Text, Inc. v. Trend Micro Inc.*, No. 6:22-CV-00239-ADA-DTG, W.D. Tex., Sep. 13, 2022, 32 pgs.
Defendant's Preliminary Invalidity Contentions, Exhibit 844-A-21, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 844-A-22, *Webroot, Inc. and Open Text, Inc. v. Trend Micro Inc.*, No. 6:22-CV-00239-ADA-DTG, W.D. Tex., Sep. 13, 2022, 39 pgs.
Defendant's Preliminary Invalidity Contentions, Exhibit 844-A-23, *Webroot, Inc. and Open Text, Inc. v. Trend Micro Inc.*, No. 6:22-CV-00239-ADA-DTG, W.D. Tex., Sep. 13, 2022, 30 pgs.
Defendant's Preliminary Invalidity Contentions, Exhibit 844-A-24, *Webroot, Inc. and Open Text, Inc. v. Trend Micro Inc.*, No. 6:22-CV-00239-ADA-DTG, W.D. Tex., Sep. 13, 2022, 31 pgs.
Defendant's Preliminary Invalidity Contentions, Exhibit 844-A-25, *Webroot, Inc. and Open Text, Inc. v. Trend Micro Inc.*, No. 6:22-CV-00239-ADA-DTG, W.D. Tex., Sep. 13, 2022, 36 pgs.
Defendant's Preliminary Invalidity Contentions, Exhibit 844-A-26, *Webroot, Inc. and Open Text, Inc. v. Trend Micro Inc.*, No. 6:22-CV-00239-ADA-DTG, W.D. Tex., Sep. 13, 2022, 35 pgs.
Defendant's Preliminary Invalidity Contentions, Exhibit 844-A-27, *Webroot, Inc. and Open Text, Inc. v. Trend Micro Inc.*, No. 6:22-CV-00239-ADA-DTG, W.D. Tex., Sep. 13, 2022, 37 pgs.
Defendant's Preliminary Invalidity Contentions, Exhibit 844-A-28, *Webroot, Inc. and Open Text, Inc. v. Trend Micro Inc.*, No. 6:22-CV-00239-ADA-DTG, W.D. Tex., Sep. 13, 2022, 32 pgs.
Defendant's Preliminary Invalidity Contentions, Exhibit 844-A-29, *Webroot, Inc. and Open Text, Inc. v. Trend Micro Inc.*, No. 6:22-CV-00239-ADA-DTG, W.D. Tex., Sep. 13, 2022, 31 pgs.
Defendant's Preliminary Invalidity Contentions, Exhibit 844-A-30, *Webroot, Inc. and Open Text, Inc. v. Trend Micro Inc.*, No. 6:22-CV-00239-ADA-DTG, W.D. Tex., Sep. 13, 2022, 93 pgs.
Defendant's Preliminary Invalidity Contentions, Exhibit 844-A-31, *Webroot, Inc. and Open Text, Inc. v. Trend Micro Inc.*, No. 6:22-CV-00239-ADA-DTG, W.D. Tex., Sep. 13, 2022, 39 pgs.
Defendant's Preliminary Invalidity Contentions, Exhibit 844-A-32, *Webroot, Inc. and Open Text, Inc. v. Trend Micro Inc.*, No. 6:22-CV-00239-ADA-DTG, W.D. Tex., Sep. 13, 2022, 93 pgs.
Defendant's Preliminary Invalidity Contentions, Exhibit 844-A-33, *Webroot, Inc. and Open Text, Inc. v. Trend Micro Inc.*, No. 6:22-CV-00239-ADA-DTG, W.D. Tex., Sep. 13, 2022, 54 pgs.
Defendant's Preliminary Invalidity Contentions, Exhibit 844-A-34, *Webroot, Inc. and Open Text, Inc. v. Trend Micro Inc.*, No. 6:22-CV-00239-ADA-DTG, W.D. Tex., Sep. 13, 2022, 68 pgs.
Defendant's Preliminary Invalidity Contentions, Exhibit 844-A-35, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 844-A-36, *Webroot, Inc. and Open Text, Inc. v. Trend Micro Inc.*, No. 6:22-CV-00239-ADA-DTG, W.D. Tex., Sep. 13, 2022, 53 pgs.
Defendant's Preliminary Invalidity Contentions, Exhibit 844-A-37, *Webroot, Inc. and Open Text, Inc. v. Trend Micro Inc.*, No. 6:22-CV-00239-ADA-DTG, W.D. Tex., Sep. 13, 2022, 42 pgs.
Defendant's Preliminary Invalidity Contentions, Exhibit 844-A-38, *Webroot, Inc. and Open Text, Inc. v. Trend Micro Inc.*, No. 6:22-CV-00239-ADA-DTG, W.D. Tex., Sep. 13, 2022, 68 pgs.
Defendant's Preliminary Invalidity Contentions, Exhibit 844-A-39, *Webroot, Inc. and Open Text, Inc. v. Trend Micro Inc.*, No. 6:22-CV-00239-ADA-DTG, W.D. Tex., Sep. 13, 2022, 54 pgs.
Defendant's Preliminary Invalidity Contentions, Exhibit 844-A-40, *Webroot, Inc. and Open Text, Inc. v. Trend Micro Inc.*, No. 6:22-CV-00239-ADA-DTG, W.D. Tex., Sep. 13, 2022, 69 pgs.
Defendant's Preliminary Invalidity Contentions, Exhibit 844-A-41, *Webroot, Inc. and Open Text, Inc. v. Trend Micro Inc.*, No. 6:22-CV-00239-ADA-DTG, W.D. Tex., Sep. 13, 2022, 68 pgs.
Defendant's Preliminary Invalidity Contentions, Exhibit 844-A-42, *Webroot, Inc. and Open Text, Inc. v. Trend Micro Inc.*, No. 6:22-CV-00239-ADA-DTG, W.D. Tex., Sep. 13, 2022, 40 pgs.
Defendant's Preliminary Invalidity Contentions, Exhibit 844-A-43, *Webroot, Inc. and Open Text, Inc. v. Trend Micro Inc.*, No. 6:22-CV-00239-ADA-DTG, W.D. Tex., Sep. 13, 2022, 56 pgs.
Defendant's Preliminary Invalidity Contentions, Exhibit 844-A-44, *Webroot, Inc. and Open Text, Inc. v. Trend Micro Inc.*, No. 6:22-CV-00239-ADA-DTG, W.D. Tex., Sep. 13, 2022, 67 pgs.
Defendant's Preliminary Invalidity Contentions, Exhibit 844-A-45, *Webroot, Inc. and Open Text, Inc. v. Trend Micro Inc.*, No. 6:22-CV-00239-ADA-DTG, W.D. Tex., Sep. 13, 2022, 66 pgs.
Defendant's Preliminary Invalidity Contentions, Exhibit 844-A-46, *Webroot, Inc. and Open Text, Inc. v. Trend Micro Inc.*, No. 6:22-CV-00239-ADA-DTG, W.D. Tex., Sep. 13, 2022, 81 pgs.
Defendant's Preliminary Invalidity Contentions, Exhibit 844-A-47, *Webroot, Inc. and Open Text, Inc. v. Trend Micro Inc.*, No. 6:22-CV-00239-ADA-DTG, W.D. Tex., Sep. 13, 2022, 24 pgs.
Defendant's Preliminary Invalidity Contentions, Exhibit 844-A-48, *Webroot, Inc. and Open Text, Inc. v. Trend Micro Inc.*, No. 6:22-CV-00239-ADA-DTG, W.D. Tex., Sep. 13, 2022, 78 pgs.
Defendant's Preliminary Invalidity Contentions, Exhibit 844-A-49, *Webroot, Inc. and Open Text, Inc. v. Trend Micro Inc.*, No. 6:22-CV-00239-ADA-DTG, W.D. Tex., Sep. 13, 2022, 79 pgs.
Defendant's Preliminary Invalidity Contentions, Exhibit 844-A-50, *Webroot, Inc. and Open Text, Inc. v. Trend Micro Inc.*, No. 6:22-CV-00239-ADA-DTG, W.D. Tex., Sep. 13, 2022, 73 pgs.
Defendant's Preliminary Invalidity Contentions, Exhibit 844-A-51, *Webroot, Inc. and Open Text, Inc. v. Trend Micro Inc.*, No. 6:22-CV-00239-ADA-DTG, W.D. Tex., Sep. 13, 2022, 53 pgs.
Defendant's Preliminary Invalidity Contentions, Exhibit 844-A-52, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 844-A-53, *Webroot, Inc. and Open Text, Inc. v. Trend Micro Inc.*, No. 6:22-CV-00239-ADA-DTG, W.D. Tex., Sep. 13, 2022, 75 pgs.
Defendant's Preliminary Invalidity Contentions, Exhibit 844-A-54, *Webroot, Inc. and Open Text, Inc. v. Trend Micro Inc.*, No. 6:22-CV-00239-ADA-DTG, W.D. Tex., Sep. 13, 2022, 23 pgs.
Defendant's Preliminary Invalidity Contentions, Exhibit 844-A-55, *Webroot, Inc. and Open Text, Inc. v. Trend Micro Inc.*, No. 6:22-CV-00239-ADA-DTG, W.D. Tex., Sep. 13, 2022, 19 pgs.
Defendant's Preliminary Invalidity Contentions, Exhibit 844-A-56, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 844-A-57, *Webroot, Inc. and Open Text, Inc. v. Trend Micro Inc.*, No. 6:22-CV-00239-ADA-DTG, W.D. Tex., Sep. 13, 2022, 105 pgs.
Defendant's Preliminary Invalidity Contentions, Exhibit 844-A-58, *Webroot, Inc. and Open Text, Inc. v. Trend Micro Inc.*, No. 6:22-CV-00239-ADA-DTG, W.D. Tex., Sep. 13, 2022, 82 pgs.
Defendant's Preliminary Invalidity Contentions, Exhibit 844-A-59, *Webroot, Inc. and Open Text, Inc. v. Trend Micro Inc.*, No. 6:22-CV-00239-ADA-DTG, W.D. Tex., Sep. 13, 2022, 78 pgs.
Defendant's Preliminary Invalidity Contentions, Exhibit 844-A-60, *Webroot, Inc. and Open Text, Inc. v. Trend Micro Inc.*, No. 6:22-CV-00239-ADA-DTG, W.D. Tex., Sep. 13, 2022, 64 pgs.
Defendant's Preliminary Invalidity Contentions, Exhibit 844-A-61, *Webroot, Inc. and Open Text, Inc. v. Trend Micro Inc.*, No. 6:22-CV-00239-ADA-DTG, W.D. Tex., Sep. 13, 2022, 59 pgs.
Defendant's Preliminary Invalidity Contentions, Exhibit 844-A-62, *Webroot, Inc. and Open Text, Inc. v. Trend Micro Inc.*, No. 6:22-CV-00239-ADA-DTG, W.D. Tex., Sep. 13, 2022, 81 pgs.
Defendant's Preliminary Invalidity Contentions, Exhibit 844-A-63, *Webroot, Inc. and Open Text, Inc. v. Trend Micro Inc.*, No. 6:22-CV-00239-ADA-DTG, W.D. Tex., Sep. 13, 2022, 47 pgs.
Defendant's Preliminary Invalidity Contentions, Exhibit 844-A-64, *Webroot, Inc. and Open Text, Inc. v. Trend Micro Inc.*, No. 6:22-CV-00239-ADA-DTG, W.D. Tex., Sep. 13, 2022, 81 pgs.

(56) References Cited

OTHER PUBLICATIONS

Defendant's Preliminary Invalidity Contentions, Exhibit 844-A-65, *Webroot, Inc. and Open Text, Inc. v. Trend Micro Inc.*, No. 6:22-CV-00239-ADA-DTG, W.D. Tex., Sep. 13, 2022, 52 pgs.
Defendant's Preliminary Invalidity Contentions, Exhibit 844-A-66, *Webroot, Inc. and Open Text, Inc. v. Trend Micro Inc.*, No. 6:22-CV-00239-ADA-DTG, W.D. Tex., Sep. 13, 2022, 83 pgs.
Defendant's Preliminary Invalidity Contentions, Exhibit 844-A-67, *Webroot, Inc. and Open Text, Inc. v. Trend Micro Inc.*, No. 6:22-CV-00239-ADA-DTG, W.D. Tex., Sep. 13, 2022, 25 pgs.
Defendant's Preliminary Invalidity Contentions, Exhibit 844-A-68, *Webroot, Inc. and Open Text, Inc. v. Trend Micro Inc.*, No. 6:22-CV-00239-ADA-DTG, W.D. Tex., Sep. 13, 2022, 28 pgs.
Defendant's Preliminary Invalidity Contentions, Exhibit 844-A-69, *Webroot, Inc. and Open Text, Inc. v. Trend Micro Inc.*, No. 6:22-CV-00239-ADA-DTG, W.D. Tex., Sep. 13, 2022, 80 pgs.
Defendant's Preliminary Invalidity Contentions, Exhibit 844-A-70, *Webroot, Inc. and Open Text, Inc. v. Trend Micro Inc.*, No. 6:22-CV-00239-ADA-DTG, W.D. Tex., Sep. 13, 2022, 88 pgs.
Defendant's Preliminary Invalidity Contentions, Exhibit 844-A-71, *Webroot, Inc. and Open Text, Inc. v. Trend Micro Inc.*, No. 6:22-CV-00239-ADA-DTG, W.D. Tex., Sep. 13, 2022, 100 pgs.
Defendant's Preliminary Invalidity Contentions, Exhibit 844-A-72, *Webroot, Inc. and Open Text, Inc. v. Trend Micro Inc.*, No. 6:22-CV-00239-ADA-DTG, W.D. Tex., Sep. 13, 2022, 63 pgs.
Defendant's Preliminary Invalidity Contentions, Exhibit 844-A-73, *Webroot, Inc. and Open Text, Inc. v. Trend Micro Inc.*, No. 6:22-CV-00239-ADA-DTG, W.D. Tex., Sep. 13, 2022, 97 pgs.
Defendant's Preliminary Invalidity Contentions, Exhibit 844-A-74, *Webroot, Inc. and Open Text, Inc. v. Trend Micro Inc.*, No. 6:22-CV-00239-ADA-DTG, W.D. Tex., Sep. 13, 2022, 149 pgs.
Defendant's Preliminary Invalidity Contentions, Exhibit 844-A-75, *Webroot, Inc. and Open Text, Inc. v. Trend Micro Inc.*, No. 6:22-CV-00239-ADA-DTG, W.D. Tex., Sep. 13, 2022, 57 pgs.
Defendant's Preliminary Invalidity Contentions, Exhibit 844-A-76, *Webroot, Inc. and Open Text, Inc. v. Trend Micro Inc.*, No. 6:22-CV-00239-ADA-DTG, W.D. Tex., Sep. 13, 2022, 73 pgs.
Defendant's Preliminary Invalidity Contentions, Exhibit 844-A-77, *Webroot, Inc. and Open Text, Inc. v. Trend Micro Inc.*, No. 6:22-CV-00239-ADA-DTG, W.D. Tex., Sep. 13, 2022, 48 pgs.
Defendant's Preliminary Invalidity Contentions, Exhibit 844-B, *Webroot, Inc. and Open Text, Inc. v. Trend Micro Inc.*, No. 6:22-CV-00239-ADA-DTG, W.D. Tex., Sep. 13, 2022, 52 pgs.
Defendant's Preliminary Invalidity Contentions, Exhibit 869-A-1, *Webroot, Inc. and Open Text, Inc. v. Trend Micro Inc.*, No. 6:22-CV-00239-ADA-DTG, W.D. Tex., Feb. 21, 2023, 31 pgs.
Defendant's Preliminary Invalidity Contentions, Exhibit 869-A-2, *Webroot, Inc. and Open Text, Inc. v. Trend Micro Inc.*, No. 6:22-CV-00239-ADA-DTG, W.D. Tex., Feb. 21, 2023, 59 pgs.
Defendant's Preliminary Invalidity Contentions, Exhibit 869-A-3, *Webroot, Inc. and Open Text, Inc. v. Trend Micro Inc.*, No. 6:22-CV-00239-ADA-DTG, W.D. Tex., Feb. 21, 2023, 36 pgs.
Defendant's Preliminary Invalidity Contentions, Exhibit 869-A-4, *Webroot, Inc. and Open Text, Inc. v. Trend Micro Inc.*, No. 6:22-CV-00239-ADA-DTG, W.D. Tex., Feb. 21, 2023, 37 pgs.
Defendant's Preliminary Invalidity Contentions, Exhibit 869-A-5, *Webroot, Inc. and Open Text, Inc. v. Trend Micro Inc.*, No. 6:22-CV-00239-ADA-DTG, W.D. Tex., Feb. 21, 2023, 32 pgs.
Defendant's Preliminary Invalidity Contentions, Exhibit 869-A-6, *Webroot, Inc. and Open Text, Inc. v. Trend Micro Inc.*, No. 6:22-CV-00239-ADA-DTG, W.D. Tex., Feb. 21, 2023, 65 pgs.
Defendant's Preliminary Invalidity Contentions, Exhibit 869-A-7, *Webroot, Inc. and Open Text, Inc. v. Trend Micro Inc.*, No. 6:22-CV-00239-ADA-DTG, W.D. Tex., Feb. 21, 2023, 27 pgs.
Defendant's Preliminary Invalidity Contentions, Exhibit 869-A-8, *Webroot, Inc. and Open Text, Inc. v. Trend Micro Inc.*, No. 6:22-CV-00239-ADA-DTG, W.D. Tex., Feb. 21, 2023, 29 pgs.
Defendant's Preliminary Invalidity Contentions, Exhibit 869-A-9, *Webroot, Inc. and Open Text, Inc. v. Trend Micro Inc.*, No. 6:22-CV-00239-ADA-DTG, W.D. Tex., Feb. 21, 2023, 29 pgs.
Defendant's Preliminary Invalidity Contentions, Exhibit 869-A-10, *Webroot, Inc. and Open Text, Inc. v. Trend Micro Inc.*, No. 6:22-CV-00239-ADA-DTG, W.D. Tex., Feb. 21, 2023, 30 pgs.
Defendant's Preliminary Invalidity Contentions, Exhibit 869-A-11, *Webroot, Inc. and Open Text, Inc. v. Trend Micro Inc.*, No. 6:22-CV-00239-ADA-DTG, W.D. Tex., Feb. 21, 2023, 30 pgs.
Defendant's Preliminary Invalidity Contentions, Exhibit 869-A-12, *Webroot, Inc. and Open Text, Inc. v. Trend Micro Inc.*, No. 6:22-CV-00239-ADA-DTG, W.D. Tex., Feb. 21, 2023, 35 pgs.
Defendant's Preliminary Invalidity Contentions, Exhibit 869-A-13, *Webroot, Inc. and Open Text, Inc. v. Trend Micro Inc.*, No. 6:22-CV-00239-ADA-DTG, W.D. Tex., Feb. 21, 2023, 36 pgs.
Defendant's Preliminary Invalidity Contentions, Exhibit 869-A-14, *Webroot, Inc. and Open Text, Inc. v. Trend Micro Inc.*, No. 6:22-CV-00239-ADA-DTG, W.D. Tex., Feb. 21, 2023, 32 pgs.
Defendant's Preliminary Invalidity Contentions, Exhibit 869-A-15, *Webroot, Inc. and Open Text, Inc. v. Trend Micro Inc.*, No. 6:22-CV-00239-ADA-DTG, W.D. Tex., Feb. 21, 2023, 33 pgs.
Defendant's Preliminary Invalidity Contentions, Exhibit 869-A-16, *Webroot, Inc. and Open Text, Inc. v. Trend Micro Inc.*, No. 6:22-CV-00239-ADA-DTG, W.D. Tex., Feb. 21, 2023, 34 pgs.
Defendant's Preliminary Invalidity Contentions, Exhibit 869-A-17, *Webroot, Inc. and Open Text, Inc. v. Trend Micro Inc.*, No. 6:22-CV-00239-ADA-DTG, W.D. Tex., Feb. 21, 2023, 48 pgs.
Defendant's Preliminary Invalidity Contentions, Exhibit 869-A-18, *Webroot, Inc. and Open Text, Inc. v. Trend Micro Inc.*, No. 6:22-CV-00239-ADA-DTG, W.D. Tex., Feb. 21, 2023, 38 pgs.
Defendant's Preliminary Invalidity Contentions, Exhibit 869-A-19, *Webroot, Inc. and Open Text, Inc. v. Trend Micro Inc.*, No. 6:22-CV-00239-ADA-DTG, W.D. Tex., Feb. 21, 2023, 33 pgs.
Defendant's Preliminary Invalidity Contentions, Exhibit 869-A-20, *Webroot, Inc. and Open Text, Inc. v. Trend Micro Inc.*, No. 6:22-CV-00239-ADA-DTG, W.D. Tex., Feb. 21, 2023, 33 pgs.
Defendant's Preliminary Invalidity Contentions, Exhibit 869-A-21, *Webroot, Inc. and Open Text, Inc. v. Trend Micro Inc.*, No. 6:22-CV-00239-ADA-DTG, W.D. Tex., Feb. 21, 2023, 45 pgs.
Defendant's Preliminary Invalidity Contentions, Exhibit 869-A-22, *Webroot, Inc. and Open Text, Inc. v. Trend Micro Inc.*, No. 6:22-CV-00239-ADA-DTG, W.D. Tex., Feb. 21, 2023, 35 pgs.
Defendant's Preliminary Invalidity Contentions, Exhibit 869-A-23, *Webroot, Inc. and Open Text, Inc. v. Trend Micro Inc.*, No. 6:22-CV-00239-ADA-DTG, W.D. Tex., Feb. 21, 2023, 35 pgs.
Defendant's Preliminary Invalidity Contentions, Exhibit 869-A-24, *Webroot, Inc. and Open Text, Inc. v. Trend Micro Inc.*, No. 6:22-CV-00239-ADA-DTG, W.D. Tex., Feb. 21, 2023, 55 pgs.
Defendant's Preliminary Invalidity Contentions, Exhibit 869-A-25, *Webroot, Inc. and Open Text, Inc. v. Trend Micro Inc.*, No. 6:22-CV-00239-ADA-DTG, W.D. Tex., Feb. 21, 2023, 56 pgs.
Defendant's Preliminary Invalidity Contentions, Exhibit 869-A-26, *Webroot, Inc. and Open Text, Inc. v. Trend Micro Inc.*, No. 6:22-CV-00239-ADA-DTG, W.D. Tex., Feb. 21, 2023, 83 pgs.
Defendant's Preliminary Invalidity Contentions, Exhibit 869-A-27, *Webroot, Inc. and Open Text, Inc. v. Trend Micro Inc.*, No. 6:22-CV-00239-ADA-DTG, W.D. Tex., Feb. 21, 2023, 25 pgs.
Defendant's Preliminary Invalidity Contentions, Exhibit 869-A-28, *Webroot, Inc. and Open Text, Inc. v. Trend Micro Inc.*, No. 6:22-CV-00239-ADA-DTG, W.D. Tex., Feb. 21, 2023, 79 pgs.
Defendant's Preliminary Invalidity Contentions, Exhibit 869-A-29, *Webroot, Inc. and Open Text, Inc. v. Trend Micro Inc.*, No. 6:22-CV-00239-ADA-DTG, W.D. Tex., Feb. 21, 2023, 95 pgs.
Defendant's Preliminary Invalidity Contentions, Exhibit 869-A-30, *Webroot, Inc. and Open Text, Inc. v. Trend Micro Inc.*, No. 6:22-CV-00239-ADA-DTG, W.D. Tex., Feb. 21, 2023, 24 pgs.
Defendant's Preliminary Invalidity Contentions, Exhibit 869-A-31, *Webroot, Inc. and Open Text, Inc. v. Trend Micro Inc.*, No. 6:22-CV-00239-ADA-DTG, W.D. Tex., Feb. 21, 2023, 25 pgs.
Defendant's Preliminary Invalidity Contentions, Exhibit 869-A-32, *Webroot, Inc. and Open Text, Inc. v. Trend Micro Inc.*, No. 6:22-CV-00239-ADA-DTG, W.D. Tex., Feb. 21, 2023, 68 pgs.
Defendant's Preliminary Invalidity Contentions, Exhibit 869-A-33, *Webroot, Inc. and Open Text, Inc. v. Trend Micro Inc.*, No. 6:22-CV-00239-ADA-DTG, W.D. Tex., Feb. 21, 2023, 27 pgs.

(56) References Cited

OTHER PUBLICATIONS

Defendant's Preliminary Invalidity Contentions, Exhibit 869-A-34, *Webroot, Inc. and Open Text, Inc. v. Trend Micro Inc.*, No. 6:22-CV-00239-ADA-DTG, W.D. Tex., Feb. 21, 2023, 21 pgs.
Defendant's Preliminary Invalidity Contentions, Exhibit 869-A-35, *Webroot, Inc. and Open Text, Inc. v. Trend Micro Inc.*, No. 6:22-CV-00239-ADA-DTG, W.D. Tex., Feb. 21, 2023, 126 pgs.
Defendant's Preliminary Invalidity Contentions, Exhibit 869-A-36, *Webroot, Inc. and Open Text, Inc. v. Trend Micro Inc.*, No. 6:22-CV-00239-ADA-DTG, W.D. Tex., Feb. 21, 2023, 27 pgs.
Defendant's Preliminary Invalidity Contentions, Exhibit 869-A-37, *Webroot, Inc. and Open Text, Inc. v. Trend Micro Inc.*, No. 6:22-CV-00239-ADA-DTG, W.D. Tex., Feb. 21, 2023, 112 pgs.
Defendant's Preliminary Invalidity Contentions, Exhibit 869-A-38, *Webroot, Inc. and Open Text, Inc. v. Trend Micro Inc.*, No. 6:22-CV-00239-ADA-DTG, W.D. Tex., Feb. 21, 2023, 41 pgs.
Defendant's Preliminary Invalidity Contentions, Exhibit 869-A-39, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 869-A-40, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 869-A-41, *Webroot, Inc. and Open Text, Inc. v. Trend Micro Inc.*, No. 6:22-CV-00239-ADA-DTG, W.D. Tex., Feb. 21, 2023, 54 pgs.
Defendant's Preliminary Invalidity Contentions, Exhibit 869-A-42, *Webroot, Inc. and Open Text, Inc. v. Trend Micro Inc.*, No. 6:22-CV-00239-ADA-DTG, W.D. Tex., Feb. 21, 2023, 63 pgs.
Defendant's Preliminary Invalidity Contentions, Exhibit 869-A-43, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 869-A-44, *Webroot, Inc. and Open Text, Inc. v. Trend Micro Inc.*, No. 6:22-CV-00239-ADA-DTG, W.D. Tex., Feb. 21, 2023, 64 pgs.
Defendant's Preliminary Invalidity Contentions, Exhibit 869-A-45, *Webroot, Inc. and Open Text, Inc. v. Trend Micro Inc.*, No. 6:22-CV-00239-ADA-DTG, W.D. Tex., Feb. 21, 2023, 23 pgs.
Defendant's Preliminary Invalidity Contentions, Exhibit 869-A-46, *Webroot, Inc. and Open Text, Inc. v. Trend Micro Inc.*, No. 6:22-CV-00239-ADA-DTG, W.D. Tex., Feb. 21, 2023, 22 pgs.
Defendant's Preliminary Invalidity Contentions, Exhibit 869-A-47, *Webroot, Inc. and Open Text, Inc. v. Trend Micro Inc.*, No. 6:22-CV-00239-ADA-DTG, W.D. Tex., Feb. 21, 2023, 22 pgs.
Defendant's Preliminary Invalidity Contentions, Exhibit 869-A-48, *Webroot, Inc. and Open Text, Inc. v. Trend Micro Inc.*, No. 6:22-CV-00239-ADA-DTG, W.D. Tex., Feb. 21, 2023, 64 pgs.
Defendant's Preliminary Invalidity Contentions, Exhibit 869-A-49, *Webroot, Inc. and Open Text, Inc. v. Trend Micro Inc.*, No. 6:22-CV-00239-ADA-DTG, W.D. Tex., Feb. 21, 2023, 65 pgs.
Defendant's Preliminary Invalidity Contentions, Exhibit 869-A-50, *Webroot, Inc. and Open Text, Inc. v. Trend Micro Inc.*, No. 6:22-CV-00239-ADA-DTG, W.D. Tex., Feb. 21, 2023, 108 pgs.
Defendant's Preliminary Invalidity Contentions, Exhibit 869-A-51, *Webroot, Inc. and Open Text, Inc. v. Trend Micro Inc.*, No. 6:22-CV-00239-ADA-DTG, W.D. Tex., Feb. 21, 2023, 111 pgs.
Defendant's Preliminary Invalidity Contentions, Exhibit 869-A-52, *Webroot, Inc. and Open Text, Inc. v. Trend Micro Inc.*, No. 6:22-CV-00239-ADA-DTG, W.D. Tex., Feb. 21, 2023, 81 pgs.
Defendant's Preliminary Invalidity Contentions, Exhibit 869-A-53, *Webroot, Inc. and Open Text, Inc. v. Trend Micro Inc.*, No. 6:22-CV-00239-ADA-DTG, W.D. Tex., Feb. 21, 2023, 51 pgs.
Defendant's Preliminary Invalidity Contentions, Exhibit 869-A-54, *Webroot, Inc. and Open Text, Inc. v. Trend Micro Inc.*, No. 6:22-CV-00239-ADA-DTG, W.D. Tex., Feb. 21, 2023, 61 pgs.
Defendant's Preliminary Invalidity Contentions, Exhibit 869-A-55, *Webroot, Inc. and Open Text, Inc. v. Trend Micro Inc.*, No. 6:22-CV-00239-ADA-DTG, W.D. Tex., Feb. 21, 2023, 61 pgs.
Defendant's Preliminary Invalidity Contentions, Exhibit 869-A-56, *Webroot, Inc. and Open Text, Inc. v. Trend Micro Inc.*, No. 6:22-CV-00239-ADA-DTG, W.D. Tex., Feb. 21, 2023, 107 pgs.
Defendant's Preliminary Invalidity Contentions, Exhibit 869-A-57, *Webroot, Inc. and Open Text, Inc. v. Trend Micro Inc.*, No. 6:22-CV-00239-ADA-DTG, W.D. Tex., Feb. 21, 2023, 47 pgs.
Defendant's Preliminary Invalidity Contentions, Exhibit 869-A-58, *Webroot, Inc. and Open Text, Inc. v. Trend Micro Inc.*, No. 6:22-CV-00239-ADA-DTG, W.D. Tex., Feb. 21, 2023, 108 pgs.
Defendant's Preliminary Invalidity Contentions, Exhibit 869-A-59, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 869-A-60, *Webroot, Inc. and Open Text, Inc. v. Trend Micro Inc.*, No. 6:22-CV-00239-ADA-DTG, W.D. Tex., Feb. 21, 2023, 78 pgs.
Defendant's Preliminary Invalidity Contentions, Exhibit 869-A-61, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 869-A-62, *Webroot, Inc. and Open Text, Inc. v. Trend Micro Inc.*, No. 6:22-CV-00239-ADA-DTG, W.D. Tex., Feb. 21, 2023, 77 pgs.
Defendant's Preliminary Invalidity Contentions, Exhibit 869-A-63, *Webroot, Inc. and Open Text, Inc. v. Trend Micro Inc.*, No. 6:22-CV-00239-ADA-DTG, W.D. Tex., Feb. 21, 2023, 80 pgs.
Defendant's Preliminary Invalidity Contentions, Exhibit 869-A-64, *Webroot, Inc. and Open Text, Inc. v. Trend Micro Inc.*, No. 6:22-CV-00239-ADA-DTG, W.D. Tex., Feb. 21, 2023, 76 pgs.
Defendant's Preliminary Invalidity Contentions, Exhibit 869-A-65, *Webroot, Inc. and Open Text, Inc. v. Trend Micro Inc.*, No. 6:22-CV-00239-ADA-DTG, W.D. Tex., Feb. 21, 2023, 77 pgs.
Defendant's Preliminary Invalidity Contentions, Exhibit 869-A-66, *Webroot, Inc. and Open Text, Inc. v. Trend Micro Inc.*, No. 6:22-CV-00239-ADA-DTG, W.D. Tex., Feb. 21, 2023, 76 pgs.
Defendant's Preliminary Invalidity Contentions, Exhibit 869-A-67, *Webroot, Inc. and Open Text, Inc. v. Trend Micro Inc.*, No. 6:22-CV-00239-ADA-DTG, W.D. Tex., Feb. 21, 2023, 78 pgs.
Defendant's Preliminary Invalidity Contentions, Exhibit 869-A-68, *Webroot, Inc. and Open Text, Inc. v. Trend Micro Inc.*, No. 6:22-CV-00239-ADA-DTG, W.D. Tex., Feb. 21, 2023, 46 pgs.
Defendant's Preliminary Invalidity Contentions, Exhibit 869-A-69, *Webroot, Inc. and Open Text, Inc. v. Trend Micro Inc.*, No. 6:22-CV-00239-ADA-DTG, W.D. Tex., Feb. 21, 2023, 63 pgs.
Defendant's Preliminary Invalidity Contentions, Exhibit 869-A-70, *Webroot, Inc. and Open Text, Inc. v. Trend Micro Inc.*, No. 6:22-CV-00239-ADA-DTG, W.D. Tex., Feb. 21, 2023, 94 pgs.
Defendant's Preliminary Invalidity Contentions, Exhibit 869-A-72, *Webroot, Inc. and Open Text, Inc. v. Trend Micro Inc.*, No. 6:22-CV-00239-ADA-DTG, W.D. Tex., Feb. 21, 2023, 49 pgs.
Defendant's Preliminary Invalidity Contentions, Exhibit 869-A-73, *Webroot, Inc. and Open Text, Inc. v. Trend Micro Inc.*, No. 6:22-CV-00239-ADA-DTG, W.D. Tex., Feb. 21, 2023, 53 pgs.
Defendant's Preliminary Invalidity Contentions, Exhibit 869-A-74, *Webroot, Inc. and Open Text, Inc. v. Trend Micro Inc.*, No. 6:22-CV-00239-ADA-DTG, W.D. Tex., Feb. 21, 2023, 64 pgs.
Defendant's Preliminary Invalidity Contentions, Exhibit 869-A-75, *Webroot, Inc. and Open Text, Inc. v. Trend Micro Inc.*, No. 6:22-CV-00239-ADA-DTG, W.D. Tex., Feb. 21, 2023, 44 pgs.
Defendant's Preliminary Invalidity Contentions, Exhibit 869-A-76, *Webroot, Inc. and Open Text, Inc. v. Trend Micro Inc.*, No. 6:22-CV-00239-ADA-DTG, W.D. Tex., Feb. 21, 2023, 73 pgs.
Defendant's Preliminary Invalidity Contentions, Exhibit 869-A-77, *Webroot, Inc. and Open Text, Inc. v. Trend Micro Inc.*, No. 6:22-CV-00239-ADA-DTG, W.D. Tex., Feb. 21, 2023, 54 pgs.
Defendant's Preliminary Invalidity Contentions, Exhibit 869-A-78, *Webroot, Inc. and Open Text, Inc. v. Trend Micro Inc.*, No. 6:22-CV-00239-ADA-DTG, W.D. Tex., Feb. 21, 2023, 44 pgs.
Defendant's Preliminary Invalidity Contentions, Exhibit 869-A-79, *Webroot, Inc. and Open Text, Inc. v. Trend Micro Inc.*, No. 6:22-CV-00239-ADA-DTG, W.D. Tex., Feb. 21, 2023, 56 pgs.
Defendant's Preliminary Invalidity Contentions, Exhibit 869-A-80, *Webroot, Inc. and Open Text, Inc. v. Trend Micro Inc.*, No. 6:22-CV-00239-ADA-DTG, W.D. Tex., Feb. 21, 2023, 43 pgs.
Defendant's Preliminary Invalidity Contentions, Exhibit 869-A-81, *Webroot, Inc. and Open Text, Inc. v. Trend Micro Inc.*, No. 6:22-CV-00239-ADA-DTG, W.D. Tex., Feb. 21, 2023, 40 pgs.

(56) References Cited

OTHER PUBLICATIONS

Defendant's Preliminary Invalidity Contentions, Exhibit 869-A-82, *Webroot, Inc. and Open Text, Inc. v. Trend Micro Inc.*, No. 6:22-CV-00239-ADA-DTG, W.D. Tex., Feb. 21, 2023, 40 pgs.
Defendant's Preliminary Invalidity Contentions, Exhibit 869-A-83, *Webroot, Inc. and Open Text, Inc. v. Trend Micro Inc.*, No. 6:22-CV-00239-ADA-DTG, W.D. Tex., Feb. 21, 2023, 44 pgs.
Defendant's Preliminary Invalidity Contentions, Exhibit 869-A-84, *Webroot, Inc. and Open Text, Inc. v. Trend Micro Inc.*, No. 6:22-CV-00239-ADA-DTG, W.D. Tex., Feb. 21, 2023, 74 pgs.
Defendant's Preliminary Invalidity Contentions, Exhibit 869-A-85, *Webroot, Inc. and Open Text, Inc. v. Trend Micro Inc.*, No. 6:22-CV-00239-ADA-DTG, W.D. Tex., Feb. 21, 2023, 42 pgs.
Defendant's Preliminary Invalidity Contentions, Exhibit 869-A-86, *Webroot, Inc. and Open Text, Inc. v. Trend Micro Inc.*, No. 6:22-CV-00239-ADA-DTG, W.D. Tex., Feb. 21, 2023, 38 pgs.
Defendant's Preliminary Invalidity Contentions, Exhibit 869-A-87, *Webroot, Inc. and Open Text, Inc. v. Trend Micro Inc.*, No. 6:22-CV-00239-ADA-DTG, W.D. Tex., Feb. 21, 2023, 30 pgs.
Defendant's Preliminary Invalidity Contentions, Exhibit 869-A-88, *Webroot, Inc. and Open Text, Inc. v. Trend Micro Inc.*, No. 6:22-CV-00239-ADA-DTG, W.D. Tex., Feb. 21, 2023, 35 pgs.
Defendant's Preliminary Invalidity Contentions, Exhibit 869-A-89, *Webroot, Inc. and Open Text, Inc. v. Trend Micro Inc.*, No. 6:22-CV-00239-ADA-DTG, W.D. Tex., Feb. 21, 2023, 35 pgs.
Defendant's Preliminary Invalidity Contentions, Exhibit 869-A-90, *Webroot, Inc. and Open Text, Inc. v. Trend Micro Inc.*, No. 6:22-CV-00239-ADA-DTG, W.D. Tex., Feb. 21, 2023, 41 pgs.
Defendant's Preliminary Invalidity Contentions, Exhibit 869-B, *Webroot, Inc. and Open Text, Inc. v. Trend Micro Inc.*, No. 6:22-CV-00239-ADA-DTG, W.D. Tex., Feb. 21, 2023, 64 pgs.
*Crowdstrike, Inc. v. Webroot Inc.*, PTAB Case No. IPR2023-01051, Petition for Inter Partes Review of U.S. Pat. No. 8,719,932, Jun. 23, 2023, 75 pgs.
*Crowdstrike, Inc. v. Webroot Inc.*, PTAB Case No. IPR2023-01051, Exhibit 1001: U.S. Pat. No. 8,719,932, 12 pgs.
*Crowdstrike, Inc. v. Webroot Inc.*, PTAB Case No. IPR2023-01051, Exhibit 1002: File History of U.S. Pat. No. 8,719,932, 120 pgs.
*Crowdstrike, Inc. v. Webroot Inc.*, PTAB Case No. IPR2023-01051, Exhibit 1003: Declaration of Markus Jakobsson, Ph.D., 98 pgs.
*Crowdstrike, Inc. v. Webroot Inc.*, PTAB Case No. IPR2023-01051, Exhibit 1004: U.S. Pat. No. 7,979,889, Gladstone et al., 23 pgs.
*Crowdstrike, Inc. v. Webroot Inc.*, PTAB Case No. IPR2023-01051, Exhibit 1005: U.S. Pat. No. 6,775,780, Muttik, 8 pgs.
*Crowdstrike, Inc. v. Webroot Inc.*, PTAB Case No. IPR2023-01051, Exhibit 1006: U.S. Pat. No. 7,093,292, Pantuso, 12 pgs.
*Crowdstrike, Inc. v. Webroot Inc.*, PTAB Case No. IPR2023-01051, Exhibit 1007: U.S. Pat. No. 8,321,910, English, 10 pgs.
*Crowdstrike, Inc. v. Webroot Inc.*, PTAB Case No. IPR2023-01051, Exhibit 1008: Plaintiffs' Responsive Claim Construction Brief, Dkt. 304, No. 22-cv-00241 (W.D. Texas), 70 pgs.
*Crowdstrike, Inc. v. Webroot Inc.*, PTAB Case No. IPR2023-01051, Exhibit 1009: Opening Claim Construction Brief, Dkt. 263, No. 22-cv-00241, (W.D. Texas), 69 pgs.
*Crowdstrike, Inc. v. Webroot Inc.*, PTAB Case No. IPR2023-01051, Exhibit 1010: Richard D. Schneeman, Device Driver Development for Microsoft Windows NT: Accessing Motion Control Hardware Using a Multimedia Framework, 1996, 54 pgs.
*Crowdstrike, Inc. v. Webroot Inc.*, PTAB Case No. IPR2023-01051, Exhibit 1011: U.S. Pat. No. 20070174911, Kronenberg, 13 pgs.
*Crowdstrike, Inc. v. Webroot Inc.*, PTAB Case No. IPR2023-01051, Exhibit 1012: U.S. Pat. No. 20060253584, Dixon et al., 74 pgs.
*Crowdstrike, Inc. v. Webroot Inc.*, PTAB Case No. IPR2023-01051, Exhibit 1013: U.S. Pat. No. 7,434,261, Costea et al., 12 pgs.
*Crowdstrike, Inc. v. Webroot Inc.*, PTAB Case No. IPR2023-01051, Exhibit 1014: U.S. Pat. No. 8,117,659, Hartrell et al., 16 pgs.
*Crowdstrike, Inc. v. Webroot Inc.*, PTAB Case No. IPR2023-01051, Exhibit 1015: Sophos Petition for Inter Partes Review of U.S. Pat. No. 8,719,932, 86 pgs.
*Crowdstrike, Inc. v. Webroot Inc.*, PTAB Case No. IPR2023-01051, Exhibit 1016: No. 22-cv-00241, Order Granting Fifth Amended Scheduling Order, 9 pgs.
*Crowdstrike, Inc. v. Webroot Inc.*, PTAB Case No. IPR2023-01051, Exhibit 1017: No. 22-cv-00243, Order Resetting Markman Hearing, 1 pg.
*Crowdstrike, Inc. v. Webroot Inc.*, PTAB Case No. IPR2023-01051, Exhibit 1018: File History of U.S. Pat. No. 8,201,243, 423 pgs.
*Crowdstrike, Inc. v. Webroot Inc.*, PTAB Case No. IPR2023-01159, Petition for Inter Partes Review of U.S. Pat. No. 8,856,505 pursuant, 35 U.S.C. §§ 311-319, 37 CFR § 42, Jun. 30, 2023, 87 pgs.
*Crowdstrike, Inc. v. Webroot Inc.*, PTAB Case No. IPR2023-01159, Exhibit 1001: U.S. Pat. No. 8,856,505, 11 pgs.
*Crowdstrike, Inc. v. Webroot Inc.*, PTAB Case No. IPR2023-01159, Exhibit 1002: Excerpts from the Prosecution History of the '505 Patent, 351 pgs.
*Crowdstrike, Inc. v. Webroot Inc.*, PTAB Case No. IPR2023-01159, Exhibit 1003: Declaration of Dr. Markus Jakobsson, 128 pgs.
*Crowdstrike, Inc. v. Webroot Inc.*, PTAB Case No. IPR2023-01159, Exhibit 1004: U.S. Pat. No. 20080005797 A1, Field, 11 pgs.
*Crowdstrike, Inc. v. Webroot Inc.*, PTAB Case No. IPR2023-01159, Exhibit 1005: U.S. Pat. No. 20080016339 A1, Shukla, 26 pgs.
*Crowdstrike, Inc. v. Webroot Inc.*, PTAB Case No. IPR2023-01159, Exhibit 1006: U.S. Appl. No. 60/806,143, 54 pgs.
*Crowdstrike, Inc. v. Webroot Inc.*, PTAB Case No. IPR2023-01159, Exhibit 1007: U.S. Pat. No. 8,239,947 B1, Glick, 25 pgs.
*Crowdstrike, Inc. v. Webroot Inc.*, PTAB Case No. IPR2023-01159, Exhibit 1009: U.S. Pat. No. 7,784,098 B1, Fan, 28 pgs.
*Crowdstrike, Inc. v. Webroot Inc.*, PTAB Case No. IPR2023-01159, Exhibit 1010: U.S. Pat. No. 7,673,341 B2, Kramer, 16 pgs.
*Crowdstrike, Inc. v. Webroot Inc.*, PTAB Case No. IPR2023-01159, Exhibit 1011: Silberschatz, Operating System Concepts (2004), 71 pgs.
*Crowdstrike, Inc. v. Webroot Inc.*, PTAB Case No. IPR2023-01159, Exhibit 1012: *Webroot, Inc. v. CrowdStrike, Inc.*, Case No. 6:22-cv-00243 ADA, "Order Granting Fifth Amended Scheduling Order" (WDTX Mar. 29, 2023), 9 pgs.
*Crowdstrike, Inc. v. Webroot Inc.*, PTAB Case No. IPR2023-01159, Exhibit 1013: *Webroot, Inc. v. CrowdStrike, Inc.*, Case No. 6:22-cv-00243-ADA, "Order Resetting Markman Hearing" (WDTX Jun. 8, 2023), 1 pg.
*Crowdstrike, Inc. v. Webroot Inc.*, PTAB Case No. IPR2023-01159, Exhibit 1014: Memorandum: Interim Procedure for Discretionary Denials in AIA Post-Grant Proceedings with Parallel District Court Litigation, Jun. 21, 2022, 9 pgs.
*Crowdstrike, Inc. v. Webroot Inc.*, PTAB Case No. IPR2023-01159, Exhibit 1015: U.S. District Courts—Median Time Intervals From Filing, Disposition of Civil Cases Terminated, by District and Method of Disposition, During the 12-Month Period Ending Mar. 31, 2023, 95 pgs.
*AO Kaspersky Lab v. Webroot Inc.*, PTAB Case No. IPR2023-01160, Petition for Inter Partes Review under 35 U.S.C. § 312 and 37 CFR § 42.104, Jun. 29, 2023, 88 pgs.
*AO Kaspersky Lab v. Webroot Inc.*, PTAB Case No. IPR2023-01160, Exhibit 1001: U.S. Pat. No. 11,409,869 (issued Aug. 9, 2022), 16 pgs.
*AO Kaspersky Lab v. Webroot Inc.*, PTAB Case No. IPR2023-01160, Exhibit 1002: Declaration of V.S. Subrahmanian, Ph.D. under 37 C.F.R. §1.68, 145 pgs.
*AO Kaspersky Lab v. Webroot Inc.*, PTAB Case No. IPR2023-01160, Exhibit 1003: Curriculum Vitae of V.S. Subrahmanian, Ph.D., 77 pgs.
*AO Kaspersky Lab v. Webroot Inc.*, PTAB Case No. IPR2023-01160, Exhibit 1004: File History of U.S. Pat. No. 11,409,869, 345 pgs.
*AO Kaspersky Lab v. Webroot Inc.*, PTAB Case No. IPR2023-01160, Exhibit 1005: U.S. Pat. No. 20150213376, Ideses et al. (published Jul. 30, 2015), 19 pgs.
*AO Kaspersky Lab v. Webroot Inc.*, PTAB Case No. IPR2023-01160, Exhibit 1006: U.S. Pat. No. 20160154960, Sharma et al. (published Jun. 2, 2016), 29 pgs.

(56) References Cited

OTHER PUBLICATIONS

*AO Kaspersky Lab* v. *Webroot Inc.*, PTAB Case No. IPR2023-01160, Exhibit 1007: Charles Ledoux & Arun Lakhotia, Malware and Machine Learning, in Intelligent Methods Cyber Warfare 1 (2014), 42 pgs.
*AO Kaspersky Lab* v. *Webroot Inc.*, PTAB Case No. IPR2023-01160, Exhibit 1008: U.S. Pat. No. 20150213365, Ideses et al., 18 pgs.
*AO Kaspersky Lab* v. *Webroot Inc.*, PTAB Case No. IPR2023-01160, Exhibit 1009: Claim Construction Order, Mar. 16, 2023, Case No. 6:22-CV-00243-ADA-DTG, 20 pgs.
*AO Kaspersky Lab* v. *Webroot Inc.*, PTAB Case No. IPR2023-01160, Exhibit 1010: Joint Stipulation Reserving Appellate Rights, Apr. 12, 2023, Case No. 6:22-CV-00243-ADA-DTG, 9 pgs.
*AO Kaspersky Lab* v. *Webroot Inc.*, PTAB Case No. IPR2023-01160, Exhibit 1011: Kris Kendall, Practical Malware Analysis, in Black Hat Conf., USA (Aug. 2007), 10 pgs.
*AO Kaspersky Lab* v. *Webroot Inc.*, PTAB Case No. IPR2023-01160, Exhibit 1012: Hao Helen Zhang et al., Compactly Supported Radial Basis Function Kernels, Inst. Stat. Mimeo Series No. 2570, N. Carolina St. U. Dep't. Stat. 2 (2004), 19 pgs.
*AO Kaspersky Lab* v. *Webroot Inc.*, PTAB Case No. IPR2023-01160, Exhibit 1013: Zane Markel & Michael Bilzor, Building a Machine Learning Classifier for Malware Detection, 2014 Second Workshop Anti- Malware Testing Res. (WATeR) (2014), 4 pgs.
*AO Kaspersky Lab* v. *Webroot Inc.*, PTAB Case No. IPR2023-01160, Exhibit 1014: Naser Peiravian & Xingquan Zhu, Machine Learning for Android Malware Detection Using Permission and API Calls, IEEE 25th Int'l Conf. Tools Artificial Intelligence 300 (2013), 6 pgs.
*AO Kaspersky Lab* v. *Webroot Inc.*, PTAB Case No. IPR2023-01160, Exhibit 1015: Ekta Gandotra et al., Malware Analysis and Classification: A Survey, J. Inf. Security 5, 56-64 (2014), 9 pgs.
*AO Kaspersky Lab* v. *Webroot Inc.*, PTAB Case No. IPR2023-01160, Exhibit 1016: Rafiqul Islam et al., Classification of Malware Based on Integrated Static and Dynamic Features, 36 J. Network Computer Applications, 646 (2012), 11 pgs.
*AO Kaspersky Lab* v. *Webroot Inc.*, PTAB Case No. IPR2023-01160, Exhibit 1017: D. Michael Cai et al., Comparison of Feature Selection And Classification Algorithms In Identifying Malicious Executables, 51(6) Computational Stat. Data Analysis 3156 (2007), 17 pgs.
*AO Kaspersky Lab* v. *Webroot Inc.*, PTAB Case No. IPR2023-01160, Exhibit 1018: Guanhua Yan et al., Exploring Discriminatory Features for Automated Malware Classification, 10 Detection Intrusions Malware, Vulnerability Assessment: 10th Int'l Conf., 41 (2013), 21 pgs.
*AO Kaspersky Lab* v. *Webroot Inc.*, PTAB Case No. IPR2023-01160, Exhibit 1019: Rafiqul Islam et al., Classification of Malware Based on String and Function Feature Selection, 2010 Second Cybercrime Trustworthy Computing Workshop 9 (2010), 9 pgs.
*AO Kaspersky Lab* v. *Webroot Inc.*, PTAB Case No. IPR2023-01160, Exhibit 1020: Eitan Menahem et al., Improving Malware Detection by Applying Multi-Inducer Ensemble, Computational Stat. Data Analysis, 53(4), 1483 (2008), 12 pgs.
*AO Kaspersky Lab* v. *Webroot Inc.*, PTAB Case No. IPR2023-01160, Exhibit 1021: Ianir Ideses & Assaf Neuberger, Adware Detection and Privacy Control in Mobile Devices, in 2014 IEEE 28th Convention Electrical Electronics Engineers Israel 1 (2014), 5 pgs.
*AO Kaspersky Lab* v. *Webroot Inc.*, PTAB Case No. IPR2023-01160, Exhibit 1022: Raja Khurram Shahzad et al., Accurate Adware Detection Using Opcode Sequence Extraction, Sixth Int'l Conf. Availability, Reliability Security 189 (2011), 7 pgs.
*AO Kaspersky Lab* v. *Webroot Inc.*, PTAB Case No. IPR2023-01160, Exhibit 1023: Raymond Canzanese et al., Toward an Automatic, Online Behavioral Malware Classification System, IEEE 7th Int'l Conf. Self-Adaptive Self-Organizing Sys., 111 (2013), 10 pgs.
*AO Kaspersky Lab* v. *Webroot Inc.*, PTAB Case No. IPR2023-01160, Exhibit 1024: Yanfang Ye et al., Automatic Malware Categorization Using Cluster Ensemble, in Proc. 16th Acm Sigkdd Int'l Conf. Knowledge Discovery Data Mining 95 (2010), 10 pgs.
*AO Kaspersky Lab* v. *Webroot Inc.*, PTAB Case No. IPR2023-01160, Exhibit 1025: Asaf Shabtai et al., Detection of Malicious Code by Applying Machine Learning Classifiers on Static Features: A State-Of-The-Art Survey, Info. Security Tech. Rep. 14(1), 16 (2009), 14 pgs.
*AO Kaspersky Lab* v. *Webroot Inc.*, PTAB Case No. IPR2023-01160, Exhibit 1026: A.M. Aswini & P. Vinod, Droid Permission Miner: Mining Prominent Permissions for Android Malware Analysis, Fifth Int'l Conf. Applications Digital Inf. Web Tech. 81 (2014), 6 pgs.
*AO Kaspersky Lab* v. *Webroot Inc.*, PTAB Case No. IPR2023-01160, Exhibit 1027: Konrad Rieck et al., Learning and Classification of Malware Behavior, Detection Intrusions Malware, Vulnerability Assessment: 5th Int'l Conf., 108 (2008), 18 pgs.
*AO Kaspersky Lab* v. *Webroot Inc.*, PTAB Case No. IPR2023-01160, Exhibit 1028: Veelasha Moonsamy et al., Feature Reduction, Speed Up Malware Classification, Inf. Security Tech. Applications: 16th Nordic Conf. Secure It Sys., Tallinn, Est., Oct. 26-28, 2011, Rev. Selected Papers 16, 176 (2012), 13 pgs.
*AO Kaspersky Lab* v. *Webroot Inc.*, PTAB Case No. IPR2023-01160, Exhibit 1029: John P. Dickerson et al., Using Sentiment, Detect Bots on Twitter: Are Humans More Opinionated Than Bots?, IEEE/ACM Int'l Conf. Advances Social Networks Analysis Mining 620 (2014), 8 pgs.
*AO Kaspersky Lab* v. *Webroot Inc.*, PTAB Case No. IPR2023-01160, Exhibit 1030: Wei Yu et al., Towards Neural Network Based Malware Detection on Android Mobile Devices, Cybersecurity Sys. Human Cognition Augmentation 99 (2014), 19 pgs.
*AO Kaspersky Lab* v. *Webroot Inc.*, PTAB Case No. IPR2023-01160, Exhibit 1031: Guanhua Yan et al., 2013. Exploring Discriminatory Features for Automated Malware Classification, Detection Intrusions Malware, Vulnerability Assessment: 10th Int'l Conf., Dimva 2013, Berlin, Ger., Jul. 18-19, 2013 Proc. 10, 41 (2013), 21 pgs.
*AO Kaspersky Lab* v. *Webroot Inc.*, PTAB Case No. IPR2023-01160, Exhibit 1032: Julia Yu-Cheng et al., An Information Retrieval Approach for Malware Classification Based on Windows API Calls, Int'l Conf. Machine Learning Cybernetics 1678 (2013), 6 pgs.
*AO Kaspersky Lab* v. *Webroot Inc.*, PTAB Case No. IPR2023-01160, Exhibit 1033: Zi Chu et al., Detecting Automation of Twitter Accounts: Are You a Human, Bot, or Cyborg?, 9 IEEE Transactions Dependable Secure Computing 6, 811 (Nov./Dec. 2012), 14 pgs.
*AO Kaspersky Lab* v. *Webroot Inc.*, PTAB Case No. IPR2023-01160, Exhibit 1034: Axelle Apvrille, Android Reverse Engineering Tools From an Anti-Virus Analyst's Perspective, Fortinet, slides 11-15 (Mar. 2012), http://wikisec.free.fr/papers/insomnidroid.pdf, 69 pgs.
*AO Kaspersky Lab* v. *Webroot Inc.*, PTAB Case No. IPR2023-01160, Exhibit 1035: Li Sun et al., Pattern Recognition Techniques for the Classification of Malware Packers, 15 Proc. Inf. Security Priv.: 15th Australasian Conf., Acisp 2010, Sydney, Austl., Jul. 5-7, 2010, 370, 21 pgs.
*AO Kaspersky Lab* v. *Webroot Inc.*, PTAB Case No. IPR2023-01160, Exhibit 1036: Munkhbayar Bat-Erdene et al., Dynamic Classification of Packing Algorithms for Inspecting Executables Using Entropy Analysis, 8th Int'l Conf. Malicious Unwanted Software: "Americas" (Malware) 19, 2013, 8 pgs.
*AO Kaspersky Lab* v. *Webroot Inc.*, PTAB Case No. IPR2023-01160, Exhibit 1037: M. Zubair et al., PE-Probe: Leveraging Packer Detection and Structural Information, Detect Malicious Portable Executables, 8 Proc. Virus Bull. Conf. (2009), 10 pgs.
*Crowdstrike, Inc.* v. *Webroot Inc.*, PTAB Case No. IPR2023-01053, Petition for Inter Partes Review of U.S. Pat. No. 11,409,869, Jul. 3, 2023, 84 pgs.
*Crowdstrike, Inc.* v. *Webroot Inc.*, PTAB Case No. IPR2023-01053, Exhibit 1001: U.S. Pat. No. 11,409,869, 16 pgs.
*Crowdstrike, Inc.* v. *Webroot Inc.*, PTAB Case No. IPR2023-01053, Exhibit 1002: File History of U.S. Pat. No. 11,409,869, 347 pgs.
*Crowdstrike, Inc.* v. *Webroot Inc.*, PTAB Case No. IPR2023-01053, Exhibit 1003: Declaration of Markus Jakobsson, Ph.D., 122 pgs.

(56) References Cited

OTHER PUBLICATIONS

*Crowdstrike, Inc. v. Webroot Inc.*, PTAB Case No. IPR2023-01053, Exhibit 1004: U.S. Pat. No. 20120317644, Kumar et al., 16 pgs.
*Crowdstrike, Inc. v. Webroot Inc.*, PTAB Case No. IPR2023-01053, Exhibit 1005: Mal-ID: Automatic Malware Detection Using Common Segment Analysis and Meta-Features by Gil Tahan et al., 31 pgs.
*Crowdstrike, Inc. v. Webroot Inc.*, PTAB Case No. IPR2023-01053, Exhibit 1006: File History of U.S. Pat. No. 10,599,844, 458 pgs.
*Crowdstrike, Inc. v. Webroot Inc.*, PTAB Case No. IPR2023-01053, Exhibit 1007: No. 22-cv-00243, Plaintiffs' Responsive Claim Construction Brief, 70 pgs.
*Crowdstrike, Inc. v. Webroot Inc.*, PTAB Case No. IPR2023-01053, Exhibit 1008: Declaration of June Ann Munford, 50 pgs.
*Crowdstrike, Inc. v. Webroot Inc.*, PTAB Case No. IPR2023-01053, Exhibit 1009: Plaintiffs' Responsive Claim Construction Brief, No. 22-cv-00243, (W.D. Texas), 86 pgs.
*Crowdstrike, Inc. v. Webroot Inc.*, PTAB Case No. IPR2023-01053, Exhibit 1010: Claim Construction Order, No. 22-cv-00243, (W.D. Texas), 20 pgs.
*Crowdstrike, Inc. v. Webroot Inc.*, PTAB Case No. IPR2023-01053, Exhibit 1011: *Sophos Inc. v. Open Text Inc.*, PGR2023-00031, Paper 1, 119 pgs.
*Crowdstrike, Inc. v. Webroot Inc.*, PTAB Case No. IPR2023-01053, Exhibit 1012: *AO Kaspersky Lab v. Webroot, Inc.*, IPR2023-01160, Paper 1, 88 pgs.
*Crowdstrike, Inc. v. Webroot Inc.*, PTAB Case No. IPR2023-01053, Exhibit 1013: Order Granting Fifth Amended Scheduling Order, No. 22-cv-00243, (W.D., Texas), 9 pgs.
*Crowdstrike, Inc. v. Webroot Inc.*, PTAB Case No. IPR2023-01053, Exhibit 1014: Order Resetting Markman Hearing, No. 22-cv-00243, (W.D. Texas), 1 pg.
*Crowdstrike, Inc. v. Webroot Inc.*, PTAB Case No. IPR2023-01053, Exhibit 1015: Declaration of Dr. Ingrid Hsieg Yee, 98 pgs.
*Crowdstrike, Inc. v. Webroot Inc.*, PTAB Case No. IPR2023-01053, Exhibit 1016: U.S. Pat. No. 20130326625, Anderson et al., 82 pgs.
*Crowdstrike, Inc. v. Webroot Inc.*, PTAB Case No. IPR2023-01053, Exhibit 1017: U.S. Pat. No. 8,266,698, Seshardi et al., 16 pgs.
*Crowdstrike, Inc. v. Webroot Inc.*, PTAB Case No. IPR2023-01053, Exhibit 1018: U.S. Pat. No. 9,489,514, Mankin et al., 12 pgs.
*Crowdstrike, Inc. v. Webroot Inc.*, PTAB Case No. IPR2023-01053, Exhibit 1019: Songlun Zhao et al., Intrusion Detection Using The Support Vector Machine Enhanced With A Feature—Weight Kernel, University of Regina, Sep. 2007, 88 pgs.
*Crowdstrike, Inc. v. Webroot Inc.*, PTAB Case No. IPR2023-01053, Exhibit 1020: Srinivas Mukkamala et al., Intrusion Detection Using Neural Networks and Support Vector Machines, IEEE, 2002, 6 pgs.
*Crowdstrike, Inc. v. Webroot Inc.*, PTAB Case No. IPR2023-01053, Exhibit 1021: Nhauo Davuth et al., Classification of Malicious Domain Names using Support Vector Machine and Bi-gram Method, International Journal of Security and Its Application, vol. 7, No. 1, Jan. 2013, 8 pgs.
*Crowdstrike, Inc. v. Webroot Inc.*, PTAB Case No. IPR2023-01053, Exhibit 1022: Ping Wang et al., Malware behavioral detection and vaccine development by using a support vector model classifier, Journal of Computer and System Sciences, 81, 2015, pp. 1012-1026.
*Crowdstrike, Inc. v. Webroot Inc.*, PTAB Case No. IPR2023-01053, Exhibit 1023: M. Zubair Rafique, FIRMA: Malware Clustering and Network Signature Generation with Mixed Network Behaviors, RAID 2013, LNCS 8145, pp. 144-163.
*Crowdstrike, Inc. v. Webroot Inc.*, PTAB Case No. IPR2023-01053, Exhibit 1024: U.S. Pat. No. 2008/0319932, Wen-tau Yih et al., 26 pgs.
*Crowdstrike, Inc. v. Webroot Inc.*, PTAB Case No. IPR2023-01053, Exhibit 1025: Proceso L. Fernandez Jr. et al., Comparative Analysis of Combinations of Dimension Reduction and Data Mining Techniques for Malware Detection, Ateneo de Manila University, 2010, 9 pgs.
*Crowdstrike, Inc. v. Webroot Inc.*, PTAB Case No. IPR2023-01053, Exhibit 1026: U.S. Pat. No. 8,418,249, Nucci et al., 30 pgs.
*Crowdstrike, Inc. v. Webroot Inc.*, PTAB Case No. IPR2023-01053, Exhibit 1027: U.S. Pat. No. 8,161,548, Wan, 28 pgs.
*Crowdstrike, Inc. v. Webroot Inc.*, PTAB Case No. IPR2023-01053, Exhibit 1028: U.S. Pat. No. 8,875,289 B2, Mahaffey et al., 53 pgs.
*Crowdstrike, Inc. v. Webroot Inc.*, PTAB Case No. IPR2023-01053, Exhibit 1029: U.S. Pat. No. 9,349,103, Eberhardt, III et al., 24 pgs.
*Crowdstrike, Inc. v. Webroot Inc.*, PTAB Case No. IPR2023-01053, Exhibit 1030: U.S. Pat. No. 9,043,894, Dennison et al., 48 pgs.
*Crowdstrike, Inc. v. Webroot Inc.*, PTAB Case No. IPR2023-01053, Exhibit 1031: U.S. Pat. No. 9,306,971, Altman et al., 9 pgs.
*Crowdstrike, Inc. v. Webroot Inc.*, PTAB Case No. IPR2023-01053, Exhibit 1032: U.S. Pat. No. 20070245420, Yong et al., 13 pgs.
*Crowdstrike, Inc. v. Webroot Inc.*, PTAB Case No. IPR2023-01053, Exhibit 1033: U.S. Pat. No. 9,721,212, Gupta et al., 39 pgs.
*Crowdstrike, Inc. v. Webroot Inc.*, PTAB Case No. IPR2023-01053, Exhibit 1034: U.S. Pat. No. 9,324,034, Gupta et al., 33 pgs.
*Crowdstrike, Inc. v. Webroot Inc.*, PTAB Case No. IPR2023-01053, Exhibit 1035: U.S. Pat. No. 10,783,254, Sharma et al., 29 pgs.
*Crowdstrike, Inc. v. Webroot Inc.*, PTAB Case No. IPR2023-01053, Exhibit 1036: Xing An, "Ensemble Methods for Malware Diagnosis Based on One-class SVMs" Louisiana State University, 2012, 43 pgs.
*Crowdstrike, Inc. v. Webroot Inc.*, PTAB Case No. IPR2023-01053, Exhibit 1037: U.S. Pat. No. 9,306,966, Eskin et al., 35 pgs.
*Crowdstrike, Inc. v. Webroot Inc.*, PTAB Case No. IPR2023-01052, Petition for Inter Partes Review of U.S. Pat. No. 8,201,243, Jun. 23, 2023, 76 pgs.
*Crowdstrike, Inc. v. Webroot Inc.*, PTAB Case No. IPR2023-01052, Exhibit 1001: U.S. Pat. No. 8,201,243, 13 pgs.
*Crowdstrike, Inc. v. Webroot Inc.*, PTAB Case No. IPR2023-01052, Exhibit 1002: File History of U.S. Pat. No. 8,201,243, 423 pgs.
*Crowdstrike, Inc. v. Webroot Inc.*, PTAB Case No. IPR2023-01052, Exhibit 1003: Declaration of Markus Jakobsson, Ph.D. , 102 pgs.
*Crowdstrike, Inc. v. Webroot Inc.*, PTAB Case No. IPR2023-01052, Exhibit 1004: U.S. Pat. No. 7,979,889 Gladstone, 23 pgs.
*Crowdstrike, Inc. v. Webroot Inc.*, PTAB Case No. IPR2023-01052, Exhibit 1005: U.S. Pat. No. 6,775,780 Muttik, 8 pgs.
*Crowdstrike, Inc. v. Webroot Inc.*, PTAB Case No. IPR2023-01052, Exhibit 1006: U.S. Pat. No. 7,093,292 Pantuso, 12 pgs.
*Crowdstrike, Inc. v. Webroot Inc.*, PTAB Case No. IPR2023-01052, Exhibit 1007: U.S. Pat. No. 8,321,910 English, 10 pgs.
*Crowdstrike, Inc. v. Webroot Inc.*, PTAB Case No. IPR2023-01052, Exhibit 1008: 22-cv-00241, Plaintiffs' Responsive Claim Construction Brief, 70 pgs.
*Crowdstrike, Inc. v. Webroot Inc.*, PTAB Case No. IPR2023-01052, Exhibit 1009: 22-cv-00241, Opening Claim Construction Brief, 69 pgs.
*Crowdstrike, Inc. v. Webroot Inc.*, PTAB Case No. IPR2023-01052, Exhibit 1010: Richard D. Schneeman, Device Driver Development for Microsoft Windows NT: Accessing Motion Control Hardware Using a Multimedia Framework, 1996, 54 pgs.
*Crowdstrike, Inc. v. Webroot Inc.*, PTAB Case No. IPR2023-01052, Exhibit 1011: U.S. Appl. No. 20070174911 Kronenberg, 13 pgs.
*Crowdstrike, Inc. v. Webroot Inc.*, PTAB Case No. IPR2023-01052, Exhibit 1012: U.S. Appl. No. 20060253584 Dixon, 74 pgs.
*Crowdstrike, Inc. v. Webroot Inc.*, PTAB Case No. IPR2023-01052, Exhibit 1013: U.S. Pat. No. 7,434,261 Costea, 12 pgs.
*Crowdstrike, Inc. v. Webroot Inc.*, PTAB Case No. IPR2023-01052, Exhibit 1014: U.S. Pat. No. 8,117,659 Hartrell, 16 pgs.
*Crowdstrike, Inc. v. Webroot Inc.*, PTAB Case No. IPR2023-01052, Exhibit 1015: Sophos Petition for Inter Partes Review of U.S. Pat. No. 8,201,243, 86 pgs.
*Crowdstrike, Inc. v. Webroot Inc.*, PTAB Case No. IPR2023-01052, Exhibit 1016: 22-cv-00241, Order Granting Fifth Amended Scheduling Order, 9 pgs.
*Crowdstrike, Inc. v. Webroot Inc.*, PTAB Case No. IPR2023-01052, Exhibit 1017: 22-cv-00243, Order Resetting Markman Hearing, 1 pg.
*Crowdstrike, Inc. v. Webroot Inc.*, PTAB Case No. IPR2023-01052, Patent Owner Open Text Inc.'s Mandatory Notices Pursuant to 37 CFR § 42.8(b), Jul. 14, 23, 9 pgs.

(56) References Cited

OTHER PUBLICATIONS

*Crowdstrike, Inc.* v. *Webroot Inc.*, PTAB Case No. IPR2023-01158, Petition for Inter Partes Review of U.S. Pat. No. 8,181,244, Jun. 30, 2023, 78 pgs.
*Crowdstrike, Inc.* v. *Webroot Inc.*, PTAB Case No. IPR2023-01158, Exhibit 1001: U.S. Pat. No. 8,181,244, 13 pgs.
*Crowdstrike, Inc.* v. *Webroot Inc.*, PTAB Case No. IPR2023-01158, Exhibit 1002: Excerpts from the Prosecution History of the '244 Patent, 389 pgs.
*Crowdstrike, Inc.* v. *Webroot Inc.*, PTAB Case No. IPR2023-01158, Exhibit 1003: Declaration of Dr. Markus Jakobsson, 107 pgs.
*Crowdstrike, Inc.* v. *Webroot Inc.*, PTAB Case No. IPR2023-01158, Exhibit 1004: U.S. Appl. No. 20070150957 Hartrell, 16 pgs.
*Crowdstrike, Inc.* v. *Webroot Inc.*, PTAB Case No. IPR2023-01158, Exhibit 1005: U.S. Pat. No. 7,784,098 Fan, 28 pgs.
*Crowdstrike, Inc.* v. *Webroot Inc.*, PTAB Case No. IPR2023-01158, Exhibit 1006: U.S. Pat. No. 7,352,280 Rockwood, 24 pgs.
*Crowdstrike, Inc.* v. *Webroot Inc.*, PTAB Case No. IPR2023-01158, Exhibit 1007: U.S. Pat. No. 7,571,482 Polyakov, 14 pgs.
*Crowdstrike, Inc.* v. *Webroot Inc.*, PTAB Case No. IPR2023-01158, Exhibit 1008: U.S. Pat. No. 8,516,583 Thomas, 14 pgs.
*Crowdstrike, Inc.* v. *Webroot Inc.*, PTAB Case No. IPR2023-01158, Exhibit 1009: U.S. Pat. No. 7,549,055 Zimmer, 10 pgs.
*Crowdstrike, Inc.* v. *Webroot Inc.*, PTAB Case No. IPR2023-01158, Exhibit 1010: U.S. District Courts—Median Time Intervals From Filing to Disposition of Civil Cases Terminated, by District and Method of Disposition, During the 12-Month Period Ending Mar. 31, 2023, 95 pgs.
*Crowdstrike, Inc.* v. *Webroot Inc.*, PTAB Case No. IPR2023-01158, Exhibit 1011: Memorandum: Interim Procedure for Discretionary Denials in AIA Post-Grant Proceedings with Parallel District Court Litigation, Jun. 21, 2022, 9 pgs.
*Crowdstrike, Inc.* v. *Webroot Inc.*, PTAB Case No. IPR2023-01158, Exhibit 1012: *Webroot, Inc.* v. *CrowdStrike, Inc.*, Case No. 6:22-cv-00243- ADA1, "Order Granting Fifth Amended Scheduling Order" (WDTX Mar. 29, 2023), 9 pgs.
*Crowdstrike, Inc.* v. *Webroot Inc.*, PTAB Case No. IPR2023-01158, Exhibit 1013: *Webroot, Inc.* v. *CrowdStrike, Inc.*, Case No. 6:22-cv-00243- ADA, "Order Resetting Markman Hearing" (WDTX Jun. 8, 2023), 1 pg.
*Crowdstrike, Inc.* v. *Webroot Inc.*, PTAB Case No. IPR2023-01158, Exhibit 1014: *Webroot, Inc.* v. *CrowdStrike, Inc.*, Case No. 6:22-cv-00241- ADA, "Opening Claim Construction Brief Regarding Patents Plaintiffs Webroot And OpenText Added By Amendment" (WDTX Apr. 12, 2023), 69 pgs.
*Crowdstrike, Inc.* v. *Webroot Inc.*, PTAB Case No. IPR2023-01158, Exhibit 1015: *Webroot, Inc.* v. *CrowdStrike, Inc.*, Case No. 6:22-cv-00243- ADA, "Plaintiffs' Responsive Claim Construction Brief Regarding Patents Plaintiffs Added By Amendment" (WDTX May 5, 2023), 70 pgs.
*Crowdstrike, Inc.* v. *Webroot Inc.*, PTAB Case No. IPR2023-01158, Patent Owner Open Text Inc.'s Mandatory Notices Pursuant to 37 CFR § 42.8(b), Jul. 14, 2023, 9 pgs.
*AO Kaspersky Lab* v. *Webroot Inc.*, PTAB Case No. IPR2023-01199, Petition for Inter Partes Review of U.S. Pat. No. 9,578,045 pursuant, 35 U.S.C. §§ 311-319, 37 CFR § 42, Jul. 14, 2023, 88 pgs.
*AO Kaspersky Lab* v. *Webroot Inc.*, PTAB Case No. IPR2023-01199, Exhibit 1001: U.S. Pat. No. 9,578,045 to Jaroch, 30 pgs.
*AO Kaspersky Lab* v. *Webroot Inc.*, PTAB Case No. IPR2023-01199, Exhibit 1002: File History of U.S. Pat. No. 9,578,045, 210 pgs.
*AO Kaspersky Lab* v. *Webroot Inc.*, PTAB Case No. IPR2023-01199, Exhibit 1003: Declaration of Dr. Wenke Lee, 202 pgs.
*AO Kaspersky Lab* v. *Webroot Inc.*, PTAB Case No. IPR2023-01199, Exhibit 1004: U.S. Appl. No. 20130298244 Kumar, 52 pgs.
*AO Kaspersky Lab* v. *Webroot Inc.*, PTAB Case No. IPR2023-01199, Exhibit 1005: U.S. Appl. No. 20070016953 Morris , 18 pgs.
*AO Kaspersky Lab* v. *Webroot Inc.*, PTAB Case No. IPR2023-01199, Exhibit 1006: U.S. Pat. No. 8,087,087 Van Oorschot, 18 pgs.
*AO Kaspersky Lab* v. *Webroot Inc.*, PTAB Case No. IPR2023-01199, Exhibit 1007: U.S. Appl. No. 20100077481 Polyakov, 19 pgs.
*AO Kaspersky Lab* v. *Webroot Inc.*, PTAB Case No. IPR2023-01199, Exhibit 1008: U.S. Appl. No. 20110321166 to Capalik, 29 pgs.
*AO Kaspersky Lab* v. *Webroot Inc.*, PTAB Case No. IPR2023-01199, Exhibit 1009: U.S. Appl. No. 20120260340, Morris, 30 pgs.
*AO Kaspersky Lab* v. *Webroot Inc.*, PTAB Case No. IPR2023-01199, Exhibit 1010: U.S. Pat. No. 10,257,224, Jaroch, 31 pgs.
*AO Kaspersky Lab* v. *Webroot Inc.*, PTAB Case No. IPR2023-01199, Exhibit 1011: Scheduling Order , No. 6:22-cv-00243-ADA-DTG, (USDC, WD, TX), 18 pgs.
*AO Kaspersky Lab* v. *Webroot Inc.*, PTAB Case No. IPR2023-01199, Exhibit 1012: Natarajan Meghanathan, Sumanth Reddy Allam, and Loretta A. Moore, Tools and Techniques for Network Forensics, International Journal of Network Security & Its Applications (IJNSA), vol. 1., No. 1 (Apr. 2009), 12 pgs.
*AO Kaspersky Lab* v. *Webroot Inc.*, PTAB Case No. IPR2023-01199, Exhibit 1013: *SANS Institute, Host-* vs. *Network-Based Intrusion Detection Systems* (2000-2005), 11 pgs.
*AO Kaspersky Lab* v. *Webroot Inc.*, PTAB Case No. IPR2023-01199, Exhibit 1014: Securosis LLC, Evolving Endpoint Malware Detection: Dealing with Advanced and Targeted Attacks, Version 1.3 (Jul. 12, 2012), 23 pgs.
*AO Kaspersky Lab* v. *Webroot Inc.*, PTAB Case No. IPR2023-01199, Exhibit 1015: Yanfang Ye, Weiwei Zhuang, Tao Li, Egemen Tas, Umesh Gupta, Shenghuo Zhu, Melih Abdulhayoglu, Combining File Content and File Relations for Cloud Based Malware Detection (Aug. 2011), 9 pgs.
*AO Kaspersky Lab* v. *Webroot Inc.*, PTAB Case No. IPR2023-01199, Exhibit 1016: U.S. Pat. No. 6,944,772 Dozortsev, 10 pgs.
*AO Kaspersky Lab* v. *Webroot Inc.*, PTAB Case No. IPR2023-01199, Exhibit 1017: U.S. Pat. No. 6,772,346 Chess, 14 pgs.
*AO Kaspersky Lab* v. *Webroot Inc.*, PTAB Case No. IPR2023-01199, Exhibit 1018: WO 2002033525 Chuang, 18 pgs.
*AO Kaspersky Lab* v. *Webroot Inc.*, PTAB Case No. IPR2023-01199, Exhibit 1019: EP 1,549,012 De Spiegeleer, 19 pgs.
*AO Kaspersky Lab* v. *Webroot Inc.*, PTAB Case No. IPR2023-01199, Exhibit 1020: EP 1,280,040 Hinchliffe, 17 pgs.
*AO Kaspersky Lab* v. *Webroot Inc.*, PTAB Case No. IPR2023-01199, Exhibit 1021: Oracle, Java Documentation, The Java Tutorials, What is a Path? (And Other File System Facts) (available at the following link https://docs.oracle.com/javase/tutorial/essential/io/path.html) (last accessed Oct. 2022), 3 pgs.
*AO Kaspersky Lab* v. *Webroot Inc.*, PTAB Case No. IPR2023-01199, Exhibit 1022: U.S. Appl. No. 2004/0143753 to Hernacki, 20 pgs.
*AO Kaspersky Lab* v. *Webroot Inc.*, PTAB Case No. IPR2023-01199, Exhibit 1023: U.S. Appl. No. 2011/0083180 to Mashevsky, 16 pgs.
*AO Kaspersky Lab* v. *Webroot Inc.*, PTAB Case No. IPR2023-01199, Exhibit 1024: U.S. Pat. No. 8,429,746 to Capalik, 11 pgs.
*AO Kaspersky Lab* v. *Webroot Inc.*, PTAB Case No. IPR2023-01199, Exhibit 1025: Server Hardware, Software and Architecture by Abeer El Hadi El Zein El Nahas, University of Khartoum, Electrical and Electronics Engineering Dept. (Feb. 2008), 152 pgs.
*AO Kaspersky Lab* v. *Webroot Inc.*, PTAB Case No. IPR2023-01199, Exhibit 1026: Guofei Gu, Phillip Porras, Vinod Yegneswaran, Martin Fong, Wenke Lee, BotHunter: Detecting Malware Infection Through IDS- Driven Dialog Correlation, In Proceedings of The 16th USENIX Security Symposium (Aug. 2007), 16 pgs.
*AO Kaspersky Lab* v. *Webroot Inc.*, PTAB Case No. IPR2023-01199, Exhibit 1027: Yacin Nadji, Manos Antonakakis, Roberto Perdisci, and Wenke Lee, Understanding the Prevalence and Use of Alternative Plans in Malware with Network Games, In Proceedings of The 27th Annual Computer Security Applications Conference (Dec. 2011), 10 pgs.
*AO Kaspersky Lab* v. *Webroot Inc.*, PTAB Case No. IPR2023-01199, Exhibit 1028: Manos Antonakakis, Roberto Perdisci, David Dagon, Wenke Lee, and Nick Feamster, Building a Dynamic Reputation System for DNS, In Proceedings of The 19th USENIX Security Symposium, (Aug. 2010), 17 pgs.

(56) References Cited

OTHER PUBLICATIONS

*AO Kaspersky Lab* v. *Webroot Inc.*, PTAB Case No. IPR2023-01199, Exhibit 1029: Long Lu, Vinod Yegneswaran, Phil Porras, and Wenke Lee, BLADE: An Attack-Agnostic Approach for Preventing Drive-By Malware Infections, In Proceedings of The 17th ACM Conference on Computer and Communications Security (CCS), Chicago, IL (Oct. 2010), 12 pgs.
*AO Kaspersky Lab* v. *Webroot Inc.*, PTAB Case No. IPR2023-01199, Exhibit 1030: Plaintiffs' Markman Opposition Brief, 86 pgs.
*AO Kaspersky Lab* v. *Webroot Inc.*, PTAB Case No. IPR2023-01199, Exhibit 1031: Defendants' Markman Opening Brief, 84 pgs.
*AO Kaspersky Lab* v. *Webroot Inc.*, PTAB Case No. IPR2023-01199, Exhibit 1032: Declaration of V.S. Subrahmanian, Ph.D., 88 pgs.
*AO Kaspersky Lab* v. *Webroot Inc.*, PTAB Case No. IPR2023-01199, Exhibit 1033: Order Granting Fifth Amended Scheduling Order, ECF No. 252, Mar. 29, 2023, 9 pgs.
*Crowdstrike, Inc.* v. *Webroot Inc.*, PTAB Case No. IPR2023-01050, Petition for Inter Partes Review of U.S. Pat. No. 8,763,123, Jul. 12, 2023, 67 pgs.
*Crowdstrike, Inc.* v. *Webroot Inc.*, PTAB Case No. IPR2023-01050, Exhibit 1001: U.S. Pat. No. 8,763,123, 16 pgs.
*Crowdstrike, Inc.* v. *Webroot Inc.*, PTAB Case No. IPR2023-01050, Exhibit 1002: File History of U.S. Pat. No. 8,763,123, 255 pgs.
*Crowdstrike, Inc.* v. *Webroot Inc.*, PTAB Case No. IPR2023-01050, Exhibit 1003: European File History, 286 pgs.
*Crowdstrike, Inc.* v. *Webroot Inc.*, PTAB Case No. IPR2023-01050, Exhibit 1004: Declaration of Markus Jakobsson, Ph.D., 89 pgs.
*Crowdstrike, Inc.* v. *Webroot Inc.*, PTAB Case No. IPR2023-01050, Exhibit 1005: U.S. Pat. No. 7,269,851 to Ackroyd, 13 pgs.
*Crowdstrike, Inc.* v. *Webroot Inc.*, PTAB Case No. IPR2023-01050, Exhibit 1006: U.S. Appl. No. 2004000670, Dahlstrom, 16 pgs.
*Crowdstrike, Inc.* v. *Webroot Inc.*, PTAB Case No. IPR2023-01050, Exhibit 1007: 22-cv-00241, Order Granting Fifth Amended Scheduling Order, 9 pgs.
*Crowdstrike, Inc.* v. *Webroot Inc.*, PTAB Case No. IPR2023-01050, Exhibit 1008: 22-cv-00241, Plaintiffs' Responsive Claim Construction Brief, 70 pgs.
*Crowdstrike, Inc.* v. *Webroot Inc.*, PTAB Case No. IPR2023-01050, Exhibit 1009: U.S. Pat. No. 6,944,772 to Dozortsev, 10 pgs.
*Crowdstrike, Inc.* v. *Webroot Inc.*, PTAB Case No. IPR2023-01050, Exhibit 1010: EP 1,549,012 to De Spiegeleer, 19 pgs.
*Crowdstrike, Inc.* v. *Webroot Inc.*, PTAB Case No. IPR2023-01050, Exhibit 1011: EP 1,280,040 to Hinchliffe, 17 pgs.
*Crowdstrike, Inc.* v. *Webroot Inc.*, PTAB Case No. IPR2023-01050, Exhibit 1012: WO 2002/033525 to Chuang, 18 pgs.
*Crowdstrike, Inc.* v. *Webroot Inc.*, PTAB Case No. IPR2023-01050, Exhibit 1013: U.S. Appl. No. 2004/0073810 to Dettinger, 15 pgs.
*Crowdstrike, Inc.* v. *Webroot Inc.*, PTAB Case No. IPR2023-01050, Exhibit 1014: WO 2003/021402 to Duke, 13 pgs.
*Crowdstrike, Inc.* v. *Webroot Inc.*, PTAB Case No. IPR2023-01050, Exhibit 1015: U.S. Appl. No. 20030115479 to Edwards, 10 pgs.
*Crowdstrike, Inc.* v. *Webroot Inc.*, PTAB Case No. IPR2023-01050, Exhibit 1017: U.S. Pat. No. 6,663,000 to Muttik, 12 pgs.
*Crowdstrike, Inc.* v. *Webroot Inc.*, PTAB Case No. IPR2023-01050, Exhibit 1018: PC Broadband Security by Darren Meyer, 3 pgs.
*Crowdstrike, Inc.* v. *Webroot Inc.*, PTAB Case No. IPR2023-01050, Exhibit 1019: Wired to the World Anti-virus Software by Ralph Lee Scott, 1 pg.
U.S. Appl. No. 60/762,359, filed Jan. 25, 2006, Kronenberg.
U.S. Appl. No. 60/806,143, filed Jun. 29, 2006, Shukla.
CounterTack Scout and CounterTack Sentinel product sheet, CounterTack, Inc., Waltham, MA, at https://web.archive.org/web/20130310054238/http:/www.countertack.com/virtual-machine-introspection/, 2013, 2 pgs.
Baratloo, Arash et al., Transparent Run-Time Defense Against Stack-Smashing Attacks, Proceedings of the 2000 USENIX Annual Technical Conf., San Diego, CA, Jun. 18-23, 2000, 13 pgs.
Goel, Ashvin et al., The Taser Intrusion Recovery System, SOSP '05, Oct. 23-26, 2005, Brighton, UK, 14 pgs.

PR Newswire, ArcSight Introduces Security Management Solution, Westlaw, Jan. 28, 2002, 4 pgs.
King, Samuel T. et al., Backtracking Intrusions, ACM Transactions on Computer Systems, vol. 23, No. 1, Feb. 2005, pp. 51-76.
Xie, Yinglian, A Spatiotemporal Event Correlation Approach to Computer Security, School of Computer Science, Carnegie Mellon University, Pittsburgh, PA, Aug. 2005, 148 pgs.
TrendMicro Control Manager 6.0, Patch 2 Administrator's Guide, Trend Micro Incorporated, Cupertino, CA, Feb. 2013, 573 pgs.
Symantec Insight and SONAR product sheet, at https://vox.veritas.com/legacyfs/online/veritasdata/Sep. 2012%20Insight%20and%20SONAR%20Factsheet, 5 pgs.
VIGNA, Giovanni, et al., Host-Based Intrusion Detection, https://sites.cs.ucsb.edu/~chris/research/doc/infsec05_hids.pdf, Jun. 15, 2005, 13 pgs.
Know Your Enemy: Sebek—A kernel based data capture tool, Nov. 17, 2003, The Honeynet Project, https://www.cs.jhu.edu/~rubin/courses/sp04/sebek.pdf, Nov. 17, 2003, 21 pgs.
Patil, Swapail, et al., I3FS: An In-Kernel Integrity Checker and Intrusion Detection File System, https://www.filesystems.org/docs/i3fs/i3fs.html, Sep. 17, 2004, 17 pgs.
Bravo, Pablo, Proactive Detection of Kernel-Mode Rootkits, 2011 Sixth Int'l Conf. on Availability, Reliability, Security, IEEE, https://ieeexplore.ieee.org/document/6045970, Oct. 17, 2011, 6 pgs.
Fratric, Ivan, ROPGuard: Runtime Prevention of Return-Oriented Programming Attacks, Sep. 24, 2012, 49 pgs.
Fratric, Ivan, Runtime Prevention of Return-Oriented Programming Attacks, Github.com, https://github.com/ivanfratric/ropguard, Aug. 26, 2012, 2 pgs.
Srivastava, Abhinav, Efficient Protection of Kernel Data Structures via Object Partitioning, ACSAC, Orlando, FL, https://dl.acm.org/doi/10.1145/242095.2421012, Dec. 3-7, 2012, 10 pgs.
Stojanovski, Nanad, Bypassing Data Execution Prevention on Microsoft Windows XP SP2, Second Int'l Conf. on Availability, Reliability, and Security, https://ieeexplore.ieee.org/document/4159930, Apr. 23, 2007, 5 pgs.
Egele, Manuel et al., A Survey on Automated Dynamic Malware-Analysis Techniques and Tools, ACM Computing Surveys, vol. 44, No. 2, Article 6, Feb. 8, 2012, 42 pgs.
Ficco, Massimo et al., A Generic Intrusion Detection and Diagnose System Based on Complex Event Processing, 2011 First Int'l Conf. on Data Compression, Communications and Processing, 2011, 10 pgs.
Giura, Paul, A Context-Based Detection Framework for Advanced Persistent Threats, 2012 Int'l Conf. on Cyber Security, 2012, 6 pgs.
Hua, Jingyu et al., Efficient Context-Sensitive Intrusion Detection Based on State Transition Table, IEICE Trans. Fundamentals, vol. E94-A, No. 1, Jan. 2011, pp. 255-264.
Johnson, Michael C., Correlating Intrusion Detection Events: A Data Mining & Profiling Approach, George Mason University, Fairfax, Virginia, 2005, 210 pgs.
Krugel, Christopher, Decentralized Event Correlation, ICICS 2001, LCS 2288, 2002, pp. 114-131.
Myers, Justin, et al., Insider Threat Detection Using Distributed Event Correlation of Web Server Logs, Int'l Conf. on Information Warfare and Security, Apr. 2010, 11 pgs.
Porras, Phillip, et al., EMERALD: Event Monitoring Enabling Responses to Anomalous Live Disturbances, 20th NISSC, Oct. 9, 1997, 15 pgs.
Jacobson, Emily et al., Detecting Code Reuse Attacks with a Model of Conformant Program Execution, Int'l Symposium on Engineering Secure Software and Systems, Feb. 2014, pp. 1-18.
StackwalkerAPI Programmer's Guide, 8.0 Release, Nov. 2012, Paradyn Parallel Performance Tools, Computer Sciences Department, University of Wisconsin, Madison, WI, 33 pgs.
Scott, David, et al., Abstracting Application-Level Web Security, WWW 2002, Honolulu, HI, May 7-11, 2002, pp. 396-407.
Dewald, Andreas, et al., ADSandbox: Sandboxing JavaScript to fight Malicious Websites, SAC' 2010, Sierre, Switzerland, Mar. 22-26, 2010, pp. 1859-1864.

(56) References Cited

OTHER PUBLICATIONS

Le, Van Lam, et al., Identification Of Potential Malicious Web Pages, Australian Computer Society, Ninth Australasian Information Security Conf., Perth Australia, CRPIT vol. 116 Information Security, 2011, pp. 33-40.
Canali, David, et al., Prophiler: A Fast for the Large-Scale Detection of Malicious Web Pages, WWW 2011 Session: Web Security, Hyderabad, IN, Mar. 28-Apr. 1, 2011, 10 pgs.
Chen, Kevin, et al., WebPatrol: Automated Collection and Replay of Web-based Malware Scenarios, ASIACCS, 2011, Hong Kong, CN, Mar. 22-24, 2011, pp. 186-195.
Yan, Wei, et al., Toward Automatic Discovery of Malware Signature for Anti-Virus Cloud Computing, Int'l Conf. on Complex Sciences, Springer, Berlin, Heidelberg, 2009, pp. 724-728.
Martinez, Cristian Adrian, et al., Malware detection based on Cloud Computing Integrating Intrustion Ontology Representation, IEEE Latin-American Conf. on Communications, 2010, 6 pgs.
Wang, Shu-Ching, et al., A Three-Phases Scheduling in a Hierarchical Cloud Computing Network, Third Int'l Conf. on Communications and Mobile Computing, IEEE, 2011, pp. 114-117.
Epshteyn, Arkady, Dejong, Gerald, Generative Prior Knowledge for Discriminative Classification, Journal of Artificial Intelligence Research 27, 2006, pp. 25-53.
Wei, Songjie, Mirkovic, Jelena, Building Reputations for Internet Clients, Electronic Notes in Theoretical Computer Science, 179, 2007, pp. 17-30.
Xia, Yinggie, Song, Guanghua, Zheng, Yao, Ni, Jun, Zhu, Mingzhe, A Small World Overlay P2P Transfer System with Role-Based and Reputation-Based Access Control Policies, 2008 Int'l Conf. on Internet Computing in Science and Engineering, IEEE, 2008, pp. 517-520.
Xu, Ziyao, He, Yeping, Deng, Lingli, A Multilevel Reputation System for Peer-to-Peer Networks, Sixth Int'l Conf. on Grid and Cooperative Computing (GCC 2007), IEEE, 2007, 8 pgs.
Arnold, William and Tesauro, Gerald, Automatically Generated WIN32 Heuristic Virus Detection, Virus Bulletin Conf., Oxfordshire, England, Sep. 2000, pp. 51-60.
Abou-Assaleh, Tony, Cercone, Nick, Keselj, Vlado, Sweidan, Ray, N-gram-based Detection of New Malicious Code, IEEE, Sep. 30, 2004, 2 pgs.
Aswini, A.M., Vinod, P., Towards the Detection of Android Malware Using Ensemble Features, Journal of Information Assurance and Security, ISSN 1554-1010 Vol. 9, 2014, pp. 375-387.
Baldangombo, Usukhbayar, Jambaljav, Nyamjav, Horng, Shi-Jinn, A Static Malware Detection System Using Data Mining Methods, arXiv:1308.2831, Jul. 4, 2013, 13 pgs.
Cortes, Corinna and Vapnik, Vladimir, Support-Vector Networks, Machine Learning, 20, Sep. 1995 Kluwer Academic Publishers, Boston, pp. 273-297.
Demertzis, Konstantinos and Iliadis, Lazaros, Evolving Computational Intelligence System for Malware Detection, LNBIP 178, Jun. 20, 2014, Springer Int'l Publishing, Switzerland, pp. 322-334.
Firdausi, Ivan, Lim, Charles, Erwin, Alva and Nugroho, Anto Satriyo, Analysis of Machine Learning Techniques Used in Behavior-Based Malware Detection, IEEE, Dec. 3, 2010, pp. 201-203.
Aafer, Yousra, Du, Wenliang, Yin, Heng, DroidAPIMiner: Mining API-Level Features for Robust Malware Detection in Android, https://www.researchgate.net/publication/278705505, Sep. 2013, 18 pgs.
Islam, Rafiqul, Ronghua, Tian, Batten, Lynn and Versteeg, Steve, Classification of Malware Based on String and Function Feature Selection, CTC IEEE, 2010, pp. 9-17.
Lai, Ying-Xu, A Feature Selection for Malicious Detection, Ninth ACIS Int'l Conf. on Software Engineering, Artificial Intelligence, Networking, and Parallel/Distributed Computing, 2008, IEEE, pp. 365-370.
Leder, Felix, Steinbock, Bastian, and Martini, Peter, Classification and Detection of Metamorphic Malware using Value Set Analysis, IEEE, Oct. 14, 2009, pp. 39-46.

Liangboonprakong, Chatchai, Sornil, Ohm, Classification of Malware Families Based on N-grams Sequential Pattern Features, Proceedings of the 2013 IEEE $8^{th}$ Conf. on Industrial Electronics and Applications, Melbourne, Australia, Jun. 19-21, 2013, pp. 777-782.
Markel, Zane and Bilzor, Michael, Building a Machine Learning Classifier for Malware Detection, IEEE, Oct. 23, 2014, 4 pgs.
Masud, Mehedy, Khan, Latifur, and Thuraisingham, Bhavani, Data Mining Tools for Malware Detection, CRC Press, 2011, 680 pgs.
Menahem, Eitan, Shabtai, Asaf, Rokach, Lior, and Elovici, Yuval, Improving Malware Detection by Applying Multi-Inducer Ensemble, Elsevier, Computational Statistics and Data Analysis 53, Feb. 2009, pp. 1483-1494.
Raman, Karthick, Selecting Features to Classify Malware, Adobe Systems, Inc., 2012, 5 pgs.
Tahan, Gil, Rokach, Lior, and Shahar, Yuval, Mal-ID: Automatic Malware Detection Using Common Segment Analysis and Meta-Features, Journal of Machine Learning, Apr. 2012, pp. 949-979.
Tian, Ronghua, An Integrated Malware Detection and Classification System, 2011, 283 pgs.
Islam, Rafiqul, Tian, Ronghua, Batten, Lynn, and Versteeg, Steve, Classification of Malware Based on Integrated Static and Dynamic Features, Journal of Network and Computer Applications, No. 36, Nov. 2, 2022, pp. 646-656.
Jiang, Quinshan, Zhao, Xinxing, Huang, Kai, A Feature Selection Method for Malware Detection, Jun. 2011, 6 pgs.
Apel, Martin, Biskup, Joachim, Flegel, Ulrich and Meier, Michael, "Towards Early Warning Systems—Challenges, Technologies and Architecture," Critical Information Infrastructures Security, 2009, 14 pgs.
Doumas, Anatasia, Mavroudakis, Konstantinos, Gritzalis, Dimitris, Katsikas, Sokratis, Design of a Neural Network for Recognition and Classification of Computer Viruses, Computers & Security, Elsevier Science Ltd., 14, 1995, pp. 435-448.
Faruki, Parvez et al., AndroSimilar: Robust Statistical Feature Signature for Android Malware Detection, SIN '13, Aksaray, Turkey, Nov. 26-28, 2013, 8 pgs.
Guo, Shanqing, et al., A Fine-Grained Classification Approach for the Packed Malicious Code, T.W. Chim and T.H. Yue (Eds.): ICICS 2012, LNCS 7618, Springer-Verlag Berlin Heidelberg, 2012, pp. 497-504.
Jeong, Young-Seob, et al., Malware Detection on Byte Streams of PDF Files Using Convolutional Neural Networks, Hindawi, Security and Communication Networks, vol. 2019, Article ID 8485365, 9 pgs.
Lam, Ho-Yu, and Yeung, Dit-Yan, A Learning Approach to Spam Detection based on Social Networks, CEAS 2007—Fourth Conf. on Email and Anti-Spam, Mountain View, CA, Aug. 2-3, 2007, 10 pgs.
Perdisci, Roberto, Lanzi, Andrea, and Lee, Wenke, Classification of Packed Executables for Accurate Computer Virus Detection, Elsevier, Jun. 2008, 15 pgs.
Babu Rajesh V, Phaninder Reddy, Himanshu P and Mahesh U Patil, Androinspector: A System for Comprehensive Analysis of Android Applications, Int'l Journal of Network Security & Its Application (IJNSA), vol. 7, No. 5, Sep. 2015, 22 pgs.
Ravula, Ravindar Reddy, Classification of Malware Using Reverse Engineering and Data Mining Techniques, Aug. 2011, Akron, 104 pgs.
Runwal, Neha, Graph Technique for Metamorphic Virus Detection, San Jose, CA, Dec. 2011, 93 pgs.
Sahs, Justin and Khan, Latifur, A Machine Learning Approach to Android Malware Detection, 2012 European Intelligence and Security Informatics Conf., EEE 2012, pp. 141-147.
Schultz, Matthew G., Eskin, Eleazar, Zadok, Erez, and Stolfo, Salvatore J., Data Mining Methods for Detection of New Malicious Executables, Proceedings 2001 IEEE Symposium on Security and Privacy, S&P 2001, 2001, pp. 38-49.
Tan, Jun, Chen, Xingshu and Du, Min, An Internet Traffic Identification Approach Based on GA and PSO-SVM, Journal of Computers, vol. 7, No. 1, Jan. 2012, pp. 19-29.

(56) References Cited

OTHER PUBLICATIONS

Tian, R, Batten, L.M., Versteeg, S.C., Function Length as a Tool for Malware Classification, 2008 3$^{rd}$ Int'l Conf. on Malicious and Unwanted Software (MALWARE), Los Alamitos, CA, 2008, pp. 69-76.
Tesauro, Gerald J., Kephart, Jeffrey O., Sorkin, Gregory B., Neural Networks for Computer Virus Recognition, Aug. 1996, pp. 5-6.
Walenstein, Andrew, Venable, Michael, Hayes, Matthew, Thompson, Christopher, and Lakhotia, Arun, Exploiting Similarity Between Variants to Defeat Malware, Computer Science, 2007, 12 pgs.
Wang, Tzu-Yen, Wu, Chin-Hsiung, Hsieh, Chu-Cheng, Detecting Unknown Malicious Executables Using Portable Executable Headers, 2009 Fifth Int'l Joint Conf. on INC, IMS, and IDC, 2009, pp. 278-284.
Gorton, Dan, Extending Intrusion Detection with Alert Correlation, Department of Computer Engineering, Chalmers University of Technology, Sweden, 2003, 121 pgs.
Shafiq, M. Zubair, S. Momina Tabish, Fauzan Mirza, and Muddassar Farooq, "A Framework For Efficient Mining Of Structural Information To Detect Zero-Day Malicious Portable Executables," Next Generation Intelligent Networks Research Center, nexGIN RC, Tech. Rep., Jan. 2009, 30 pgs.
Wang, Tzu-Yen, and Chin-Hsiung Wu, "Detection of Packed Executables Using Support Vector Machines," 2011 Int'l Conf. on Machine Learning and Cybernetics, IEEE, vol. 2, Jul. 2011, pp. 717-722.
Shafiq, M. Zubair, S. Tabish, and Muddassar Farooq, "PE-Probe: Leveraging Packer Detection and Structural Information to Detect Malicious Portable Executables," Proceedings of the Virus Bulletin Conf., vol. 8., Jun. 2009, 10 pgs.
Nath, Hiran V., and Babu M. Mehtre, "Static Malware Analysis Using Machine Learning Methods," In Recent Trends in Computer Networks and Distributed Systems Security: Second Int'l Conf., Trivandrum, India, Springer Berlin Heidelberg, Mar. 13-14, 2014, pp. 440-450.
Sun, Li, Steven Versteeg, Serdar Bozta, and Trevor Yann, "Pattern Recognition Techniques for the Classification of Malware Packers," ACISP 2010, Sydney, Australia, Jul. 5-7, 2010, pp. 370-390.
Nataraj, Lakshmanan, Grégoire Jacob, and B. S. Manjunath, "Detecting Packed executables based on raw binary data," *VRL, ECE*, 2010, 6 pgs.
Tang, Yuchun, Sven Krasser, Yuanchen He, Weilai Yang, and Dmitri Alperovitch, "Support Vector Machines and Random Forests Modeling for Spam Senders Behavior Analysis," 2008 IEEE Global Telecommunications Conf., IEEE, 2008, pp. 1-5.
S. Krasser, B. Meyer and P. Crenshaw, "Valkyrie: Behavioral Malware Detection Using Global Kernel-Level Telemetry Data," 2015 IEEE 25th Int'l Workshop on Machine Learning for Signal Processing, Boston, MA, 2015, pp. 1-6.
Hsu, Chih-Wei, Chih-Chung Chang, and Chih-Jen Lin, "A Practical Guide to Support Vector Classification," Department of Computer Science, Taiwan, 2003 (last updated Apr. 15, 2010), 16 pgs.
Krasser, Sven, Yuchun Tang, Jeremy Gould, Dmitri Alperovitch, and Paul Judge, "Identifying Image Spam Based on Header and File Properties Using C4. 5 Decision Trees and Support Vector Machine Learning," Proceedings of the 2007 IEEE Workshop on Information Assurance, West Point, NY, Jun. 2007, 7 pgs.
Cynomix malware visualization tool, The Wayback Machine—https://web.archive.org/web/20141006050639/http://cynomix.org:80/, Cynomix, 2 pgs.
Check Point Anti-Bot Software Blade Product Sheet, The Wayback Machine—https://web.archive.org/web/20150320181749/http://www.checkpoint.com/products/anti-bot-software-blade/index.html/, Check Point Software Technologies Ltd., 2015, 5 pgs.
Check Point Anti-Spam Software Blade Product Sheet, The Wayback Machine—https://web.archive.org/web/20150316022003/http://www.checkpoint.com:80//products/anti-spam-email-security-software-blade/index.html/, Check Point Software Technologies Ltd., 2015, 3 pgs.
Check Point URL Filtering Software Blade Product Sheet, The Wayback Machine—https://web.archive.org/web/20150317044930/http://www.checkpoint.com:80/products/url-filtering-software-blade/index.html/, 3 pgs.
Check Point Secure Web Gateway Product Sheet, The Wayback Machine—https://web.archive.org/web/20150313011752/http://www.checkpoint.com:80/products/next-generation-secure-web-gateway/index.html/, Check Point Software Technologies Ltd., 2015, 3 pgs.
McAfee Email Protection Product Sheet, The Wayback Machine—https://web.archive.org/web/20150317020514/http://www.mcafee.com/us/products/email-protection.aspx, McAfee Corp., San Jose, CA, 2015, 2 pgs.
McAfee Web Protection Product Sheet, The Wayback Machine—https://web.archive.org/web/20150317030901/http://www.mcafee.com/us/products/web-protection.aspx/, McAfee Corp., San Jose, CA, 2014, 2 pgs.
McAfee Content Security Suite Product Sheet, The Wayback Machine—https://web.archive.org/web/20140122063324/http://www.mcafee.com/us/products/content-security-suite.aspx/, McAfee Corp., San Jose, CA, 2014, 11 pgs.
McAfee Mobile Virus Scan Product Sheet, The Wayback Machine—https://web.archive.org/web/20150317022132/http://www.mcafee.com/us/products/virusscan-mobile.aspx/, McAfee Corp., San Jose, CA, 2015, 2 pgs.
McAfee Advanced Threat Defense Product Sheet, The Wayback Machine—https://web.archive.org/web/20140122063921/http://www.mcafee.com/us/products/advanced-threat-defense.aspx/, McAfee Corp., San Jose, CA, 2014, 5 pgs.
McAfee Endpoint Protection Product Sheet, The Wayback Machine—https://web.archive.org/web/20140122063414/http://www.mcafee.com/us/products/endpoint-protection-advaced-suite.aspx/, McAfee Corp., San Jose, CA, 2014, 11 pgs.
Check Point Threat Prevention Appliance Product Sheet, The Wayback Machine—https://web.archive.org/web/20131219213701/http://www.checkpoint.com:80/products/secure-web-gateway-appliance/ind. . . /, Check Point Software Technologies Ltd., 2013, 5 pgs.
Symantec Instant Messaging Security.cloud Product Sheet, The Wayback Machine—https://web.archive.org/web/20140122064248/http://www.symantec.com/us/products/instant-messaging-secur. . . /, Symantec, Cupertino, CA, 2014, 13 pgs.
Symantec Web Security Product Sheet, The Wayback Machine—https://web.archive.org/web/20150423061313/http://www.symantec.com:80/ /web-security-cloud/, Symantec, Cupertino, CA, 2015, 13 pgs.
Symantec AntiSpam Product Sheet, The Wayback Machine—https://web.archive.org/web/20140122071106/http://www.symantec.com/premium-antispam/, Symantec, Cupertino, CA, 2014, 12 pgs.
Symantec Email Security Product Sheet, The Wayback Machine—https://web.archive.org/web/20140122064243/http://www.symantec.com/email-security-cloud, Symantec, Cupertino, CA, 2014, 13 pgs.
White Paper: Endpoint Protection.cloud, Technical Product Overview, Symantec, Mountain View, CA, 2011, 13 pgs.
Webroot SecureAnywhere Web Security Service Datasheet, Endpoint Protection, Webroot Inc., Broomfield, CO, Jan. 2015, 4 pgs.
Trend Micro InterScan Messaging Security Datasheet, Trend Micro Inc., 2014, 4 pgs.
Trend Micro Apex One (Mac), Administrator's Guide, Trend Micro Inc., Version 2019, 170 pgs.
Trend Micro Worry-Free Business Security Services Datasheet, Trend Micro Inc., 2010, 2 pgs.
File Reputation Service Datasheet, Open Text and BrightCloud, 2022, 2 pgs.
BrightCloud Mobile App Reputation Service Datasheet, Webroot Inc., Broomfield, CO, Feb. 2014, 4 pgs.
BrightCloud IP Reputation Service Datasheet, BrightCloud, copyright 2022, 2 pgs.
BrightCloud Web Classification Service and Web Reputation Services Datasheet, BrightCloud, 2022, 4 pgs.
BrightCloud Real-Time Anti-Phishing Service Datasheet, BrightCloud, 2022, 2 pgs.
Trend Micro Smart Protection Server 2.6, Administrator's Guide, Trend Micro Inc., Apr. 2013, 86 pgs.

(56) References Cited

OTHER PUBLICATIONS

Trend Micro NeatSuite for small and medium businesses Datasheet, Trend Micro Inc., 2004, 2 pgs.
Trend Micro Client/Service Suite for small and medium businesses Datasheet, Trend Micro Inc., 2003-2004, 2 pgs.
Trend Micro Deep Discovery Analyzer Datasheet, Trend Micro Inc., 2014, 3 pgs.
Trend Micro Hosted Email Security Datasheet, Trend Micro Inc., 2015, 2 pgs.
Abraham, Ajith, Jain, Ravi, Johnson, Thomas, and Han, Sang Yong, D-SCIDS: Distributed Soft Computing Intrusion Detection System, Journal of Network and Computer Application, 2007, pp. 81-98.
Dai, Shuaifu, Liu, Yaxi, Wang, Tielei, Wei, Tao, and Zou, Wei, Behavior-Based Malware Detection on Mobile Phone, IEEE, Sep. 25, 2010, 4 pgs.
Del Grosso, Nick, It's Time to Rethink your Corporate Malware Strategy, SANS Institute, Feb. 24, 2002, 12 pgs.
Jiang, Xiao, Hao, Zhiyu, and Wang, Yanming, A Malware Sample Capturing and Tracking System, 2010 Second WRI World Congress on Software Engineering, IEEE, 2010, pp. 69-72.
Kumar, Brijesh and Katsinis, Constantine, A Network Based Approach to Malware Detection in Large IT Infrastructures, Ninth IEEE Int'l Symposium on Network Computing and Application, Jul. 17, 2010, pp. 188-191.
Scanlan, Joel, Lorimer, Samuel, Hartnett, Jacky, and Manderson, Kevin, Intrusion Detection by Intelligent Analysis of Data Across Multiple Gateways in Real-Time, School of Computing, University of Tasmania, 8 pgs.
Bhattacharyya, Manasi, Hershkop, Shlomo, and Eskin, Eleazar, MET: An Experimental System for Malicious Email Tracking, 2002, 8 pgs.
Blue Coat WebFilter product sheet, Block Malware and Filter Content According to Strict Policy Controls, EdgeBlue.com, 1 pg. at https://web.archive.org/web/20101122082933/http://www.edgeblue.com:80/WebFilter.asp.
Colajanni, Michele, Gozzi, Daniele, and Marchetti, Mirco, Collaborative Architecture for Malware Detection and Analysis, Int'l Federation for Information Processing, Proceedings of the IFIP TC 11 $23^{rd}$ Int'l Information Security Conf., vol. 278, 2008, pp. 79-93.
Firstbrook, Peter, and Orans, Lawrence, Magic Quadrant for Secure Web Gateway, Gartner Ras Core Research Note G00172783, Jan. 8, 2010, 20 pgs.
Marchetti, Mirco, Gozzi, Daniele, and Colajanni, Michele, Peer-to-Peer Architecture for Collaborative Intrusion and Malware Detection on a Large Scale, Int'l Journal of Information Security, ISC '09: Proceedings of the 12th Int'l Conf. on Information Security, 2009, pp. 475-490.
Oberheide, Jon, Cooke, Evan and Jahanian, Farnam, CloudAV: N-Version Antivirus in a Network Cloud, USENIX Security Symposium, San Jose, CA, 2008, 24 pgs.
Royal, Paul, Halpin, Mitch, Dagon, David, Edmonds, Robert, Lee, Wenke, PolyUnpack: Automating the Hidden-Code Extraction of Unpack-Executing Malware, $22^{nd}$ Annual Computer Security Applications Conf., 2006, 11 pgs.
Xin, Wang, Ting-Lei, Huang, and Zhi-Jian, Ren, Research on the Anti-Virus System of Military Network Based on Cloud Security, Oct. 2010, IEEE, pp. 656-659.
Zheng, Xufel, and Fang, Yonghui, An AIS-based Cloud Security Model, Int'l Conf. on Intelligent Control and Information Processing, Dalian, CN, Aug. 13-15, 2010, pp. 153-158.
James P. Anderson Co., Computer Security Threat Monitoring and Surveillance, Feb. 26, 1980 (Rev. Apr. 15, 1980), Fort Washington, PA, 56 pgs.
Anderson, Debra, Lunt, Teresa F., Javitz, Harold, Tamaru, Ann, Valdes, Alfonso, Detecting Unusual Program Behavior Using the Statistical Component of the Next-generation Intrusion Detection Expert System (NIDES), Trusted Information Systems, Mountain View, CA (Contract No. 910097C), May 1995, 86 pgs.
Berk, Vincent, et al., Designing a Framework for Active Worm Detection on Global Networks, IEEE, Mar. 24, 2003, 13 pgs.
Bolton, Stacy, Aladdin Esafe Enterprise v3.0, Global Information Assurance Certification Paper, Sans Institute, Aug. 1, 2002, 18 pgs.
Cai, Min, et al., Collaborative Internet Worm Containment, 3, IEEE Computer Society, Jun. 13, 2005, pp. 25-33.
Chuvakin, Anton, Security Event Analysis through Correlation, Information Systems Security, May/Jun. 2004, pp. 13-18.
Conry-Murray, Andrew, Product Focus: Behavior-Blocking Stops Unknown Malicious Code, Network Magazine, Jun. 5, 2002, 10 pgs. at http://networkmagazine.com/article/NMG20020603S0009/1.
CoreTrace Corporation: ECM 3000, Preliminary Product and Technical Information, 2 pgs., retrieved Sep. 12, 2022, at https://web.archive.org/web/20050307224541/http://www.coretrace.com:80/ecm.html.
Websense CPM Explorer v6.1, Administrator's Guide, Websense, Inc., San Diego, CA, Sep. 19, 2005, 77 pgs.
Dagon, David, et al., HoneyStat: Local Worm Detection Using Honeypots, Recent Advances In Intrusion Detection, RAID 2004, pp. 39-58.
Denning, Dorothy E., An Intrusion-Detection Model, IEEE Transactions on Software Engineering, vol. SE-13, No. 2, Feb. 1987, pp. 222-232.
Forrest, Stephanie, Hofmeyr, Steven A., and Somayaji, Anil, and Longstaff, Thomas A., A Sense of Self for Unix Processes, IEEE Symposium on Security and Privacy, IEEE Computer Society Press, Los Alamitos, CA, 1996, pp. 120-128.
Forrest, Stephanie, Hofmeyr, Steven A., and Somayaji, Anil, Computer Immunology, Communications of the ACM, vol. 40, Oct. 1997, pp. 88-96.
Hedberg, Sara, Combating Computer Viruses: IBM's new computer immune system, Industry Spotlight, IEEE Explore, Summer 1996, pp. 9-11.
Higgins, Kelly Jackson, Sandbox the Hackers—They're spreading viruses and stealth code. One Way to stop them: block, or 'sandbox,' the culprits, InternetWeek, Manhasset Iss. 858, Apr. 23, 2001, pp. 29-33.
Inoue, Hajime and Forrest, Stephanie, Anomaly Intrusion Detection in Dynamic Execution Environments, NSPW Proceedings of the 2002 Workshop on New Security Paradigms, Sep. 2002, pp. 52-60.
Javitz, Harold S. and Valdes, Alfonso, The NIDES Statistical Component Description and Justification, Annual Report, SRI Project 3131, Mar. 7, 1994, 52 pgs.
King, Christopher M., Security Management: Making Sense Of Events, Business Communications Review, Sep. 2001, pp. 32-38.
Leung, Linda, Advanced Technologies Aim to Protect Network Asset, Profiling Cybercrime: Network Threats And Defense Strategies, Nov. 29, 2004, pp. 56.
Nance, Barry, Server-Based Java Security Products Help Guard Your Enterprise Flank, Network Computing (www.networkcomputing.com), Dec. 1, 1998, pp. 86-99.
NetRanger Intrustion Detection System, Wheel Group Corporation, San Antonio, TX, 1997, 4 pgs.
NeuSecure 3.0, Security Management and Incident Response Platform for the Enterprise, GuardedNet, 2005, 37 pgs. at https://web.archive.org/web/20040403183424/http://www.guarded.net:80/neusecure3.0.html.
Okena StormWatch, A New Approach To Intrusion Detection: Intrusion Prevention, Intrusion Prevention White Paper, Okena, Waltham, MA, 2002, 17 pgs.
Prevx Home 2.0 Launches as Version 1.0 continues to outperform major league anti-virus and firewall products, Prevx—News and Press Releases, San Francisco, CA, 2004, 2 pgs.
PR Newswire, Finjan Software and F-Secure to Deliver Proactive Content Security For Corporate PCs in New Era of Malicious Code, PR Newswire Association LLC, New York, NY, Oct. 30, 2000, 4 pgs.
Rivest, R., The MD5 Message-Digest Algorithm, MIT Laboratory for Computer Science and RSA Data Security, Inc., Apr. 1992, 21 pgs.
SandBox Security's Secure4U, Sandbox Security AG, Germany, last modified Dec. 7, 2000, 151 pgs. at https://web.archive.org/web/20010304104828/http://sandboxsecurity.com:80/products/index.htm.

(56) References Cited

OTHER PUBLICATIONS

Shieh, Shiuh-Pyng and Gilgor, Virgil D., A Pattern-Oriented Intrusion-Detection Model and Its Applications, IEEE, 1991, 16 pgs.
Shieh, Shiuh-Pyng and Gilgor, Virgil D., On a Pattern-Oriented Model for Intrusion Detection, IEEE Transactions on Knowledge and Data Engineering, vol. 9, No. 4, Jul./Aug. 1997, pp. 661-667.
Finjan SurfinGuard Pro 5.7, at https://web.archive.org/web/20050207211129/http://www.finjan.com:80/Products/HomeUsers-SurfinGuardPro/default.asp (last visited Sep. 11, 2022) Finjan Software, 2005, 12 pgs.
Using Management Center for Cisco Security Agents 4.0, Cisco Systems, Inc., San Jose, CA, 2003, 413 pgs.
Webroot Spy Sweeper Enterprise: Key Features, Webroot Software, Inc., Boulder, CO, copyright 2002-2005, 2 pgs.
The Digital Immune System, Technical Brief, Symantec, Cupertino, CA, 2001, 16 pgs.
White, Steve R., Swimmer, Morton, Pring, Edward, Arnold, William C., Chess, David M. and Morar, John F., "Anatomy of a Commercial-Grade Immune System", 1999, 28 pgs.
Malin, C.H., Casey, E. and Aquilina, J.M., Malware Forensics: Investigating And Analyzing Malicious Code, Syngress, 2008, 692 pgs.
Bace, Rebecca, and Mell, Peter, NIST Special Publication On Intrusion Detection Systems, Macmillan Technical Publishing, Indianapolis, IN, 2001, 143 pgs.
Snapp, Steven R., et al., A System for Distributed Intrusion Detection, San Francisco, February 25-Mar. 1, 1991, 11 pgs.
Security Threat Manager Product Sheet, OpenService, Inc., https://webarchive.org/web/20031002025323/http://www.open.com:80/products/products.shtml, copyright 2002-2003, 27 pgs.
Goel, Ashvin, Forensix: A Robust, High-Performance Reconstruction System, Proceedings of the 25th IEEE Int'l Conf. on Distributed Computing Systems Workshops, 2005, 8 pgs.
Lunt, Teresa F. et al., IDES: The Enhanced Prototype, A Real-Time Intrusion-Detection Expert System, Computer Science Laboratory, SRI International, Menlo Park, CA, Oct. 1988, 89 pgs.
Klosterboer, Larry, Implementing ITIL Configuration Management, IBM Press, 2007, 252 pgs.
Debar, Herve et al., Aggregation and Correlation of Intrusion-Detection Alerts, RAID 2001, LNCS 2212, 2001, pp. 85-103.
Carrier, Brian D. and Matheny, B., Methods for Cluster-Based Incident Detection, Information Assurance Workshop, 2004, Proceedings, Second IEEE International, IEEE, May 2004, 8 pgs.
Xie, Yinglian, Kim, Hyang-Ah, O'Hallaron, David R., Reiter, Michael K. and Zhang, Hui, "Seurat: A Pointillist Approach To Anomaly Detection," In Recent Advances in Intrusion Detection: 7th Int'l Symposium, RAID 2004, Sophia Antipolis, France, Sep. 15-17, 2004, 20 pgs.
Burbeck, Kalle and Nadjm-Tehrani, Simin, ADWICE—Anomaly Detection with Real-Time Incremental Clustering, Information Security and Cryptology, 7th Int'l Conf., Seoul, KR, Dec. 2-3, 2004, 26 pgs.
Just, J.E., et al., "Learning Unknown Attacks—A Start," Foundations of Intrusion Tolerant Systems, IEEE, Dec. 2003, 19 pgs.
Parkhouse, Jayne, Pelican SafeTNet 2.0 Product Review, The Wayback Machine https://web.archive.org/web/20030729191240/http://www.scmagazine.com :80/scma. . . , SC Magazine, Jun. 2000, 5 pgs.
Valdes, Alfonso, and Keith Skinner, "Probabilistic Alert Correlation," In Recent Advances in Intrusion Detection: 4th Int'l Symposium, RAID 2001 Davis, CA, Oct. 10-12, 2001, pp. 54-68.
Tolle, Jens, Jahnke, Marko, Bussmann, Michael, and Henkel, Sven, "Meta IDS Environments: An Event Message Anomaly Detection Approach," Third IEEE Int'l Workshop on Information Assurance, IEEE, 2005, pp. 85-94.
Office Action for U.S. Appl. No. 18/302,885, mailed Nov. 28, 2023, 21 pgs.
Office Action for U.S. Appl. No. 18/301,832, mailed Jan. 4, 2024, 12 pgs.
U.S. Appl. No. 60/793,475, filed Apr. 21, 2006, Lowrey.
U.S. Appl. No. 60/803,058, filed May 26, 2006, Gutterman.
U.S. Appl. No. 60/830,122, filed Jul. 12, 2006, Just.
Crowdstrike's First Supplemental Preliminary Invalidity Contentions (Patents Asserted by Amendment), *Webroot, Inc. and Open Text, Inc.* v. *Crowdstrike, Inc.*, No. 6:22 CV-00241-ADA-DTG (WD, Texas), Jun. 27, 2023, 90 pgs.
Crowdstrike's Second Supplemental Preliminary Invalidity Contentions, *Webroot, Inc. and Open Text, Inc.* v. *Crowdstrike, Inc.*, No. 6:22 CV-00241-ADA-DTG (WD, Texas), Jul. 14, 2023, 85 pgs.
Defendant Forcepoint LLC's Final Invalidity Contentions, *Webroot, Inc. and Open Text, Inc.* v. *Forcepoint LLC*, Ca. No. 6:22-CV-00342-ADA-DTG, W.D. Tex., Nov. 1, 2023, 394 pgs.
Defendant's Final Invalidity Contentions, *Webroot, Inc. and Open Text, Inc.* v. *Trend Micro Inc.*, Case No. 6:22-CV-00239-ADA-DTG, W.D., Tex., Nov. 1, 2023, 168 pgs.
Defendant Sophos Ltd.'s Final Invalidity Contentions, *Webroot, Inc. and Open Text, Inc.* v. *Sophos Ltd.*, Case No. 6:22-cv-00240-ADA-DTG, W.D., Tex., Nov. 1, 2023, 281 pgs.
Defendant Crowdstrike Holdings, Inc.'s Second Supplemental Preliminary Invalidity Contentions, Exhibit 045-A-1, *Webroot, Inc. and Open Text, Inc.* v. *Crowdstrike Holdings, Inc.*, No. 6:22-CV-00241-ADA-DTG (WD, Texas), Jul. 14, 2023, 82 pgs.
Defendant Crowdstrike Holdings, Inc.'s Second Supplemental Preliminary Invalidity Contentions, Exhibit 224-A-1, *Webroot, Inc. and Open Text, Inc.* v. *Crowdstrike Holdings, Inc.*, No. 6:22-CV-00241-ADA-DTG (WD, Texas), Jul. 14, 2023, 118 pgs.
Defendant Forcepoint LLC's Final Invalidity Contentions, Exhibit 243-F-1, *Webroot, Inc. and Open Text, Inc.* v. *Forcepoint LLC*, Ca. No. 6:22-CV-00342-ADA-DTG, W.D. Tex., Nov. 1, 2023, 25 pgs.
Defendant Forcepoint LLC's Final Invalidity Contentions, Exhibit 243-F-2, *Webroot, Inc. and Open Text, Inc.* v. *Forcepoint LLC*, CA. No. 6:22-CV-00342-ADA-DTG, W.D. Tex., Nov. 1, 2023, 49 pgs.
Defendant Forcepoint LLC's Final Invalidity Contentions, Exhibit 243-F-3, *Webroot, Inc. and Open Text, Inc.* v. *Forcepoint LLC*, CA. No. 6:22-CV-00342-ADA-DTG, W.D. Tex., Nov. 1, 2023, 36 pgs.
Defendant Forcepoint LLC's Final Invalidity Contentions, Exhibit 243-F-4, *Webroot, Inc. and Open Text, Inc.* v. *Forcepoint LLC*, CA. No. 6:22-CV-00342-ADA-DTG, W.D. Tex., Nov. 1, 2023, 31 pgs.
Defendant Forcepoint LLC's Final Invalidity Contentions, Exhibit 243-F-5, *Webroot, Inc. and Open Text, Inc.* v. *Forcepoint LLC*, CA. No. 6:22-CV-00342-ADA-DTG, W.D. Tex., Nov. 1, 2023, 90 pgs.
Defendant Forcepoint LLC's Final Invalidity Contentions, Exhibit 243-F-6, *Webroot, Inc. and Open Text, Inc.* v. *Forcepoint LLC*, CA. No. 6:22-CV-00342-ADA-DTG, W.D. Tex., Nov. 1, 2023, 35 pgs.
Defendant Forcepoint LLC's Final Invalidity Contentions, Exhibit 243-F-7, *Webroot, Inc. and Open Text, Inc.* v. *Forcepoint LLC*, CA. No. 6:22-CV-00342-ADA-DTG, W.D. Tex., Nov. 1, 2023, 73 pgs.
Defendant Forcepoint LLC's Final Invalidity Contentions, Exhibit 243-F-8, *Webroot, Inc. and Open Text, Inc.* v. *Forcepoint LLC*, CA. No. 6:22-CV-00342-ADA-DTG, W.D. Tex., Nov. 1, 2023, 58 pgs.
Defendant Forcepoint LLC's Final Invalidity Contentions, Exhibit 243-F-9 *Webroot, Inc. and Open Text, Inc.* v. *Forcepoint LLC*, CA. No. 6:22-CV-00342-ADA-DTG, W.D. Tex., Nov. 1, 2023, 92 pgs.
Defendant Forcepoint LLC's Final Invalidity Contentions, Exhibit 243-F-10, *Webroot, Inc. and Open Text, Inc.* v. *Forcepoint LLC*, CA. No. 6:22-CV-00342-ADA-DTG, W.D. Tex., Nov. 1, 2023, 52 pgs.
Defendant Forcepoint LLC's Final Invalidity Contentions, Exhibit 243-F-11, *Webroot, Inc. and Open Text, Inc.* v. *Forcepoint LLC*, CA. No. 6:22-CV-00342-ADA-DTG, W.D. Tex., Nov. 1, 2023, 88 pgs.
Defendant Forcepoint LLC's Final Invalidity Contentions, Exhibit 243-F-12, *Webroot, Inc. and Open Text, Inc.* v. *Forcepoint LLC*, CA. No. 6:22-CV-00342-ADA-DTG, W.D. Tex., Nov. 1, 2023, 64 pgs.
Defendant Forcepoint LLC's Final Invalidity Contentions, Exhibit 243-F-13, *Webroot, Inc. and Open Text, Inc.* v. *Forcepoint LLC*, CA. No. 6:22-CV-00342-ADA-DTG, W.D. Tex., Nov. 1, 2023, 53 pgs.
Defendant Forcepoint LLC's Final Invalidity Contentions, Exhibit 243-F-14, *Webroot, Inc. and Open Text, Inc.* v. *Forcepoint LLC*, CA. No. 6:22-CV-00342-ADA-DTG, W.D. Tex., Nov. 1, 2023, 60 pgs.
Defendant Forcepoint LLC's Final Invalidity Contentions, Exhibit 243-F-15, *Webroot, Inc. and Open Text, Inc.* v. *Forcepoint LLC*, CA. No. 6:22-CV-00342-ADA-DTG, W.D. Tex., Nov. 1, 2023, 34 pgs.

(56) References Cited

OTHER PUBLICATIONS

Defendant Forcepoint LLC's Final Invalidity Contentions, Exhibit 243-F-16, *Webroot, Inc. and Open Text, Inc. v. Forcepoint LLC*, CA. No. 6:22-CV-00342-ADA-DTG, W.D. Tex., Nov. 1, 2023, 53 pgs.
Defendant Forcepoint LLC's Final Invalidity Contentions, Exhibit 243-F-17, *Webroot, Inc. and Open Text, Inc. v. Forcepoint LLC*, CA. No. 6:22-CV-00342-ADA-DTG, W.D. Tex., Nov. 1, 2023, 37 pgs.
Defendant Forcepoint LLC's Final Invalidity Contentions, Exhibit 243-F-18, *Webroot, Inc. and Open Text, Inc. v. Forcepoint LLC*, CA. No. 6:22-CV-00342-ADA-DTG, W.D. Tex., Nov. 1, 2023, 46 pgs.
Defendant Forcepoint LLC's Final Invalidity Contentions, Exhibit 243-F-19, *Webroot, Inc. and Open Text, Inc. v. Forcepoint LLC*, CA. No. 6:22-CV-00342-ADA-DTG, W.D. Tex., Nov. 1, 2023, 46 pgs.
Defendant Forcepoint LLC's Final Invalidity Contentions, Exhibit 243-F-20, *Webroot, Inc. and Open Text, Inc. v. Forcepoint LLC*, CA. No. 6:22-CV-00342-ADA-DTG, W.D. Tex., Nov. 1, 2023, 45 pgs.
Defendant Forcepoint LLC's Final Invalidity Contentions, Exhibit 243-F-21, *Webroot, Inc. and Open Text, Inc. v. Forcepoint LLC*, CA. No. 6:22-CV-00342-ADA-DTG, W.D. Tex., Nov. 1, 2023, 41 pgs.
Defendant Forcepoint LLC's Final Invalidity Contentions, Exhibit 243-F-22, *Webroot, Inc. and Open Text, Inc. v. Forcepoint LLC*, CA. No. 6:22-CV-00342-ADA-DTG, W.D. Tex., Nov. 1, 2023, 52 pgs.
Defendant Forcepoint LLC's Final Invalidity Contentions, Exhibit 243-F-23, *Webroot, Inc. and Open Text, Inc. v. Forcepoint LLC*, CA. No. 6:22-CV-00342-ADA-DTG, W.D. Tex., Nov. 1, 2023, 50 pgs.
Defendant Forcepoint LLC's Final Invalidity Contentions, Exhibit 243-F-24, *Webroot, Inc. and Open Text, Inc. v. Forcepoint LLC*, CA. No. 6:22-CV-00342-ADA-DTG, W.D. Tex., Nov. 1, 2023, 54 pgs.
Defendant Forcepoint LLC's Final Invalidity Contentions, Exhibit 243-F-25, *Webroot, Inc. and Open Text, Inc. v. Forcepoint LLC*, CA. No. 6:22-CV-00342-ADA-DTG, W.D. Tex., Nov. 1, 2023, 107 pgs.
Defendant Forcepoint LLC's Final Invalidity Contentions, Exhibit 243-F-26, *Webroot, Inc. and Open Text, Inc. v. Forcepoint LLC*, CA. No. 6:22-CV-00342-ADA-DTG, W.D. Tex., Nov. 1, 2023, 220 pgs.
Defendant Forcepoint LLC's Final Invalidity Contentions, Exhibit 243-F-27, *Webroot, Inc. and Open Text, Inc. v. Forcepoint LLC*, CA. No. 6:22-CV-00342-ADA-DTG, W.D. Tex., Nov. 1, 2023, 32 pgs.
Defendant Forcepoint LLC's Final Invalidity Contentions, Exhibit 243-F-28, *Webroot, Inc. and Open Text, Inc. v. Forcepoint LLC*, CA. No. 6:22-CV-00342-ADA-DTG, W.D. Tex., Nov. 1, 2023, 29 pgs.
Defendant Forcepoint LLC's Final Invalidity Contentions, Exhibit 932-G-1 *Webroot, Inc. and Open Text, Inc. v. Forcepoint LLC*, CA. No. 6:22-CV-00342-ADA-DTG, W.D. Tex., Nov. 1, 2023, , 26 pgs.
Defendant Forcepoint LLC's Final Invalidity Contentions, Exhibit 932-G-2 *Webroot, Inc. and Open Text, Inc. v. Forcepoint LLC*, CA. No. 6:22-CV-00342-ADA-DTG, W.D. Tex., Nov. 1, 2023, 54 pgs.
Defendant Forcepoint LLC's Final Invalidity Contentions, Exhibit 932-G-3, *Webroot, Inc. and Open Text, Inc. v. Forcepoint LLC*, CA. No. 6:22-CV-00342-ADA-DTG, W.D. Tex., Nov. 1, 2023, 44 pgs.
Defendant Forcepoint LLC's Final Invalidity Contentions, Exhibit 932-G-4, *Webroot, Inc. and Open Text, Inc. v. Forcepoint LLC*, CA. No. 6:22-CV-00342-ADA-DTG, W.D. Tex., Nov. 1, 2023, 33 pgs.
Defendant Forcepoint LLC's Final Invalidity Contentions, Exhibit 932-G-5, *Webroot, Inc. and Open Text, Inc. v. Forcepoint LLC*, CA. No. 6:22-CV-00342-ADA-DTG, W.D. Tex., Nov. 1, 2023, 113 pgs.
Defendant Forcepoint LLC's Final Invalidity Contentions, Exhibit 932-G-6, *Webroot, Inc. and Open Text, Inc. v. Forcepoint LLC*, CA. No. 6:22-CV-00342-ADA-DTG, W.D. Tex., Nov. 1, 2023, 36 pgs.
Defendant Forcepoint LLC's Final Invalidity Contentions, Exhibit 932-G-7, *Webroot, Inc. and Open Text, Inc. v. Forcepoint LLC*, CA. No. 6:22-CV-00342-ADA-DTG, W.D. Tex., Nov. 1, 2023, 87 pgs.
Defendant Forcepoint LLC's Final Invalidity Contentions, Exhibit 932-G-8, *Webroot, Inc. and Open Text, Inc. v. Forcepoint LLC*, CA. No. 6:22-CV-00342-ADA-DTG, W.D. Tex., Nov. 1, 2023, 70 pgs.
Defendant Forcepoint LLC's Final Invalidity Contentions, Exhibit 932-G-9, *Webroot, Inc. and Open Text, Inc. v. Forcepoint LLC*, CA. No. 6:22-CV-00342-ADA-DTG, W.D. Tex., Nov. 1, 2023, 112 pgs.
Defendant Forcepoint LLC's Final Invalidity Contentions, Exhibit 932-G-10, *Webroot, Inc. and Open Text, Inc. v. Forcepoint LLC*, CA. No. 6:22-CV-00342-ADA-DTG, W.D. Tex., Nov. 1, 2023, 63 pgs.
Defendant Forcepoint LLC's Final Invalidity Contentions, Exhibit 932-G-11, *Webroot, Inc. and Open Text, Inc. v. Forcepoint LLC*, CA. No. 6:22-CV-00342-ADA-DTG, W.D. Tex., Nov. 1, 2023, 110 pgs.
Defendant Forcepoint LLC's Final Invalidity Contentions, Exhibit 932-G-12, *Webroot, Inc. and Open Text, Inc. v. Forcepoint LLC*, CA. No. 6:22-CV-00342-ADA-DTG, W.D. Tex., Nov. 1, 2023, 74 pgs.
Defendant Forcepoint LLC's Final Invalidity Contentions, Exhibit 932-G-13, *Webroot, Inc. and Open Text, Inc. v. Forcepoint LLC*, CA. No. 6:22-CV-00342-ADA-DTG, W.D. Tex., Nov. 1, 2023, 57 pgs.
Defendant Forcepoint LLC's Final Invalidity Contentions, Exhibit 932-G-14, *Webroot, Inc. and Open Text, Inc. v. Forcepoint LLC*, CA. No. 6:22-CV-00342-ADA-DTG, W.D. Tex., Nov. 1, 2023, 60 pgs.
Defendant Forcepoint LLC's Final Invalidity Contentions, Exhibit 932-G-15, *Webroot, Inc. and Open Text, Inc. v. Forcepoint LLC*, CA. No. 6:22-CV-00342-ADA-DTG, W.D. Tex., Nov. 1, 2023, 39 pgs.
Defendant Forcepoint LLC's Final Invalidity Contentions, Exhibit 932-G-16, *Webroot, Inc. and Open Text, Inc. v. Forcepoint LLC*, CA. No. 6:22-CV-00342-ADA-DTG, W.D. Tex., Nov. 1, 2023, 62 pgs.
Defendant Forcepoint LLC's Final Invalidity Contentions, Exhibit 932-G-17, *Webroot, Inc. and Open Text, Inc. v. Forcepoint LLC*, CA. No. 6:22-CV-00342-ADA-DTG, W.D. Tex., Nov. 1, 2023, 57 pgs.
Defendant Forcepoint LLC's Final Invalidity Contentions, Exhibit 932-G-18, *Webroot, Inc. and Open Text, Inc. v. Forcepoint LLC*, CA. No. 6:22-CV-00342-ADA-DTG, W.D. Tex., Nov. 1, 2023, 61 pgs.
Defendant Forcepoint LLC's Final Invalidity Contentions, Exhibit 932-G-19, *Webroot, Inc. and Open Text, Inc. v. Forcepoint LLC*, CA. No. 6:22-CV-00342-ADA-DTG, W.D. Tex., Nov. 1, 2023, 54 pgs.
Defendant Forcepoint LLC's Final Invalidity Contentions, Exhibit 932-G-20, *Webroot, Inc. and Open Text, Inc. v. Forcepoint LLC*, CA. No. 6:22-CV-00342-ADA-DTG, W.D. Tex., Nov. 1, 2023, 57 pgs.
Defendant Forcepoint LLC's Final Invalidity Contentions, Exhibit 932-G-21, *Webroot, Inc. and Open Text, Inc. v. Forcepoint LLC*, CA. No. 6:22-CV-00342-ADA-DTG, W.D. Tex., Nov. 1, 2023, 59 pgs.
Defendant Forcepoint LLC's Final Invalidity Contentions, Exhibit 932-G-22, *Webroot, Inc. and Open Text, Inc. v. Forcepoint LLC*, CA. No. 6:22-CV-00342-ADA-DTG, W.D. Tex., Nov. 1, 2023, 139 pgs.
Defendant Forcepoint LLC's Final Invalidity Contentions, Exhibit 932-G-23, *Webroot, Inc. and Open Text, Inc. v. Forcepoint LLC*, CA. No. 6:22-CV-00342-ADA-DTG, W.D. Tex., Nov. 1, 2023, 273 pgs.
Defendant Forcepoint LLC's Final Invalidity Contentions, Exhibit 932-G-24, *Webroot, Inc. and Open Text, Inc. v. Forcepoint LLC*, CA. No. 6:22-CV-00342-ADA-DTG, W.D. Tex., Nov. 1, 2023, 39 pgs.
Defendant Forcepoint LLC's Final Invalidity Contentions, Exhibit 932-G-25, *Webroot, Inc. and Open Text, Inc. v. Forcepoint LLC*, CA. No. 6:22-CV-00342-ADA-DTG, W.D. Tex., Nov. 1, 2023, 31 pgs.
Defendant Forcepoint LLC's Final Invalidity Contentions, Exhibit 932-G-26, *Webroot, Inc. and Open Text, Inc. v. Forcepoint LLC*, CA. No. 6:22-CV-00342-ADA-DTG, W.D. Tex., Nov. 1, 2023, 54 pgs.
Defendant Forcepoint LLC's Final Invalidity Contentions, Exhibit 932-G-27, *Webroot, Inc. and Open Text, Inc. v. Forcepoint LLC*, CA. No. 6:22-CV-00342-ADA-DTG, W.D. Tex., Nov. 1, 2023, 55 pgs.

(56) References Cited

OTHER PUBLICATIONS

Defendant Sophos Ltd.'s Final Invalidity Contentions, Exhibit 045-A-4, *Webroot, Inc. and Open Text, Inc. v. Sophos Ltd.*, Case No. 6:22-cv-00240-ADA-DTG, W.D. Tex., Nov. 1, 2023, 150 pgs.
Defendant Sophos Ltd.'s Final Invalidity Contentions, Exhibit 045-A-22, *Webroot, Inc. and Open Text, Inc. v. Sophos Ltd.*, Case No. 6:22-cv-00240-ADA-DTG, W.D. Tex., Nov. 1, 2023, 93 pgs.
Defendant Sophos Ltd.'s Final Invalidity Contentions, Exhibit 045-A-27, *Webroot, Inc. and Open Text, Inc. v. Sophos Ltd.*, Case No. 6:22-cv-00240-ADA-DTG, W.D. Tex., Nov. 1, 2023, 35 pgs.
Defendant Sophos Ltd.'s Final Invalidity Contentions, Exhibit 045-A-34, *Webroot, Inc. and Open Text, Inc. v. Sophos Ltd.*, Case No. 6:22-cv-00240-ADA-DTG, W.D. Tex., Nov. 1, 2023, 27 pgs.
Defendant Sophos Ltd.'s Final Invalidity Contentions, Exhibit 045-B, *Webroot, Inc. and Open Text, Inc. v. Sophos Ltd.*, Case No. 6:22-cv-00240-ADA-DTG, W.D. Tex., Nov. 1, 2023, 35 pgs.
Defendant Sophos Ltd.'s Final Invalidity Contentions, Exhibit 224-A-4, *Webroot, Inc. and Open Text, Inc. v. Sophos Ltd.*, CA. No. 6:22-CV-00240-ADA-DTG, W.D. Tex., Nov. 1, 2023, 207 pgs.
Defendant Sophos Ltd.'s Final Invalidity Contentions, Exhibit 224-A-22, *Webroot, Inc. and Open Text, Inc. v. Sophos Ltd.*, CA. No. 6:22-CV-00240-ADA-DTG, W.D. Tex., Nov. 1, 2023, 152 pgs.
Defendant Sophos Ltd.'s Final Invalidity Contentions, Exhibit 224-A-27, *Webroot, Inc. and Open Text, Inc. v. Sophos Ltd.*, CA. No. 6:22-CV-00240-ADA-DTG, W.D. Tex., Nov. 1, 2023, 69 pgs.
Defendant Sophos Ltd.'s Final Invalidity Contentions, Exhibit 224-A-34, *Webroot, Inc. and Open Text, Inc. v. Sophos Ltd.*, CA. No. 6:22-CV-00240-ADA-DTG, W.D. Tex., Nov. 1, 2023, 59 pgs.
Defendant Sophos Ltd.'s Final Invalidity Contentions, Exhibit 224-B, *Webroot, Inc. and Open Text, Inc. v. Sophos Ltd.*, CA. No. 6:22-CV-00240-ADA-DTG, W.D. Tex., Nov. 1, 2023, 53 pgs.
Defendant Sophos Ltd.'s Final Invalidity Contentions, Exhibit 243-A-3, *Webroot, Inc. and Open Text, Inc. v. Sophos Ltd.*, Case No. 6:22-cv-00240-ADA-DTG, W.D. Tex., Nov. 1, 2023, 30 pgs.
Defendant Sophos Ltd.'s Final Invalidity Contentions, Exhibit 243-A-7, *Webroot, Inc. and Open Text, Inc. v. Sophos Ltd.*, Case No. 6:22-cv-00240-ADA-DTG, W.D. Tex., Nov. 1, 2023, 110 pgs.
Defendant Sophos Ltd.'s Final Invalidity Contentions, Exhibit 243-A-8, *Webroot, Inc. and Open Text, Inc. v. Sophos Ltd.*, Case No. 6:22-cv-00240-ADA-DTG, W.D. Tex., Nov. 1, 2023, 60 pgs.
Defendant Sophos Ltd.'s Final Invalidity Contentions, Exhibit 243-A-13, *Webroot, Inc. and Open Text, Inc. v. Sophos Ltd.*, Case No. 6:22-cv-00240-ADA-DTG, W.D. Tex., Nov. 1, 2023, 37 pgs.
Defendant Sophos Ltd.'s Final Invalidity Contentions, Exhibit 243-A-14, *Webroot, Inc. and Open Text, Inc. v. Sophos Ltd.*, Case No. 6:22-cv-00240-ADA-DTG, W.D. Tex., Nov. 1, 2023, 49 pgs.
Defendant Sophos Ltd.'s Final Invalidity Contentions, Exhibit 243-A-18, *Webroot, Inc. and Open Text, Inc. v. Sophos Ltd.*, Case No. 6:22-cv-00240-ADA-DTG, W.D. Tex., Nov. 1, 2023, 37 pgs.
Defendant Sophos Ltd.'s Final Invalidity Contentions, Exhibit 243-A-29, *Webroot, Inc. and Open Text, Inc. v. Sophos Ltd.*, Case No. 6:22-cv-00240-ADA-DTG, W.D. Tex., Nov. 1, 2023, 113 pgs.
Defendant Sophos Ltd.'s Final Invalidity Contentions, Exhibit 243-A-30, *Webroot, Inc. and Open Text, Inc. v. Sophos Ltd.*, Case No. 6:22-cv-00240-ADA-DTG, W.D. Tex., Nov. 1, 2023, 93 pgs.
Defendant Sophos Ltd.'s Final Invalidity Contentions, Exhibit 243-A-31, *Webroot, Inc. and Open Text, Inc. v. Sophos Ltd.*, Case No. 6:22-cv-00240-ADA-DTG, W.D. Tex., Nov. 1, 2023, 33 pgs.
Defendant Sophos Ltd.'s Final Invalidity Contentions, Exhibit 243-A-32, *Webroot, Inc. and Open Text, Inc. v. Sophos Ltd.*, Case No. 6:22-cv-00240-ADA-DTG, W.D. Tex., Nov. 1, 2023, 32 pgs.
Defendant Sophos Ltd.'s Final Invalidity Contentions, Exhibit 243-A-33, *Webroot, Inc. and Open Text, Inc. v. Sophos Ltd.*, Case No. 6:22-cv-00240-ADA-DTG, W.D. Tex., Nov. 1, 2023, 27 pgs.
Defendant Sophos Ltd.'s Final Invalidity Contentions, Exhibit 243-A-34, *Webroot, Inc. and Open Text, Inc. v. Sophos Ltd.*, Case No. 6:22-cv-00240-ADA-DTG, W.D. Tex., Nov. 1, 2023, 24 pgs.
Defendant Sophos Ltd.'s Final Invalidity Contentions, Exhibit 243-B, *Webroot, Inc. and Open Text, Inc. v. Sophos Ltd.*, Case No. 6:22-cv-00240-ADA-DTG, W.D. Tex., Nov. 1, 2023, 131 pgs.
Defendant Sophos Ltd.'s Final Invalidity Contentions, Exhibit 932-A-3, *Webroot, Inc. and Open Text, Inc. v. Sophos Ltd.*, Case No. 6:22-cv-00240-ADA-DTG, W.D. Tex., Nov. 1, 2023, 29 pgs.
Defendant Sophos Ltd.'s Final Invalidity Contentions, Exhibit 932-A-6, *Webroot, Inc. and Open Text, Inc. v. Sophos Ltd.*, Case No. 6:22-cv-00240-ADA-DTG, W.D. Tex., Nov. 1, 2023, 130 pgs.
Defendant Sophos Ltd.'s Final Invalidity Contentions, Exhibit 932-A-7, *Webroot, Inc. and Open Text, Inc. v. Sophos Ltd.*, Case No. 6:22-cv-00240-ADA-DTG, W.D. Tex., Nov. 1, 2023, 75 pgs.
Defendant Sophos Ltd.'s Final Invalidity Contentions, Exhibit 932-A-13, *Webroot, Inc. and Open Text, Inc. v. Sophos Ltd.*, Case No. 6:22-cv-00240-ADA-DTG, W.D. Tex., Nov. 1, 2023, 62 pgs.
Defendant Sophos Ltd.'s Final Invalidity Contentions, Exhibit 932-A-14, *Webroot, Inc. and Open Text, Inc. v. Sophos Ltd.*, Case No. 6:22-cv-00240-ADA-DTG, W.D. Tex., Nov. 1, 2023, 63 pgs.
Defendant Sophos Ltd.'s Final Invalidity Contentions, Exhibit 932-A-18, *Webroot, Inc. and Open Text, Inc. v. Sophos Ltd.*, Case No. 6:22-cv-00240-ADA-DTG, W.D. Tex., Nov. 1, 2023, 39 pgs.
Defendant Sophos Ltd.'s Final Invalidity Contentions, Exhibit 932-A-28, *Webroot, Inc. and Open Text, Inc. v. Sophos Ltd.*, Case No. 6:22-cv-00240-ADA-DTG, W.D. Tex., Nov. 1, 2023, 159 pgs.
Defendant Sophos Ltd.'s Final Invalidity Contentions, Exhibit 932-A-29, *Webroot, Inc. and Open Text, Inc. v. Sophos Ltd.*, Case No. 6:22-cv-00240-ADA-DTG, W.D. Tex., Nov. 1, 2023, 120 pgs.
Defendant Sophos Ltd.'s Final Invalidity Contentions, Exhibit 932-A-30, *Webroot, Inc. and Open Text, Inc. v. Sophos Ltd.*, Case No. 6:22-cv-00240-ADA-DTG, W.D. Tex., Nov. 1, 2023, 34 pgs.
Defendant Sophos Ltd.'s Final Invalidity Contentions, Exhibit 932-A-31, *Webroot, Inc. and Open Text, Inc. v. Sophos Ltd.*, Case No. 6:22-cv-00240-ADA-DTG, W.D. Tex., Nov. 1, 2023, 33 pgs.
Defendant Sophos Ltd.'s Final Invalidity Contentions, Exhibit 932-A-32, *Webroot, Inc. and Open Text, Inc. v. Sophos Ltd.*, Case No. 6:22-cv-00240-ADA-DTG, W.D. Tex., Nov. 1, 2023, 26 pgs.
Defendant Sophos Ltd.'s Final Invalidity Contentions, Exhibit 932-A-33, *Webroot, Inc. and Open Text, Inc. v. Sophos Ltd.*, Case No. 6:22-cv-00240-ADA-DTG, W.D. Tex., Nov. 1, 2023, 24 pgs.
Defendant Sophos Ltd.'s Final Invalidity Contentions, Exhibit 932-B, *Webroot, Inc. and Open Text, Inc. v. Sophos Ltd.*, Case No. 6:22-cv-00240-ADA-DTG, W.D. Tex., Nov. 1, 2023, 164 pgs.
Defendant Sophos Ltd.'s Final Invalidity Contentions, Exhibit 244-A-6, *Webroot, Inc. and Open Text, Inc. v. Sophos Ltd.*, Case No. 6:22-cv-00240-ADA-DTG, W.D. Tex., Nov. 1, 2023, 45 pgs.
Defendant Sophos Ltd.'s Final Invalidity Contentions, Exhibit 244-A-9, *Webroot, Inc. and Open Text, Inc. v. Sophos Ltd.*, Case No. 6:22-cv-00240-ADA-DTG, W.D. Tex., Nov. 1, 2023, 100 pgs.
Defendant Sophos Ltd.'s Final Invalidity Contentions, Exhibit 244-A-23, *Webroot, Inc. and Open Text, Inc. v. Sophos Ltd.*, Case No. 6:22-cv-00240-ADA-DTG, W.D. Tex., Nov. 1, 2023, 28 pgs.
Defendant Sophos Ltd.'s Final Invalidity Contentions, Exhibit 244-A-24, *Webroot, Inc. and Open Text, Inc. v. Sophos Ltd.*, Case No. 6:22-cv-00240-ADA-DTG, W.D. Tex., Nov. 1, 2023, 107 pgs.
Defendant Sophos Ltd.'s Final Invalidity Contentions, Exhibit 244-A-25, *Webroot, Inc. and Open Text, Inc. v. Sophos Ltd.*, Case No. 6:22-cv-00240-ADA-DTG, W.D. Tex., Nov. 1, 2023, 108 pgs.
Defendant Sophos Ltd.'s Final Invalidity Contentions, Exhibit 244-A-26, *Webroot, Inc. and Open Text, Inc. v. Sophos Ltd.*, Case No. 6:22-cv-00240-ADA-DTG, W.D. Tex., Nov. 1, 2023, 43 pgs.
Defendant Sophos Ltd.'s Final Invalidity Contentions, Exhibit 244-A-27, *Webroot, Inc. and Open Text, Inc. v. Sophos Ltd.*, Case No. 6:22-cv-00240-ADA-DTG, W.D. Tex., Nov. 1, 2023, 32 pgs.
Defendant Sophos Ltd.'s Final Invalidity Contentions, Exhibit 244-B, *Webroot, Inc. and Open Text, Inc. v. Sophos Ltd.*, Case No. 6:22-cv-00240-ADA-DTG, W.D. Tex., Nov. 1, 2023, 53 pgs.
Defendant Sophos Ltd.'s Final Invalidity Contentions, Exhibit 505-A-6, *Webroot, Inc. and Open Text, Inc. v. Sophos Ltd.*, Case No. 6:22-cv-00240-ADA-DTG, W.D. Tex., Nov. 1, 2023, 162 pgs.
Defendant Sophos Ltd.'s Final Invalidity Contentions, Exhibit 505-A-8, *Webroot, Inc. and Open Text, Inc. v. Sophos Ltd.*, Case No. 6:22-cv-00240-ADA-DTG, W.D. Tex., Nov. 1, 2023, 35 pgs.
Defendant Sophos Ltd.'s Final Invalidity Contentions, Exhibit 505-A-15, *Webroot, Inc. and Open Text, Inc. v. Sophos Ltd.*, CA. No. 6:22-CV-00240-ADA-DTG, W.D. Tex., Feb. 21, 2023, 148 pgs.

(56) References Cited

OTHER PUBLICATIONS

Defendant Sophos Ltd.'s Final Invalidity Contentions, Exhibit 505-A-21, *Webroot, Inc. and Open Text, Inc.* v. *Sophos Ltd.*, Case No. 6:22-cv-00240-ADA-DTG, W.D. Tex., Nov. 1, 2023, 30 pgs.
Defendant Sophos Ltd.'s Final Invalidity Contentions, Exhibit 505-A-22, *Webroot, Inc. and Open Text, Inc.* v. *Sophos Ltd.*, Case No. 6:22-cv-00240-ADA-DTG, W.D. Tex., Nov. 1, 2023, 32 pgs.
Defendant Sophos Ltd.'s Final Invalidity Contentions, Exhibit 505-B, *Webroot, Inc. and Open Text, Inc.* v. *Sophos Ltd.*, Case No. 6:22-cv-00240-ADA-DTG, W.D. Tex., Nov. 1, 2023, 117 pgs.
Defendant Sophos Ltd.'s Final Invalidity Contentions, Exhibit 591-A-3, *Webroot, Inc. and Open Text, Inc.* v. *Sophos Ltd.*, Case No. 6:22-cv-00240-ADA-DTG, W.D. Tex., Nov. 1, 2023, 37 pgs.
Defendant Sophos Ltd.'s Final Invalidity Contentions, Exhibit 591-A-4, *Webroot, Inc. and Open Text, Inc.* v. *Sophos Ltd.*, Case No. 6:22-cv-00240-ADA-DTG, W.D. Tex., Nov. 1, 2023, 53 pgs.
Defendant Sophos Ltd.'s Final Invalidity Contentions, Exhibit 591-A-19, *Webroot, Inc. and Open Text, Inc.* v. *Sophos Ltd.*, Case No. 6:22-cv-00240-ADA-DTG, W.D. Tex., Nov. 1, 2023, 54 pgs.
Defendant Sophos Ltd.'s Final Invalidity Contentions, Exhibit 591-A-20, *Webroot, Inc. and Open Text, Inc.* v. *Sophos Ltd.*, Case No. 6:22-cv-00240-ADA-DTG, W.D. Tex., Nov. 1, 2023, 33 pgs.
Defendant Sophos Ltd.'s Final Invalidity Contentions, Exhibit 591-A-22, *Webroot, Inc. and Open Text, Inc.* v. *Sophos Ltd.*, Case No. 6:22-cv-00240-ADA-DTG, W.D. Tex., Nov. 1, 2023, 52 pgs.
Defendant Sophos Ltd.'s Final Invalidity Contentions, Exhibit 591-A-28, *Webroot, Inc. and Open Text, Inc.* v. *Sophos Ltd.*, Case No. 6:22-cv-00240-ADA-DTG, W.D. Tex., Nov. 1, 2023, 60 pgs.
Defendant Sophos Ltd.'s Final Invalidity Contentions, Exhibit 591-B, *Webroot, Inc. and Open Text, Inc.* v. *Sophos Ltd.*, Case No. 6:22-cv-00240-ADA-DTG, W.D. Tex., Nov. 1, 2023, 38 pgs.
Defendant's Final Invalidity Contentions, Exhibit 591-A-47, *Webroot, Inc. and Open Text, Inc.* v. *Trend Micro, Inc.*, Case No. 6:22-cv-00239-ADA-DTG, W.D. Tex., Nov. 1, 2023, 46 pgs.
Defendant Forcepoint LLC's Final Invalidity Contentions, Exhibit 386-D-1, *Webroot, Inc. and Open Text, Inc.* v. *Forcepoint LLC*, No. 6:22-CV-00342-ADA-DTG (WD, Texas), Nov. 1, 2023, 88 pgs.
Defendant Forcepoint LLC's Final Invalidity Contentions, Exhibit 386-D-2, *Webroot, Inc. and Open Text, Inc.* v. *Forcepoint LLC*, No. 6:22-CV-00342-ADA-DTG (WD, Texas), Nov. 1, 2023, 61 pgs.
Defendant Forcepoint LLC's Final Invalidity Contentions, Exhibit 386-D-3, *Webroot, Inc. and Open Text, Inc.* v. *Forcepoint LLC*, No. 6:22-CV-00342-ADA-DTG (WD, Texas), Nov. 1, 2023, 72 pgs.
Defendant Forcepoint LLC's Final Invalidity Contentions, Exhibit 386-D-4, *Webroot, Inc. and Open Text, Inc.* v. *Forcepoint LLC*, No. 6:22-CV-00342-ADA-DTG (WD, Texas), Nov. 1, 2023, 69 pgs.
Defendant Forcepoint LLC's Final Invalidity Contentions, Exhibit 386-D-5, *Webroot, Inc. and Open Text, Inc.* v. *Forcepoint LLC*, No. 6:22-CV-00342-ADA-DTG (WD, Texas), Nov. 1, 2023, 73 pgs.
Defendant Forcepoint LLC's Final Invalidity Contentions, Exhibit 386-D-6, *Webroot, Inc. and Open Text, Inc.* v. *Forcepoint LLC*, No. 6:22-CV-00342-ADA-DTG (WD, Texas), Nov. 1, 2023, 100 pgs.
Defendant Forcepoint LLC's Final Invalidity Contentions, Exhibit 386-D-7, *Webroot, Inc. and Open Text, Inc.* v. *Forcepoint LLC*, No. 6:22-CV-00342-ADA-DTG (WD, Texas), Nov. 1, 2023, 77 pgs.
Defendant Forcepoint LLC's Final Invalidity Contentions, Exhibit 928-E-1, *Webroot, Inc. and Open Text, Inc.* v. *Forcepoint LLC*, No. 6:22-CV-00342-ADA-DTG (WD, Texas), Nov. 1, 2023, 26 pgs.
Defendant Forcepoint LLC's Final Invalidity Contentions, Exhibit 928-E-2, *Webroot, Inc. and Open Text, Inc.* v. *Forcepoint LLC*, No. 6:22-CV-00342-ADA-DTG (WD, Texas), Nov. 1, 2023, 24 pgs.
Defendant Forcepoint LLC's Final Invalidity Contentions, Exhibit 928-E-3, *Webroot, Inc. and Open Text, Inc.* v. *Forcepoint LLC*, No. 6:22-CV-00342-ADA-DTG (WD, Texas), Nov. 1, 2023, 27 pgs.
Defendant Forcepoint LLC's Final Invalidity Contentions, Exhibit 928-E-4, *Webroot, Inc. and Open Text, Inc.* v. *Forcepoint LLC*, No. 6:22-CV-00342-ADA-DTG (WD, Texas), Nov. 1, 2023, 29 pgs.
Defendant Forcepoint LLC's Final Invalidity Contentions, Exhibit 928-E-5, *Webroot, Inc. and Open Text, Inc.* v. *Forcepoint LLC*, No. 6:22-CV-00342-ADA-DTG (WD, Texas), Nov. 1, 2023, 30 pgs.
Defendant Forcepoint LLC's Final Invalidity Contentions, Exhibit 844-B-1, *Webroot, Inc. and Open Text, Inc.* v. *Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 844-B-2, *Webroot, Inc. and Open Text, Inc.* v. *Forcepoint LLC*, No. 6:22-CV-00342-ADA-DTG (WD, Texas), Jan. 1, 2023, 21 pgs.
Defendant Forcepoint LLC's Final Invalidity Contentions, Exhibit 844-B-3, *Webroot, Inc. and Open Text, Inc.* v. *Forcepoint LLC*, No. 6:22-CV-00342-ADA-DTG (WD, Texas), Nov. 1, 2023, 27 pgs.
Defendant Forcepoint LLC's Final Invalidity Contentions, Exhibit 844-B-4, *Webroot, Inc. and Open Text, Inc.* v. *Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 844-B-5, *Webroot, Inc. and Open Text, Inc.* v. *Forcepoint LLC*, No. 6:22-CV-00342-ADA-DTG (WD, Texas), Nov. 1, 2023, 25 pgs.
Defendant Forcepoint LLC's Final Invalidity Contentions, Exhibit 844-B-6, *Webroot, Inc. and Open Text, Inc.* v. *Forcepoint LLC*, No. 6:22-CV-00342-ADA-DTG (WD, Texas), Nov. 1, 2023, 21 pgs.
Defendant Forcepoint LLC's Final Invalidity Contentions, Exhibit 844-B-7, *Webroot, Inc. and Open Text, Inc.* v. *Forcepoint LLC*, No. 6:22-CV-00342-ADA-DTG (WD, Texas), Nov. 1, 2023, 29 pgs.
Defendant Forcepoint LLC's Final Invalidity Contentions, Exhibit 844-B-8, *Webroot, Inc. and Open Text, Inc.* v. *Forcepoint LLC*, No. 6:22-CV-00342-ADA-DTG (WD, Texas), Nov. 1, 2023, 24 pgs.
Defendant Forcepoint LLC's Final Invalidity Contentions, Exhibit 844-B-9, *Webroot, Inc. and Open Text, Inc.* v. *Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 844-B-10, *Webroot, Inc. and Open Text, Inc.* v. *Forcepoint LLC*, No. 6:22-CV-00342-ADA-DTG (WD, Texas), Nov. 1, 2023, 20 pgs.
Defendant Forcepoint LLC's Final Invalidity Contentions, Exhibit 844-B-11, *Webroot, Inc. and Open Text, Inc.* v. *Forcepoint LLC*, No. 6:22-CV-00342-ADA-DTG (WD, Texas), Nov. 1, 2023, 25 pgs.
Defendant Forcepoint LLC's Final Invalidity Contentions, Exhibit 844-B-12, *Webroot, Inc. and Open Text, Inc.* v. *Forcepoint LLC*, No. 6:22-CV-00342-ADA-DTG (WD, Texas), Nov. 1, 2023, 24 pgs.
Defendant Forcepoint LLC's Final Invalidity Contentions, Exhibit 844-B-13, *Webroot, Inc. and Open Text, Inc.* v. *Forcepoint LLC*, No. 6:22-CV-00342-ADA-DTG (WD, Texas), Nov. 1, 2023, 24 pgs.
Defendant Forcepoint LLC's Final Invalidity Contentions, Exhibit 844-B-14, *Webroot, Inc. and Open Text, Inc.* v. *Forcepoint LLC*, No. 6:22-CV-00342-ADA-DTG (WD, Texas), Nov. 1, 2023, 21 pgs.
Defendant Forcepoint LLC's Final Invalidity Contentions, Exhibit 844-B-15, *Webroot, Inc. and Open Text, Inc.* v. *Forcepoint LLC*, No. 6:22-CV-00342-ADA-DTG (WD, Texas), Nov. 1, 2023, 17 pgs.
Defendant Forcepoint LLC's Final Invalidity Contentions, Exhibit 844-B-16, *Webroot, Inc. and Open Text, Inc.* v. *Forcepoint LLC*, No. 6:22-CV-00342-ADA-DTG (WD, Texas), Nov. 1, 2023, 20 pgs.
Defendant Forcepoint LLC's Final Invalidity Contentions, Exhibit 844-B-17, *Webroot, Inc. and Open Text, Inc.* v. *Forcepoint LLC*, No. 6:22-CV-00342-ADA-DTG (WD, Texas), Nov. 1, 2023, 18 pgs.
Defendant Forcepoint LLC's Final Invalidity Contentions, Exhibit 844-B-18, *Webroot, Inc. and Open Text, Inc.* v. *Forcepoint LLC*, No. 6:22-CV-00342-ADA-DTG (WD, Texas), Nov. 1, 2023, 18 pgs.
Defendant Forcepoint LLC's Final Invalidity Contentions, Exhibit 844-B-19, *Webroot, Inc. and Open Text, Inc.* v. *Forcepoint LLC*, No. 6:22-CV-00342-ADA-DTG (WD, Texas), Nov. 1, 2023, 20 pgs.
Defendant Forcepoint LLC's Final Invalidity Contentions, Exhibit 844-B-20, *Webroot, Inc. and Open Text, Inc.* v. *Forcepoint LLC*, No. 6:22-CV-00342-ADA-DTG (WD, Texas), Nov. 1, 2023, 17 pgs.
Defendant Forcepoint LLC's Final Invalidity Contentions, Exhibit 844-B-21, *Webroot, Inc. and Open Text, Inc.* v. *Forcepoint LLC*, No. 6:22-CV-00342-ADA-DTG (WD, Texas), Nov. 1, 2023, 18 pgs.
Defendant Forcepoint LLC's Final Invalidity Contentions, Exhibit 844-B-22, *Webroot, Inc. and Open Text, Inc.* v. *Forcepoint LLC*, No. 6:22-CV-00342-ADA-DTG (WD, Texas), Nov. 1, 2023, 22, 17 pgs.
Defendant Forcepoint LLC's Final Invalidity Contentions, Exhibit 844-B-23, *Webroot, Inc. and Open Text, Inc.* v. *Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 844-B-24, *Webroot, Inc. and Open Text, Inc.* v. *Forcepoint LLC*, No. 6:22-CV-00342-ADA-DTG (WD, Texas), Nov. 1, 2023, 27 pgs.

(56) References Cited

OTHER PUBLICATIONS

Defendant Forcepoint LLC's Final Invalidity Contentions, Exhibit 844-B-25, *Webroot, Inc. and Open Text, Inc.* v. *Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 844-B-26, *Webroot, Inc. and Open Text, Inc.* v. *Forcepoint LLC*, No. 6:22-CV-00342-ADA-DTG (WD, Texas), Nov. 1, 2023, 22 pgs.
Defendant Forcepoint LLC's Final Invalidity Contentions, Exhibit 844-B-27, *Webroot, Inc. and Open Text, Inc.* v. *Forcepoint LLC*, No. 6:22-CV-00342-ADA-DTG (WD, Texas), Nov. 1, 2023, 33 pgs.
Defendant Forcepoint LLC's Final Invalidity Contentions, Exhibit 844-B-28, *Webroot, Inc. and Open Text, Inc.* v. *Forcepoint LLC*, No. 6:22-CV-00342-ADA-DTG (WD, Texas), Nov. 1, 2023, 30 pgs.
Defendant Forcepoint LLC's Final Invalidity Contentions, Exhibit 844-B-29, *Webroot, Inc. and Open Text, Inc.* v. *Forcepoint LLC*, No. 6:22-CV-00342-ADA-DTG (WD, Texas), Nov. 1, 2023, 27 pgs.
Defendant Forcepoint LLC's Final Invalidity Contentions, Exhibit 869-H-1, *Webroot, Inc. and Open Text, Inc.* v. *Forcepoint LLC*, No. 6:22-CV-00342-ADA-DTG (WD, Texas), Nov. 1, 2023, 55 pgs.
Defendant Forcepoint LLC's Final Invalidity Contentions, Exhibit 869-H-2, *Webroot, Inc. and Open Text, Inc.* v. *Forcepoint LLC*, No. 6:22-CV-00342-ADA-DTG (WD, Texas), Nov. 1, 2023, 42 pgs.
Defendant Forcepoint LLC's Final Invalidity Contentions, Exhibit 869-H-3, *Webroot, Inc. and Open Text, Inc.* v. *Forcepoint LLC*, No. 6:22-CV-00342-ADA-DTG (WD, Texas), Nov. 1, 2023, 39 pgs.
Defendant Forcepoint LLC's Final Invalidity Contentions, Exhibit 869-H-4, *Webroot, Inc. and Open Text, Inc.* v. *Forcepoint LLC*, No. 6:22-CV-00342-ADA-DTG (WD, Texas), Nov. 1, 2023, 40 pgs.
Defendant Forcepoint LLC's Final Invalidity Contentions, Exhibit 869-H-5, *Webroot, Inc. and Open Text, Inc.* v. *Forcepoint LLC*, No. 6:22-CV-00342-ADA-DTG (WD, Texas), Nov. 1, 2023, 47 pgs.
Defendant Forcepoint LLC's Final Invalidity Contentions, Exhibit 869-H-6, *Webroot, Inc. and Open Text, Inc.* v. *Forcepoint LLC*, No. 6:22-CV-00342-ADA-DTG (WD, Texas), Nov. 1, 2023, 48 pgs.
Defendant Forcepoint LLC's Final Invalidity Contentions, Exhibit 869-H-7, *Webroot, Inc. and Open Text, Inc.* v. *Forcepoint LLC*, No. 6:22-CV-00342-ADA-DTG (WD, Texas), Nov. 1, 2023, 62 pgs.
Defendant Forcepoint LLC's Final Invalidity Contentions, Exhibit 869-H-8, *Webroot, Inc. and Open Text, Inc.* v. *Forcepoint LLC*, No. 6:22-CV-00342-ADA-DTG (WD, Texas), Nov. 1, 2023, 36 pgs.
Defendant Forcepoint LLC's Final Invalidity Contentions, Exhibit 869-H-9, *Webroot, Inc. and Open Text, Inc.* v. *Forcepoint LLC*, No. 6:22-CV-00342-ADA-DTG (WD, Texas), Nov. 1, 2023, 39 pgs.
Defendant Forcepoint LLC's Final Invalidity Contentions, Exhibit 869-H-10, *Webroot, Inc. and Open Text, Inc.* v. *Forcepoint LLC*, No. 6:22-CV-00342-ADA-DTG (WD, Texas), Nov. 1, 2023, 37 pgs.
Defendant Forcepoint LLC's Final Invalidity Contentions, Exhibit 869-H-11, *Webroot, Inc. and Open Text, Inc.* v. *Forcepoint LLC*, No. 6:22-CV-00342-ADA-DTG (WD, Texas), Nov. 1, 2023, 44 pgs.
Defendant Forcepoint LLC's Final Invalidity Contentions, Exhibit 869-H-12, *Webroot, Inc. and Open Text, Inc.* v. *Forcepoint LLC*, No. 6:22-CV-00342-ADA-DTG (WD, Texas), Nov. 1, 2023, 39 pgs.
Defendant Forcepoint LLC's Final Invalidity Contentions, Exhibit 869-H-13, *Webroot, Inc. and Open Text, Inc.* v. *Forcepoint LLC*, No. 6:22-CV-00342-ADA-DTG (WD, Texas), Nov. 1, 2023, 50 pgs.
Defendant Forcepoint LLC's Final Invalidity Contentions, Exhibit 869-H-14, *Webroot, Inc. and Open Text, Inc.* v. *Forcepoint LLC*, No. 6:22-CV-00342-ADA-DTG (WD, Texas), Nov. 1, 2023, 37 pgs.
Defendant Forcepoint LLC's Final Invalidity Contentions, Exhibit 869-H-15, *Webroot, Inc. and Open Text, Inc.* v. *Forcepoint LLC*, No. 6:22-CV-00342-ADA-DTG (WD, Texas), Nov. 1, 2023, 36 pgs.
Defendant Forcepoint LLC's Final Invalidity Contentions, Exhibit 869-H-16, *Webroot, Inc. and Open Text, Inc.* v. *Forcepoint LLC*, No. 6:22-CV-00342-ADA-DTG (WD, Texas), Nov. 1, 2023, 32 pgs.
Defendant Forcepoint LLC's Final Invalidity Contentions, Exhibit 869-H-17, *Webroot, Inc. and Open Text, Inc.* v. *Forcepoint LLC*, No. 6:22-CV-00342-ADA-DTG (WD, Texas), Nov. 1, 2023, 31 pgs.
Defendant Forcepoint LLC's Final Invalidity Contentions, Exhibit 869-H-18, *Webroot, Inc. and Open Text, Inc.* v. *Forcepoint LLC*, No. 6:22-CV-00342-ADA-DTG (WD, Texas), Nov. 1, 2023, 31 pgs.
Defendant Forcepoint LLC's Final Invalidity Contentions, Exhibit 869-H-19, *Webroot, Inc. and Open Text, Inc.* v. *Forcepoint LLC*, No. 6:22-CV-00342-ADA-DTG (WD, Texas), Nov. 1, 2023, 37 pgs.
Defendant Forcepoint LLC's Final Invalidity Contentions, Exhibit 869-H-20, *Webroot, Inc. and Open Text, Inc.* v. *Forcepoint LLC*, No. 6:22-CV-00342-ADA-DTG (WD, Texas), Nov. 1, 2023, 32 pgs.
Defendant Forcepoint LLC's Final Invalidity Contentions, Exhibit 869-H-21, *Webroot, Inc. and Open Text, Inc.* v. *Forcepoint LLC*, No. 6:22-CV-00342-ADA-DTG (WD, Texas), Nov. 1, 2023, 37 pgs.
Defendant Forcepoint LLC's Final Invalidity Contentions, Exhibit 869-H-22, *Webroot, Inc. and Open Text, Inc.* v. *Forcepoint LLC*, No. 6:22-CV-00342-ADA-DTG (WD, Texas), Nov. 1, 2023, 38 pgs.
Defendant Forcepoint LLC's Final Invalidity Contentions, Exhibit 869-H-23, *Webroot, Inc. and Open Text, Inc.* v. *Forcepoint LLC*, No. 6:22-CV-00342-ADA-DTG (WD, Texas), Nov. 1, 2023, 33 pgs.
Defendant Forcepoint LLC's Final Invalidity Contentions, Exhibit 869-H-24, *Webroot, Inc. and Open Text, Inc.* v. *Forcepoint LLC*, No. 6:22-CV-00342-ADA-DTG (WD, Texas), Nov. 1, 2023, 35 pgs.
Defendant Forcepoint LLC's Final Invalidity Contentions, Exhibit 869-H-25, *Webroot, Inc. and Open Text, Inc.* v. *Forcepoint LLC*, No. 6:22-CV-00342-ADA-DTG (WD, Texas), Nov. 1, 2023, 63 pgs.
Defendant Forcepoint LLC's Final Invalidity Contentions, Exhibit 869-H-26, *Webroot, Inc. and Open Text, Inc.* v. *Forcepoint LLC*, No. 6:22-CV-00342-ADA-DTG (WD, Texas), Nov. 1, 2023, 39 pgs.
Defendant Forcepoint LLC's Final Invalidity Contentions, Exhibit 869-H-27, *Webroot, Inc. and Open Text, Inc.* v. *Forcepoint LLC*, No. 6:22-CV-00342-ADA-DTG (WD, Texas), Nov. 1, 2023, Exhibit 869-H-27, 29 pgs.
Defendant Forcepoint LLC's Final Invalidity Contentions, Exhibit 869-H-28, *Webroot, Inc. and Open Text, Inc.* v. *Forcepoint LLC*, No. 6:22-CV-00342-ADA-DTG (WD, Texas), Nov. 1, 2023, 71 pgs.
Defendant Forcepoint LLC's Final Invalidity Contentions, Exhibit 869-H-29, *Webroot, Inc. and Open Text, Inc.* v. *Forcepoint LLC*, No. 6:22-CV-00342-ADA-DTG (WD, Texas), Nov. 1, 2023, 38 pgs.
Defendant Forcepoint LLC's Final Invalidity Contentions, Exhibit 869-H-30, *Webroot, Inc. and Open Text, Inc.* v. *Forcepoint LLC*, No. 6:22-CV-00342-ADA-DTG (WD, Texas), Nov. 1, 2023, 33 pgs.
Defendant Forcepoint LLC's Final Invalidity Contentions, Exhibit 869-H-31, *Webroot, Inc. and Open Text, Inc.* v. *Forcepoint LLC*, No. 6:22-CV-00342-ADA-DTG (WD, Texas), Nov. 1, 2023, 39 pgs.
Defendant Forcepoint LLC's Final Invalidity Contentions, Exhibit 869-H-32, *Webroot, Inc. and Open Text, Inc.* v. *Forcepoint LLC*, No. 6:22-CV-00342-ADA-DTG (WD, Texas), Nov. 1, 2023, 34 pgs.
Defendant Forcepoint LLC's Final Invalidity Contentions, Exhibit 869-H-33, *Webroot, Inc. and Open Text, Inc.* v. *Forcepoint LLC*, No. 6:22-CV-00342-ADA-DTG (WD, Texas), Nov. 1, 2023, 40 pgs.
Defendant Forcepoint LLC's Final Invalidity Contentions, Exhibit 869-H-34, *Webroot, Inc. and Open Text, Inc.* v. *Forcepoint LLC*, No. 6:22-CV-00342-ADA-DTG (WD, Texas), Nov. 1, 2023, 43 pgs.
Defendant Forcepoint LLC's Final Invalidity Contentions, Exhibit 869-H-35, *Webroot, Inc. and Open Text, Inc.* v. *Forcepoint LLC*, No. 6:22-CV-00342-ADA-DTG (WD, Texas), Nov. 1, 2023, 49 pgs.
Defendant Forcepoint LLC's Final Invalidity Contentions, Exhibit 869-H-36, *Webroot, Inc. and Open Text, Inc.* v. *Forcepoint LLC*, No. 6:22-CV-00342-ADA-DTG (WD, Texas), Nov. 1, 2023, 69 pgs.
Defendant's Final Invalidity Contentions, Exhibit 844-A-48, *Webroot, Inc. and Open Text, Inc.* v. *Trend Micro, Inc.*, Case No. 6:22-cv-00239-ADA-DTG, W.D. Tex., Nov. 1, 2023, 100 pgs.
Defendant's Final Invalidity Contentions, Exhibit 844-A-75, *Webroot, Inc. and Open Text, Inc.* v. *Trend Micro, Inc.*, Case No. 6:22-cv-00239-ADA-DTG, W.D. Tex., Nov. 1, 2023, 78 pgs.
Defendant's Final Invalidity Contentions, Exhibit 844-B, *Webroot, Inc. and Open Text, Inc.* v. *Trend Micro, Inc.*, Case No. 6:22-cv-00239-ADA-DTG, W.D. Tex., Nov. 1, 2023, 53 pgs.
Defendant's Final Invalidity Contentions, Exhibit 869-A-24, *Webroot, Inc. and Open Text, Inc.* v. *Trend Micro, Inc.*, Case No. 6:22-cv-00239-ADA-DTG, W.D. Tex., Nov. 1, 2023, 71 pgs.
Defendant's Final Invalidity Contentions, Exhibit 869-A-53, *Webroot, Inc. and Open Text, Inc.* v. *Trend Micro, Inc.*, Case No. 6:22-cv-00239-ADA-DTG, W.D. Tex., Nov. 1, 2023, 64 pgs.
Defendant's Final Invalidity Contentions, Exhibit 869-B, *Webroot, Inc. and Open Text, Inc.* v. *Trend Micro, Inc.*, Case No. 6:22-cv-00239-ADA-DTG, W.D. Tex., Nov. 1, 2023, 65 pgs.

(56) References Cited

OTHER PUBLICATIONS

Defendant Forcepoint LLC's Final Invalidity Contentions, Exhibit 389-A-1, *Webroot, Inc. and Open Text, Inc. v. Forcepoint LLC*, No. 6:22-CV-00342-ADA-DTG (WD, Texas), Nov. 1, 2023, 28 pgs.
Defendant Forcepoint LLC's Final Invalidity Contentions, Exhibit 389-A-2, *Webroot, Inc. and Open Text, Inc. v. Forcepoint LLC*, No. 6:22-CV-00342-ADA-DTG (WD, Texas), Nov. 1, 2023, 44 pgs.
Defendant Forcepoint LLC's Final Invalidity Contentions, Exhibit 389-A-3, *Webroot, Inc. and Open Text, Inc. v. Forcepoint LLC*, No. 6:22-CV-00342-ADA-DTG (WD, Texas), Nov. 1, 2023, 49 pgs.
Defendant Forcepoint LLC's Final Invalidity Contentions, Exhibit 389-A-4, *Webroot, Inc. and Open Text, Inc. v. Forcepoint LLC*, No. 6:22-CV-00342-ADA-DTG (WD, Texas), Nov. 1, 2023, 68 pgs.
Defendant Forcepoint LLC's Final Invalidity Contentions, Exhibit 389-A-5, *Webroot, Inc. and Open Text, Inc. v. Forcepoint LLC*, No. 6:22-CV-00342-ADA-DTG (WD, Texas), Nov. 1, 2023, 25 pgs.
Defendant Forcepoint LLC's Final Invalidity Contentions, Exhibit 389-A-6, *Webroot, Inc. and Open Text, Inc. v. Forcepoint LLC*, No. 6:22-CV-00342-ADA-DTG (WD, Texas), Nov. 1, 2023, 20 pgs.
Defendant Forcepoint LLC's Final Invalidity Contentions, Exhibit 389-A-7, *Webroot, Inc. and Open Text, Inc. v. Forcepoint LLC*, No. 6:22-CV-00342-ADA-DTG (WD, Texas), Nov. 1, 2023, 31 pgs.
Defendant Forcepoint LLC's Final Invalidity Contentions, Exhibit 389-A-8, *Webroot, Inc. and Open Text, Inc. v. Forcepoint LLC*, No. 6:22-CV-00342-ADA-DTG (WD, Texas), Nov. 1, 2023, 86 pgs.
Defendant Forcepoint LLC's Final Invalidity Contentions, Exhibit 389-A-9, *Webroot, Inc. and Open Text, Inc. v. Forcepoint LLC*, No. 6:22-CV-00342-ADA-DTG (WD, Texas), Nov. 1, 2023, 19 pgs.
Defendant Forcepoint LLC's Final Invalidity Contentions, Exhibit 389-A-10, *Webroot, Inc. and Open Text, Inc. v. Forcepoint LLC*, No. 6:22-CV-00342-ADA-DTG (WD, Texas), Nov. 1, 2023, 75 pgs.
Defendant Forcepoint LLC's Final Invalidity Contentions, Exhibit 389-A-11, *Webroot, Inc. and Open Text, Inc. v. Forcepoint LLC*, No. 6:22-CV-00342-ADA-DTG (WD, Texas), Nov. 1, 2023, 28 pgs.
Defendant Forcepoint LLC's Final Invalidity Contentions, Exhibit 389-A-12, *Webroot, Inc. and Open Text, Inc. v. Forcepoint LLC*, No. 6:22-CV-00342-ADA-DTG (WD, Texas), Nov. 1, 2023, 24 pgs.
Defendant Forcepoint LLC's Final Invalidity Contentions, Exhibit 389-A-13, *Webroot, Inc. and Open Text, Inc. v. Forcepoint LLC*, No. 6:22-CV-00342-ADA-DTG (WD, Texas), Nov. 1, 2023, 38 pgs.
Defendant Forcepoint LLC's Final Invalidity Contentions, Exhibit 389-A-14, *Webroot, Inc. and Open Text, Inc. v. Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 389-A-15, *Webroot, Inc. and Open Text, Inc. v. Forcepoint LLC*, No. 6:22-CV-00342-ADA-DTG (WD, Texas), Nov. 1, 2023, 125 pgs.
Defendant Forcepoint LLC's Final Invalidity Contentions, Exhibit 389-A-16, *Webroot, Inc. and Open Text, Inc. v. Forcepoint LLC*, No. 6:22-CV-00342-ADA-DTG (WD, Texas), Nov. 1, 2023, 126 pgs.
Defendant Forcepoint LLC's Final Invalidity Contentions, Exhibit 389-A-17, *Webroot, Inc. and Open Text, Inc. v. Forcepoint LLC*, No. 6:22-CV-00342-ADA-DTG (WD, Texas), Nov. 1, 2023, 60 pgs.
Defendant Forcepoint LLC's Final Invalidity Contentions, Exhibit 389-A-18, *Webroot, Inc. and Open Text, Inc. v. Forcepoint LLC*, No. 6:22-CV-00342-ADA-DTG (WD, Texas), Nov. 1, 2023, 34 pgs.
Defendant Forcepoint LLC's Final Invalidity Contentions, Exhibit 389-A-19, *Webroot, Inc. and Open Text, Inc. v. Forcepoint LLC*, No. 6:22-CV-00342-ADA-DTG (WD, Texas), Nov. 1, 2023, 41 pgs.
Defendant Forcepoint LLC's Final Invalidity Contentions, Exhibit 389-A-20, *Webroot, Inc. and Open Text, Inc. v. Forcepoint LLC*, No. 6:22-CV-00342-ADA-DTG (WD, Texas), Nov. 1, 2023, 34 pgs.
Defendant's Final Invalidity Contentions, Exhibit 250-A-13, *Webroot, Inc. and Open Text, Inc. v. Trend Micro, Inc.*, Case No. 6:22-cv-00239-ADA-DTG, W.D. Tex., Nov. 1, 2023, 75 pgs.
Defendant's Final Invalidity Contentions, Exhibit 250-A-37, *Webroot, Inc. and Open Text, Inc. v. Trend Micro, Inc.*, Case No. 6:22-cv-00239-ADA-DTG, W.D. Tex., Nov. 1, 2023, 40 pgs.
Defendant's Final Invalidity Contentions, Exhibit 250-A-38, *Webroot, Inc. and Open Text, Inc. v. Trend Micro, Inc.*, Case No. 6:22-cv-00239-ADA-DTG, W.D. Tex., Nov. 1, 2023, 31 pgs.
Defendant's Final Invalidity Contentions, Exhibit 250-A-39, *Webroot, Inc. and Open Text, Inc. v. Trend Micro, Inc.*, Case No. 6:22-cv-00239-ADA-DTG, W.D. Tex., Nov. 1, 2023, 49 pgs.
Defendant's Final Invalidity Contentions, Exhibit 250-A-40, *Webroot, Inc. and Open Text, Inc. v. Trend Micro, Inc.*, Case No. 6:22-cv-00239-ADA-DTG, W.D. Tex., Nov. 1, 2023, 50 pgs.
Defendant's Final Invalidity Contentions, Exhibit 250-A-41, *Webroot, Inc. and Open Text, Inc. v. Trend Micro, Inc.*, Case No. 6:22-cv-00239-ADA-DTG, W.D. Tex., Nov. 1, 2023, 40 pgs.
Defendant's Final Invalidity Contentions, Exhibit 250-A-42, *Webroot, Inc. and Open Text, Inc. v. Trend Micro, Inc.*, Case No. 6:22-cv-00239-ADA-DTG, W.D. Tex., Nov. 1, 2023, 36 pgs.
Defendant's Final Invalidity Contentions, Exhibit 389-A-13, *Webroot, Inc. and Open Text, Inc. v. Trend Micro, Inc.*, Case No. 6:22-cv-00239-ADA-DTG, W.D. Tex., Nov. 1, 2023, 77 pgs.
Defendant's Final Invalidity Contentions, Exhibit 389-A-38, *Webroot, Inc. and Open Text, Inc. v. Trend Micro, Inc.*, Case No. 6:22-cv-00239-ADA-DTG, W.D. Tex., Nov. 1, 2023, 37 pgs.
Defendant's Final Invalidity Contentions, Exhibit 389-A-39, *Webroot, Inc. and Open Text, Inc. v. Trend Micro, Inc.*, Case No. 6:22-cv-00239-ADA-DTG, W.D. Tex., Nov. 1, 2023, 21 pgs.
Defendant's Final Invalidity Contentions, Exhibit 389-A-40, *Webroot, Inc. and Open Text, Inc. v. Trend Micro, Inc.*, Case No. 6:22-cv-00239-ADA-DTG, W.D. Tex., Nov. 1, 2023, 52 pgs.
Defendant's Final Invalidity Contentions, Exhibit 389-A-41, *Webroot, Inc. and Open Text, Inc. v. Trend Micro, Inc.*, Case No. 6:22-cv-00239-ADA-DTG, W.D. Tex., Nov. 1, 2023, 42 pgs.
Defendant's Final Invalidity Contentions, Exhibit 389-A-42, *Webroot, Inc. and Open Text, Inc. v. Trend Micro, Inc.*, Case No. 6:22-cv-00239-ADA-DTG, W.D. Tex., Nov. 1, 2023, 33 pgs.
Defendant's Final Invalidity Contentions, Exhibit 389-A-43, *Webroot, Inc. and Open Text, Inc. v. Trend Micro, Inc.*, Case No. 6:22-cv-00239-ADA-DTG, W.D. Tex., Nov. 1, 2023, 31 pgs.
Defendant Sophos Ltd.'s Final Invalidity Contentions, Exhibit 250-A-18, *Webroot, Inc. and Open Text, Inc. v. Sophos Ltd.*, Case No. 6:22-cv-00240-ADA-DTG, W.D. Tex., Nov. 1, 2023, 123 pgs.
Defendant Sophos Ltd.'s Final Invalidity Contentions, Exhibit 250-B, *Webroot, Inc. and Open Text, Inc. v. Sophos Ltd.*, Case No. 6:22-cv-00240-ADA-DTG, W.D. Tex., Nov. 1, 2023, 42 pgs.
Defendant Sophos Ltd.'s Final Invalidity Contentions, Exhibit 389-A-21, *Webroot, Inc. and Open Text, Inc. v. Sophos Ltd.*, Case No. 6:22-cv-00240-ADA-DTG, W.D. Tex., Nov. 1, 2023, 160 pgs.
Defendant Sophos Ltd.'s Final Invalidity Contentions, Exhibit 389-B, *Webroot, Inc. and Open Text, Inc. v. Sophos Ltd.*, Case No. 6:22-cv-00240-ADA-DTG, W.D. Tex., Nov. 1, 2023, 23 pgs.
Defendant Sophos Ltd.'s Final Invalidity Contentions, Exhibit 123-A-1, *Webroot, Inc. and Open Text, Inc. v. Sophos Ltd.*, Case No. 6:22-cv-00240-ADA-DTG, W.D. Tex., Nov. 1, 2023, 54 pgs.
Defendant Sophos Ltd.'s Final Invalidity Contentions, Exhibit 123-A-8, *Webroot, Inc. and Open Text, Inc. v. Sophos Ltd.*, Case No. 6:22-cv-00240-ADA-DTG, W.D. Tex., Nov. 1, 2023, 252 pgs.
Defendant Sophos Ltd.'s Final Invalidity Contentions, Exhibit 123-B, *Webroot, Inc. and Open Text, Inc. v. Sophos Ltd.*, Case No. 6:22-cv-00240-ADA-DTG, W.D. Tex., Nov. 1, 2023, 46 pgs.
Defendant Forcepoint LLC's Final Invalidity Contentions, Exhibit 721-C-1, *Webroot, Inc. and Open Text, Inc. v. Forcepoint LLC*, No. 6:22-CV-00342-ADA-DTG (WD, Texas), Nov. 1, 2023, 49 pgs.
Defendant Forcepoint LLC's Final Invalidity Contentions, Exhibit 721-C-2, *Webroot, Inc. and Open Text, Inc. v. Forcepoint LLC*, No. 6:22-CV-00342-ADA-DTG (WD, Texas), Nov. 1, 2023, 80 pgs.
Defendant Forcepoint LLC's Final Invalidity Contentions, Exhibit 721-C-3, *Webroot, Inc. and Open Text, Inc. v. Forcepoint LLC*, No. 6:22-CV-00342-ADA-DTG (WD, Texas), Nov. 1, 2023, 79 pgs.
Defendant Forcepoint LLC's Final Invalidity Contentions, Exhibit 721-C-4, *Webroot, Inc. and Open Text, Inc. v. Forcepoint LLC*, No. 6:22-CV-00342-ADA-DTG (WD, Texas), Nov. 1, 2023, 97 pgs.
Defendant Forcepoint LLC's Final Invalidity Contentions, Exhibit 721-C-5, *Webroot, Inc. and Open Text, Inc. v. Forcepoint LLC*, No. 6:22-CV-00342-ADA-DTG (WD, Texas), Nov. 1, 2023, 30 pgs.
Defendant Forcepoint LLC's Final Invalidity Contentions, Exhibit 721-C-6, *Webroot, Inc. and Open Text, Inc. v. Forcepoint LLC*, No. 6:22-CV-00342-ADA-DTG (WD, Texas), Nov. 1, 2023, 26 pgs.

(56) References Cited

OTHER PUBLICATIONS

Defendant Forcepoint LLC's Final Invalidity Contentions, Exhibit 721-C-7, *Webroot, Inc. and Open Text, Inc. v. Forcepoint LLC*, No. 6:22-CV-00342-ADA-DTG (WD, Texas), Nov. 1, 2023, 32 pgs.
Defendant Forcepoint LLC's Final Invalidity Contentions, Exhibit 721-C-8, *Webroot, Inc. and Open Text, Inc. v. Forcepoint LLC*, No. 6:22-CV-00342-ADA-DTG (WD, Texas), Nov. 1, 2023, 38 pgs.
Defendant Forcepoint LLC's Final Invalidity Contentions, Exhibit 721-C-9, *Webroot, Inc. and Open Text, Inc. v. Forcepoint LLC*, No. 6:22-CV-00342-ADA-DTG (WD, Texas), Nov. 1, 2023, 40 pgs.
Defendant Forcepoint LLC's Final Invalidity Contentions, Exhibit 721-C-10, *Webroot, Inc. and Open Text, Inc. v. Forcepoint LLC*, No. 6:22-CV-00342-ADA-DTG (WD, Texas), Nov. 1, 2023, 29 pgs.
Defendant Forcepoint LLC's Final Invalidity Contentions, Exhibit 721-C-11, *Webroot, Inc. and Open Text, Inc. v. Forcepoint LLC*, No. 6:22-CV-00342-ADA-DTG (WD, Texas), Nov. 1, 2023, 37 pgs.
Defendant Forcepoint LLC's Final Invalidity Contentions, Exhibit 721-C-12, *Webroot, Inc. and Open Text, Inc. v. Forcepoint LLC*, No. 6:22-CV-00342-ADA-DTG (WD, Texas), Nov. 1, 2023, 34 pgs.
Defendant Forcepoint LLC's Final Invalidity Contentions, Exhibit 721-C-13, *Webroot, Inc. and Open Text, Inc. v. Forcepoint LLC*, No. 6:22-CV-00342-ADA-DTG (WD, Texas), Nov. 1, 2023, 40 pgs.
Defendant Forcepoint LLC's Final Invalidity Contentions, Exhibit 721-C-14, *Webroot, Inc. and Open Text, Inc. v. Forcepoint LLC*, No. 6:22-CV-00342-ADA-DTG (WD, Texas), Nov. 1, 2023, 40 pgs.
Defendant Forcepoint LLC's Final Invalidity Contentions, Exhibit 721-C-15, *Webroot, Inc. and Open Text, Inc. v. Forcepoint LLC*, No. 6:22-CV-00342-ADA-DTG (WD, Texas), Nov. 1, 2023, 33 pgs.
Defendant Forcepoint LLC's Final Invalidity Contentions, Exhibit 721-C-16, *Webroot, Inc. and Open Text, Inc. v. Forcepoint LLC*, No. 6:22-CV-00342-ADA-DTG (WD, Texas), Nov. 1, 2023, 21 pgs.
Defendant Forcepoint LLC's Final Invalidity Contentions, Exhibit 721-C-17, *Webroot, Inc. and Open Text, Inc. v. Forcepoint LLC*, No. 6:22-CV-00342-ADA-DTG (WD, Texas), Nov. 1, 2023, 21 pgs.
Defendant Sophos Ltd.'s Final Invalidity Contentions, Exhibit 721-A-23, *Webroot, Inc. and Open Text, Inc. v. Sophos Ltd.*, Case No. 6:22-cv-00240-ADA-DTG, W.D. Tex., Nov. 1, 2023, 88 pgs.
Defendant Sophos Ltd.'s Final Invalidity Contentions, Exhibit 721-B, *Webroot, Inc. and Open Text, Inc. v. Sophos Ltd.*, Case No. 6:22-cv-00240-ADA-DTG, W.D. Tex., Nov. 1, 2023, 70 pgs.
*AO Kaspersky Lab v. Webroot Inc.*, PTAB Case No. IPR2023-01160, Decision denying institution of Inter Parties Review, Feb. 7, 2024, 27 pgs.
*Trend Micro, Inc. v. Webroot Inc.*, PTAB Case No. IPR2023-01390, Patent Owner Open Text Inc.'s Mandatory Notices Pursuant to 37 CFR § 42.8(b), Sep. 28, 2023, 6 pgs.
*Trend Micro, Inc. v. Webroot Inc.*, PTAB Case No. IPR2023-01390, Patent Owner's Preliminary Response, Dec. 18, 2023, 32 pgs.
*Trend Micro, Inc. v. Webroot Inc.*, PTAB Case No. IPR2023-01390, Exhibit 2001: Declaration Of Matthew L. Boney In Support Of Patent Owner's Preliminary Response, Dec. 18, 2023, 1 pg.
*Trend Micro, Inc. v. Webroot Inc.*, PTAB Case No. IPR2023-01390, Exhibit 2002: Assignment of U.S. Publication No. 2007/0006310 A1 from Paul Piccard to Webroot Software, Inc. executed Jun. 30, 2005 and Corrective Assignment, Dec. 18, 2023, 5 pgs.
*Trend Micro, Inc. v. Webroot Inc.*, PTAB Case No. IPR2023-01390, Exhibit 2003: Paul Piccard LinkedIn, Dec. 18, 2023, 4 pgs.
*Trend Micro, Inc. v. Webroot Inc.*, PTAB Case No. IPR2023-01390, Exhibit 2004: Assignment of U.S. Appl. No. 11/408,146 from Matthew L. Boney to Webroot Software, Inc. executed on Jun. 7, 2006, Dec. 18, 2023, 4 pgs.
*Trend Micro, Inc. v. Webroot Inc.*, PTAB Case No. IPR2023-01390, Exhibit 2005: *Sonrai Memory Ltd. v. Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), Dec. 18, 2023, 7 pgs.
*Trend Micro, Inc. v. Webroot Inc.*, PTAB Case No. IPR2023-01390, Exhibit 2006: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), Dec. 18, 2023, 7 pgs.
*Trend Micro, Inc. v. Webroot Inc.*, PTAB Case No. IPR2023-01390, Exhibit 2007: *Intellectual Ventures I LLC et al. v. Hewlett Packard Enterprise Co.*, No. 6:21-cv-00596- *Trend Micro, Inc. v. Webroot Inc.*, PTAB Case No. IPR2023-01391, Exhibit ADA, Order Denying Hewlett Packard Enterprise Company's Opposed Motion to Stay Pending Resolution of Inter Partes Review, Dkt. 104 (W.D. Tex., Dec. 22, 2022), Dec. 18, 2023, 8 pgs.
*Trend Micro, Inc. v. Webroot Inc.*, PTAB Case No. IPR2023-01390, Exhibit 2008: *Webroot, Inc. and Open Text Inc., v. AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), Dec. 18, 2023, 2 pgs.
*Trend Micro, Inc. v. Webroot Inc.*, PTAB Case No. IPR2023-01390, Exhibit 2009: Dani Kass, "Catching Up On Patent Litigation With Judge Albright" (Law360 Mar. 14, 2023), Dec. 18, 2023, 3 pgs.
*Trend Micro, Inc. v. Webroot Inc.*, PTAB Case No. IPR2023-01390, Exhibit 2010: *Webroot, Inc. and Open Text Inc., v. Trend Micro, Inc et al.*, Case No. 6:22-cv-243-ADA-DTG, Amend the Schedule Order, Dkt. 521 (W.D. Tex. Dec. 7, 2023), Dec. 18, 2023, 4 pgs.
*Trend Micro, Inc. v. Webroot Inc.*, PTAB Case No. IPR2023-01390, Exhibit 2011: *Webroot, Inc. and Open Text Inc., v. Sophos Ltd.*, Case No. 6:22-cv-00240-ADA-DTG, Defendant Sophos Ltd.'s Final Invalidity Contentions (W.D. Tex., Nov. 1, 2022) (excerpted), Dec. 18, 2023, 11 pgs.
*Trend Micro, Inc. v. Webroot Inc.*, PTAB Case No. IPR2023-01390, Exhibit 2012: *Webroot, Inc. and Open Text Inc., v. AO Kaspersky Lab et al.*, Case No. 6:22-cv-243-ADA-DTG, Claim Construction Order, Dkt. 391 (W.D. Tex. Jul. 25, 2023), Dec. 18, 2023, 19 pgs.
*Trend Micro, Inc. v. Webroot Inc.*, PTAB Case No. IPR2023-01390, Exhibit 2013: USPTO Assignment Record for U.S. Pub. No. 2009/0144826 A2 (Prior U.S. Pub. No. 2007/0006310 A1), U.S. Appl. No. 11/171,924, filed Jun. 30, 2005, issued Jun. 4, 2009, Dec. 18, 2023, 2 pgs.
*Trend Micro, Inc. v. Webroot Inc.*, PTAB Case No. IPR2023-01390, Exhibit 2014: USPTO Assignment Record for U.S. Pat. No. 8,201,243, U.S. Pub. No. 2007/0250817 A1, U.S. Appl. No. 11/408,146, filed Apr. 20, 2006, issued Jun. 12, 2012, Dec. 18, 2023, 3 pgs.
*Trend Micro, Inc. v. Webroot Inc.*, PTAB Case No. IPR2023-01390, Decision denying Institution of Inter Partes Review, Feb. 17, 2024, 9 pgs.
*Trend Micro, Inc. v. Webroot Inc.*, PTAB Case No. IPR2023-01391, Patent Owner Open Text Inc.'s Mandatory Notices Pursuant to 37 CFR § 42.8(b), Sep. 28, 2023, 6 pgs.
*Trend Micro, Inc. v. Webroot Inc.*, PTAB Case No. IPR2023-01391, Patent Owner's Preliminary Response, Dec. 18, 2023, 32 pgs.
*Trend Micro, Inc. v. Webroot Inc.*, PTAB Case No. IPR2023-01391, Exhibit 2001: Declaration Of Matthew L. Boney In Support Of Patent Owner's Preliminary Response, Dec. 18, 2023, 1 pg.
*Trend Micro, Inc. v. Webroot Inc.*, PTAB Case No. IPR2023-01391, Exhibit 2002: Assignment of U.S. Publication No. 2007/0006310 A1 from Paul Piccard to Webroot Software, Inc. executed Jun. 30, 2005 and Corrective Assignment, Dec. 18, 2023, 5 pgs.
*Trend Micro, Inc. v. Webroot Inc.*, PTAB Case No. IPR2023-01391, Exhibit 2003: Paul Piccard LinkedIn, Dec. 18, 2023, 4 pgs.
*Trend Micro, Inc. v. Webroot Inc.*, PTAB Case No. IPR2023-01391, Exhibit 2004: Assignment of U.S. Appl. No. 13/490,294 from Matthew L. Boney to Webroot Software, Inc. executed on Jun. 7, 2006, Dec. 18, 2023, 4 pgs.
*Trend Micro, Inc. v. Webroot Inc.*, PTAB Case No. IPR2023-01391, Exhibit 2005: *Sonrai Memory Ltd. v. Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), Dec. 18, 2023, 7 pgs.
*Trend Micro, Inc. v. Webroot Inc.*, PTAB Case No. IPR2023-01391, Exhibit 2006: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), Dec. 18, 2023, 7 pgs.

(56) References Cited

OTHER PUBLICATIONS

*Trend Micro, Inc.* v. *Webroot Inc.*, PTAB Case No. IPR2023-01391, Exhibit 2007: *Intellectual Ventures I LLC et al.* v. *Hewlett Packard Enterprise Co.*, No. 6:21-cv-00596- *Trend Micro, Inc.* v. *Webroot Inc.*, PTAB Case No. IPR2023-01391, Exhibit ADA, Order Denying Hewlett Packard Enterprise Company's Opposed Motion to Stay Pending Resolution of Inter Partes Review, Dkt. 104 (W.D. Tex., Dec. 22, 2022), Dec. 18, 2023, 8 pgs.
*Trend Micro, Inc.* v. *Webroot Inc.*, PTAB Case No. IPR2023-01391, Exhibit 2008: *Webroot, Inc. and Open Text Inc.,* v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), Dec. 18, 2023, 2 pgs.
*Trend Micro, Inc.* v. *Webroot Inc.*, PTAB Case No. IPR2023-01391, Exhibit 2009: Dani Kass, "Catching Up On Patent Litigation With Judge Albright" (Law360 Mar. 14, 2023), Dec. 18, 2023, 3 pgs.
*Trend Micro, Inc.* v. *Webroot Inc.*, PTAB Case No. IPR2023-01391, Exhibit 2010: *Webroot, Inc. and Open Text Inc.,* v. *Trend Micro, Inc et al.*, Case No. 6:22-cv-243-ADA-DTG, Amend the Schedule Order, Dkt. 521 (W.D. Tex. Dec. 7, 2023), Dec. 18, 2023, 4 pgs.
*Trend Micro, Inc.* v. *Webroot Inc.*, PTAB Case No. IPR2023-01391, Exhibit 2011: *Webroot, Inc. and Open Text Inc.,* v. *Sophos Ltd.*, Case No. 6:22-cv-00240-ADA-DTG, Defendant Sophos Ltd.'s Final Invalidity Contentions (W.D. Tex., Nov. 1, 2022) (excerpted), Dec. 18, 2023, 11 pgs.
*Trend Micro, Inc.* v. *Webroot Inc.*, PTAB Case No. IPR2023-01391, Exhibit 2012: *Webroot, Inc. and Open Text Inc.,* v. *AO Kaspersky Lab et al.*, Case No. 6:22-cv-243-ADA-DTG, Claim Construction Order, Dkt. 391 (W.D. Tex. Jul. 25, 2023), Dec. 18, 2023, 19 pgs.
*Trend Micro, Inc.* v. *Webroot Inc.*, PTAB Case No. IPR2023-01391, Exhibit 2013: USPTO Assignment Record for U.S. Pub. No. 2009/0144826 A2 (Prior U.S. Pub. No. 2007/0006310 A1), U.S. Appl. No. 11/171,924, filed Jun. 30, 2005, issued Jun. 4, 2009, Dec. 18, 2023, 2 pgs.
*Trend Micro, Inc.* v. *Webroot Inc.*, PTAB Case No. IPR2023-01391, Exhibit 2014: USPTO Assignment Record for U.S. Pat. No. 8,719,932, U.S. Pub. No. 2012/0246722 A1, U.S. Appl. No. 13/490,294, filed Jun. 26, 2012, issued May 6, 2014, Dec. 18, 2023, 3 pgs.
*Trend Micro, Inc.* v. *Webroot Inc.*, PTAB Case No. IPR2023-01391, Decision denying Institution of Inter Partes Review, Feb. 17, 2024, 9 pgs.
*Trend Micro, Inc.* v. *Webroot Inc.*, PTAB Case No. IPR2023-01380, Patent Owner Open Text Inc.'s Mandatory Notices pursuant to 37 CFR § 42.8(b), Sep. 26, 2023, 9 pgs.
*Trend Micro, Inc.* v. *Webroot Inc.*, PTAB Case No. IPR2023-01380, Notice of Filing Date Accorded to Petition and Time for filing Patent Owner Preliminary Response, Sep. 26, 2023, 6 pgs.
*Trend Micro, Inc.* v. *Webroot Inc.*, PTAB Case No. IPR2023-01380, Patent Owner's Preliminary Response, Dec. 21, 2023, 75 pgs.
*Trend Micro, Inc.* v. *Webroot Inc.*, PTAB Case No. IPR2023-01380, Exhibit 2001: Declaration Of Sam Malek, Ph.D., Dec. 21, 2023, 55 pgs.
*Trend Micro, Inc.* v. *Webroot Inc.*, PTAB Case No. IPR2023-01380, Exhibit 2002: Curriculum Vitae of Sam Malek, Ph.D., Feb. 14, 2023, 36 pgs.
*Trend Micro, Inc.* v. *Webroot Inc.*, PTAB Case No. IPR2023-01380, Exhibit 2003: *Webroot, Inc., Open Text Inc.,* v. *AO Kaspersky Lab et al.*, Case No. 6:22-cv-00243-ADA-DTG, Order Granting Amended Scheduling Order, Dkt. 521 (W.D. Tex., Dec. 7, 2023), 4 pgs.
*Trend Micro, Inc.* v. *Webroot Inc.*, PTAB Case No. IPR2023-01380, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Trend Micro, Inc.* v. *Webroot Inc.*, PTAB Case No. IPR2023-01380, Exhibit 2005: *mCom IP, LLC* v. *Cisco Systems, Inc.*, Case No. 6:22-cv-00261- ADA, Order Denying Defendant's Motion to Stay Pending Inter Partes Review, Dkt. 42 (W.D. Tex., Oct. 20, 2022), 7 pgs.

*Trend Micro, Inc.* v. *Webroot Inc.*, PTAB Case No. IPR2023-01380, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Trend Micro, Inc.* v. *Webroot Inc.*, PTAB Case No. IPR2023-01380, Exhibit 2007: *Webroot, Inc. and Open Text Inc.,* v. *AO Kaspersky Lab et al.*, Case No. 6:22-cv-243-ADA-DTG, Claim Construction Order, Dkt. 236 (W.D. Tex., Mar. 16, 2023), 20 pgs.
*Trend Micro, Inc.* v. *Webroot Inc.*, PTAB Case No. IPR2023-01380, Exhibit 2008: Dani Kass, "Catching Up On Patent Litigation With Judge Albright" (Law360 Mar. 14, 2023) at https://www.law360.com/pulse/articles/1582438/print?section= pulse/courts, 3 pgs.
*Trend Micro, Inc.* v. *Webroot Inc.*, PTAB Case No. IPR2023-01380, Exhibit 2009: *Webroot, Inc. and Open Text Inc.,* v. *AO Kaspersky Lab et al.*, Case No. 6:22-cv-243-ADA-DTG, Claim Construction Order, Dkt. 391 (W.D. Tex. Jul. 25, 2023), 19 pgs.
*Trend Micro, Inc.* v. *Webroot Inc.*, PTAB Case No. IPR2023-01380, Exhibit 2010: *Webroot, Inc. and Open Text Inc.,* v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.
*Trend Micro, Inc.* v. *Webroot Inc.*, PTAB Case No. IPR2023-01380, Exhibit 2011: *Webroot, Inc. and Open Text Inc.,* v. *Trend Micro, Inc.*, Case No. 6:22-cv-00239-ADA, Complaint for Patent Infringement, Dkt. 1 (W.D. Tex., Mar. 4, 2022), 6 pgs.
*Trend Micro, Inc.* v. *Webroot Inc.*, PTAB Case No. IPR2023-01380, Exhibit 2012: *Webroot, Inc. and Open Text Inc.,* v. *AO Kaspersky Lab*, Case No. 6:22- cv-00243-ADA-DTG, Defendant's Preliminary Invalidity Contentions Appendix C (W.D. Tex., Sep. 14, 2022), 4 pgs.
*Trend Micro, Inc.* v. *Webroot Inc.*, PTAB Case No. IPR2023-01380, Exhibit 2013: *Webroot, Inc. and Open Text Inc.,* v. *Sophos Ltd.*, Case No. 6:22- cv-00240-ADA-DTG, Defendant Sophos Ltd.'s Final Invalidity Contentions (W.D. Tex., Nov. 1, 2023) (excerpted), 4 pgs.
*Trend Micro, Inc.* v. *Webroot Inc.*, PTAB Case No. IPR2023-01380, Exhibit 2014: *Webroot, Inc. and Open Text Inc.,* v. *Trend Micro Inc.*, Case No. 6:22-cv-00239-ADA-DTG,: Defendant's Final Invalidity Contentions (W.D. Tex., Nov. 1, 2023) (excerpted), 7 pgs.
*Trend Micro, Inc.* v. *Webroot Inc.*, PTAB Case No. IPR2023-01380, Joint Motion to Terminate Proceedings, Feb. 19, 2024, 16 pgs.
*Trend Micro, Inc.* v. *Webroot Inc.*, PTAB Case No. IPR2023-01380, Joint Request to Treat Agreement as Confidential Information, Feb. 19, 2024, 7 pgs.
*Trend Micro, Inc.* v. *Webroot Inc.*, PTAB Case No. IPR2023-01380, Decision—Settlement prior to Institution of Trial, Feb. 28, 2024, 5 pgs.
*Trend Micro, Inc.* v. *Webroot Inc.*, PTAB Case No. IPR2023-01389, Notice of Filing Date Accorded to Petition and Time for Filing Patent Owner Preliminary Response, Sep. 26, 2023, 6 pgs.
*Trend Micro, Inc.* v. *Webroot Inc.*, PTAB Case No. IPR2023-01389, Patent Owner Open Text Inc.'s Mandatory Notices Pursuant to 37 CFR § 42.8(b), Sep. 28, 2023,.
*Trend Micro, Inc.* v. *Webroot Inc.*, PTAB Case No. IPR2023-01389, Patent Owner's Preliminary Response, Dec. 22, 2023, 72 pgs.
*Trend Micro, Inc.* v. *Webroot Inc.*, PTAB Case No. IPR2023-01389, Exhibit 2001: Declaration of Ron Schnell, 26 pgs.
*Trend Micro, Inc.* v. *Webroot Inc.*, PTAB Case No. IPR2023-01389, Exhibit 2002: Curriculum Vitae of Ron Schnell, 5 pgs.
*Trend Micro, Inc.* v. *Webroot Inc.*, PTAB Case No. IPR2023-01389, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 5 pgs.
*Trend Micro, Inc.* v. *Webroot Inc.*, PTAB Case No. IPR2023-01389, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Trend Micro, Inc.* v. *Webroot Inc.*, PTAB Case No. IPR2023-01389, Exhibit 2005: *Intellectual Ventures I LLC et al.* v. *Hewlett Packard*

(56) References Cited

OTHER PUBLICATIONS

*Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Trend Micro, Inc.* v. *Webroot Inc.*, PTAB Case No. IPR2023-01389, Exhibit 2006: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.

*Trend Micro, Inc.* v. *Webroot Inc.*, PTAB Case No. IPR2023-01389, Exhibit 2007: Dani Kass, "Catching Up On Patent Litigation With Judge Albright" (Law360 Mar. 14, 2023), 3 pgs.

*Trend Micro, Inc.* v. *Webroot Inc.*, PTAB Case No. IPR2023-01389, Exhibit 2008: *Webroot, Inc. and Open Text Inc.*, v. *Trend Micro, Inc et al.*, Case No. 6:22-cv-243-ADA-DTG, Amend the Schedule Order, Dkt. 521 (W.D. Tex. Dec. 7, 2023), 4 pgs.

*Trend Micro, Inc.* v. *Webroot Inc.*, PTAB Case No. IPR2023-01389, Exhibit 2009: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2023), 19 pgs.

*Trend Micro, Inc.* v. *Webroot Inc.*, PTAB Case No. IPR2023-01389, Exhibit 2010: *Webroot, Inc. and Open Text Inc.*, v. *Sophos Ltd.*, Case No. 6:22-cv-240-ADA-DTG, Defendant Sophos Ltd.'s Final Invalidity Contentions—Claim Chart 505-A-21, Garfinkel, (W.D. Tex. Nov. 1, 2023) (excerpted), 30 pgs.

*Trend Micro, Inc.* v. *Webroot Inc.*, PTAB Case No. IPR2023-01389, Exhibit 2011: *Webroot, Inc. and Open Text Inc.*, v. *Sophos Ltd.*, Case No. 6:22-cv-240-ADA-DTG, Defendant Sophos Ltd.'s Final Invalidity Contentions—Claim Chart 505-A-22 ("Hoglund") (W.D. Tex. Nov. 1, 2023) (excerpted), 32 pgs.

*Trend Micro, Inc.* v. *Webroot Inc.*, PTAB Case No. IPR2023-01389, Exhibit 2012: Wayback Machine re symposium website address, https://web.archive.org/web/20230000000000*/https:/www.ndss-symposium.org/ndss2003/, 3 pgs.

*Trend Micro, Inc.* v. *Webroot Inc.*, PTAB Case No. IPR2023-01389, Exhibit 2013: Network and Distributed System Security Symposium conference proceedings—2003 [electronic resource]: NDSS '03 Symposium; https://science-catalogue.canada.ca/record=b2011094~S6, 3 pgs.

*Trend Micro, Inc.* v. *Webroot Inc.*, PTAB Case No. IPR2023-01389, Order: Conduct of the Proceeding, Jan. 29, 2024, 5 pgs.

*Trend Micro, Inc.* v. *Webroot Inc.*, PTAB Case No. IPR2023-01389, Exhibit 3001: Jan. 29, 2024 Joint email re: Petitioner's Request for Leave to file Appendices Missing from Dr. Yee's Declaration, 2 pgs.

*Trend Micro, Inc.* v. *Webroot Inc.*, PTAB Case No. IPR2023-01389, Joint Motion to Terminate Proceedings, Feb. 19, 2024, 9 pgs.

*Trend Micro, Inc.* v. *Webroot Inc.*, PTAB Case No. IPR2023-01389, Joint Request to Treat Agreement as Confidential Information, Feb. 19, 2024, 6 pgs.

*Trend Micro, Inc.* v. *Webroot Inc.*, PTAB Case No. IPR2023-01389, Decision—Settlement prior to Institution of Trial, Feb. 28, 2024, 5 pgs.

*Trend Micro, Inc.* v. *Webroot Inc.*, PTAB Case No. IPR2023-01392, Notice of Accepting Corrected Petition, Sep. 26, 2023, 2 pgs.

*Trend Micro, Inc.* v. *Webroot Inc.*, PTAB Case No. IPR2023-01392, Patent Owner Open Text Inc.'s Mandatory Notices Pursuant to 37 CFR § 42.8(b), Sep. 28, 2023, 10 pgs.

*Trend Micro, Inc.* v. *Webroot Inc.*, PTAB Case No. IPR2023-01392, Corrected Petition for Inter Partes Review of U.S. Pat. No. 8,181,244, Oct. 26, 2023, 87 pgs.

*Trend Micro, Inc.* v. *Webroot Inc.*, PTAB Case No. IPR2023-01392, Exhibit 1020: Redlined Petition for Inter Partes Review of U.S. Pat. No. 8,181,244, Oct. 26, 23, 94 pgs.

*Trend Micro, Inc.* v. *Webroot Inc.*, PTAB Case No. IPR2023-01392, Patent Owner's Preliminary Response, Dec. 18, 2023, 32 pgs.

*Trend Micro, Inc.* v. *Webroot Inc.*, PTAB Case No. IPR2023-01392, Exhibit 2001: Declaration Of Matthew L. Boney In Support Of Patent Owner's Preliminary Response, 1 pg.

*Trend Micro, Inc.* v. *Webroot Inc.*, PTAB Case No. IPR2023-01392, Exhibit 2002: Assignment of U.S. Patent Publication No. 2007/0006310 A1 from Paul Piccard to Webroot Software, Inc. executed Jun. 30, 2005 and Corrective Assignment, 5 pgs.

*Trend Micro, Inc.* v. *Webroot Inc.*, PTAB Case No. IPR2023-01392, Exhibit 2003: Paul Piccard LinkedIn, 4 pgs.

*Trend Micro, Inc.* v. *Webroot Inc.*, PTAB Case No. IPR2023-01392, Exhibit 2004: Assignment of U.S. Appl. No. 11/408,145 from Matthew L. Boney to Webroot Software, Inc. executed on Jun. 7, 2006, 4 pgs.

*Trend Micro, Inc.* v. *Webroot Inc.*, PTAB Case No. IPR2023-01392, Exhibit 2005: USPTO Assignment Record for U.S. Pub. No. 2009/0144826 A2 (Prior U.S. Pub. No. 2007/0006310 A1), U.S. Appl. No. 11/171,924, filed Jun. 30, 2005, issued Jun. 4, 2009, 2 pgs.

*Trend Micro, Inc.* v. *Webroot Inc.*, PTAB Case No. IPR2023-01392, Exhibit 2006: USPTO Assignment Record for U.S. Pat. No. 8,181,244, U.S. Pub. No. 2007/0250928 A1, U.S. Appl. No. 11/408,145, filed Apr. 20, 2006, issued May 15, 2012, 3 pgs.

*Trend Micro, Inc.* v. *Webroot Inc.*, PTAB Case No. IPR2023-01392, Exhibit 2007: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Trend Micro, Inc.* v. *Webroot Inc.*, PTAB Case No. IPR2023-01392, Exhibit 2008: *mCom IP, LLC* v. *Cisco Systems, Inc.*, Case No. 6:22-cv-00261- ADA, Order Denying Defendant's Motion to Stay Pending Inter Partes Review, Dkt. 42 (W.D. Tex., Oct. 20, 2022), 7 pgs.

*Trend Micro, Inc.* v. *Webroot Inc.*, PTAB Case No. IPR2023-01392, Exhibit 2009: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Trend Micro, Inc.* v. *Webroot Inc.*, PTAB Case No. IPR2023-01392, Exhibit 2010: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.

*Trend Micro, Inc.* v. *Webroot Inc.*, PTAB Case No. IPR2023-01392, Exhibit 2011: Dani Kass, "Catching Up On Patent Litigation With Judge Albright" (Law360 Mar. 14, 2023), 3 pgs.

*Trend Micro, Inc.* v. *Webroot Inc.*, PTAB Case No. IPR2023-01392, Exhibit 2012: *Webroot, Inc. and Open Text Inc.*, v. *Trend Micro, Inc et al.*, Case No. 6:22-cv-243-ADA-DTG, Amend the Schedule Order, Dkt. 521 (W.D. Tex. Dec. 7, 2023), 4 pgs.

*Trend Micro, Inc.* v. *Webroot Inc.*, PTAB Case No. IPR2023-01392, Exhibit 2013: *Webroot, Inc. and Open Text Inc.*, v. *Sophos Ltd.*, Case No. 6:22-cv-00240-ADA-DTG, Defendant Sophos Ltd.'s Final Invalidity Contentions (W.D. Tex., Nov. 1, 2022) (excerpted), 16 pgs.

*Trend Micro, Inc.* v. *Webroot Inc.*, PTAB Case No. IPR2023-01392, Exhibit 2014: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2023), 19 pgs.

*Trend Micro, Inc.* v. *Webroot Inc.*, PTAB Case No. IPR2023-01392, Joint Request to Treat Agreement as Confidential Information, Feb. 19, 2024, Feb. 19, 2024, 7 pgs.

*Trend Micro, Inc.* v. *Webroot Inc.*, PTAB Case No. IPR2023-01392, Joint Motion to Terminate Proceedings, Feb. 19, 2024, 9 pgs.

*Trend Micro, Inc.* v. *Webroot Inc.*, PTAB Case No. IPR2023-01392, Decision—Settlement prior to Institution of Trial, Feb. 28, 2024, 5 pgs.

*Trend Micro, Inc.* v. *Webroot Inc.*, PTAB Case No. IPR2024-00106, Patent Owner's Opposition to Petitioner's Motion for Joinder, Dec. 8, 2023, 18 pgs.

*Trend Micro, Inc.* v. *Webroot Inc.*, PTAB Case No. IPR2024-00106, Exhibit 2001: *Webroot, Inc. and Open Text, Inc.'s* v. *Trend Micro Inc.*, Case No. 6:22- CV-0239-ADA-DTG, Defendants' Preliminary Invalidity Contentions, dated Sep. 13, 2022 (W.D. Tex), 125 pgs.

*Trend Micro, Inc.* v. *Webroot Inc.*, PTAB Case No. IPR2024-00106, Exhibit 2002: *Webroot, Inc. and Open Text, Inc.'s* v. *Trend Micro*

(56) References Cited

OTHER PUBLICATIONS

Inc., Case No. 6:22-ccv-0239-ADA-DTG, Defendants' Final Invalidity Contentions, dated Nov. 1, 2023 (W.D. Tex), 168 pgs.
Trend Micro, Inc. v. Webroot Inc., PTAB Case No. IPR2024-00106, Exhibit 2003: Webroot, Inc. and Open Text, Inc.'s v. Trend Micro Inc., Case No. 6:22-cv-0239-ADA-DTG, Order to Amend the Scheduling Order, Dkt. 521, dated Dec. 7, 2023 (W.D. Tex), 4 pgs.
Trend Micro, Inc. v. Webroot Inc., PTAB Case No. IPR2024-00106, Joint Request to Treat Agreement as Business Confidential Information, Feb. 19, 2024, 6 pgs.
Trend Micro, Inc. v. Webroot Inc., PTAB Case No. IPR2024-00106, Joint Motion to Terminate Proceedings, Feb. 19, 2024, 8 pgs.
Trend Micro, Inc. v. Webroot Inc., PTAB Case No. IPR2024-00106, Patent Owner's Preliminary Response, Feb. 22, 2024, 19 pgs.
Trend Micro, Inc. v. Webroot Inc., PTAB Case No. IPR2024-00106, Exhibit 2004: Email from B. Hansen to Trials@USPTO.gov, cc: B. Eutermoser et al. re Request for permission to file joint motions to terminate five IPRs: IPR 2023-01380, IPR 2023-01389, IPR 2023-01392, IPR2023-01459, and IPR2024-00106, dated Feb. 15, 2024, 42 pgs.
Trend Micro, Inc. v. Webroot Inc., PTAB Case No. IPR2024-00106, Exhibit 2005: Email from Trials@USPTO.gov to Bob Hansen et al. re Authorized to file joint motion to terminate and request to file settlement agreement as CBI, dated Feb. 16, 2024, 2 pgs.
Trend Micro, Inc. v. Webroot Inc., PTAB Case No. IPR2024-00106, Exhibit 2006: Trend Micro, Inc. v. Open Text, Inc., IPR2024-00106, Joint Motion to Terminate Proceedings (P.T.A.B. Feb. 19, 2024), 8 pgs.
Trend Micro, Inc. v. Webroot Inc., PTAB Case No. IPR2024-00106, Decision—Settlement prior to Institution of Trial, Feb. 28, 2024, 5 pgs.
Roberts, Paul, "Big Picture Security—A Multiplicity of Threats Yields an Ever-Expanding Variety of Defenses Spewing Gobs of Security Data Security Event," InfoWorld, vol. 26, Issue 44, Nov. 1, 2004, 6 pgs.
Pappas, Vasilis, et al., Transparent ROP Exploit Mitigation Using Indirect Branch Tracing, Proceedings of the 22nd USENIX Security Symposium, Washington, DC, USENIX Association, Columbia University, Aug. 14-16, 2013, pp. 447-462.
Cowan, Crispan, et al., Stackguard: Automatic Adaptive Detection and Prevention of Buffer-Overflow Attacks, 7th USENIX Security Symposium, San Antonio, TX, USENIX Association, Jan. 26-29, 1998, 16 pgs.
Asaka, Midori, et al., Information Gathering with Mobile Agents for an Intrusion Detection System, Systems and Computers in Japan, vol. 30, No. 2, 1999, 7 pgs.
Asaka, Midori, et al., Remote Attack Detection Method in IDA: MLSI-Based Intrusion Detection with Discriminant Analysis, Electronics and Communications in Japan, Part 1, vol. 86, No. 4, 2003, pp. 50-62, Wiley Periodicals, Inc. (translated from Denshi Joho Tshushin Gakki Ronbunshi, vol. J85-B, No. 1, Jan. 2002, pp. 60-74).
Kaplan, Yariv, API Spying Techniques for Windows 9x, NT and 2000, The Wayback Machine at https://web.archive.org/web/20001009011848/http://www.inte . . . , Oct. 9, 2000, 11 pgs.
Kephart, Jeffrey, et al., "An Immune System for Cyberspace," 1997 IEEE Int'l Conf. on Systems, Man, and Cybernetics, Computational Cybernetics and Simulation 1, vol. 1, 1997, pp. 879-884.
King, Samuel, et al., Enriching intrusions alerts through multi-host causality, Proceedings of the Network and Distributed System Security Symposium, 2005, San Diego, California, Jan. 1, 2005, 12 pgs.
Li, Zhenmin, et al., UCLog: A Unified, Correlated Logging Architecture for Intrusion Detection, In'tl Conf. on Telecomm. Sys. Modeling & Analysis, Jan. 2004, 15 pgs.
Lunt, Teresa F., et al., A Real-Time Intrusion-Detection Expert System, SRI International, Menlo Park, CA, Feb. 28, 1992, 166 pgs.
PrevX Home launches Worlds first free consumer intrusion prevention system, M2 Presswire, M2 Communications Ltd., Jun. 16, 2004, 2 pgs.
PrevX Home v20 Shuts the Door on the Unknown and Unwanted Internet Security Threats Upgrade to First In, Business Wire, Nov. 5, 2004, 2 pgs.
Yu, Dong and FRINCKE, Deborah, Alert Confidence Fusion in Intrusion Detection Systems with Extended Dempster-Shafer Theory, Proceedings of the 43rd Annual Southeast Regional Conference, vol. 2, 2005, 6 pgs.
Proventia Desktop User Guide, Version 8.0, Internet Security Systems, Inc., Atlanta, GA, Mar. 24, 2005, 132 pgs.
Feng, Henry H., et al., "Anomaly Detection Using Call Stack Information," 2003 Symposium on Security and Privacy, Berkeley, CA, 003, pp. 62-75, available at https://ieeexplore.ieee.org/document/1199328.
Kruegel, Christopher, et al., Bayesian Event Classification for Intrusion Detection, 19th Annual Computer Security Applications Conference 2003, pp. 14-23.
Yurcik, William, et al., UCLog+: A Security Data Management System for Correlating Alerts, Incidents, and Raw Data From Remote Logs, Cornell University, arXiv:cs/0607111, Jul. 25, 2006, 10 pgs.
Publications on Data Mining/Machine Learning on Systems, UCSD Operating Systems Research Group, The Wayback Machine at https://web.archive.org/web/20100907170802/http://opera.ucsd.edu:80/pub_sysmining.html, 1 pg.
Nachenberg, Carey, Behavior Blocking: The Next Step in Anti-Virus Protection, SecurityFocus, at http://ww.securityfocus.com/print/infocus/1557, Mar. 19, 2002, 7 pgs.
Ranum, Marcos J., Tales From The Early Days of the Firewall Presentation, 33 pgs.
Moffie, Micha, and Kaeli, David, "ASM: Application Security Monitor", ACM SIGARCH Computer Architecture News, Dec. 2005, pp. 21-26.
Chari, Suresh N., and Cheng, Pau-Chen, "BlueBox: A policy-driven, host-based intrusion detection system," ACM Transactions on Information and System Security, vol. 6, No. 2, May 2003, pp. 173-200.
Vasudevan, Amit, and Yerraballi, Ramesh, "SPIKE: Engineering Malware Analysis Tools using Unobtrusive Binary-Instrumentation", Proceedings of the 29th Australasian Computer Science Conference, Tasmania, Australia, vol. 48, Jan. 2006, 10 pgs.
Rabek, Jesse C., et al., "Detection of injected, dynamically generated, and obfuscated malicious code", Proceedings of the 2003 ACM workshop on Rapid Malcode, 2003, pp. 76-82.
Kruegel, Christopher, et al., Intrusion Detection and Correlation: Challenges and Solutions, Springer, ISBN: 978-0-387-23398-7, 2005, 87 pgs.
Pfleeger, Charles P., and Pfleeger, Shari Lawrence, Security in Computing, 4th Edition, Prentice Hall, Jan. 2006, 237 pgs.
Abrams, Lawrence, Using Blacklight to detect and remove Rootkits from your computer, May 18, 2006, F-Secure, 8 pgs.
Adelstein, Frank, Stillerman, Matt, and Kozen, Dexter, Malicious Code Detection for Open Firmware, Proceedings of the 18th Annual Computer Security Applications Conference, IEEE, Jun. 2002, 10 pgs.
Chow, Sherman, et al., A generic anti-spyware solution by access control list at kernel level, The Journal of Systems and Software 75 (www.sciencedirect.com) available Jul. 15, 2004, pp. 227-234.
The Cure—F-Secure Blacklight (Beta Release), Aug. 2, 2005, The Wayback Machine at https://web.archive.org.web/20050802004302/http://www.f-secure.com:80/blacklight/cure.shtml, F-Secure, 2 pgs.
Grizzard, Jullian, On a μ-Kernel Based System Architecture Enabling Recovery from Rootkits, Proceedings of the First IEEE International Workshop on Critical Infrastructure Protection, IEEE, (07695-2426-5/05) Nov. 2005, 9 pgs.
Iglio, Pietro, TrustedBox: a Kernel-Level Integrity Checker, 15th Annual Computer Security Applications Conference, Phoenix, AZ, IEEE, Dec. 6-10, 1999, 20 pgs.
Kruegel, Christopher et al., Detecting Kernel-Level Rootkits Through Binary Analysis, 20th Annual Computer Security Applications Conference, Tucson, AZ, IEEE, Dec. 6-10, 2004, 18 pgs.
Levine, John G., et al., A Methodology to Characterize Kernel Level Rootkit Exploits that Overwrite the System Call Table, IEEE SoutheastCon, 2004, Proceedings., Greensboro, NC, pp. 25-31.

(56) References Cited

OTHER PUBLICATIONS

Levine, John, et al., Application of a Methodology to Characterize Rootkits Retrieved from Honeynets, Proceedings of the 2004 IEEE Workshop on Information Assurance, U.S. Military Academy, West Point, NY, Jun. 10-11, 2004, pp. 15-21.
Levine, John G., et al., Detecting and Categorizing Kernel-Level Rootkits to Aid Future Detection, IEEE Security & Privacy, IEEE (www.computer.org/security/), Feb. 2006, pp. 24-32.
Liang, Zhenkai, et al., Isolated Program Execution: An Application Transparent Approach for Executing Untrusted Programs, Proceedings of the 19$^{th}$ Annual Computer Security Applications Conference, 2003, IEEE, 10 pgs.
Mulliner, Collin, et al., Using Labeling to Prevent Cross-Service Attacks Against Smart Phones, 3rd International Conference, Detections of Intrusions and Malware & Vulnerability Assessment, Berlin, Germany, Jul. 13-14, 2006, pp. 91-108.
Munson, John C. and WIMER, Scott, Watcher: The Missing Piece of the Security Puzzle, 17$^{th}$ Annual Computer Security Applications Conference, New Orleans, LA, IEEE, Dec. 10-14, 2001, 17 pgs.
Provos, Niels, Improving Host Security with System Call Policies, Proceedings of the 12$^{th}$ USENIX Security Symposium, The USENIX Association (www.usenix.org), Aug. 4-8, 2003, pp. 257-271.
Quynh, Nguyen Anh, and Takefui, Yoshiyasu, A Real-time Integrity Monitor for Xen Virtual Machine, International Conference on Networking and Services, Jul. 2006, Silicon Valley, CA, IEEE, 20 pgs.
Shi, Weidong, et al., An Intrusion-Tolerant and Self-Recoverable Network Service System Using A Security Enhanced Chip Multiprocessor, Second International Conference on Autonomic Computing, Seattle, WA, IEEE, Jun. 13-16, 2005, 12 pgs.
Wang, Yi-Min, et al., Detecting Stealth Software with Strider GhostBuster, International Conference on Dependable Systems and Networks, Yokohama, Japan, IEEE, 2005, pp. 368-377.
Wright, Chris, et al., Linux Security Modules: General Security Support for the Linux Kernel, 11$^{th}$ USENIX Security Symposium, San Francisco, CA, Aug. 5-9, 2002, 21 pgs.
Xu, Haizhi, Du, Wenliang, and Chapin, Steve J., Detecting Exploit Code Execution in Loadable Kernel Modules, 20$^{th}$ Annual Computer Security Applications Conference, Tucson, AZ, IEEE, Dec. 6-10, 2004, 18 pgs.
Zhou, Jingyu and Vigna, Giovanni, Detecting Attacks That Exploit Application—Logic Errors Through Application-Level Auditing, 20$^{th}$ Annual Computer Security Applications Conference, Tucson, AZ, IEEE, Dec. 6-10, 2004, 19 pgs.
Ren, Jiangchun, Dai, Kui, and Wang, Zhiying, Trust-Enhanced Alteration Scenario For Universal Computer, 11$^{th}$ International Symposium Pacific Rim Dependable Computing, Changsha, Hunan, China, IEEE, Dec. 12-14, 2005, 10 pgs.
Schmid, Matthew, Hill, Frank, and Ghosh, Anup K., Protecting Data from Malicious Software, Proceedings of the 18$^{th}$ Annual Computer Security Applications Conference, IEEE, Dec. 2002, 10 pgs.
Russinovich, Mark, Monitoring Registry Activity During the Boot Process, The Wayback Machine at https://web.archive.org/web/20050622032630/http://www.sysinternals.com . . . , Nov. 2, 1998, 3 pgs.
Russinovich, Mark and Cogswell, Bryce, Regmon for Windows NT/9x, The Wayback Machine at https://web.archive.org/web/20050622023903/http://www.sysinternals.com:80/ . . . , Apr. 7, 2005, 4 pgs.
Notice of Allowance for U.S. Appl. No. 18/302,885, mailed Mar. 14, 2024, 2 pgs.
Notice of Allowance for U.S. Appl. No. 18/353,491, mailed Mar. 27, 2024, 6 pgs.
*AO Kaspersky Lab* v. *Webroot Inc.*, PTAB Case No. IPR2023-01011, Termination due to Settlement after Institution of Trial, Apr. 17, 2024, 5 pgs.
*AO Kaspersky Lab* v. *Webroot Inc.*, PTAB Case No. IPR2023-01199, Panel Change Order, Conduct of the Proceeding, 37 CFR § 42.5, Feb. 23, 2024, 3 pgs.
*AO Kaspersky Lab* v. *Webroot Inc.*, PTAB Case No. IPR2023-01199, Termination due to Settlement after Institution of Trial, Apr. 17, 2024, 5 pgs.
*Sophos Ltd. and Sophos Inc.* v. *Webroot Inc.*, PTAB Case No. IPR2024-00252, Notice of Filing Date Accorded to Petition and Time for Filing Patent Owner Preliminary Response, Dec. 22, 2023, 6 pgs.
*Sophos Ltd. and Sophos Inc.* v. *Webroot Inc.*, PTAB Case No. IPR2024-00252, Patent Owner Open Text Inc.'s Mandatory Notices Pursuant to 37 CFR § 42.8(b), Dec. 29, 2023, 10 pgs.
*Sophos Ltd. and Sophos Inc.* v. *Webroot Inc.*, PTAB Case No. IPR2024-00252, Patent Owner's Preliminary Response, Mar. 22, 2023, 62 pgs.
*Sophos Ltd. and Sophos Inc.* v. *Webroot Inc.*, PTAB Case No. IPR2024-00252, Exhibit 2001: Declaration of Professor Ron Schnell (Patent Owner Exhibit 2001, IPR2023-00731), Aug. 10, 2023, 41 pgs.
*Sophos Ltd. and Sophos Inc.* v. *Webroot Inc.*, PTAB Case No. IPR2024-00252, Exhibit 2002: Curriculum Vitae of Professor Ron Schnell (Patent Owner Exhibit 2002, IPR2023-00731), Feb. 2005, 5 pgs.
*Sophos Ltd. and Sophos Inc.* v. *Webroot Inc.*, PTAB Case No. IPR2024-00252, Exhibit 2003: Defendant Sophos Ltd.'s Preliminary Invalidity Contentions for Patens Plaintiffs Added by Amendment, 13 pgs.
*Sophos Ltd. and Sophos Inc.* v. *Webroot Inc.*, PTAB Case No. IPR2024-00252, Exhibit 2004: *Webroot, Inc. and Open Text Inc.*, v. *Sophos Ltd.*, Case No. 6:22-cv-00240-ADA-DTG, Defendant's Final Invalidity Contentions Against Counterclaim Plaintiff Sophos Ltd. (W.D. Tex., Nov. 1, 2023) (excerpted), 16 pgs.
*Sophos Ltd. and Sophos Inc.* v. *Webroot Inc.*, PTAB Case No. IPR2024-00252, Exhibit 2005: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2022), 19 pgs.
*Sophos Ltd. and Sophos Inc.* v. *Webroot Inc.*, PTAB Case No. IPR2024-00252, Exhibit 2006: Email from Timothy Best (counsel for Petitioner) to trials@uspto.gov re IPR Proceedings: IPR2023-00699; IPR2024-00252; and IPR2024-00253, dated Mar. 20, 2024, 2 pgs.
*Sophos Ltd. and Sophos Inc.* v. *Webroot Inc.*, PTAB Case No. IPR2024-00252, Exhibit 2007: *Sophos Ltd. & Sophos Inc.* v. *Open Text Inc.*, Case IPR2023-00732, EX-3002: Email dated Oct. 16, 2023 from trials@uspto.gov to Timothy Best (counsel for Petitioner), 3 pgs.
*Sophos Ltd. and Sophos Inc.* v. *Webroot Inc.*, PTAB Case No. IPR2024-00252, Joint Motion to Terminate Proceeding, Mar. 22, 2024, 9 pgs.
*Sophos Ltd. and Sophos Inc.* v. *Webroot Inc.*, PTAB Case No. IPR2024-00252, Joint Request to Treat Agreements as Business Confidential Information, Mar. 29, 2024, 5 pgs.
*Sophos Ltd. and Sophos Inc.* v. *Webroot Inc.*, PTAB Case No. IPR2024- 00252, Termination due to Settlement before Institution of Trial, Apr. 2, 2024, 5 pgs.
*Sophos Ltd. and Sophos Inc.* v. *Webroot Inc.*, PTAB Case No. IPR2024-00253, Notice of Filing Date Accorded to Petition and Time for Filing Patent Owner Preliminary Response, Dec. 22, 2023, 6 pgs.
*Sophos Ltd. and Sophos Inc.* v. *Webroot Inc.*, PTAB Case No. IPR2024-00253, Patent Owner Open Text Inc.'s Mandatory Notices Pursuant to 37 CFR § 42.8(b), Dec. 29, 2023, 10 pgs.
*Sophos Ltd. and Sophos Inc.* v. *Webroot Inc.*, PTAB Case No. IPR2024-00253, Patent Owner's Preliminary Response, Mar. 22, 2023, 61 pgs.
*Sophos Ltd. and Sophos Inc.* v. *Webroot Inc.*, PTAB Case No. IPR2024-00253, Exhibit 2001: Declaration of Professor Ron Schnell (Patent Owner Exhibit 2001, IPR2023-00732), Aug. 10, 2023, 41 pgs.
*Sophos Ltd. and Sophos Inc.* v. *Webroot Inc.*, PTAB Case No. IPR2024-00253, Exhibit 2002: Curriculum Vitae of Professor Ron Schnell (Patent Owner Exhibit 2002, IPR2023-00732), Feb. 2005, 5 pgs.
*Sophos Ltd. and Sophos Inc.* v. *Webroot Inc.*, PTAB Case No. IPR2024-00253, Exhibit 2003: *Webroot, Inc. and Open Text Inc.*, v.

(56) References Cited

OTHER PUBLICATIONS

*Sophos Ltd.*, Case No. 6:22-cv-00240-ADA-DTG, Defendant's Preliminary Invalidity Contentions (W.D. Tex., Feb. 21, 2023) (excerpted), 13 pgs.
*Sophos Ltd. and Sophos Inc.* v. *Webroot Inc.*, PTAB Case No. IPR2024-00253, Exhibit 2004: *Webroot, Inc. and Open Text Inc.*, v. *Sophos Ltd.*, Case No. 6:22-cv-00240-ADA-DTG, Defendant's Final Invalidity Contentions Against Counterclaim Plaintiff Sophos Ltd. (W.D. Tex., Nov. 1, 2023) (excerpted), 16 pgs.
*Sophos Ltd. and Sophos Inc.* v. *Webroot Inc.*, PTAB Case No. IPR2024-00253, Exhibit 2005: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2022), 19 pgs.
*Sophos Ltd. and Sophos Inc.* v. *Webroot Inc.*, PTAB Case No. IPR2024-00253, Exhibit 2006: Email from Timothy Best (counsel for Petitioner) to trials@uspto.gov re IPR Proceedings: IPR2023-00699; IPR2024-00252; and IPR2024-00253, dated Mar. 20, 2024.
*Sophos Ltd. and Sophos Inc.* v. *Webroot Inc.*, PTAB Case No. IPR2024-00253, Exhibit 2007: *Sophos Ltd. & Sophos Inc.* v. *Open Text Inc.*, Case IPR2023-00732, EX-3002: Email dated Oct. 16, 2023 from trials@uspto.gov to Timothy Best (counsel for Petitioner), 3 pgs.
*Sophos Ltd. and Sophos Inc.* v. *Webroot Inc.*, PTAB Case No. IPR2024-00253, Joint Motion to Terminate Proceeding, Mar. 29, 2024, 9 pgs.
*Sophos Ltd. and Sophos Inc.* v. *Webroot Inc.*, PTAB Case No. IPR2024-00253, Joint Request to Treat Agreements as Business Confidential Information, Mar. 29, 2024, 5 pgs.
*Sophos Ltd. and Sophos Inc.* v. *Webroot Inc.*, PTAB Case No. IPR2024-00253, Termination due to Settlement before Institution of Trial, Apr. 2, 2024, 5 pgs.
*AO Kaspersky Lab* v. *Open Text Inc.*, PTAB Case No. IPR2024-00297, Notice of Filing Date According to Petition and Time for Filing Patent Owner Preliminary Response, Dec. 22, 2023, 6 pgs.
*AO Kaspersky Lab* v. *Open Text Inc.*, PTAB Case No. IPR2024-00297, Patent Owner Open Text Inc.'s Mandatory Notices Pursuant to 37 CFR § 42.8(b), Dec. 29, 2023, 10 pgs.
*AO Kaspersky Lab* v. *Open Text Inc.*, PTAB Case No. IPR2024-00297, Patent Owner's Preliminary Response, Mar. 22, 2024, 29 pgs.
*AO Kaspersky Lab* v. *Open Text Inc.*, PTAB Case No. IPR2024-00297, Exhibit 2001: Declaration Of Matthew L. Boney In Support Of Patent Owner's Preliminary Response, 1 pgs.
*AO Kaspersky Lab* v. *Open Text Inc.*, PTAB Case No. IPR2024-00297, Exhibit 2002: Assignment of U.S. Publication No. 2007/0016951 A1 from Paul Piccard and Michael Greene to Webroot Software, Inc. executed Jul. 11, 2005 and Jul. 7, 2005, 5 pgs.
*AO Kaspersky Lab* v. *Open Text Inc.*, PTAB Case No. IPR2024-00297, Exhibit 2003: Paul Piccard LinkedIn, 4 pgs.
*AO Kaspersky Lab* v. *Open Text Inc.*, PTAB Case No. IPR2024-00297, Exhibit 2004: Michael P. Greene LinkedIn, 6 pgs.
*AO Kaspersky Lab* v. *Open Text Inc.*, PTAB Case No. IPR2024-00297, Exhibit 2005: Assignment of U.S. Appl. No. 13/490,294 from Matthew L. Boney to Webroot Software, Inc. executed on Jun. 7, 2006, 4 pgs.
*AO Kaspersky Lab* v. *Open Text Inc.*, PTAB Case No. IPR2024-00297, Exhibit 2006: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*AO Kaspersky Lab* v. *Open Text Inc.*, PTAB Case No. IPR2024-00297, Exhibit 2007: *mCom IP, LLC* v. *Cisco Systems, Inc.*, Case No. 6:22-cv-00261- ADA, Order Denying Defendant's Motion to Stay Pending Inter Partes Review, Dkt. 42 (W.D. Tex., Oct. 20, 2022), 7 pgs.
*AO Kaspersky Lab* v. *Open Text Inc.*, PTAB Case No. IPR2024-00297, Exhibit 2008: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*AO Kaspersky Lab* v. *Open Text Inc.*, PTAB Case No. IPR2024-00297, Exhibit 2009: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.
*AO Kaspersky Lab* v. *Open Text Inc.*, PTAB Case No. IPR2024-00297, Exhibit 2010: Dani Kass, "Catching Up On Patent Litigation With JudgeAlbright" (Law360 Mar. 14, 2023), 3 pgs.
*AO Kaspersky Lab* v. *Open Text Inc.*, PTAB Case No. IPR2024-00297, Exhibit 2011: *Webroot, Inc. and Open Text Inc.*, v. *Trend Micro, Inc et al.*, Case No. 6:22-cv-243-ADA-DTG, Seventh Amended Schedule Order, Dkt. 566 (W.D. Tex. Feb. 23, 2024), 3 pgs.
*AO Kaspersky Lab* v. *Open Text Inc.*, PTAB Case No. IPR2024-00297, Exhibit 2012: *Webroot, Inc. and Open Text Inc.*, v. *AO Kaspersky Lab.*, Case No. 6:22-cv-00243-ADA-DTG, Defendants' Second Amended Invalidity Contentions (W.D. Tex., Jan. 19, 2024) (excerpted), 6 pgs.
*AO Kaspersky Lab* v. *Open Text Inc.*, PTAB Case No. IPR2024-00297, Exhibit 2013: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2023), 19 pgs.
*AO Kaspersky Lab* v. *Open Text Inc.*, PTAB Case No. IPR2024-00297, Exhibit 2014: USPTO Assignment Record for U.S. Pub. No. 2007/0016951 A1, U.S. Appl. No. 11/180,161, filed Jul. 13, 2005, published on Jan. 18, 2007, 2 pgs.
*AO Kaspersky Lab* v. *Open Text Inc.*, PTAB Case No. IPR2024-00297, Exhibit 2015: USPTO Assignment Record for U.S. Pat. No. 8,719,932, U.S. Pub. No. 2012/0246722 A1, U.S. Appl. No. 13/490,294, filed Jun. 26, 2012, issued May 6, 2014, 3 pgs.
*AO Kaspersky Lab* v. *Open Text Inc.*, PTAB Case No. IPR2024-00297, Joint Motion to Terminate Proceeding, Apr. 12, 2024, 9 pgs.
*AO Kaspersky Lab* v. *Open Text Inc.*, PTAB Case No. IPR2024-00297, Joint Request to Treat Agreement as Business Confidential Information, Apr. 12, 2024, 5 pgs.
*AO Kaspersky Lab* v. *Open Text Inc.*, PTAB Case No. IPR2024-00297, Decision, Joint Motion to Terminate and Request to Keep Confidential, Apr. 18, 2024, 4 pgs.
*AO Kaspersky Lab* v. *Open Text Inc.*, PTAB Case No. IPR2024-00297, Exhibit 3001: Attorney Correspondence, Apr. 9, 2024, 2 pgs.
*Crowdstrike, Inc.* v. *Webroot Inc.*, PTAB Case No. IPR2023-00556, Decision Granting Institution of Inter Partes Review, Jan. 25, 2024, 7 pgs.
*Crowdstrike, Inc.* v. *Webroot Inc.*, PTAB Case No. IPR2023-00556, Second Revised Scheduling Order, Jan. 25, 2024, 4 pgs.
*Crowdstrike, Inc.* v. *Webroot Inc.*, PTAB Case No. IPR2023-00556, Decision Granting Institution of Inter Partes Review, Jan. 29, 2024, 8 pgs.
*Crowdstrike, Inc.* v. *Webroot Inc.*, PTAB Case No. IPR2023-00556, Order, Termination as to Crowdstrike, Inc. due to Settlement, Feb. 6, 2024, 6 pgs.
*Crowdstrike, Inc.* v. *Webroot Inc.*, PTAB Case No. IPR2023-00556, Joint Stipulation to Modify Due Dates 1, 2 and 3, Feb. 22, 2024, 4 pgs.
*Crowdstrike, Inc.* v. *Webroot Inc.*, PTAB Case No. IPR2023-00556, Order, Termination as to Trend Micro, Inc. due to Settlement, Feb. 28, 2024, 5 pgs.
*Crowdstrike, Inc.* v. *Webroot Inc.*, PTAB Case No. IPR2023-00556, Patent Owner's Response, Mar. 29, 2024, 56 pgs.
*Crowdstrike, Inc.* v. *Webroot Inc.*, PTAB Case No. IPR2023-00556, Joint Motion to Terminate Proceeding, Apr. 12, 2024, 9 pgs.
*Crowdstrike, Inc.* v. *Webroot Inc.*, PTAB Case No. IPR2023-00556, Joint Request to Treat Agreement as Business Confidential Information, Apr. 12, 2024, 5 pgs.
*Crowdstrike, Inc.* v. *Webroot Inc.*, PTAB Case No. IPR2023-00556, Termination due to Settlement after Institution of Trial, Apr. 17, 2024, 5 pgs.
*Crowdstrike, Inc.* v. *Webroot Inc.*, PTAB Case No. IPR2023-00556, Exhibit 3001: Attorney Correspondence, Apr. 17, 24, 2 pgs.

(56) References Cited

OTHER PUBLICATIONS

*Sophos Ltd. and Sophos Inc.* v. *Webroot Inc.*, PTAB Case No. IPR2023-00699, Joint Motion to Terminate Proceedings, Mar. 29, 2024, 9 pgs.
*Sophos Ltd. and Sophos Inc.* v. *Webroot Inc.*, PTAB Case No. IPR2023-00699, Joint Request to Treat Agreements as Business Confidential Information, Mar. 29, 2024, 5 pgs.
*Sophos Ltd. and Sophos Inc.* v. *Webroot Inc.*, PTAB Case No. IPR2023-00699, Termination due to Settlement after Institution of Trial, Apr. 5, 2024, 4 pgs.
*AO Kaspersky Lab* v. *Webroot Inc.*, PTAB Case No. IPR2023-01334, Patent Owner's Preliminary Response, Nov. 28, 2023, 14 pgs.
*AO Kaspersky Lab* v. *Webroot Inc.*, PTAB Case No. IPR2023-01334, Exhibit 2001: *Webroot, Inc. and Open Text Inc.* v. *AO Kaspersky Lab*, Complaint for Patent Infringement, Dkt. 1 (W.D. Tex. Mar. 4, 2022), 115 pgs.
*AO Kaspersky Lab* v. *Webroot Inc.*, PTAB Case No. IPR2023-01334, Exhibit 2002: *Webroot, Inc. and Open Text Inc.* v. *AO Kaspersky Lab*, Waiver of Service of Summons, Dkt. 16 (W.D. Tex. May 25, 2022), 1 pg.
*AO Kaspersky Lab* v. *Webroot Inc.*, PTAB Case No. IPR2023-01334, Exhibit 2003: Email from J. Miotke to trials@uspto.gov re *Crowdstrike* v. *Open Text Inc.* —IPR2023-00126 & IPR2023-01011 (U.S. Pat. No. 10,257,224) and IPR2023-00289 & IPR2023-001334 (U.S. Pat. No. 8,418,250) / Conference Call Request, Nov. 21, 2023, 2 pgs.
*AO Kaspersky Lab* v. *Webroot Inc.*, PTAB Case No. IPR2023-01334, Supplemental Mandatory Notice Under 37 CFR § 42.8(a)(3), Dec. 11, 2023, 7 pgs.
*AO Kaspersky Lab* v. *Webroot Inc.*, PTAB Case No. IPR2023-01334, Decision granting Institution of Inter Partes Review and granting Motion for Joinder, Dec. 21, 2023, 10 pgs.
*AO Kaspersky Lab* v. *Webroot Inc.*, PTAB Case No. IPR2023-01334, Petitioner's Reply to Patent Owner's Response, Feb. 22, 2024, 32 pgs.
*AO Kaspersky Lab* v. *Webroot Inc.*, PTAB Case No. IPR2023-01334, Patent Owner's Request for Oral Argument, Mar. 12, 2024, 4 pgs.
*AO Kaspersky Lab* v. *Webroot Inc.*, PTAB Case No. IPR2023-01334, Termination due to Settlement after Institution of Trial, Apr. 17, 2024, 5 pgs.
*AO Kaspersky Lab* v. *Webroot Inc.*, PTAB Case No. IPR2023-01334, Exhibit 3002, Attorney Correspondence, Apr. 17, 2024, 3 pgs.
*Trend Micro, Inc.* v. *Open Text Inc.*, PTAB Case No. IPR2023-01459, Decision Granting Institution of Inter Partes Review and Granting Motion for Joinder, Jan. 25, 2024, 7 pgs.
*Trend Micro, Inc.* v. *Open Text Inc.*, PTAB Case No. IPR2023-01459, Joint Motion to Terminate Proceedings, Feb. 19, 24, 9 pgs.
*Trend Micro, Inc.* v. *Open Text Inc.*, PTAB Case No. IPR2023-01459, Request to Treat as Business Confidential Information, Feb. 19, 2024, 7 pgs.
*Trend Micro, Inc.* v. *Open Text Inc.*, PTAB Case No. IPR2023-01459, Termination due to Settlement after Institution of Trial, Apr. 17, 2024, 5 pgs.
*Trend Micro, Inc.* v. *Open Text Inc.*, PTAB Case No. IPR2023-01459, Exhibit 3001: Attorney Correspondence, Apr. 17, 2024, 2 pgs.
*AO Kaspersky Lab* v. *Webroot Inc.*, PTAB Case No. IPR2024-00035, Decision Granting Institution of Inter Partes Review and Granting Motion for Joinder, Jan. 29, 2024, 8 pgs.
*AO Kaspersky Lab* v. *Webroot Inc.*, PTAB Case No. IPR2024-00035, Termination due to Settlement after Institution of Trial, Apr. 17, 2024, 5 pgs.
*AO Kaspersky Lab* v. *Webroot Inc.*, PTAB Case No. IPR2024-00035, Exhibit 3001: Attorney Correspondence, Apr. 17, 2024, 2 pgs.
Notice of Allowance for U.S. Appl. No. 18/301,832, mailed May 14, 2024, 7 pgs.

*Crowdstrike, Inc.* v. *Webroot Inc.*, PTAB Case No. IPR2022-01522, Patent Owner's Response to Petition, Jul. 18, 2023, 83 pgs.
*Crowdstrike, Inc.* v. *Webroot Inc.*, PTAB Case No. IPR2022-01522, Exhibit 2024: Declaration of Professor Nenad Medvidovic, Ph.D in Support of Patent Owner's Response to Petition, Jul. 18, 2023, 131 pgs.
*Crowdstrike, Inc.* v. *Webroot Inc.*, PTAB Case No. IPR2022-01522, Exhibit 2025: Erickson, J., Hacking: The Art of Exploitation, 2nd Ed., 2008, 492 pgs.
*Crowdstrike, Inc.* v. *Webroot Inc.*, PTAB Case No. IPR2022-01522, Exhibit 2026: Kleymenov, A. and Thabet, A., Mastering Malware Analysis, Packt Pub. (2019), 547 pgs.
*Crowdstrike, Inc.* v. *Webroot Inc.*, PTAB Case No. IPR2022-01522, Exhibit 2027: Deposition Transcript of Dr. Wenke Lee, Ph.D., Jun. 30, 2023, 212 pgs.
*Crowdstrike, Inc.* v. *Webroot Inc.*, PTAB Case No. IPR2022-01522, Exhibit 2028: U.S. Pat. No. 9,251,373, AlHarbi, Feb. 2, 2016, 14 pgs.
*Crowdstrike, Inc.* v. *Webroot Inc.*, PTAB Case No. IPR2022-01522, Exhibit 2029: U.S. Pat. No. 8,291,381, Lai, Oct. 16, 2012, 26 pgs.
*Crowdstrike, Inc.* v. *Webroot Inc.*, PTAB Case No. IPR2022-01522, Exhibit 2030: GeeksforGeeks, Stack Unwinding in C++, Nov. 25, 2021, 7 pgs.
*Crowdstrike, Inc.* v. *Webroot Inc.*, PTAB Case No. IPR2022-01522, Exhibit 2031: IBM Documentation, Stack unwinding (C++ only) IBM Documentation, Mar. 22, 2021, 3 pgs.
*Crowdstrike, Inc.* v. *Webroot Inc.*, PTAB Case No. IPR2022-01522, Exhibit 2032: Microsoft Learn, Exceptions and Stack Unwinding in C++, Nov. 13, 2022, 4 pgs.
*Crowdstrike, Inc.* v. *Webroot Inc.*, PTAB Case No. IPR2022-01522, Decision denying Patent Owner's Request for Rehearing of Decision Granting Institution of Inter Partes Review, Aug. 21, 2023, 12 pgs.
*Crowdstrike, Inc.* v. *Webroot Inc.*, PTAB Case No. IPR2022-01522, Joint Stipulation to Modify Due Dates 2-3, Oct. 6, 2023, 4 pgs.
*Crowdstrike, Inc.* v. *Webroot Inc.*, PTAB Case No. IPR2022-01522, Joint Stipulation to Modify Due Dates 2-3, Oct. 20, 2023, 4 pgs.
*Crowdstrike, Inc.* v. *Webroot Inc.*, PTAB Case No. IPR2022-01522, Panel Change Order, Nov. 6, 2023, 3 pgs.
*Crowdstrike, Inc.* v. *Webroot Inc.*, PTAB Case No. IPR2022-01522, Second Updated Joint Stipulation to Modify Due Dates 2-3, Nov. 7, 2023, 4 pgs.
*Crowdstrike, Inc.* v. *Webroot Inc.*, PTAB Case No. IPR2022-01522, Joint Motion to Terminate Proceeding, Nov. 20, 2023, 10 pgs.
*Crowdstrike, Inc.* v. *Webroot Inc.*, PTAB Case No. IPR2022-01522, Joint Request to Treat Agreement as Business Confidential Information, Nov. 20, 2023, 5 pgs.
*Crowdstrike, Inc.* v. *Webroot Inc.*, PTAB Case No. IPR2022-01522, Patent Owner's Request for Oral Argument, Dec. 12, 2023, 4 pgs.
*Crowdstrike, Inc.* v. *Webroot Inc.*, PTAB Case No. IPR2022-01522, Termination due to Settlement Prior to Institution of Trial, Jan. 8, 2024, 4 pgs.
*Trend Micro, Inc.* v. *Webroot Inc.*, PTAB Case No. IPR2023-00692, Patent Owner's Preliminary Response to Petition, Aug. 11, 2023, 81 pgs.
*Trend Micro, Inc.* v. *Webroot Inc.*, PTAB Case No. IPR2023-00692, Exhibit 2001: Declaration of Professor Nenad Medvidovic, Ph. D in Support of Patent Owner's Preliminary Response To Petition, Aug. 11, 2023, 58 pgs.
*Trend Micro, Inc.* v. *Webroot Inc.*, PTAB Case No. IPR2023-00692, Exhibit 2002: Curriculum Vitae of Professor Nenad Medvidovic, Ph.D., Jul. 2022, 71 pgs.
*Trend Micro, Inc.* v. *Webroot Inc.*, PTAB Case No. IPR2023-00692, Exhibit 2003: *Webroot, Inc. and Open Text Inc.*, v. *Trend Micro Inc.*, Case No. 6:22-cv-00239, Complaint for Patent Infringement, Dkt. 1 (W.D. Tex., Mar. 4, 2022), 117 pgs.
*Trend Micro, Inc.* v. *Webroot Inc.*, PTAB Case No. IPR2023-00692, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

(56) References Cited

OTHER PUBLICATIONS

*Trend Micro, Inc.* v. *Webroot Inc.*, PTAB Case No. IPR2023-00692, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Trend Micro, Inc.* v. *Webroot Inc.*, PTAB Case No. IPR2023-00692, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Trend Micro, Inc.* v. *Webroot Inc.*, PTAB Case No. IPR2023-00692, Exhibit 2007: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.

*Trend Micro, Inc.* v. *Webroot Inc.*, PTAB Case No. IPR2023-00692, Exhibit 2008: Dani Kass, "Catching Up On Patent Litigation With Judge Al-bright" (Law360 Mar. 14, 2023); https://www.law360.com/pulse/articles/1582438/print?section=pulse/courts, 3 pgs.

*Trend Micro, Inc.* v. *Webroot Inc.*, PTAB Case No. IPR2023-00692, Exhibit 2009: *Webroot, Inc. and Open Text Inc.*, v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.

*Trend Micro, Inc.* v. *Webroot Inc.*, PTAB Case No. IPR2023-00692, Exhibit 2010: U.S. District Courts—Federal Court Management Statistics—Profiles—During the 12-Month Periods Ending Mar. 31, 2018 Through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, 95 pgs.

*Trend Micro, Inc.* v. *Webroot Inc.*, PTAB Case No. IPR2023-00692, Exhibit 2011: *Webroot, Inc. and Open Text Inc.*, v. *Trend Micro, Inc.*, Case No. 6:22-cv-00239-ADA-DTG, Defendant's Preliminary Invalidity Contentions (W.D. Tex., Sep. 13, 2022), 125 pgs.

*Trend Micro, Inc.* v. *Webroot Inc.*, PTAB Case No. IPR2023-00692, Exhibit 2012: *Webroot, Inc. and Open Text Inc.*, v. *Sophos Ltd.*, Case No. 6:22-cv-240-ADA-DTG, Defendant's Preliminary Invalidity Contentions (W.D. Tex., Sep. 13, 2022), 127 pgs.

*Trend Micro, Inc.* v. *Webroot Inc.*, PTAB Case No. IPR2023-00692, Exhibit 2013: *Webroot, Inc. and Open Text Inc.*, v. *CrowdStrike, Inc. and CrowdStrike Holdings, Inc.*, Case No. 6:22-cv-00241-ADA-DTG, Second Supplemental Preliminary Invalidity Contentions (W.D. Tex., Jul. 14, 2023), 85 pgs.

*Trend Micro, Inc.* v. *Webroot Inc.*, PTAB Case No. IPR2023-00692, Exhibit 2014: U.S. Publication No. 20090049550, Shevchenko, Feb. 19, 2009, 17 pgs.

*Trend Micro, Inc.* v. *Webroot Inc.*, PTAB Case No. IPR2023-00692, Exhibit 2015: U.S. Publication No. 20050108562, Khazan et al., May 19, 2005, 30 pgs.

*Trend Micro, Inc.* v. *Webroot Inc.*, PTAB Case No. IPR2023-00692, Exhibit 2016: U.S. Pat. No. 8,510,596, Gupta, Aug. 13, 2013, 47 pgs.

*Trend Micro, Inc.* v. *Webroot Inc.*, PTAB Case No. IPR2023-00692, Exhibit 2017: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.

*Trend Micro, Inc.* v. *Webroot Inc.*, PTAB Case No. IPR2023-00692, Exhibit 2018: Erickson, J., Hacking: The Art of Exploitation, 2nd Ed., 2008, 486 pgs.

*Trend Micro, Inc.* v. *Webroot Inc.*, PTAB Case No. IPR2023-00692, Exhibit 2019: Kleymenov, A. and Thabet, A., Mastering Malware Analysis, Packt Pub., 2019, 547 pgs.

*Trend Micro, Inc.* v. *Webroot Inc.*, PTAB Case No. IPR2023-00692, Exhibit 2020: LWN.net, An Introduction to Last Branch Records (Mar. 23, 2016) (available at https://web.archive.org/web/20160413055733/https://lwn.net/Articles/680985/), 5 pgs.

*Trend Micro, Inc.* v. *Webroot Inc.*, PTAB Case No. IPR2023-00692, Exhibit 2021: U.S. Pat. No. 9,251,373, AlHarbi, Feb. 2, 2016, 14 pgs.

*Trend Micro, Inc.* v. *Webroot Inc.*, PTAB Case No. IPR2023-00692, Exhibit 2022: U.S. Pat. No. 8,291,381, Lai, Oct. 16, 2012, 26 pgs.

*Trend Micro, Inc.* v. *Webroot Inc.*, PTAB Case No. IPR2023-00692, Exhibit 2023: GeeksforGeeks, Stack Unwinding in C++, Nov. 25, 2021, 7 pgs.

*Trend Micro, Inc.* v. *Webroot Inc.*, PTAB Case No. IPR2023-00692, Exhibit 2024: IBM Documentation, Stack unwinding (C++ only), Mar. 22, 2021, 3 pgs.

*Trend Micro, Inc.* v. *Webroot Inc.*, PTAB Case No. IPR2023-00692, Exhibit 2025: Microsoft Learn, Exceptions and Stack Unwinding in C++, Nov. 13, 2022, 4 pgs.

*Trend Micro, Inc.* v. *Webroot Inc.*, PTAB Case No. IPR2023-00692, Sotera Stipulation, Sep. 28, 2023, 3 pgs.

*Trend Micro, Inc.* v. *Webroot Inc.*, PTAB Case No. IPR2023-00692, Order, Conduct of Proceeding, Sep. 28, 2023, 6 pgs.

*Trend Micro, Inc.* v. *Webroot Inc.*, PTAB Case No. IPR2023-00692, Exhibit 3001: email re: Sotera Stipulation, Sep. 28, 2023, 2 pgs.

*Trend Micro, Inc.* v. *Webroot Inc.*, PTAB Case No. IPR2023-00692, Decision denying institution of Inter Parties Review, Nov. 6, 2023, 32 pgs.

*AO Kaspersky Lab* v. *Webroot Inc.*, PTAB Case No. IPR2023-00895, Corrected Label Exhibit 1001: U.S. Pat. No. 10284591, Giuliani, May 7, 2019, 14 pgs.

*AO Kaspersky Lab* v. *Webroot Inc*, PTAB Case No. IPR2023-00895, Corrected Label Exhibit 1002: Declaration of V.S. Subrahmanian, Ph.D. under 37 C.F.R. §1.68, Apr. 28, 2023, 110 pgs.

*AO Kaspersky Lab* v. *Webroot Inc*, PTAB Case No. IPR2023-00895, Corrected Label Exhibit 1003: Curriculum Vitae of V.S. Subrahmanian, Ph.D., Apr. 28, 2023, 77 pgs.

*AO Kaspersky Lab* v. *Webroot Inc*, PTAB Case No. IPR2023-00895, Corrected Label Exhibit 1004: Motion for Order Authorizing Alternative Service, Mar. 24, 2022, 13 pgs.

*AO Kaspersky Lab* v. *Webroot Inc*, PTAB Case No. IPR2023-00895, Corrected Label Exhibit 1005: Waiver of Service of Summons, May 24, 2022, 1 pgs.

*AO Kaspersky Lab* v. *Webroot Inc*, PTAB Case No. IPR2023-00895, Corrected Label Exhibit 1006: File History of U.S. Pat. No. 10,284,591, Sep. 6, 2023, 238 pgs.

*AO Kaspersky Lab* v. *Webroot Inc*, PTAB Case No. IPR2023-00895, Corrected Label Exhibit 1007: Ivan Fratric, Runtime Prevention of Return-Oriented Programming Attacks, at https://github.com/ivanfratric/ropguard/blob/master/doc/ropguard.pdf, last comment Aug. 26, 2012, 11 pgs.

*AO Kaspersky Lab* v. *Webroot Inc*, PTAB Case No. IPR2023-00895, Corrected Label Exhibit 1008: U.S. Publication No. 20120255018, Sallam, Oct. 4, 2012, 53 pg.

*AO Kaspersky Lab* v. *Webroot Inc*, PTAB Case No. IPR2023-00895, Corrected Label Exhibit 1009: Hello World, Github Docs, at https://docs.github.com/en/get-started/quickstart/hello-world, last visited Apr. 26, 2023, 8 pgs.

*AO Kaspersky Lab* v. *Webroot Inc*, PTAB Case No. IPR2023-00895, Corrected Label Exhibit 1010: Committing and Reviewing Changes to your Project, Github Docs, at https://docs.github.com/en/desktop/contributing-and-collaborating-using-github-desktop/making-changes-in-a-branch/committing-and-reviewing-changes-to-your-project (last visited Apr. 26, 2023), 11 pgs.

*AO Kaspersky Lab* v. *Webroot Inc*, PTAB Case No. IPR2023-00895, Corrected Label Exhibit 1011: Setting Repository Visibility, Github Docs, at https://docs.github.com/en/repositories/managing-your-repositorys-settings-and-features/managing-repository-settings/setting-repository-visibility (last visited Apr. 26, 2023), 3 pgs.

*AO Kaspersky Lab* v. *Webroot Inc*, PTAB Case No. IPR2023-00895, Corrected Label Exhibit 1012: GitHub Glossary, Github Docs, at https://docs.github.com/en/get-started/quickstart/github-glossary#public-repository (last visited Apr. 26, 2023), 37 pgs.

*AO Kaspersky Lab* v. *Webroot Inc*, PTAB Case No. IPR2023-00895, Corrected Label Exhibit 1013: Scott Chacon, GitHub Code Search, The Github Blog, at https://github.blog/2008-11-03-github-code-search/, Nov. 3, 2008, 7 pgs.

(56) References Cited

OTHER PUBLICATIONS

*AO Kaspersky Lab* v. *Webroot Inc*, PTAB Case No. IPR2023-00895, Corrected Label Exhibit 1014: About Searching on GitHub, Github Docs, at https://docs.github.com/en/search-github/getting-started-with-searching-on-github/about-searching-on-github (last visited Apr. 26, 2023), 3 pgs.
*AO Kaspersky Lab* v. *Webroot Inc*, PTAB Case No. IPR2023-00895, Corrected Label Exhibit 1015: Finding Ways to Contribute to Open Source on GitHub, Github Docs, at https://docs.github.com/en/get-started/exploring-projects-on-github/finding-ways-to-contribute-to-open-source-on-github (last visited Apr. 26, 2023), 3 pgs.
*AO Kaspersky Lab* v. *Webroot Inc*, PTAB Case No. IPR2023-00895, Corrected Label Exhibit 1016: Claim Construction Order, *Webroot, Inc. and Open Text, Inc.* v. *AO Kaspersky Lab*, Case No. 6:22-CV-00243-ADA-DTG, (Mar. 16, 2023), 5 pgs.
*AO Kaspersky Lab* v. *Webroot Inc*, PTAB Case No. IPR2023-00895, Corrected Label Exhibit 1017: Michael Huttermann, Devops For Developers (Apress, 2012), 183 pgs.
*AO Kaspersky Lab* v. *Webroot Inc*, PTAB Case No. IPR2023-00895, Corrected Label Exhibit 1018: Nicolas Despres, Automatic performance monitoring tool, Laboratoire De Recherche Et Developpement De L'epita Tech Report No. 0601, 915 (2006), 21 pgs.
*AO Kaspersky Lab* v. *Webroot Inc*, PTAB Case No. IPR2023-00895, Corrected Label Exhibit 1019: Bryan D. Payne, Martin D.P. de A. Carbone, Wenke Lee, 2007, December. Secure and Flexible Monitoring of Virtual Machines, 23rd Ann. Comp. Sec. Applications Conf., 385, 385-397 (2007), 13 pgs.
*AO Kaspersky Lab* v. *Webroot Inc*, PTAB Case No. IPR2023-00895, Corrected Label Exhibit 1020: Margaret Rouse, Dynamic Library, Techopedia (Mar. 2, 2012), 7 pgs.
*AO Kaspersky Lab* v. *Webroot Inc*, PTAB Case No. IPR2023-00895, Corrected Label Exhibit 1021: Krishnan, S. and Srihari, K., A Knowledge-Based Object Oriented DFM Advisor for Surface Mount PCB Assembly. 10 Li Int'l. J. Advanced Mfg. Tech, 317, 317-329 (1995), 13 pgs.
*AO Kaspersky Lab* v. *Webroot Inc*, PTAB Case No. IPR2023-00895, Corrected Label Exhibit 1022: Henry Hanping Feng, Jonathon T. Giffin, Yong Huang, Somesh Jha, Wenkee Lee, and Barton P. Miller, Formalizing Sensitivity in Static Analysis for Intrusion Detection, IEEE Symp. Sec. Priv., 194, 194-208, 2004, 15 pgs.
*AO Kaspersky Lab* v. *Webroot Inc*, PTAB Case No. IPR2023-00895, Corrected Label Exhibit 1023: Wei Li, Lap-chung Lam, and Tzicker Chiueh, How to Automatically and Accurately Sandbox Microsoft IIS, 22nd Ann. Comp. Sec. Applications Conf., 213, 213-222 (2006), 10 pgs.
*AO Kaspersky Lab* v. *Webroot Inc*, PTAB Case No. IPR2023-00895, Corrected Label Exhibit 1024: Kevin A. Roundy and Barton P. Miller, Hybrid Analysis and Control of Malware, Recent Advances In Intrusion Detection: 13th Int'l Symp., 317, 317-338 (2010), 23 pgs.
*AO Kaspersky Lab* v. *Webroot Inc*, PTAB Case No. IPR2023-00895, Corrected Label Exhibit 1025: Toshiyuki Maeda, 2002, Safe Execution of User Programs in Kernel Mode Using Typed Assembly Language, (Master's Thesis, University of Tokyo, 2002), 44 pgs.
*AO Kaspersky Lab* v. *Webroot Inc*, PTAB Case No. IPR2023-00895, Corrected Label Exhibit 1026: Alex Skaletsky, Tevi Devor, Nadav Chachmon, Robert Cohn, Kim Hazelwood, Vladimirov, Moshe Bach, Dynamic Program Analysis of Microsoft Windows Applications, IEEE Int'l Symp. Performance Analysis Sys. Software, 2, 2-12 (2010), 11 pgs.
*AO Kaspersky Lab* v. *Webroot Inc*, PTAB Case No. IPR2023-00895, Corrected Label Exhibit 1027: Tarjei Mandt, T., Locking Down the Windows Kernel: Mitigating Null Pointer Exploitation, Norman Threat Research, 1009, 13 pgs.
*AO Kaspersky Lab* v. *Webroot Inc*, PTAB Case No. IPR2023-00895, Corrected Label Exhibit 1028: Xiangyu Dong, Cong Xu, Yuan Xie, Norman P. Jouppi, N.P., NVSim: A Circuit-Level Performance, Energy, and Area Model for Emerging Nonvolatile Memory, 31 IEEE Transactions Computer-Aided Design Of Integrated Circuits Sys., 994, 994-1007 (2012), 14 pgs.

*AO Kaspersky Lab* v. *Webroot Inc*, PTAB Case No. IPR2023-00895, Corrected Label Exhibit 1029: Father, H., Hooking Windows API-Technics of hooking API functions on Windows, 2 Assembly Programming J., 2, 2-30 (2004), 30 pgs.
*AO Kaspersky Lab* v. *Webroot Inc*, PTAB Case No. IPR2023-00895, Corrected Label Exhibit 1030: J. Berdajs and Z. Bosnić, Extending Applications Using an Advanced Approach to DLL Injection and API Hooking, 40 Software: Practice Experience, 567, 567-584 (2010), 18 pgs.
*AO Kaspersky Lab* v. *Webroot Inc.*, PTAB Case No. IPR2023-00895, Corrected Label Exhibit 1031: Ulrich Bayer, Christopher Kruegel, and Engin Kirda, TTAnalyze: A Tool for Analyzing Malware, Ikarus Software Tech. Univ. Vienna, 180, 180-192 (2006), 12 pgs.
*AO Kaspersky Lab* v. *Webroot Inc.*, PTAB Case No. IPR2023-00895, Patent Owner's Preliminary Response to Petition, Sep. 11, 2023, 48 pgs.
*AO Kaspersky Lab* v. *Webroot Inc.*, PTAB Case No. IPR2023-00895, Exhibit 2001: Declaration of Professor Nenad Medvidovic, Ph.D in Support of Patent Owner's Preliminary Response To Petition, Sep. 11, 2023, 15 pgs.
*AO Kaspersky Lab* v. *Webroot Inc.*, PTAB Case No. IPR2023-00895, Exhibit 2002: Curriculum Vitae of Professor Nenad Medvidovic, Ph.D., Jul. 2022, 71 pgs.
*AO Kaspersky Lab* v. *Webroot Inc.*, PTAB Case No. IPR2023-00895, Exhibit 2003: *Webroot, Inc. and Open Text Inc.*, v. *AO Kaspersky.*, Case No. 6:22-cv-00243, Complaint for Patent Infringement, Dkt. 1 (W.D. Tex., Mar. 4, 2022), 115 pgs.
*AO Kaspersky Lab* v. *Webroot Inc.*, PTAB Case No. IPR2023-00895, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*AO Kaspersky Lab* v. *Webroot Inc.*, PTAB Case No. IPR2023-00895, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*AO Kaspersky Lab* v. *Webroot Inc.*, PTAB Case No. IPR2023-00895, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*AO Kaspersky Lab* v. *Webroot Inc.*, PTAB Case No. IPR2023-00895, Exhibit 2007: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.
*AO Kaspersky Lab* v. *Webroot Inc.*, PTAB Case No. IPR2023-00895, Exhibit 2008: Dani Kass, "Catching Up On Patent Litigation With Judge Albright" (Law360 Mar. 14, 2023); at https://www.law360.com/pulse/articles/1582438/print?section=pulse/courts, 3 pgs.
*AO Kaspersky Lab* v. *Webroot Inc.*, PTAB Case No. IPR2023-00895, Exhibit 2009: *Webroot, Inc. and Open Text Inc.*, v. *AO Kaspersky Lab et al.*, Case No. 6:22-cv-243-ADA-DTG, Order Granting Fifth Amended Scheduling Order, Dkt. 252 (W.D. Tex. Mar. 29, 2023), 7 pgs.
*AO Kaspersky Lab* v. *Webroot Inc.*, PTAB Case No. IPR2023-00895, Exhibit 2010: U.S. District Courts—Federal Court Management Statistics—Profiles—During the 12-Month Periods Ending Mar. 31, 2018 Through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, Mar. 31, 2023, 95 pgs.
*AO Kaspersky Lab* v. *Webroot Inc*, PTAB Case No. IPR2023-00895, Exhibit 2011: *Webroot, Inc. and Open Text Inc.*, v. *AO Kaspersky Lab et al.*, Case No. 6:22-cv-243-ADA-DTG, Defendant's Preliminary Invalidity Contentions, Appx. B (W.D. Tex., Sep. 14, 2022), 125 pgs.

(56) References Cited

OTHER PUBLICATIONS

*AO Kaspersky Lab* v. *Webroot Inc*, PTAB Case No. IPR2023-00895, Exhibit 2012: *Webroot, Inc. and Open Text Inc., v. Sophos Ltd.*, Case No. 6:22-cv-240-ADA-DTG, Defendant's Preliminary Invalidity Contentions (W.D. Tex., Sep. 13, 2022), 127 pgs.
*AO Kaspersky Lab* v. *Webroot Inc*, PTAB Case No. IPR2023-00895, Exhibit 2013: *Webroot, Inc. and Open Text Inc., v. AO Kaspersky Lab et al.*, Case No. 6:22-cv-243-ADA-DTG, Claim Construction Order, Dkt. 236 (W.D. Tex. Mar. 16, 2023), 20 pgs.
*AO Kaspersky Lab* v. *Webroot Inc*, PTAB Case No. IPR2023-00895, Exhibit 2014: Setting Repository Visibility, Github Docs, https://docs.github.com/en/repositories/managing-your-repositorys-settings-and-features/managing-repository-settings/setting-repository-visibility (last visited Sep. 11, 2023), 3 pgs.
*AO Kaspersky Lab* v. *Webroot Inc*, PTAB Case No. IPR2023-00895, Exhibit 2015: Calendar of archives for https://github.com/ivanfratric/ropguard, Internet Archive Wayback Machine, at https://web.archive.org/web/20180401000000*/https://github.com/iva nfratric/ropguard (last visited Sep. 11, 2023), 2 pgs.
*AO Kaspersky Lab* v. *Webroot Inc*, PTAB Case No. IPR2023-00895, Exhibit 2016: Reviewing Your Security Log, Github Docs, at https://docs.github.com/en/authentication/keeping-your-account-and-data-secure/reviewing-your-security-log (last visited Sep. 11, 2023), 6 pgs.
*AO Kaspersky Lab* v. *Webroot Inc*, PTAB Case No. IPR2023-00895, Decision denying Institution of Inter Partes Review, Dec. 7, 2023, 12 pgs.
*AO Kaspersky Lab* v. *Webroot Inc*, PTAB Case No. IPR2023-00895, Petitioner's Request for Rehearing, Jan. 5, 2024, 20 pgs.
*AO Kaspersky Lab* v. *Webroot Inc*, PTAB Case No. IPR2023-00895, Exhibit 1032: Fratric, Runtime Prevention of Return-Oriented Programming Attacks, Sep. 24, 2012, 16 pgs.
*AO Kaspersky Lab* v. *Webroot Inc*, PTAB Case No. IPR2023-00895, Exhibit 1033: Fratric, Abstract of Runtime Prevention of Return-Oriented Programming Attacks, Jan. 5, 2024, 1 pgs.
*AO Kaspersky Lab* v. *Webroot Inc*, PTAB Case No. IPR2023-00895, Exhibit 1034, Jan. 5, 2024, 2 pgs.
*AO Kaspersky Lab* v. *Webroot Inc*, PTAB Case No. IPR2023-00895, Exhibit 1035: Email re: Subpoena served on GitHub, Dec. 6, 2023, 1 pg.
*AO Kaspersky Lab* v. *Webroot Inc*, PTAB Case No. IPR2023-00895, Exhibit 1036: screenshot of Ivan Fratric communication dated Dec. 23, 2023, 1 pg.
*AO Kaspersky Lab* v. *Webroot Inc*, PTAB Case No. IPR2023-00895, Exhibit 1037: screenshot of post of Ivan Fratric post dated Aug. 26, 2012, 1 pg.
*AO Kaspersky Lab* v. *Webroot Inc*, PTAB Case No. IPR2023-00895, Exhibit 1038: Ivan Fratric's Security Blog dated Dec. 28, 2023, 3 pgs.
*AO Kaspersky Lab* v. *Webroot Inc*, PTAB Case No. IPR2023-00895, Exhibit 1039: Ivan Fratric's Security Blog dated Sep. 29, 2012, 16 pgs.
*AO Kaspersky Lab* v. *Webroot Inc*, PTAB Case No. IPR2023-00895, Exhibit 1040: Google Code archive for Runtime Prevention of Return-Oriented Programming Attacks, Dec. 28, 2023, 1 pg.
*AO Kaspersky Lab* v. *Webroot Inc*, PTAB Case No. IPR2023-00895, Exhibit 1041: Twitter listing of Users who reposted this post / X, Dec. 28, 2023, 4 pgs.
*AO Kaspersky Lab* v. *Webroot Inc*, PTAB Case No. IPR2023-00895, Exhibit 1042: screenshot of Twitter posts, Jan. 5, 2024, 1 pg.
*Crowdstrike, Inc.* v. *Webroot Inc.*, PTAB Case No. IPR2023-00124, Decision Granting Institution of Inter Partes Review, Jun. 15, 2023, 48 pgs.
*Crowdstrike, Inc.* v. *Webroot Inc.*, PTAB Case No. IPR2023-00124, Scheduling Order, Jun. 15, 2023, 12 pgs.
*Crowdstrike, Inc.* v. *Webroot Inc.*, PTAB Case No. IPR2023-00124, Patent Owner's Request for Rehearing, Jun. 29, 2023, 19 pgs.
*Crowdstrike, Inc.* v. *Webroot Inc.*, PTAB Case No. IPR2023-00124, Patent Owner's Updated Exhibit List, Jun. 29, 2023, 6 pgs.

*Crowdstrike, Inc.* v. *Webroot Inc.*, PTAB Case No. IPR2023-00124, Exhibit 2024: *Webroot, Inc. and Open Text Inc.* v. *AO Kaspersky Lab et al.*, Case No. 6:22-cv-243-ADA-DTG, Claim Construction Order, Dkt. 236 (W.D. Tex. Mar. 16, 2023), 20 pgs.
*Crowdstrike, Inc.* v. *Webroot Inc.*, PTAB Case No. IPR2023-00124, Patent Owner's Objections to Evidence submitted by Petitioner, Jun. 30, 2023, 6 pgs.
*Crowdstrike, Inc.* v. *Webroot Inc.*, PTAB Case No. IPR2023-00124, Patent Owner's Response to Petition, Sep. 7, 2023, 81 pgs.
*Crowdstrike, Inc.* v. *Webroot Inc.*, PTAB Case No. IPR2023-00124, Exhibit 2025: *CrowdStrike, Inc.* v. *Open Text Inc.*, IPR2023-00126, Deposition Transcript of Wenke Lee, Ph.D., dated Jul. 17, 2023, 269 pgs.
*Crowdstrike, Inc.* v. *Webroot Inc.*, PTAB Case No. IPR2023-00124, Exhibit 2026: Second Declaration of Professor Nenad Medvidovic, Ph.D., Sep. 7, 2023, 83 pgs.
*Crowdstrike, Inc.* v. *Webroot Inc.*, PTAB Case No. IPR2023-00124, Exhibit 2027: Email chain from Brian Eutermoser to Hunter Horton regarding *CrowdStrike, Inc.* v. *Open Text Inc.* | IPR2023-00124 -r. Lee deposition, Aug. 18, 2023, 2 pgs.
*Crowdstrike, Inc.* v. *Webroot Inc.*, PTAB Case No. IPR2023-00124, Decision denying Patent Owner's Request on Rehearing of Decision granting Institution of Inter Partes Review, Oct. 13, 2023, 11 pgs.
*Crowdstrike, Inc.* v. *Webroot Inc.*, PTAB Case No. IPR2023-00124, Panel Change Order, Nov. 6, 2023, 3 pgs.
*Crowdstrike, Inc.* v. *Webroot Inc.*, PTAB Case No. IPR2023-00124, Joint Motion to Terminate Proceeding, Nov. 20, 2023, 10 pgs.
*Crowdstrike, Inc.* v. *Webroot Inc.*, PTAB Case No. IPR2023-00124, Joint Request to Treat Agreement as Business Confidential Information, Nov. 20, 2023, 5 pgs.
*Crowdstrike, Inc.* v. *Webroot Inc.*, PTAB Case No. IPR2023-00124, Decision granting Institution of Inter Parties Review and granting Motion for Joinder, Dec. 21, 2023, 10 pgs.
*Crowdstrike, Inc.* v. *Webroot Inc.*, PTAB Case No. IPR2023-00124, Order on Settlement as to CrowdStrike, Inc., Jan. 5, 2024, 5 pgs.
*Crowdstrike, Inc.* v. *Webroot Inc.*, PTAB Case No. IPR2023-00124, Petitioner's Reply to Patent Owner's Response, Jan. 8, 2024, 27 pgs.
*Crowdstrike, Inc.* v. *Webroot Inc.*, PTAB Case No. IPR2023-00124, Exhibit 1035: *Webroot, Inc. and Open Text Inc.* v. *AO Kaspserksy Lab, et al.*, Case No. 6:22-cv-243-ADA-DTG, Joint Claim Construction Statement, Dkt 185 (W.D. Tex., Feb. 20, 23), 12 pgs.
*Crowdstrike, Inc.* v. *Webroot Inc.*, PTAB Case No. IPR2023-00124, Exhibit 1036, Robert Sedgewick, Algorithms in C: Graph Algorithms ($3^{rd}$ ed.), Pearson Education, 2002, 571 pgs.
*Crowdstrike, Inc.* v. *Webroot Inc.*, PTAB Case No. IPR2023-00124, Exhibit 1037: David B. Guralnik, Webster's New World Dictionary of the American Language, 1984, 3 pgs.
*Trend Micro, Inc.* v. *Webroot Inc.*, PTAB Case No. IPR2023-00677, Replacement Exhibit 1002: Expert Declaration of Dr. Seth Nielson, Jul. 17, 2023, 138 pgs.
*Trend Micro, Inc.* v. *Webroot Inc.*, PTAB Case No. IPR2023-00677, Patent Owner's Preliminary Response, Aug. 10, 2023, 80 pgs.
*Trend Micro, Inc.* v. *Webroot Inc.*, PTAB Case No. IPR2023-00677, Exhibit 2001: Declaration of Professor Nenad Medvidovic, Ph.D., Aug. 10, 2023, 64 pgs.
*Trend Micro, Inc.* v. *Webroot Inc.*, PTAB Case No. IPR2023-00677, Exhibit 2002: Curriculum Vitae of Professor Nenad Medvidovic, Ph.D., Jul. 2022, 71 pgs.
*Trend Micro, Inc.* v. *Webroot Inc.*, PTAB Case No. IPR2023-00677, Exhibit 2003: *Webroot, Inc., Open Text Inc., v. AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.
*Trend Micro, Inc.* v. *Webroot Inc.*, PTAB Case No. IPR2023-00677, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Trend Micro, Inc.* v. *Webroot Inc.*, PTAB Case No. IPR2023-00677, Exhibit 2005: *mCom IP, LLC* v. *Cisco Systems, Inc.*, Case No.

(56) References Cited

OTHER PUBLICATIONS

6:22-cv-00261-ADA, Order Denying Defendant's Motion to Stay Pending Inter Partes Review, Dkt. 42 (W.D. Tex., Oct. 20, 2022), 7 pgs.
*Trend Micro, Inc.* v. *Webroot Inc.*, PTAB Case No. IPR2023-00677, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Trend Micro, Inc.* v. *Webroot Inc.*, PTAB Case No. IPR2023-00677, Exhibit 2007: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Trend Micro, Inc.* v. *Webroot Inc.*, PTAB Case No. IPR2023-00677, Exhibit 2008: Dani Kass, "Catching Up On Patent Litigation With Judge Albright" (Law360 Mar. 14, 2023); at https://www.law360.com/pulse/articles/1582438/print?section=pulse/courts, 3 pgs.
*Trend Micro, Inc.* v. *Webroot Inc.*, PTAB Case No. IPR2023-00677, Exhibit 2009: U.S. District Courts—Federal Court Management Statistics—Profiles—During the 12-month Periods Ending Mar. 31, 2018 Through 2023, "Table N/A—U.S. District Courts—Combined Civil and Criminal Federal Court Management Statistics (Mar. 31, 2023)," available at https://www.uscourts.gov/sites/default/files/data_tables/fcms_na_distprofile0331.2023.pdf, Mar. 31, 2023, 95 pgs.
*Trend Micro, Inc.* v. *Webroot Inc.*, PTAB Case No. IPR2023-00677, Exhibit 2010: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Trend Micro, Inc.* v. *Webroot Inc.*, PTAB Case No. IPR2023-00677, Exhibit 2011: *Webroot, Inc. and Open Text Inc.*, v. *Trend Micro Inc*, Case No. 6:22-cv-00239-ADA-DTG, Defendant Trend Micro's Preliminary Invalidity Contentions (W.D. Tex., Sep. 13, 2022), 125 pgs.
*Trend Micro, Inc.* v. *Webroot Inc.*, PTAB Case No. IPR2023-00677, Exhibit 2012: *Webroot, Inc. and Open Text Inc.*, v. *Trend Micro Inc.*, Case No. 6:22-cv-00239-ADA-DTG, Plaintiff's Preliminary Infringement Contentions (W.D. Tex., Jul. 13, 2022), 10 pgs.
*Trend Micro, Inc.* v. *Webroot Inc.*, PTAB Case No. IPR2023-00677, Exhibit 2013: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022), 16 pgs.
*Trend Micro, Inc.* v. *Webroot Inc.*, PTAB Case No. IPR2023-00677, Exhibit 2014: *Webroot, Inc. and Open Text Inc.*, v. *Trend Micro Inc.*, Case No. 6:22-cv-00239-ADA, Complaint for Patent Infringement, Dkt. 1 (W.D. Tex., Mar. 4, 2022), 117 pgs.
*Trend Micro, Inc.* v. *Webroot Inc.*, PTAB Case No. IPR2023-00677, Exhibit 2015: *Webroot, Inc. and Open Text Inc.*, v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.
*Trend Micro, Inc.* v. *Webroot Inc.*, PTAB Case No. IPR2023-00677, Exhibit 2016: *Open Text Inc et al.*, v. *AO Kaspersky Lab*, Case No. 6:22-cv-00243-ADA-DTG, First Amended Complaint for Patent Infringement, Dkt. 80 (W.D. Tex., Oct. 27, 2022), 148 pgs.
*Trend Micro, Inc.* v. *Webroot Inc.*, PTAB Case No. IPR2023-00677, Exhibit 2017: *Webroot, Inc. and Open Text Inc.*, v. *Trend Micro Inc.*, Case No. 6:22-cv-00239-ADA-DTG, First Amended Complaint for Patent Infringement, Dkt. 53 (W.D. Tex., Sept. 7, 2022), 235 pgs.
*Trend Micro, Inc.* v. *Webroot Inc.*, PTAB Case No. IPR2023-00677, Exhibit 2018: *Webroot, Inc. and Open Text Inc.*, v. *Sophos, Ltd.*, Case No. 6:22-cv-00240-ADA-DTG, Second Amended Complaint for Patent Infringement, Dkt. 76 (W.D. Tex., Oct. 24, 2022), 184 pgs.
*Trend Micro, Inc.* v. *Webroot Inc.*, PTAB Case No. IPR2023-00677, Exhibit 2019: *Webroot, Inc. and Open Text Inc.*, v. *CrowdStrike, Inc. and CrowdStrike Holdings, Inc.*, Case No. 6:22-cv-00241OADA-DTG, Defendant's Preliminary Invalidity Contentions (W.D. Tex., Sep. 13, 2022), 62 pgs.
*Trend Micro, Inc.* v. *Webroot Inc.*, PTAB Case No. IPR2023-00677, Sotera Stipulation, Sep. 28, 2023, 3 pgs.
*Trend Micro, Inc.* v. *Webroot Inc.*, PTAB Case No. IPR2023-00677, Order Conduct of Proceeding, Sep. 28, 2023, 6 pgs.
*Trend Micro, Inc.* v. *Webroot Inc.*, PTAB Case No. IPR2023-00677, Exhibit 3001: email re: Sotera stipulation, Sep. 28, 2023, 2 pgs.
*Trend Micro, Inc.* v. *Webroot Inc.*, PTAB Case No. IPR2023-00677, Decision denying institution of Inter Parties Review, Nov. 6, 2023, 24 pgs.
*AO Kaspersky Lab* v. *Webroot Inc.*, PTAB Case No. IPR2023-01199, Patent Owner Open Text Inc.'s Mandatory Notices Pursuant to 37 CFR § 42.8(b), Aug. 4, 2023, 10 pgs.
*AO Kaspersky Lab* v. *Webroot Inc.*, PTAB Case No. IPR2023-01199, Notice of Filing Date Accorded to Petition and Time for Filing Patent Owner Preliminary Response, Sep. 19, 2023, 6 pgs.
*AO Kaspersky Lab* v. *Webroot Inc.*, PTAB Case No. IPR2023-01199, Patent Owner's Preliminary Response, Dec. 19, 2023, 14 pgs.
*AO Kaspersky Lab* v. *Webroot Inc.*, PTAB Case No. IPR2023-01199, Exhibit 2001: *Webroot, Inc. and Open Text Inc.* v. *AO Kaspersky Lab*, Case No. 6:22-cv-00243-ADA, Complaint, Dkt. 1 (W.D. Tex., Mar. 4, 2022), Dec. 19, 2023, 115 pgs.
*AO Kaspersky Lab* v. *Webroot Inc.*, PTAB Case No. IPR2023-01199, Exhibit 2002: *Webroot, Inc. and Open Text Inc.* v. *AO Kaspersky Lab*, Case No. 6:22-cv-00243-ADA, Waiver of the Service of Summons, Dkt. 16 (W.D. Tex., May 25, 2022), Dec. 19, 2023, 1 pgs.
*AO Kaspersky Lab* v. *Webroot Inc.*, PTAB Case No. IPR2023-01199, Exhibit 2003: Email chain from PTAB Trials to E. Block re *Crowdstrike* v. *Open Text Inc.* —IPR2023-00124 & IPR2023-001199 (U.S. Pat. No. 9,578,045) / Conference Call, (dated Nov. 21, 2023) , Dec. 19, 2023, 4 pgs.
*AO Kaspersky Lab* v. *Webroot Inc.*, PTAB Case No. IPR2023-01199, Decision granting Inter Partes Review and Motion for Joinder, Dec. 21, 2023, 10 pgs.
*AO Kaspersky Lab* v. *Webroot Inc.*, PTAB Case No. IPR2023-01199, Petitioner's Reply to Patent Owner's Response, Dec. 28, 2023, 27 pgs.
*AO Kaspersky Lab* v. *Webroot Inc.*, PTAB Case No. IPR2023-01199, Exhibit 1035: *Webroot, Inc. and Open Text Inc.* v. *AO Kaspserksy Lab*, et al., Case No. 6:22-cv-243-ADA-DTG, Joint Claim Construction Statement, Dkt 185 (W.D. Tex., Feb. 20, 23), 12 pgs.
*AO Kaspersky Lab* v. *Webroot Inc.*, PTAB Case No. IPR2023-01199, Exhibit 1036, Robert Sedgewick, Algorithms in C: Graph Algorithms (3$^{rd}$ ed.), Pearson Education, 2002, 571 pgs.
*AO Kaspersky Lab* v. *Webroot Inc.*, PTAB Case No. IPR2023-01199, Exhibit 1037: David B. Guralnik, Webster's New World Dictionary of the American Language, 1984, 3 pgs.
*Crowdstrike, Inc.* v. *Webroot Inc.*, PTAB Case No. IPR2023-00126, Patent Owner's Response to Petition, Jul. 28, 2023, 71 pgs.
*Crowdstrike, Inc.* v. *Webroot Inc.*, PTAB Case No. IPR2023-00126, Exhibit 2022: Deposition Transcript of Wendke Lee Ph.D, dated Jul. 17, 2023, *Crowdstrike, Inc.* v. *Open Text Inc.*, Jul. 28, 2023, 268 pgs.
*Crowdstrike, Inc.* v. *Webroot Inc.*, PTAB Case No. IPR2023-00126, Exhibit 2023: Second Declaration of Professor Nenad Medvidovic, Jul. 28, 2023, 73 pgs.
*Crowdstrike, Inc.* v. *Webroot Inc.*, PTAB Case No. IPR2023-00126, Patent Owner Open Text Inc.'s Second Updated Mandatory Notices, Oct. 3, 2023, 10 pgs.
*Crowdstrike, Inc.* v. *Webroot Inc.*, PTAB Case No. IPR2023-00126, Joint Motion to Modify Due Dates 2 and 3, Oct. 6, 2023, 4 pgs.
*Crowdstrike, Inc.* v. *Webroot Inc.*, PTAB Case No. IPR2023-00126, Joint Motion to Modify Due Dates 2 and 3, Oct. 20, 2023, 4 pgs.
*Crowdstrike, Inc.* v. *Webroot Inc.*, PTAB Case No. IPR2023-00126, Second Updated Joint Stipulation to Modify Due Dates 2 and 3, Nov. 7, 2023, 4 pgs.
*Crowdstrike, Inc.* v. *Webroot Inc.*, PTAB Case No. IPR2023-00126, Panel Change Order, Nov. 9, 2023, 3 pgs.

(56) References Cited

OTHER PUBLICATIONS

*Crowdstrike, Inc.* v. *Webroot Inc.*, PTAB Case No. IPR2023-00126, Decision denying Patent Owner's Request for Rehearing of Decision granting Institution of Inter Partes Review, Nov. 15, 2023, 11 pgs.
*Crowdstrike, Inc.* v. *Webroot Inc.*, PTAB Case No. IPR2023-00126, Joint Motion to Terminate Proceeding, Nov. 20, 2023, 10 pgs.
*Crowdstrike, Inc.* v. *Webroot Inc.*, PTAB Case No. IPR2023-00126, Joint Request to Treat Agreement as Business Confidential Information, Nov. 20, 2023, 5 pgs.
*Crowdstrike, Inc.* v. *Webroot Inc.*, PTAB Case No. IPR2023-00126, Decision instituting Inter Partes Review and granting Petitioner's Motion for Joinder Nov. 28, 2023, 6 pgs.
*Crowdstrike, Inc.* v. *Webroot Inc.*, PTAB Case No. IPR2023-00126, Patent Owner's Request for Oral Argument, Dec. 22, 2023, 5 pgs.
*Crowdstrike, Inc.* v. *Webroot Inc.*, PTAB Case No. IPR2023-00126, Order Settlement as to Crowdstrike, Inc., Jan. 5, 2024, 4 pgs.
*Crowdstrike, Inc.* v. *Webroot Inc.*, PTAB Case No. IPR2023-00126, Order setting Oral Argument, Jan. 9, 2024, 9 pgs.
*Trend Micro, Inc.* v. *Webroot Inc.*, PTAB Case No. IPR2023-00657, Patent Owner's Preliminary Response, Jul. 17, 2023, 73 pgs.
*Trend Micro, Inc.* v. *Webroot Inc.*, PTAB Case No. IPR2023-00657, Exhibit 2001: Declaration of Professor Nenad Medvidovic, Ph.D., Jul. 17, 2023, 59 pgs.
*Trend Micro, Inc.* v. *Webroot Inc.*, PTAB Case No. IPR2023-00657, Exhibit 2002: Curriculum Vitae of Professor Nenad Medvidovic, Ph.D., Jul. 2022, 71 pgs.
*Trend Micro, Inc.* v. *Webroot Inc.*, PTAB Case No. IPR2023-00657, Exhibit 2003: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.
*Trend Micro, Inc.* v. *Webroot Inc.*, PTAB Case No. IPR2023-00657, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Trend Micro, Inc.* v. *Webroot Inc.*, PTAB Case No. IPR2023-00657, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Trend Micro, Inc.* v. *Webroot Inc.*, PTAB Case No. IPR2023-00657, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Trend Micro, Inc.* v. *Webroot Inc.*, PTAB Case No. IPR2023-00657, Exhibit 2007: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Trend Micro, Inc.* v. *Webroot Inc.*, PTAB Case No. IPR2023-00657, Exhibit 2008: Dani Kass, "Catching Up On Patent Litigation With Judge Albright" (Law360 Mar. 14, 2023); at https://www.law360.com/pulse/articles/1582438/print?section=pulse/courts, 3 pgs.
*Trend Micro, Inc.* v. *Webroot Inc.*, PTAB Case No. IPR2023-00657, Exhibit 2009: U.S. District Courts—Federal Court Management Statistics—Pro-files—During the 12-month Periods Ending Mar. 31, 2018 through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, Mar. 31, 2023, 95 pgs.
*Trend Micro, Inc.* v. *Webroot Inc.*, PTAB Case No. IPR2023-00657, Exhibit 2010: *Webroot, Inc. and Open Text Inc.*, v. *AO Kaspersky Lab et al.*, Case No. 6:22-cv-00243-ADA-DTG, Claim Construction Order, Dkt. 236 (W.D. Tex. Mar. 16, 2023), 20 pgs.
*Trend Micro, Inc.* v. *Webroot Inc.*, PTAB Case No. IPR2023-00657, Exhibit 2011: *Webroot, Inc. and Open Text Inc.*, v. *Trend Micro Inc*, Case No. 6:22-cv-00239-ADA-DTG, Defendant Trend Micro's Preliminary Invalidity Contentions (W.D. Tex., Sep. 13, 2022), 125 pgs.
*Trend Micro, Inc.* v. *Webroot Inc.*, PTAB Case No. IPR2023-00657, Exhibit 2012: *Webroot, Inc. and Open Text Inc.*, v. *Trend Micro Inc.*, Case No. 6:22-cv-00239-ADA-DTG, Plaintiff's Preliminary Infringement Contentions (W.D. Tex., Jul. 13, 2022), 10 pgs.
*Trend Micro, Inc.* v. *Webroot Inc.*, PTAB Case No. IPR2023-00657, Exhibit 2013: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022), 16 pgs.
*Trend Micro, Inc.* v. *Webroot Inc.*, PTAB Case No. IPR2023-00657, Exhibit 2014: *Webroot, Inc. and Open Text Inc.*, v. *Trend Micro Inc.*, Case No. 6:22-cv-00239-ADA, Complaint for Patent Infringement, Dkt. 1 (W.D. Tex., Mar. 4, 2022), 117 pgs.
*Trend Micro, Inc.* v. *Webroot Inc.*, PTAB Case No. IPR2023-00657, Exhibit 2015: *Webroot, Inc. and Open Text Inc.*, v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.
*Trend Micro, Inc.* v. *Webroot Inc.*, PTAB Case No. IPR2023-00657, Exhibit 2016: *Open Text Inc. et al.*, v. *AO Kaspersky Lab*, Case No. 6:22-cv-00243-ADA-DTG, First Amended Complaint for Patent Infringement, Dkt. 80 (W.D. Tex., Oct. 27, 2022), 148 pgs.
*Trend Micro, Inc.* v. *Webroot Inc.*, PTAB Case No. IPR2023-00657, Exhibit 2017: *Webroot, Inc. and Open Text Inc.*, v. *Trend Micro Inc.*, Case No. 6:22-cv-00239-ADA-DTG, First Amended Complaint for Patent Infringement, Dkt. 53 (W.D. Tex., Sept. 7, 2022), 235 pgs.
*Trend Micro, Inc.* v. *Webroot Inc.*, PTAB Case No. IPR2023-00657, Exhibit 2018: *Webroot, Inc. and Open Text Inc.*, v. *Sophos, Ltd.*, Case No. 6:22-cv-00240-ADA-DTG, Second Amended Complaint for Patent Infringement, Dkt. 76 (W.D. Tex., Oct. 24, 2022), 184 pgs.
*Trend Micro, Inc.* v. *Webroot Inc.*, PTAB Case No. IPR2023-00657, Exhibit 2019: *Webroot, Inc. and Open Text Inc.*, v. *CrowdStrike, Inc. and Crowdstrike Holdings, Inc.*, Case No. 6:22-cv-002410ADA-DTG, Defendant's Preliminary Invalidity Contentions (W.D. Tex., Sep. 13, 2022), 62 pgs.
*Trend Micro, Inc.* v. *Webroot Inc.*, PTAB Case No. IPR2023-00657, Exhibit 1017: Sotera Stipulation, Sep. 28, 2023, 3 pgs.
*Trend Micro, Inc.* v. *Webroot Inc.*, PTAB Case No. IPR2023-00657, Order Conduct of Proceeding, Sep. 28, 2023, 6 pgs.
*Trend Micro, Inc.* v. *Webroot Inc.*, PTAB Case No. IPR2023-00657, Exhibit 3001: email, Sep. 28, 2023, 2 pgs.
*Trend Micro, Inc.* v. *Webroot Inc.*, PTAB Case No. IPR2023-00657, Decision denying institution of Inter Parties Review, Oct. 13, 2023, 23 pgs.
*AO Kaspersky Lab* v. *Webroot Inc.*, PTAB Case No. IPR2023-01011, Patent Owner Open Text Inc.'s Mandatory Notices Pursuant to 37 CFR § 42.8(b), Jun. 23, 2023, 9 pgs.
*AO Kaspersky Lab* v. *Webroot Inc.*, PTAB Case No. IPR2023-01011, Patent Owner's Preliminary Response, Sep. 11, 2023, 6 pgs.
*AO Kaspersky Lab* v. *Webroot Inc.*, PTAB Case No. IPR2023-01011, Exhibit 2001: *CrowdStrike, Inc.* v. *Open Text Inc.*, IPR2023-00126, Paper 11 (PTAB May 19, 2023), 19 pgs.
*AO Kaspersky Lab* v. *Webroot Inc.*, PTAB Case No. IPR2023-01011, Exhibit 2002: *Webroot, Inc. and Open Text Inc.* v. *AO Kaspersky Lab*, Case No. 6:22-cv-00243-ADA-DTG, Wavier of Summons AO Kaspersky Labs, Dkt. 16 (E.D. Tex May 24, 2022), 1 pg.
*AO Kaspersky Lab* v. *Webroot Inc.*, PTAB Case No. IPR2023-01011, Decision instituting Inter Partes Review, Nov. 28, 2023, 6 pgs.
*AO Kaspersky Lab* v. *Webroot Inc.*, PTAB Case No. IPR2023-01011, Petitioner's Reply to Patent Owner's Response, Dec. 18, 2023, 27 pgs.
*AO Kaspersky Lab* v. *Webroot Inc.*, PTAB Case No. IPR2023-01011, Exhibit 1034: *Webroot, Inc. and Open Text Inc.* v. *AO Kaspserksy Lab, et al.*, Case No. 6:22-cv-243-ADA-DTG, Joint Claim Construction Statement, Dkt 185 (W.D. Tex., Feb. 20, 23), 12 pgs.

(56) References Cited

OTHER PUBLICATIONS

*AO Kaspersky Lab* v. *Webroot Inc.*, PTAB Case No. IPR2023-01011, Exhibit 1035, Robert Sedgewick, Algorithms in C: Graph Algorithms (3$^{rd}$ ed.), Pearson Education, 2002, 571 pgs.
*AO Kaspersky Lab* v. *Webroot Inc.*, PTAB Case No. IPR2023-01011, Exhibit 1036: David B. Guralnik, Webster's New World Dictionary of the American Language, 1984, 3 pgs.
*Sophos Ltd. and Sophos Inc.* v. *Webroot Inc.*, PTAB Case No. IPR2023-00731, Patent Owner's Preliminary Response, Aug. 10, 2023, 75 pgs.
*Sophos Ltd. and Sophos Inc.* v. *Webroot Inc.*, PTAB Case No. IPR2023-00731, Exhibit 2001: Declaration of Professor Ron Schnell, Aug. 10, 2023, 42 pgs.
*Sophos Ltd. and Sophos Inc.* v. *Webroot Inc.*, PTAB Case No. IPR2023-00731, Exhibit 2002: Curriculum Vitae of Professor Ron Schnell, Aug. 10, 2023, 5 pgs.
*Sophos Ltd. and Sophos Inc.* v. *Webroot Inc.*, PTAB Case No. IPR2023-00731, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Sophos Ltd. and Sophos Inc.* v. *Webroot Inc.*, PTAB Case No. IPR2023-00731, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Sophos Ltd. and Sophos Inc.* v. *Webroot Inc.*, PTAB Case No. IPR2023-00731, Exhibit 2005: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Sophos Ltd. and Sophos Inc.* v. *Webroot Inc.*, PTAB Case No. IPR2023-00731, Exhibit 2006: *Webroot, Inc. and Open Text Inc.,* v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Sophos Ltd. and Sophos Inc.* v. *Webroot Inc.*, PTAB Case No. IPR2023-00731, Exhibit 2007: Dani Kass, "Catching Up On Patent Litigation With Judge Albright" (Law360 Mar. 14, 2023); https://www.law360.com/pulse/articles/1582438/print?section=pulse/courts, 3 pgs.
*Sophos Ltd. and Sophos Inc.* v. *Webroot Inc.*, PTAB Case No. IPR2023-00731, Exhibit 2008: *Webroot, Inc. and Open Text Inc.,* v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Sophos Ltd. and Sophos Inc.* v. *Webroot Inc.*, PTAB Case No. IPR2023-00731, Exhibit 2009: U.S. District Courts—Federal Court Management Statistics—Profiles—During the 12-Month Periods Ending Mar. 31, 2018 through 2023, "Table N/A—U.S. District Courts—Combined Civil and Criminal Federal Court Management Statistics (Mar. 31, 2023)", available at https://www.uscourts.gov/sites/default/files/data_tables/fcms_na_d istprofile0331.2023.pdf, Mar. 31, 2023, 95 pgs.
*Sophos Ltd. and Sophos Inc.* v. *Webroot Inc.*, PTAB Case No. IPR2023-00731, Exhibit 2010: *Webroot, Inc. and Open Text Inc.,* v. *AO Kaspersky Lab et al.*, Case No. 6:22-cv-243-ADA-DTG, Jul. 25, 2023 Claim Construction Order, Dkt. 391 (W.D. Tex. Jul. 25, 2022), 19 pgs.
*Sophos Ltd. and Sophos Inc.* v. *Webroot Inc.*, PTAB Case No. IPR2023-00731, Exhibit 2011: *Webroot, Inc. and Open Text Inc.,* v. *CrowdStrike, Inc. and CrowdStrike Holdings, Inc.*, Case No. 6:22-cv-00241-ADA-DTG, Defendant's Preliminary Invalidity Contentions (W.D. Tex., Feb. 21, 2023) (excerpted), 17 pgs.
*Sophos Ltd. and Sophos Inc.* v. *Webroot Inc.*, PTAB Case No. IPR2023-00731, Exhibit 2012: *Webroot, Inc. and Open Text Inc.,* v. *Trend Micro, Inc.*, Case No. 6:22-cv-00239-ADA-DTG, Defendant's Preliminary Invalidity Contentions (W.D. Tex., Feb. 21, 2023) (excerpted), 15 pgs.
*Sophos Ltd. and Sophos Inc.* v. *Webroot Inc.*, PTAB Case No. IPR2023-00731, Exhibit 2013: *Webroot, Inc. and Open Text Inc.*, v. *AO Kaspersky Lab*, Case No. 6:22-cv-00243-ADA-DTG, Defendant's Preliminary Invalidity Contentions Appendix C (W.D. Tex., Feb. 21, 2023) (excerpted), 4 pgs.
*Sophos Ltd. and Sophos Inc.* v. *Webroot Inc.*, PTAB Case No. IPR2023-00731, Exhibit 2014: Website: About ResearchGate, https://www.researchgate.net/about, 7 pgs.
*Sophos Ltd. and Sophos Inc.* v. *Webroot Inc.*, PTAB Case No. IPR2023-00731, Exhibit 2015: Website: "Google Announces Beta Release of Google Scholar," Univ. of Calif. (Nov. 17, 2004); available at https://osc.universityofcalifornia.edu/2004/11/google-announces-beta-release-of-google-scholar/, 2 pgs.
*Sophos Ltd. and Sophos Inc.* v. *Webroot Inc.*, PTAB Case No. IPR2023-00731, Revised Mandatory Notices, Aug. 30, 2023, 5 pgs.
*Sophos Ltd. and Sophos Inc.* v. *Webroot Inc.*, PTAB Case No. IPR2023-00731, Board Exhibit 3001, Sep. 18, 2023, 3 pgs.
*Sophos Ltd. and Sophos Inc.* v. *Webroot Inc.*, PTAB Case No. IPR2023-00731, Panel Change Order, Sep. 18, 2023, 3 pgs.
*Sophos Ltd. and Sophos Inc.* v. *Webroot Inc.*, PTAB Case No. IPR2023-00731, Order—Conduct of the Proceeding, Oct. 2, 2023, 3 pgs.
*Sophos Ltd. and Sophos Inc.* v. *Webroot Inc.*, PTAB Case No. IPR2023-00731, Motion to Dismiss Petition for Inter Partes Review, Oct. 10, 2023, 10 pgs.
*Sophos Ltd. and Sophos Inc.* v. *Webroot Inc.*, PTAB Case No. IPR2023-00731, Patent Owner's Opposition to Petitioners' Motion to Dismiss Petition, Oct. 13, 2023, 9 pgs.
*Sophos Ltd. and Sophos Inc.* v. *Webroot Inc.*, PTAB Case No. IPR2023-00731, Patent Owner's Updated Exhibit List, Oct. 13, 2023, 6 pgs.
*Sophos Ltd. and Sophos Inc.* v. *Webroot Inc.*, PTAB Case No. IPR2023-00731, Exhibit 2016: Best email to Eutermoser, Oct. 13, 2023, 3 pgs.
*Sophos Ltd. and Sophos Inc.* v. *Webroot Inc.*, PTAB Case No. IPR2023-00731, Exhibit 3002: Board email to Best, Oct. 16, 2023, 3 pgs.
*Sophos Ltd. and Sophos Inc.* v. *Webroot Inc.*, PTAB Case No. IPR2023-00731, Order denying Motion to Dismiss, Nov. 1, 2023, 6 pgs.
*Sophos Ltd. and Sophos Inc.* v. *Webroot Inc.*, PTAB Case No. IPR2023- 00731, Decision denying Institution of Inter Partes Review, Nov. 2, 2023, 20 pgs.
*Sophos Ltd. and Sophos Inc.* v. *Webroot Inc.*, PTAB Case No. IPR2023-00731, Petitioners' Request for Rehearing by the Director, Dec. 4, 2023, 17 pgs.
*Sophos Ltd. and Sophos Inc.* v. *Webroot Inc.*, PTAB Case No. IPR2023-00731, Exhibit 3100: Best email re Request for Rehearing by the Director, Dec. 5, 2023, 2 pgs.
*Sophos Ltd. and Sophos Inc.* v. *Webroot Inc.*, PTAB Case No. IPR2023-00731, Order Denying Director Review, Dec. 21, 2023, 3 pgs.
*Crowdstrike, Inc.* v. *Open Text Inc.*, PTAB Case No. IPR2023-01052, Notice of Filing Date Accorded to Petition and Time for Filing Patent Owner Preliminary Response, Aug. 23, 2023, 6 pgs.
*Crowdstrike, Inc.* v. *Webroot Inc.*, PTAB Case No. IPR2023-01052, Joint Motion to Terminate Proceeding, Nov. 20, 2023, 9 pgs.
*Crowdstrike, Inc.* v. *Open Text Inc.*, PTAB Case No. IPR2023-01052, Joint Request to Treat Agreement as Business Confidential Information, Nov. 20, 2023, 5 pgs.
*Crowdstrike, Inc.* v. *Webroot Inc.*, PTAB Case No. IPR2023-01052, Decision, Settlement Prior to Institution of Trial, Dec. 4, 2023, 5 pgs.
*Crowdstrike, Inc.* v. *Webroot Inc.*, PTAB Case No. IPR2023-01052, Exhibit 3001: Email regarding Joint Motion to Terminate Proceeding, Dec. 4, 2023, 2 pgs.
*Sophos Ltd. and Sophos Inc.* v. *Webroot Inc.*, PTAB Case No. IPR2023-00732, Patent Owner's Preliminary Response, Aug. 10, 2023, 75 pgs.

(56) References Cited

OTHER PUBLICATIONS

*Sophos Ltd. and Sophos Inc. v. Webroot Inc.*, PTAB Case No. IPR2023-00732, Exhibit 2001: Declaration of Professor Ron Schnell, Aug. 10, 2023, 41 pgs.
*Sophos Ltd. and Sophos Inc. v. Webroot Inc.*, PTAB Case No. IPR2023-00732, Exhibit 2002: Curriculum Vitae of Professor Ron Schnell, Aug. 10, 2023, 5 pgs.
*Sophos Ltd. and Sophos Inc. v. Webroot Inc.*, PTAB Case No. IPR2023-00732, Exhibit 2003: *Sonrai Memory Ltd. v. Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Sophos Ltd. and Sophos Inc. v. Webroot Inc.*, PTAB Case No. IPR2023-00732, Exhibit 2004: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Sophos Ltd. and Sophos Inc. v. Webroot Inc.*, PTAB Case No. IPR2023-00732, Exhibit 2005: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Sophos Ltd. and Sophos Inc. v. Webroot Inc.*, PTAB Case No. IPR2023-00732, Exhibit 2006: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Sophos Ltd. and Sophos Inc. v. Webroot Inc.*, PTAB Case No. IPR2023-00732, Exhibit 2007: Dani Kass, "Catching Up On Patent Litigation With Judge Albright" (Law360 Mar. 14, 2023); https://www.law360.com/pulse/articles/1582438/print?section=pulse/courts, 3 pgs.
*Sophos Ltd. and Sophos Inc. v. Webroot Inc.*, PTAB Case No. IPR2023-00732, Exhibit 2008: *Webroot, Inc. and Open Text Inc.*, v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Sophos Ltd. and Sophos Inc. v. Webroot Inc.*, PTAB Case No. IPR2023-00732, Exhibit 2009: U.S. District Courts—Federal Court Management Statistics—Profiles—During the 12-Month Periods Ending Mar. 31, 2018 through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, Mar. 31, 2023, 95 pgs.
*Sophos Ltd. and Sophos Inc. v. Webroot Inc.*, PTAB Case No. IPR2023-00732, Exhibit 2010: *Webroot, Inc. and Open Text Inc.*, v. *AO Kaspersky Lab et al.*, Case No. 6:22-cv-243-ADA-DTG, Jul. 25, 2023 Claim Construction Order, Dkt. 391 (W.D. Tex. Jul. 25, 2022), 19 pgs.
*Sophos Ltd. and Sophos Inc. v. Webroot Inc.*, PTAB Case No. IPR2023-00732, Exhibit 2011: *Webroot, Inc. and Open Text Inc.*, v. *CrowdStrike, Inc. and CrowdStrike Holdings, Inc.*, Case No. 6:22-cv-00241-ADA-DTG, Defendant's Preliminary Invalidity Contentions (W.D. Tex., Feb. 21, 2023) (excerpted), 17 pgs.
*Sophos Ltd. and Sophos Inc. v. Webroot Inc.*, PTAB Case No. IPR2023-00732, Exhibit 2012: *Webroot, Inc. and Open Text Inc.*, v. *Trend Micro, Inc.*, Case No. 6:22-cv-00239-ADA-DTG, Defendant's Preliminary Invalidity Contentions (W.D. Tex., Feb. 21, 2023) (excerpted), 15 pgs.
*Sophos Ltd. and Sophos Inc. v. Webroot Inc.*, PTAB Case No. IPR2023-00732, Exhibit 2013: *Webroot, Inc. and Open Text Inc.*, v. *AO Kaspersky Lab*, Case No. 6:22-cv-00243-ADA-DTG, Defendant's Preliminary Invalidity Contentions Appendix C (W.D. Tex., Feb. 21, 2023) (excerpted), 4 pgs.
*Sophos Ltd. and Sophos Inc. v. Webroot Inc.*, PTAB Case No. IPR2023-00732, Exhibit 2014: Website: About ResearchGate, https://www.researchgate.net/about, 7 pgs.
*Sophos Ltd. and Sophos Inc. v. Webroot Inc.*, PTAB Case No. IPR2023-00732, Exhibit 2015: Website: "Google Announces Beta Release of Google Scholar," Univ. of Calif. (Nov. 17, 2004); available at https://osc.universityofcalifornia.edu/2004/11/google-announces-beta-release-of-google-scholar/, 2 pgs.
*Sophos Ltd. and Sophos Inc. v. Webroot Inc.*, PTAB Case No. IPR2023-00732, Exhibit 2016: U.S. Pat. No. 8,201,243 File History (Sophos Ex. 1002 IPR2023-00731), 423 pgs.
*Sophos Ltd. and Sophos Inc. v. Webroot Inc.*, PTAB Case No. IPR2023-00732, Revised Mandatory Notices, Aug. 30, 2023, 5 pgs.
*Sophos Ltd. and Sophos Inc. v. Webroot Inc.*, PTAB Case No. IPR2023-00732, Panel Change Order, Sep. 12, 2023, 3 pgs.
*Sophos Ltd. and Sophos Inc. v. Webroot Inc.*, PTAB Case No. IPR2023-00732, Board Exhibit 3001, Sep. 15, 2023, 3 pgs.
*Sophos Ltd. and Sophos Inc. v. Webroot Inc.*, PTAB Case No. IPR2023-00732, Order Conduct of the Proceeding, Oct. 2, 2023, 3 pgs.
*Sophos Ltd. and Sophos Inc. v. Webroot Inc.*, PTAB Case No. IPR2023-00732, Motion to Dismiss Petition for Inter Partes Review, Oct. 10, 2023, 10 pgs.
*Sophos Ltd. and Sophos Inc. v. Webroot Inc.*, PTAB Case No. IPR2023-00732, Patent Owner's Updated Exhibit List, Oct. 13, 2023, 6 pgs.
*Sophos Ltd. and Sophos Inc. v. Webroot Inc.*, PTAB Case No. IPR2023-00732, Exhibit 2017: email from Best to Eutermoser, Oct. 13, 2023, 3 pgs.
*Sophos Ltd. and Sophos Inc. v. Webroot Inc.*, PTAB Case No. IPR2023-00732, Patent Owner's Opposition to Petitioners' Motion to Dismiss Petition, Oct. 13, 2023, 9 pgs.
*Sophos Ltd. and Sophos Inc. v. Webroot Inc.*, PTAB Case No. IPR2023-00732, Exhibit 3002, Oct. 16, 2023, 3 pgs.
*Sophos Ltd. and Sophos Inc. v. Webroot Inc.*, PTAB Case No. IPR2023-00732, Order denying Motion to Dismiss, Nov. 1, 2023, 6 pgs.
*Sophos Ltd. and Sophos Inc. v. Webroot Inc.*, PTAB Case No. IPR2023-00732, Decision denying Institution of Inter Partes Review, Nov. 2, 2023, 20 pgs.
*Crowdstrike, Inc. v. Open Text Inc.*, PTAB Case No. IPR2023-01051, Patent Owner Open Text Inc.'s Mandatory Notices Pursuant to 37 CFR § 42.8(b), Jul. 14, 2023, 6 pgs.
*Crowdstrike, Inc. v. Open Text Inc.*, PTAB Case No. IPR2023-01051, Notice of Filing Date Accorded to Petition and Time for Filing Patent Owner Preliminary Response, Aug. 23, 2023, 6 pgs.
*Crowdstrike, Inc. v. Open Text Inc.*, PTAB Case No. IPR2023-01051, Joint Motion to Terminate Proceeding, Nov. 20, 2023, 9 pgs.
*Crowdstrike, Inc. v. Open Text Inc.*, PTAB Case No. IPR2023-01051, Joint Request to Treat Agreement as Business Confidential Information, Nov. 20, 2023, 5 pgs.
*Crowdstrike, Inc. v. Webroot Inc.*, PTAB Case No. IPR2023-01051, Decision, Settlement Prior to Institution of Trial, Dec. 4, 2023, 5 pgs.
*Crowdstrike, Inc. v. Webroot Inc.*, PTAB Case No. IPR2023-01051, Exhibit 3001: Email regarding Joint Motion to Terminate Proceeding, Dec. 4, 2023, 2 pgs.
*Crowdstrike, Inc. v. Webroot Inc.*, PTAB Case No. IPR2023-01158, Notice of Filing Date Accorded to Petition and Time for Filing Patent Owner Preliminary Response, Aug. 23, 2023, 6 pgs.
*Crowdstrike, Inc. v. Webroot Inc.*, PTAB Case No. IPR2023-01158, Joint Motion to Terminate Proceeding, Nov. 20, 2023, 9 pgs.
*Crowdstrike, Inc. v. Open Text Inc.*, PTAB Case No. IPR2023-01158, Joint Request to Treat Agreement as Business Confidential Information, Nov. 20, 2023, 5 pgs.
*Crowdstrike, Inc. v. Webroot Inc.*, PTAB Case No. IPR2023-01158, Decision, Settlement Prior to Institution of Trial, Dec. 4, 2023, 5 pgs.
*Crowdstrike, Inc. v. Webroot Inc.*, PTAB Case No. IPR2023-01158, Exhibit 3001: Email regarding Joint Motion to Terminate Proceeding, Dec. 4, 2023, 2 pgs.
*Crowdstrike, Inc. v. Webroot Inc.*, PTAB Case No. IPR2023-01159, Patent Owner Open Text Inc.'s Mandatory Notices Pursuant to 37 CFR § 42.8(b), Jul. 21, 2023, 9 pgs.

(56) References Cited

OTHER PUBLICATIONS

*Crowdstrike, Inc.* v. *Webroot Inc.*, PTAB Case No. IPR2023-01159, Notice of Filing Date Accorded to Petition and Time for Filing Patent Owner Preliminary Response, Aug. 23, 2023, 6 pgs.
*Crowdstrike, Inc.* v. *Webroot Inc.*, PTAB Case No. IPR2023-01159, Joint Motion to Terminate Proceeding, Nov. 20, 2023, 9 pgs.
*Crowdstrike, Inc.* v. *Open Text Inc.*, PTAB Case No. IPR2023-01159, Joint Request to Treat Agreement as Business Confidential Information, Nov. 20, 2023, 5 pgs.
*Crowdstrike, Inc.* v. *Webroot Inc.*, PTAB Case No. IPR2023-01159, Decision, Settlement Prior to Institution of Trial, Dec. 4, 2023, 5 pgs.
*Crowdstrike, Inc.* v. *Webroot Inc.*, PTAB Case No. IPR2023-01159, Exhibit 3001: Email regarding Joint Motion to Terminate Proceeding, Dec. 4, 2023, 2 pgs.
*Forcepoint LLC* v. *Open Text, Inc.*, PTAB Case No. IPR2023-00786, Patent Owner's Preliminary Response to Petition for Inter Partes Review U.S. Pat. No. 10,025,928; Aug. 17, 2023, 59 pgs.
*Forcepoint LLC* v. *Open Text, Inc.*, PTAB Case No. IPR2023-00786, Exhibit 2001: Declaration of Professor Alessandro Orso, Ph.D., Aug. 17, 2023, 46 pgs.
*Forcepoint LLC* v. *Open Text, Inc.*, PTAB Case No. IPR2023-00786, Exhibit 2002: Curriculum Vitae of Alessandro Orso, Ph.D., May 2023, 52 pgs.
*Forcepoint LLC* v. *Open Text, Inc.*, PTAB Case No. IPR2023-00786, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Forcepoint LLC* v. *Open Text, Inc.*, PTAB Case No. IPR2023-00786, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Forcepoint LLC* v. *Open Text, Inc.*, PTAB Case No. IPR2023-00786, Exhibit 2005: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Forcepoint LLC* v. *Open Text, Inc.*, PTAB Case No. IPR2023-00786, Exhibit 2006: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Forcepoint LLC* v. *Open Text, Inc.*, PTAB Case No. IPR2023-00786, Exhibit 2007: Dani Kass, "Catching Up On Patent Litigation With Judge Albright" (Law360 Mar. 14, 2023); https://www.law360.com/pulse/articles/1582438/print?section=pulse/courts, 3 pgs.
*Forcepoint LLC* v. *Open Text, Inc.*, PTAB Case No. IPR2023-00786, Exhibit 2008: U.S. District Courts—Federal Court Management Statistics—Profiles—During the 12-Month Periods Ending Mar. 31, 2018 Through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, Mar. 31, 2023, 95 pgs.
*Forcepoint LLC* v. *Open Text, Inc.*, PTAB Case No. IPR2023-00786, Exhibit 2009: *Webroot, Inc. and Open Text Inc.*, v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Forcepoint LLC* v. *Open Text, Inc.*, PTAB Case No. IPR2023-00786, Exhibit 2010: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Forcepoint LLC* v. *Open Text, Inc.*, PTAB Case No. IPR2023-00786, Exhibit 2011: *Webroot, Inc. et al.* v. *AO Kaspersky Lab et al.*, No 6-22-cv-00243, Dkt. 121, Second Amended Complaint For Patent Infringement (Forcepoint LLC, Case No. 22-cv-00342-ADA-DTG) (W.D. Tex. Dec. 9, 2022), 338 pgs.
*Forcepoint LLC* v. *Open Text, Inc.*, PTAB Case No. IPR2023-00786, Exhibit 2012: *Webroot, Inc. and Open Text Inc.*, v. *Forcepoint LLC*, Case No. 6:22-cv-342-ADA-DTG, Defendant Forcepoint LLC's Preliminary Invalidity Contentions (W.D. Tex. Sep. 13, 2022) (excerpted), 9 pgs.
*Forcepoint LLC* v. *Open Text, Inc.*, PTAB Case No. IPR2023-00786, Petitioner Forcepoint LLC's Updated Mandatory Notices Pursuant to 37 CFR § 42.8, Oct. 25, 2023, 5 pgs.
*Forcepoint LLC* v. *Open Text, Inc.*, PTAB Case No. IPR2023-00786, Order, Conduct of Proceedings, Oct. 30, 2023, 4 pgs.
*Forcepoint LLC* v. *Open Text, Inc.*, PTAB Case No. IPR2023-00786, Notice of Stipulation regarding Invalidity Contentions, Nov. 1, 2023, 5 pgs.
*Forcepoint LLC* v. *Open Text, Inc.*, PTAB Case No. IPR2023-00786, Patent Owner's Reply to Stipulation, Nov. 3, 2023, 7 pgs.
*Forcepoint LLC* v. *Open Text, Inc.*, PTAB Case No. IPR2023-00786, Exhibit 2013: Defendant Forcepoint LLC's Final Invalidity Contentions, Nov. 3, 2023, 394 pgs.
*Forcepoint LLC* v. *Open Text, Inc.*, PTAB Case No. IPR2023-00786, Decision denying Institution of Inter Partes Review, Nov. 9, 2023, 24 pgs.
*Forcepoint LLC* v. *Open Text, Inc.*, PTAB Case No. IPR2023-00786, Petitioner's Request for Rehearing, Nov. 22, 2023, 12 pgs.
*Forcepoint LLC* v. *Open Text, Inc.*, PTAB Case No. IPR2023-00786, Petitioner's Unopposed Motion to Withdraw Request for Rehearing of the Board's Decision Denying Inter Partes Review, Nov. 22, 2023, 5 pgs.
*Forcepoint LLC* v. *Open Text, Inc.*, Case No. IPR2023-00784, Patent Owner's Preliminary Response to Petition for Inter Partes Review for U.S. Pat. No. 8,438,386; Aug. 17, 2023, 62 pgs.
*Forcepoint LLC* v. *Open Text, Inc.*, Case No. IPR2023-00784, Exhibit 2001: Declaration of Professor Alessandro Orso, Ph. D., Aug. 17, 2023, 49 pgs.
*Forcepoint LLC* v. *Open Text, Inc.*, Case No. IPR2023-00784, Exhibit 2002: Curriculum Vitae of Professor Alessandro Orso, Ph. D., May 2023, 52 pgs.
*Forcepoint LLC* v. *Open Text, Inc.*, Case No. IPR2023-00784, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Forcepoint LLC* v. *Open Text, Inc.*, Case No. IPR2023-00784, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Forcepoint LLC* v. *Open Text, Inc.*, Case No. IPR2023-00784, Exhibit 2005: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Forcepoint LLC* v. *Open Text, Inc.*, Case No. IPR2023-00784, Exhibit 2006: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Forcepoint LLC* v. *Open Text Inc.*, Case No. IPR2023-00784, Exhibit 2007: Dani Kass, "Catching Up On Patent Litigation With Judge Albright" (Law360 Mar. 14, 2023); https://www.law360.com/pulse/articles/1582438/print?section=pul se/courts, 3 pgs.
*Forcepoint LLC* v. *Open Text, Inc.*, Case No. IPR2023-00784, Exhibit 2008: U.S. District Courts—Federal Court Management Statistics—Profiles—During the 12-Month Periods Ending Mar. 31, 2018 Through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, Mar. 31, 2023, 95 pgs.

(56) References Cited

OTHER PUBLICATIONS

*Forcepoint LLC* v. *Open Text Inc.*, Case No. IPR2023-00784, Exhibit 2009: *Webroot, Inc. and Open Text Inc.*, v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Forcepoint LLC* v. *Open Text Inc.*, Case No. IPR2023-00784, Exhibit 2010: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Forcepoint LLC* v. *Open Text Inc.*, Case No. IPR2023-00784, Exhibit 2011: *Webroot, Inc. and Open Text Inc.*, v. *Forcepoint LLC*, Case No. 6:22-cv-342-ADA-DTG, Defendant Forcepoint LLC's Preliminary Invalidity Contentions (W.D. Tex. Sep. 13, 2022) (excerpted), 9 pgs.
*Forcepoint LLC* v. *Open Text Inc.*, Case No. IPR2023-00784, Exhibit 2012: *Webroot, Inc et al.* v. *AO Kaspersky Lab et al.*, No 6-22-cv-00243, Dkt. 121, Second Amended Complaint For Patent Infringement (Forcepoint LLC, Case No. 22-cv-00342-ADA-DTG) (W.D. Tex. Dec. 9, 2022), 338 pgs.
*Forcepoint LLC* v. *Webroot, Inc. and Open Text, Inc.*, Case No. IPR2023-00784, Petitioner's Forcepoint LLC's Updated Mandatory Notices Pursuant to 37 CFR § 42.8, Oct. 25, 2023, 5 pgs.
*Forcepoint LLC* v. *Webroot, Inc. and Open Text, Inc.*, Case No. IPR2023-00784, Order Conduct of the Proceeding, Oct. 30, 2023, 4 pgs.
*Forcepoint LLC* v. *Webroot, Inc. and Open Text, Inc.*, Case No. IPR2023-00784, Petitioner Forcepoint LLC's Notice of Stipulation regarding Invalidity Contentions, Nov. 1, 2023, 5 pgs.
*Forcepoint LLC* v. *Webroot, Inc. and Open Text, Inc.*, Case No. IPR2023-00784, Patent Owner's Reply to Stipulation, Nov. 3, 2023, 7 pgs.
*Forcepoint LLC* v. *Webroot, Inc. and Open Text, Inc.*, Case No. IPR2023-00784, Exhibit 2013: Final Invalidity Contentions, 394 pgs.
*Forcepoint LLC* v. *Webroot, Inc. and Open Text, Inc.*, Case No. IPR2023-00784, Decision denying Institution of Inter Partes Review, Nov. 13, 2023, 27 pgs.
*Forcepoint LLC* v. *Webroot, Inc. and Open Text, Inc.*, Case No. IPR2023-00784, Petitioner's Request for Rehearing, Nov. 27, 2023, 12 pgs.
*Forcepoint LLC* v. *Webroot, Inc. and Open Text, Inc.*, Case No. IPR2023-00784, Petitioner's Unopposed Motion to Withdraw its Request for Rehearing of the Board's Decision Denying Inter Partes Review, Dec. 12, 2023, 5 pgs.
*Forcepoint LLC* v. *Webroot, Inc. and Open Text, Inc.*, Case No. IPR2023-00784, Order granting Petitioner's Unopposed Motion to Withdraw its Request for Rehearing of the Board's Decision Denying Inter Partes Review, Dec. 13, 2023, 3 pgs.
*Sophos Ltd. and Sophos Inc.* v. *Webroot Inc.*, PTAB Case No. IPR2023-00528, Decision denying institution of Inter Parties Review, Aug. 14, 2023, 23 pgs.
*Sophos Ltd. and Sophos Inc.* v. *Webroot Inc.*, PTAB Case No. IPR2023-00528, Board Exhibit 3001: Email Request for Leave to File Reply to Patent Owner's Preliminary Response, 2 pgs., Jul. 13, 2023.
*Sophos Ltd. and Sophos Inc.* v. *Webroot Inc.*, PTAB Case No. IPR2023-00528, Petitioner's Revised Mandatory Notices, 4 pgs., Aug. 30, 2023.
*Trend Micro, Inc.* v. *Webroot Inc.*, PTAB Case No. IPR2023-00662, Patent Owner's Preliminary Response, Jul. 17, 2023, 72 pgs.
*Trend Micro, Inc.* v. *Webroot Inc.*, PTAB Case No. IPR2023-00662, Exhibit 2001: Declaration Of Sam Malek, Ph.D., Jul. 17, 2023, 45 pgs.
*Trend Micro, Inc.* v. *Webroot Inc.*, PTAB Case No. IPR2023-00662, Exhibit 2002: Curriculum Vitae of Sam Malek, Ph.D., Feb. 14, 2023, 36 pgs.
*Trend Micro, Inc.* v. *Webroot Inc.*, PTAB Case No. IPR2023-00662, Exhibit 2003: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022, 9 pgs.
*Trend Micro, Inc.* v. *Webroot Inc.*, PTAB Case No. IPR2023-00662, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022, 7 pgs.
*Trend Micro, Inc.* v. *Webroot Inc.*, PTAB Case No. IPR2023-00662, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022, 7 pgs.
*Trend Micro, Inc.* v. *Webroot Inc.*, PTAB Case No. IPR2023-00662, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Trend Micro, Inc.* v. *Webroot Inc.*, PTAB Case No. IPR2023-00662, Exhibit 2007: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Trend Micro, Inc.* v. *Webroot Inc.*, PTAB Case No. IPR2023-00662, Exhibit 2008: Dani Kass, "Catching Up On Patent Litigation With Judge Albright" (Law360 Mar. 14, 2023); https://www.law360.com/pulse/articles/1582438/print?section=pulse/courts, 3 pgs.
*Trend Micro, Inc.* v. *Webroot Inc.*, PTAB Case No. IPR2023-00662, Exhibit 2009: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022, 9 pgs.
*Trend Micro, Inc.* v. *Webroot Inc.*, PTAB Case No. IPR2023-00662, Exhibit 2010: United States Courts, Statistics & Reports, Federal Court Management Statistics—Comparison Within Circuit—During the 12-Month Period Ending Jun. 30, 2022, "Comparison of Districts Within the First Circuit—12-Month Period Ending Jun. 30, 2022," available at https://www.uscourts.gov/sites/default/files/fcms_na_distcomparison0630.2022_0.pdf, Jun. 30, 2022, 11 pgs.
*Trend Micro, Inc.* v. *Webroot Inc.*, PTAB Case No. IPR2023-00662, Exhibit 2011: *Webroot, Inc. and Open Text Inc.*, v. *Sophos Ltd.*, Case No. 6:22-cv-00240-ADA, Complaint for Patent Infringement, Dkt. 1 (W.D. Tex., Mar. 4, 2022), 144 pgs.
*Trend Micro, Inc.* v. *Webroot Inc.* PTAB Case No. IPR2023-00662, Exhibit 2012: *Webroot, Inc. and Open Text Inc.*, v. *ForcePoint LLC*, Case No. 6:22-cv-00342-ADA-DTG, Defendant ForcePoint LLC's Preliminary Invalidity Contentions (W.D. Tex., Sep. 13, 2022), 149 pgs.
*Trend Micro, Inc.* v. *Webroot Inc.*, PTAB Case No. IPR2023-00662, Exhibit 2013: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022), 127 pgs.
*Trend Micro, Inc.* v. *Webroot Inc.*, PTAB Case No. IPR2023-00662, Exhibit 2014: *Webroot, Inc. and Open Text Inc.*, v. *Trend Micro Inc.*, Case No. 6:22-cv-00239-ADA-DTG, Defendant's Preliminary Invalidity Contentions (W.D. Tex., Sep. 13, 2022), 125 pgs.
*Trend Micro, Inc.* v. *Webroot Inc.*, PTAB Case No. IPR2023-00662, Exhibit 2015: *Webroot, Inc. and Open Text Inc.*, v. *Ao Kaspersky Lab*, Case No. 6:22-cv-00243-ADA-DTG, Defendant's Preliminary Invalidity Contentions Appendix A (W.D. Tex., Sep. 14, 2022), 8 pgs.
*Trend Micro, Inc.* v. *Webroot Inc.*, PTAB Case No. IPR2023-00662, Exhibit 2016: *Webroot, Inc. and Open Text Inc.*, v. *CrowdStrike, Inc. and CrowdStrike Holdings, Inc.*, Case No. 6:22-cv-00241-ADA-DTG, Defendant's Preliminary Invalidity Contentions (W.D. Tex., Sep. 13, 2022), 62 pgs.
*Trend Micro, Inc.* v. *Webroot Inc.*, PTAB Case No. IPR2023-00662, Exhibit 2017: Dec. 9, 2022 excerpt from discovery hearing transcript, 2 pgs.
*Trend Micro, Inc.* v. *Webroot Inc.*, PTAB Case No. IPR2023-00662, Exhibit 1020: Sotera Stipulation, Sep. 28, 2023, 3 pgs.

(56) References Cited

OTHER PUBLICATIONS

*Trend Micro, Inc.* v. *Webroot Inc.*, PTAB Case No. IPR2023-00662, Order Conduct of the Proceeding, Sep. 28, 2023, 6 pgs.

*Trend Micro, Inc.* v. *Webroot Inc.*, PTAB Case No. IPR2023-00662, Exhibit 3001: Email re: Sotera stipulation, Sep. 28, 2023, 2 pgs.

*Trend Micro, Inc.* v. *Webroot Inc.*, PTAB Case No. IPR2023-00662, Decision denying institution of Inter Parties Review, Oct. 13, 2023, 20 pgs.

*Sophos Ltd. and Sophos Inc.* v. *Webroot Inc.*, PTAB Case No. PGR2023-00031, Patent Owner's Preliminary Response, Sep. 6, 2023, 75 pgs.

*Sophos Ltd. and Sophos Inc.* v. *Webroot Inc.*, PTAB Case No. PGR2023-00031, Exhibit 2001: Declaration Of Sam Malek, Ph.D., Sep. 5, 2023, 52 pgs.

*Sophos Ltd. and Sophos Inc.* v. *Webroot Inc.*, PTAB Case No. PGR2023-00031, Exhibit 2002: Curriculum Vitae of Sam Malek, Ph.D., Feb. 14, 2023, 36 pgs.

*Sophos Ltd. and Sophos Inc.* v. *Webroot Inc.*, PTAB Case No. PGR2023-00031, Exhibit 2003: *Webroot, Inc., Open Text Inc.*, v. *AO Kaspersky Lab et al.*, Case No. 6:22-cv-00243-ADA-DTG, Claim Construction Order, Dkt. 391 (W.D. Tex Jul. 25, 2023), 19 pgs.

*Sophos Ltd. and Sophos Inc.* v. *Webroot Inc.*, PTAB Case No. PGR2023-00031, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Sophos Ltd. and Sophos Inc.* v. *Webroot Inc.*, PTAB Case No. PGR2023-00031, Exhibit 2005: *mCom IP, LLC* v. *Cisco Systems, Inc.*, Case No. 6:22-cv-0026-ADA, Order Denying Defendant's Motion to Stay Pending Inter Partes Review, Dkt. 42 (W.D. Tex., Oct. 20, 2022), 7 pgs.

*Sophos Ltd. and Sophos Inc.* v. *Webroot Inc.*, PTAB Case No. PGR2023-00031, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Sophos Ltd. and Sophos Inc.* v. *Webroot Inc.*, PTAB Case No. PGR2023-00031, Exhibit 2007: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.

*Sophos Ltd. and Sophos Inc.* v. *Webroot Inc.*, PTAB Case No. PGR2023-00031, Exhibit 2008: Dani Kass, "Catching Up On Patent Litigation With Judge Albright" https://www.law360.com/pulse/articles/1582438/print?section=pulse/courts, (Law360 Mar. 14, 2023); 3 pgs.

*Sophos Ltd. and Sophos Inc.* v. *Webroot Inc.*, PTAB Case No. PGR2023-00031, Exhibit 2009: U.S. District Courts—Federal Court Management Statistics—Profiles—During the 12-Month Periods Ending Mar. 31, 2018 Through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, Mar. 31, 2023, 95 pgs.

*Sophos Ltd. and Sophos Inc.* v. *Webroot Inc.*, PTAB Case No. PGR2023-00031, Exhibit 2010: *Webroot, Inc., Open Text Inc.*, v. *AO Kaspersky Lab et al.*, Case No. 6:22-cv-00243-ADA-DTG, Order Granting Fifth Amended Scheduling Order, Dkt. 252 (W.D. Tex., Mar. 29, 2023), 9 pgs.

*Sophos Ltd. and Sophos Inc.* v. *Webroot Inc.*, PTAB Case No. PGR2023-00031, Exhibit 2011: *Webroot, Inc. and Open Text Inc.*, v. *Sophos Ltd.*, Case No. 6:22-cv-00240-ADA, Second Amended Complaint for Patent Infringement, Dkt. 76 (W.D. Tex., Oct. 24, 2022), 184 pgs.

*Sophos Ltd. and Sophos Inc.* v. *Webroot Inc.*, PTAB Case No. PGR2023-00031, Exhibit 2012: *Webroot, Inc. and Open Text Inc.*, v. *Sophos Ltd.*, Case No. 6:22-cv-00240-ADA-DTG, Defendant Sophos Ltd.'s Preliminary Invalidity Contentions For Patents Plaintiffs Added by Amendment (W.D. Tex., Feb. 21, 2023) (excerpted), 7 pgs.

*Sophos Ltd. and Sophos Inc.* v. *Webroot Inc.*, PTAB Case No. PGR2023-00031, Exhibit 2013: *Webroot, Inc. and Open Text Inc.*, v. *CrowdStrike, Inc. and CrowdStrike Holdings, Inc.*, Case No. 6:22-cv-00241-ADA-DTG, Crowdstrike's Preliminary Invalidity Contentions (Patents Asserted by Amendment) (W.D. Tex., Feb. 21, 2023) (excerpted), 8 pgs.

*Sophos Ltd. and Sophos Inc.* v. *Webroot Inc.*, PTAB Case No. PGR2023-00031, Exhibit 2014: *Webroot, Inc. and Open Text Inc.*, v. *Trend Micro Inc.*, Case No. 6:22-cv-00239-ADA-DTG, Defendant's Preliminary Invalidity Contentions (W.D. Tex., Feb. 21, 2023) (excerpted), 9 pgs.

*Sophos Ltd. and Sophos Inc.* v. *Webroot Inc.*, PTAB Case No. PGR2023-00031, Exhibit 2015: *Webroot, Inc. and Open Text Inc.*, v. *AO Kaspersky Lab*, Case No. 6:22-cv-00243-ADA-DTG, Defendant's AO Kaspersky Lab's Pre-liminary Invalidity Contentions (W.D. Tex., Feb. 21, 2023) (excerpted), 4 pgs.

*Sophos Ltd. and Sophos Inc.* v. *Webroot Inc.*, PTAB Case No. PGR2023-00031, Exhibit 2016: *Webroot, Inc. and Open Text Inc.*, v. *AO Kaspersky Lab*, Case No. 6:22-cv-00243-ADA-DTG, Opening Claim Construction Brief From: [Defendants], Dkt. 86 (W.D. Tex., Oct. 28, 2022), 84 pgs.

*Sophos Ltd. and Sophos Inc.* v. *Webroot Inc.*, PTAB Case No. PGR2023-00031, Exhibit 2017: Microsoft Computer Dictionary, (Fifth Ed. Microsoft 2012), p. 36, 4 pgs.

*Sophos Ltd. and Sophos Inc.* v. *Webroot Inc.*, PTAB Case No. PGR2023-00031, Exhibit 2018: Decimal-Binary-Octal-Hex—ASCII Conversion Chart, available at https://www.eecis.udel.edu/~amer/CISC651/ASCII-Conversion-Chart.pdf., 1 pg.

*Sophos Ltd. and Sophos Inc.* v. *Webroot Inc.*, PTAB Case No. PGR2023-00031, Exhibit 2019: Microsoft, String to numberic value functions, available at https://learn.microsoft.com/en-US/cpp/c-runtime-library/string-to-numeric-value-functions?view=msvc-140, 3 pgs.

*Sophos Ltd. and Sophos Inc.* v. *Webroot Inc.*, PTAB Case No. PGR2023-00031, Decision denying Institution of Post-Grant Review, Nov. 29, 2023, 33 pgs.

*AO Kaspersky Lab* v. *Webroot Inc.*, PTAB Case No. IPR2023-01160, Patent Owner Open Text Inc.'s Mandatory Notices Pursuant to 37 CFR § 42.8(b), Jul. 21, 2023, 10 pgs.

*AO Kaspersky Lab* v. *Webroot Inc.*, PTAB Case No. IPR2023-01160, Notice of Filing Date Accorded to Petition and Time for Filing Patent Owner Preliminary Response, Aug. 23, 2023, 6 pgs.

*AO Kaspersky Lab* v. *Webroot Inc.*, PTAB Case No. IPR2023-01160, Corrected Exhibit 1001: U.S. Pat. No. 11,409,869, Aug. 9, 2022, Schmidtler, 16 pgs.

*AO Kaspersky Lab* v. *Webroot Inc.*, PTAB Case No. IPR2023-01160, Corrected Exhibit 1002: Declaration of V.S. Subrahmanian, Ph.D. under 37 C.F.R. §1.68, Jun. 29, 2023, 145 pgs.

*AO Kaspersky Lab* v. *Webroot Inc.*, PTAB Case No. IPR2023-01160, Corrected Exhibit 1003: Curriculum Vitae of V.S. Subrahmanian, Ph.D., Jun. 29, 2023, 77 pgs.

*AO Kaspersky Lab* v. *Webroot Inc.*, PTAB Case No. IPR2023-01160, Corrected Exhibit 1004: File History of U.S. Pat. No. 11,409,869, Jun. 29, 2023, 345 pgs.

*AO Kaspersky Lab* v. *Webroot Inc.*, PTAB Case No. IPR2023-01160, Corrected Exhibit 1005: U.S. Patent Publication No. 20150213376, Ideses, published Jul. 30, 2015, 19 pgs.

*AO Kaspersky Lab* v. *Webroot Inc.*, PTAB Case No. IPR2023-01160, Corrected Exhibit 1006: U.S. Patent Publication No. 20160154960, Sharma, published Jun. 2, 2016, 29 pgs.

*AO Kaspersky Lab* v. *Webroot Inc.*, PTAB Case No. IPR2023-01160, Corrected Exhibit 1007: Charles Ledoux & Arun Lakhotia, Malware and Machine Learning, in Intelligent Methods Cyber Warfare 1 (2014), 42 pgs.

*AO Kaspersky Lab* v. *Webroot Inc.*, PTAB Case No. IPR2023-01160, Corrected Exhibit 1008: U.S. Patent Publication No. 20150213365, Ideses et al., Jul. 30, 2015, 18 pgs.

*AO Kaspersky Lab* v. *Webroot Inc.*, PTAB Case No. IPR2023-01160, Corrected Exhibit 1009: Claim Construction Order, Mar. 16, 2023, Case No. 6:22-CV-00243-ADA-DTG, 20 pgs.

(56) References Cited

OTHER PUBLICATIONS

*AO Kaspersky Lab* v. *Webroot Inc.*, PTAB Case No. IPR2023-01160, Corrected Exhibit 1010: Joint Stipulation Reserving Appellate Rights, Case No. 6:22-CV-00243-ADA-DTG, Apr. 12, 2023, 9 pgs.
*AO Kaspersky Lab* v. *Webroot Inc.*., PTAB Case No. IPR2023-01160, Corrected Exhibit 1011: Kris Kendall, Practical Malware Analysis, in Black Hat Conf., USA, Aug. 2007, 10 pgs.
*AO Kaspersky Lab* v. *Webroot Inc.*, PTAB Case No. IPR2023-01160, Corrected Exhibit 1012: Hao Helen Zhang et al., Compactly Supported Radial Basis Function Kernels, Inst. Stat. Mimeo Series No. 2570, N. Carolina St. U. Dep't. Stat. 2 (2004), 19 pgs.
*AO Kaspersky Lab* v. *Webroot Inc.*., PTAB Case No. IPR2023-01160, Corrected Exhibit 1013: Zane Markel & Michael Bilzor, Building a Machine Learning Classifier for Malware Detection, 2014 Second Workshop Anti-Malware Testing Res. (WATeR) (2014), 4 pgs.
*AO Kaspersky Lab* v. *Webroot Inc.*, PTAB Case No. IPR2023-01160, Corrected Exhibit 1014: Naser Peiravian & Xingquan Zhu, Machine Learning for Android Malware Detection Using Permission and API Calls, IEEE 25th Int'l Conf. Tools Artificial Intelligence 300 (2013), 6 pgs.
*AO Kaspersky Lab* v. *Webroot Inc.*, PTAB Case No. IPR2023-01160, Corrected Exhibit 1015: Ekta Gandotra et al., Malware Analysis and Classification: A Survey, J. Inf. Security 5, 56-64 (2014), 9 pgs.
*AO Kaspersky Lab* v. *Webroot Inc.*, PTAB Case No. IPR2023-01160, Corrected Exhibit 1016: Rafiqul Islam et al., Classification of Malware Based on Integrated Static and Dynamic Features, 36 J. Network Computer Applications, 646, 2012, 11 pgs.
*AO Kaspersky Lab* v. *Webroot Inc.*, PTAB Case No. IPR2023-01160, Corrected Exhibit 1017: D. Michael Cai et al., Comparison of Feature Selection And Classification Algorithms In Identifying Malicious Executables, 51(6) Computational Stat. Data Analysis 3156 (2007), 17 pgs.
*AO Kaspersky Lab* v. *Webroot Inc.*, PTAB Case No. IPR2023-01160, Corrected Exhibit 1018: Guanhua Yan et al., Exploring Discriminatory Features for Automated Malware Classification, 10 Detection Intrusions Malware, Vulnerability Assessment: 10th Int'l Conf., 41 (2013), 21 pgs.
*AO Kaspersky Lab* v. *Webroot Inc.*, PTAB Case No. IPR2023-01160, Corrected Exhibit 1019: Rafiqul Islam et al., Classification of Malware Based on String and Function Feature Selection, 2010 Second Cybercrime Trustworthy Computing Workshop 9 (2010), 9 pgs.
*AO Kaspersky Lab* v. *Webroot Inc.*, PTAB Case No. IPR2023-01160, Corrected Exhibit 1020: Eitan Menahem et al., Improving Malware Detection by Applying Multi- Inducer Ensemble, Computational Stat. Data Analysis, 53(4), 1483 (2008), 12 pgs.
*AO Kaspersky Lab* v. *Webroot Inc.*, PTAB Case No. IPR2023-01160, Corrected Exhibit 1021: Ianir Ideses & Assaf Neuberger, Adware Detection and Privacy Control in Mobile Devices, in 2014 IEEE 28th Convention Electrical Electronics Engineers Israel 1 (2014), 5 pgs.
*AO Kaspersky Lab* v. *Webroot Inc.*, PTAB Case No. IPR2023-01160, Corrected Exhibit 1022: Raja Khurram Shahzad et al., Accurate Adware Detection Using Opcode Sequence Extraction, Sixth Int'l Conf. Availability, Reliability Security 189 (2011), 7 pgs.
*AO Kaspersky Lab* v. *Webroot Inc.*, PTAB Case No. IPR2023-01160, Corrected Exhibit 1023: Raymond Canzanese et al., Toward an Automatic, Online Behavioral Malware Classification System, IEEE 7th Int'l Conf. Self-Adaptive Self-Organizing Sys., 111 (2013), 10 pgs.
*AO Kaspersky Lab* v. *Webroot Inc.*, PTAB Case No. IPR2023-01160, Corrected Exhibit 1024: Yanfang Ye et al., Automatic Malware Categorization Using Cluster Ensemble, in Proc. 16th Acm Sigkdd Int'l Conf. Knowledge Discovery Data Mining 95 (2010), 10 pgs.
*AO Kaspersky Lab* v. *Webroot Inc.*, PTAB Case No. IPR2023-01160, Corrected Exhibit 1025: Asaf Shabtai et al., Detection of Malicious Code by Applying Machine Learning Classifiers on Static Features: A State-Of-The-Art Survey, Info. Security Tech. Rep. 14(1), 16 (2009), 14 pgs.
*AO Kaspersky Lab* v. *Webroot Inc.*, PTAB Case No. IPR2023-01160, Corrected Exhibit 1026: A.M. Aswini & P. Vinod, Droid Permission Miner: Mining Prominent Permissions for Android Malware Analysis, Fifth Int'l Conf. Applications Digital Inf. Web Tech. 81 (2014), 6 pgs.
*AO Kaspersky Lab* v. *Webroot Inc.*, PTAB Case No. IPR2023-01160, Corrected Exhibit 1027: Konrad Rieck et al., Learning and Classification of Malware Behavior, Detection Intrusions Malware, Vulnerability Assessment: 5th Int'l Conf., 108 (2008), 18 pgs.
*AO Kaspersky Lab* v. *Webroot Inc.*, PTAB Case No. IPR2023-01160, Corrected Exhibit 1028: Veelasha Moonsamy et al., Feature Reduction, Speed Up Malware Classification, Inf. Security Tech. Applications: 16th Nordic Conf. Secure It Sys., Tallinn, Est., Oct. 26-28, 2011, Rev. Selected Papers 16, 176 (2012), 13 pgs.
*AO Kaspersky Lab* v. *Webroot Inc.*, PTAB Case No. IPR2023-01160, Corrected Exhibit 1029: John P. Dickerson et al., Using Sentiment, Detect Bots on Twitter: Are Humans More Opinionated Than Bots?, IEEE/ACM Int'l Conf. Advances Social Networks Analysis Mining 620 (2014), 8 pgs.
*AO Kaspersky Lab* v. *Webroot Inc.*, PTAB Case No. IPR2023-01160, Corrected Exhibit 1030: Wei Yu et al., Towards Neural Network Based Malware Detection on Android Mobile Devices, Cybersecurity Sys. Human Cognition Augmentation 99 (2014), 19 pgs.
*AO Kaspersky Lab* v. *Webroot Inc.*, PTAB Case No. IPR2023-01160, Corrected Exhibit 1031: Guanhua Yan et al., 2013. Exploring Discriminatory Features for Automated Malware Classification, Detection Intrusions Malware, Vulnerability Assessment: 10th Int'l Conf., Dimva 2013, Berlin, Ger., Jul. 18-19, 2013 Proc. 10, 41 (2013), 21 pgs.
*AO Kaspersky Lab* v. *Webroot Inc.*, PTAB Case No. IPR2023-01160, Corrected Exhibit 1032: Julia Yu-Cheng et al., An Information Retrieval Approach for Malware Classification Based on Windows API Calls, Int'l Conf. Machine Learning Cybernetics 1678 (2013), 6 pgs.
*AO Kaspersky Lab* v. *Webroot Inc.*, PTAB Case No. IPR2023-01160, Corrected Exhibit 1033: Zi Chu et al., Detecting Automation of Twitter Accounts: Are You a Human, Bot, or Cyborg?, 9 IEEE Transactions Dependable Secure Computing 6, 811 (Nov./Dec. 2012), 14 pgs.
*AO Kaspersky Lab* v. *Webroot Inc.*, PTAB Case No. IPR2023-01160, Corrected Exhibit 1034: Axelle Apvrille, Android Reverse Engineering Tools From an Anti-Virus Analyst's Perspective, Fortinet, slides 11-15, http://wikisec.free.fr/papers/insomnidroid.pdf, Mar. 2012, 69 pgs.
*AO Kaspersky Lab* v. *Webroot Inc.*, PTAB Case No. IPR2023-01160, Corrected Exhibit 1035: Li Sun et al., Pattern Recognition Techniques for the Classification of Malware Packers, 15 Proc. Inf. Security Priv.: 15th Australasian Conf., Acisp 2010, Sydney, Austl., Jul. 5-7, 2010, 370, 21 pgs.
*AO Kaspersky Lab* v. *Webroot Inc.*, PTAB Case No. IPR2023-01160, Corrected Exhibit 1036: Munkhbayar Bat-Erdene et al., Dynamic Classification of Packing Algorithms for Inspecting Executables Using Entropy Analysis, 8th Int'l Conf. Malicious Unwanted Software: "Americas" (MALWARE) 19, 2013, 8 pgs.
*AO Kaspersky Lab* v. *Webroot Inc.*, PTAB Case No. IPR2023-01160, Corrected Exhibit 1037: M. Zubair et al., PE-Probe: Leveraging Packer Detection and Structural Information, Detect Malicious Portable Executables, 8 Proc. Virus Bull. Conf. (2009), 10 pgs.
*AO Kaspersky Lab* v. *Webroot Inc.*, PTAB Case No. IPR2023-01160, Notice of Accepting Corrected Petition, Sep. 13, 2023, 2 pgs.
*AO Kaspersky Lab* v. *Webroot Inc.*, PTAB Case No. IPR2023-01160, Patent Owner's Preliminary Response, Nov. 21, 2023, 60 pgs.
*AO Kaspersky Lab* v. *Webroot Inc.*, PTAB Case No. IPR2023-01160, Exhibit 2001: Declaration Of Sam Malek, Ph.D., Nov. 21, 2023, 37 pgs.

(56) References Cited

OTHER PUBLICATIONS

AO Kaspersky Lab v. Webroot Inc., PTAB Case No. IPR2023-01160, Exhibit 2002: Curriculum Vitae of Sam Malek, Ph.D., Feb. 14, 2023,36 pgs.
AO Kaspersky Lab v. Webroot Inc., PTAB Case No. IPR2023-01160, Exhibit 2003: Webroot, Inc., Open Text Inc., v. AO Kaspersky Lab et al., Case No. 6:22-cv-00243-ADA-DTG, Claim Construction Order, Dkt. 391 (W.D. Tex Jul. 25, 2023), Nov. 21, 2023,19 pgs.
AO Kaspersky Lab v. Webroot Inc., PTAB Case No. IPR2023-01160, Exhibit 2004: Sonrai Memory Ltd. v. Kingston Tech. Co. and Kingston Tech. Corp., Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), Nov. 21, 2023, 17 pgs.
AO Kaspersky Lab v. Webroot Inc., PTAB Case No. IPR2023-01160, Exhibit 2005: mCom IP, LLC v. Cisco Systems, Inc., Case No. 6:22-cv-00261-ADA, Order Denying Defendant's Motion to Stay Pending Inter Partes Review, Dkt. 42 (W.D. Tex., Oct. 20, 2022), Nov. 21, 2023, 7 pgs.
AO Kaspersky Lab v. Webroot Inc., PTAB Case No. IPR2023-01160, Exhibit 2006: Intellectual Ventures I LLC et al. v. Hewlett Packard Enterprise Co., No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), Nov. 21, 2023, 8 pgs.
AO Kaspersky Lab v. Webroot Inc., PTAB Case No. IPR2023-01160, Exhibit 2007: Email dated Nov. 8, 2023 from David Holt to Trials@USPTO.gov re CrowdStrike v Open Text / Webroot IPRs: Request to File Motions to Terminate, Nov. 21, 2023, 1 pg.
AO Kaspersky Lab v. Webroot Inc., PTAB Case No. IPR2023-01160, Exhibit 2008: Email dated Nov. 13, 2023 from Trials@USPTO.gov to David Holt RE: CrowdStrike v Open Text / Webroot IPRs: Request to File Motions to Terminate, Nov. 21, 2023, 2 pgs.
AO Kaspersky Lab v. Webroot Inc., PTAB Case No. IPR2023-01160, Exhibit 2009: Webroot, Inc. and Open Text Inc., v. AO Kaspersky Lab et al., Case No. 6:22-cv-243-ADA-DTG, Dec. 9, 2022 Transcript of Motions Hearing, Dkt. 133 (W.D. Tex. Dec. 15, 2022) (excerpted), Nov. 21, 2023, 2 pgs.
AO Kaspersky Lab v. Webroot Inc., PTAB Case No. IPR2023-01160, Exhibit 2010: Dani Kass, "Catching Up On Patent Litigation With Judge Albright" (Law360 Mar. 14, 2023); https://www.law360.com/pulse/articles/1582438/ print?section=pulse/courts, Nov. 21, 2023, 3 pgs.
AO Kaspersky Lab v. Webroot Inc., PTAB Case No. IPR2023-01160, Exhibit 2011: Webroot, Inc. and Open Text Inc., v. AO Kaspersky Lab et al., Case No. 6:22-cv-243-ADA-DTG, Unopposed Motion to Modify the Scheduling Order, Dkt. 468 (W.D. Tex. Oct. 23, 2023) , Nov. 21, 2023, 10 pgs.
AO Kaspersky Lab v. Webroot Inc., PTAB Case No. IPR2023-01160, Exhibit 2012: Webroot, Inc., Open Text Inc., v. AO Kaspersky Lab et al., Case No. 6:22-cv-00243-ADA-DTG, Order Granting Fifth Amended Scheduling Order, Dkt. 252 (W.D. Tex., Mar. 29, 2023) , Nov. 21, 2023, 9 pgs.
AO Kaspersky Lab v. Webroot Inc., PTAB Case No. IPR2023-01160, Exhibit 2013: Webroot, Inc. and Open Text Inc., v. AO Kaspersky Lab, Case No. 6:22-cv-00243-ADA-DTG, Defendant's AO Kaspersky Lab's Preliminary Invalidity Contentions, Appendix C (W.D. Tex., Feb. 21, 23) (excerpted) , Nov. 21, 2023, 4 pgs.
AO Kaspersky Lab v. Webroot Inc., PTAB Case No. IPR2023-01160, Exhibit 2014: Webroot, Inc. and Open Text Inc., v. Sophos Ltd., Case No. 6:22-cv-00240-ADA-DTG, Defendant Sophos Ltd.'s Final Invalidity Contentions (W.D. Tex., Nov. 1, 2023) (excerpted), Nov. 21, 2023, 22 pgs.
AO Kaspersky Lab v. Webroot Inc., PTAB Case No. IPR2023-01160, Exhibit 2015: Webroot, Inc. and Open Text Inc., v. AO Kaspersky Lab, Case No. 6:22-cv-00243-ADA, Second Amended Complaint for Patent Infringement, Dkt. 122 (W.D. Tex., Dec. 9, 2022) , Nov. 21, 2023,227 pgs.
AO Kaspersky Lab v. Webroot Inc., PTAB Case No. IPR2023-01160, Exhibit 2016: Webroot, Inc. and Open Text Inc., v. Forcepoint LLC, Case No. 6:22-cv-00342-ADA, Defendant Forcepoint LLC's Final Invalidity, (W.D. Tex., Nov. 1, 2023) (excerpted), Nov. 21, 2023, 89 pgs.
AO Kaspersky Lab v. Webroot Inc., PTAB Case No. IPR2023-01160, Exhibit 2017: Webroot, Inc. and Open Text Inc., v. Trend Micro Inc., Case No. 6:22-cv-00243-ADA, Defendant's Final Invalidity Contentions (W.D. Tex., Nov. 1, 2023) (excerpted), Nov. 21, 2023, 7 pgs.
Crowdstrike, Inc. v. Webroot Inc., PTAB Case No. IPR2023-00289, Decision Granting Institution of Inter Partes Review, Jul. 21, 2023, 44 pgs.
Crowdstrike, Inc. v. Webroot Inc., PTAB Case No. IPR2023-00289, Scheduling Order, Jul. 21, 2023, 12 pgs.
Crowdstrike, Inc. v. Webroot Inc., PTAB Case No. IPR2023-00289, Patent Owner's Request for Rehearing, Aug. 4, 2023, 20 pgs.
Crowdstrike, Inc. v. Webroot Inc., PTAB Case No. IPR2023-00289, Patent Owner's Objections to Evidence Submitted by Petitioner, Aug. 4, 2023, 4 pgs.
Crowdstrike, Inc. v. Webroot Inc., PTAB Case No. IPR2023-00289, Decision denying Patent Owner's Request for Rehearing of Decision Granting Institution of Inter Partes Review, Sep. 7, 2023, 11 pgs.
Crowdstrike, Inc. v. Webroot Inc., PTAB Case No. IPR2023-00289, Joint Stipulation to Modify Due Dates, Oct. 7, 2023, 4 pgs.
Crowdstrike, Inc. v. Webroot Inc., PTAB Case No. IPR2023-00289, Updated Joint Stipulation to Modify Due Dates, Oct. 20, 2023, 4 pgs.
Crowdstrike, Inc. v. Webroot Inc., PTAB Case No. IPR2023-00289, Second Updated Joint Stipulation to Modify Due Dates, Nov. 7, 2023, 4 pgs.
Crowdstrike, Inc. v. Webroot Inc., PTAB Case No. IPR2023-00289, Panel Change Order, Nov. 9, 2023, 3 pgs.
Crowdstrike, Inc. v. Webroot Inc., PTAB Case No. IPR2023-00289, Third Updated Joint Stipulation to Modify Due Dates, Nov. 16, 2023, 4 pgs.
Crowdstrike, Inc. v. Webroot Inc., PTAB Case No. IPR2023-00289, Joint Motion to Terminate Proceeding, Nov. 20, 2023, 9 pgs.
Crowdstrike, Inc. v. Webroot Inc., PTAB Case No. IPR2023-00289, Joint Request to Treat Agreement as Business Confidential Information, Nov. 20, 2023, 5 pgs.
Crowdstrike, Inc. v. Webroot Inc., PTAB Case No. IPR2023-00289, Patent Owner's Response, Dec. 21, 2023, 72 pgs.
Crowdstrike, Inc. v. Webroot Inc., PTAB Case No. IPR2023-00289, Exhibit 2018: Transcript of Wenke Lee, Ph.D., Dec. 21, 2023, 86 pgs.
Crowdstrike, Inc. v. Webroot Inc., PTAB Case No. IPR2023-00289, Exhibit 2019: Declaration of Professor Nenad Medvidovic, Dec. 21, 2023, 87 pgs.
Crowdstrike, Inc. v. Webroot Inc., PTAB Case No. IPR2023-00289, Exhibit 2020: Webroot, Inc. v. Open Text Inc. v. AO Kaspersky Lab, et al., Case No. 22-cv-00243-ADA-DTG, Open Claim Construction Brief from: OA Kaspersky Lab et al., Dkt. 86 (W.D. Tex. Oct. 28, 2022) (excerpted), Dec. 21, 2023, 29 pgs.
Crowdstrike, Inc. v. Webroot Inc., PTAB Case No. IPR2023-00289, Decision Granting Institution of Inter Partes Review and granting Motion for Joinder, Dec. 21, 2023, 10 pgs.
Crowdstrike, Inc. v. Webroot Inc., PTAB Case No. IPR2023-00289, Order of Settlement as to Crowdstrike, Jan. 4, 2024, 5 pgs.
Crowdstrike, Inc. v. Webroot Inc., PTAB Case No. IPR2023-00289, Exhibit 3001: email, Dec. 21, 2023, 2 pgs.
Trend Micro, Inc. v. Webroot Inc., PTAB Case No. IPR2023-00655, Patent Owner's Preliminary Response, Jul. 17, 2023, 76 pgs.
Trend Micro, Inc. v. Webroot Inc., PTAB Case No. IPR2023-00655, Exhibit 2001: Declaration of Professor Nenad Medvidovic, Ph.D, Jul. 17, 2023, 70 pgs.
Trend Micro, Inc. v. Webroot Inc., PTAB Case No. IPR2023-00655, Exhibit 2002: Curriculum Vitae of Professor Nenad Medvidovic, Ph.D., Jul. 2022, 71 pgs.
Trend Micro, Inc. v. Webroot Inc., PTAB Case No. IPR2023-00655, Exhibit 2003: Sonrai Memory Ltd. v. Kingston Tech. Co. and Kingston Tech. Corp., Case No. 6:21-cv-1284-ADA, Order Denying

(56) References Cited

OTHER PUBLICATIONS

Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
Trend Micro, Inc. v. Webroot Inc., PTAB Case No. IPR2023-00655, Exhibit 2004: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
Trend Micro, Inc. v. Webroot Inc., PTAB Case No. IPR2023-00655, Exhibit 2005: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
Trend Micro, Inc. v. Webroot Inc., PTAB Case No. IPR2023-00655, Corrected Exhibit 2006: Dani Kass, "Catching Up On Patent Litigation With Judge Albright"; https://www.law360.com/pulse/articles/1582438/print?section=pulse/courts, Law360 Mar. 14, 2023, 4 pgs.
Trend Micro, Inc. v. Webroot Inc., PTAB Case No. IPR2023-00655, Corrected Exhibit 2006: Dani Kass, "Catching Up On Patent Litigation With Judge Albright"; https://www.law360.com/pulse/articles/1582438/print?section=pulse/courts, Law360 Mar. 14, 2023, 3 pgs.
Trend Micro, Inc. v. Webroot Inc., PTAB Case No. IPR2023-00655, Corrected Exhibit 2006: Dani Kass, "Catching Up On Patent Litigation With Judge Albright"; https://www.law360.com/pulse/articles/ 582438/print? section=pulse/courts, Law360 Mar. 14, 2023, 3 pgs.
Trend Micro, Inc. v. Webroot Inc., PTAB Case No. IPR2023-00655, Exhibit 2007: U.S. District Courts—Federal Court Management Statistics—Profiles—During the 12-Month Periods Ending Mar. 31, 2018 Through 2023, Table N/A—U.S. District Courts—Combined Civil and Criminal Federal Court Management Statistics, available at https://www.uscourts.gov/ sites/default/files/data_tables/ fcms_na_distprofile0331.2023.pdf, Mar. 31, 2023, 95 pgs.
Trend Micro, Inc. v. Webroot Inc., PTAB Case No. IPR2023-00655, Exhibit 2008: *Webroot, Inc., Open Text Inc., v. AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.
Trend Micro, Inc. v. Webroot Inc., PTAB Case No. IPR2023-00655, Exhibit 2009: *Webroot, Inc. and Open Text Inc., v. AO Kaspersky Lab et al.*, Case No. 6:22-cv-243-ADA-DTG, Claim Construction Order, Dkt. 236 (W.D. Tex. Mar. 16, 2023), 20 pgs.
Trend Micro, Inc. v. Webroot Inc., PTAB Case No. IPR2023-00655, Exhibit 2010: *Webroot, Inc. and Open Text Inc., v. Trend Micro, Inc..*, Case No. 6:22-cv-239-ADA-DTG, First Amended Complaint For Patent Infringement, Dkt. 42 (W.D. Tex. Jun. 23, 2023), 235 pgs.
Trend Micro, Inc. v. Webroot Inc., PTAB Case No. IPR2023-00655, Exhibit 2011: *Webroot, Inc. and Open Text Inc., v. AO Kaspersky Lab et al.*, Case No. 6:22-cv-243-ADA-DTG, Scheduling Order, Dkt. 53 (W.D. Tex. Sept. 7, 2022), 7 pgs.
Trend Micro, Inc. v. Webroot Inc., PTAB Case No. IPR2023-00655, Exhibit 2012: *Webroot, Inc. and Open Text Inc., v. Trend Micro, Inc.*, Case No. 6:22-cv-00239-ADA-DTG, Defendant's Preliminary Invalidity Contentions (W.D. Tex., Sep. 13, 2022) (excerpted), 9 pgs.
Trend Micro, Inc. v. Webroot Inc., PTAB Case No. IPR2023-00655, Exhibit 2013: *Webroot, Inc. and Open Text Inc., v. CrowdStrike, Inc. and CrowdStrike Holdings, Inc.*, Case No. 6:22-cv-00241-ADA-DTG, Defendant's Preliminary Invalidity Contentions (W.D. Tex., Sep. 13, 2022) (excerpted), 10 pgs.
Trend Micro, Inc. v. Webroot Inc., PTAB Case No. IPR2023-00655, Exhibit 2014: *Webroot, Inc. and Open Text Inc., v. AO Kaspersky Lab*, Case No. 6:22-cv-00243-ADA-DTG, Defendant's Preliminary Invalidity Contentions Appendix A (W.D. Tex., Sep. 14, 2022) (excerpted), 8 pgs.

Trend Micro, Inc. v. Webroot Inc., PTAB Case No. IPR2023-00655, Decision Denying Institution of Inter Partes Request, Oct. 11, 2023, 19 pgs.
Sophos Ltd. and Sophos Inc. v. Webroot Inc., PTAB Case No. IPR2023-00699, Patent Owner's Preliminary Response, Jul. 14, 2023, 75 pgs.
Sophos Ltd. and Sophos Inc. v. Webroot Inc., PTAB Case No. IPR2023-00699, Exhibit 2001: Declaration of Professor Nenad Medvidovic, Ph.D, Jul. 14, 2023, 63 pgs.
Sophos Ltd. and Sophos Inc. v. Webroot Inc., PTAB Case No. IPR2023-00699, Exhibit 2002: Curriculum Vitae of Professor Nenad Medvidovic, Ph.D., Jul. 2022, 71 pgs.
Sophos Ltd. and Sophos Inc. v. Webroot Inc., PTAB Case No. IPR2023-00699, Exhibit 2003: *Sonrai Memory Ltd. v. Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
Sophos Ltd. and Sophos Inc. v. Webroot Inc., PTAB Case No. IPR2023-00699, Exhibit 2004: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
Sophos Ltd. and Sophos Inc. v. Webroot Inc., PTAB Case No. IPR2023-00699, Exhibit 2005: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
Sophos Ltd. and Sophos Inc. v. Webroot Inc., PTAB Case No. IPR2023-00699, Exhibit 2006: Dani Kass, "Catching Up On Patent Litigation With Judge Albright" (Law360 Mar. 14, 2023); https://www.law360.com/pulse/articles/1582438/print?section=pulse/courts, 3 pgs.
Sophos Ltd. and Sophos Inc. v. Webroot Inc., PTAB Case No. IPR2023-00699, Exhibit 2007: U.S. District Courts—Federal Court Management Statistics—Profiles—During the 12-Month Periods Ending Mar. 31, 2018 Through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, Mar. 31, 2023, 95 pgs.
Sophos Ltd. and Sophos Inc. v. Webroot Inc., PTAB Case No. IPR2023-00699, Exhibit 2008: *Webroot, Inc., Open Text Inc., v. AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.
Sophos Ltd. and Sophos Inc. v. Webroot Inc., PTAB Case No. IPR2023-00699, Exhibit 2009: *Webroot, Inc. and Open Text Inc., v. AO Kaspersky Lab et al.*, Case No. 6:22-cv-243-ADA-DTG, Claim Construction Order, Dkt. 236 (W.D. Tex. Mar. 16, 2023), 20 pgs.
Sophos Ltd. and Sophos Inc. v. Webroot Inc., PTAB Case No. IPR2023-00699, Exhibit 2010: *Webroot, Inc. and Open Text Inc., v. Sophos Ltd.*, Case No. 6:22-cv-240-ADA-DTG, First Amended Complaint For Patent Infringement, Dkt. 42 (W.D. Tex. Jun. 23, 2023), 158 pgs.
Sophos Ltd. and Sophos Inc. v. Webroot Inc., PTAB Case No. IPR2023-00699, Exhibit 2011: *Webroot, Inc. and Open Text Inc., v. AO Kaspersky Lab et al.*, Case No. 6:22-cv-243-ADA-DTG, Scheduling Order, Dkt. 39 (W.D. Tex. Aug. 17, 2022), 7 pgs.
Sophos Ltd. and Sophos Inc. v. Webroot Inc., PTAB Case No. IPR2023-00699, Exhibit 2012: *Webroot, Inc. and Open Text Inc., v. Trend Micro, Inc.*, Case No. 6:22-cv-00239-ADA-DTG, Defendant's Preliminary Invalidity Contentions (W.D. Tex., Sep. 13, 2022) (excerpted), 47 pgs.
Sophos Ltd. and Sophos Inc. v. Webroot Inc., PTAB Case No. IPR2023-00699, Exhibit 2013: *Webroot, Inc. and Open Text Inc., v. CrowdStrike, Inc. and CrowdStrike Holdings, Inc.*, Case No. 6:22-cv-00241-ADA-DTG, Defendant's Preliminary Invalidity Contentions (W.D. Tex., Sep. 13, 2022) (excerpted), 10 pgs.
Sophos Ltd. and Sophos Inc. v. Webroot Inc., PTAB Case No. IPR2023-00699, Exhibit 2014: *Webroot, Inc. and Open Text Inc., v. AO Kaspersky Lab*, Case No. 6:22-cv-00243-ADA-DTG, Defen-

(56) References Cited

OTHER PUBLICATIONS dant's Preliminary Invalidity Contentions Appendix A (W.D. Tex., Sep. 14, 2022) (excerpted), 8 pgs.
*Sophos Ltd. and Sophos Inc. v. Webroot Inc.*, PTAB Case No. IPR2023-00699, Panel Change Order, Aug. 15, 2023, 3 pgs.
*Sophos Ltd. and Sophos Inc. v. Webroot Inc.*, PTAB Case No. IPR2023-00699, Revised Mandatory Notices, Aug. 30, 2023, 4 pgs.
*Sophos Ltd. and Sophos Inc. v. Webroot Inc.*, PTAB Case No. IPR2023-00699, Decision Granting Institution of Inter Partes Review, Oct. 11, 2023, 38 pgs.
*Sophos Ltd. and Sophos Inc. v. Webroot Inc.*, PTAB Case No. IPR2023-00699, Scheduling Order, Oct. 16, 2023, 12 pgs.
*Sophos Ltd. and Sophos Inc. v. Webroot Inc.*, PTAB Case No. IPR2023-00699, Patent Owner's Objections to Evidence submitted by Petitioner, Oct. 25, 2023, 6 pgs.
*Sophos Ltd. and Sophos Inc. v. Webroot Inc.*, PTAB Case No. IPR2023-00699, Petitioner's Updated Mandatory Notices, Nov. 27, 2023, 5 pgs.
*Sophos Ltd. and Sophos Inc. v. Webroot Inc.*, PTAB Case No. IPR2023-00699, Patent Owner's Response, Jan. 2, 2024, 80 pgs.
*Sophos Ltd. and Sophos Inc. v. Webroot Inc.*, PTAB Case No. IPR2023-00699, Exhibit 2015: Declaration of Nanad Medvidovic, Ph.D., Jan. 2, 2024, 76 pgs.
*Sophos Ltd. and Sophos Inc. v. Webroot Inc.*, PTAB Case No. IPR2023-00699, Exhibit 2016: Excerpt of Dr. Richard Newman Deposition Transcript, Jan. 2, 2024, 21 pgs.
*Sophos Ltd. and Sophos Inc. v. Webroot Inc.*, PTAB Case No. IPR2023-00699, Exhibit 2017: Gheorghescu—Automated Virus Classification System, Jan. 2, 2024, 7 pgs.
*Crowdstrike, Inc. v. Webroot Inc.*, PTAB Case No. IPR2023-00556, Patent Owner's Preliminary Response, Jun. 16, 2023, 81 pgs.
*Crowdstrike, Inc. v. Webroot Inc.*, PTAB Case No. IPR2023-00556, Exhibit 2001: Declaration of Professor Nenad Medvidovic, Ph.D., Jun. 16, 2023, 63 pgs.
*Crowdstrike, Inc. v. Webroot Inc.*, PTAB Case No. IPR2023-00556, Exhibit 2002: Curriculum Vitae of Professor Nenad Medvidovic, Ph.D., Jul. 2022, 71 pgs.
*Crowdstrike, Inc. v. Webroot Inc.*, PTAB Case No. IPR2023-00556, Exhibit 2003: *Webroot, Inc., Open Text Inc., v. AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.
*Crowdstrike, Inc. v. Webroot Inc.*, PTAB Case No. IPR2023-00556, Exhibit 2004: *Sonrai Memory Ltd. v. Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Crowdstrike, Inc. v. Webroot Inc.*, PTAB Case No. IPR2023-00556, Exhibit 2005: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Crowdstrike, Inc. v. Webroot Inc.*, PTAB Case No. IPR2023-00556, Exhibit 2006: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Crowdstrike, Inc. v. Webroot Inc.*, PTAB Case No. IPR2023-00556, Exhibit 2007: *Webroot, Inc. and Open Text Inc., v. AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Crowdstrike, Inc. v. Webroot Inc.*, PTAB Case No. IPR2023-00556, Exhibit 2008: Dani Kass, "Catching Up On Patent Litigation With Judge Albright"; https://www.law360.com/pulse/articles/1582438/print?section=pulse/courts, Law360 Mar. 14, 2023, 3 pgs.
*Crowdstrike, Inc. v. Webroot Inc.*, PTAB Case No. IPR2023-00556, Exhibit 2009: U.S. District Court—Federal Court Management Statistics—Profiles—During the 12-Month Periods Ending Mar. 31, 2018 Through 2023, Table N/A—U.S. District Courts—Combined Civil and Criminal Federal Court Management Statistics, at https://www.uscourts.gov/sites/default/files/data_tables/fcms_na_distprofile0331.2023.pdf, Mar. 31, 2023, 95 pgs.
*Crowdstrike, Inc. v. Webroot Inc.*, PTAB Case No. IPR2023-00556, Exhibit 2010: *Webroot, Inc. and Open Text Inc., v. AO Kaspersky Lab et al.*, Case No. 6:22-cv-243-ADA-DTG, Claim Construction Order, Dkt. 236 (W.D. Tex. Mar. 16, 2023), 20 pgs.
*Crowdstrike, Inc. v. Webroot Inc.*, PTAB Case No. IPR2023-00556, Exhibit 2011: *Webroot, Inc. and Open Text Inc., v. CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.
*Crowdstrike, Inc. v. Webroot Inc.*, PTAB Case No. IPR2023-00556, Exhibit 2012: *Webroot, Inc. and Open Text Inc., v. AO Kaspersky Lab et al.*, Case No. 6:22-cv-243-ADA-DTG, Scheduling Order, Dkt. 39 (W.D. Tex. Aug. 17, 2022), 7 pgs.
*Crowdstrike, Inc. v. Webroot Inc.*, PTAB Case No. IPR2023-00556, Exhibit 2013: *Webroot, Inc. and Open Text Inc., v. ForcePoint LLC*, Case No. 6:22-cv-00342-ADA-DTG, Defendant ForcePoint LLC's Preliminary Invalidity Contentions (W.D. Tex., Sep. 13, 2022) (excerpted), 149 pgs.
*Crowdstrike, Inc. v. Webroot Inc.*, PTAB Case No. IPR2023-00556, Exhibit 2014: *Webroot, Inc. and Open Text Inc., v. Sophos Ltd.*, Case No. 6:22-cv-00240-ADA-DTG, Defendant Sophos Ltd.'s Preliminary Invalidity Contentions (W.D. Tex. Sep. 13, 2022) (excerpted), 127 pgs.
*Crowdstrike, Inc. v. Webroot Inc.*, PTAB Case No. IPR2023-00556, Exhibit 2015: *Webroot, Inc. and Open Text Inc., v. Trend Micro, Inc.*, Case No. 6:22-cv-00239-ADA-DTG, Defendant's Preliminary Invalidity Contentions (W.D. Tex., Sep. 13, 2022) (excerpted), 125 pgs.
*Crowdstrike, Inc. v. Webroot Inc.*, PTAB Case No. IPR2023-00556, Exhibit 2016: *Webroot, Inc. and Open Text Inc., v. AO Kaspersky Lab*, Case No. 6:22-cv-00243-ADA-DTG, Defendant's Preliminary Invalidity Contentions Appendix A (W.D. Tex., Sep. 14, 2022) (excerpted), 8 pgs.
*Crowdstrike, Inc. v. Webroot Inc.*, PTAB Case No. IPR2023-00556, Exhibit 2017: *Webroot, Inc. and Open Text Inc., v. CrowdStrike, Inc. and CrowdStrike Holdings, Inc.*, Case No. 6:22-cv-00241-ADA-DTG, Defendant's Preliminary Invalidity Contentions (W.D. Tex., Sep. 13, 2022) (excerpted), 62 pgs.
*Crowdstrike, Inc. v. Webroot Inc.*, PTAB Case No. IPR2023-00556, Exhibit 2018: Ex Parte James M. Brennan, et al., Appeal 2021-003606, U.S. Appl. No. 15/285,875, Decision On Appeal Statement of the Case (PTAB Jul. 26, 2022), 10 pgs.
*Crowdstrike, Inc. v. Webroot Inc.*, PTAB Case No. IPR2023-00556, Exhibit 2019: File History of U.S. Pat. No. 8,418,250, Jun. 16, 2023, 1187 pgs.
*Crowdstrike, Inc. v. Webroot Inc.*, PTAB Case No. IPR2023-00556, Patent Owner's Updated Mandatory Notices Pursuant to 37 CFR §42.8(b), Jun. 23, 2023, 9 pgs.
*Crowdstrike, Inc. v. Webroot Inc.*, PTAB Case No. IPR2023-00556, Notice of Petitioner Stipulation, Jul. 17, 2023, 3 pgs.
*Crowdstrike, Inc. v. Webroot Inc.*, PTAB Case No. IPR2023-00556, Decision Granting Institution of Inter Partes Review, Sep. 12, 2023, 25 pgs.
*Crowdstrike, Inc. v. Webroot Inc.*, PTAB Case No. IPR2023-00556, Sep. 12, 2023, Scheduling Order, Sep. 12, 2023, 12 pgs.
*Crowdstrike, Inc. v. Webroot Inc.*, PTAB Case No. IPR2023-00556, Patent Owner's Objections to Evidence submitted by Petitioner, Sep. 26, 2023, 5 pgs.
*Crowdstrike, Inc. v. Webroot Inc.*, PTAB Case No. IPR2023-00556, Panel Change Order, Nov. 8, 2023, 3 pgs.
*Crowdstrike, Inc. v. Webroot Inc.*, PTAB Case No. IPR2023-00556, Joint Stipulation to Modify Due Date 1, Nov. 16, 2023, 4 pgs.
*Crowdstrike, Inc. v. Webroot Inc.*, PTAB Case No. IPR2023-00556, Joint Motion to Terminate Proceeding, Nov. 20, 2023, 9 pgs.
*Crowdstrike, Inc. v. Webroot Inc.*, PTAB Case No. IPR2023-00556, Joint Request to Treat Agreement as Business Confidential Information, Nov. 20, 2023, 5 pgs.
*Crowdstrike, Inc. v. Webroot Inc.*, PTAB Case No. IPR2023-00556, Revised Scheduling Order, Jan. 2, 2024, 4 pgs.

(56) References Cited

OTHER PUBLICATIONS

*Sophos Ltd. and Sophos Inc. v. Webroot Inc.*, PTAB Case No. IPR2023-00633, Patent Owner's Preliminary Response, Jun. 16, 2023, 81 pgs.
*Sophos Ltd. and Sophos Inc. v. Webroot Inc.*, PTAB Case No. IPR2023-00633, Exhibit 2001: Declaration of Professor Nenad Medvidovic, Ph.D., Jun. 16, 2023, 70 pgs.
*Sophos Ltd. and Sophos Inc. v. Webroot Inc.*, PTAB Case No. IPR2023-00633, Exhibit 2002: Curriculum Vitae of Nenad Medvidovic, Ph.D., Jul. 2022, 71 pgs.
*Sophos Ltd. and Sophos Inc. v. Webroot Inc.*, PTAB Case No. IPR2023-00633, Exhibit 2003: *Webroot, Inc. and Open Text Inc., v. Sophos LTD*, Case No. 6:22-cv-240-ADA-DTG, Complaint (W.D. Tex Mar. 4, 2022), 144 pgs.
*Sophos Ltd. and Sophos Inc. v. Webroot Inc.*, PTAB Case No. IPR2023-00633, Exhibit 2004: *Sonrai Memory Ltd. v. Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Sophos Ltd. and Sophos Inc. v. Webroot Inc.*, PTAB Case No. IPR2023-00633, Exhibit 2005: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Sophos Ltd. and Sophos Inc. v. Webroot Inc.*, PTAB Case No. IPR2023-00633, Exhibit 2006: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Sophos Ltd. and Sophos Inc. v. Webroot Inc.*, PTAB Case No. IPR2023-00633, Exhibit 2007: Dani Kass, "Catching Up On Patent Litigation With Judge Albright"; https://www.law360.com/pulse/articles/1582438/print?section=pulse/courts, Law360 Mar. 14, 2023, 3 pgs.
*Sophos Ltd. and Sophos Inc. v. Webroot Inc.*, PTAB Case No. IPR2023-00633, Exhibit 2008: U.S. District Courts—Combined Civil and Criminal Federal Court Management Statistics (Mar. 31, 2023), at https://www.uscourts.gov/statistics/table/na/federal-court-management-statistics/2023/03/31-1, 95 pgs.
*Sophos Ltd. and Sophos Inc. v. Webroot Inc.*, PTAB Case No. IPR2023-00633, Exhibit 2009: *Webroot, Inc. and Open Text Inc., v. AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Sophos Ltd. and Sophos Inc. v. Webroot Inc.*, PTAB Case No. IPR2023-00633, Exhibit 2010: *Webroot, Inc. and Open Text Inc., v. AO Kaspersky Lab et al.*, Case No. 6:22-cv-243-ADA-DTG, Claim Construction Order, Dkt. 236 (W.D. Tex. Mar. 16, 2023), 20 pgs.
*Sophos Ltd. and Sophos Inc. v. Webroot Inc.*, PTAB Case No. IPR2023-00633, Exhibit 2011: U.S. Patent Application Publication No. 2002/0194490, Halperin, Dec. 19, 2002, 25 pgs.
*Sophos Ltd. and Sophos Inc. v. Webroot Inc.*, PTAB Case No. IPR2023-00633, Exhibit 2012: *Webroot, Inc. and Open Text Inc., v. Sophos LTD*, Case No. 6:22-CV-240-ADA-DTG, Scheduling Order, Dkt. 54 (W.D. Tex. Aug. 8, 2022), 4 pgs.
*Sophos Ltd. and Sophos Inc. v. Webroot Inc.*, PTAB Case No. IPR2023-00633, Exhibit 2013: *Webroot, Inc. and Open Text Inc., v. Forcepoint LLC*, Case No. 6:22-cv-00342-ADA-DTG, Defendant's Preliminary Invalidity Contentions (W.D. Tex., Sep. 13, 2022) (excerpted), 21 pgs.
*Sophos Ltd. and Sophos Inc. v. Webroot Inc.*, PTAB Case No. IPR2023-00633, Exhibit 2014: *Webroot, Inc. and Open Text Inc., v. Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 36 pgs.
*Sophos Ltd. and Sophos Inc. v. Webroot Inc.*, PTAB Case No. IPR2023-00633, Exhibit 2015: *Webroot, Inc. and Open Text Inc., v. Trend Micro, Inc..*, Case No. 6:22-cv-00239-ADA-DTG, Defendant's Preliminary Invalidity Contentions (W.D. Tex., Sep. 13, 2022) (excerpted), 47 pgs.
*Sophos Ltd. and Sophos Inc. v. Webroot Inc.*, PTAB Case No. IPR2023-00633, Exhibit 2016: *Webroot, Inc. and Open Text Inc., v. AO Kaspersky Lab et al.*, Case No. 6:22-cv-243-ADA-DTG, Defendant's Preliminary Invalidity Contentions Appendix A (W.D. Tex., Sep. 14, 2022), 8 pgs.
*Sophos Ltd. and Sophos Inc. v. Webroot Inc.*, PTAB Case No. IPR2023-00633, Exhibit 2017: *Webroot, Inc. and Open Text Inc., v. CrowdStrike, Inc. and CrowdStrike Holdings, Inc..*, Case No. 6:22-cv-00241-ADA, Defendant's Preliminary Invalidity Contentions (W.D. Tex., Sep. 13, 2022) (excerpted), 10 pgs.
*Sophos Ltd. and Sophos Inc. v. Webroot Inc.*, PTAB Case No. IPR2023-00633, Exhibit 2018: U.S. Pat. No. 8,726,389 Certified File History, Oct. 6, 2021, 324 pgs.
*Sophos Ltd. and Sophos Inc. v. Webroot Inc.*, PTAB Case No. IPR2023-00633, Exhibit 2019: Jul. 13, 2022 Email from Jennifer Inghram of King & Spalding, 2 pgs.
*Sophos Ltd. and Sophos Inc. v. Webroot Inc.*, PTAB Case No. IPR2023-00633, Exhibit 2020: *Webroot, Inc. and Open Text Inc., v. AO Kaspersky Lab et al.*, Case No. 6:22-cv-243-ADA-DTG, Joint Defendants' Opening Claim Construction Brief, Dkt. 86 (W.D. Tex., Oct. 28, 2022), 84 pgs.
*Sophos Ltd. and Sophos Inc. v. Webroot Inc.*, PTAB Case No. IPR2023-00633, Patent Owner Open Text Inc.'s Updated Mandatory Notices Pursuant to 37 CFR § 42.8(b), Jun. 23, 2023, 9 pgs.
*Sophos Ltd. and Sophos Inc. v. Webroot Inc.*, PTAB Case No. IPR2023-00633, Petitioner's Reply to Patent Owner's Preliminary Response, Aug. 18, 2023, 5 pgs.
*Sophos Ltd. and Sophos Inc. v. Webroot Inc.*, PTAB Case No. IPR2023-00633, Exhibit 1014: email granting Request for Leave to File Reply to Patent Owner's Preliminary Response, Aug. 10, 2023, 2 pgs.
*Sophos Ltd. and Sophos Inc. v. Webroot Inc.*, PTAB Case No. IPR2023-00633, Panel Change Order, Aug. 21, 2023, 3 pgs.
*Sophos Ltd. and Sophos Inc. v. Webroot Inc.*, PTAB Case No. IPR2023-00633, Patent Owner's Preliminary Sur-Reply, Aug. 25, 2023, 10 pgs.
*Sophos Ltd. and Sophos Inc. v. Webroot Inc.*, PTAB Case No. IPR2023-00633, Exhibit 2021: U.S. Patent and Trademark Office, General USPTO Customer Information, at https://www.uspto.gov/ebc/pair/pair_faq_pt_general.html#certifiedcopy, Aug. 25, 2023, 4 pgs.
*Sophos Ltd. and Sophos Inc. v. Webroot Inc.*, PTAB Case No. IPR2023-00633, Exhibit 2022: U.S. Patent and Trademark Office, Order Certified Copies, https://www.uspto.gov/patents/apply/checking-application-status/order-certified-copies, Aug. 25, 2023, 2 pgs.
*Sophos Ltd. and Sophos Inc. v. Webroot Inc.*, PTAB Case No. IPR2023-00633, Revised Mandatory Notices, Aug. 30, 2023, 5 pgs.
*Sophos Ltd. and Sophos Inc. v. Webroot Inc.*, PTAB Case No. IPR2023- 00633, Decision denying institution of Inter Parties Review, Sep. 12, 2023, 11 pgs.
*Crowdstrike, Inc. v. Webroot Inc.*, PTAB Case No. IPR2023-01050, Patent Owner Open Text Inc.'s Mandatory Notices Pursuant to 37 CFR § 42.8(b), Aug. 2, 2023, 9 pgs.
*Crowdstrike, Inc. v. Webroot Inc.*, PTAB Case No. IPR2023-01050, Notice of Filing Date Accorded to Petition and Time for Filing Patent Owner Preliminary Response, Aug. 23, 2023, 6 pgs.
*Crowdstrike, Inc. v. Webroot Inc.*, PTAB Case No. IPR2023-01050, Joint Request to Treat Agreement as Business Confidential Information, Nov. 20, 2023, 9 pgs.
*Crowdstrike, Inc. v. Webroot Inc.*, PTAB Case No. IPR2023-01050, Joint Motion to Terminate Proceeding, Nov. 20, 2023, 5 pgs.
*Crowdstrike, Inc. v. Webroot Inc.*, PTAB Case No. IPR2023-01050, Decision, Settlement Prior to Institution of Trial, Dec. 4, 2023, 5 pgs.
*Crowdstrike, Inc. v. Webroot Inc.*, PTAB Case No. IPR2023-01050, Exhibit 3001: Email regarding Joint Motion to Terminate Proceeding, Dec. 4, 2023, 2 pgs.

(56) References Cited

OTHER PUBLICATIONS

*Sophos Ltd. and Sophos Inc.* v. *Webroot Inc.*, PTAB Case No. IPR2023-00491, Exhibit 3001: email denying Request for Leave to File Reply to Patent Owner's Preliminary Response, Aug. 2, 2023, 3 pgs.
*Sophos Ltd. and Sophos Inc.* v. *Webroot Inc.*, PTAB Case No. IPR2023-00491, Decision denying institution of Inter Parties Review, Aug. 2, 2023, 27 pgs.
*Sophos Ltd. and Sophos Inc.* v. *Webroot Inc.*, PTAB Case No. IPR2023-00491, Revised Mandatory Notices, Aug. 30, 2023, 4 pgs.
*AO Kaspersky Lab* v. *Webroot Inc.*, PTAB Case No. IPR2023-01334, Petition for Inter Partes Review of U.S. Pat. No. 8,418,250, Aug. 18, 2023, 78 pgs.
*AO Kaspersky Lab* v. *Webroot Inc.*, PTAB Case No. IPR2023-01334, Exhibit 1001: U.S. Pat. No. 8,418,250, Morris, Apr. 9, 2013, 17 pgs.
*AO Kaspersky Lab* v. *Webroot Inc.*, PTAB Case No. IPR2023-01334, Exhibit 1002: File History of U.S. Pat. No. 8,418,250, Aug. 18, 2023, 888 pgs.
*AO Kaspersky Lab* v. *Webroot Inc.*, PTAB Case No. IPR2023-01334, Exhibit 1003: Declaration of Dr. Wenke Lee, Dec. 29, 2022, 171 pgs.
*AO Kaspersky Lab* v. *Webroot Inc.*, PTAB Case No. IPR2023-01334, Exhibit 1004: U.S. Patent Publication No. 20050210035, Kester, Sep. 22, 2005, 42 pgs.
*AO Kaspersky Lab* v. *Webroot Inc.*, PTAB Case No. IPR2023-01334, Exhibit 1005: U.S. Pat. No. 7,225,343, Honig, May 29, 2007, 22 pgs.
*AO Kaspersky Lab* v. *Webroot Inc.*, PTAB Case No. IPR2023-01334, Exhibit 1006: U.S. Pat. No. 7,594,272, Kennedy, Sep. 22, 2009, 10 pgs.
*AO Kaspersky Lab* v. *Webroot Inc.*, PTAB Case No. IPR2023-01334, Exhibit 1007: Plaintiff's Opposition Markman Brief, No. 6:22-cv-00243, USDC, WDTX, Nov. 18, 2022, 86 pgs.
*AO Kaspersky Lab* v. *Webroot Inc.*, PTAB Case No. IPR2023-01334, Exhibit 1010: Defendants' Opening Markman Brief, 22-cv-00243 WDTX, Oct. 28, 22, 84 pgs.
*AO Kaspersky Lab* v. *Webroot Inc.*, PTAB Case No. IPR2023-01334, Exhibit 1011: Intrusion Detection with Unlabeled Data Using Clustering by Leonid Portnoy, et al., Nov. 2001, 25 pgs.
*AO Kaspersky Lab* v. *Webroot Inc.*, PTAB Case No. IPR2023-01334, Exhibit 1012: U.S. Pat. No. 6,944,772, Dozortsev, Sep. 13, 2005, 10 pgs.
*AO Kaspersky Lab* v. *Webroot Inc.*, PTAB Case No. IPR2023-01334, Exhibit 1013: U.S. Pat. No. 6,772,363, Chess, Aug. 3, 2004, 14 pgs.
*AO Kaspersky Lab* v. *Webroot Inc.*, PTAB Case No. IPR2023-01334, Exhibit 1014: WO 2002033525, Shyne-Song Chuang, Apr. 25, 2002, 18 pgs.
*AO Kaspersky Lab* v. *Webroot Inc.*, PTAB Case No. IPR2023-01334, Exhibit 1015: EP 1549012, Kristof De Spiegeleer, Jun. 29, 2005, 19 pgs.
*AO Kaspersky Lab* v. *Webroot Inc.*, PTAB Case No. IPR2023-01334, Exhibit 1016: EP 1280040, Alexander James Hinchliffe, et al., Jan. 29, 2003, 17 pgs.
*AO Kaspersky Lab* v. *Webroot Inc.*, PTAB Case No. IPR2023-01334, Exhibit 1017: U.S. Patent Publication No. 20040153644, McCorkendale, Aug. 5, 2004, 15 pgs.
*AO Kaspersky Lab* v. *Webroot Inc.*, PTAB Case No. IPR2023-01334, Exhibit 1018: U.S. Pat. No. 7,516,476, Kraemer, Apr. 7, 2009, 13 pgs.
*AO Kaspersky Lab* v. *Webroot Inc.*, PTAB Case No. IPR2023-01334, Exhibit 1019: Harold S. Javitz et al., The NIDES Statistical Component: Description and Justification, Mar. 7, 1994, 52 pgs.
*AO Kaspersky Lab* v. *Webroot Inc.*, PTAB Case No. IPR2023-01334, Exhibit 1020: U.S. Pat. No. 7,448,084, Apap, Nov. 4, 2008, 17 pgs.
*AO Kaspersky Lab* v. *Webroot Inc.*, PTAB Case No. IPR2023-01334, Exhibit 1021: Order Granting Third Amended Scheduling Order, 22-cv-00243, WDTX, No. 142, Dec. 27, 2022, 9 pgs.
*AO Kaspersky Lab* v. *Webroot Inc.*, PTAB Case No. IPR2023-01334, Exhibit 1022: Declaration of V.S. Subrahmanian, Ph.D., Aug. 16, 2023, 86 pgs.
*AO Kaspersky Lab* v. *Webroot Inc.*, PTAB Case No. IPR2023-01334, Exhibit 1023: Order Granting Fifth Amended Scheduling Order, ECF No. 252, Mar. 29, 2023, 9 pgs.
*AO Kaspersky Lab* v. *Webroot Inc.*, PTAB Case No. IPR2023-01334, Notice of Filing Date Accorded to Petition and Time for Filing Patent Owner Preliminary Response, Aug. 28, 2023, 6 pgs.
*AO Kaspersky Lab* v. *Webroot Inc.*, PTAB Case No. IPR2023-01334, Patent Owner Open Text Inc.'s Mandatory Notices Pursuant to 37 CFR § 42.8(b), Sep. 8, 2023, 11 pgs.
*Trend Micro, Inc.* v. *Webroot Inc.*, PTAB Case No. IPR2023-01380, Petition for Inter Partes Review of U.S. Pat. No. 11,409,869, Sep. 5, 2023, 91 pgs.
*Trend Micro, Inc.* v. *Webroot Inc.*, PTAB Case No. IPR2023-01380, Exhibit 1001: U.S. Pat. No. 11,409,869, Schmidtler, Aug. 9, 2022, 16 pgs.
*Trend Micro, Inc.* v. *Webroot Inc.*, PTAB Case No. IPR2023-01380, Exhibit 1002: Prosecution History of 11,409,869, Sep. 5, 2023, 347 pgs.
*Trend Micro, Inc.* v. *Webroot Inc.*, PTAB Case No. IPR2023-01380, Exhibit 1003: Expert Declaration of Dr. Seth Nielson, Sep. 4, 2023, 174 pgs.
*Trend Micro, Inc.* v. *Webroot Inc.*, PTAB Case No. IPR2023-01380, Exhibit 1004: Curriculum Vitae of A.L. Seth Nielson, Ph.D., Sep. 4, 2023, 15 pgs.
*Trend Micro, Inc.* v. *Webroot Inc.*, PTAB Case No. IPR2023-01380, Exhibit 1005: Gil Tahan, Mal-ID: Automatic Malware Detection Using Common Segment Analysis and Meta-Features, Journal of Machine Learning 13, 949-979, Apr. 13, 2012, 31 pgs.
*Trend Micro, Inc.* v. *Webroot Inc.*, PTAB Case No. IPR2023-01380, Exhibit 1006: Eitan Menahem, Improving Malware Detection by Applying Multi-Inducer Ensemble, Computational Statistics & Data Analysis 53, 2009, 12 pgs.
*Trend Micro, Inc.* v. *Webroot Inc.*, PTAB Case No. IPR2023-01380, Exhibit 1007: U.S. Patent Publication No. 20090254992, Schultz, Oct. 8, 2009, 20 pgs.
*Trend Micro, Inc.* v. *Webroot Inc.*, PTAB Case No. IPR2023-01380, Exhibit 1008: Stuart Russell, Artificial Intelligence: A Modern Approach; The Intelligent Agent Book, Prentice Hall 2, 2003 pp. 749-751.
*Trend Micro, Inc.* v. *Webroot Inc.*, PTAB Case No. IPR2023-01380, Exhibit 1009: Lars Buitinck, API design for machine learning software: Experiences from the scikit-learn project, Sep. 2013, 16 pgs.
*Trend Micro, Inc.* v. *Webroot Inc.*, PTAB Case No. IPR2023-01380, Exhibit 1010: Declaration of Ingrid Hsieh-Yee, Ph.D., Aug. 15, 2023, 30 pgs.
*Trend Micro, Inc.* v. *Webroot Inc.*, PTAB Case No. IPR2023-01380, Exhibit 1011: Dr. Solomon's Anti-Virus Toolkit Reference Guide, Apr. 1999, 8 pgs.
*Trend Micro, Inc.* v. *Webroot Inc.*, PTAB Case No. IPR2023-01380, Exhibit 1012: George Karypis, Chameleon: A Hierarchical Clustering Algorithm Using Dynamic Modeling, IEEE 32 (8), Aug. 1999, 22 pgs.
*Trend Micro, Inc.* v. *Webroot Inc.*, PTAB Case No. IPR2023-01380, Exhibit 1013: Yingjie Tian, Recent Advances on Support Vector Machine Research, Technological and Economic Development of Economy 18(1), Apr. 2012, 32 pgs.
*Trend Micro, Inc.* v. *Webroot Inc.*, PTAB Case No. IPR2023-01380, Exhibit 1014: Ian H. Witten, Data Mining, Practical Machine Learning Tools and Techniques 2, Jul. 2005, 10 pgs.
*Trend Micro, Inc.* v. *Webroot Inc.*, PTAB Case No. IPR2023-01380, Exhibit 1015: Craig Szydlowski, Multithreaded Technology & Multicore Processors, Dr. Dobb's Journal, May 2005, 19 pgs.
*Trend Micro, Inc.* v. *Webroot Inc.*, PTAB Case No. IPR2023-01380, Exhibit 1016: *Webroot, Inc. and Open Text, Inc.* v. *Trend Micro Inc.*, Case No. 6:22-cv-00243-ADA-DTG, Claim Construction Order, Dkt. 391 (W.D. Tex.) Jul. 25, 2023, 15 pgs.
*Trend Micro, Inc.* v. *Webroot Inc.*, PTAB Case No. IPR2023-01380, Exhibit 1017: U.S. Pat. No. 7,657,838, Daniell et al., Feb. 2, 2010, 15 pgs.

(56) References Cited

OTHER PUBLICATIONS

*Trend Micro, Inc.* v. *Webroot Inc.*, PTAB Case No. IPR2023-01380, Exhibit 1018: U.S. Pat. No. 8,885,928, Forman, Nov. 11, 2014, 11 pgs.
*Trend Micro, Inc.* v. *Webroot Inc.*, PTAB Case No. IPR2023-01380, Exhibit 1019: U.S. Publication 20100082642, Forman, Apr. 1, 2010,14 pgs.
*Trend Micro, Inc.* v. *Webroot Inc.*, PTAB Case No. IPR2023-01389, Petition for Inter Partes Review of U.S. Pat. No. 8,856,505, Sep. 7, 2023, 63 pgs.
*Trend Micro, Inc.* v. *Webroot Inc.*, PTAB Case No. IPR2023-01389, Exhibit 1001: U.S. Pat. No. 8,856,505, Schneider, Oct. 7, 2014, 11 pgs.
*Trend Micro, Inc.* v. *Webroot Inc.*, PTAB Case No. IPR2023-01389, Exhibit 1002: Prosecution History of 8,856,505, Sep. 7, 2023, 351 pgs.
*Trend Micro, Inc.* v. *Webroot Inc.*, PTAB Case No. IPR2023-01389, Exhibit 1003: Expert Declaration of Dr. Seth Nielson, Sep. 7, 2023, 89 pgs.
*Trend Micro, Inc.* v. *Webroot Inc.*, PTAB Case No. IPR2023-01389, Exhibit 1004: Curriculum Vitae of Dr. Seth Nielson, Sep. 7, 2023, 15 pgs.
*Trend Micro, Inc.* v. *Webroot Inc.*, PTAB Case No. IPR2023-01389, Exhibit 1005: *Webroot, Inc. and Open Text, Inc.* v. *Trend Micro Inc.*, Case No. 6:22-cv-00243-ADA-DTG, Claim Construction Order, Dkt. 391 (W.D. Tex.) Jul. 25, 2023, 19 pgs.
*Trend Micro, Inc.* v. *Webroot Inc.*, PTAB Case No. IPR2023-01389, Exhibit 1006: Tal Garfinkel, A Virtual Machine Introspection Based Architecture for Intrusion Detection, Computer Science Department, Stanford University, 2003, 16 pgs.
*Trend Micro, Inc.* v. *Webroot Inc.*, PTAB Case No. IPR2023-01389, Exhibit 1007: Greg Hoglund, Subverting the Windows Kernel: Rootkits, Addison-Wesley Professional, Jul. 22, 2005, 363 pgs.
*Trend Micro, Inc.* v. *Webroot Inc.*, PTAB Case No. IPR2023-01389, Exhibit 1008: Andreas Bunten, UNIX and Linux based Rootkits Techniques and Countermeasures, DFN-CERT Services GmbH, Apr. 30, 2004, 17 pgs.
*Trend Micro, Inc.* v. *Webroot Inc.*, PTAB Case No. IPR2023-01389, Exhibit 1009: Catherine Dodge, A Study of Initialization in Linux and OpenBSD, ACM SIGOPS Operating Systems Review 39(2), pp. 79-93, Apr. 2005, 16 pgs.
*Trend Micro, Inc.* v. *Webroot Inc.*, PTAB Case No. IPR2023-01389, Exhibit 1010: Phrack Staff, Linux on-the-fly kernel patching without LKM (58), Linux on-the-fly kernel patching without LKM, at http://phrack.org/issues/58/7.html, Dec. 28, 2001, 71 pgs.
*Trend Micro, Inc.* v. *Webroot Inc.*, PTAB Case No. IPR2023-01389, Exhibit 1011: Red Hat Linux 6.2, The Official Red Hat Linuz Reference Guide, 2000, 375 pgs.
*Trend Micro, Inc.* v. *Webroot Inc.*, PTAB Case No. IPR2023-01389, Exhibit 1012: Kathy Ivens, Walkin' Through the Boot Process, Aug. 30, 2004, 9 pgs.
*Trend Micro, Inc.* v. *Webroot Inc.*, PTAB Case No. IPR2023-01389, Exhibit 1013: Henrique de Moraes Holschuh, System Init Scripts and the Debian O.S., 3rd Debian Conference, Jun. 2002, 20 pgs.
*Trend Micro, Inc.* v. *Webroot Inc.*, PTAB Case No. IPR2023-01389, Exhibit 1014: Frank Apap, Detecting Malicious Software by Monitoring Anomalous Windows Registry Accesses, LNCS (2516), Oct. 2002, 19 pgs.
*Trend Micro, Inc.* v. *Webroot Inc.*, PTAB Case No. IPR2023-01389, Exhibit 1015: Declaration of Ingrid Hsieh-Yee, Ph.D., Sep. 7, 2023, 26 pgs.
*Trend Micro, Inc.* v. *Webroot Inc.*, PTAB Case No. IPR2023-01390, Petition for Inter Partes Review of U.S. Pat. No. 8,201,243, Sep. 18, 2023, 79 pgs.
*Trend Micro, Inc.* v. *Webroot Inc.*, PTAB Case No. IPR2023-01390, Exhibit 1001: U.S. Pat. No. 8,201,243, Boney, Jun. 12, 2012, 13 pgs.
*Trend Micro, Inc.* v. *Webroot Inc.*, PTAB Case No. IPR2023-01390, Exhibit 1002: Prosecution History of 8,201,243, Sep. 18, 2023, 423 pgs.
*Trend Micro, Inc.* v. *Webroot Inc.*, PTAB Case No. IPR2023-01390, Exhibit 1003: Expert Declaration of Dr. Seth Nielson, Sep. 7, 2023, 135 pgs.
*Trend Micro, Inc.* v. *Webroot Inc.*, PTAB Case No. IPR2023-01390, Exhibit 1004: Curriculum Vitae of A.L. Seth Nielson, Ph.D., Sep. 18, 2023, 15 pgs.
*Trend Micro, Inc.* v. *Webroot Inc.*, PTAB Case No. IPR2023-01390, Exhibit 1005: *Webroot, Inc. and Open Text, Inc.* v. *Trend Micro Inc.*, Case No. 6:22-cv-00243-ADA-DTG, Claim Construction Order, Dkt. 391 (W.D. Tex., Jul. 25, 2023), 19 pgs.
*Trend Micro, Inc.* v. *Webroot Inc.*, PTAB Case No. IPR2023-01390, Exhibit 1006: Cristina Abad, Log Correlation for Intrusion Detection: A Proof of Concept, 19th Annual Computer Security Applications Conference, 2003, 10 pgs.
*Trend Micro, Inc.* v. *Webroot Inc.*, PTAB Case No. IPR2023-01390, Exhibit 1007: U.S. Publication No. 20070006310, Piccard, Jan. 4, 2007, 7 pgs.
*Trend Micro, Inc.* v. *Webroot Inc.*, PTAB Case No. IPR2023-01390, Exhibit 1008: U.S. Pat. No. 6,735,703, Kilpatrick, May 11, 2004, 11 pgs.
*Trend Micro, Inc.* v. *Webroot Inc.*, PTAB Case No. IPR2023-01390, Exhibit 1009: Ed Skoudis, Malware: Fighting Malicious Code, Pearson, Nov. 2003, 30 pgs.
*Trend Micro, Inc.* v. *Webroot Inc.*, PTAB Case No. IPR2023-01390, Exhibit 1010: Robert Rinnan, Benefits of Centralized Log File Correlation, Gjøvik University College, 2005, 68 pgs.
*Trend Micro, Inc.* v. *Webroot Inc.*, PTAB Case No. IPR2023-01390, Exhibit 1011: Platform SDK: Windows Management Instrumentation, Win32_Process, Win32_Process class [WMI] (archive.org), Jul. 17, 2004, 9 pgs.
*Trend Micro, Inc.* v. *Webroot Inc.*, PTAB Case No. IPR2023-01390, Exhibit 1012: Matthew M. Lavy, Windows Management Instrumentation (WMI), Sams, Oct. 2001, 24 pgs.
*Trend Micro, Inc.* v. *Webroot Inc.*, PTAB Case No. IPR2023-01390, Exhibit 1013: Yariv Kaplan API Spying Techniques for Windows 9x, NT and 2000 (archive.org) Feb. 10, 2003, 7 pgs.
*Trend Micro, Inc.* v. *Webroot Inc.*, PTAB Case No. IPR2023-01390, Exhibit 1014: Stephanie Forrest, Computer Immunology, Communications of the ACM 40(1), Oct. 1997, 9 pgs.
*Trend Micro, Inc.* v. *Webroot Inc.*, PTAB Case No. IPR2023-01390, Exhibit 1015: Declaration of Ingrid Hsieh-Yee, Ph.D., Sep. 7, 2023, 24 pgs.
*Trend Micro, Inc.* v. *Webroot Inc.*, PTAB Case No. IPR2023-01390, Notice of Filing Date Accorded to Petition and Time for Filing Patent Owner Preliminary Response, Sep. 18, 2023, 6 pgs.
*Trend Micro, Inc.* v. *Webroot Inc.*, PTAB Case No. IPR2023-01391, Petition for Inter Partes Review of U.S. Pat. No. 8,719,932, Sep. 7, 2023, 79 pgs.
*Trend Micro, Inc.* v. *Webroot Inc.*, PTAB Case No. IPR2023-01391, Exhibit 1001: U.S. Pat. No. 8,719,932, Boney, May 6, 2014, 12 pgs.
*Trend Micro, Inc.* v. *Webroot Inc.*, PTAB Case No. IPR2023-01391, Exhibit 1002: Prosecution History of 8719932, Sep. 7, 2023, 120 pgs.
*Trend Micro, Inc.* v. *Webroot Inc.*, PTAB Case No. IPR2023-01391, Exhibit 1003: Expert Declaration of Dr. Seth Nielson, Sep. 7, 2023, 138 pgs.
*Trend Micro, Inc.* v. *Webroot Inc.*, PTAB Case No. IPR2023-01391, Exhibit 1004: Curriculum Vitae of Dr. Seth Nielson, Sep. 7, 2023, 15 pgs.
*Trend Micro, Inc.* v. *Webroot Inc.*, PTAB Case No. IPR2023-01391, Exhibit 1005: *Webroot, Inc. and Open Text, Inc.* v. *Trend Micro Inc.*, Case No. 6:22-cv-00243-ADA-DTG, Claim Construction Order, Dkt. 391 (W.D. Tex.), Jul. 25, 2023, 19 pgs.
*Trend Micro, Inc.* v. *Webroot Inc.*, PTAB Case No. IPR2023-01391, Exhibit 1006: Cristina Abad, Log Correlation for Intrusion Detection: A Proof of Concept, 19th Annual Computer Security Applications Conference, 2003, 10 pgs.
*Trend Micro, Inc.* v. *Webroot Inc.*, PTAB Case No. IPR2023-01391, Exhibit 1007: U.S. Publication No. 20070006310, Piccard, Jan. 4, 2007, 7 pgs.
*Trend Micro, Inc.* v. *Webroot Inc.*, PTAB Case No. IPR2023-01391, Exhibit 1008: U.S. Pat. No. 6,735,703, Kilpatrick, May 11, 2004, 11 pgs.

(56) References Cited

OTHER PUBLICATIONS

*Trend Micro, Inc. v. Webroot Inc.*, PTAB Case No. IPR2023-01391, Exhibit 1009: Ed Skoudis, Malware: Fighting Malicious Code, Pearson, Nov. 2003, 30 pgs.

*Trend Micro, Inc. v. Webroot Inc.*, PTAB Case No. IPR2023-01391, Exhibit 1010: Robert Rinnan, Benefits of Centralized Log File Correlation, Gjøvik University College, 2005, 68 pgs.

*Trend Micro, Inc. v. Webroot Inc.*, PTAB Case No. IPR2023-01391, Exhibit 1011: Platform SDK: Windows Management Instrumentation, Win32_Process, Win32_Process class [WMI] (archive.org) Jul. 17, 2004, 9 pgs.

*Trend Micro, Inc. v. Webroot Inc.*, PTAB Case No. IPR2023-01391, Exhibit 1012: Matthew M. Lavy, Windows Management Instrumentation (WMI), Sams, Oct. 2001, 24 pgs.

*Trend Micro, Inc. v. Webroot Inc.*, PTAB Case No. IPR2023-01391, Exhibit 1013: Yariv Kaplan, API Spying Techniques for Windows 9x, NT and 2000, API Spying Techniques for Windows 9x, NT and 2000 (archive.org), Feb. 10, 2003, 7 pgs.

*Trend Micro, Inc. v. Webroot Inc.*, PTAB Case No. IPR2023-01391, Exhibit 1014: Stephanie Forrest, Computer Immunology, Communications of the ACM 40(1), Oct. 1997, 9 pgs.

*Trend Micro, Inc. v. Webroot Inc.*, PTAB Case No. IPR2023-01391, Exhibit 1015: Declaration of Ingrid Hsieh-Yee, Ph.D., Sep. 7, 2023, 24 pgs.

*Trend Micro, Inc. v. Webroot Inc.*, PTAB Case No. IPR2023-01391, Notice of Filing Date Accorded to Petition and Time for Filing Patent Owner Preliminary Response, Sep. 18, 2023, 6 pgs.

*Trend Micro, Inc. v. Webroot Inc.*, PTAB Case No. IPR2023-01392, Petition for Inter Partes Review of U.S. Pat. No. 8,181,244, Sep. 7, 2023, 88 pgs.

*Trend Micro, Inc. v. Webroot Inc.*, PTAB Case No. IPR2023-01392, Exhibit 1001: U.S. Pat. No. 8,181,244, Boney, Mar. 15, 2012, 13 pgs.

*Trend Micro, Inc. v. Webroot Inc.*, PTAB Case No. IPR2023-01392, Exhibit 1002: Prosecution History of 8181244, Sep. 7, 2023, 389 pgs.

*Trend Micro, Inc. v. Webroot Inc.*, PTAB Case No. IPR2023-01392, Exhibit 1003: Expert Declaration of Dr. Seth Nielson, Sep. 7, 2023, 142 pgs.

*Trend Micro, Inc. v. Webroot Inc.*, PTAB Case No. IPR2023-01392, Exhibit 1004: Curriculum Vitae of Dr. Seth Nielson, Sep. 7, 2023, 15 pgs.

*Trend Micro, Inc. v. Webroot Inc.*, PTAB Case No. IPR2023-01392, Exhibit 1005: *Webroot, Inc. and Open Text, Inc. v. Trend Micro Inc.*, Case No. 6:22-cv-00243-ADA-DTG, Claim Construction Order, Dkt. 391 (W.D. Tex.), Jul. 25, 2023, 19 pgs.

*Trend Micro, Inc. v. Webroot Inc.*, PTAB Case No. IPR2023-01392, Exhibit 1006: Kevin Chen, ECF—Event Correlation for Forensics, Australian Computer, Network & Information Forensics Conference, 2003, 10 pgs.

*Trend Micro, Inc. v. Webroot Inc.*, PTAB Case No. IPR2023-01392, Exhibit 1007: U.S. Patent Publication No. 20070006310, Piccard, Jan. 4, 2007, 7 pgs.

*Trend Micro, Inc. v. Webroot Inc.*, PTAB Case No. IPR2023-01392, Exhibit 1008: Zhenmin Li, UCLog: A Unified, Correlated Logging Architecture for Intrusion Detection, Int'l Conf. on Telecomm. Sys. Modelling & Analysis, 2004, 15 pgs.

*Trend Micro, Inc. v. Webroot Inc.*, PTAB Case No. IPR2023-01392, Exhibit 1009: Declaration of Ingrid Hsieh-Yee, Ph.D., Sep. 7, 2023, 29 pgs.

*Trend Micro, Inc. v. Webroot Inc.*, PTAB Case No. IPR2023-01392, Exhibit 1010: Peter G. Viscarola, Windows NT Device Driver Development, ORS Open Systems Resources, Inc., 1999, 686 pgs.

*Trend Micro, Inc. v. Webroot Inc.*, PTAB Case No. IPR2023-01392, Exhibit 1011: Nicholas Weaver, Worms vs. Perimeters: The Case or Hard-LANS, 12th Annual IEEE Symposium, Aug. 2004, 8 pgs.

*Trend Micro, Inc. v. Webroot Inc.*, PTAB Case No. IPR2023-01392, Exhibit 1012: Weidong Cui, Design and Implementation of an Extrusion-based Break-In Detector for Personal Computers, 2006, 11 pgs.

*Trend Micro, Inc. v. Webroot Inc.*, PTAB Case No. IPR2023-01392, Exhibit 1013: Cristina Abad, Log Correlation for Intrusion Detection: A Proof of Concept, 19th Annual Computer Security Applications Conference, 2003, 10 pgs.

*Trend Micro, Inc. v. Webroot Inc.*, PTAB Case No. IPR2023-01392, Exhibit 1014: Robert Rinnan, Benefits of Centralized Log File Correlation, Gjøvik University College, 2005, 68 pgs.

*Trend Micro, Inc. v. Webroot Inc.*, PTAB Case No. IPR2023-01392, Exhibit 1015: Ed Skoudis, Malware: Fighting Malicious Code, Pearson, Nov. 2003, 30 pgs.

*Trend Micro, Inc. v. Webroot Inc.*, PTAB Case No. IPR2023-01392, Exhibit 1016: Platform SDK: Windows Management Instrumentation, Win32_Process, Win32_Process class [WMI] (archive.org), Jul. 17, 2004, 9 pgs.

*Trend Micro, Inc. v. Webroot Inc.*, PTAB Case No. IPR2023-01392, Exhibit 1017: Matthew M. Lavy, Windows Management Instrumentation (WMI), Sams, Oct. 2001, 24 pgs.

*Trend Micro, Inc. v. Webroot Inc.*, PTAB Case No. IPR2023-01392, Exhibit 1018: Yariv Kaplan, API Spying Techniques for Windows 9x, NT and 2000, API Spying Techniques for Windows 9x, NT and 2000 (archive.org) Feb. 10, 2003, 7 pgs.

*Trend Micro, Inc. v. Webroot Inc.*, PTAB Case No. IPR2023-01392, Exhibit 1019: Stephanie Forrest, Computer Immunology, Communications of the ACM 40(1), Oct. 1997, 9 pgs.

*Trend Micro, Inc. v. Webroot Inc.*, PTAB Case No. IPR2023-01392, Corrected Exhibit List, Sep. 19, 2023, 4 pgs.

*Trend Micro, Inc. v. Open Text Inc.*, PTAB Case No. IPR2023-01459, Petition for Inter Partes Review of U.S. Pat. No. 8,726,389, Oct. 4, 2023, 89 pgs.

*Trend Micro, Inc. v. Open Text Inc.*, PTAB Case No. IPR2023-01459, Exhibit 1001: U.S. Pat. No. 8,726,389, Morris, May 13, 2014, 17 pgs.

*Trend Micro, Inc. v. Open Text Inc.*, PTAB Case No. IPR2023-01459, Exhibit 1002: File History of U.S. Pat. No. 8,726,389, Oct. 4, 2023, 276 pgs.

*Trend Micro, Inc. v. Open Text Inc.*, PTAB Case No. IPR2023-01459, Exhibit 1003: Declaration of Dr. Wenke Lee, Feb. 17, 2023, 164 pgs.

*Trend Micro, Inc. v. Open Text Inc.*, PTAB Case No. IPR2023-01459, Exhibit 1004: U.S. Patent Application Publication No. 20050210035 A1, Kester et al., Sep. 22, 2005, 42 pgs.

*Trend Micro, Inc. v. Open Text Inc.*, PTAB Case No. IPR2023-01459, Exhibit 1005: U.S. Pat. No. 7,594,272, Kennedy et al., Sep. 22, 2009, 10 pgs.

*Trend Micro, Inc. v. Open Text Inc.*, PTAB Case No. IPR2023-01459, Exhibit 1006: U.S. Pat. No. 7,225,343, Honig et al., May 29, 2007, 22 pgs.

*Trend Micro, Inc. v. Open Text Inc.*, PTAB Case No. IPR2023-01459, Exhibit 1007: PO Opposition Markman Brief, 22-cv-00243 WDTX, No. 98, Nov. 18, 2022, 86 pgs.

*Trend Micro, Inc. v. Open Text Inc.*, PTAB Case No. IPR2023-01459, Exhibit 1008: Defendants' Markman Brief, 22-cv-00243 WDTX, No. 86, Oct. 28, 2022, 84 pgs.

*Trend Micro, Inc. v. Open Text Inc.*, PTAB Case No. IPR2023-01459, Exhibit 1009: Order Granting Fifth Amended Scheduling Order, 22-cv-00243 WDTX, No. 252, Mar. 29, 2023, 9 pgs.

*Trend Micro, Inc. v. Open Text Inc.*, PTAB Case No. IPR2023-01459, Exhibit 1010: SANS Institute, Host- vs. Network-Based Intrusion Detection Systems, 2000-2005, 11 pgs.

*Trend Micro, Inc. v. Open Text Inc.*, PTAB Case No. IPR2023-01459, Exhib: Intrusion Detection with Unlabeled Data Using Clustering by Leonid Portnoy, et al., Nov. 2001, 25 pgs.

*Trend Micro, Inc. v. Open Text Inc.*, PTAB Case No. IPR2023-01459, Exhibit 1012: U.S. Pat. No. 6,944,772, Dozortsev, Sep. 13, 2005, 10 pgs.

*Trend Micro, Inc. v. Open Text Inc.*, PTAB Case No. IPR2023-01459, Exhibit 1013: U.S. Pat. No. 6,772,346, Chess et al., Aug. 3, 2004, 14 pgs.

*Trend Micro, Inc. v. Open Text Inc.*, PTAB Case No. IPR2023-01459, Exhibit 1014: WO 2002033525, Shyne-Song Chuang, Apr. 25, 2002, 18 pgs.

(56) References Cited

OTHER PUBLICATIONS

*Trend Micro, Inc.* v. *Open Text Inc.*, PTAB Case No. IPR2023-01459, Exhibit 1015: EP 1,549,012, Kristof De Spiegeleer, Jun. 29, 2005, 19 pgs.
*Trend Micro, Inc.* v. *Open Text Inc.*, PTAB Case No. IPR2023-01459, Exhibit 1016: EP 1,280,040, Alexander James Hinchliffe, et al., Jan. 29, 2003, 17 pgs.
*Trend Micro, Inc.* v. *Open Text Inc.*, PTAB Case No. IPR2023-01459, Exhibit 1017: U.S. Pat. No. 7,089,428, Farley et al., Aug. 8, 2006, 35 pgs.
*Trend Micro, Inc.* v. *Open Text Inc.*, PTAB Case No. IPR2023-01459, Exhibit 1018: U.S. Patent Publication No. 20040153644, McCorkendale, Aug. 5, 2004, 16 pgs.
*Trend Micro, Inc.* v. *Open Text Inc.*, PTAB Case No. IPR2023-01459, Exhibit 1019: The NIDES Statistical Component: Description and Justification by Harold S. Javitz et al., Mar. 7, 1994, 52 pgs.
*Trend Micro, Inc.* v. *Open Text Inc.*, PTAB Case No. IPR2023-01459, Exhibit 1020: U.S. Pat. No. 7,516,476, Kraemer et al., Apr. 7, 2009, 13 pgs.
*Trend Micro, Inc.* v. *Open Text Inc.*, PTAB Case No. IPR2023-01459, Exhibit 1021: U.S. Pat. No. 8,418,250, Morris et al., Apr. 9, 2013, 17 pgs.
*Trend Micro, Inc.* v. *Open Text Inc.*, PTAB Case No. IPR2023-01459, Exhibit 1022: U.S. Pat. No. 10,284,591, Giuliani et al., May 7, 2019, 14 pgs.
*Trend Micro, Inc.* v. *Open Text Inc.*, PTAB Case No. IPR2023-01459, Notice of Filing Date Accorded to Petition and Time for Filing Patent Owner Preliminary Response, Oct. 17, 2023, 6 pgs.
*Trend Micro, Inc.* v. *Open Text Inc.*, PTAB Case No. IPR2023-01459, Patent Owner Open Text Inc.'s Mandatory Notices Pursuant to 37 CFR § 42.8(b), Oct. 25, 2023, 11 pgs.
*AO Kaspersky Lab* v. *Webroot Inc.*, PTAB Case No. IPR2024-00035, Petition for Inter Partes Review of U.S. Pat. No. 8,726,389, Oct. 11, 2023, 76 pgs.
*AO Kaspersky Lab* v. *Webroot Inc.*, PTAB Case No. IPR2024-00035, Exhibit 1001: U.S. Pat. No. 8,726,389, Morris et al., May 13, 2014, 17 pgs.
*AO Kaspersky Lab* v. *Webroot Inc.*, PTAB Case No. IPR2024-00035, Exhibit 1002: File History of U.S. Pat. No. 8,726,389, Oct. 11, 2023, 276 pgs.
*AO Kaspersky Lab* v. *Webroot Inc.*, PTAB Case No. IPR2024-00035, Exhibit 1003: Declaration of Dr. Wenke Lee, Feb. 17, 2023, 164 pgs.
*AO Kaspersky Lab* v. *Webroot Inc.*, PTAB Case No. IPR2024-00035, Exhibit 1004: U.S. Patent Application Publication No. 2005/0210035 A1, Kester et al., Sep. 22, 2005, 42 pgs.
*AO Kaspersky Lab* v. *Webroot Inc.*, PTAB Case No. IPR2024-00035, Exhibit 1005: U.S. Pat. No. 7,594,272, Kennedy et al., Sep. 22, 2009, 10 pgs.
*AO Kaspersky Lab* v. *Webroot Inc.*, PTAB Case No. IPR2024-00035, Exhibit 1006: U.S. Pat. No. 7,225,343, Honig et al., May 29, 2007, 22 pgs.
*AO Kaspersky Lab* v. *Webroot Inc.*, PTAB Case No. IPR2024-00035, Exhibit 1007: PO Opposition Markman Brief, 22-cv-00243 WDTX, No. 98, Nov. 18, 2022, 86 pgs.
*AO Kaspersky Lab* v. *Webroot Inc.*, PTAB Case No. IPR2024-00035, Exhibit 1008: Defendants' Opening Markman Brief, 22-cv-00243 WDTX, No. 86, Oct. 28, 2022, 84 pgs.
*AO Kaspersky Lab* v. *Webroot Inc.*, PTAB Case No. IPR2024-00035, Exhibit 1009: Order Granting Fourth Amended Scheduling Order, 22-cv-00243 WDTX, No. 160, Jan. 22, 2023, 7 pgs.
*AO Kaspersky Lab* v. *Webroot Inc.*, PTAB Case No. IPR2024-00035, Exhibit 1010: SANS Institute, Host- vs. Network-Based Intrusion Detection Systems, 2000-2005, 11 pgs.
*AO Kaspersky Lab* v. *Webroot Inc.*, PTAB Case No. IPR2024-00035, Exhibit 1011: Intrusion Detection with Unlabeled Data Using Clustering by Leonid Portnoy, et al., Nov. 2001, 25 pgs.
*AO Kaspersky Lab* v. *Webroot Inc.*, PTAB Case No. IPR2024-00035, Exhibit 1012: U.S. Pat. No. 6,944,772, Dozortsev, Sep. 13, 2005, 10 pgs.
*AO Kaspersky Lab* v. *Webroot Inc.*, PTAB Case No. IPR2024-00035, Exhibit 1013: U.S. Pat. No. 6,772,346, Chess et al., Aug. 3, 2004, 14 pgs.
*AO Kaspersky Lab* v. *Webroot Inc.*, PTAB Case No. IPR2024-00035, Exhibit 1014: WO 2002/033525, Shyne-Song Chuang, Apr. 25, 2002, 18 pgs.
*AO Kaspersky Lab* v. *Webroot Inc.*, PTAB Case No. IPR2024-00035, Exhibit 1015: EP 1,549,012, Kristof De Spiegeleer, Jun. 29, 2005, 19 pgs.
*AO Kaspersky Lab* v. *Webroot Inc.*, PTAB Case No. IPR2024-00035, Exhibit 1016: EP 1,280,040, Alexander James Hinchliffe, et al., Jan. 29, 2003, 17 pgs.
*AO Kaspersky Lab* v. *Webroot Inc.*, PTAB Case No. IPR2024-00035, Exhibit 1017: U.S. Pat. No. 7,089,428, Farley et al., Aug. 8, 2006, 35 pgs.
*AO Kaspersky Lab* v. *Webroot Inc.*, PTAB Case No. IPR2024-00035, Exhibit 1018: U.S. Patent Publication No. 20040153644, McCorkendale, Aug. 5, 2004, 15 pgs.
*AO Kaspersky Lab* v. *Webroot Inc.*, PTAB Case No. IPR2024-00035, Exhibit 1019: The NIDES Statistical Component: Description and Justification by Harold S. Javitz et al., Mar. 7, 1994, 52 pgs.
*AO Kaspersky Lab* v. *Webroot Inc.*, PTAB Case No. IPR2024-00035, Exhibit 1020: U.S. Pat. No. 7,516,476, Kraemer et al., Apr. 7, 2009, 13 pgs.
*AO Kaspersky Lab* v. *Webroot Inc.*, PTAB Case No. IPR2024-00035, Exhibit 1021: U.S. Pat. No. 8,418,250, Morris et al., Apr. 9, 2013, 17 pgs.
*AO Kaspersky Lab* v. *Webroot Inc.*, PTAB Case No. IPR2024-00035, Exhibit 1022: U.S. Pat. No. 10,284,591, Giuliani et al., May 7, 2019, 14 pgs.
*AO Kaspersky Lab* v. *Webroot Inc.*, PTAB Case No. IPR2024-00035, Exhibit 1023: Declaration of V.S. Subrahmanian, Ph.D., Oct. 9, 2023, 88 pgs.
*AO Kaspersky Lab* v. *Webroot Inc.*, PTAB Case No. IPR2024-00035, Exhibit 1024: Order Granting Fifth Amended Scheduling Order, ECF No. 252, Mar. 29, 2023, 9 pgs.
*AO Kaspersky Lab* v. *Webroot Inc.*, PTAB Case No. IPR2024-00035, Notice of Filing Date Accorded to Petition and Time for Filing Patent Owner Preliminary Response, Oct. 17, 2023, 6 pgs.
*AO Kaspersky Lab* v. *Webroot Inc.*, PTAB Case No. IPR2024-00035, Patent Owner Open Text Inc.'s Mandatory Notices Pursuant to 37 CFR § 42.8(b), Oct. 25, 2023, 11 pgs.
*Trend Micro, Inc.* v. *Webroot Inc.*, PTAB Case No. IPR2024-00106, Petition for Inter Partes Review of U.S. Pat. No. 8,418,250, Nov. 8, 2023, 85 pgs.
*Trend Micro, Inc.* v. *Webroot Inc.*, PTAB Case No. IPR2024-00106, Exhibit 1001: U.S. Pat. No. 8,418,250, Morris, Apr. 9, 2013, 17 pgs.
*Trend Micro, Inc.* v. *Webroot Inc.*, PTAB Case No. IPR2024-00106, Exhibit 1002: File History for U.S. Pat. No. 8,418,250, Nov. 8, 2023, 888 pgs.
*Trend Micro, Inc.* v. *Webroot Inc.*, PTAB Case No. IPR2024-00106, Exhibit 1003: Complaint, *Webroot Inc, et al.* v. *Sophos Ltd.*, No. 6:22-cv-240 (W.D. Tex.), Mar. 4, 2022, 144 pgs.
*Trend Micro, Inc.* v. *Webroot Inc.*, PTAB Case No. IPR2024-00106, Exhibit 1004: Declaration of Dr. Richard Newman, Mar. 8, 2023, 85 pgs.
*Trend Micro, Inc.* v. *Webroot Inc.*, PTAB Case No. IPR2024-00106, Exhibit 1005: Curriculum Vitae of Dr. Richard Newman, Nov. 8, 2023, 13 pgs.
*Trend Micro, Inc.* v. *Webroot Inc.*, PTAB Case No. IPR2024-00106, Exhibit 1006: U.S. Patent Appl. Pub. No. 2004/0111632, Halperin, Jun. 10, 2004, 22 pgs.
*Trend Micro, Inc.* v. *Webroot Inc.*, PTAB Case No. IPR2024-00106, Exhibit 1007: U.S. Pat. No. 7,694,150, Kirby, Apr. 6, 2010, 22 pgs.
*Trend Micro, Inc.* v. *Webroot Inc.*, PTAB Case No. IPR2024-00106, Exhibit 1008: U.S. Pat. No. 7,900,194, Mankins, Mar. 1, 2011, 12 pgs.
*Trend Micro, Inc.* v. *Webroot Inc.*, PTAB Case No. IPR2024-00106, Exhibit 1009: Stipulation Waiving IPR Claims in District Court Litigation, Mar. 8, 2023, 4 pgs.
*Trend Micro, Inc.* v. *Webroot Inc.*, PTAB Case No. IPR2024-00106, Exhibit 1010: S. Forrest et al., Computer Immunology, Comms. of the ACM, vol. 40, No. 10, 88-96, 1997, 9 pgs.

(56) References Cited

OTHER PUBLICATIONS

*Trend Micro, Inc. v. Webroot Inc.*, PTAB Case No. IPR2024-00106, Exhibit 1011: A. Snoeren et al., Single-Packet IP Traceback, IEEE/ACM Trans. on Networking (TON), vol. 10, No. 6, 721-34, 2002, 14 pgs.

*Trend Micro, Inc. v. Webroot Inc.*, PTAB Case No. IPR2024-00106, Exhibit 1012: S. Hofmeyr, Intrusion Detection Using Sequences of System Calls, J. Computer Security, vol. 6, Issue 3, 151-180, Aug. 18, 1998, 25 pgs.

*Trend Micro, Inc. v. Webroot Inc.*, PTAB Case No. IPR2024-00106, Exhibit 1013: S. Forrest et al., A Sense of Self for Unix Processes, Proc. 1996 IEEE Symp. on Security and Privacy, 120-28 1996, 9 pgs.

*Trend Micro, Inc. v. Webroot Inc.*, PTAB Case No. IPR2024-00106, Exhibit 1014: Order Granting Fifth Amended Scheduling Order, Dkt. 253, *Webroot, Inc., et al. v. AO Kaspersky Lab*, No. 6:22-cv-00243-ADA-DTG (W.D. Tex.) Mar. 29, 2023, 7 pgs.

*Trend Micro, Inc. v. Webroot Inc.*, PTAB Case No. IPR2024-00106, Exhibit 1015: Excerpt from Transcript of Motions Hearing in *Webroot, Inc., et al. v. AO Kaspersky Lab*, No. 6:22-cv-00243-ADA-DTG (W.D. Tex.) Dec. 9, 2022, 7 pgs.

*Trend Micro, Inc. v. Webroot Inc.*, PTAB Case No. IPR2024-00106, Exhibit 1016: Threat Graphs examples: Malware detection, Sophos Ltd., KB-000036359, https://support.sophos.com/support/s/article/KB000036359?language=en_US, Feb. 23, 2023, 15 pgs.

*Trend Micro, Inc. v. Webroot Inc.*, PTAB Case No. IPR2024-00106, Corrected Exhibit, Nov. 22, 2023, 4 pgs.

*Trend Micro, Inc. v. Webroot Inc.*, PTAB Case No. IPR2024-00106, Exhibit 1014: Order Granting Fifth Amended Scheduling Order, Dkt. 253, *Webroot Inc et al. v. AO Kaspersky Lab*, No. 6:22-CV-00243-ADA-DTG (W.D. Tex, Mar. 29, 2023), Nov. 22, 2023, 9 pgs.

*Trend Micro, Inc. v. Webroot Inc.*, PTAB Case No. IPR2024-00106, Notice of Filing Date Accorded to Petition and Time for Filing Patent Owner Preliminary Response, Nov. 22, 2023, 6 pgs.

*Trend Micro, Inc. v. Webroot Inc.*, PTAB Case No. IPR2024-00106, Patent Owner Open Text Inc.'s Mandatory Notices Pursuant to 37 CFR § 42.8(b), Nov. 29, 2023, 10 pgs.

*Sophos Ltd. and Sophos Inc. v. Webroot Inc.*, PTAB Case No. IPR2024-00252, Petition for Inter Partes Review of U.S. Pat. No. 8,201,243, Dec. 8, 2023, 87 pgs.

*Sophos Ltd. and Sophos Inc. v. Webroot Inc.*, PTAB Case No. IPR2024-00252, Exhibit 1001: U.S. Pat. No. 8,201,243, Boney, Jun. 12, 2012, 13 pgs.

*Sophos Ltd. and Sophos Inc. v. Webroot Inc.*, PTAB Case No. IPR2024-00252, Exhibit 1002: File History of the '243 Patent, Dec. 8, 2023, 423 pgs.

*Sophos Ltd. and Sophos Inc. v. Webroot Inc.*, PTAB Case No. IPR2024-00252, Exhibit 1003: Declaration of Dr. Henry Houh, Nov. 29, 2023, 113 pgs.

*Sophos Ltd. and Sophos Inc. v. Webroot Inc.*, PTAB Case No. IPR2024-00252, Exhibit 1004: Curriculum Vitae of Dr. Henry Houh, Dec. 8, 2023, 12 pgs.

*Sophos Ltd. and Sophos Inc. v. Webroot Inc.*, PTAB Case No. IPR2024-00252, Exhibit 1005: Li, et al., UCLog: A Unified, Correlated Logging Architecture for Intrusion Detection, Int'l Conf. on Telecomm. Sys.Modelling & Analysis, Jan. 2004, 15 pgs.

*Sophos Ltd. and Sophos Inc. v. Webroot Inc.*, PTAB Case No. IPR2024-00252, Exhibit 1006: U.S. Pat. No. 8,117,659, Hartrell, Feb. 14, 2002, 16 pgs.

*Sophos Ltd. and Sophos Inc. v. Webroot Inc.*, PTAB Case No. IPR2024-00252, Exhibit 1007: Salvador Mandujano Vergara, A multiagent approach to outbound intrusion detection, (Ph.D. Thesis, Instituto Tecnológico y de Estudios Superires de Monterrey) (on file with Repositorio Institucional del Tecnológico de Monterrey (RITEC) in the Instituto Tecnológico y de Estudios Superiores de Monterrey Library), 2004, 216 pgs.

*Sophos Ltd. and Sophos Inc. v. Webroot Inc.*, PTAB Case No. IPR2024-00252, Exhibit 1008: U.S. Pat. No. 7,174,566, Yadav, Feb. 6, 2007, 17 pgs.

*Sophos Ltd. and Sophos Inc. v. Webroot Inc.*, PTAB Case No. IPR2024-00252, Exhibit 1009: Declaration of Dr. Mary K. Bolin, Dec. 11, 2023, 318 pgs.

*Sophos Ltd. and Sophos Inc. v. Webroot Inc.*, PTAB Case No. IPR2024-00252, Exhibit 1010: Webroot Infringement Contentions, Oct. 25, 2022, 9 pgs.

*Sophos Ltd. and Sophos Inc. v. Webroot Inc.*, PTAB Case No. IPR2024-00252, Exhibit 1011: Jeff Crume, Inside Internet Security: What Hackers Don't Want You to Know, Pearson Educ. Ltd., 2000, 293 pgs.

*Sophos Ltd. and Sophos Inc. v. Webroot Inc.*, PTAB Case No. IPR2024-00252, Exhibit 1012: Information Sciences Institute, Univ. of S. Cal., Internet Protocol: DARPA Internet Program Protocol Specification, Sep. 1981, 51 pgs.

*Sophos Ltd. and Sophos Inc. v. Webroot Inc.*, PTAB Case No. IPR2024-00252, Exhibit 1013: Stipulation Waiving IPR Claims in District Court Litigation, Dec. 6, 2023, 7 pgs.

*Sophos Ltd. and Sophos Inc. v. Webroot Inc.*, PTAB Case No. IPR2024-00252, Exhibit 1014: Mandia, Kevin and Prosise, Chris, Incident Response, Investigating Computer Crime, Osborne/McGraw-Hill, Berkeley, CA, copyright 2001, 23 pgs.

*Sophos Ltd. and Sophos Inc. v. Webroot Inc.*, PTAB Case No. IPR2024-00252, Exhibit 1015: Declaration of Cristina L. Abad, Ph.D., Sep. 26, 2023, 61 pgs.

*Sophos Ltd. and Sophos Inc. v. Webroot Inc.*, PTAB Case No. IPR2024-00252, Exhibit 1016: Declaration of Z. Morley Mao, Ph.D., Oct. 11, 2023, 33 pgs.

*Sophos Ltd. and Sophos Inc. v. Webroot Inc.*, PTAB Case No. IPR2024-00252, Exhibit 1017: District Court Claim Construction Order entered in *Webroot, Inc. v. AO Kaspersky Lab*, No. 6:22-cv-00243-ADA-DTG (W.D. Tex.) (Dkt. 391) Jul. 25, 2023, 19 pgs.

*Sophos Ltd. and Sophos Inc. v. Webroot Inc.*, PTAB Case No. IPR2024-00253, Petition for Inter Partes Review of U.S. Pat. No. 8,719,932, Dec. 8, 2023, 86 pgs.

*Sophos Ltd. and Sophos Inc. v. Webroot Inc.*, PTAB Case No. IPR2024-00253, Exhibit 1001: U.S. Pat. No. 8,719,932, Boney, May 6, 2014, 12 pgs.

*Sophos Ltd. and Sophos Inc. v. Webroot Inc.*, PTAB Case No. IPR2024-00253, Exhibit 1002: File History of the '932 Patent, Dec. 8, 2023, 120 pgs.

*Sophos Ltd. and Sophos Inc. v. Webroot Inc.*, PTAB Case No. IPR2024-00253, Exhibit 1003: Declaration of Dr. Henry Houh, Nov. 29, 2023, 111 pgs.

*Sophos Ltd. and Sophos Inc. v. Webroot Inc.*, PTAB Case No. IPR2024-00253, Exhibit 1004: Curriculum Vitae of Dr. Henry Houh, Dec. 8, 2023, 12 pgs.

*Sophos Ltd. and Sophos Inc. v. Webroot Inc.*, PTAB Case No. IPR2024-00253, Exhibit 1005: Li, et al., UCLog: A Unified, Correlated Logging Architecture for Intrusion Detection Int'l Conf. on Telecomm. Sys.- Modelling & Analysis, Jan. 2004, 15 pgs.

*Sophos Ltd. and Sophos Inc. v. Webroot Inc.*, PTAB Case No. IPR2024-00253, Exhibit 1006: U.S. Pat. No. 8,117,659, Hartrell, Feb. 14, 2012, 16 pgs.

*Sophos Ltd. and Sophos Inc. v. Webroot Inc.*, PTAB Case No. IPR2024-00253, Exhibit 1007: Salvador Mandujano Vergara, A multiagent approach to outbound intrusion detection, (Ph.D. Thesis, Instituto Tecnológico y de Estudios Superires de Monterrey) (on file with Repositorio Institucional del Tecnológico de Monterrey (RITEC) in the Instituto Tecnológico y de Estudios Superiores de Monterrey Library), 2004, 216 pgs.

*Sophos Ltd. and Sophos Inc. v. Webroot Inc.*, PTAB Case No. IPR2024-00253, Exhibit 1008: U.S. Pat. No. Yadav, Feb. 6, 2007, 17 pgs.

*Sophos Ltd. and Sophos Inc. v. Webroot Inc.*, PTAB Case No. IPR2024-00253, Exhibit 1009: Declaration of Dr. Mary K. Bolin, Dec. 11, 2023, 318 pgs.

*Sophos Ltd. and Sophos Inc. v. Webroot Inc.*, PTAB Case No. IPR2024-00253, Exhibit 1010: Webroot Infringement Contentions, Oct. 25, 2022, 9 pgs.

*Sophos Ltd. and Sophos Inc. v. Webroot Inc.*, PTAB Case No. IPR2024-00253, Exhibit 1011: Crume, Jeff, Inside Internet Security, What Hackers Don't Want You to Know, Addison-Wesley, GB, first published 2000, 293 pgs.

(56) References Cited

OTHER PUBLICATIONS

*Sophos Ltd. and Sophos Inc.* v. *Webroot Inc.*, PTAB Case No. IPR2024-00253, Exhibit 1012: Internet Protocol DARPA Internet Program Protocol Specification, Marina del Rey, CA, Sep. 1981, 51 pgs.

*Sophos Ltd. and Sophos Inc.* v. *Webroot Inc.*, PTAB Case No. IPR2024-00253, Exhibit 1013: U.S. Pat. No. 8,201,243, Boney, Jun. 12, 2012, 13 pgs.

*Sophos Ltd. and Sophos Inc.* v. *Webroot Inc.*, PTAB Case No. IPR2024-00253, Exhibit 1014: File History of U.S. Pat. No. 8,201,243, Dec. 8, 2023, 423 pgs.

*Sophos Ltd. and Sophos Inc.* v. *Webroot Inc.*, PTAB Case No. IPR2024-00253, Exhibit 1015: Mandia, Kevin and Prosise, Chris, Incident Response, Investigating Computer Crime, Osborne/McGraw-Hill, Berkeley, CA, copyright 2001, 23 pgs.

*Sophos Ltd. and Sophos Inc.* v. *Webroot Inc.*, PTAB Case No. IPR2024-00253, Exhibit 1016: Stipulation Waiving IPR Claims in District Court Litigation, Dec. 6, 2023, 5 pgs.

*Sophos Ltd. and Sophos Inc.* v. *Webroot Inc.*, PTAB Case No. IPR2024-00253, Exhibit 1017: District Court Claim Construction Order entered in *Webroot, Inc.* v. *AO Kaspersky Lab*, No. 6:22-cv-00243-ADA-DTG (W.D. Tex.) (Dkt. 391), Jul. 25, 2023, 19 pgs.

*Sophos Ltd. and Sophos Inc.* v. *Webroot Inc.*, PTAB Case No. IPR2024-00253, Exhibit 1018: Declaration of Cristina L. Abad, Ph.D., Sep. 26, 2023, 61 pgs.

*Sophos Ltd. and Sophos Inc.* v. *Webroot Inc.*, PTAB Case No. IPR2024-00253, Exhibit 1019: Declaration of Z. Morley Mao, Ph.D., Oct. 11, 2023, 33 pgs.

*AO Kaspersky Lab* v. *Open Text Inc.*, PTAB Case No. IPR2024-00297, Petition for Inter Partes Review of U.S. Pat. No. 8,719,932, Dec. 8, 2023, 76 pgs.

*AO Kaspersky Lab* v. *Open Text Inc.*, PTAB Case No. IPR2024-00297, Exhibit 1001: U.S. Pat. No. 8,719,932, Boney, May 6, 2014, 12 pgs.

*AO Kaspersky Lab* v. *Open Text Inc.*, PTAB Case No. IPR2024-00297, Exhibit 1002: Declaration of Michael J. Donahoo, Ph.D. under 37 C.F.R. §1.68, Dec. 8, 2023, 113 pgs.

*AO Kaspersky Lab* v. *Open Text Inc.*, PTAB Case No. IPR2024-00297, Exhibit 1003: Curriculum Vitae of Michael J. Donahoo, Ph.D., Dec. 8, 2023, 12 pgs.

*AO Kaspersky Lab* v. *Open Text Inc.*, PTAB Case No. IPR2024-00297, Exhibit 1004: File History of U.S. Pat. No. 8,719,932, Dec. 8, 2023, 120 pgs.

*AO Kaspersky Lab* v. *Open Text Inc.*, PTAB Case No. IPR2024-00297, Exhibit 1005: U.S. Pat. No. 8,719,924, Williamson, May 6, 2014, 14 pgs.

*AO Kaspersky Lab* v. *Open Text Inc.*, PTAB Case No. IPR2024-00297, Exhibit 1006: U.S. Patent Publication No. 20070016951, Piccard, Jan. 18, 2007, 8 pgs.

*AO Kaspersky Lab* v. *Open Text Inc.*, PTAB Case No. IPR2024-00297, Exhibit 1007: U.S. Pat. No. 7,934,103, Kidron, Apr. 26, 2011, 13 pgs.

*AO Kaspersky Lab* v. *Open Text Inc.*, PTAB Case No. IPR2024-00297, Exhibit 1008: Walter Oney, Programming The Microsoft Windows Driver Model, 2nd ed., 2003, 467 pgs.

*AO Kaspersky Lab* v. *Open Text Inc.*, PTAB Case No. IPR2024-00297, Exhibit 1009: Ted Hudek & Don Marshall, KMDF Version History, Microsoft, at https://learn.microsoft.com/en-us/windows-hardware/drivers/wdf/kmdf-version-history, Oct. 31, 2023, 8 pgs.

*AO Kaspersky Lab* v. *Open Text Inc.*, PTAB Case No. IPR2024-00297, Exhibit 1010: Troy Mott, Learning Carbon, Apple Computer, Inc. eds., 1st ed., 2001, 3 pgs.

*AO Kaspersky Lab* v. *Open Text Inc.*, PTAB Case No. IPR2024-00297, Exhibit 1011: T James Gosling, Frank Yellin, & The Java Team, The Java™ Application Programming Interface, vol. 1: Core Packages in The Java Series . . . From The Source, May 29, 1996, 10 pgs.

*AO Kaspersky Lab* v. *Open Text Inc.*, PTAB Case No. IPR2024-00297, Exhibit 1012: Dictionary Of Computing, 4th ed. 1996, 6 pgs.

*AO Kaspersky Lab* v. *Open Text Inc.*, PTAB Case No. IPR2024-00297, Exhibit 1013: Sixth Amended Scheduling Order, *Open Text Inc.* v. *AO Kaspersky Lab*, 6:22-cv-00243-ADA-DTG (U.S. Dist. Ct. W. Dist. Tx. Waco Div.), Oct. 30, 2023, 3 pgs.

*AO Kaspersky Lab* v. *Open Text Inc.*, PTAB Case No. IPR2024-00297, Exhibit 1014: Claim Construction Order, *Webroot, Inc., Open Text Inc.* v. *AO Kaspersky Lab*, 6:22-cv-00243-ADA-DTG (U.S. Dist. Ct. W. Dist. Tx. Waco Div.), Jul. 25, 2023, 19 pgs.

*AO Kaspersky Lab* v. *Open Text Inc.*, PTAB Case No. IPR2024-00297, Exhibit 1015: Fifth Amended Scheduling Order, *Open Text Inc.* v. *AO Kaspersky Lab*, 6:22-cv-00243-ADA-DTG (U.S. Dist. Ct. W. Dist. Tx. Waco Div.), Mar. 29, 2023, 9 pgs.

*AO Kaspersky Lab* v. *Open Text Inc.*, PTAB Case No. IPR2024-00297, Exhibit 1016: Plaintiffs' Responsive Claim Construction Brief Regarding Patents Plaintiffs Added by Amendment [263], *Open Text Inc.* v. *AO Kaspersky Lab*, 6:22-cv-00243-ADA-DTG (U.S. Dist. Ct. W. Dist. Tx. Waco Div.) May 5, 2023, 70 pgs.

*AO Kaspersky Lab* v. *Open Text Inc.*, PTAB Case No. IPR2024-00297, Exhibit 1017: File History of U.S. Pat. No. 8,201,243, Dec. 8, 2023, 423 pgs.

*AO Kaspersky Lab* v. *Open Text Inc.*, PTAB Case No. IPR2024-00297, Exhibit 1018: James Boney, Cisco IOS In A Nutshell, Dec. 2001, 1381 pgs.

*AO Kaspersky Lab* v. *Open Text Inc.*, PTAB Case No. IPR2024-00297, Exhibit 1019: David Hucaby, Cisco ASA And PIX Firewall Logging, provided by Cisco Press, at https://www.ciscopress.com/articles/article.asp?p=424447& seqNum=2, Dec. 7, 2023, 19 pgs.

*AO Kaspersky Lab* v. *Open Text Inc.*, PTAB Case No. IPR2024-00297, Exhibit 1020: Jennifer M. Anderson, et al., Continuous Profiling: Where Have All the Cycles Gone?, 15 ACM Transactions on Computer Systems 357, Nov. 1997, 34 pgs.

Request for Ex Parte Reexamination of U.S. Pat. No. 10,599,844 under 35 U.S.C. § 302 and 37 C.F.R. § 1.510, U.S. Appl. No. 90/015,286, filed Aug. 31, 2023, 85 pgs.

Exhibit 1001: U.S. Pat. No. 10,599,844 to Request for Ex Parte Reexamination of U.S. Pat. No. 10,599,844, U.S. Appl. No. 90/015,286, filed Aug. 31, 2023, 16 pgs.

Exhibit 1002: File History of U.S. Pat. No. 10,599,844 to Request for Ex Parte Reexamination of U.S. Pat. No. 10,599,844, U.S. Appl. No. 90/015,286, filed Aug. 31, 2023, 459 pgs.

Exhibit 1003: Declaration of Dr. Markus Jakobsson to Request for Ex Parte Reexamination of U.S. Pat. No. 10,599,844, U.S. Appl. No. 90/015,286, filed Aug. 31, 2023, 132 pgs.

Exhibit 1004: U.S. Patent Pub. No. 2012/0317644 to Kumar et al. to Request for Ex Parte Reexamination of U.S. Pat. No. 10,599,844, U.S. Appl. No. 90/015,286, filed Aug. 31, 2023, 17 pgs.

Exhibit 1005: Mal-ID: Automatic Malware Detection Using Common Segment Analysis and Meta-Features by Gil Tahan et al. to Request for Ex Parte Reexamination of U.S. Pat. No. 10,599,844, U.S. Appl. No. 90/015,286, filed Aug. 31, 2023, 32 pgs.

Exhibit 1006: U.S. Pat. No. 10,666,676 to Hsu et al. to Request for Ex Parte Reexamination of U.S. Pat. No. 10,599,844, U.S. Appl. No. 90/015,286, filed Aug. 31, 2023, 21 pgs.

Exhibit 1007: 22-cv-00243, Dkt. 304, Plaintiffs' Responsive Claim Construction Brief ("Responsive Markman Brief, Dkt. 304") to Request for Ex Parte Reexamination of U.S. Pat. No. 10,599,844, U.S. Appl. No. 90/015,286, filed Aug. 31, 2023, 71 pgs.

Exhibit 1008: Declaration of June Ann Munford to Request for Ex Parte Reexamination of U.S. Pat. No. 10,599,844, U.S. Appl. No. 90/015,286, filed Aug. 31, 2023, 51 pgs.

Exhibit 1009: 22-cv-00243, Dkt. 98, Plaintiffs' Responsive Claim Construction Brief to Request for Ex Parte Reexamination of U.S. Pat. No. 10,599,844, U.S. Appl. No. 90/015,286, filed Aug. 31, 2023, 87 pgs.

Exhibit 1010: 22-cv-00243, Dkt. 236 Claim Construction Order to Request for Ex Parte Reexamination of U.S. Pat. No. 10,599,844, U.S. Appl. No. 90/015,286, filed Aug. 31, 2023, 21 pgs.

Exhibit 1011: Declaration of Dr. Ingrid Hsieg Yee to Request for Ex Parte Reexamination of U.S. Pat. No. 10,599,844, U.S. Appl. No. 90/015,286, filed Aug. 31, 2023, 99 pgs.

(56) References Cited

OTHER PUBLICATIONS

Exhibit 1012: U.S. Patent Application No. 2013/0326625 to Anderson et al. to Request for Ex Parte Reexamination of U.S. Pat. No. 10,599,844, U.S. Appl. No. 90/015,286, filed Aug. 31, 2023,83 pgs.
Exhibit 1013: U.S. Pat. No. 8,266,698 to Seshardi et al. to Request for Ex Parte Reexamination of U.S. Pat. No. 10,599,844, U.S. Appl. No. 90/015,286, filed Aug. 31, 2023, 17 pgs.
Exhibit 1014: U.S. Pat. No. 9,489,514 to Mankin et al. to Request for Ex Parte Reexamination of U.S. Pat. No. 10,599,844, U.S. Appl. No. 90/015,286, filed Aug. 31, 2023, 13 pgs.
Exhibit 1015: Intrusion Detection Using The Support Vector Machine Enhanced With A Feature—Weight Kernel by Songlun Zhao et al. to Request for Ex Parte Reexamination of U.S. Pat. No. 10,599,844, U.S. Appl. No. 90/015,286, filed Aug. 31, 2023, 89 pgs.
Exhibit 1016: Intrusion Detection Using Neural Networks and Support Vector Machines by Srinivas Mukkamala et al. to Request for Ex Parte Reexamination of U.S. Pat. No. 10,599,844, U.S. Appl. No. 90/015,286, filed Aug. 31, 2023, 7 pgs.
Exhibit 1017: Classification of Malicious Domain Names using Support Vector Machine and Bi-gram Method by Nhauo Davuth et al. to Request for Ex Parte Reexamination of U.S. Pat. No. 10,599,844, U.S. Appl. No. 90/015,286, filed Aug. 31, 2023, 9 pgs.
Exhibit 1018: Malware behavioral detection and vaccine development by using a support vector model classifier by Ping Wang et al. to Request for Ex Parte Reexamination of U.S. Pat. No. 10,599,844, U.S. Appl. No. 90/015,286, filed Aug. 31, 2023, 16 pgs.
Exhibit 1019: U.S. Patent Publication No. 2008/0319932 to Wentau Yih et al. to Request for Ex Parte Reexamination of U.S. Pat. No. 10,599,844, U.S. Appl. No. 90/015,286, filed Aug. 31, 2023, 27 pgs.
Exhibit 1020: Comparative Analysis of Combinations of Dimension Reduction and Data Mining Techniques for Malware Detection, by Proceso L. Fernandez Jr. et al. to Request for Ex Parte Reexamination of U.S. Pat. No. 10,599,844, U.S. Appl. No. 90/015,286, filed Aug. 31, 2023, 10 pgs.
Exhibit 1021: U.S. Pat. No. 9,349,103 to Eberhardt, III et al. to Request for Ex Parte Reexamination of U.S. Pat. No. 10,599,844, U.S. Appl. No. 90/015,286, filed Aug. 31, 2023, 25 pgs.
Exhibit 1022: U.S. Pat. No. 9,043,894 to Dennison et al. to Request for Ex Parte Reexamination of U.S. Pat. No. 10,599,844, U.S. Appl. No. 90/015,286, filed Aug. 31, 2023, 49 pgs.
Exhibit 1023: U.S. Pat. No. 9,306,971 to Altman et al. to Request for Ex Parte Reexamination of U.S. Pat. No. 10,599,844, U.S. Appl. No. 90/015,286, filed Aug. 31, 2023, 10 pgs.
Exhibit 1024: FIRMA: Malware Clustering and Network Signature Generation with Mixed Network Behaviors by M. Zubair Rafique to Request for Ex Parte Reexamination of U.S. Pat. No. 10,599,844, U.S. Appl. No. 90/015,286, filed Aug. 31, 2023, 21 pgs.
Exhibit 1025: IPR2023-00528- Sophos, Inc v. Open Text Inc et al., Petition for IPR, Paper 1, to Request for Ex Parte Reexamination of U.S. Pat. No. 10,599,844, U.S. Appl. No. 90/015,286, filed Aug. 31, 2023, 87 pgs.
Exhibit 1026: IPR2023-00662- *Trend Micro, Inc* v. *Webroot, Inc et al.* Petition for IPR, Paper 2, to Request for Ex Parte Reexamination of U.S. Pat. No. 10,599,844, U.S. Appl. No. 90/015,286, filed Aug. 31, 2023, 86 pgs.
Exhibit 1027: IPR2023-01053- *CrowdStrike, Inc.* v. *Webroot Inc.*, Petitioner for IPR, Paper 2, to Request for Ex Parte Reexamination of U.S. Pat. No. 10,599,844, U.S. Appl. No. 90/015,286, filed Aug. 31, 2023, 85 pgs.
Exhibit 1028: U.S. Pat. No. 11,409,869 ('869 Patent) to Request for Ex Parte Reexamination of U.S. Pat. No. 10,599,844, U.S. Appl. No. 90/015,286, filed Aug. 31, 2023, 17 pgs.
Information Disclosure Statement submitted with Request for Ex Parte Reexamination of U.S. Pat. No. 10,599,844, U.S. Appl. No. 90/015,286, filed Aug. 31, 2023, 4 pgs.
Notice of Assignment of Reexamination Request issued in U.S. Appl. No. 90/015,286, dated Sep. 15, 2023, 1 pg.
Notice of Reexamination Request Filing Date issued in U.S. Appl. No. 90/015,286, dated Sep. 15, 2023, 1 pg.
Order Granting Request for Ex Parte Reexamination issued in U.S. Appl. No. 90/015,286, dated Sep. 15, 2023, 17 pgs.
Intrusion Prevention, Astaro Internet Security, Astaro GmbH & Co. KG, a Sophos company, The Wayback Machine at https://web.archive.org/web/2012040 6123658/http:/www.astaro.com/solutions/network-security/intrusion-prevention, 2012, 2 pgs.
Astaro Security Gateway, Astaro AG, The Wayback Machine at https://web.archive.org/web/20100 208163039/ http:/www.astaro.com/, 2010, 2 pgs.
Blue Coat Proxy AV Appliances Overview, 2010, 2 pgs.
Blue Coat WebFilter, Products and Overview, EdgeBlue.com, 2010, 9 pgs.
Blue Coat ProxyAV 210/510/810 Product Sheet, Blue Coat Systems, Inc., www.bluecoat.com, Sunnyvale, CA, 2009, 2 pgs.
Blue Coat WebFilter, Blue Coat Systems, Inc., www.bluecoat.com, Sunnyvale, CA, 2 pgs.
Blue Coat AV Appliances, EdgeBlue.com, The Wayback Machine at https://web.archive.org/web/201005220252442/http://www.edgeblue.com:80/AV-Appliances.asp, 1 pg.
Check Point Anti-Malware & Program Control Software Blade, Benefits, Check Point Software Technologies Ltd. at https://web.archive.org/web/20131231065958/http:/www.checkpoint.com/products/anti-malware-program-control/index.html, 2013, 3 pgs.
Software Blades, Release Notes, R75.20, Check Point Software Technologies Ltd., Oct. 6, 2013, 29 pgs.
Software Blades, SmartEvent R75.40 Administration Guide, Check Point Software Technologies Ltd., Sep. 2, 2013, 78 pgs.
Software Blades, SmartView Monitor R75.40VS Administration Guide, Check Point Software Technologies Ltd., Apr. 16, 2012, 52 pgs.
Software Blades SmartEvent R75 Administration Guide, Check Point Software Technologies Ltd., Dec. 15, 2010, 35 pgs.
Check Point Anti-Spam & Email Security Software Blade Overview, The Wayback Machine at https://web.archive.org/web/20150316022003/http://www.checkpoint.com:80//products/anti-spam-email-security-software-blade/index.html/, Check Point Software Technologies Ltd., 2015, 5 pgs.
Check Point Anti-Bot Software Blade Data Sheet, Check Point Software Technologies Ltd., Apr. 16, 2012, 2 pgs.
Check Point Secure Web Gateway Appliance Benefits, The Wayback Machine at https://web.archive.org/web/20131219213701/http://www.checkpoint.com:80/products/secure-web-gateway/ind . . . , Check Point Software Technologies Ltd., 2013, 5 pgs.
Check Point Threat Prevention Appliance Features, The Wayback Machine—https://web.archive.org/web/20140109004125/http://www.checkpoint.com:80/products/threat-prevention-appliances/index . . . , Check Point Software Technologies Ltd., 2013, 3 pgs.
Check Point URL Filtering Software Blade Overview, The Wayback Machine—https://web.archive.org/web/20150317044930/http://www.checkpoint.com:80/products/url-filtering-software-blade/index.html/, 7 pgs.
Check Point R70.30 Installation and Upgrade Guide, Check Point Software Ltd., Jun. 22, 2010, 27 pgs.
Check Point SmartEvent Software Blade, Benefits, Check Point Software Technologies Ltd., The Wayback Machine at https://web.archive.org/web/20130225182620/http://www.checkpoint.com/products/smartevent- software-blade/index.html?sp_link=1, Feb. 25, 2013, 3 pgs.
Check Point SmartEvent Software Blade, Check Point Software Technologies, Ltd., Apr. 28, 2013, 3 pgs.
CounterTack Announces Sentinel—Expanding the Deep System Inspection Product Portfolio with Production System Monitoring, CounterTack, InkHouse LLC, Feb. 25, 2013, 1 pg.
CounterTack Announces Sentinel—Expanding the Deep System Inspection Product Portfolio with Production System Monitoring, CounterTack, at https://www.globenewswire.com/news-release/2013/02/25/1034553/0/en /CounterTack-Announces-Sentinel.html, Feb. 2025, 2013, 3 pgs.
Machine Learning, Trend Micro Incorporated, undated, 14 pgs.
Cyberoam-Securing You, Cyberoam, a division of Elitecore Technologies Pvt. Ltd., The Wayback Machine, at https://web.archive.org/web/20120425093828/http://www.cyberoam .com, Apr. 25, 2012, 2 pgs.

(56) References Cited

OTHER PUBLICATIONS

Cyberoam Central Console, Cyberoam, a division of Elitecore Technologies Pvt. Ltd., The Wayback Machine at https://web.archive.org/web/20120421122028/http://www.cyberoam.com/ccc.html, Apr. 21, 2012, 2 pgs.
Cyberoam Endpoint Data Protection, Cyberoam, a division of Elitecore Technologies Pvt. Ltd., The Wayback Machine at https://web.archive.org/web/20120428070944/http: //www.cyberoam.com/endpointdataprotection.html, Apr. 28, 2012, 2 pgs.
DeepNines Delivers Solution to Thwart Extortion Demands from Cyber Criminals, Business Wire, The Wayback Machine at https://web.archive.org/web/20031203045510/http://www.deepnines.com/press_releases/pr112003.html, Nov. 20, 2003, 2 pgs.
ArcSight ESM Enterprise Security Manager, ArcSight, Inc., Cupertino, CA, The Wayback Machine at https://web.archive.org/web/20100422041236/http://www.arcsight. com:80/products/products-esm/, Apr. 22, 2010, 2 pgs.
HP Arcsight Express: Powered by the Corr-Engine, HP Enterprise Product Brief, Hewlett-Packard Development Co., LP, The Wayback Machine at https://www.hp.com/hpinfo/newsroom/press_kits/2011/risk2011/HP_ArcSight_Express_Product_Brief.pdf, Aug. 2011, 3 pgs.
Cisco IronPort S-Series Web Security Appliance Security Target, Version 1.0, Cisco IronPort Systems, San Bruno, CA, Oct. 12, 2009, 51 pgs.
Duffy, Jim, Cisco IronPort unveils e-mail security appliances, Channel Strategy, Oct. 9, 2008, 1 pg.
Evers, Joris, IronPort to Rate Web Links in Spam Fight, CNET News.com, Jan. 24, 2006, 11 pgs.
The SenderBase Network Overview, IronPort Systems, Inc., San Bruno, CA, 2006, 3 pgs.
Cisco IronPort Email Security Appliances, Data Sheet, Cisco Systems, Inc., San Jose, CA, #C78-694035-03, copyright 2011-2012, 5 pgs.
McAfee Advanced Threat Defense, Advanced detection for stealthy, zero-day malware, Data Sheet, McAfee, Santa Clara, CA, 2013, 2 pgs.
McAfee Advanced Threat Defense, Next Steps, McAfee, Santa Clara, CA, at https://web.archive.org/web/20150317123246/http://www.mcafee.com:80/products/advanced-threat-defense.aspx, 2015, 2 pgs.
McAfee Advanced Threat Defense, Appliance Hardware Components, Data Sheet, McAfee, Santa Clara, CA, at https://web.archive.org/web/20150317123246/http://www.mcafee.com:80/ products/advanced-threat-defense.aspx, 2015, 2 pgs.
McAfee Content Security Suite, comprehensive email, web, and data security, Data Sheet, McAfee, Santa Clara, CA, 2012, 2 pgs.
Security Target: McAfee Enterprise Security Manager with Event Receiver, Enterprise Log Manager, Advanced Correlation Engine, Application Data Monitor and Database Event Monitor 9.1, Document Version 1.1, McAfee, Santa Clara, CA, Mar. 25, 2013, 36 pgs.
McAfee Enterprise Security Manager Data Sheet, McAfee, Santa Clara, CA, [47101ds_esm_0612_fnl_ETMG], copyright 2012, 2 pgs.
McAfee Global Threat Intelligence for Enterprise Security Manager Data Sheet, McAfee, Santa Clara, CA, [46502ds_gti-esm_0612_ETMG], copyright 2012, 2 pgs.
McAfee SiteAdvisor Plus 2009, DataSheet, McAfee, Santa Clara, CA, copyright 2008, 2 pgs.
Singel, Ryan, McAfee SiteAdvisory Plus Review, Wired Security, Wired.com, Nov. 6, 2006, 9 pgs.
McAfee Web Protection Data Sheet, Web Security your way—SaaS, on premises, or a hybrid combination, McAfee, Santa Clara, CA, [61120ds_web-protection_0514B_ETMG], copyright 2014, 3 pgs.
Enterprise Security and Network Management Software, Product Overview, OpenService, Inc., The Wayback Machine at https://web.archive.org/web/20061115024535/http://www.openservice.com:80/products/, Nov. 15, 2006, 2 pgs.
Security Management Center, OpenService, Inc., The Wayback Machine at https://web.archive.org/web/20061016130049/http://www.openservice.com/products/smc.php, Oct. 16, 2006, 2 pgs.
NerveCenter Overview, OpenService, Inc., The Wayback Machine at https://web.archive.org/web/20061016124321/http://www.openservice.com/products/nervecenter.php, Oct. 16, 2006, 1 pg.
Prevx1 Product Tour: What is Prevx1?, Prevx, The Wayback Machine at http://web.archive.org/ web/20060510191309/http:/info.prevx.com/onetutorial.asp?st=1, May 4, 2006, 1 pgs.
Prevx1 Product Tour: How Does Prevx1 Work?, The Wayback Machine at http://web.archive.org/web/ 20060510191054/http:/info.prevx.com/onetutorial.asp?st=2, May 10, 2006, 1 pg.
Prevx1 Product Tour: Installation and Setup, The Wayback Machine at http://web.archive.org/web/2006 0510191303/http:/info.prevx.com/onetutorial.asp?st=3, May 4, 2006, 2 pgs.
Prevx1 Product Tour: Community Information, The Wayback Machine at http://web.archive.org/web/ 20061109165542/http:/info.prevx.com/onetutorial.asp?st=11, Nov. 9, 2006, 1 pg.
Prevx1 Product Tour: Prevx1 Console: Program Monitor, The Wayback Machine at http://web.archive.org/web/20060510191339/http:/info.prevx.com/onetutorial.asp?st=6, May 10, 2006, 1 pg.
Prevx1 Product Tour: Prevx1 Console: Jail, The Wayback Machine at http://web.archive.org/web/20060510191327/http:/info.prevx.com/onetutorial.asp?st=5, May 10, 2006, 1 pg.
Prevx1 Product Tour: Prevx1 Console: Advanced Features, The Wayback Machine at http://web.archive.org/web/20060510191345/http:/info.prevx.com/onetutorial.asp?st=7, May 10, 2006, 2 pgs.
Prevx1 ABC, FAQ, Prevx, The Wayback Machine at http://web.archive.org/web/20060110161540/http:/individual.prevx.com:80/faq.asp, Jan. 10, 2006, 11 pgs.
Prevx Company Overview, Prevx ltd, copyright 2003, 1 pg.
Prevx Computer Security Investigator—Enterprise, Prevx, https://slideplayer.com/slide/7232158/, undated, 12 pgs.
Jacobson, Emily, Using Dyninst for Program Binary Analysis and Instrumentation, Paradyn/Dyninst Week, Madison, WI, at https://www.paradyn.org/petascale2013/tutorial/Dyninst.pptx, 2013, 35 pgs.
Roundy, Kevin A. and Miller, Barton P., Hybrid Analysis and Control of Malware, University of Wisconsin, Computer Sciences Department, at https://www.paradyn.org/papers/Roundy10Malware.pdf, 2010, 23 pgs.
Stackwalker Source Code at https://github.com/dyninst/dyninst/tree/c4ad1fbc37535b84f83343c9296c2717704264ab/stackwalk, 2 pgs.
OpenText EnCase Endpoint Security Product Overview, OpenText, copyright 2021, 4 pgs.
What is Splunk Enterprise? The Platform for Machine Data, The Wayback Machine at https://web.archive.org/web/20130424224158/http://www.splunk.com/view/splunk/S . . . , 6 pgs.
Splunk 5.0.2 Installation Manual, The Wayback Machine at https://web.archive .org/web/20130306111105/http://docs.splunk.com:80/Documentation/Splunk/latest/Installation/Whatsinthismanual . . . , Mar. 6, 2013, 135 pgs.
Splunk Memory Use Patterns, Splunk Blog Tips & Tricks, The Wayback Machine at https://www.splunk.com/en_us/blog/tips-and-tricks/splunk-memory-use-patterns.html, Feb. 3, 2010, 4 pgs.
Splunk Fact Sheet: Splunk App for Enterprise Security, Splunk, San Francisco, CA, [Item # FS-Splunk-AppEntSec-101], copyright 2012, 2 pgs.
Splunk Enterprise Product Data Sheet: The Platform for Machine Data, Splunk, San Francisco, CA, [Item # DS-Splunk-115], copyright 2012, 2 pgs.
Event Correlation: Move from Search to Operational Intelligence, Splunk Tech Brief, Splunk, San Francisco, CA, copyright 2009, 1 pg.
Splunk for Cisco Security Suite, Fact Sheet, Splunk, San Francisco, CA, [Item # FS-Splunk-Cisco-101], copyright 2012, 2 pgs.
Splunk for Cyber Threat Analysis—A Big Data Approach to Enterprise Security, Solutions Guide, Splunk, San Francisco, CA, [Item # SG-Splunk-Security-106], copyright 2012, 2 pgs.
Splunk for Security, Solutions Guide, Splunk, San Francisco, CA, [Item # SG-Splunk-Security-106], copyright 2012, 2 pgs.
Splunk for Windows—End-to-End Real-time Visibility of Your Windows Environment, Solutions Guide, Splunk, San Francisco, CA, [Item # SG-Splunk-Windows-102], copyright 2012, 2 pgs.

(56) References Cited

OTHER PUBLICATIONS

Splunk Forwarders: the Benefits of Deploying Splunk, Tech Brief, Splunk, San Francisco, CA, [ItemTB-Splunk-Forwarder Deployment-101], copyright 2012, 2 pgs.
The Splunk Guide to Operational Intelligence—Turn Machine-generated Data into Real-time Visibility and Insight, Solutions Guide, Splunk, San Francisco, CA, [Item # SG-Splunk-OpIntell-113], copyright 2012, 13 pgs.
Symantec Email Security.cloud, DataSheet: Messaging Security, Symantec, Mountain View, CA, #21290485-2, Jul. 2014, 4 pgs.
Symantec Endpoint Protection 12.1, Data Sheet: Endpoint Security, Symantec, Mountain View, CA, #21194634, Jun. 2011, 5 pgs.
Symantec Endpoint Encryption Policy Administrator Guide Version 11.3.1, Symantec, Mountain View, CA, 197 pgs.
Symantec Endpoint Protection. Cloud, FAQ: Symantec.cloud, Symantec, Mountain View, CA, #125480, Aug. 2012, 4 pgs.
Symantec Endpoint Protection, Data Sheet: Endpoint Security, Symantec, Mountain View, CA, #12516465, May 2007, 4 pgs.
Symantec Endpoint Protection User Manual, Symantec, Mountain View, CA, 7 pgs.
Symantec Security Information Manager, Data Sheet: Compliance and Security Management, Symantec, Mountain View, CA, #12415412-1, May 2008, 8 pgs.
Worry-Free Business Security Services 3.5 Review's Guide, Volume Technical Product Marketing, Trend Micro, Inc., Cupertino, CA, 2010, 110 pgs.
Client Server Security 3 for Small and Medium Business, Administrator's Guide, Trend Micro, Inc., Cupertino, CA, Document Part No. CSEM32492/51028, Nov. 2005, 223 pgs.
Client Server Messaging Security for Small and Medium Business 3, Desktop/Server/Email-SMB, Trend Micro, Inc., Cupertino, CA, #DS05CSMSM03051024US, 2005, 2 pgs.
Client Server Messaging Security 3 for Small and Medium Business, Getting Started Guide, Trend Micro, Inc., Cupertino, CA, Document Part No. CSEM32493/51028, Nov. 2005, 115 pgs.
Client/Server Messaging Suite for Small and Medium Businesses, Administrator's Guide, Trend Micro, Inc., Cupertino, CA, Document Part No. NAEM21620/31003, Nov. 2003, 339 pgs.
Worry-Free Business Security Services for Small Business Security, User's Guide, Trend Micro, Inc., Cupertino, CA, Document Version: 0.3, Sep. 2010, 150 pgs.
Worry-Free Business Security 7 Services Standard and Advanced Editions, Installation Guide, Trend Micro, Inc., Cupertino, CA, Document Part No. WBEM74599/100819, Nov. 2011, 204 pgs.
Worry-Free Business Security Advanced and Standard, Products, Datasheet, Trend Micro Inc., [DS04_WFBS6_10021US], copyright 2010, 2 pgs.
Client Server Security 3 for Small and Medium Business, Administrator's Guide, Trend Micro, Inc., Cupertino, CA, Document Part No. CSEM32494/51028, Nov. 2005, 276 pgs.
Client/Server Suite, Getting Started Guide, Trend Micro, Inc., Cupertino, CA, Document Part No. NJEM01254/20926, Oct. 2002, 61 pgs.
Client/Server Suite for Small and Medium Businesses (SMB), Trend Micro, Inc., [DS01CS_NT20_03112IDE], copyright 2003-2004, 2 pgs.
Enterprise Security for Communication and Collaboration, Datasheet, Trend Micro, Inc., Cupertino, CA, [DS01_ESCC_121109US], 2012, 3 pgs.
How to Test Outbreak Commander, Testing Guide, Trend Micro, Inc., Cupertino, CA, Aug. 2002, 13 pgs.
Control Manager 3, Installation Guide, Trend Micro Incorporated, Cupertino, CA, Document Part No. CMEM32569/51128, Mar. 2006, 233 pgs.
Control Manager 3, Getting Start Guide, Trend Micro Incorporated, Cupertino, CA, Document Part No. TMEM31864/40414, Apr. 2004, 237 pgs.
Control Manager 2, Getting Start Guide, Trend Micro Incorporated, Cupertino, CA, Item Code CMEM21397/30306, Mar. 2003, 151 pgs.
Control Manager 5, Administrator's Guide, Trend Micro Incorporated, Cupertino, CA, Document Part No. TMEM53360/70921, Feb. 2008, 476 pgs.
Control Manager 5, Installation Guide, Trend Micro Incorporated, Cupertino, CA, Document Part No. CMEM54524/100720, Mar. 2012, 146 pgs.
Control Manager 6.0, Installation Guide, Trend Micro Incorporated, Cupertino, CA, Document Part No. CMEM65332/120203, Feb. 2013, 136 pgs.
Control Manager 3, Administrator's Guide, Trend Micro Incorporated, Cupertino, CA, Document Part No. CMEM32570/51128, Mar. 2006, 497 pgs.
Oliver, Jon, Is Big Data Enough for Machine Learning in Cybersecurity?, Trend Micro Incorporated, available at https://www.trendmicro.com/vinfo/us/security/news/security-technology/is-big-data-big-enough-for-machine-learning-in-cybersecurity, Jul. 19, 2018, 3 pgs.
Machine Learning, What is Machine Learning?, Trend Micro, Incorporated, Cupertino, CA, 8 pgs.
Deep Discovery Analyzer 5.8, Syslog Content Mapping Guide, Trend Micro, Incorporated, Cupertino, CA, Document No. APEM57742/170315, Mar. 2017, 56 pgs.
Deep Discovery Analyzer 6.1, Administrator's Guide, Trend Micro, Incorporated, Cupertino, CA, Document No. APEM68234/180418, Jul. 2018, 276 pgs.
Deep Discovery Analyzer 7.0, Syslog Content Mapping Guide, Trend Micro, Incorporated, Cupertino, CA, Document No. APEM79199_210115, Apr. 2021, 69 pgs.
Deep Discovery Analyzer 7.1, Readme file, Trend Micro, Incorporated, Cupertino, CA, copyright 2021, 5 pgs.
Deep Discovery Analyzer 7.2, Syslog Content Mapping Guide, Trend Micro, Incorporated, Cupertino, CA, Document No. APEM79450_211122, Jun. 2022, 74 pgs.
Deep Discovery Analyzer 1200 Quick Start Card, Trend Micro, Incorporated, Cupertino, CA, Item Code APEQ79153/201119, 2021, 1 pg.
Deep Discovery Analyzer 5.5 SP1, Readme file, Trend Micro, Incorporated, Cupertino, CA, Jun. 2016, 11 pgs.
Deep Discovery Inspector 3.7, User's Guide, Trend Micro, Incorporated, Cupertino, CA, Document No. APEM36464/140618, Jul. 2014, 126 pgs.
Deep Discovery Inspector 3.8, Service Pack 3, Administrator's Guide, Trend Micro, Incorporated, Cupertino, CA, Document No. APEM37418/160627, Jul. 2016, 403 pgs.
Deep Discovery Inspector 4000, Quick Start Card, Trend Micro, Incorporated, Cupertino, CA, Item Code APEQ36484/140710, copyright 2014, 1 pg.
Deep Edge 2.5, Service Pack 2, Administrator's Guide, Trend Micro, Incorporated, Cupertino, CA, Document No. CTEM26692_140930, Nov. 2014, 371 pgs.
Deep Security 7.5, Installation Guide, Trend Micro, Incorporated, Cupertino, CA, Document No. APEM74679/100927, Oct. 2010, 47 pgs.
Deep Security 7.5, Security Target (EAL4+) Revision 1.18, Trend Micro, Inc., Ottawa, Canada, Aug. 2, 2011, 48 pgs.
Deep Security 9, Data Sheet, Trend Micro, Incorporated, Cupertino, CA, [DS01_DeepSecurity9_120812US], copyright 2012, 4 pgs.
Deep Security 9.0, SP1 Administrator's Guide, Trend Micro, Incorporated, Cupertino, CA, Document No. APEM95863/130213, Apr. 2013, 574 pgs.
Deep Security 9.0, SP1 Installation Guide, Trend Micro, Incorporated, Cupertino, CA, Document No. APEM95862/130213, May 2013, 160 pgs.
Deep Security 7.5, Data Sheet, Trend Micro, Incorporated, Cupertino, CA, DS04DeepSecurity7.5_101116US], copyright 2010, 2 pgs.
Deep Security 8.0, Getting Started and Installation Guide, Trend Micro, Incorporated, Cupertino, CA, Document No. APEM85311_120105, Jan. 2012, 156 pgs.
Enterprise Security Suites, Trend Micro Incorporated, The Wayback Machine at https://web.archive .org/web/20130322054951/http://www.trendmicro.com/us/enterprise/security-suite-solutions/index.html, Mar. 22, 2013, 2 pgs.

(56) References Cited

OTHER PUBLICATIONS

Enterprise Security for Endpoints, Datasheet, Trend Micro, Inc., Cupertino, CA, [DS02_ESE_100803US], copyright 2010, 2 pgs.
Enterprise Security Suite, Datasheet, Trend Micro, Inc., Cupertino, CA, [DS02_ESS_100830US], copyright 2010, 2 pgs.
Enterprise Security Suite, Datasheet, Trend Micro, Inc., Cupertino, CA, [DS01_ESS_121108US], copyright 2012, 4 pgs.
Solution Brief—Combating New Spam and Social Engineering Attack Methods, Trend Micro Incorporated, Cupertino, CA, copyright 2015, 5 pgs.
Hosted Email Security Datasheet, Trend Micro Inc., Cupertino, CA, [DS02_TMHES_130912US], copyright 2013, 2 pgs.
IM Security for Microsoft Skype for Business 1.6.5, Administrator's Guide, Trend Micro, Inc., Cupertino, CA, Document Part No. TIEM16346/140311, May 2014, 259 pgs.
Trend Micro Earns Patent for Active Content Security Technology, Help Net Security, at https://www.helpnetsecurity.com/2002/04/08/trend-micro-earns-patent-for-active-content-security-technology/, Apr. 8, 2002, 5 pgs.
InterScan Messaging Security Suite 7.5, Administrator's Guide, Trend Micro, Inc., Cupertino, CA, Document Part No. MSEM76206_131030, Feb. 2014, 419 pgs.
InterScan Messaging Security Suite 7.5, Installation Guide for Windows, Trend Micro, Inc., Cupertino, CA, Document Part No. MSEM76207_131030, Feb. 2014, 171 pgs.
InterScan Messaging Security Virtual Appliance 9.0, Installation Guide for Hybrid SaaS Email Security, Trend Micro, Inc., Cupertino, CA, Document Part No. MSEM96477/140707, Oct. 2014, 197 pgs.
InterScan VirusWall 3 for Unix, Administrator's Guide, Trend Micro, Inc., Cupertino, CA, Document Part No. IVEM30728/20916, Sep. 2002, 249 pgs.
InterScan VirusWall 6 for Linux, Reference Manual, Trend Micro, Inc., Cupertino, CA, Document Part No. IVEM62664/60224, Jul. 2006, 102 pgs.
InterScan VirusWall 7 for Small and Medium Businesses for Windows, Administrator's Guide, Trend Micro, Inc., Cupertino, CA, Document Part No. IVEM74091/90513, Jul. 2009, 499 pgs.
InterScan VirusWall 7 for Small and Medium Businesses for Windows, Quick Start Guide, Trend Micro, Inc., Cupertino, CA, Document Part No. IVEM74092/90513, Jul. 2009, 95 pgs.
Interscan Web Security, Overview, Trend Micro, Inc., Cupertino, CA, [OV01_IWS_Overview_140411US], copyright 2014, 3 pgs.
NeatSuite Standard 1 for Medium Business, Getting Started Guide, Trend Micro, Inc., Cupertino, CA, Document Part No. NSEM13111/70302, Jul. 2007, 60 pgs.
NeatSuite for SMB, Datasheet, Trend Micro, Inc., Cupertino, CA, [DS05NSSMB_080407US] copyright 2008, 2 pgs.
NeatSuite Advanced, Datasheet, Trend Micro, Inc., Cupertino, CA, [DS12NSAdv_080305US] copyright 2008, 2 pgs.
NeatSuite Standard, Datasheet, Trend Micro, Inc., Cupertino, CA, [DS09NSStd_070627US], copyright 2007, 2 pgs.
NeatSuite Advanced, Datasheet, Trend Micro, Inc., Europe, [DS11NSAdv_070629GB], copyright 2007, 2 pgs.
NeatSuite Advanced, Datasheet, Trend Micro, Inc., Cupertino, CA, [DS14NSAdv_090513US], copyright 2009, 2 pgs.
NeaTSuite for Microsoft Windows NT and Lotus Notes, Datasheet, Trend Micro, Inc., Cupertino, CA, copyright 2002, 2 pgs.
NeatSuite for SMB 3.5, Datasheet, Trend Micro, Inc., Cupertino, CA, [DS02_NS35_070118US], copyright 2007, 2 pgs.
Security 2.0 for MAC, Administrator's Guide, Trend Micro, Inc., Cupertino, CA, Document Part No. TSEM25920/130401, Jun. 2013, 144 pgs.
Security 1 for MAC, Administrator's Guide, Trend Micro, Inc., Cupertino, CA, Document Part No. TSEM14893/110621, Aug. 2012, 111 pgs.
Security 1 for Enterprise and Medium Business, MAC, Administrator's Guide, Trend Micro, Inc., Cupertino, CA, Document Part No. TSEM14307/90916, Sep. 2009, 116 pgs.
ServerProtect for Microsoft Windows and Novell Netware, Datasheet, Trend Micro, Inc., Cupertino, CA, [DS02_SP_MSNT090922US], copyright 2009, 2 pgs.
ServerProtect for EMC Celerra Filers, Getting Started Guide, Trend Micro, Inc., Cupertino, CA, Document Part No. SPEM51694/31205, Dec. 2003, 19 pgs.
ServerProtect 5.3 for Network Appliance Filers, Evaluation Guide, Trend Micro, Inc., Cupertino, CA, Aug. 2001, 20 pgs.
Whitepaper: Ensuring Data Integrity with Trend Micro ServerProtect for Network Appliance filers, Trend Micro, Inc., Cupertino, CA, Aug. 2001, 12 pgs.
ServerProtect 5 for Windows NT/NetWare, Getting Started Guide, Trend Micro, Inc., Cupertino, CA, Document Part No. SPEM51426/30407, Apr. 2003, 149 pgs.
ServerProtect 2 for Linux, Getting Started Guide, Trend Micro, Inc., Cupertino, CA, Document Part No. SPEM22345/50715, Apr. 2006, 176 pgs.
ServerProtect 5.8 for Microsoft Windows and Novell Netware, Getting Started Guide (Patch 3), Trend Micro, Inc., Cupertino, CA, Document Part No. SPEM56439/140521, Feb. 2022, 180 pgs.
ServerProtect 5 for NetApp, Getting Started Guide (Patch 3), Trend Micro, Inc., Cupertino, CA, Document Part No. SPEM54352/91119, Mar. 2011, 172 pgs.
ServerProtect 5 for Microsoft Windows Server/Novell Netware, Getting Started Guide, Trend Micro, Inc., Cupertino, CA, Document Part No. SPEM51426/30407, Jul. 2009, 170 pgs.
ServerProtect for Network Appliance Filers, Datasheet, Trend Micro, Inc., Buckinghamshire, England, [DS01SPNA561040420GB], copyright 2002-2004, 2 pgs.
InterScan Messaging Security Datasheet, Trend Micro, Inc., Cupertino, CA, [DS01_IMS_C&C_130619US], copyright 2013, 4 pgs.
Smart Protection Server 2.5, Administrator's Guide, Trend Micro Inc., Cupertino, CA, Document Part No. APEM84993/110727, Jul. 2011, 86 pgs.
Rashid, Fahmida Y., Trend Micro Enhances Cloud-security Infrastructure with Big Data Analytics, SecurityWeek, at https://www.securityweek.com/trend-micro-enhances-cloud-security-infrastructure-big-data-analyticsm, Aug. 7, 2012, 6 pgs.
Hoffman, Stefanie, Trend Micro Releases New 'Smart Protection Network', CRN Magazine, at https://www.crn.com/news/security/208700393/ trend-micro-releases-new-smart-protection-network.htm, Jun. 18, 2008, 3 pgs.
Smart Protection Server 2.6, Administrator's Guide, Trend Micro Inc., Cupertino, CA, Document Part No. APEM26465/120620, Apr. 2013, 86 pgs.
Smart Protection Server 3.0, Administrator's Guide, Trend Micro Inc., Cupertino, CA, Document Part No. APEM36294/140116, Mar. 2014, 98 pgs.
Threat Management System, What it Does, Trend Micro, Inc., The Wayback Machine at https://web.archive.org/web/20120129041740/http://www.trendmicro.com:80/us/enterprise/security-management/threat-management-services/index.html, 2012, 2 pgs.
White Paper: Kolodgy, Charles J., Network Security Overwatch Layer: Smarter Protection for the Enterprise, IDC, Framingham, MA, Nov. 2009, 8 pgs.
Smart Protection Network Datasheet, Trend Micro, Inc., Cupertino, CA, copyright 2010, 2 pgs.
Security Threat Assessment, Datasheet, Trend Micro, Inc., Cupertino, CA, [DS02_TMS_Assessment091007US], copyright 2009, 4 pgs.
Threat Management System, Datasheet, Trend Micro, Inc., Cupertino, CA, [DS01_TMS_110523US], copyright 2011, 2 pgs.
White Paper: Trend Micro Smart Protection Network—Security Made Smarter, Trend Micro, Inc., Cupertino, CA, at https://web.archive.org/web/20120129041740/ http://www.trendmicro.com:80/us/enterprise/security-management/threat-management-services/index.html, Jun. 2010, 15 pgs.
Worry-Free Business Security 7, Standard and Advanced Editions, Installation Guide, Trend Micro Inc., Cupertino, CA, Document Part No. WBEM74599/100819, Oct. 2010, 192 pgs.

(56) References Cited

OTHER PUBLICATIONS

Worry-Free Business Security 9, Standard and Advanced Editions, Service Pack 1, Administrator's Guide, Trend Micro Inc., Cupertino, CA, Document Part No. WFEM96626/140825, Sep. 2014, 400 pgs.

Brightcloud, End Point Security Application Integration, The Wayback Machine at http://web.archive.org/web/20070505030946/http://www.brightcloud.com:80/endpointsecurity.asp, May 5, 2007, 2 pgs.

BrightCloud Master URL Database Overview, The Wayback Machine at http://web.archive.org/web/20070508223909/http://www.brightcloud.com:80/endpointsecurity.asp, May 8, 2007, 2 pgs.

Webroot BrightCloud Overview, The Wayback Machine at https://web.archive.org/web/20130423211117/http://brightcloud.com/resourcecenter/technology.php, Apr. 23, 2013, 1 pg.

BrightCloud Streaming Malware Detection, Datasheet, OpenText, DS_073120, copyright 2020, 2 pgs.

BrightCloud File Reputation Service, Datasheet, Webroot Inc., Broomfield, CO, Feb. 2014, 2 pgs.

BrightCloud File Reputation Service, Datasheet, Open Text, DS_070620, copyright 2020, 2 pgs.

BrightCloud IP Reputation Service, Datasheet, Webroot Inc., Broomfield, CO, Feb. 2014, 2 pgs.

BrightCloud Real-Time Anti-Phishing Service, Datasheet, Webroot Inc., Broomfield, CO, Feb. 2014, 2 pgs.

Whitepaper: BrightCloud Real-Time Anti-Phishing Service, Webroot Inc., Broomfield, CO, Feb. 2014, 4 pgs.

BrightCloud Web Classification Service, Datasheet, Webroot Inc., Broomfield, CO, Feb. 2014, 2 pgs.

BrightCloud Web Reputation Service, Datasheet, Webroot Inc., Broomfield, CO, Feb. 2014, 2 pgs.

SecureAnywhere Business—Endpoint Protection: Reduced Endpoint Scan Times, Webroot Inc., The Wayback Machine at https://web.archive.org/web/20121104163529/http://www.webroot.com:80/En_US/business/secureanywhereendpoint/performance-productivity/scans, Nov. 2012, 3 pgs.

Webroot Intelligence Network, Webroot Inc., The Wayback Machine at https://web.archive.org/web/20130228175825/http://www.webroot.com/En_US/business/resources/WSAEP_DS_Win.html, Feb. 2013, 3 pgs.

Webroot Security Intelligence for Networks Suite, The Wayback Machine at https://web.archive.org/web/20130316085428/http://www.webroot.com/En_US/business/security-solutions/security-intelligence-network-suite, Mar. 2013, 3 pgs.

Webroot Intelligence Network, The Wayback Machine at https://web.archive.org/web/20130424014346/http://brightcloud.com/toc/index.php, Apr. 2013, 1 pg.

SecureAnywhere—Endpoint Protection, The Wayback Machine at https://web.archive.org/web/20120410105149/http://www.webroot.com/En_US/business-products-secureanywhere-endpoint.html, 2012, 2 pgs.

Kovalev, Timur and Niller,Darren, Mobile App Reputation, a Webroot Security Intelligence Service, Webroot Inc., Broomfield, CO, Apr. 2013, 9 pgs.

Webroot SecureAnywhere—Endpoint Protection, Administrator Guide, Downloading and Forcing Updates, at https://docs.webroot.com/us/en/business/wsab_endpointprotection_adminguide/Content/ManagingEndpoints/DownloadingAndForcingUpdates.htm, 4 pgs.

Webroot SecureAnywhere BusinessEndpoint Protection, Datasheet, Webroot Inc., Broomfield, CO, DS_051917_US, copyright 2017, 4 pgs.

Webroot SecureAnywhere, User Guide for the Complete Edition, Version 8.0.1, Webroot Inc., Broomfield, CO, May 2012, 144 pgs.

\* cited by examiner

BEHAVIORAL THREAT DETECTION DEFINITION AND COMPILATION

RELATED APPLICATION(S)

This application is a continuation of, and claims a benefit of priority under 35 U. S.C. 120 of, U.S. patent application Ser. No. 16/366,014 filed Mar. 27, 2019, entitled "BEHAVIORAL THREAT DETECTION DEFINITION AND COMPILATION," which is hereby incorporated herein for all purposes.

BACKGROUND

Traditional malware detection techniques typically rely on signature-based analyses of files associated with potentially malicious software. However, minor changes, new versions, executable encryption or file packing, or other obfuscation techniques applied to such files may render traditional techniques ineffective against new threats until malware detection signatures are updated accordingly, resulting in a security solution that is reactionary and slow to adapt. Further, traditional techniques for logic- or conditional-based approaches introduce potential security vulnerabilities, complicate distribution of malware definitions, and are not well-suited to describe and analyze events.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for behavioral threat detection definition and compilation. In an example, a behavior rule comprising a set of rule instructions is used to define one or more events indicative of a behavior. For example, a set of events from which one event must be matched may be defined or a set of events from which all events must be matched may be defined. In some examples, events are matched based on an event name or type, or may be matched based on one or more parameters. Exact and/or inexact matching may be used. The set of rule instructions ultimately specifies one or more halt instructions, thereby indicating that a determination as to the presence of the behavior has been made. Example determinations include, but are not limited to, a match determination, a non-match determination, or an indication that additional monitoring should be performed.

One or more sets of rule instructions may be packaged for distribution and/or use by a behavioral threat detection engine. As an example, a set of rule instructions is compiled into an intermediate language and assembled in to a compiled behavior rule binary. Event linking is performed, wherein other rules launched by the rule and/or events that launch the rule or are processed by the rule are identified, and such information may be stored accordingly. The behavior rule binary may be packaged with other rules and/or may be packaged with additional information, including, but not limited to, a friendly name, a description, information regarding one or more events processed by the behavior rule, and/or information regarding one or more rules launched by the behavior rule. The packaged behavior rule is distributed to one or more computing devices for use with a behavioral threat detection engine. For example, the threat detection engine may execute the behavior rule using a rule virtual machine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1A:
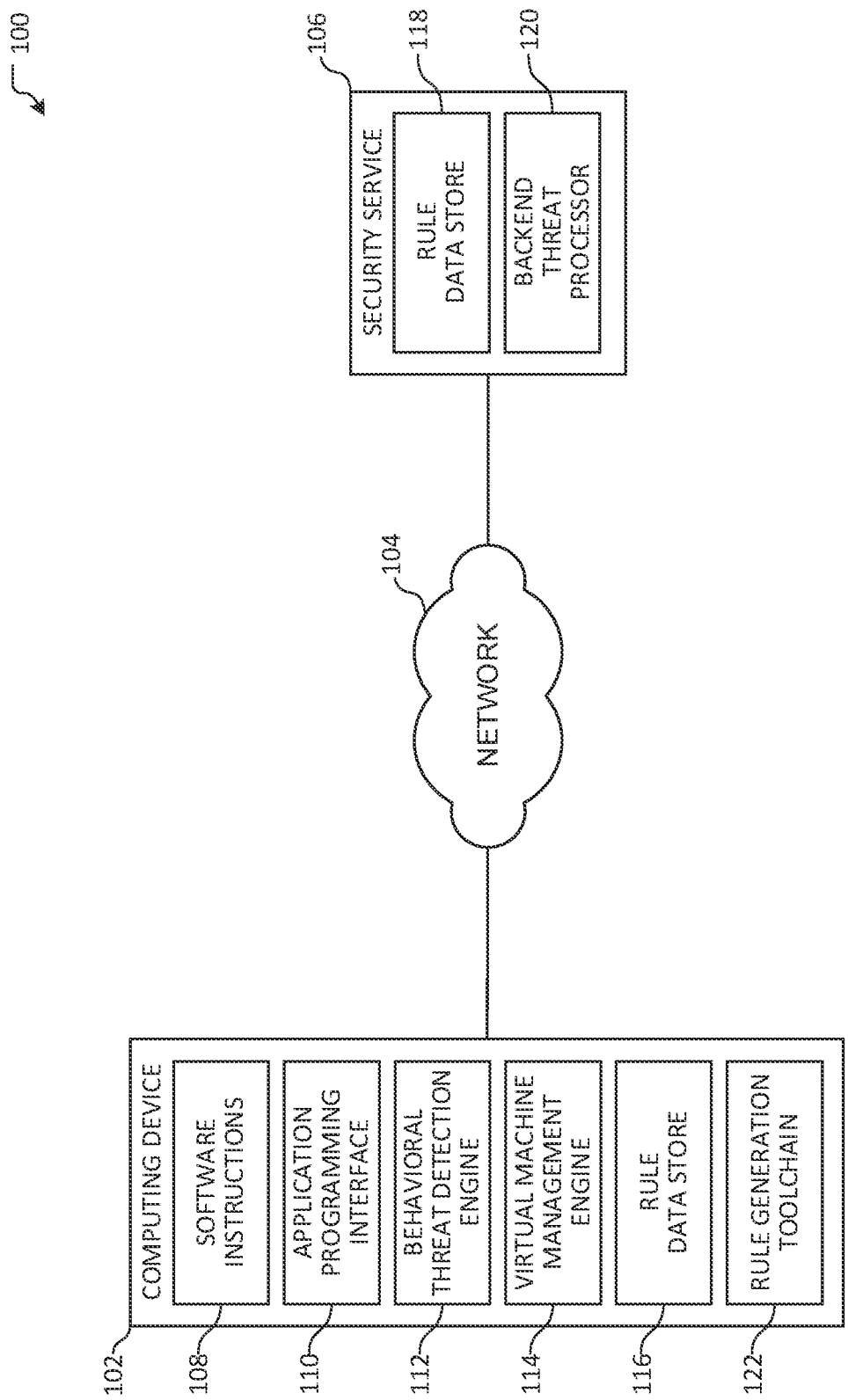
FIG. 1A illustrates an overview of an example system for behavioral threat processing.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In an example, a set of signatures is used to identify one or more files that pose a potential security threat to a computing device. Signatures may be periodically updated to provide protection against new threats and/or old threats that have been obfuscated using any of a variety of techniques. However, until the set of signatures used by the computing device is updated, the computing device may be susceptible to threats that are not identifiable using the current set of signatures. In other examples, one or more behaviors may be identified so as to identify the presence of potentially malicious software. However, defining such behaviors and, in some instances, enabling third parties to describe such behaviors, is difficult and may result in the introduction of other security vulnerabilities and added complexity in rule distribution, among other complications.

Accordingly, the present disclosure provides systems and methods for behavioral threat detection definition and compilation. In an example, a domain-specific language is used to describe one or more behaviors as rule instructions relating to a set of events, such that computations, comparisons, and other instructions may be applied to events and, in some instances, such that continued execution of the rule instructions is predicated on the occurrence (or lack thereof) of one or more events. In some examples, such rule instructions are processed by a compiler to generate a compiled behavior rule, which may be executed using a rule virtual machine. As a result, such rules may be platform-independent and/or version-independent (e.g., with respect to an operating system, an execution environment, and/or a behavioral threat detection engine), and may be executed in such a way that insulates a computing device from the rule instructions and/or the events that they process.

In examples, execution of a behavior rule in a rule virtual machine begins in response to, or in some instances, the absence of one or more events. As used herein, a rule virtual machine is a complex finite state machine used to execute a rule and arrive at a determination accordingly. Further, a rule virtual machine may be instantiated to execute a behavior rule for any of a variety of contexts. For instance, a context may relate to one or more applications, processes, threads, network connections, and/or files, or any combination thereof, among other examples. As a result, a behavior rule may process events that relate to the context, such that it may be determined whether an aspect of the context poses a potential threat to computer security. In some instances, a rule may cause another rule to be executed (e.g., based on the detection of an event, based on the determination of a certain condition, etc.), such that a hierarchy of rules may be executed based on detected behaviors. Thus, not only is it possible for a rule author to define behaviors using rule instructions that process events, but the rules may be platform-independent and/or hierarchically interrelated.

Aspects described herein provide various technical benefits, including, but not limited to, enabling the definition of event-based behavior rules (e.g., wherein rule instructions process parameters and/or values associated with such events, etc.), generating interrelated rules triggered based on a hierarchy of events, and implementing cross-platform and/or environment-agnostic rules. For example, as a result of executing a rule using a rule virtual machine, the computing device is insulated from potential exploits that may result from improperly coded rules, rules need not be recompiled for different execution environments, and rule distribution is simplified. Further, as a result of performing a behavioral analysis of a given context using a rule as described herein, it is possible to identify threats without relying on the rigid, reactive approach typically used by signature-centric, file-based techniques. The language and compilation suite discussed herein facilitates efficient behavior rule generation and distribution while reducing the potential risks and inconveniences associated with traditional behavior-based approaches. For example, traditional approaches may be architecture-dependent, thereby complicating the distribution of rules. As another example, rules authored in a traditional computing language may have the potential to introduce computer vulnerabilities if they are authored incorrectly or care is not taken when executing such rules. Thus, it will be appreciated that the technical benefits include, but are not limited to, dynamic threat identification, more accurate threat identification, and increased ease of generation, maintenance, and distribution of rules used to identify threats.

FIG. 1A illustrates an overview of an example system 100 for behavioral threat processing. As illustrated, system 100 is comprised of computing device 102, network 104, and security service 106. In an example, computing device 102 and security service 106 may communicate by way of network 104. As an example, computing device 102 and security service 106 may communicate using wired and/or wireless connections to network 104. While system 100 is illustrated as having one computing device 102, one network 104, and one security service 106, it will be appreciated that other examples may comprise alternate quantities of such elements.

Computing device 102 may be any of a variety of devices, including, but not limited to, a mobile computing device, a tablet computing device, a desktop or laptop computing device, an internet of things (IoT) computing device, a server computing device, or a distributed computing device. In some instances, it will be appreciated that computing device 102 may comprise one or more virtual devices and/or may comprise one or more operating systems that are executed as virtualized guests in which computing device 102 operates as a host. Computing device 102 is illustrated as comprising software instructions 108, application programming interface (API) 110, behavioral threat detection engine 112, virtual machine management engine 114, rule data store 116, and rule generation toolchain 122. In some examples, computing device 102 may form at least a part of an execution environment in which an operating system (OS) and/or other software may execute.

For example, software instructions 108 may execute on computing device 102. Software instructions 108 may be an application, a plugin, a script, a module, a driver, and/or a web application, among other examples. In some examples, software instructions 108 may be pre-compiled, compiled at runtime, or interpreted at runtime. In another example, software instructions 108 may execute in kernel mode, user mode, or a combination thereof Software instructions 108 may call one or more APIs that are available in the execution environment of computing device 102. For example, software instructions 108 may call API 110. In some examples, API 110 may enable software instructions 108 to engage in file system access or searching, network communication, process management, memory management, or communication with a specific hardware component (e.g., device drivers, sensor data access, etc.), among other functionality. In examples, API 110 may be provided by an OS of computing device 102. While examples are discussed herein with respect to API 110, it will be appreciated that, in other examples, other operations and/or other APIs may relate to any of a wide variety of software interfaces, commands, libraries, or services, among others, useable by software instructions 108 when executed by computing device 102.

As illustrated, computing device 102 further comprises behavioral threat detection engine 112 and virtual machine management engine 114. In an example, behavioral threat detection engine 112 and virtual machine management engine 114 provide threat detection, threat prevention, and/or threat mitigation using behavior rules according to aspects disclosed herein, among other functionality. In some examples, behavioral threat detection engine 112 processes one or more rules stored in rule data store 116 to determine the events for which a behavior rule should be triggered and/or events for which a rule should receive an event packet indicating the event occurred. Accordingly, behavioral threat detection engine 112 monitors for such events and, upon identifying a circumstance in which a rule should be triggered, causes a rule virtual machine to be initialized in which to execute the associated rule. In examples, a rule can specify one or more specific contexts for which events should be monitored, such that the rule is executed to specifically analyze one or more applications, processes, threads, network connections, and/or files, or any combination thereof, among other examples.

Virtual machine management engine 114 manages execution of rule virtual machines. For example, virtual machine management engine 114 may generate and/or maintain a state for executing rule virtual machines. In another example, virtual machine management engine 114 executes a behavior rule in a rule virtual machine. In some instances, at least a part of a rule execution state of a rule virtual machine is duplicated when an event specified by a set of rule instructions is matched, such that one instance of the rule virtual machine resumes execution of the rule instructions, while the other instance of the rule virtual machine continues waiting for matching events. Rule virtual machine duplication may enable the detection of behaviors that would otherwise go unmatched as a result of the occurrence of intermediate events, events having different parameters, and/or events that occur in a different order than was previously observed or expected, among other examples. Duplication may be configurable to selectively duplicate the rule virtual machine or it may be disabled altogether, among other examples. In examples, a time to live (TTL) rule instruction may be used to set an expiration value associated with a rule virtual machine, such that the rule virtual machine may be automatically terminated (or, in some instances, suspended) once an amount of time defined by the TTL rule instruction has elapsed. Eventually, virtual machine management engine 114 encounters a halt instruction, such that the rule virtual machine may be halted, thereby indicating that the rule has reached a determination. Example determinations include, but are not limited to, a match determination (indicating the presence of a malicious or potentially malicious behavior), a non-match determination (thereby exonerating the context of potential malicious behavior), or an indication that additional monitoring should be performed. It will be appreciated that, in other examples, a determination may indicate a processing error (e.g., processing has timed out, a syntax error has been encountered, etc.). In examples, an indication of the halt state is provided to behavioral threat detection engine 112, while, in other examples, behavioral threat detection engine 112 may periodically evaluate rule virtual machines managed by virtual machine management engine 114 to determine whether any rule virtual machines are halted.

Additional discussion of behavior rule execution and behavior rule virtual machine management techniques are described in more detail by U.S. application Ser. No. 16/366,065 filed Mar. 27, 2019, titled "BEHAVIORAL THREAT DETECTION ENGINE," and U.S. application Ser. No. 16/366,098 filed Mar. 27, 2019, titled "BEHAVIORAL THREAT DETECTION VIRTUAL MACHINE," both of which are hereby incorporated by reference in their entirety.

Computing device 102 is also illustrated as having rule data store 116, which stores one or more rules. In examples, rules may be added by a user of computing device 102 and/or may be downloaded from a security service, such as from rule data store 118 of security service 106. In some examples, rules in rule data store 116 may be stored as human-readable rule instructions using a domain-specific language, according to aspects described herein. In other examples, rules stored in rule data store 116 may be stored in a compiled format comprising instructions that are interpretable in a rule virtual machine. One or more rules may be packaged together, as illustrated by example behavior rule 160 described in greater detail with respect to FIG. 1C.

As discussed above, behavior rule instructions enable the processing of events and associated computations in order to identify a specific behavior. For example, an event code block is used in the set of rule instructions to indicate that an event should be identified before execution continues. One or more parameters associated with the event may be used to further define what constitutes a match. In examples, exact or inexact (e.g., wild cards, regular expressions, etc.) matching may be used. An event code block may specify more than one event. In some examples, a match may be defined as identifying at least one event in the code block (e.g., an "or" event code block), while, in other examples, a match may be defined as the identification of all events in the code block (e.g., an "and" event code block).

In another example, an event code block contains additional rule instructions, such that the additional rule instructions are associated with events within the event code block. As an example, a first set of additional rule instructions is associated with a first event, while a second set of additional rule instructions is associated with a second event. If the first event is identified, the first set of additional rule instructions is executed. By contrast, if the second event is identified, the second set of additional rule instructions is executed instead. Thus, the execution of a code block may be conditioned on the occurrence of a specific event.

A set of rule instructions may comprise a set of sequential event code blocks, thereby defining a series of events comprising a specific behavior. In some examples, a negative event match may be specified, such that an event match does not occur when the specified event. For example, an event code block may require a "file open" event, but may indicate that "file open" events relating to C:\WINDOWS\ should be ignored. It will be appreciated that other events relating to other platforms may be used according to aspects described herein.

Information relating to one or more matched events is available for processing by subsequent rule instructions, such as the type of event, one or more parameters associated with the event, what pattern was matched by a regular expression, and/or the application that caused the event, among other information. In some examples, a special "last match" rule instruction is provided, wherein the return value for the last match instruction comprises information relating to the last-matched event. It will be appreciated that "last_match" is provided as an example function name.

Rule generation toolchain 122 is further illustrated as part of computing device 102. In examples, aspects of rule generation toolchain 122 are used to generate a compiled rule, which may be referred to herein as a rule binary. For example, a set of rule instructions in human-readable form may be processed by rule generation toolchain 122 to define macros, replace operations, verify syntax, and/or generate a set of rule instructions in an intermediate language. In examples, the intermediate language may be an assembly language that uses operation codes ("opcodes") to represent human-readable instructions in a way that can be executed in a rule virtual machine. Rule generation toolchain 122 may assemble the intermediate language to generate a resulting rule binary. In some examples, event linking may occur, wherein an event hierarchy may be generated. The event hierarchy describes relationships between events and rules, for example, in instances where rules execute other rules (e.g., based on the occurrence of one or more events, based on processing performed by one or more rule instructions, etc.). Rule generation toolchain 122 may be used to generate a packaged behavior rule, which may comprise a set of behavior rules (e.g., in human-readable form, in an intermediate language, in compiled form, etc.), configuration information, event registration data relating to an event hierarchy, launch data, metadata, and/or other information. Additional aspects of rule generation toolchain 122 are discussed in greater detail with respect to FIG. 1B.

System 100 further comprises security service 106. In an example, security service 106 may be a service for providing computer security for one or more computing devices (e.g., computing device 102). It will be appreciated that while security service 106 is illustrated as comprising elements 118-120, fewer, additional, or alternative elements may be used, or security service 106 may be provided as part of a distributed computing device or a cloud-computing system. In some examples, various aspects described above with respect to computing device 102 may additionally or alternatively be performed by security service 106. As illustrated, security service 106 further comprises rule data store 118 and backend threat processor 120. In some examples, behavioral threat detection engine 112 and/or one or more rules in rule data store 116 may be provided by and/or communicate with security service 106 in order to provide computer security to computing device 102 according to aspects described herein.

In an example, rule data store 118 may store one or more rules for access by or distribution to various computing devices, such as computing device 102, thereby updating or improving the security offered by behavioral threat detection engine 112. In some instances, rules in rule data store 118 may be created by security service 106, while, in other examples, rules may be created by one or more third parties (e.g., security researchers, companies, institutions, etc.). As another example, rules created by a user of computing device 102 may be provided to security service 106 by behavioral threat detection engine 112, thereby enabling security service 106 to crowd-source and redistribute rules. Rules stored and/or distributed by rule data store 118 may be generated using a rule generation toolchain, such as rule generation toolchain 122 of computing device 102. In some instances, security service 106 may distribute the rule generation toolchain. As a result of defining a behavior as a behavior rule, aspects of the present disclosure enable any of a variety of people, companies, or other entities to define rules that are useable to detect malicious behaviors rather than merely applying a rigid, pattern-based analysis as has historically been used in malware detection.

Figures 1B, 1C:
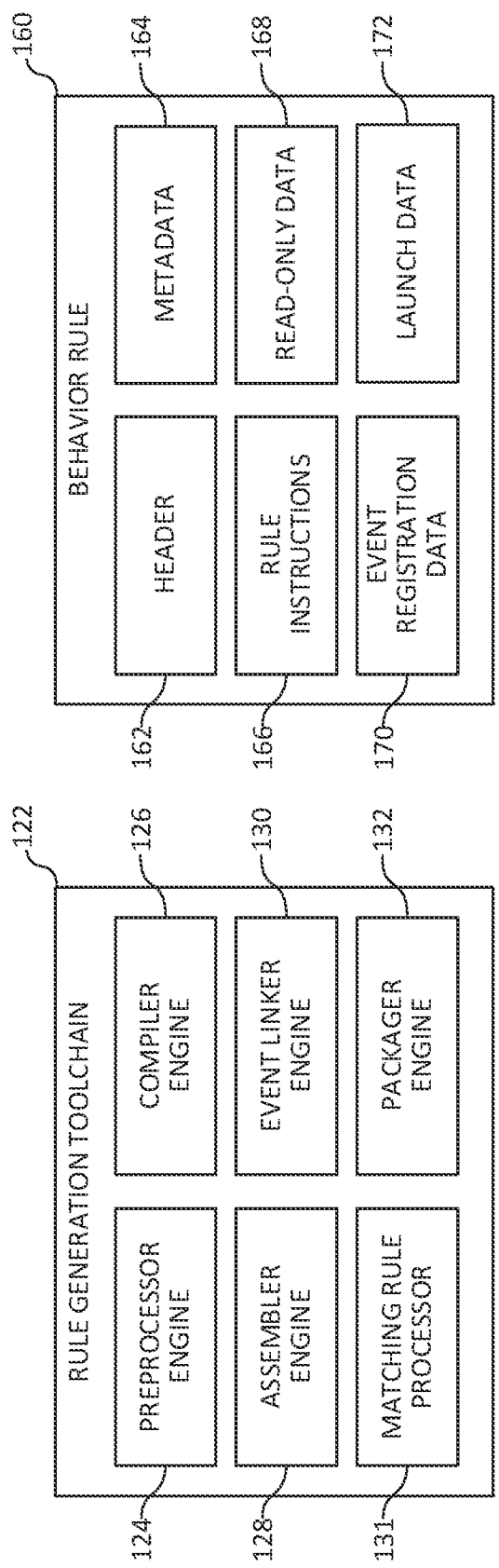
FIG. 1B illustrates an overview of an example rule generation toolchain for generating a behavior rule.
FIG. 1C illustrates an overview of an example behavior rule according to aspects described herein.

FIG. 1B illustrates an overview of an example rule generation toolchain 122 for generating a compiled behavior rule. As illustrated, rule generation toolchain 122 comprises preprocessor engine 124, compiler engine 126, assembler engine 128, event linker engine 130, matching rule processor 131, and packager engine 132. While rule generation toolchain is illustrated as comprising elements 124-132, it will be appreciated that, in other examples, a rule generation toolchain may be comprised of additional or fewer elements. Further, in some examples, certain aspects may be performed by a different component of a computing device, such as behavioral threat detection engine 112 of computing device 102 and/or backend threat processor 120 of security service 106.

As described above, a set of rule instructions describes one or more behaviors and may comprise computations, comparisons, and other instructions relating to events, such that continued execution of the rule instructions may be predicated on the occurrence (or lack thereof) of one or more events. Preprocessor engine 124 performs a variety of operations to preprocess human-readable rule instructions. For example, preprocessor engine 124 may identify one or more files for inclusion (e.g., headers, libraries, etc.), evaluate macro definitions (e.g., macro definitions, macro un-definitions, conditional definitions, etc.), and/or expand macros. While example preprocessor operations are described herein, it will be appreciated that other preprocessor operations may be performed by preprocessor engine 124 without departing from the spirit of this disclosure.

Compiler engine 126 may parse rule instructions, perform semantic analysis, and/or generate intermediate language output. In some examples, compiler engine 126 processes rule instructions that have been preprocessed by preprocessor engine 124. As an example, compiler engine 126 parses a set of rule instructions to generate an abstract syntax tree. The abstract syntax tree may be used to perform semantic analysis, wherein compiler engine 126 verifies the syntax of the set of rule instructions to identify errors, generate warnings, determine variable storage locations, correlate variable usage, and check the correctness of event prototypes, among other examples. In another example, compiler engine 126 uses the abstract syntax tree to generate intermediate language output. In examples, the intermediate language is an assembly language that uses opcodes to represent human-readable instructions in a way that can be executed in a rule virtual machine.

The intermediate language may comprise one or more opcodes relating to an event rule instruction, which may cause execution of the rule virtual machine to pause while waiting for a matching event. For example, "event" opcodes may specify a positive event match, a negative event match, and/or one or more parameters associated with the specified event. Parameters may be specified as positive or negative matches using exact matching (e.g., numerical values, strings, ranges, sets of matches, etc.) and/or inexact matching (e.g., regular expressions, wild cards, etc.). In another example, the intermediate language defines one or more "halt" opcodes relating to halt rule instructions, such that a behavior rule is able to indicate a specific determination has been reached by the rule. Such a determination need not be made at the end of a rule, and a halt instruction may instead be used at any point within the rule. Example determinations include, but are not limited to, a match determination, a non-match determination, or an indication that additional monitoring should be performed. In examples, absent an explicit declaration, compiler engine 126 automatically inserts an implicit halt opcode at the end of execution for the rule, thereby automatically indicating that a rule has or has not been matched.

In some examples, the intermediate language enables the definition of options that are distinct from executable rule instructions and instead specify various aspects relating to the behavior rule. Such aspects may affect the generation of the rule binary. Example options include, but are not limited to, strings, numbers, or other data that should be stored in a read-only section of a rule binary, context information indicating one or more contexts for which a rule should be executed, a friendly name and a description defining human-readable descriptive information for the rule (e.g., which may be used to identify the rule, be used for logging purposes, etc.), a heuristic value indicating a level of suspiciousness associated with a scenario matching the rule (e.g., a higher heuristic value indicates a matched behavior is more suspicious than a lower heuristic value), and/or event registration data defining one or more events processed by the rule and/or events for which the rule should be launched, among other examples. In examples, one or more heuristic values are evaluated using a threshold in order to determine when a rule has made a determination and/or when an action should be taken. In another example, the intermediate language output may retain comments from the human-readable set of rule instructions, so as to facilitate easier human understanding and more efficient debugging of the intermediate language representation of the rule instructions.

Rule generation toolchain 122 is illustrated as further comprising assembler engine 128. In examples, assembler engine 128 uses output generated by compiler engine 126 and preprocessor engine 124 to generate a compiled rule binary. For example, assembler engine 128 processes the intermediate language output generated by compiler engine 126 to generate byte code that can be processed by a behavior engine (e.g., executed in a rule virtual machine).

Event linker engine 130 may evaluate the generated rule binary to determine relationships between the rule binary and one or more other rules, identify (and, in some examples, resolve) cycles in a launch chain, and/or generate an event hierarchy indicating which events are processed by which rules. For example, if the compiled rule binary causes the execution of another rule, event linker engine 130 may identify this and other such relationships. As another example, event linker engine 130 evaluates a launch chain (e.g., a set of rules in which one rule causes the execution one or more other rules) to determine whether any cycles are present. If a cycle is identified, event linker engine 130 may generate a warning or error with respect to the identified cycle. In another example, event linker engine 130 may automatically resolve the identified cycle. Event linker engine 130 may generate an event hierarchy to determine which events should be adopted from related (e.g., child) behavior rules. For example, if a first rule launches a second rule that processes event A, the first rule adopts event A such that the generated event hierarchy will indicate that the first rule also processes event A, even if the first rule does not comprise any rule instructions relating to event A. As a result, events relating to event A are added to the event queue for the first rule, such that when the second rule is executed in a rule virtual machine by the first rule, events relating to event A from the first rule are propagated to the execution of the second rule.

Rule generation toolchain 122 further comprises matching rule processor 131. In examples, matching rule processor 131 processes one or more matching rules, such that matching rules may later be evaluated in order to determine when to execute an associated behavior rule. Similar to a behavior rule, a matching rule may be defined as a set of human-readable instructions, in an intermediate language, or in a binary format, or any combination thereof. Thus, in examples, matching rule processor 131 may preprocess, compile, and/or assemble one or more matching rules as part of the rule binary generation process. In some examples, matching rules are processed prior to, during, or after behavior rules are processed. As an example, matching rule processor 131 processes a matching rule to generate a binary representation of the matching rule, which subsequently causes an associated behavior rule to be processed as described above. In another example, matching rule processor 131 processes one or more matching rules when a behavior rule is packaged as part of generating a packaged behavior rule. In some examples, a behavior rule may be associated with multiple matching rules and, similarly, multiple matching rules may be associated with a behavior rule. In some instances, a matching rule receives an indication (e.g., one or more event packets, event types, etc.) of events that match a behavior rule, thereby causing the behavior rule to be executed.

In some examples, a matching rule relates to higher-level system events as compared to the lower-level (e.g., API-based, interrupt-based, etc.) events that are processed by behavior rules. For example, a matching rule may be defined with respect to a file open operation, whereas a behavior rule processes the API call associated with opening the file. It will be appreciated that any of a variety of system events may be described in a matching rule, including, but not limited to, a file write event, a file delete event, a process creation event, or an event associated with opening and/or editing a registry key, etc. In examples, a matching rule describes multiple events (e.g., using Boolean logic, a hierarchical structure, etc.). For example, a parent matching rule describes a first event and a child matching rule describes a second event, such that the child matching rule is evaluated after the occurrence of the first event, and a match is identified after matching both the parent and child matching rules. It will be appreciated that, in other examples, one or more other operations occur once a matching rule is matched, in addition or as an alternative to executing a behavior rule. As an example, a matching rule may cause a process or parent process to be killed, generate a log entry, request user input, or mark a process as benign, among other examples. In some examples, a matching rule may have an associated mode, wherein the matching rule may be enabled, disabled, or marked as silent. In an example where the matching rule is marked as silent, associated processing may occur without requesting user input or generating an alert, among other examples.

Packager engine 132 of rule generation toolchain 122 packages behavior rules according to aspects described herein. In examples, behavior rule 160, discussed in greater detail with respect to FIG. 1C, is a behavior rule package generated at least in part by packager engine 132. In some examples, packager engine 132 associates a matching rule (e.g., as may be generated by matching rule processor 131) with a behavior rule. Packager engine 132 may use a configuration file to generate a behavior rule package. The configuration file may be in a JavaScript Object Notation (JSON) format, an Extensible Markup Language (XML) format, or in an encoded binary format, among other examples. It will be appreciated that, in another example, configuration information is stored in a database or provided as command line arguments, among other techniques. Example configuration components include, but are not limited to, global options, rule categories, exclusion rules, and a list of rules that are included in the rule package.

Example global options include, but are not limited to, a magic value (e.g., a number identifying the rule/executable format, a globally unique identifier, etc.), one or more version numbers, and an indication as to whether all processes should be monitored. It will be appreciated that, in some examples, the indication may instead comprise one or more contexts that should be monitored. Such options may affect information stored in the header of a generated rule package.

In another example, a rule category defines one or more behavior rules that should be launched under a specific set of circumstances. For instance, a list of applications browser applications (e.g., "firefox.exe," "chrome.exe," etc.) is specified, such that when any one of the applications is launched, an associated rule is launched in a behavior virtual machine. It will be appreciated that any of a variety of matching techniques may be used, including, but not limited to, exact matching, inexact matching, as well as matching based on process name, window title, file name, etc. Information relating to rule categories may be stored as launch data in a behavior rule package. Conversely, an exclusion rule may specify an instance in which an associated rule should not be launched. Returning to the browser application example above, an exclusion rule may specify criteria in which the associated rule should not be launched even when a browser application is launched. Example exclusion rules include, but are not limited to, criteria relating to a calling process, a window title, and/or execution parameters.

The list of included rules specifies one or more behavior rules that are included in the behavior rule package. In examples, the list of included rules is used to perform error checking, wherein the list is evaluated to identify rules specified in the above-discussed rule categories but not listed in the list of included rules and/or to identify rules listed in the list of included rules but not included in any rule categories. In another example, the list of included rules is used by packager engine 132 to determine which rules to include in the behavior rule package.

FIG. 1C illustrates an overview of an example behavior rule 160 according to aspects described herein. For example, behavior rule 160 may be generated by a rule generation toolchain, such as rule generation toolchain 122 in FIG. 1A and/or may be used by a behavioral threat detection engine, such as behavioral threat detection engine 112. Behavior rule 160 may have been packaged by a packager engine according to aspects described herein. As illustrated, behavior rule 160 is comprised of header 162, metadata 164, rule instructions 166, read-only data 168, event registration data 170, and launch data 172. While behavior rule 160 is illustrated as comprising elements 162-172, it will be appreciated that, in some examples, additional, fewer, or alternative elements may be used. For example, event registration data 170 and metadata 164 may be parts of header 162.

Header 162 may contain information including, but not limited to, a magic value, one or more offsets and/or sizes associated with elements 164-172, one or more checksums, a version, a heuristic value, one or more contexts for which rule 160 applies, one or more matching rules, and/or a globally unique identifier. In examples, metadata 164 comprises information about the rule that may facilitate logging. For instance, such information may include, but is not limited to, another magic value, compile-time information, a text-based name for the rule (e.g., in addition to or as an alternative to a globally unique identifier), and/or a description for the rule. In some examples, aspects of header 162 are determined based on options processed by compiler engine 126 and/or global options processed by packager engine 132, as discussed above with respect to FIG. 1B.

Rule instructions 166 comprises one or more rule instructions according to aspects described herein. In examples, at least some of the rule instructions may be machine-readable instructions, as may be generated by compiler engine 126 and/or assembler engine 128 of rule generation toolchain 122 in FIG. 1B. It will be appreciated that, in other examples, at least some of the rule instructions may be human-readable instructions, as may be interpreted by a parser. Read-only data 168 may comprise information useable by rule instructions 166 during execution (e.g., strings, numbers, etc.). In some examples, at least some of the data included in read-only data 168 is determined based on options processed by compiler engine 126 and/or identified when compiler engine 126 is evaluating a set of rule instructions, as discussed above with respect to FIG. 1B.

Event registration data 170 may comprise information relating to one or more events that rule instructions 166 processes. For instance, event registration data 170 may comprise one or more records relating to events for which rule 160 should be launched and/or events that rule 160 processes. In examples, aspects of event registration data 170 are generated by event linker engine 130 of rule generation toolchain 122, such as the event hierarchy described above. Launch data 172 may comprise one or more records relating to rules that rule 160 may launch. For instance, rule 160 may launch a rule as a result of an event occurring, a determination being made (e.g., a halt state being reached), or after a predetermined amount of time, among other examples. Information stored as part of launch data 172 may relate to a launch chain generated/evaluated by event linker engine 130 of rule generation toolchain 122, as was discussed above with respect to FIG. 1B. It will be appreciated that aspects of rule 160 are discussed herein as an example, and that any of a variety of other information and rule formats may be used.

Figure 2:
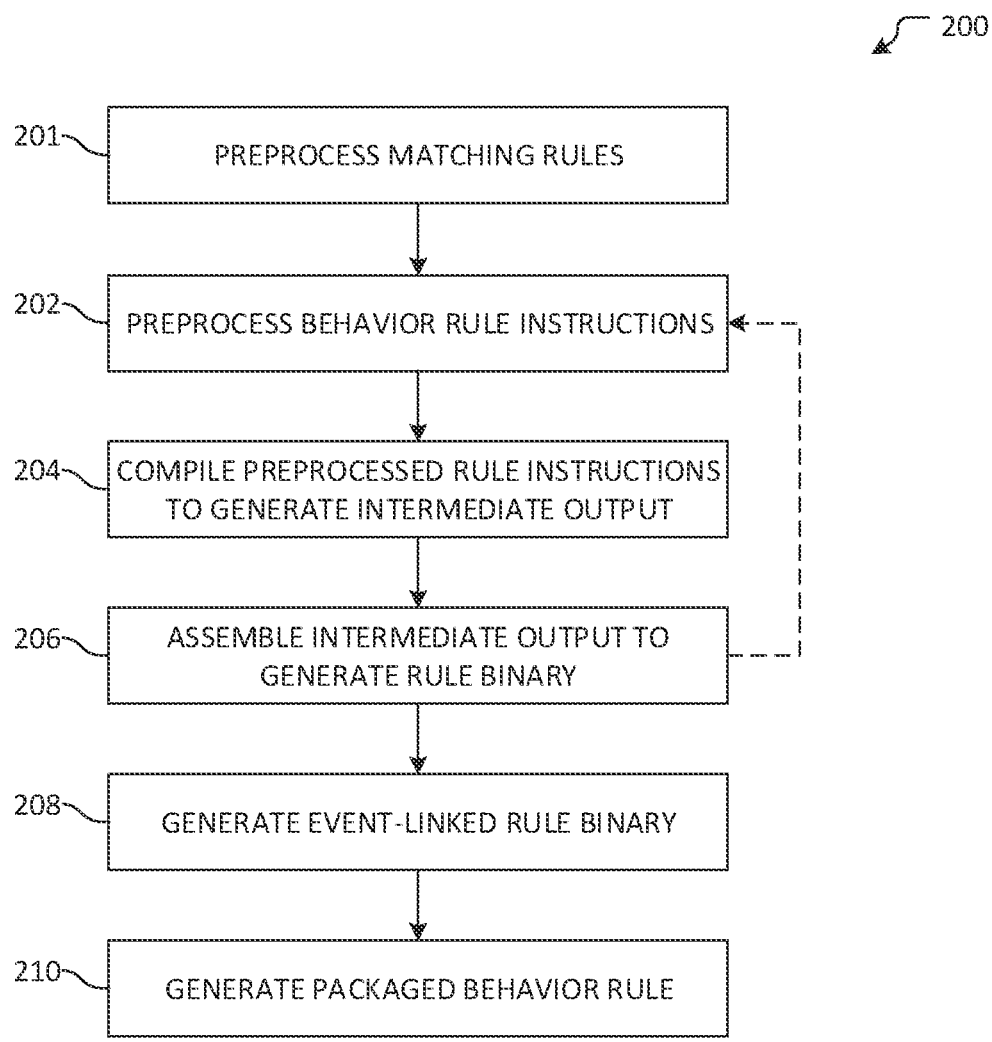
FIG. 2 illustrates an overview of an example method for generating a packaged behavior rule from a set of rule instructions.

FIG. 2 illustrates an overview of an example method 200 for generating a packaged behavior rule from a set of rule instructions. In an example, aspects of method 200 may be performed by rule generation toolchain 122 of computing device 102 discussed above with respect to FIGS. 1A and 1B. Method 200 begins at operation 201, where one or more matching rules are processed. In examples, matching rules are processed by a matching rule processor, such as matching rule processor 131 of rule generation toolchain 122 in FIG. 1B. Processing the matching rules may comprise preprocessing, compiling, and/or assembling one or more matching rules. A matching rule may be defined as a set of human-readable instructions, in an intermediate language, or in a binary format, or any combination thereof. As described above, a matching rule may define one or more behavior rules that are executed in a rule virtual machine when the matching rule is matched. Accordingly, the following operations of method 200 process rule instructions for associated behavior rules in order to generate packaged behavior rule binary.

At operation 202, a set of behavior rule instructions are preprocessed. In examples, the rule instructions are preprocessed by a preprocessor engine, such as preprocessor engine 124 of rule generation toolchain 122 in FIG. 1B. Preprocessing may comprise identifying one or more files for inclusion, evaluating macro definitions, and/or expanding macros. While example preprocessor operations are described herein, it will be appreciated that other preprocessor operations may be performed by preprocessor engine 124 without departing from the spirit of this disclosure.

Flow progresses to operation 204, where the preprocessed rule instructions are compiled to generate an intermediate language output. In an example, the rule instructions are compiled using a compiler engine, such as compiler engine 126 of rule generation toolchain 122 in FIG. 1B. In some examples, compiling the preprocessed rule instructions comprises parsing the rule instructions to generate an abstract syntax tree and performing semantic analysis of the abstract syntax tree. For example, the syntax of the rule instructions is verified to identify errors, generate warnings, determine variable storage locations, correlate variable usage, and/or check the correctness of event prototypes. The abstract syntax tree is used to generate intermediate language output for the rule instructions. As an example, the intermediate language output is an assembly language in which opcodes are used to represent the human-readable rule instructions in a way that can be executed in a rule virtual machine. The intermediate language output may comprise one or more opcodes relating to an event rule instruction and/or a match rule instruction according to aspects described herein.

At operation 206, the intermediate language output is assembled in order to generate a compiled rule binary. In an example, an assembler engine is used to generate the compiled rule binary, such as assembler engine 128 of rule generation toolchain 122 in FIG. 1B. The intermediate language output is assembled in order to generate byte code that can be processed by a behavior engine (e.g., executed in a rule virtual machine). The dashed arrow from operation 206 to operation 202 indicates that one or more of operations 202-206 may be performed multiple times, such as in instances where there are multiple behavior rules defined in the same file or set of files. For example, interrelated rules may be described as a group, such that the processing of each rule may be performed at operations 202-206.

Moving to operation 208, an event-linked rule binary is generated from the compiled output of operation 206. In examples, event linking is performed using an event linker engine, such as event linker engine 130 of rule generation toolchain 122 in FIG. 1B. As an example, the rule binary (or, in the case of multiple behavior rules, rule binaries) generated at operation 206 is evaluated to determine relationships between interrelated rules, identify (and, in some examples, resolve) cycles in a launch chain, and/or generate an event hierarchy indicating which events are processed by which rules.

At operation 210, a packaged behavior rule is generated. In examples, the packaged behavior rule comprises the one or more rule binaries that were generated as a result of operations 202-206 discussed above. In some examples, the behavior rule package is of a format similar to example behavior rule 160 discussed above with respect to FIG. 1C. In some instances, the generation may comprise evaluating configuration, as may be stored in a file or a database, provided as one or more command line arguments, or accessed from a variety of other sources. The generated package may comprise information generated or evaluated at operations 201-208, including, but not limited to, processed matching rules, options processed when generating the intermediate language output, as well as an event hierarchy and/or launch cycle information generated at operation 208. In examples, generating the packaged behavior rule comprises associating one or more matching rules with the packaged behavior rule. In some examples, one or more matching rules processed at operation 201 are stored as part of the packaged behavior rule (e.g., as part of the metadata, as a separate element within the packaged behavior rule, etc.). In other examples, matching rules generated at operation 201 are stored separately from the packaged behavior rule. Flow terminates at operation 210.

The generated behavior rule package may be distributed (e.g., to computing device 102 and/or security service 106 in FIG. 1A, etc.) for use with a behavioral threat detection engine, such as behavioral threat detection engine 112. The behavioral rule package may be executed in a rule virtual machine accordingly. It will be appreciated that while examples herein are described with respect to compiling and packaging a set of rule instructions for execution in a virtual machine, similar aspects may be used to package a set of rule instructions for parsing by a behavioral threat detection engine. For example, human-readable rule instructions may be distributed in place of compiled rule instructions, wherein operations similar to operations 202, 208, and/or 210 may be used to package the rule instructions into a behavior rule package accordingly.

Figure 3:
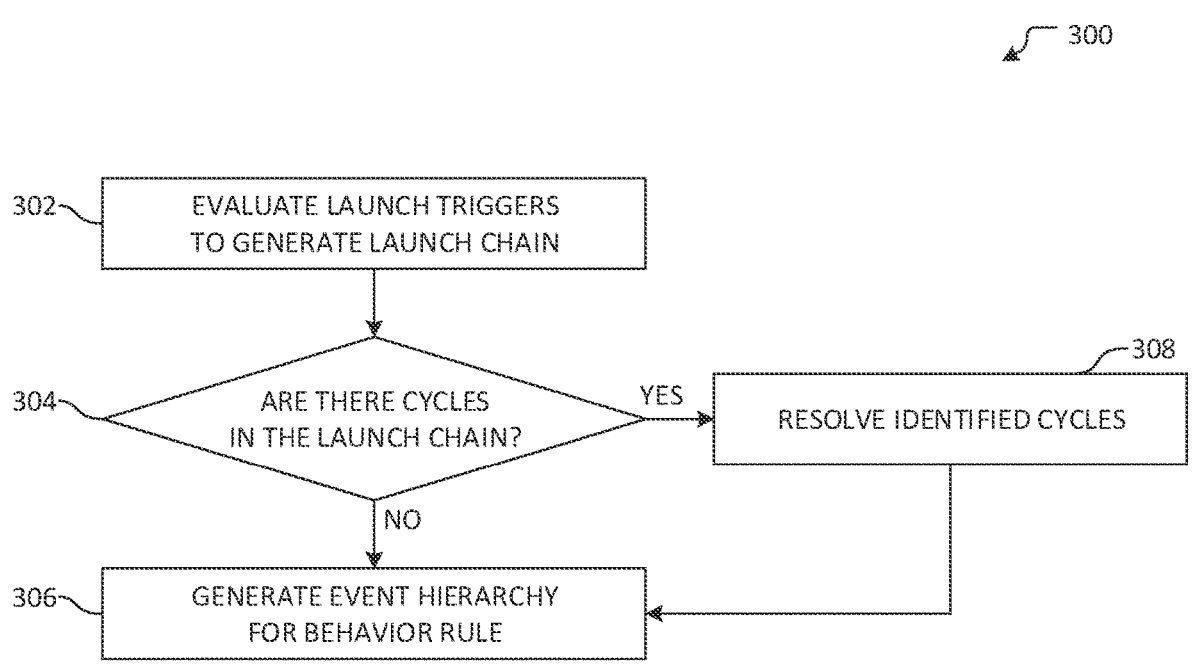
FIG. 3 illustrates an overview of an example method for processing launch triggers for a behavior rule.

FIG. 3 illustrates an overview of an example method 300 for processing launch triggers for a behavior rule. In examples, aspects of method 300 are performed by an event linker engine, such as event linker engine 130 of rule generation toolchain 122 in FIG. 1B. In other examples, aspects of method 300 may be performed at operation 208 discussed above with respect to method 200 in FIG. 2.

Method 300 begins at operation 302, where launch triggers for a behavior rule are evaluated to generate a launch chain. In an example, the evaluation may be performed on a set of human-readable rule instructions, on intermediate language output (e.g., as may be generated by a compiler engine), or on a compiled rule binary (e.g., as may be generated by assembler engine 128). Evaluating launch triggers may comprise iterating through rule instructions to identify instances in which a rule is launched by another rule. In another example, the evaluation comprises determining which events cause a rule to be launched. Thus, the launch chain describes a set of rules in which one rule causes the execution one or more other rules.

At determination 304, it is determined whether there are cycles in the launch chain. The determination may comprise evaluating each element in the launch chain to determine whether any elements have been encountered previously in the launch chain. As an example, if rule A launches rule B, which subsequently launches rule C, the launch chain may indicate A=>B=>C. However, if C subsequently launches A (e.g., A=>B=>C=>A), this may be determined to be a cycle at determination 304.

Accordingly, if it is determined at operation 304 that one or more cycles are present in the launch chain, flow branches "YES" to operation 308, where the identified cycles are resolved. As an example, resolving a launch cycle may comprise omitting the instruction that caused the cycle. Returning to the above example, the instruction launching rule A from rule C may be omitted. In another example, an error or warning may be generated, such that a user may manually resolve the launch cycle. Flow then progresses to operation 306, which is discussed below.

If, however, it is determined that there are not cycles in the launch chain, flow instead branches "NO" to operation 306, where an event hierarchy is generated. As discussed above, the event hierarchy indicates which events are processed by which rules. Thus, it may be determined which events should be adopted from related behavior rules. As an example, if a first rule launches a second rule that processes event A, the generated event hierarchy will indicate that the first rule also processes event A. As a result, when the first rule is executed in a rule virtual machine, events relating to event A are added to the event queue for the first rule, such that the events may be propagated to the execution of the second rule when it is launched by the first rule. Thus, if there are multiple interrelated rules that are launched as a result of various events, the generated event hierarchy identifies events for which subsequent rules in the launch chain depend and/or process. Flow terminates at operation 306.

Figure 4:
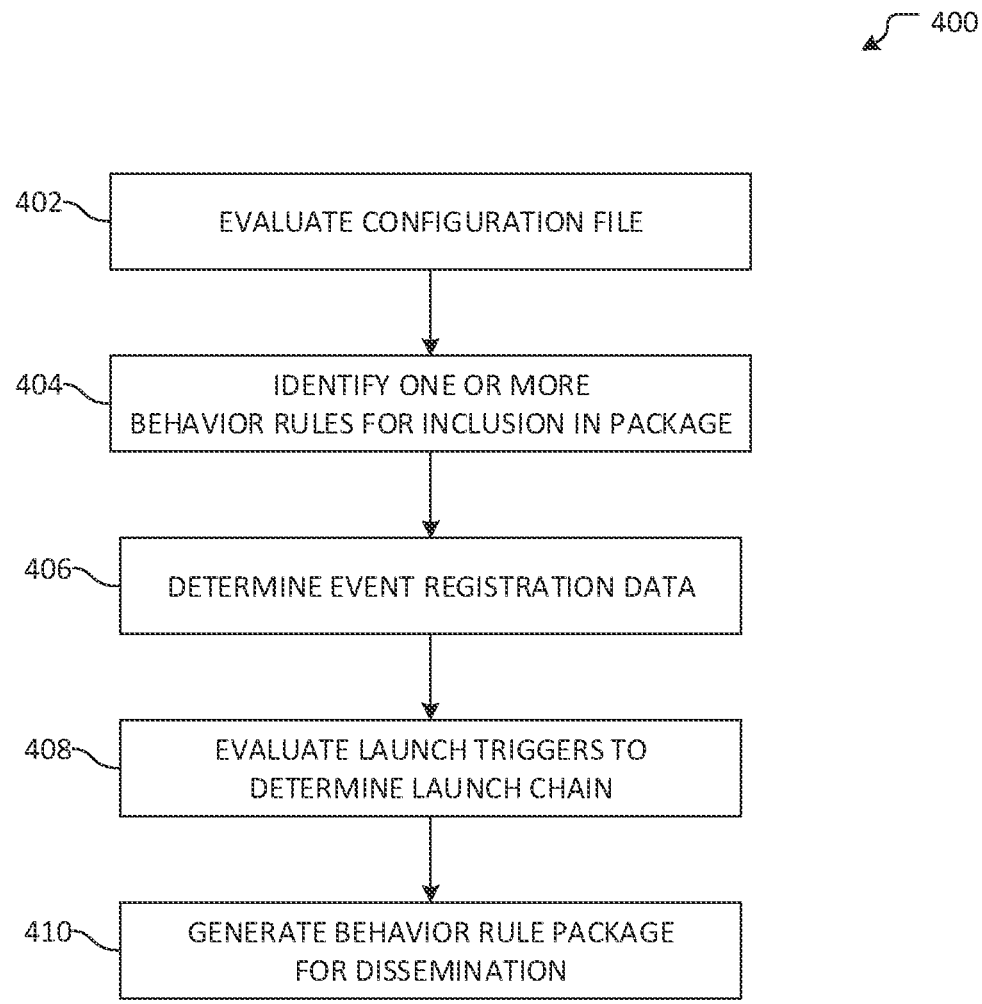
FIG. 4 illustrates an overview of an example method for generating a package for a set of behavior rules.

FIG. 4 illustrates an overview of an example method 400 for generating a packaged behavior rule for a set of behavior rules. In an example, aspects of method 400 are performed by a packager engine, such as packager engine 132 of rule generation toolchain 122 in FIG. 1B. In other examples, aspects of method 400 may be performed at operation 210 discussed above with respect to method 200 in FIG. 2.

Method 400 begins at operation 402, where a configuration file is evaluated. The configuration file may be in a JSON format, an XML format, or a binary format, among other examples. It will be appreciated that, in another example, configuration information is stored in a database or provided as command line arguments, among other techniques. Example configuration components include, but are not limited to, global options, rule categories, exclusion rules, and a list of rules that are included in the rule package, as discussed above. The evaluated information may be included as part of the header and/or may affect aspects of the package generation as described herein.

At operation 404, one or more behavior rules are identified for inclusion in the behavior rule package. Identifying the behavior rules may comprise evaluating rules defined in the same file, listed in the same directory, and/or evaluating which rules are interdependent. In another example, the list of rules in the evaluated configuration file is used to identify the behavior rules for inclusion. In some examples, a launch chain generated by an event linker engine may be evaluated at operation 404 to identify rules for inclusion. The behavior rules may be compiled, in an intermediate language, or in human-readable form, or any combination thereof.

Flow progresses to operation 406, where events registration data is determined. In examples, an event hierarchy (e.g., as may be generated by an event linker engine) is evaluated to generate event registration data that identifies events that launch and/or are processed by the identified behavior rules. In another example, rule instructions associated with the identified behavior rules are evaluated to identify instances of event instructions relating to one or more events.

Moving to operation 408, launch triggers are evaluated to determine a launch chain associated with the identified behavior rules. In examples, the launch chain may have been determined by an event linker engine, as discussed above with respect to method 300 in FIG. 3 and event linker engine 130 in FIG. 1B. In other examples, interdependencies among the identified behavior rules are evaluated in order to determine the rules that launch and/or are launched by other rules, thereby generating a launch chain for the identified behavior rules.

At operation 410, a behavior rule package is generated. In an example, the format of the behavior rule package is similar to that of behavior rule 160 in FIG. 1C. For example, a header and/or metadata for the behavior rule package may be generated and may comprise information including, but not limited to, a magic value, one or more offsets and/or sizes associated with other elements of the behavior rule package, one or more checksums, a version, a heuristic value, one or more contexts for which the identified rules apply, information used for debugging or logging purposes, one or more matching rules, and/or a globally unique identifier.

As another example, rule instructions associated with the identified behavior rules are included in the behavior rule package, wherein the included rule instructions may be human-readable instructions, intermediate language instructions, and/or compiled byte code, or any combination thereof according to aspects described herein. Some of the rule instructions may refer to, process, or otherwise access read-only data, which may also be stored in the generated rule behavior package. Similarly, one or more matching rules incorporated into the behavior rule package may be stored as human-readable instructions, intermediate language instructions, and/or compiled byte code, or any combination thereof.

Information determined at operations 406 and 408 is also incorporated into the behavior rule package. For example, event registration data determined at operation 406 is included in the generated behavior rule package, such that the events relevant to the identified rules in the rule package are easily identifiable (e.g., by a behavioral threat detection engine, by a virtual machine management engine, etc.). As another example, information relating to the launch chain determined at operation 408 is incorporated into the behavior rule package, thereby enabling the transfer of relevant events from a parent rule to one or more child rules accordingly when the parent rule causes the instantiation of the child rule. Flow terminates at operation 410.

Figure 5:
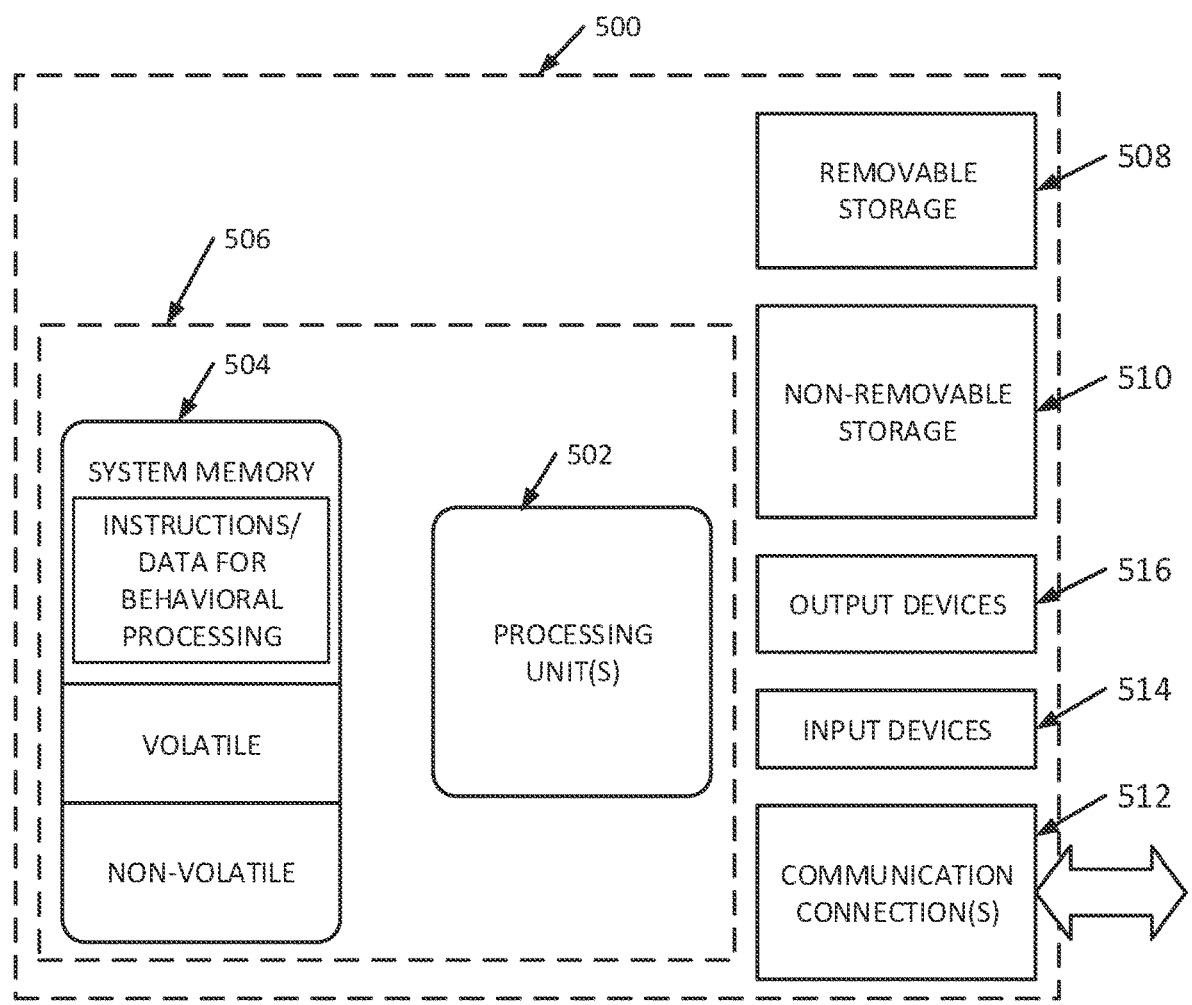
FIG. 5 illustrates one example of a suitable operating environment in which one or more of the present embodiments may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, one or more rules, an event type index, one or more configuration files, one or more executables relating to a rule generation toolchain, instructions to perform the methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

As will be understood from the foregoing disclosure, one aspect of the technology relates to a system comprising: at least one processor; and memory storing instructions that, when executed by the at least one processor, causes the system to perform a set of operations. The set of operations comprises: generating, from a set of rule instructions for a first behavior rule to identify a behavior, an intermediate language output, wherein the intermediate language output is a representation of the set of rule instructions and comprises at least one event operation code and at least one halt operation code, wherein the halt operation code indicates a determination with respect to the behavior; compiling the intermediate language output to generate a behavior rule binary; generating an event hierarchy for the generated behavior rule binary, wherein the event hierarchy comprises an indication of one or more events processed by the behavior rule binary; and distributing the generated behavior rule binary and information relating to the generated event hierarchy to a computing device, wherein the generated behavior rule binary is executable in a rule virtual machine of the computing device. In an example, the set of rule instructions comprises an instruction to launch a second behavior rule, and the set of operations further comprises: generating a launch chain for the behavior rule binary, wherein the launch chain comprises an indication that the generated behavior rule binary launches the second behavior rule. In another example, generating the launch chain further comprises: evaluating the launch chain to determine whether a launch cycle is present in the launch chain; and when it is determined that a launch cycle is present in the launch chain, generating an indication of the launch cycle. In a further example, distributing the generated behavior rule binary further comprises distributing a second rule binary for the second behavior rule and information relating to the generated launch chain. In yet another example, distributing the generated behavior rule binary and information relating to the generated event hierarchy comprises distributing a packaged behavior rule, wherein the packaged behavior rule comprises a header, the generated behavior rule binary, and the information relating to the generated event hierarchy. In a further still example, the packaged behavior rule further comprises a second rule binary for a second behavior rule. In another example, the packaged behavior rule further comprises information relating to a launch chain for the first behavior rule and the second behavior rule.

In another aspect, the technology relates to a method for generating a packaged behavior rule for behavioral threat detection. The method comprises: processing a first set of rule instructions to generate a first behavior rule binary; processing a second set of rule instructions to generate a second behavior rule binary; generating an event hierarchy for the first behavior rule binary and the second behavior rule binary, wherein the event hierarchy comprises an indication of one or more events processed by the first behavior rule binary and the second behavior rule binary; generating a launch chain for the first behavior rule binary and the second behavior rule binary, wherein the launch chain comprises an indication that the first behavior rule binary launches the second behavior rule binary; generating a packaged behavior rule comprising the first behavior rule binary, the second behavior rule binary, information relating to the event hierarchy, and information relating to the launch chain; and distributing the generated packaged behavior rule to a computing device. In an example, generating the launch chain further comprises: evaluating the launch chain to determine whether a launch cycle is present in the launch chain; and when it is determined that a launch cycle is present in the launch chain, generating an indication of the launch cycle. In another example, generating the launch chain further comprises: evaluating the launch chain to determine whether a launch cycle is present in the launch chain; and when it is determined that a launch cycle is present in the launch chain, automatically resolving the launch cycle in the launch chain. In a further example, processing the first set of rule instructions to generate a first behavior rule binary comprises: generating, from the first set of rule instructions, an intermediate language output, wherein the intermediate language output is a representation of the first set of rule instructions and comprises at least one event operation code and at least one halt operation code, wherein the halt operation code indicates a determination with respect to a behavior; and compiling the intermediate language output to generate the first behavior rule binary. In yet another example, the packaged behavior rule further comprises a header and read-only data for at least one of the first behavior rule and the second behavior rule. In a further still example, distributing the generated packaged behavior rule to a computing device comprises providing the generated packaged behavior rule to a security service for further distribution.

In a further aspect, the technology relates to a method for processing a behavior rule for behavioral threat detection. The method comprises: generating, from a set of rule instructions for a first behavior rule to identify a behavior, an intermediate language output, wherein the intermediate language output is a representation of the set of rule instructions and comprises at least one event operation code and at least one halt operation code, wherein the halt operation code indicates a determination with respect to the behavior; compiling the intermediate language output to generate a behavior rule binary; generating an event hierarchy for the generated behavior rule binary, wherein the event hierarchy comprises an indication of one or more events processed by the behavior rule binary; and distributing the generated behavior rule binary and information relating to the generated event hierarchy to a computing device, wherein the generated behavior rule binary is executable in a rule virtual machine of the computing device. In an example, the set of rule instructions comprises an instruction to launch a second behavior rule, and the method further comprises: generating a launch chain for the behavior rule binary, wherein the launch chain comprises an indication that the generated behavior rule binary launches the second behavior rule. In another example, generating the launch chain further comprises: evaluating the launch chain to determine whether a launch cycle is present in the launch chain; and when it is determined that a launch cycle is present in the launch chain, generating an indication of the launch cycle. In a further example, distributing the generated behavior rule binary further comprises distributing a second rule binary for the second behavior rule and information relating to the generated launch chain. In yet another example, distributing the generated behavior rule binary and information relating to the generated event hierarchy comprises distributing a packaged behavior rule, wherein the packaged behavior rule comprises a header, the generated behavior rule binary, and the information relating to the generated event hierarchy. In a further still example, the packaged behavior rule further comprises a second rule binary for a second behavior rule. In another example, the packaged behavior rule further comprises information relating to a launch chain for the first behavior rule and the second behavior rule.

As will be further understood from the foregoing disclosure, one aspect of the technology relates to a system comprising: at least one processor; and memory storing instructions that, when executed by the at least one processor, causes the system to perform a set of operations. The set of operations comprises: encountering a first instruction of a behavior rule indicating at least one event, wherein the at least one event is associated with a behavior; in response to encountering the first instruction, pausing execution; when an event occurrence associated with the at least one event is identified, resuming execution; processing, based on a second instruction of the behavior rule, information associated with the event occurrence; encountering a third instruction of the behavior rule, wherein the third instruction is a halt instruction indicating a determination as to the behavior has been made; and performing, by the system, an action in response to the halt instruction. In an example, halt instruction indicates a positive match determination as to the behavior, and performing the action comprises taking a remedial action based on the determination as to the behavior. In another example, the halt instruction indicates a negative match determination as to the behavior, and performing the action comprises continuing normal system execution. In a further example, the halt instruction indicates additional monitoring should be performed, and performing the action comprises performing additional monitoring for the behavior. In yet another example, the event occurrence indicates that an event of the at least one event occurred. In a further still example, the event occurrence indicates that every event of the at least one event occurred. In another example, first instruction indicating the at least one event further comprises an indication of a parameter for the at least one event, and the event occurrence associated with the at least one event indicates that an event having the parameter indicated by the first instruction occurred.

In another aspect, the technology relates to another system comprising at least one processor; and memory storing instructions that, when executed by the at least one processor, causes the system to perform a set of operations. The set of operations comprises: encountering a first instruction of a behavior rule indicating at least one event and a parameter for the at least one event, wherein the at least one event is associated with a behavior; in response to encountering the first instruction, pausing execution; when an event occurrence associated with the at least one event is identified at a computing device and the event occurrence associated with the at least one event indicates that an event having the parameter indicated by the first instruction occurred, resuming execution; processing, based on a second instruction of the behavior rule, information associated with the event occurrence; encountering a third instruction of the behavior rule, wherein the third instruction is a halt instruction indicating a determination as to the behavior has been made; and performing, by the computing device, an action in response to the halt instruction. In an example, the parameter is defined an exact match for an event parameter of the at least one event. In another example, the parameter is defined as a regular expression indicating an inexact match for an event parameter of the at least one event. In a further example, the information associated with the event occurrence comprises the parameter that matched the regular expression indicating the inexact match for the event parameter of the at least one event. In yet another example, the halt instruction indicates a determination selected from the group of determinations consisting of: a positive match determination as to the behavior; a negative match determination as to the behavior; and an inconclusive determination indicating that additional monitoring should be performed. In a further still example, the first instruction further comprises a negative indication, which indicates a negative event match that is not the event occurrence for the at least one event.

In a further aspect, the technology relates to a method for executing a behavior rule to perform behavioral threat detection. The method comprises: encountering a first instruction of a behavior rule indicating at least one event, wherein the at least one event is associated with a behavior; in response to encountering the first instruction, pausing execution; when an event occurrence associated with the at least one event is identified, resuming execution; processing, based on a second instruction of the behavior rule, information associated with the event occurrence; encountering a third instruction of the behavior rule, wherein the third instruction is a halt instruction indicating a determination as to the behavior has been made; and performing, by the system, an action in response to the halt instruction. In an example, the halt instruction indicates a positive match determination as to the behavior, and performing the action comprises taking a remedial action based on the determination as to the behavior. In another example, the halt instruction indicates a negative match determination as to the behavior, and performing the action comprises continuing normal system execution. In a further example, the halt instruction indicates additional monitoring should be performed, and performing the action comprises performing additional monitoring for the behavior. In yet another example, the event occurrence indicates that an event of the at least one event occurred. In a further still example, the event occurrence indicates that every event of the at least one event occurred. In another example, the first instruction indicating the at least one event further comprises an indication of a parameter for the at least one event, and the event occurrence associated with the at least one event indicates that an event having the parameter indicated by the first instruction occurred.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A non-transitory computer readable medium, comprising instructions for generating a packaged behavior rule for behavioral threat detection, the instructions for:
   processing a first set of rule instructions to generate a first behavior rule binary, wherein processing comprises:
   generating, from the first set of rule instructions, an intermediate language output, wherein the intermediate language output is a representation of the first set of rule instructions and comprises at least one event operation code and at least one halt operation code, wherein the halt operation code indicates a determination with respect to a behavior; and
   compiling the intermediate language output to generate the first behavior rule binary;
   processing a second set of rule instructions to generate a second behavior rule binary;
   generating an event hierarchy for the first behavior rule binary and the second behavior rule binary, wherein the event hierarchy comprises an indication of one or more events processed by the first behavior rule binary and the second behavior rule binary;
   generating a launch chain for the first behavior rule binary and the second behavior rule binary, wherein the launch chain comprises an indication that the first behavior rule binary launches the second behavior rule binary;
   generating a packaged behavior rule comprising the first behavior rule binary, the second behavior rule binary, information relating to the event hierarchy, and information relating to the launch chain; and
   distributing the generated packaged behavior rule to a computing device.

2. The non-transitory computer readable medium of claim 1, wherein generating the launch chain further comprises:
   evaluating the launch chain to determine whether a launch cycle is present in the launch chain; and
   when it is determined that the launch cycle is present in the launch chain, generating an indication of the launch cycle.

3. The non-transitory computer readable medium of claim 1, wherein generating the launch chain further comprises:
   evaluating the launch chain to determine whether a launch cycle is present in the launch chain; and
   when it is determined that the launch cycle is present in the launch chain, automatically resolving the launch cycle in the launch chain.

4. The non-transitory computer readable medium of claim 1, wherein the packaged behavior rule further comprises a header and read-only data for at least one of the first behavior rule and the second behavior rule.

5. The non-transitory computer readable medium of claim 1, wherein distributing the generated packaged behavior rule to a computing device comprises providing the generated packaged behavior rule to a security service for further distribution.

6. A non-transitory computer readable medium for processing a behavior rule for behavioral threat detection, comprising instructions for:
   generating, from a set of rule instructions for a first behavior rule to identify a behavior, an intermediate language output, wherein the intermediate language output is a representation of the set of rule instructions and comprises at least one event operation code and at least one halt operation code, wherein the halt operation code indicates a determination with respect to the behavior;
   compiling the intermediate language output to generate a behavior rule binary;
   generating an event hierarchy for the generated behavior rule binary, wherein the event hierarchy comprises an indication of one or more events processed by the behavior rule binary; and
   distributing the generated behavior rule binary and information relating to the generated event hierarchy to a computing device, wherein the generated behavior rule binary is executable in a rule virtual machine of the computing device.

7. The non-transitory computer readable medium of claim 6, wherein the set of rule instructions comprises an instruction to launch a second behavior rule, and wherein the instructions are further for:
   generating a launch chain for the behavior rule binary, wherein the launch chain comprises an indication that the generated behavior rule binary launches the second behavior rule.

8. The non-transitory computer readable medium of claim 7, wherein generating the launch chain further comprises:
   evaluating the launch chain to determine whether a launch cycle is present in the launch chain; and
   when it is determined that that launch cycle is present in the launch chain, generating an indication of the launch cycle.

9. The non-transitory computer readable medium of claim 7, wherein distributing the generated behavior rule binary further comprises distributing a second rule binary for the second behavior rule and information relating to the generated launch chain.

10. The non-transitory computer readable medium of claim 6, wherein distributing the generated behavior rule binary and information relating to the generated event hierarchy comprises distributing a packaged behavior rule, wherein the packaged behavior rule comprises a header, the generated behavior rule binary, and the information relating to the generated event hierarchy.

11. The non-transitory computer readable medium of claim 10, wherein the packaged behavior rule further comprises a second rule binary for a second behavior rule.

12. The non-transitory computer readable medium of claim 11, wherein the packaged behavior rule further comprises information relating to a launch chain for the first behavior rule and the second behavior rule.

13. A system, comprising:
   a processor; and
   a non-transitory computer readable medium, comprising instructions for
   generating, from a set of rule instructions for a first behavior rule to identify a behavior, an intermediate language output, wherein the intermediate language output is a representation of the set of rule instructions and comprises at least one event operation code and at least one halt operation code, wherein the halt operation code indicates a determination with respect to the behavior;

compiling the intermediate language output to generate a behavior rule binary;

generating an event hierarchy for the generated behavior rule binary, wherein the event hierarchy comprises an indication of one or more events processed by the behavior rule binary; and distributing the generated behavior rule binary and information relating to the generated event hierarchy to a computing device, wherein the generated behavior rule binary is executable in a rule virtual machine of the computing device.

14. The system of claim 13, wherein the set of rule instructions comprises an instruction to launch a second behavior rule, and wherein the instructions are further for:

generating a launch chain for the behavior rule binary, wherein the launch chain comprises an indication that the generated behavior rule binary launches the second behavior rule.

15. The system of claim 14, wherein generating the launch chain further comprises:

evaluating the launch chain to determine whether a launch cycle is present in the launch chain; and when it is determined that that launch cycle is present in the launch chain, generating an indication of the launch cycle.

16. The system of claim 14, wherein distributing the generated behavior rule binary further comprises distributing a second rule binary for the second behavior rule and information relating to the generated launch chain.

17. The system of claim 13, wherein distributing the generated behavior rule binary and information relating to the generated event hierarchy comprises distributing a packaged behavior rule, wherein the packaged behavior rule comprises a header, the generated behavior rule binary, and the information relating to the generated event hierarchy.

18. The system of claim 17, wherein the packaged behavior rule further comprises a second rule binary for a second behavior rule.

19. The system of claim 18, wherein the packaged behavior rule further comprises information relating to a launch chain for the first behavior rule and the second behavior rule.

* * * * *